US012785817B2

(12) United States Patent
Winzer et al.

(10) Patent No.: US 12,785,817 B2
(45) Date of Patent: Nov. 3, 2026

(54) PHOTONIC CHIPLET PACKAGING

(71) Applicant: Ciena Corporation, Hanover, MD (US)

(72) Inventors: Peter Johannes Winzer, Aberdeen, NJ (US); Brett Michael Dunn Sawyer, Pasadena, CA (US); Guilhem de Valicourt, Jersey City, NJ (US); Jonathan Proesel, Mount Vernon, NY (US); Marco Lamponi, Aberdeen, NJ (US)

(73) Assignee: Ciena Corporation, Fulton, MD (US)

( * ) Notice: Subject to any disclaimer, the term of this patent is extended or adjusted under 35 U.S.C. 154(b) by 374 days.

(21) Appl. No.: 18/368,864

(22) Filed: Sep. 15, 2023

(65) Prior Publication Data

US 2024/0097796 A1 Mar. 21, 2024

Related U.S. Application Data

(60) Provisional application No. 63/407,610, filed on Sep. 16, 2022.

(51) Int. Cl.
*H04B 10/80* (2013.01)
*H04B 10/50* (2013.01)

(52) U.S. Cl.
CPC ......... *H04B 10/801* (2013.01); *H04B 10/503* (2013.01)

(58) Field of Classification Search
CPC ............................ H04B 10/801; H04B 10/503
(Continued)

(56) References Cited

U.S. PATENT DOCUMENTS 5,136,410 A 8/1992 Heiling et al.
5,229,925 A 7/1993 Spencer et al.
(Continued)

FOREIGN PATENT DOCUMENTS

CA 3055376 9/2018
CN 103402337 3/2016
(Continued)

OTHER PUBLICATIONS

[No Author Listed] [online], “The Promise of Co-Packaged Optics: Paving the Way for Improved Power Efficiency, Size, and Cost,” The Institute for Energy Efficiency, Oct. 2, 2020, retrieved on Jan. 11, 2023, <https://www.youtube.com/watch?v=OzNGZJHKiE8>, 19 pages [Video Submission].
(Continued)

*Primary Examiner* — Amritbir K Sandhu
(74) *Attorney, Agent, or Firm* — Baratta Law PLLC; Lawrence A. Baratta, Jr.

(57) ABSTRACT

A system includes a first chiplet, a second chiplet, an electronic amplification module, and a converter module. The first chiplet includes, e.g., a network switch, a central processor unit, a graphics processor unit, a tensor processing unit, a neural network processor, an artificial intelligence accelerator, a digital signal processor, an application specific integrated circuit (ASIC), or a data storage device. The second chiplet includes a photonic module having, e.g., optical switches, optical couplers, optical routers, optical splitters, optical multiplexers, optical demultiplexers, optical filters, optical modulators, optical phase shifters, lasers, optical amplifiers, optical-to-electrical signal converters, or electrical-to-optical signal converters. The electronic amplification module includes, e.g., a driver amplifier or a transimpedance amplifier, and configured to process electrical signals sent to or from the photonic module. The converter
(Continued)

module converts signals between a first interface (for communicating with the first chiplet) and a second interface (for communicating with the electronic amplification module).

66 Claims, 80 Drawing Sheets

(58) Field of Classification Search
USPC .......................................................... 398/164
See application file for complete search history.

(56) References Cited

U.S. PATENT DOCUMENTS

| | | | |
|---|---|---|---|
| 6,396,990 | B1 | 5/2002 | Ehn et al. |
| 6,411,520 | B1 | 6/2002 | Hauke et al. |
| 6,563,696 | B1 | 5/2003 | Harris et al. |
| 6,769,812 | B1 | 8/2004 | Handforth |
| 6,822,874 | B1 | 11/2004 | Marler |
| 7,170,749 | B2 | 1/2007 | Hoshino et al. |
| 7,180,751 | B1 | 2/2007 | Geschke et al. |
| 7,239,523 | B1 | 7/2007 | Collins et al. |
| 7,643,292 | B1 | 1/2010 | Chen |
| 7,787,772 | B2 | 8/2010 | Ota |
| 7,813,143 | B2 | 10/2010 | Dorenkamp et al. |
| 8,047,856 | B2 | 11/2011 | Mccolloch |
| 8,090,230 | B1 | 1/2012 | Hasharoni et al. |
| 8,116,095 | B2 | 2/2012 | Dorenkamp et al. |
| 8,208,253 | B1 | 6/2012 | Goergen et al. |
| 8,482,917 | B2 | 7/2013 | Rose |
| 8,488,921 | B2 | 7/2013 | Doany et al. |
| 8,780,551 | B2 | 7/2014 | Farnholtz |
| 8,992,099 | B2 | 3/2015 | Blackwell et al. |
| 9,250,649 | B2 | 2/2016 | Shabbir et al. |
| 9,301,025 | B2 | 3/2016 | Kioski et al. |
| 9,366,832 | B2 | 6/2016 | Arao et al. |
| 9,461,768 | B2 | 10/2016 | Kipp |
| 9,557,478 | B2 | 1/2017 | Doerr et al. |
| 9,622,388 | B1 | 4/2017 | Gaal |
| 9,645,316 | B1 | 5/2017 | Hasharoni et al. |
| 9,768,881 | B2 | 9/2017 | Georgas et al. |
| 9,781,546 | B2 | 10/2017 | Barrett et al. |
| 9,786,641 | B2 | 10/2017 | Budd et al. |
| 9,874,688 | B2 | 1/2018 | Doerr et al. |
| 9,927,575 | B2 | 3/2018 | Goodwill et al. |
| 10,018,787 | B1 | 7/2018 | Wang |
| 10,025,043 | B2 | 7/2018 | Vallance et al. |
| 10,054,749 | B1 | 8/2018 | Wang et al. |
| 10,082,633 | B2 | 9/2018 | Schaevitz et al. |
| 10,135,218 | B2 | 11/2018 | Popovic et al. |
| 10,135,539 | B2 | 11/2018 | Moss et al. |
| 10,209,464 | B2 | 2/2019 | Pfnuer et al. |
| 10,215,944 | B2 | 2/2019 | Sedor et al. |
| 10,234,646 | B2 | 3/2019 | Mack et al. |
| 10,271,461 | B2 | 4/2019 | Schmidtke |
| 10,330,875 | B2 | 6/2019 | Fini et al. |
| 10,365,436 | B2 | 7/2019 | Byrd et al. |
| 10,436,992 | B2 | 10/2019 | Zbinden et al. |
| 10,514,509 | B2 | 12/2019 | Popovic et al. |
| 10,568,238 | B1 | 2/2020 | Leung |
| 10,582,639 | B1 | 3/2020 | Chopra |
| 10,615,903 | B2 | 4/2020 | Welch |
| 10,725,245 | B2 | 7/2020 | Leigh et al. |
| 10,866,376 | B1 | 12/2020 | Ghiasi |
| 10,905,025 | B1 | 1/2021 | Thomas et al. |
| 11,005,572 | B1 | 5/2021 | Chiang et al. |
| 11,058,034 | B2 | 7/2021 | Leung |
| 11,107,770 | B1 | 8/2021 | Ramalingam et al. |
| 11,121,776 | B2 | 9/2021 | Aboagye |
| 11,153,670 | B1 | 10/2021 | Winzer |
| 11,159,240 | B1 * | 10/2021 | Di Mola ............... H04L 1/0045 |
| 11,165,509 | B1 | 11/2021 | Nagarajan et al. |
| 11,190,172 | B1 | 11/2021 | Raj et al. |
| 11,194,109 | B2 | 12/2021 | Winzer |
| 11,287,585 | B2 | 3/2022 | Winzer |
| 11,381,891 | B2 | 7/2022 | Leigh |
| 11,411,643 | B1 | 8/2022 | Chaouch |
| 11,432,056 | B1 | 8/2022 | Doerr et al. |
| 11,477,908 | B2 | 10/2022 | Jochim et al. |
| 11,483,943 | B2 | 10/2022 | Leigh et al. |
| 11,509,399 | B2 | 11/2022 | Paraiso et al. |
| 11,510,329 | B2 | 11/2022 | Leigh |
| 11,557,875 | B2 | 1/2023 | Kovsh |
| 11,621,795 | B2 | 4/2023 | Winzer |
| 11,895,798 | B2 | 2/2024 | Winzer et al. |
| 11,988,874 | B2 | 5/2024 | Winzer et al. |
| 11,997,819 | B2 | 5/2024 | Winzer et al. |
| 12,004,318 | B2 | 6/2024 | Winzer et al. |
| 12,029,004 | B2 | 7/2024 | Winzer et al. |
| 12,055,766 | B2 | 8/2024 | Pupalaikis et al. |
| 2002/0003232 | A1 | 1/2002 | Ahn et al. |
| 2002/0142634 | A1 | 10/2002 | Poplawski et al. |
| 2003/0030977 | A1 | 2/2003 | Garnett et al. |
| 2003/0081287 | A1 | 5/2003 | Jannson et al. |
| 2003/0201462 | A1 | 10/2003 | Pommer et al. |
| 2003/0211759 | A1 | 11/2003 | Olzak et al. |
| 2004/0027462 | A1 | 2/2004 | Hing |
| 2004/0033016 | A1 | 2/2004 | Kropp |
| 2004/0094760 | A1 | 5/2004 | Taylor et al. |
| 2004/0257766 | A1 | 12/2004 | Rasmussen et al. |
| 2004/0264838 | A1 | 12/2004 | Uchida et al. |
| 2005/0025409 | A1 | 2/2005 | Welch et al. |
| 2005/0083653 | A1 | 4/2005 | Chen |
| 2005/0111810 | A1 | 5/2005 | Giraud et al. |
| 2005/0124224 | A1 | 6/2005 | Schunk |
| 2005/0147117 | A1 | 7/2005 | Pettey et al. |
| 2005/0224946 | A1 | 10/2005 | Dutta |
| 2006/0062526 | A1 | 3/2006 | Ikeuchi |
| 2006/0239605 | A1 | 10/2006 | Palen et al. |
| 2007/0223865 | A1 | 9/2007 | Lu et al. |
| 2007/0258683 | A1 | 11/2007 | Rolston et al. |
| 2008/0055847 | A1 | 3/2008 | Belady et al. |
| 2008/0259566 | A1 | 10/2008 | Fried |
| 2009/0093073 | A1 | 4/2009 | Chan et al. |
| 2009/0113698 | A1 | 5/2009 | Love et al. |
| 2010/0008038 | A1 | 1/2010 | Coglitore |
| 2010/0054681 | A1 | 3/2010 | Biribuze |
| 2010/0097752 | A1 | 4/2010 | Doll et al. |
| 2010/0262285 | A1 | 10/2010 | Teranaka |
| 2010/0265658 | A1 | 10/2010 | Sawai et al. |
| 2010/0284698 | A1 | 11/2010 | Mccolloch |
| 2010/0288420 | A1 | 11/2010 | Kimura et al. |
| 2011/0188054 | A1 | 8/2011 | Petronius et al. |
| 2011/0188815 | A1 | 8/2011 | Blackwell et al. |
| 2011/0261427 | A1 | 10/2011 | Hart et al. |
| 2012/0014639 | A1 | 1/2012 | Doany et al. |
| 2012/0120596 | A1 | 5/2012 | Bechtolsheim et al. |
| 2012/0257355 | A1 | 10/2012 | Yi et al. |
| 2013/0089293 | A1 | 4/2013 | Howard et al. |
| 2013/0094827 | A1 | 4/2013 | Haataja |
| 2013/0102237 | A1 | 4/2013 | Zhou et al. |
| 2013/0193304 | A1 | 8/2013 | Yu et al. |
| 2013/0342993 | A1 | 12/2013 | Singleton |
| 2014/0049931 | A1 | 2/2014 | Wellbrock et al. |
| 2014/0064659 | A1 | 3/2014 | Doerr et al. |
| 2014/0098492 | A1 | 4/2014 | Lam |
| 2014/0133101 | A1 | 5/2014 | Sunaga et al. |
| 2014/0306131 | A1 | 10/2014 | Mack et al. |
| 2014/0321803 | A1 | 10/2014 | Thacker et al. |
| 2014/0321804 | A1 | 10/2014 | Thacker |
| 2014/0327902 | A1 | 11/2014 | Giger et al. |
| 2015/0037044 | A1 | 2/2015 | Peterson et al. |
| 2015/0094896 | A1 | 4/2015 | Cuddihy et al. |
| 2015/0098677 | A1 | 4/2015 | Thacker et al. |
| 2015/0107101 | A1 | 4/2015 | DeCusatis et al. |
| 2015/0125110 | A1 | 5/2015 | Anderson et al. |
| 2015/0139223 | A1 | 5/2015 | Mayenburg |
| 2015/0261269 | A1 | 9/2015 | Bruscoe |
| 2015/0293305 | A1 | 10/2015 | Nakagawa et al. |
| 2015/0341119 | A1 * | 11/2015 | Fincato .................... H05K 3/30<br>398/139 |
| 2015/0350914 | A1 | 12/2015 | Baxley et al. |
| 2016/0011390 | A1 | 1/2016 | Montalvo Urbano et al. |
| 2016/0062068 | A1 | 3/2016 | Giraud et al. |
| 2016/0073544 | A1 | 3/2016 | Heyd et al. |

(56) References Cited

U.S. PATENT DOCUMENTS

2016/0116693 A1 4/2016 Oki et al.
2016/0125706 A1 5/2016 Butterbaugh et al.
2016/0127931 A1 5/2016 Baxley et al.
2016/0156999 A1 6/2016 Liboiron-Ladouceur et al.
2016/0209610 A1 7/2016 Kurtz et al.
2016/0216445 A1 7/2016 Thacker et al.
2016/0291273 A1 10/2016 Nguyen
2016/0377821 A1 12/2016 Vallance et al.
2017/0123164 A1 5/2017 Suematsu et al.
2017/0131469 A1 5/2017 Kobrinsky et al.
2017/0139145 A1 5/2017 Heanue et al.
2017/0168253 A1 6/2017 Wilcox et al.
2017/0192184 A1 7/2017 Kelty
2017/0332519 A1 11/2017 Schmidtke
2017/0363826 A1 12/2017 Zer et al.
2017/0364295 A1 12/2017 Sardinha et al.
2017/0366272 A1* 12/2017 Shin .................... H04B 10/032
2018/0027700 A1 1/2018 Adiletta et al.
2018/0131056 A1 5/2018 Sato
2018/0159651 A1 6/2018 Li et al.
2018/0188459 A1 7/2018 Mekis et al.
2018/0196196 A1 7/2018 Byrd et al.
2018/0223582 A1 8/2018 Shin et al.
2018/0231723 A1 8/2018 Leigh et al.
2018/0231727 A1 8/2018 Kurtz et al.
2018/0278332 A1 9/2018 Leigh et al.
2018/0303004 A1 10/2018 Zhai et al.
2018/0306990 A1 10/2018 Badihi
2018/0329159 A1 11/2018 Mathai et al.
2018/0335558 A1 11/2018 Fini et al.
2018/0335595 A1 11/2018 Takeuchi et al.
2019/0027898 A1 1/2019 Bovington et al.
2019/0027899 A1 1/2019 Krishnamoorthy et al.
2019/0027901 A1 1/2019 Zheng et al.
2019/0028207 A1 1/2019 Saeedi et al.
2019/0033528 A1 1/2019 Ootorii
2019/0086618 A1 3/2019 Shastri et al.
2019/0116689 A1 4/2019 Chen et al.
2019/0207342 A1 7/2019 Aden et al.
2019/0208290 A1 7/2019 Olson
2019/0258175 A1 8/2019 Dietrich et al.
2019/0285815 A1 9/2019 Sugiyama
2019/0293971 A1 9/2019 Yu et al.
2019/0307014 A1 10/2019 Adiletta
2019/0312642 A1 10/2019 Neilson et al.
2019/0317287 A1 10/2019 Raghunathan et al.
2020/0015386 A1 1/2020 Gupta
2020/0033544 A1 1/2020 Costello
2020/0073061 A1 3/2020 Leigh et al.
2020/0077544 A1 3/2020 Leung et al.
2020/0104064 A1* 4/2020 Teh ...................... G11C 7/1057
2020/0132930 A1 4/2020 Bchir
2020/0132946 A1* 4/2020 Bchir ................. G02B 6/12004
2020/0158964 A1 5/2020 Winzer et al.
2020/0158967 A1 5/2020 Winzer et al.
2020/0161243 A1 5/2020 Lee et al.
2020/0163242 A1 5/2020 Leigh et al.
2020/0219865 A1 7/2020 Nelson et al.
2020/0284883 A1 9/2020 Ferreira et al.
2020/0292769 A1 9/2020 Zbinden
2021/0044356 A1 2/2021 Aboagye
2021/0072473 A1 3/2021 Wall, Jr.
2021/0074677 A1 3/2021 Kwon et al.
2021/0084749 A1 3/2021 Devalla et al.
2021/0142177 A1 5/2021 Mallya et al.
2021/0211785 A1 7/2021 Rose et al.
2021/0247580 A1 8/2021 Reagan
2021/0257021 A1* 8/2021 Meade ................ G11C 11/4096
2021/0263247 A1 8/2021 Bechtolsheim et al.
2021/0272944 A1* 9/2021 Bchir ................. G02B 6/12004
2021/0279841 A1 9/2021 Liu et al.
2021/0281323 A1 9/2021 Williams et al.
2021/0286140 A1* 9/2021 Winzer .................... G02B 6/34
2021/0294052 A1 9/2021 Winzer
2021/0305127 A1 9/2021 Refai-Ahmed et al.
2021/0345024 A1 11/2021 Leigh
2021/0345511 A1 11/2021 Leigh et al.
2021/0376950 A1 12/2021 Winzer
2021/0384989 A1 12/2021 Nagarajan et al.
2021/0385000 A1 12/2021 Nagarajan et al.
2021/0389536 A1 12/2021 Dietrich et al.
2022/0003946 A1 1/2022 Edwards, Jr. et al.
2022/0029379 A1 1/2022 Kovsh
2022/0029380 A1 1/2022 Kovsh
2022/0092795 A1 3/2022 Liu et al.
2022/0102583 A1 3/2022 Baumheinrich et al.
2022/0103261 A1* 3/2022 Di Mola ................ H04B 10/40
2022/0109501 A1 4/2022 Latchman
2022/0141949 A1 5/2022 Devalla et al.
2022/0141990 A1 5/2022 Gupta
2022/0158752 A1* 5/2022 Duthel .................... G02F 1/212
2022/0159860 A1 5/2022 Winzer
2022/0159878 A1 5/2022 Dillman et al.
2022/0187559 A1 6/2022 Lin et al.
2022/0244465 A1 8/2022 Winzer
2022/0263586 A1 8/2022 Winzer
2022/0264759 A1* 8/2022 Sawyer ................ G02B 6/4278
2022/0279256 A1 9/2022 Chaouch et al.
2022/0291461 A1* 9/2022 Elsinger ............. G02B 6/12004
2022/0292035 A1* 9/2022 Li ......................... G06F 13/362
2022/0329020 A1 10/2022 Narayanan et al.
2022/0404544 A1* 12/2022 Winterbottom .... G02B 6/12004
2022/0405566 A1* 12/2022 Winterbottom .... G02B 6/12004
2023/0003958 A1 1/2023 Shimazu et al.
2023/0018654 A1 1/2023 Winzer
2023/0043794 A1 2/2023 Winzer
2023/0064740 A1 3/2023 Rathinasamy
2023/0077979 A1 3/2023 Winzer
2023/0161109 A1 5/2023 Pupalaikis et al.
2023/0176304 A1 6/2023 Winzer
2023/0209761 A1 6/2023 Winzer
2023/0258873 A1 8/2023 Pupalaikis et al.
2023/0305247 A1 9/2023 Hemp et al.
2023/0305249 A1 9/2023 Hemp et al.
2023/0354541 A1 11/2023 Cole et al.
2023/0380095 A1 11/2023 Winzer et al.
2024/0036254 A1* 2/2024 Winzer ............. G02B 6/12014
2024/0064922 A1 2/2024 Winzer
2024/0097796 A1* 3/2024 Winzer ................ H04B 10/503
2024/0142731 A1 5/2024 Hemp et al.

FOREIGN PATENT DOCUMENTS

| | | | | | |
|---|---|---|---|---|---|
| CN | 106054328 | A | | 10/2016 | |
| CN | 109856738 | A | | 6/2019 | |
| EP | 3543754 | A1 | * | 9/2019 | ............. H04B 10/27 |
| EP | 3588321 | A1 | * | 1/2020 | ........... G06F 15/781 |
| JP | 2010176010 | | | 8/2010 | |
| JP | 2013-051448 | | | 3/2013 | |
| JP | 2023551401 | A | * | 12/2023 | ........... H04L 49/351 |
| TW | M494947 | U | | 2/2015 | |
| TW | 201827874 | A | | 8/2018 | |
| TW | 201937335 | A | | 9/2019 | |
| WO | WO-03009497 | A1 | * | 1/2003 | ............. H04B 10/25 |
| WO | WO 2006/113094 | | | 10/2006 | |
| WO | WO 2009/107671 | | | 9/2009 | |
| WO | WO 2020/083845 | | | 4/2020 | |
| WO | WO 2021/183792 | | | 9/2021 | |
| WO | WO 2021/188648 | | | 9/2021 | |
| WO | WO 2021/211725 | | | 10/2021 | |
| WO | WO 2021/247521 | | | 12/2021 | |
| WO | WO 2022/061160 | | | 3/2022 | |
| WO | WO 2022/076539 | | | 4/2022 | |
| WO | WO 2022/109349 | | | 5/2022 | |

OTHER PUBLICATIONS

[No Author Listed], "2020 Optical Fiber Communication Conference and Exhibition: Conference Schedule," OFC 2020 tutorial M1H.4, Mar. 8-12, 2020, 152 pages.
[No Author Listed], "Hands-on with Intel Co-Packaged Optics and Silicon Photonics Switch," Serve the Home, Mar. 18, 2020, retrieved

(56) References Cited

OTHER PUBLICATIONS on Feb. 15, 2022, <https://www.youtube.com/watch?v=Esgyj26vdxs>, 31 pages.
[No Author Listed], "IEEE P802.3 Electrical I/O Specifications," LAN/MAN Standards Committee of the IEEE Computer Society, May 13, 2022, 235 pages.
[No Author Listed], "Implementation Agreement for a 3.2Tb/s Co-Packaged (CPO) Module," OIF-Co-Packaging-3.2T-Module-01.0, Mar. 29, 2023, 38 pages.
[No Author Listed], "MTP/MPO Breakout Cable Datasheet," FS Technical Documents, Apr. 26, 2020, 9 pages.
[No Author Listed], "MTP/MPO Fiber Cables, Quick Start Guide V1.0," FS Technical Documents, Mar. 24, 2020, 5 pages.
[No Author Listed], "Paradigm Change: Reinventing HPC Architectures with In- Package Optical I/O," Ayar Labs, Solution Brief, Jul. 2, 2020, 9 pages.
[No Author Listed], "QSFP-DD MSA QSFP-DD/QSFP-DD800/QSFP112 Hardware Specification for QSFP Double Density 8X and QSFP 4X Pluggable Transceivers," Revision 6.2, Mar. 11, 2022, 169 pages.
[No Author Listed], "Rockley Photonics Silicon Photonics Platform for Next Generation Transceivers," Rockley Photonics, Mar. 2020, 1 page.
[No Author Listed], "Support Tomorrow's Speeds Inside Today's Footprint; Molex Solutions for 112 Gbps Architecture," Molex, 2019, 7 pages.
[No Author Listed], "Technical Brief: Optical I/O Chiplets Eliminate Bottlenecks to Unleash Innovation," Ayar Labs, Technical Brief, Dec. 6, 2021, 9 pages.
[No Author Listed], [online], "Intel's Plan to 1000x Performance with Raja Koduri," Nov. 2021, retrieved on Sep. 22, 2022, URL<https://www.youtube.com/watch?v=7CpDQ5WZiSU&t=7s>, 18 pages [Video Submission].
[No Author Listed], "QSFP-DD MSA QSFP-DD/QSFP-DD800/QSFP112 Hardware Specification for QSFP Double Density 8X and QSFP 4X Pluggable Transceivers," QSFP-DD, Revision 6.01, May 28, 2021, 167 pages.
[No Author Listed], "Specification for OSFP Octal Small Form Factor Pluggable Module," OSFP MSA, Rev 4.0, May 28, 2021, 109 pages.
Akhter et al., "WaveLight: A Monolithic Low Latency Silicon-Photonics Communication Platform for the Next-Generation Disaggregated Cloud Data Centers," 2017 IEEE 25th Annual Symposium on High-Performance Interconnects, Aug. 28-30, 2017, pp. 25-28.
Alexoudi et al., "Optics in Computing: From Photonic Network-on-Chip to Chip-to-Chip Interconnects and Disintegrated Architectures," Journal of Lightwave Technology, Jan. 15, 2019, 37(2):363-379.
Allaboutcircuits.com [online], "Innovative Interconnects: The Future of Chiplet-based Processors?," Apr. 18, 2022, retrieved on Oct. 26, 2023, retrieved from URL<https://www.allaboutcircuits.com/news/innovative-interconnects-the-future-of-chiplet-based-processors/>, 6 pages.
Amazon.com [online], "IBM Midplane Board-8852Refurbished, 25R5780Refurbished)," Jun. 30, 2014, retrieved on Nov. 22, 2022, retrieved from URL< https://www.amazon.com/IBM-MIDPLANE-BOARD-8852-Refurbished-25R5780/dp/B00LEQ2URK>, 4 pages.
Analui et al., "A Fully Integrated 20-GB/s Optoelectronic Transceiver Implemented in a Standard 0.13-um CMOS SOI Technology," IEEE Journal of Solid-State Circuits, Dec. 2006, 41(12):2945-2955.
Ase.aseglobal.com [online], "Fan-Out Packaging, "2022, retrieved on Jul. 8, 2022, retrieved from URL<https://ase.aseglobal.com/en/technology/fan_out>, 8 pages.
Awavesemi [online], "1G to 224G SerDes," Jan. 28, 2023, retrieved on Oct. 24, 2023, retrieved from URL<http://web.archive.org/web/20230701000000*/https://awavesemi.com/silicon-ip/phy-ip/1g-224g-serdes/>, 4 pages.
Blum, "Integrated silicon photonics for high vol. data center applications," Proc. SPIE 11286, Optical Interconnects, Feb. 28, 2020, 10 pages.
Bower et al., "Heterogeneous Integration of Microscale Semiconductor Devices By Micro-Transfer-Printing," Electronic Components & Technology Conference, 2015, 963-967.
Bower et al., "Heterogeneous Integration of Microscale Semiconductor Devices By Micro-Transfer-Printing," IEEE 65th ECTC, San Diego, CA, USA, May 26-29, 2015, 30 pages.
Broadcom.com [online], "Broadcom's persistent cadence of co-packaged optics innovation," Mar. 1, 2023, retrieved on Oct. 24, 2023, retrieved from URL<https://www.broadcom.com/blog/broadcoms-persistent-cadence-copackaged-optics-innovation>, 5 pages.
Cadence.com [online], "112Gbps XSR SerDes IP for TSMC 7nm FinFET," 2022, retrieved on Oct. 24, 2023, retrieved from URL<https://www.cadence.com/content/dam/cadence-www/global/en_US/documents/tools/ip/design-ip/112g-xsr-pamp4-ip-br.pdf>, 2 pages.
Chen et al., "A 25Gb/s Hybrid Integrated Silicon Photonic Transceiver in 28nm CMOS and SOI," ISSSCC 2015, Session 22, High-Speed Optical Links, 22.2, 2:00PM, Feb. 25, 2015, 402-404.
Chopra, "Looking Beyond 400G: A System Vendor Perspective, Beyond 400 GB/s Ethernet Study Group," Cisco Fellow, Feb. 8, 2020, 23 pages.
Chuang et al., "Theoretical and empirical qualification of a mechanical-optical interface for parallel optics links," Optical Interconnects XV, Apr. 2015, 9368:11 pages.
CoPackagedOptics.com [online], "3.2 Tb/s Copackaged Optics Optical Module Product Requirements Document," Feb. 2021, retrieved in Jan. 2022, retrieved from <http://www.copackagedoptics.com/wp-content/uploads/2021/02/JDF-3.2-Tb_s-Copackaged-Optics-Module-PRD-1.0.pdf>, 28 pages.
CoPackagedOptics.com [online], "Co-Packaged Optic Assembly Guidance Document," upon information and belief, available no later than Sep. 18, 2020, retrieved on Jan. 26, 2021, retrieved from URL <http://www.copackagedoptics.com/wp-content/uploads/2020/05/CPO-Assembly-Guidance-Doc-V1.0-FINAL.pdf>, 22 pages.
CoPackagedOptics.com [online], "Co-Packaged Optical Module Discussion Document," upon information and belief, available no later than Sep. 18, 2020, retrieved on Jan. 26, 2021, retrieved from URL <http://www.copackagedoptics.com/wp-content/uploads/2019/11/CPO-Module-Discussion-Doc-V1.0Final.pdf>, 18 pages.
CoPackagedOptics.com [online], "Co-Packaged Optics Collaboration FAQ," upon information and belief, available no later than Sep. 18, 2020, retrieved on Jan. 26, 2021, retrieved from URL <http://www.copackagedoptics.com/wpcontent/uploads/2019/11/CoPackagedOpticsCollaboration-FAQ-Final-051319.pdf>, 3 pages.
CoPackagedOptics.com [online], "Co-packaged Optics External Laser Source Guidance Document," upon information and belief, available no later than Sep. 18, 2020, retrieved on Jan. 26, 2021, retrieved from URL <http://www.copackagedoptics.com/wp-content/uploads/2020/01/ELS-Guidance-Doc-v1.0-FINAL.pdf>, 23 pages.
De Heyn et al., "Ultra-Dense 16x56Gb/s NRZ GeSi EAM-PD Arrays Coupled to Multicore Fiber for Short-Reach 896Gb/s Optical Links," In Optical Fiber Communication Conference, Mar. 2017, 3 pages.
Doany et al., "Multichannel High-Bandwidth Coupling of Ultradense Silicon Photonic Waveguide Array to Standard-Pitch Fiber Array," Journal of Lightwave Technology, Feb. 15, 2021, 29: 475-482.
Doany et al., Terabit/Sec VCSEL-Based 48-Channel Optical Module Based on Holey CMOS Transceiver IC, Journal of Lightwave Technology, Feb. 15, 2013, 31:672-680.
Dobbelaere, "Advanced Silicon Photonics Technology Platform Leveraging a Semiconductor Supply Chain," 2017 IEEE International Electron Devices Meeting, Dec. 2-6, 2017, 4 pages.
Dobbelaere, "Silicon Photonics Technology Platform for Integration of Optical IOs with ASICs," 2013 IEEE Hot Chips 25 Symposium (HCS)—Silicon Photonics Technology Platform for integration of optical IOS with ASICs, Aug. 25-Aug. 27, 2013, 18 pages.
Dogruoz et al., "Optimizing QSFP-DD Systems to Achieve at Least 25 Watt Thermal Port Performance," QSFP-DD, Jan. 2021, 30 pages.

(56) References Cited

OTHER PUBLICATIONS

Ethernetalliance.org [online], "CEI-28G: Paving the Way for 100 Gigabit," Jun. 2010, retrieved on Sep. 26, 2023, retrieved from URL<https://www.ethernetalliance.org/wp-content/uploads/2011/10/document_files_CEI-28G_rev8.pdf>, 10 pages.

Extended European Search Report in European Appln. No. 22195981, dated Feb. 14, 2023, 9 pages.

Fathololoumi et al., "1.6Tbps Silicon Photonics Integrated Circuit and 800 Gbps Photonic Engine for Switch Co-Packaging Demonstration," Journal of Lightwave Technology, Feb. 15, 2021, 39:1155-1161.

Fathololoumi et al., "1.6Tbps Silicon Photonics Integrated Circuit for Co-Packaged Optical-IO Switch Applications," 2020 Optical Fiber Communications Conference and Exhibition (OFC), Mar. 8-12, 2020, 3 pages.

Fuse.wikichip.org [online], "Ayar Labs Realizes Co-Packaged Silicon Photonics," Jan. 19, 2020, retrieved on Feb. 15, 2022, retrieved from URL <https://fuse.wikichip.org/news/3233/ayar-labs-realizes-co-packaged-silicon-photonics/2/, 7 pages.

Fuse.wikichip.org [online], "Ayar Labs Realizes Co-Packaged Silicon Photonics," Jan. 19, 2020, retrieved on Mar. 23, 2022, retrieved from URL <https://fuse.wikichip.org/news/3233/ayar-labs-realizes-co-packaged-silicon-photonics/>, 6 pages.

Fuse.wikichip.org [online], "Ranovus Odin: Co-Packaging Next-Gen DC Switches and Accelerators With Silicon Photonics," Apr. 11, 2020, retrieved on or before Mar. 23, 2022, retrieved from URL <https://fuse.wikichip.org/news/3420/ranovus-odin-co-packaging-next-gen-dc-switches-and-accelerators-with-silicon-photonics/>, 8 pages.

Gazettabyte.com [online], "Ayar Labs prepares for the era of co-packaged optics," Feb. 21, 2019, retrieved on or before Mar. 23, 2022, retrieved from URL<http://www.gazettabyte.com/home/2019/2/21/ayar-labs-prepares-for-the-era-of-co-packaged-optics.html>, 7 pages.

Gazettabyte.com [online], "Inphi unveils first 800-gigabit PAM-4 signal processing chip," Apr. 8, 2020, retrieved on Feb. 15, 2022, retrieved from URL <http://www.gazettabyte.com/home/2020/4/8/inphi-unveils-first-800-gigabit-pam-4-signal-processing-chip.html>, 5 pages.

Gazettabyte.com [online], "Intel combines optics to its Tofino 2 switch chip," Mar. 19, 2020, retrieved on Jan. 26, 2022, retrieved from URL <http://www.gazettabyte.com/home/2020/3/19/intel-combines-optics-to-its-tofino-2-switch-chip.html>, 10 pages.

Gazettabyte.com [online], "Ranovus outlines its co-packaged optics plans," Apr. 20, 2020, retrieved on Feb. 15, 2022, retrieved from URL <http://www.gazettabyte.com/home/2020/4/30/ranovus-outlines-its-co-packaged-optics-plans.html>, 10 pages.

Gunn, "CMOS Photonics for High-Speed Interconnects," IEEE Micro, Mar.-Apr. 2006, 26:58-66.

Harrisburg.psu.edu [online], "112 Gbps Electrical Interfaces: Does rate drive architecture or does architecture enable rate?," Apr. 12, 2019, retrieved on Sep. 26, 2023, retrieved from URL<https://harrisburg.psu.edu/files/pdf/16546/2019/04/24/te_connectivity_at_psu_hburg_si_symposium.pdf>, 34 pages.

Hayashi et al., "End-to-End Multi-Core Fiber Transmission Link Enabled by Silicon Photonics Transceiver with Grating Coupler Array," 2017 European Conference on Optical Communication (ECOC), Sep. 17-21, 2017, 3 pages.

Hosseini et al., "8 Tbps Co-Packaged FPGA and Silicon Photonics Optical IO," 2021 Optical Fiber Communications Conference and Exhibition (OFC), Jun. 1, 2021, 3 pages.

Hughes et al., "A Single-Mode Expanded Beam Separable Fiber Optic Interconnect for Silicon Photonics," Optical Fiber Communications Conference and Exhibition, Mar. 2019, 3 pages.

I3electronics.com [online], "Advanced Semiconductor Packaging," 2022, retrieved on Jul. 8, 2022, retrieved from URL<https://i3electronics.com/micro_semiconductor/>, 8 pages.

IBM, "Silicon Photonics Co-Packaging Webcast," COBO, Sep. 16, 2020, 31 pages.

Ieee802.org [online], "Broadened Consensus for a 200GEL Copper Cable Objective," Aug. 26, 2021, retrieved Oct. 17, 2022, retrieved from URL<https://www.ieee802.org/3/B400G/public/21_08/kocsis_b400g_01a_210826.pdf>, 17 pages.

Ieeee802.org [online], "Multi-200Gbps/lane Package Model Considerations," Jul. 12, 2022, retrieved Oct. 17, 2022, retrieved from URL<https://www.ieee802.org/3/df/public/22_07/benartsi_3df_01a_2207.pdf>, 13 pages.

Imec-int.com [online], "A new approach to fan-out wafer-level packaging," Jun. 6, 2019, retrieved on Jul. 8, 2022, retrieved from URL<https://www.imec-int.com/en/imec-magazine/imec-magazine-june-2019/a-new-approach-to-fan-out-wafer-level-packaging>, 30 pages.

Intel.com [online], "Accelerating Innovation Through A Standard Chiplet Interface: The Advanced Interface Bus (AIB)," Sep. 19, 2020, retrieved on Sep. 26, 2023, retrieved from URL<https://www.intel.com/content/dam/www/public/US/en/documents/white-papers/accelerating-innovation-through-aib-whitepaper.pdf>, 9 pages.

Intel.com [online], "CEI 28 Very Short Reach (VSR) Specifications for CFP2/CFP4/QSFP+/QSFP28/zQSFP/SMA 2.4 mm," available on or before Dec. 9, 2022, retrieved on Oct. 24, 2023, retrieved from URL<https://www.intel.com/content/www/us/en/docs/programmable/683132/current/cei-28-very-short-reach-vsr-specifications.html>, 7 pages.

International Preliminary Report on Patentability Chapter II in International Appln. No. PCT/US2021/053745, mailed Jun. 14, 2023, 14 pages.

International Preliminary Report on Patentability in International Appln. No. PCT/US2021/050945, mailed Mar. 30, 2023, 12 pages.

International Preliminary Report on Patentability in International Appln. No. PCT/US2021/060215, mailed Jun. 1, 2023, 41 pages.

International Preliminary Report on Patentability in International Appln. No. PCT/US2022/071857, mailed on Nov. 2, 2023, 23 pages.

International Search Report and Written Opinion in International Appln. No. PCT/US2021/050945, dated Dec. 27, 2021, 15 pages.

International Search Report and Written Opinion in International Appln. No. PCT/US2021/053745, dated Feb. 3, 2022, 15 pages.

International Search Report and Written Opinion in International Appln. No. PCT/US2021/060215, dated Mar. 22, 2022, 46 pages.

International Search Report and Written Opinion in International Appln. No. PCT/US2022/033870, mailed Sep. 28, 2022, 15 pages.

International Search Report and Written Opinion in International Appln. No. PCT/US2022/071857, mailed Jun. 29, 2022, 25 pages.

International Search Report and Written Opinion in International Appln. No. PCT/US2023/020730, mailed Jul. 31, 2023, 10 pages.

International Search Report and Written Opinion in International Appln. No. PCT/US2023/16573, mailed Aug. 11, 2023, 18 pages.

Invitation to Pay Additional Fees in International Appln. No. PCT/US2021/060215, dated Jan. 26, 2022, 3 pages.

Invitation to Pay Additional Fees in International Appln. No. PCT/US2021/53745, dated Dec. 8, 2021, 2 pages.

Invitation to Pay Additional Fees in International Appln. No. PCT/US2023/16573, mailed Jun. 6, 2023, 2 pages.

Itpeernetwork.com [online], "Industry-First Co-Packaged Optics Ethernet Switch Solution with Intel Silicon Photonics," Hou, IT Peer Network, Mar. 9, 2020, retrieved on or before Mar. 23, 2022, retrieved from URL <https://itpeernetwork.intel.com/optics-ethernet-solution/]>, 5 pages.

Janta-Polczynski et al., "Towards co-packaging of photonics and microelectronics in existing manufacturing facilities," Proc. SPIE 10538, Optical Interconnects XVIII, 105380B, Feb. 22, 2018, 11 pages.

Keeler et al., "Heterogeneous Integration of III-V Photonics and Silicon Electronics for Advanced Optical Microsystems," Sandia National Laboratories, Mar. 1, 2016, 23 pages.

Kehlet, "Chiplets On the Rise," 2020 Heterogeneous Integration Roadmap Symposium, Feb. 21, 2020, 27 pages.

Kocsis et al., "OSFP MDI Proposal," Amphenol, High Speed Interconnects, Mar. 6, 2016, 13 pages.

Kuchta "Co-Packaging on Organic Laminates: Motion Phase 2 Arpa-E Enlitened Kickoff Meeting," IBM Research, Jan. 13, 2021, 16 pages.

Kuchta et al., "Multi-wavelength Optical Transceivers Integrated On Node (Motion)," ARPA, IBM, Apr. 22, 2019, 28 pages.

(56) References Cited

OTHER PUBLICATIONS

Kuchta et al., "Multi-wavelength Optical Transceivers Integrated On Node (Motion)," ARPA, IBM, Apr. 22, 2019, 40 pages.
LaserFocusWorld.com [online], "Integrated optics permeate datacenter networks," Laser Focus World Online Magazine, Oct. 1, 2018, retrieved on or before Mar. 23, 2022, retrieved from www.laserfocusworld.com, 4 pages.
LaserFocusWorld.com [online], "Photonics for Datacenters: Integrated optics permeate datacenter networks," Oct. 2018, retrieved on Jan. 26, 2022, retrieved from URL <https://www.laserfocusworld.com/optics/article/16555340/photonics-for-datacenters-integrated-optics-permeate-datacenter-networks>, 16 pages.
Lau et al., "Fan-Out Wafer-Level Packaging for Heterogeneous Integration," Electronic Components and Technology Conference, May 1, 2018, 4 pages (abstract only).
Lau et al., "Redistribution-Layers for Fan-Out Wafer-Level Packaging and Heterogeneous Integrations," China Semiconductor Technology International Conference, Mar. 1, 2019, 3 pages (abstract only).
Lee et al., "End-to-End Multicore Multimode Fiber Optic Link Operating up to 120 GB/s," Journal of Lightwave Technology, Mar. 15, 2012, 30:886-892.
Lee et al., "OnRamps: Optical Networks Using Rapid Amplified Multi-wavelength Photonic Switches," PowerPoint, ARPA, IBM Research, Apr. 22, 2019, 27 pages.
Lee, "OnRamps: Optical Networks Using Rapid Amplified Multi-wavelength Photonic Switches," PowerPoint, ARPA, IBM Research, Apr. 22, 2019, 17 pages.
Li et al., "A 112 GB/s PAM4 Linear TIA with 0.96 pJ/bit Energy Efficiency in 28 nm CMOS," ESSCIRC 2018—IEEE 44th European Solid State Circuits Conference (ESSCIRC), Sep. 2-6, 2018, pp. 238-241.
Liang et al., "Fully-Integrated Heterogeneous DML Transmitters for High-Performance Computing," Journal of Lightwave Technology, Jul. 1, 2020, 38:3322-3337.
Liang et al., "Integrated energy efficient WDM photonic solution for Data Centers and Supercomputers," ARPA-E Enlightened Review Meeting, Seattle, WA, Oct. 23-24, 2018, 24 pages.
Liang, "Integrated DWDM Photonics 2.0 for Green Exascale Supercomputing in HPE," ARPA-Enlightened Annual Review Meeting, Coronado, CA, USA, Oct. 30-Nov. 1, 2019, 19 pages.
Lightcounting.com [online], "High Speed Cables, Embedded and Co-Packaged Optics," Dec. 2022, retrieved on Jun. 8, 2023, retrieved from URL<www.lightcounting.com>, 100 pages.
Lightwaveonline.com [online], "OIF launches CEI-112G-Extra Short Reach (XSR)+ project," Sep. 2, 2021, retrieved on Oct. 24, 2023, retrieved from URL<https://www.lightwaveonline.com/optical-tech/electronics/article/14209722/oif-launches-cei112gextra-short-reach-xsr-project>, 3 pages.
Lin et al., "Organic Interposer CoWoS-R+ (plus) Technology," 2022 IEEE 72nd Electronic Components and Technology Conference (ECTC), Jul. 12, 2022, 6 pages.
Logan et al., "800Gb/s Silicon Photonic Transmitter for Co-Packaged Optics," 2020 IEEE Photonics Conference (IPC), Sep. 28-Oct. 2020, 2 pages.
Lusted et al. "Motions and Straw Polls," IEEE P802.3df Task Force, Intel, Sep. 2022, 6 pages.
Mahajan et al., "Co-Packaged Photonics for High Performance Computing: Status, Challenges and Opportunities," Journal of Lightwave Technology, Jan. 15, 2022, 40:379-398.
Mahajan et al., "Embedded Multi-Die Interconnect Bridge (EMIB)—A High Density, High Bandwidth Packaging Interconnect," 2016 IEEE 66th Electronic Components and Technology Conference, May 31, 2016-Jun. 3, 2016, 557-565.
Mangal et al., "Through-substrate coupling elements for silicon-photonics based short-reach optical interconnects," Proceedings of the SPIE, Optical Interconnects XIX, Mar. 2019, 10924: 14 pages.
Marchetti et al., "Coupling strategies for silicon photonics integrated chips," Photonics Research, Feb. 2019, 7(2):201-239.
Marvell Technology, [online], "Post Moore Data Center Networks for 800GbE/1.6TbE with Radha Nagarajan | Marvell Technology," https://www.marvell.com, Sep. 14, 2021, retrieved on Nov. 30, 2021, <https://www.youtube.com/watch?v=ruo_WNqEBP8>, 13 pages [Video Submission].
Meade et al., "TeraPHY: A High-density Electronic-Photonic Chiplet for Optical I/O from a Multi-Chip Module," 2019 Optical Fiber Communications Conference and Exhibition (OFC), Mar. 3-7, 2019, 3 pages.
Michelogiannakis et al., "Efficient Intra-Rack Resource Disaggregation for HPC Using Co-Packaged DWDM Photonics," CoRR, submitted Jul. 17, 2023, arXiv:2301.03592v3, 15 pages.
Minkenberg et al., "Reimagining Datacenter Topologies With Integrated Silicon Photonics," Journal of Optical Communications and Networking, Jul. 2018, 10(7):B126-B139.
Missinne et al., "Alignment-tolerant interfacing of a photonic integrated circuit using back side etched silicon microlenses," Proceedings of the SPIE, Oct. 2019, 10923: 8 pages.
Moazeni et al., "A 40-Gb/s PAM-4 Transmitter Based on a Ring-Resonator Optical DAC in 45-nm SOI CMOS," IEEE Journal of Solid-State Circuits, Dec. 2017, 52:3503-3516.
Nagarajan, "2.5D Heterogeneous Silicon Photonics Light Engine with Integrated DFB Lasers and Electronics," Poster, Presented at OCP Future Technologies Symposium, Inphi Corp, 2020 OCP Global Summit, Mar. 4-5, 2020, 1 page.
Nagarajan, "2.5D Heterogeneous Silicon Photonics Light Engine with Integrated DFB Lasers and Electronics," Presentation, Presented at OCP Future Technologies Symposium, Inphi Corp, 2020 OCP Global Summit, Mar. 4-5, 2020, 13 pages.
Nambiar et al., "Grating-Assisted Fiber to Chip Coupling for SOI Photonic Circuits," Applied Sciences. Jul. 2018, 8(7): 22 pages.
Nextplatform.com [online], "Nvidia Shows What Optically Linked GPU Systems Might Look Like," Aug. 17, 2022, retrieved on Oct. 24, 2023, retrieved from URL<https://www.nextplatform.com/2022/08/17/nvidia-shows-what-optically-linked-gpu-systems-might-look-like/?utm_content=218412429&utm_medium=social&utm_source=linkedin&hss_channel=lcp-6627049>, 8 pages.
Notaros et al., "Ultra-Efficient CMOS Fiber-to-Chip Grating Couplers," Optical Fiber Communication Conference, Mar. 20-22, 2016, 3 pages.
Nowell et al., "Progress in 100G Lambda MSA Based on 100G PAM4 Technology," 2020 Optical Fiber Communications Conference and Exhibition (OFC), Mar. 8-12, 2020, 3 pages.
Oiforum.com [online], "Alphawave IP, ZeusCORE™ MSS IP," ECOC 2022, retrieved on Oct. 24, 2023, retrieved from URL<https://www.oiforum.com/wp-content/uploads/OIF_PLL_Demo_Alphawave_ECOC22.pdf> 2 pages.
Oiforum.com [online], "Common Electrical I/O (CEI)-112G," Dec. 10, 2019, retrieved on Oct. 24, 2023, retrieved from URL<http://web.archive.org/web/20191201000000*/https://www.oiforum.com/technical-work/hot-topics/common-electrical-interface-cei-112g-2/>, 8 pages.
Oiforum.com [online], "IA Title: Common Electrical I/O (CEI)—Electrical and Jitter Interoperability agreements for 6G+ bps, 11G+ bps, 5G+ bps I/O and 56G+ bps," Dec. 29, 2017, retrieved on Oct. 24, 2023, retrieved from URL<https://www.oiforum.com/wp-content/uploads/2019/01/OIF-CEI-04.0.pdf>, 464 pages.
Oiforum.com [online], "OIF's CEI 56G Interfaces—Key Building Blocks for Optics in the 400G Data Center," Sep. 28, 2015, retrieved on Sep. 26, 2023, retrieved from URL<https://www.oiforum.com/wp- content/uploads/2019/01/150928_Mkt-Focus-ECOC-Panel-OIF.pdf>, 23 pages.
Opencompute.org [online], "Bunch of Wires (BoW) PHY Specification, The Open Domain-Specific Architecture BoW Workstream, DRAFT Version 2.0," Mar. 1, 2023, retrieved on Sep. 26, 2023, retrieved from URL<https://www.opencompute.org/documents/bow-specification-v2-0d-1-pdf>, 51 pages.
Overclock3d.net [online], "Intel discusses EMIB technology—Multi-die CPUs incoming?," Aug. 28, 2017, retrieved on Oct. 26, 2023, retrieved from URL<https://overclock3d.net/news/gpu-displays/intel-discusses-emib-technology-multi-die-cpus-incoming/>, 10 pages.
Patterson et al., "The future of packaging with silicon photonics," Chip Scale Review, Jan. & Feb. 2017, 10 pages.

(56) References Cited

OTHER PUBLICATIONS

Pcmag.com [online], "To 'Meteor Lake' and Beyond: How Intel Plans a New Era of 'Chiplet'-Based CPUs," Aug. 24, 2022, retrieved on Oct. 26, 2023, retrieved from URL<https://www.pcmag.com/news/to-meteor-lake-and-beyond-how-intel-plans-a-new-era-of-chiplet-based-cpus>, 13 pages.

Raj et al., "50Gb/s Hybrid Integrated Si-Photonic Optical Link in 16nm FinFET," 2020 European Conference on Optical Communications (ECOC), Dec. 6-10, 2020, 4 pages.

Raj et al., "Design of a 50-GB/s Hybrid Integrated Si-Photonic Optical Link in 16-nm FinFET," IEEE Journal of Solid-State Circuits, Apr. 2020, 55: 1086-1095.

Rakowski, "Silicon photonics platform for 50G optical interconnects," Cadence Photonics Summit and Workshop, San Jose, CA, Sep. 6-7, 2017, 45 pages.

Roberts et al., "High Speed Optics—The road to 44G and Beyond," CiscoLive!, Jan. 28-Feb. 1, 2019, 102 pages.

Rockleyphotonics.com [online], "25.6T Switch Co-Packages with LightDriver and Copper Cable Attached 400G Modules," Rockley Photonics, 2020, retrieved on Mar. 24, 2022, retrieved from <https://rockleyphotonics.com/?s=25.6+T+switch+co-package>, 1 page.

Rockleyphotonics.com [online], "Rockley Photonics collaborates with Accton, TE and Molex to demonstrate a 25.6Tbps OptoASIC Switch system," Rockley Photonics, Mar. 10, 2020, retrieved on or before Mar. 23, 2022, retrieved from <https://rockleyphotonics.com/rockley-photonics-collaborates-with-accton-te-and-molex-to-demonstrate-a-25-6tbps-optoasic-switch-system/>, 6 pages.

Rockleyphotonics.com [online], "Sailing Through the Data Deluge with Pervasive Optical Connectivity," Rockley Photonics, Feb. 2019, retrieved on or before Mar. 23, 2022, retrieved from <https://rockleyphotonics.com/wp-content/uploads/2019/02/Rockley-Photonics-Sailing-through-the-Data-Deluge.pdf>, 9 pages.

Romagnoli et al., "High Bandwidth density optically interconnected Terabit/s Boards," SPIE OPTO, Jan. 30, 2018, 15 pages.

Saeedi et al., "A 25 Gb/s 3D-Integrated CMOS/Silicon-Photonic Receiver for Low-Power High-Sensitivity Optical Communication," Journal of Lightwave Technology, Jun. 15, 2016, 34(12):2924-2933.

Sakib et al., "A high-speed micro-ring modulator for next generation energy-efficient optical networks beyond 100 Gbaud," CLEO: Science and Innovations 2021, San Jose, California United States, May 9-14, 2021, 3 pages.

Samtec.com [online], "Flyover® QSFP Cable Systems, Cages, and Heat Sinks," 2022, retrieved on Dec. 22, 2022, retrieved from URL<https://www.samtec.com/cables/high-speed/assemblies/qsfp-flyover>, 12 pages.

Samtec.com [online], "Novaray® I/O 112 Gbps PAM4 Panel Mount Cable System," May 18, 2022, retrieved on Mar. 29, 2023, retrieved from URL<https://www.samtec.com/cables/high-speed/io-assemblies/novaray-io>, 12 pages.

Scarcella et al., "Pluggable Single-Mode Fiber-Array-to-PIC Coupling Using Micro-Lenses," IEEE Photonics Technology Letters, Oct. 2017, 29(22):1943-1946.

Schaevitz et al., "Solving the Escape Density Problem: Making connections count with SCIP," Optica Publishing Group, Mar. 2023, 3 pages.

Semi.org [online], "As Chiplets Go Mainstream, Chip Industry Players Collaborate to Overcome New Development Challenges," Feb. 14, 2023, retrieved on Oct. 26, 2023, retrieved from URL<https://www.semi.org/en/blogs/technology-and-trends/as-chiplets-go-mainstream-chip-industry-players-collaborate-to-overcome-new-development-challenges>, 9 pages.

Semianalysis.com [online], "Intel's Trojan Horse into the Foundry Business | Co-packaged Silicon Photonics is Intel's Path Forward for IDM 2.0," Jun. 11, 2021, retrieved on Aug. 15, 2022, retrieved from URL<https://semianalysis.com/intels-trojan-horse-into-the-foundry-business-co-packaged-silicon-photonics-is-intels-path-forward-for-idm-2-0/>, 22 pages.

Semiengineering.com [online], "Improving Redistribution Layers For Fan-Out Packages And SiPs," Sep. 15, 2022, retrieved on Oct. 24, 2023, retrieved from URL<https://semiengineering.com/improving-redistribution-layers-for-fan-out-packages-and-sips/>, 11 pages.

Servethehome.com [online], "Hands-on with the Intel Co-Packaged Optics and Silicon Photonics Switch," Mar. 18, 2020, retrieved on Mar. 24, 2022, retrieved from <https://www.servethehome.com/hands-on-with-the-intel-co-packaged-optics-and-silicon-photonics-switch/>, 25 pages.

Servethehome.com [online], "Important Silicon Photonics Future at Intel Vision 2022," May 16, 2022, retrieved on Aug. 15, 2022, retrieved from URL<https://www.servethehome.com/important-silicon-photonics-future-at-intel-vision-2022-lightbender-light-bender/>, 6 pages.

Shang et al., "High-temperature reliable quantum-dot lasers on Si with misfit and threading dislocation filters," Optics, May 2021, 8:749-754.

Sharma, "Universal Chiplet Interconnect Express (UCIe)®: An open standard for developing a successful chiplet ecosystem," IEEE Electronics Packaging Society, Mar. 2, 2022, 3 pages.

Shen et al., "Silicon photonic integrated circuits and its application in data center," Proc. SPIE 11763, Seventh Symposium on Novel Photoelectronic Detection Technology and Applications, Mar. 12, 2021, 15 pages.

Shen et al., "Silicon Photonics for Extreme Scale Systems," Journal of Lightwave Technology, Jan. 15, 2019, vol. 37:245-258.

Stojanovic et al., "Monolithic silicon-photonic platforms in state-of-the-art CMOS SOI processes [Invited]," Optics Express, May 7, 2018, 26: 1-16.

Sun et al., "A 45 nm CMOS-SOI Monolithic Photonics Platform With Bit-Statistics-Based Resonant Microring Thermal Tuning," IEEE Journal of Solid-State Circuits, Apr. 2016, 51:893-907.

Sun et al., "A Monolithically-Integrated Chip-to-Chip Optical Link in Bulk CMOS," 2014 Symposium on VLSI Circuits Digest of Technical Papers, Apr. 2015, 2 pages.

Sun et al., "Single-chip microprocessor that communicates directly using light," Nature, Dec. 2015, 528; 534-544.

Sun et al., "TeraPHY: An O-band WDM Electro-optic Platform for Low Power, Terabit/s Optical I/O," 2020 IEEE Symposium on VLSI Technology, Dec. 2, 2020, 2 pages.

Synopsys.com [online], "Synopsys UCIe IP Solutions," Jul. 5, 2022, retrieved on Oct. 24, 2023, retrieved from URL<https://www.synopsys.com/dw/ipdir.php?ds=dwc_ucie_ip>, 2 pages.

Synopsys.com [online], "Synopsys XSR PHY IP," May 28, 2020, retrieved on Oct. 24, 2023, retrieved from URL<https://www.synopsys.com/dw/ipdir.php?ds-dwc_usr-xsr_phy>, 2 pages.

Timurdogan et al., "400G Silicon Photonics Integrated Circuit Transceiver Chipsets for CPO, OBO, and Pluggable Modules," 2020 Optical Fiber Communications Conference and Exhibition (OFC), Mar. 12-8, 2020, 3 pages.

Timurdogan et al., "An Ultra Low Power 3D Integrated Intra-Chip Silicon Electronic-Photonic Link," 2015 Optical Fiber Communications Conference and Exhibition (OFC), Mar. 22-26, 2015, 3 pages.

Tracy, "Supporting Data to Demonstrate 100Gbps Capability of Proposed MDIs," TW Connectivity, Sep. 13, 2018, 9 pages.

Uciexpress.org [online], "Universal Chiplet Interconnect Express (UCIe) Specification," retrieved on Feb. 24, 2020, retrieved on Sep. 26, 2023, retrieved from URL<https://www.uciexpress.org/specifications>, 2 pages.

Uciexpress.org [online], "Universal Chiplet Interconnect Express (UCIe)®: Building an open chiplet ecosystem," Mar. 2, 2022, retrieved on Jul. 8, 2022, retrieved from URL<https://www.uciexpress.org/_files/ugd/0c1418_c5970a68ab214ffc97fab16d11581449.pdf>, 7 pages.

Wade et al., "75% Efficient Wide Bandwidth Grating Couplers in a 45 nm Microelectronics CMOS Process," 2015 IEEE Optical Interconnects Conference (OI), Apr. 20-22, 2015, 46-47.

Wade et al., "A Bandwidth-Dense, Low Power Electronic-Photonic Platform and Architecture for Multi-Tbps Optical I/O," 2018 European Conference on Optical Communication (ECOC), Sep. 23-27, 2018, 3 pages.

(56) References Cited

OTHER PUBLICATIONS

Wade et al., "An Error-free 1 Tbps WDM Optical I/O Chiplet and Multi-wavelength Multi-port Laser," 2021 Optical Fiber Communications Conference and Exhibition (OFC), Jun. 6-10, 2021, 3 pages.
Wade et al., "TeraPHY: A Chiplet Technology for Low- Power, High-Bandwidth In-Package Optical I/O," IEEE Computer Society, Mar. & Apr. 2020, 9 pages.
Wade et al., "TeraPHY: A Chiplet Technology for Low-Power, High-Bandwidth In-Package Optical I/O," Presentation Ayar Labs and Intel, Hot Chips 2019, Aug. 20, 2019, 48 pages.
Wang et al., "4×112 Gbps/Fiber CWDM VCSEL Arrays for Co-Packaged Interconnects," Journal of Lightwave Technology, Jul. 1, 2020, 38:3439-3444.
Wang et al., "Bidirectional Tuning of Microring-Based Silicon Photonic Transceivers for Optimal Energy Efficiency," Proceedings of the 24th Asia and South Pacific Design Automation Conference, Jan. 21, 2019, pp. 370-375.
Wang et al., "Energy-Efficient Channel Alignment of DWDM Silicon Photonic Transceivers," 2018 Design, Automation & Test in Europe Conference & Exhibition, Mar. 19-23, 2018, 4 pages.
Yoshida et al. "56-GB/s PAM4 x 8-Channel VCSEL-Based Optical Transceiver for Co-Packaged Optics," 2022 IEEE CPMT Symposium Japan (ICSJ), 2022, 4 pages.
Yu et al., "400Gbps Fully Integrated DR4 Silicon Photonics Transmitter for Data Center Applications," 2020 Optical Fiber Communications Conference and Exhibition (OFC), Mar. 8-12, 2020, 3 pages.
Zdnet.com [online], "AMD, Intel, TSMC, Microsoft and others establish universal chiplet standard," Mar. 2, 2022, retrieved on Oct. 26, 2023, retrieved from URL<https://www.zdnet.com/article/amd-intel-tsmc-microsoft-and-others-establish-universal-chiplet-standard/>, 8 pages.
Zhang et al., "3D and 2.5D Heterogeneous Integration Platforms with Interconnect Stitching and Microfluidic Cooling," Georgia Institute of Technology, Doctor of Philosophy in the School of Electrical and Computer Engineering Aug. 2017, 151 pages.
Zhao et al., "Ultra-dense Silicon Photonics Coupling Solution for Optical Chip Scale Package Transceiver," In Asia Communications and Photonics Conference, Nov. 2016, 3 pages.
Zheng et al., Ultra-efficient 10 GB/s hybrid integrated silicon photonic transmitter and receiver, Optics Express, Mar. 2011, 19(6):5172-5186.
Zilkie et al., "Multi-micron silicon photonics platform for highly manufactural and versatile photonic integrated circuits," IEEE Journal of Selected Topics in Quantum Electronics, Apr. 15, 2019, 15 pages.
Extended European Search Report in European Appln. No. 21870320.5, mailed on Aug. 30, 2024, 14 pages.
Extended European Search Report in European Appln. No. 21878442.9, dated Aug. 30, 2024, 12 pages.
International Preliminary Report on Patentability in International Appln. No. PCT/US2023/016573, mailed on Oct. 10, 2024, 10 pages.
Schröder et al., "Demonstration of glass based photonic interposer for mid-board-optical engines and electrical-optical circuit board (EOCB) integration strategy," Proc. SPIE, Optical Interconnects XVIII, Feb. 22, 2018, 10538:57-69.
Brusberg et al., "On-board Optical Fiber and Embedded Waveguide Interconnects," 2018 7th Electronic System-Integration Technology Conference (ESTC), Nov. 29, 2018, pp. 1-7.
Cook et al., "36-Channel Parallel Optical Interconnect Module Based on Optoelectronics-on-VLSI Technology," IEEE Journal of Selected Topics in Quantum Electronics, Mar./Apr. 2003, 9(2):387-391.
Young et al., "Optical I/O Technology for Tera-Scale Computing," IEEE Journal of Solid-State Circuits, Jan. 2010, 45(1):235-242.
Grani et al., "Design and Evaluation of AWGR-based Photonic NoC Architectures for 2.5D Integrated High Performance Computing Systems," 2017 IEEE International Symposium on High Performance Computer Architecture (HPCA), May 8, 2017, pp. 289-295.
International Preliminary Report on Patentability in International Appln. No. PCT/US2022/033870, mailed on Dec. 28, 2023, 13 pages.
International Search Report and Written Opinion in International Appln. No. PCT/US2023/32927, mailed on Jan. 25, 2024, 26 pages.
Krishnamoorthy et al., "From Chip to Cloud: Optical Interconnects in Engineered Systems," Journal of Light Wave Technology, Aug. 1, 2017, 35(15):3101-3111.
Rostan et al., "EtherCAT enabled Advanced Control Architecture," 2010 IEEE/SEMI Advanced Semiconductor Manufacturing Conference (ASMC), 2010, pp. 39-41.
International Preliminary Report on Patentability in International Appln. No. PCT/US2023/032927, mailed on Mar. 27, 2025, 23 pages.

* cited by examiner

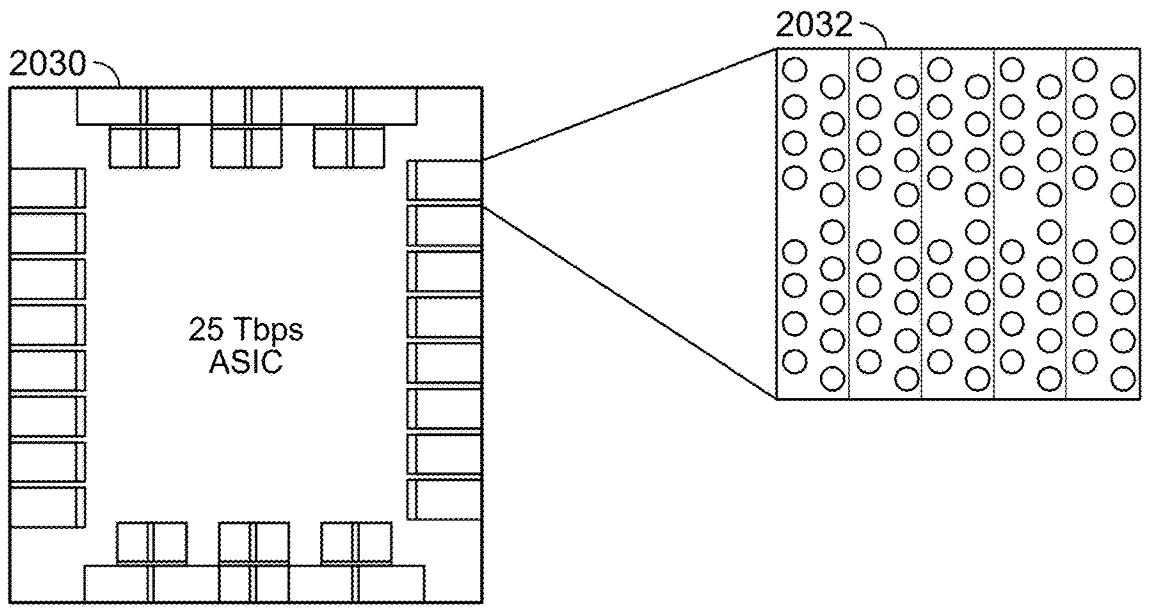

FIG. 41

2040

| I/O Type | Per-lane Rate | Loss @ Nyquist | Power | Area/112Gbps | Shoreline Density |
|---|---|---|---|---|---|
| 200G SerDes | N x 224 Gbps | 36 dB | 4.0 pJ/bit | 0.27 $mm^2$ | 1,253 Gbps/mm |
| XLR SerDes | N x 112 Gbps | 40 dB | 5.7 pJ/bit | 0.45 $mm^2$ | 627 Gbps/mm |
| LR SerDes | N x 112 Gbps | 36 dB | 4.4 pJ/bit | 0.38 $mm^2$ | 627 Gbps/mm |
| MR SerDes | N x 112 Gbps | 25 dB | 3.5 pJ/bit | 0.33 $mm^2$ | 627 Gbps/mm |
| XSR SerDes | N x 112 Gbps | 6-10dB | 0.9 pJ/bit | 0.14 $mm^2$ | 1,468 Gbps/mm |
| BoW on Organic | N x 16 Gbps | 6-10dB | 0.35 pJ/bit | 0.15 $mm^2$ | 394 Gbps/mm |
| BoW on Si Interposer | N x 16 Gbps | 6-10dB | 0.35 pJ/bit | 0.02 $mm^2$ | 2,048 Gbps/mm |

FIG. 42

PHOTONIC CHIPLET PACKAGING

CROSS-REFERENCE TO RELATED APPLICATION

This application claims priority to U.S. provisional patent application 63/407,610, filed on Sep. 16, 2022. The entire disclosure of the above application is hereby incorporated by reference.

TECHNICAL FIELD

This document describes photonic chiplet packaging.

BACKGROUND

This section introduces aspects that can help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient input/output capacity across the limited size of a practically viable electronic chip package. For example, photonic integrated circuits can provide input/output functions to a high speed data processing chip, such as a network switch chip. The photonic integrated circuits can convert input optical signals to input electrical signals that are forwarded to the data processing chip, and convert output electrical signals from the data processing chip to output optical signals that are transmitted to external optical fiber cables. For example, each photonic integrated circuit can be edge-coupled to a ribbon fiber optic cable that includes multiple optical fibers.

SUMMARY

In a general aspect, a system includes a first chiplet, a second chiplet, an electronic amplification module, and a converter module. The first chiplet includes at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device. The second chiplet includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification module includes at least one of a driver amplifier or a transimpedance amplifier, and configured to process electrical signals sent to or from the photonic module. The converter module is configured to convert signals between a first interface and a second interface, wherein the converter module is configured to communicate with the first chiplet using the first interface, and the converter module is configured to communicate with the electronic amplification module using the second interface.

In another general aspect, a system includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The photonic module includes an optically active layer that includes active photonic components, the photonic module has an optically active side and a backside, and at least some of the active photonic components are closer to the optically active side than the backside. The photonic module includes back-side illuminated couplers arranged in a two-dimensional configuration. Each back-side illuminated coupler is configured to receive a light beam incident on the back side of the photonic module or emit a light beam that exits the back side of the photonic module. The photonic module includes a first substrate and a first layer formed on the first substrate. The first substrate includes a first material having a first refractive index, and the first layer includes a second material having a second refractive index that is smaller than the first refractive index. The first substrate includes a first side and a second side, the first side of the first substrate faces towards the first layer, and the second side of the first substrate forms or faces towards the backside of the photonic module. The first layer is disposed between the first substrate and the optically active layer of the photonic module. The first substrate defines at least one opening that extends from the first side of the first substrate to the second side of the first substrate, and the at least one opening is associated with at least one of the back-side illuminated couplers.

In another general aspect, a system includes a photonic module, an electronic amplification module, and a converter module. The photonic module includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification module includes at least one of a driver amplifier or a transimpedance amplifier, and configured to process electrical signals sent to or from the photonic module. The converter module is configured to convert signals between a first interface and a second interface, wherein the converter module communicates with a data processing module using the first interface, and the converter module communicates with the electronic amplification module using the second interface. The photonic module is mounted on the electronic amplification module. The electronic amplification module is mounted on the converter module such that the photonic module, the electronic amplification module, and the converter module form a stack.

In another general aspect, a system includes a second chiplet, an electronic amplification module, and a converter module. The second chiplet includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification module includes at least one of a driver amplifier or a transimpedance amplifier, and configured to process electrical signals sent to or from the photonic module. The converter module is configured to convert signals between a first interface and a second interface, wherein the converter module communicates with a first chiplet using the first interface, and the converter module is configured to communicate with the electronic amplification module using the second interface.

In another general aspect, a system includes a photonic chiplet and an electronic amplification chiplet. The photonic chiplet includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification chiplet includes at least one of a driver amplifier or a transimpedance amplifier, and is configured to process electrical signals sent to or from the photonic module. The photonic chiplet includes a first substrate and an optically active layer on or in the substrate, the optically active layer includes active photonic components, the photonic chiplet has an optically active side and a backside, and at least some of the active photonic components are closer to the optically active side than the backside. The photonic chiplet includes optical couplers arranged in a two-dimensional configuration. Each optical coupler is configured to receive a light beam incident on the optically active side of the photonic chiplet or emit a light beam that exits the optically active side of the photonic chiplet. The first substrate includes conductive vias that extend from the optically active layer to the backside of the photonic chiplet. The electronic amplification chiplet includes a second substrate and an electrically active layer, and the electrically active layer includes active electronic components. The electronic amplification chiplet includes a first side and a second side, the electrically active layer is closer to the first side than the second side, and the second substrate includes conductive vias that extend from the electrically active layer to the second side of the electronic amplification chiplet.

In another general aspect, a system includes a second chiplet and a third chiplet, wherein the second chiplet is mounted on the third chiplet. The second chiplet includes a photonic module and an electronic amplification module. The photonic module includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification module includes at least one of a driver amplifier or a transimpedance amplifier, and is configured to process electrical signals sent to or from the photonic module. The photonic chiplet includes optical couplers arranged in a two-dimensional configuration, and each optical coupler is configured to receive a light beam from an external optical link or emit a light beam that is transmitted to an external optical link. The third chiplet includes a converter module configured to convert signals between a first interface and a second interface, wherein the converter module is configured to communicate with a first chiplet using the first interface, and the converter module is configured to communicate with the electronic amplification module using the second interface.

In another general aspect, a system includes a photonic chiplet and an electronic amplification chiplet. The photonic chiplet includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification chiplet includes at least one of a driver amplifier or a transimpedance amplifier, and configured to process electrical signals sent to or from the photonic module. The photonic chiplet includes a plurality of optical couplers, and each optical coupler is configured to receive input light or emit output light. The electronic amplification module is mounted on a first portion of the photonic chiplet without covering a second portion of the photonic chiplet to enable the optical couplers to receive the input light or emit the output light.

In another general aspect, a system includes a photonic chiplet, an electronic amplification chiplet, and a dummy chiplet. The photonic chiplet includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification chiplet includes at least one of a driver amplifier or a transimpedance amplifier, and is configured to process electrical signals sent to or from the photonic module. The dummy chiplet has a first side and a second side, and the dummy chiplet includes conductive vias extending from the first side to the second side. The photonic chiplet includes a first substrate and an optically active layer on or in the substrate, the optically active layer includes active photonic components, the photonic chiplet has an optically active side and a backside, and at least some of the active photonic components are closer to the optically active side than the backside. The photonic chiplet includes optical couplers arranged in a two-dimensional configuration, and each optical coupler is configured to receive a light beam incident on the optically active side of the photonic chiplet or emit a light beam that exits the optically active side of the photonic chiplet. The electronic amplification chiplet includes a first set of electrical contacts and a second set of electrical contacts. The optically active layer of the photonic chiplet is electrically coupled to the electronic amplification chiplet through the first set of contacts, and the electronic amplification chiplet is electrically coupled through the second set of contacts to the conductive vias of the dummy chiplet.

In another general aspect, a system includes a photonic chiplet, an electronic amplification chiplet, and a dummy chiplet. The photonic chiplet includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification chiplet includes at least one of a driver amplifier or a transimpedance amplifier, and configured to process electrical signals sent to or from the photonic module. The dummy chiplet has a first side and a second side, and the dummy chiplet includes conductive vias extending from the first side to the second side. The photonic chiplet includes a first substrate and an optically active layer on or in the substrate, the optically active layer includes active photonic components, the photonic chiplet has an optically active side and a backside, and at least some of the active photonic components are closer to the optically active side than the backside. The photonic chiplet is edge coupled to one or more optical fibers. The electronic amplification chiplet includes a first set of electrical contacts and a second set of electrical contacts. The optically active layer of the photonic chiplet is electrically coupled to the electronic amplification chiplet through the first set of contacts, and the electronic amplification chiplet is electrically coupled through the second set of contacts to the conductive vias of the dummy chiplet.

In another general aspect, a system includes a photonic chiplet, a dummy chiplet, and molding compound. The photonic chiplet includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The dummy chiplet has a first side and a second side, and the dummy chiplet includes conductive vias extending from the first side to the second side. The molding compound covers at least a portion of the photonic chiplet and at least a portion of the dummy chiplet, wherein the photonic chiplet is mechanically coupled to the dummy chiplet through the molding compound. The photonic chiplet and the dummy chiplet have a same thickness.

In another general aspect, a system includes a photonic chiplet, an electronic amplification chiplet, and a converter chiplet. The photonic chiplet includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification chiplet includes at least one of a driver amplifier or a transimpedance amplifier, and configured to process electrical signals sent to or from the photonic module. The converter chiplet includes converter circuitry configured to convert signals between a first interface and a second interface, wherein the converter circuitry communicates with a first chiplet using the first interface, and the converter circuitry communicates with the electronic amplification chiplet using the second interface. The electronic amplification chiplet includes a first side and a second side, a first portion of the second side faces towards the optically active side of the photonic chiplet, and a second portion of the second side faces towards the converter chiplet. The converter chiplet includes a first side and a second side, and the converter circuitry is closer to the first side than the second side. The converter chiplet includes conductive vias that extend from the converter circuitry to the second side of the converter chiplet. The electronic amplification chiplet is partially mounted on the photonic chiplet and partially mounted on the converter chiplet. The electronic amplification chiplet has a first set of electrical contacts and a second set of electrical contacts, the first set of electrical contacts are electrically coupled to the optically active layer of the photonic chiplet, and the second set of electrical contacts are electrically coupled to the converter circuitry of the converter chiplet.

In another general aspect, a system includes a second chiplet, a third chiplet, and a dummy chiplet. The second chiplet includes a photonic module and an electronic amplification module. The photonic module includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification chiplet includes at least one of a driver amplifier or a transimpedance amplifier, and configured to process electrical signals sent to or from the photonic module. The third chiplet includes converter circuitry configured to convert signals between a first interface and a second interface, wherein the converter circuitry communicates with a first chiplet using the first interface, and the converter circuitry communicates with the electronic amplification chiplet using the second interface. The dummy chiplet has a first side and a second side, wherein the dummy chiplet includes conductive vias that extend from the first side to the second side. The third chiplet is partially mounted on the second chiplet and partially mounted on the dummy chiplet. The third chiplet includes a first set of electrical contacts and a second set of electrical contacts, the first set of electrical contacts is electrically coupled to the second chiplet, and the second set of electrical contacts is electrically coupled to the conductive vias of the dummy chiplet.

In another general aspect, a system includes a second chiplet, a third chiplet, a fourth chiplet, and a fifth chiplet. The second chiplet includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The third chiplet includes an electronic amplification module that includes at least one of a driver amplifier or a transimpedance amplifier, and is configured to process electrical signals sent to or from the photonic module. The fourth chiplet includes a converter module configured to convert signals between a first interface and a second interface, wherein the converter circuitry communicates with a first chiplet using the first interface, and the converter circuitry communicates with the electronic amplification chiplet using the second interface. The fifth chiplet has a first side and a second side, wherein the fifth chiplet includes through vias that extend from the first side to the second side. The second chiplet is mounted on the common substrate. The third chiplet is partially mounted on the second chiplet and partially mounted on the fifth chiplet. The fourth chiplet is mounted on the fifth chiplet, wherein the fifth chiplet includes conductive traces that electrically couple the third chiplet to the fourth chiplet. The fourth chiplet is electrically coupled to the common substrate using the through vias of the fifth substrate.

In another general aspect, a system includes a second chiplet, a third chiplet, and a common substrate defining a cavity or a through-hole. The second chiplet includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The third chiplet includes an electronic amplification module that includes at least one of a driver amplifier or a transimpedance amplifier, and is configured to process electrical signals sent to or from the photonic module. The third chiplet is partially mounted on the second chiplet and partially mounted on the common substrate, wherein the second chiplet is disposed at least partially in the cavity or the through-hole.

In another general aspect, a system includes a second chiplet, a third chiplet, and a common substrate. The second chiplet includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O)

signal converters. The third chiplet includes an electronic amplification module that includes at least one of a driver amplifier or a transimpedance amplifier, and is configured to process electrical signals sent to or from the photonic module. The common substrate defines a partial through-hole having a first portion that extends partly through the common substrate and a second portion that extends completely through the common substrate and defines an opening, wherein a thinned portion of the common substrate is disposed above the first portion of the partial through-hole. The third chiplet is partially mounted on the second chiplet and partially mounted on the common substrate, wherein the second chiplet is disposed at least partially in the cavity or the through-hole. The second chiplet is disposed in the partial through-hole, wherein the second chiplet is oriented such that an optically active side of the photonic module faces upwards, a first portion of the optically active side of the second chiplet is covered by the thinned portion of the common substrate, and a second portion of the optically active side of the second chiplet is exposed by the opening of the partial through-hole. The electronic amplification module is electrically coupled to the first portion of the optically active layer of the photonic module using conductive vias through the thinned portion of the common substrate.

In another general aspect, a system includes a second chiplet, an electronic amplification module, and a common substrate. The second chiplet includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification module includes at least one of a driver amplifier or a transimpedance amplifier, and is configured to process electrical signals sent to or from the photonic module. The common substrate includes a redistribution layer that includes alternating electrically conductive layers and electrical insulation layers, wherein each conductive layer is disposed between two insulation layers, each conductive layer has a thickness in a range from 1 μm to 50 μm, and each insulation layer has a thickness in a range from 1 μm to 300 μm. The second chiplet is directly or indirectly mounted on the common substrate. The molding compound covers at least a portion of side surfaces of the second chiplet and at least a portion of a surface of the common substrate, wherein the molding compound is configured to enhance a structural stability of a semiconductor package that includes the second chiplet, the electronic amplification module, the common substrate, and the molding compound.

In another general aspect, a system includes a common substrate, a second chiplet, an electronic amplification module, and a converter module. The common substrate includes a first set of bump contacts and a second set of bump contacts, wherein the first set of bump contacts is configured to be electrically connected to a first chiplet that includes at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device. The second chiplet includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The electronic amplification module includes at least one of a driver amplifier or a transimpedance amplifier, and is configured to process electrical signals sent to or from the photonic module. The converter module is configured to convert signals between a first interface and a second interface, wherein the converter module communicates with the first chiplet using the first interface, and the converter module communicates with the electronic amplification module using the second interface. At least some of the second set of bump contacts are directly or indirectly electrically connected to the second chiplet.

In another general aspect, a system includes a semiconductor package that includes a first chiplet, a second chiplet, a common substrate, and a molding compound. The first chiplet includes a first side and a second side, and the first chiplet includes optical couplers that are configured to be optically coupled to an external optical device. The second chiplet is configured to at least one of transmit electrical signals to or receive electrical signals from the first chiplet. The common substrate includes alternating layers of electrically conductive material and electrically insulating material, wherein the common substrate has a total thickness of less than 1 mm, and the common substrate defines a cavity. The molding compound covers at least a portion of the common substrate and at least a portion of the surface of the second chiplet, wherein the molding compound enhances a structural strength of the semiconductor package, and the molding compound defines a first opening that exposes the optical couplers of the first chiplet. The first chiplet is disposed in the cavity in the common substrate, wherein at least some electrical contacts of the first chiplet are electrically coupled to at least some electrical contacts of the second chiplet. At least some electrical contacts of the second chiplet are electrically coupled to at least some electrical contacts of the common substrate.

In another general aspect, a system includes a semiconductor package that includes a first chiplet, a second chiplet, and a common substrate that defines a cavity and a first opening. The first chiplet includes optical couplers that are configured to be optically coupled to an external optical device. The second chiplet is configured to at least one of transmit electrical signals to or receive electrical signals from the first chiplet. The first chiplet is disposed in the cavity in the common substrate, wherein at least some electrical contacts of the first chiplet are electrically coupled to at least some electrical contacts of the second chiplet, and the first opening in the common substrate exposes the optical couplers of the first chiplet. At least some electrical contacts of the second chiplet are electrically coupled to at least some electrical contacts of the common substrate.

In another general aspect, an apparatus includes an input/output interface that includes a photonic module and a fiber optic connector configured to enable a data processing device having a first shoreline bandwidth density of at least 1 Gbps/mm to communicate with optical fiber cores through the photonic module and the fiber optic connector. The input/output interface is configured to substantially maintain the shoreline bandwidth density from the data processing device to the fiber optic connector with no fan out or with a fan out of not more than 50%.

In another general aspect, a system includes a first device that includes a photonic module, wherein the first chiplet has a first shoreline bandwidth density D1 bps/mm. The system includes a fiber optic connector attached to the first device, wherein the fiber optic connector has a third shoreline bandwidth density D3 bps/mm. The first device is configured to directly or indirectly communicate with a second device that has a second shoreline bandwidth density D2 bps/mm, wherein $D2 \geq 1{,}000{,}000$. The first device and the fiber optic connector are configured such that the first shoreline bandwidth density and the third shoreline bandwidth density substantially match the second shoreline bandwidth density, wherein $D2 \leq 1.5 \times D1$, and $D2 \leq 1.5 \times D3$.

In another general aspect, an apparatus includes a first chiplet configured to be optically coupled to a two-dimensional (2D) array of optical fiber cores. The first chiplet is configured to directly or indirectly send electrical signals to or receive electrical signals from a second chiplet. The first chiplet has a geometry that enables the first chiplet to be substantially pitch-matched or quasi pitch-matched with the second chiplet.

In another general aspect, a method includes maintaining a shoreline bandwidth density of at least 1 Gbps/mm from a data processing device to a fiber optic connector with no fan out or a fan out of not more than 50%.

In another general aspect, a method includes mounting a second chiplet on a temporary wafer carrier, wherein the second chiplet is configured to at least one of transmit electrical signals to or receive electrical signals from a first chiplet that includes electrical and optical components. The second chiplet includes a first side and a second side, wherein the second chiplet includes conductive bumps on the second side, and the second side of the second chiplet faces the wafer carrier. The method includes overmolding the second chiplet and the wafer carrier by applying a molding compound over the second chiplet and the wafer carrier; removing the wafer carrier from the second chiplet, exposing the conductive bumps on the second chiplet; and forming redistribution layers that are electrically coupled to at least some of the conductive bumps of the second chiplet. The method includes forming a cavity in the redistribution layers, wherein the cavity has dimensions in a lateral direction slightly larger than dimensions of the second chiplet. The method includes forming a first opening in the molding compound at a first location. The method includes inserting the first chiplet into the cavity in the redistribution layers, wherein the first chiplet includes optical couplers. The first opening in the molding compound and the redistribution layers are positioned above the optical couplers, wherein the optical couplers are configured to be optically coupled to an external optical device through an optical path that passes the first opening in the molding compound and the redistribution layers. The method includes electrically coupling at least some of electrical contacts of the first chiplet to at least some electrical contacts of the redistribution layers.

In another general aspect, a system includes a semiconductor package that includes a first chiplet, a second chiplet, and a common substrate. The first chiplet includes a first side and a second side, wherein the first chiplet includes optical components that are optically coupled to an external optical device through an optical path that passes the first side of the first chiplet. The second chiplet is configured to at least one of transmit electrical signals to or receive electrical signals from the first chiplet. The common substrate includes alternating layers of electrically conductive material and electrically insulating material, wherein the common substrate has a total thickness of less than 1 mm, the first chiplet is directly or indirectly mounted on the common substrate, the first chiplet is oriented such that the first side faces away from the common substrate and the second side faces towards the common substrate, and the second chiplet is directly or indirectly mounted on the common substrate. The molding compound bonds to at least a portion of a surface of the first chiplet, at least a portion of a surface of the second chiplet, and at least a portion of a surface of the common substrate, wherein the molding compound enhances a structural stability of the semiconductor package.

In another general aspect, a method includes providing a temporary wafer carrier having a two-side release tape on the temporary wafer carrier; and mounting a first chiplet on the two-side release tape, wherein the first chiplet includes a first side and a second side, the first chiplet includes at least one optical coupler, the first chiplet is oriented such that the second side of the first chiplet faces towards the two-side release tape, and the first chiplet includes conductive bumps on the second side. The method includes mounting a second chiplet on the two-side release tape, wherein the second chiplet includes a first side and a second side, the second chiplet is oriented such that the second side of the second chiplet faces towards the two-side release tape, the first chiplet includes conductive bumps on the second side, and the second chiplet is configured to at least one of transmit electrical signals to or receive electrical signals from the first chiplet. The method includes overmolding the first chiplet, the second chiplet, and the temporary wafer carrier with the two-side release tape by applying a molding compound over the first chiplet, the second chiplet, and the temporary wafer carrier with the two-side release tape. The method includes grinding the molding compounding to reduce a thickness of the molding compound until a first surface of the first chiplet is exposed; and removing the two-side tape and the carrier wafer from the first chiplet and the second chiplet, exposing the conductive bumps on the second side of the first chiplet and the conductive bumps on the second side of the second chiplet. The method includes forming redistribution layers that are electrically coupled to the conductive bumps of the first chiplet and the conductive bumps on the second chiplet.

In another general aspect, a method of fabricating a semiconductor package includes a first chiplet having an electronic integrated circuit and a second chiplet having a photonic integrated circuit, the photonic integrated circuit having at least one optical coupler. The method includes mounting the first chiplet and the second chiplet on a temporary wafer carrier; and applying a molding compound over the first chiplet, the second chiplet, and the temporary wafer carrier. The method includes exposing at least a portion of a first surface of the second chiplet such that the exposed portion of the first surface is not covered by the molding compound to enable the at least one optical coupler to gain access to an optical path that extends to outside of the semiconductor package; removing the temporary wafer carrier from the first chiplet and the second chiplet; and forming redistribution layers that are coupled to the first chiplet and the second chiplet.

In another general aspect, a system includes a second chiplet and a third chiplet. The second chiplet includes a photonic module that includes at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters. The third chiplet includes a converter module and an electronic amplification module, wherein the converter module and the electronic amplification module are formed on a monolithic semiconductor die. The electronic amplification module includes at least one of a driver amplifier or a transimpedance amplifier, and is configured to process electrical signals sent to or from the photonic module. The converter module is configured to convert signals between a first interface and a second interface, wherein the converter module is configured to communicate with a first chiplet using the first interface, and the converter module is configured to communicate with the electronic amplification module using the second interface.

In another general aspect, a system includes a semiconductor package that includes a first chiplet and a second chiplet. The first chiplet includes a data processing module. The second chiplet includes a photonic module that includes an optically active layer, wherein the optically active layer includes active photonic components. The photonic module has an optically active side and a back side, wherein at least some of the active photonic components are closer to the optically active side than the back side. The photonic module includes back-side illuminated couplers arranged in a two-dimensional configuration, wherein each back-side illuminated coupler is configured to receive light incident on the back side of the photonic module or emit light that exits the back side of the photonic module. The photonic module includes a first substrate and a first layer formed on the first substrate, wherein the first substrate includes a first material having a first refractive index, and the first layer includes a second material having a second refractive index that is smaller than the first refractive index. The first substrate includes a first side and a second side, wherein the first side of the first substrate faces towards the first layer, and the second side of the first substrate forms or faces towards the backside of the photonic module. The photonic module is configured to perform at least one of (i) convert output electrical signals provided by the data processing module to output optical signals that are transmitted to an external optical link through the back-side illuminated couplers, or (ii) convert input optical signals received through the back-side illuminated couplers to input electrical signals that are provided to the data processing module.

In another general aspect, a system includes a semiconductor package that includes a first chiplet, a second chiplet, a third chiplet, a fourth chiplet, and a common substrate. The first chiplet includes a data processing module. The second chiplet includes a photonic module that includes back-side illuminated couplers arranged in a two-dimensional configuration, wherein each back-side illuminated coupler is configured to receive light incident on the back side of the photonic module or emit light that exits the back side of the photonic module. The fourth chiplet includes an electronic amplification module includes at least one of (i) a driver amplifier configured to amplify electrical signals transmitted to the photonic module, or (ii) a transimpedance amplifier configured to amplify electrical signals transmitted from the photonic module. The third chiplet includes a converter module configured to convert signals between a first interface and a second interface, wherein the data processing module communicates with the converter module using the first interface that complies with a first die-to-die interface specification, and the converter module communicates with the electronic amplification module using the second interface that complies with a second die-to-die interface specification. The first chiplet is mounted on the common substrate. The second chiplet, third chiplet, and fourth chiplet are directly or indirectly mounted on the common substrate.

In another general aspect, a system includes a semiconductor package that includes a first chiplet, a second chiplet, a third chiplet, a fourth chiplet, and a common substrate made in a fan-out wafer-level packaging (FoWLP) process. The first chiplet includes a data processing module. The second chiplet includes a photonic module that includes couplers arranged in a two-dimensional configuration, wherein each coupler is configured to receive incident light or emit output light. The fourth chiplet includes an electronic amplification module configured to amplify electrical signals transmitted to or from the photonic module. The third chiplet includes a converter module configured to convert signals between a first interface and a second interface, wherein the data processing module communicates with the converter module using the first interface that complies with a first die-to-die interface specification, and the converter module communicates with the electronic amplification module using the second interface that complies with a second die-to-die interface specification. The first chiplet is mounted on the common substrate. The second chiplet, third chiplet, and fourth chiplet are directly or indirectly mounted on the common substrate. The system includes a molding compound surrounding at least a portion of the first chip, wherein the molding compound surrounds at least a portion of at least one of the second chiplet, third chiplet, or fourth chiplet. The molding compound surrounds at least a portion of a surface of the common substrate, and the molding compound is configured to enhance a structural stability of the semiconductor package.

In another general aspect, a system includes a semiconductor package that includes a first chiplet, a second chiplet, a third chiplet, and a common substrate. The first chiplet includes a data processing module. The second chiplet includes a photonic module and an electronic amplification module. The photonic module includes back-side illuminated couplers arranged in a two-dimensional configuration, wherein each back-side illuminated coupler is configured to receive light incident on the back side of the photonic module or emit light that exits the back side of the photonic module. The electronic amplification module includes at least one of (i) a driver amplifier configured to amplify electrical signals transmitted to the photonic module, or (ii) a transimpedance amplifier configured to amplify electrical signals transmitted from the photonic module. The third chiplet includes a converter module configured to convert signals between a first interface and a second interface, wherein the data processing module communicates with the converter module using the first interface that complies with a first die-to-die interface specification, and the converter module communicates with the electronic amplification module using the second interface that complies with a second die-to-die interface specification. The first chiplet is mounted on the common substrate. The second chiplet and third chiplet are directly or indirectly mounted on the common substrate.

In another general aspect, a system includes a semiconductor package that includes a first chiplet, a second chiplet, a third chiplet, and a common substrate. The first chiplet includes a data processing module. The second chiplet includes a photonic module that includes back-side illuminated couplers arranged in a two-dimensional configuration, wherein each back-side illuminated coupler is configured to receive light incident on the back side of the photonic module or emit light that exits the back side of the photonic module. The third chiplet includes a converter module and an electronic amplification module. The electronic amplification module is configured to amplify electrical signals transmitted to or from the photonic module. The converter module is configured to convert a first set of a first number of bit streams from the data processing module, each bit stream at a first bit rate, to a second set of a second number of bit streams to the electronic amplification module, each bit stream at a second bit rate. The first chiplet is mounted on the common substrate. The second chiplet and third chiplet are directly or indirectly mounted on the common substrate.

In another general aspect, a system includes a semiconductor package that includes a first chiplet, a second chiplet, and a common substrate. The first chiplet includes a data processing module. The second chiplet includes a photonic module, an electronic amplification module, and a converter module. The photonic module includes back-side illuminated couplers arranged in a two-dimensional configuration, wherein each back-side illuminated coupler is configured to receive light incident on the back side of the photonic module or emit light that exits the back side of the photonic module. The electronic amplification module includes at least one of (i) a driver amplifier configured to amplify electrical signals transmitted to the photonic module, or (ii) a transimpedance amplifier configured to amplify electrical signals transmitted from the photonic module. The converter module is configured to convert a first set of a first number of bit streams from the data processing module, each bit stream at a first bit rate, to a second set of a second number of bit streams to the electronic amplification module, each bit stream at a second bit rate. The first chiplet and the second chiplet are mounted on the common substrate.

In another general aspect, a system includes a semiconductor package that includes a first chiplet, a second chiplet, a third chiplet, a fourth chiplet, and a common substrate. The first chiplet includes a data processing module. The second chiplet includes a photonic module that includes front-side illuminated couplers arranged in a two-dimensional configuration, wherein each front-side illuminated coupler is configured to receive light incident on the front side of the photonic module or emit light that exits the front side of the photonic module. The photonic module is configured to perform at least one of (i) convert input optical signals to high speed serial input electrical signals, or (ii) convert high speed serial output electrical signals to output optical signals. The fourth chiplet includes an electronic amplification module configured to amplify at least one of (i) the high speed serial output electrical signals transmitted to the photonic module, or (ii) the high speed serial input electrical signals transmitted from the photonic module. The third chiplet includes a converter module configured to perform at least one of (i) convert the high speed serial input electrical signals from the electronic amplification module to low speed parallel input electrical signals transmitted to the data processing module, or (ii) convert low speed parallel output electrical signals transmitted from the data processing module to high speed serial output electrical signals transmitted to the electronic amplification module. The first chiplet is mounted on the common substrate. At least one of the second chiplet, third chiplet, or fourth chiplet is mounted on the common substrate.

In another general aspect, a system includes a semiconductor package that includes a first chiplet, a second chiplet, a third chiplet, and a common substrate. The first chiplet includes a data processing module, and the first chiplet is mounted on the common substrate. The second chiplet includes a photonic module that includes an optically active layer, wherein the optically active layer includes active photonic components. The photonic module has an optically active side and a backside, wherein at least some of the active photonic components are closer to the optically active side than the backside. The photonic module includes front-side illuminated couplers arranged in a two-dimensional configuration, wherein each front-side illuminated coupler is configured to receive light incident on the front side of the photonic module or emit light that exits the front side of the photonic module. The photonic module includes a first substrate, wherein the optically active layer is formed on the first substrate, and the first substrate includes conductive vias that electrically couple at least some of the active photonic components to the backside of the photonic module. The third chiplet includes an electronic amplification module that includes at least one of a driver amplifier or a transimpedance amplifier. The second chiplet is mounted on the third chiplet with the backside of the photonic module facing towards the electronic amplification module. The third chiplet is mounted on the common substrate.

In another general aspect, a system includes a common substrate; a first integrated circuit configured to processes data; a converter integrated circuit; and an analog electronic amplification integrated circuit configured to amplify electrical signals. The first integrated circuit, the converter integrated circuit, and the electronic amplification integrated circuit are mounted on the common substrate. The common substrate includes at least one of an organic substrate, a ceramic substrate, a silicon interposer, a substrate using silicon bridges, or a substrate made in a fan-out wafer-level packaging (FoWLP) process. The system includes a photonic integrated circuit that includes an optically active layer, wherein the optically active layer includes active photonic components. The photonic integrated circuit has an optically active side and a backside, wherein at least some of the active photonic components are closer to the optically active side than the backside. The photonic integrated circuit includes back-side illuminated couplers arrange in a two-dimensional configuration, wherein each back-side illuminated coupler is configured to receive a light beam incident on the back side of the photonic integrated circuit or emit a light beam that exits the back side of the photonic integrated circuit. The photonic integrated circuit is mounted on the electronic amplification integrated circuit with the optically active side of the photonic integrated circuit facing towards the electronic amplification integrated circuit. The common substrate includes first signal lines configured to enable transmission of first electrical signals between the first integrated circuit and the converter integrated circuit, and second signal lines configured to enable transmission of second electrical signals between the converter integrated circuit and the analog electronic amplification integrated circuit.

In another general aspect, a method includes providing a common substrate having a first set of contacts, a second set of contacts, and a third set of contacts, wherein the common substrate includes at least one of a silicon interposer or a substrate using silicon bridges. The method includes mounting a first integrated circuit (IC) on the common substrate and electrically connecting a fourth set of contacts on the first IC to the first set of contacts on the common substrate; mounting a converter IC on the common substrate and electrically connecting a fifth set of contacts on the converter IC to the second set of contacts on the common substrate; and mounting an analog electronic amplification IC and a photonic integrated circuit on the common substrate and electrically connecting a sixth set of contacts on the analog electronic amplification IC to the third set of contacts on the common substrate. The photonic integrated circuit includes an optically active layer that includes active photonic components, wherein the photonic integrated circuit has an optically active side and a backside, at least some of the active photonic components are closer to the optically active side than the backside. The photonic integrated circuit includes back-side illuminated couplers arrange in a two-dimensional configuration, wherein each back-side illuminated coupler is configured to receive a light beam incident on the back side of the photonic integrated circuit or emit a light beam that exits the back side of the photonic integrated circuit. The photonic integrated circuit is mounted on the electronic amplification integrated circuit with the optically active side of the photonic integrated circuit facing towards the electronic amplification integrated circuit, and the active photonic components are electrically coupled to the common substrate through conductive vias in the electronic amplification integrated circuit.

In another general aspect, a method includes providing a common substrate; mounting a first integrated circuit (IC) on the common substrate; mounting a converter IC on the common substrate; and mounting an analog electronic amplification IC and a photonic integrated circuit on the common substrate, wherein the photonic integrated circuit is mounted on the electronic amplification integrated circuit. The photonic integrated circuit includes an optically active layer that includes active photonic components, wherein the photonic integrated circuit has an optically active side and a backside, and at least some of the active photonic components are closer to the optically active side than the backside. The photonic integrated circuit includes at least one back-side illuminated coupler configured to receive a light beam incident on the back side of the photonic integrated circuit or emit a light beam that exits the back side of the photonic integrated circuit. The photonic integrated circuit is mounted on the electronic amplification integrated circuit with the optically active side of the photonic integrated circuit facing towards the electronic amplification integrated circuit. The photonic integrated circuit includes a first substrate and a first layer formed on the first substrate, wherein the first substrate includes a first material having a first refractive index, and the first layer includes a second material having a second refractive index that is smaller than the first refractive index. The first substrate includes a first side and a second side, wherein the first side of the first substrate faces towards the first layer, and the second side of the first substrate forms or faces towards the backside of the photonic integrated circuit. The first layer is disposed between the first substrate and the optically active layer of the photonic integrated circuit. The method includes etching the first substrate to generate one or more openings that extend from the first side of the first substrate to the second side of the first substrate and exposing one or more portions of a surface of the first layer.

In another general aspect, a method includes providing a temporary wafer carrier, wherein a release tape is provided on the temporary wafer carrier. The method includes placing a first integrated circuit (IC) on the release tape; placing a converter IC on the release tape; and placing an analog electronic amplification IC and a photonic integrated circuit on the release tape, wherein the photonic integrated circuit is mounted on the electronic amplification integrated circuit. The method includes overmolding the first IC, the converter IC, the analog electronic amplification IC, the photonic IC, and at least a portion of the release tape with a molding compound. The method includes removing the temporary wafer carrier and the release tape from the first IC, the converter IC, the analog electronic amplification IC, and the molding compound. The method includes forming a redistribution layer that includes electrical contacts that are electrically connected to the first IC, the converter IC, and the analog electronic amplification IC.

In another general aspect, a method includes providing a temporary wafer carrier, wherein a release tape is provided on the temporary wafer carrier. The method includes forming a redistribution layer on the release tape, wherein the redistribution layer includes a first side and a second side, the first side of the redistribution layer faces the release tape. The method includes mounting a first integrated circuit (IC) on the second side of the redistribution layer, wherein electrical contacts on the first IC are mated with corresponding electrical contacts on the redistribution layer. The method includes mounting a converter IC on the second side of the redistribution layer, wherein electrical contacts on the converter IC are mated with corresponding electrical contacts on the redistribution layer. The method includes mounting an analog electronic amplification IC and a photonic integrated circuit on the second side of the redistribution layer, wherein the photonic integrated circuit is mounted on the electronic amplification integrated circuit, and electrical contacts on the analog electronic amplification IC are mated with corresponding electrical contacts on the redistribution layer. The method includes overmolding the first IC, the converter IC, the analog electronic amplification IC, the photonic IC, and at least a portion of the redistribution layer with a molding compound. The method includes removing the temporary wafer carrier and the release tape from the redistribution layer; and forming contact pads on the second side of the redistribution layer, wherein at least some of the contact pads are electrically coupled to the first IC, the converter IC, and the analog electronic amplification IC.

In another general aspect, a system includes: a common substrate; a first data processing device; a converter device; an analog electronic amplification device configured to amplify electrical signals; and a photonic device. The converter device is configured to convert signals between the first data processing device and the analog electronic amplification device. The analog electronic amplification circuit is configured to amplify electrical signals sent to or from the photonic device. The first data processing device is mounted on the common substrate. The photonic device includes an optically active layer that includes active photonic components, the photonic device has an optically active side and a backside, at least some of the active photonic components are closer to the optically active side than the backside. The photonic device includes back-side illuminated couplers arrange in a two-dimensional configuration, wherein each back-side illuminated coupler is configured to receive a light beam incident on the back side of the photonic device or emit a light beam that exits the back side of the photonic device. The photonic device is oriented such that the optically active side of the photonic integrated circuit faces in a direction towards the common substrate.

In another general aspect, a method includes: providing a common substrate; mounting a first data processing device on the common substrate; mounting, directly or indirectly, a converter device on the common substrate; and mounting, directly or indirectly, an analog electronic amplification device on the common substrate, wherein the analog electronic amplification device is configured to amplify electrical signals. The method includes mounting, directly or indirectly, a photonic device on the common substrate. The converter device is configured to convert signals between the first data processing device and the analog electronic amplification device. The analog electronic amplification circuit is configured to amplify electrical signals sent to or from the photonic device. The first data processing device is mounted on the common substrate. The photonic device includes an optically active layer that includes active photonic components, wherein the photonic device has an optically active side and a backside, and at least some of the active photonic components are closer to the optically active side than the backside. The photonic device includes back-side illuminated couplers arrange in a two-dimensional configuration, wherein each back-side illuminated coupler is configured to receive a light beam incident on the back side of the photonic device or emit a light beam that exits the back side of the photonic device. The method includes orienting the photonic device such that the optically active side of the photonic integrated circuit faces in a direction towards the common substrate.

In another general aspect, a system includes: a common substrate; a first integrated circuit configured to processes data; a converter integrated circuit; an analog electronic amplification integrated circuit configured to amplify electrical signals; and a photonic integrated circuit. The first integrated circuit, the converter integrated circuit, the analog electronic amplification integrated circuit, and the photonic integrated circuit are mounted on the common substrate. The common substrate includes at least one of an organic substrate, a ceramic substrate, a silicon interposer, a substrate using silicon bridges, or a substrate made in a fan-out wafer-level packaging (FoWLP) process. The photonic integrated circuit includes an optically active layer that includes active photonic components, wherein the photonic integrated circuit has an optically active side and a backside, and at least some of the active photonic components are closer to the optically active side than the backside. The photonic integrated circuit includes back-side illuminated couplers arrange in a two-dimensional configuration, wherein each back-side illuminated coupler is configured to receive a light beam incident on the back side of the photonic integrated circuit or emit a light beam that exits the back side of the photonic integrated circuit. The optically active side of the photonic integrated circuit faces towards the common substrate. The common substrate includes first signal lines configured to enable transmission of electrical signals between the first integrated circuit and the converter integrated circuit, second signal lines configured to enable transmission of second electrical signals between the converter integrated circuit and the analog electronic amplification integrated circuit, and third signal lines configured to enable transmission of third electrical signals between the analog electronic amplification integrated circuit and the photonic integrated circuit.

In another general aspect, an apparatus includes an optical input/output chiplet interfacing to an electronic chiplet in a pitch-matched manner, wherein the optical input/output chiplet is configured to be vertically optically coupled to a 2D array of optical fiber cores.

Other aspects include other combinations of the features recited above and other features, expressed as methods, apparatus, systems, program products, and in other ways.

Particular embodiments of the subject matter described in this specification can be implemented to realize one or more of the following advantages. The data processing system has a high data throughput, a small footprint, high power efficiency, a low construction cost, and a low operation cost.

The details of one or more embodiments of the subject matter described in this specification are set forth in the accompanying drawings and the description below. Other features, aspects, and advantages of the invention will become apparent from the description, the drawings, and the claims.

Unless otherwise defined, all technical and scientific terms used herein have the same meaning as commonly understood by one of ordinary skill in the art to which this invention belongs. In case of conflict with patent applications or patent application publications incorporated herein by reference, the present specification, including definitions, will control.

BRIEF DESCRIPTION OF DRAWINGS

FIG. 41 is a top view diagram of an example of an application specific integrated circuit.

FIG. 42 shows a table that includes information about various parameters for various types of input/output interfaces.

DETAILED DESCRIPTION

Figure 1A:
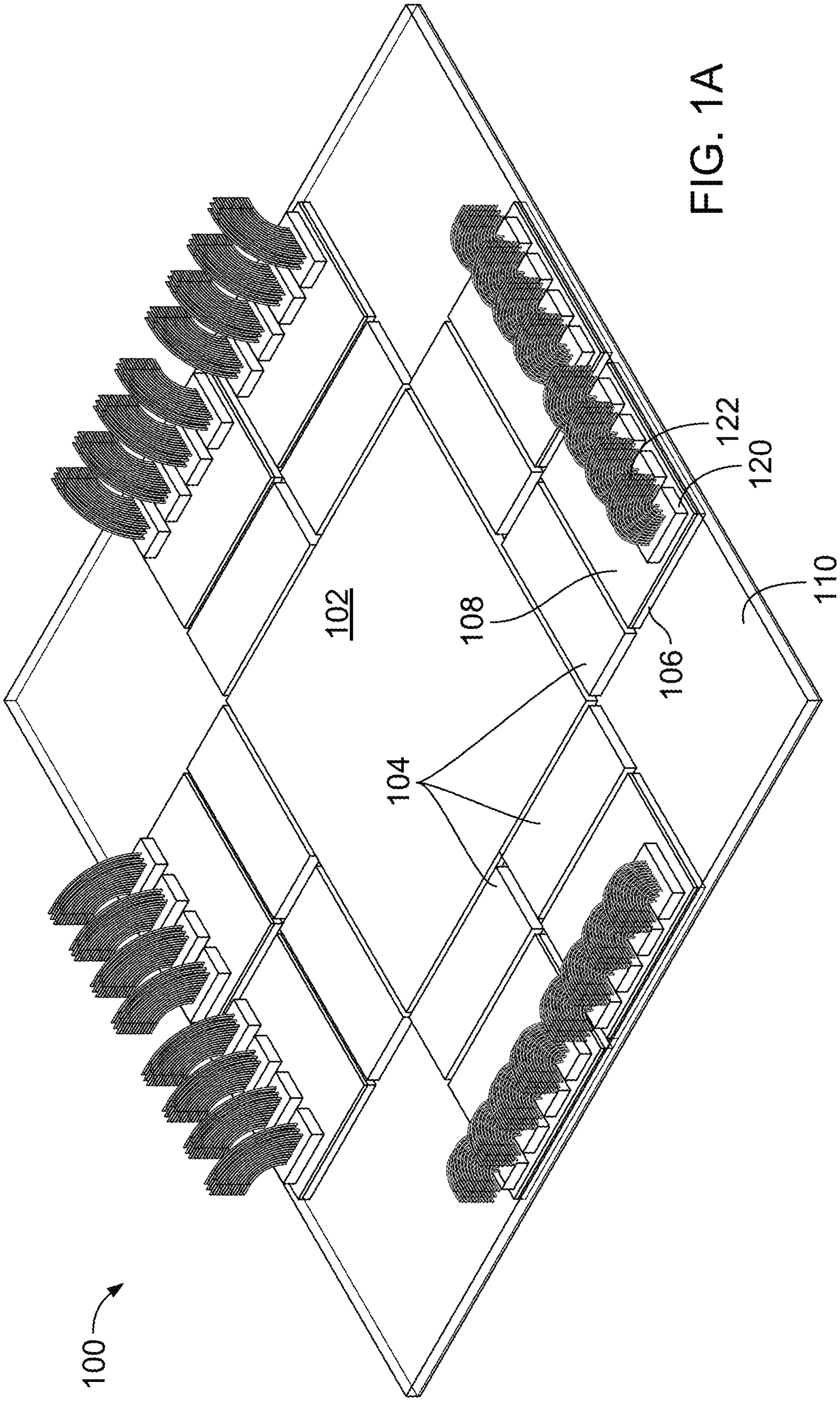
FIG. 1A is a perspective view of an example of a semiconductor package without molding compound.

This document describes novel systems that combine electronic chiplets with photonic chiplets to enable high bandwidth data processing. Also described are novel processes for manufacturing the novel systems for high bandwidth data processing. In some implementations, the system includes a semiconductor package that has a data processing chiplet that processes data, and a photonic chiplet that performs conversion between optical signals and electrical signals. The photonic chiplet includes optoelectronic components for converting electrical signals from the data processing chiplet to output optical signals that are transmitted to an external optical link (e.g., a fiber optic cable having one or more optical fibers and/or one or more fiber cores), and for converting input optical signals from the external optical link to electrical signals that are forwarded to the data processing chiplet for further processing. In some examples, the data processor chiplet is designed to transmit or receive lower speed parallel electrical signals, and the photonic chiplet is designed to receive or transmit higher speed serial electrical signals. In some examples, a converter chiplet is provided as an interface between the data processing chiplet and the photonic chiplet. The converter chiplet enables the data processing chiplet and the photonic chiplet, which can have different communication capabilities and comply with different interface specifications, to communicate with each other to achieve high bandwidth data processing. The semiconductor package can have more than one data processing chiplet, more than one photonic chiplet, more than one electronic amplification chiplet, and/or more than one converter chiplet. Two or more of the photonic chiplet, the electronic amplification chiplet, the converter chiplet, and the data processing chiplet can be integrated into a monolithic chiplet.

A chiplet can be a semiconductor die or a die stack (i.e., a stack of semiconductor dies). The semiconductor die can include a semiconductor substrate made of one or more semiconducting materials, such as silicon, silicon carbide (SiC), gallium arsenide, aluminum gallium arsenide, or gallium-nitride (GaN). Electrical components and/or optical components can be formed on the semiconductor substrate. In some examples, an individual semiconductor die can have a length and a width (forming the main plane) that are both at least 5 times larger than its height (measured perpendicular to the main plane). In some examples, the chiplet can have multiple dies stacked in the vertical direction such that the height of the chiplet is greater than its width (measured along the main plane of the individual die). As described in more detail below, in some implementations, components are formed or mounted on a semiconductor wafer, the wafer is processed to produce multiple dies in parallel, then the wafer is cut or diced to produce multiple individual dies. In some examples, a chiplet includes an individual die after the wafer is cut. In some examples, a chiplet includes a stack of multiple dies of the same type. In some examples, a chiplet includes a stack of multiple dies of two or more different types. Sometimes a device having a stack of semiconductor dies (of the same type or different types) can be considered as having a chiplet having a die stack, or having a stack of chiplets. In some examples, a chiplet can have other non-chiplet structures permanently attached to it, such as micro-optics components (e.g., lenses, birefringent elements, or optical connector receptacles and mechanical support structures thereof).

This document describes several techniques for combining one or more photonic chiplets and one or more data processing chiplets into a single package that is capable of processing a large amount of data, e.g., having a data processing bandwidth of 1 Tbps, 10 Tbps, 100 Tbps, or more. Several types of photonic chiplets, electronic amplification chiplets, converter chiplets, and data processing chiplets can be used. In some examples, the photonic chiplet uses front-side illumination. In some examples, the photonic chiplet uses back-side illumination. In some examples, the photonic chiplet has openings etched in the back side of the chiplet. In some examples, the photonic chiplet has an optically active layer closer to the side that the optical fibers are attached to. In some examples, the photonic chiplet has an optically active layer closer to the opposite side that the optical fibers are attached to. In some examples, the photonic chiplet has conductive through-vias that electrically couple the optically active layer to the other side of the photonic chiplet. In some examples, the photonic chiplet has conductive through-vias for electrically coupling one or more components (e.g., one or more other chiplets or substrates attached above or below the photonic chiplet) to one or more components (e.g., one or more other chiplets or substrates) attached below or above the photonic chiplet. In some examples, the photonic chiplet does not have conductive through-vias. In some examples, the photonic chiplet is designed to convert optical signals to electrical signals. In some examples, the photonic chiplet is designed to convert electrical signals to optical signals. In some examples, the photonic chiplet is designed to perform both optical-to-electrical signal conversions and electrical-to-optical signal conversions. In some examples, the photonic chiplet processes signals having a single wavelength. In some examples, the photonic chiplet processes signals having multiple wavelengths.

In some examples, the photonic chiplet has optical couplers (e.g., grating couplers) arranged in a one-dimensional configuration, such as arranged along a line, a curve, or a row. In some examples, the photonic chiplet has optical couplers arranged in a two-dimensional configuration. In some examples, the photonic chiplet has optical couplers arranged in a regular array having rows and columns. In some examples, the photonic chiplet has optical couplers arranged in an arbitrary two-dimensional pattern.

In some examples, a fiber optic connector is attached to the photonic chiplet, in which the fiber optic connector is connected to a fiber optic cable having multiple optical fibers and/or multiple fiber cores. The fiber optic connector has fiber ports that are optically coupled to the optical fibers and/or fiber cores. In some examples, the fiber optic connector has fiber ports that are arranged in a one-dimensional configuration, such as arranged along a line, a curve, or a row. In some examples, the fiber optic connector has fiber ports arranged in a two-dimensional configuration. In some examples, the fiber optic connector has fiber ports arranged in a regular array having rows and columns. In some examples, the fiber optic connector has fiber ports arranged in an arbitrary two-dimensional pattern. In some examples, the fiber optic connector includes optics to transform a two-dimensional arrangement of light beams emitted from fiber ports arranged in a two-dimensional configuration to a one-dimensional arrangement of light beams that are directed toward optical couplers that are arranged in a one-dimensional configuration. In some examples, the fiber optic connector includes optics to transform a one-dimensional arrangement of light beams emitted from fiber ports arranged in a one-dimensional configuration to a two-dimensional arrangement of light beams that are directed toward optical couplers that are arranged in a two-dimensional configuration. In some examples, the photonic chiplet is coupled to optical fibers or fiber cores using edge coupling.

Some electronic amplification chiplets have electrically active layers on the top side (e.g., facing a direction away from the common substrate), and some electronic amplification chiplets have electrically active layers on the bottom side (e.g., facing a direction towards the common substrate). Some electronic amplification chiplets have conductive through-vias that electrically couple the electrically active layer to the other side of the chiplets, and some electronic amplification chiplets do not have such conductive through-vias. The electronic amplification chiplets can be configured to communicate with other electronic devices using any of a variety of interface specifications, such as BoW (bunch of wires) specification, AIB (advanced interface bus) specification, UCIe (universal chiplet interconnect express) specification, XLR (extra long reach) channel/equalizer specification, LR (long reach) channel/equalizer specification, MR (medium reach) channel/equalizer specification, SR (short reach) channel/equalizer specification, VSR (very short reach) channel/equalizer specification, XSR (extra short reach) channel/equalizer specification, USR (ultra short reach) channel/equalizer specification, or XSR+ channel/equalizer specification.

Information about the BoW specification can be found in, e.g., "Bunch of Wires (BoW) PHY Specification," DRAFT Version 2.0, Mar. 1, 2023, available from the Open Computer Project at the web address "https://www.opencompute-.org/documents/bow-specification-v2-0d-1-pdf". Information about the AIB specification can be found in, e.g., the white paper "Accelerating Innovation Through A Standard Chiplet Interface: The Advanced Interface Bus (AIB)," by David Kehlet, Intel, available at the web address "https://www.intel.com/content/dam/www/public/us/en/documents/white-papers/accelerating-innovation-through-aib-whitepaper.pdf". Information about the UCIe specification can be found in, e.g., "Universal Chiplet Interconnect Express (UCIe) Specification," Revision 1.0, Feb. 24, 2022, available at the web address "https://www.uciexpress.org/specifications".

Information about the XLR interface can be found in, e.g., the article available at the web address: "https://www.oiforum.com/wp-content/uploads/OIF_PLL_Demo_Alphawave_ECOC22.pdf". An interface that complies with the XLR interface refers to a fast-and-serial interface that is supported by a SerDes capable of transmitting/receiving signals of at least 50 Gbps, 100 Gbps, or 200 Gbps. The SerDes is capable of equalizing electrical channels with a roll-off at the Nyquist frequency of at least 10 dB, 15 dB, 20 dB, 25 dB, 30 dB, 35 dB, or 40 dB. The SerDes incorporates at least one of a feed-forward equalizer (FFE), a decision feedback equalizer (DFE), or a maximum-likelihood sequence detector (MHLSD). Information about the LR, MR, VSR, ESR, and USR specifications can be found in, e.g., the article "OIF's CEI 56G Interfaces—Key Building Blocks for Optics in the 400G Data Center" by Ed Frlan, OIF Optical Internetworking Forum, available at the web address "https://www.oiforum.com/wp-content/uploads/2019/01/150928_Mkt-Focus-ECOC-Panel-OIF.pdf", and the article "112 Gbps Electrical Interfaces: Does rate drive architecture or does architecture enable rate?" by Nathan Tracy, Technologist, available at the web address: "https://harrisburg.psu.edu/files/pdf/16546/2019/04/24/te_connectivity_at_psu_hburg_si_sym posium.pdf". For example, information about the LR specification can be found in, e.g., the CEI-56G-LR and CEI-112G-LR specifications. Information about the MR specification can be found in, e.g., the CEI-56G-MR and CEI-112G-MR specifications. Information about the VSR specification can be found in, e.g., the CEI-56G-VSR and CEI-112G-VSR specifications. Information about the XSR specification can be found in, e.g., the CEI-56G-XSR and CEI-112G-XSR specifications. Information about the USR specification can be found in, e.g., the CEI-56G-USR and CEI-112G-USR specifications. Information about the SR specification can be found in, e.g., "CEI-28G-SR Electrical Specification" and the article "CEI-28G: Paving the Way for 100 Gigabit" by John D'Ambrosia et al., Optical Internetworking Forum, available at the web address "https://www.ethemetalliance.org/wp-content/uploads/2011/10/document_files_CEI-28G_rev8.pdf". Information about the XSR+ specification can be found in, e.g., the article "OIF launches CEI-112G-Extra Short Reach (XSR)+ project" and other information published by the CEI-112G-Extra Short Reach (XSR)+ project. Several examples of interfaces (e.g., BoW, AIB, UCIe, XLR, LR, MR, SR, VSR, XSR, USR, XSR, XSR+) have been mentioned above. It is understood that the invention is not limited to those particular standards. For example, in addition to the 28G, 56G, and 112G examples mentioned above, the semiconductor packages described in this document can also be implemented to cover 100G to 400G or higher data rates.

In this document, the terms relating to orientation, relative position, or relative direction, such as "top," "bottom," "up," "down," "left," "right," "upper," or "lower," refer to those shown in the figures. It is understood that the systems, apparatuses, devices, packages, or modules described in this document can be operated in any orientation or position.

Some converter chiplets have electrically active layers on the top side, and some converter chiplets have electrically active layers on the bottom side. Some converter chiplets have conductive through-vias that electrically couple the electrically active layer to the other side of the chiplets, and some converter chiplets do not have such conductive through-vias. The converter chiplets are configured to convert electrical signals from a first interface to electrical signals at a second interface. Each of the first interface and the second interface can comply with any of a variety of interface specifications, such as BoW, AIB, UCIe, XLR, LR, MR, SR, VSR, XSR, USR, or XSR+ specification. For some converters, the first interface and the second interface comply with the same interface specification. For some converters, the first interface and the second interface comply with different interface specifications.

The data processing chiplets are configured to communicate with other electrical components using any of a variety of interface specifications, such as BoW, AIB, UCIe, XLR, LR, MR, SR, VSR, XSR, USR, or XSR+ specification.

There are many ways to electrically couple the photonic chiplet, the electronic amplification chiplet, the converter chiplet, and the data processing chiplet. In general, the photonic chiplet, the electronic amplification chiplet, the converter chiplet, and the data processing chiplet are directly or indirectly mounted on a common substrate. In general, a first set of signals travel in the direction from the data processing chiplet to the converter chiplet, to the electronic amplification chiplet, and to the photonic chiplet. In general, a second set of signals travel in the direction from the photonic chiplet to the electronic amplification chiplet, to the converter chiplet, and to the data processing chiplet. The signals can travel through conductive signal lines or traces in the common substrate or an intermediate substrate, such as an interposer. The signals can travel through conductive through-vias in the converter chiplet, the electronic amplification chiplet, the photonic chiplet, a dummy chiplet, an intermediate substrate, or any combination of the above. The signals can travel through the conductive through-vias in the upward direction or the downward direction.

In some examples, each of the photonic chiplet, the electronic amplification chiplet, the converter chiplet, and the data processing chiplet is directly mounted on the common substrate. In some examples, two or more chiplets can be stacked together. In some examples, the photonic chiplet is mounted on the electronic amplification chiplet, and the electronic amplification chiplet is mounted on the common substrate. In some examples, the photonic chiplet is mounted on the electronic amplification chiplet, the electronic amplification chiplet is mounted on the converter chiplet, and the converter chiplet is mounted on the common substrate. In some examples, the electronic amplification chiplet is mounted on the photonic chiplet, and the photonic chiplet is mounted on the common substrate. In some examples, the electronic amplification chiplet is mounted on the photonic chiplet, the photonic chiplet is mounted on the converter chiplet, and the converter chiplet is mounted on the common substrate. In some examples, the electronic amplification chiplet is mounted on the converter chiplet, and the converter chiplet is mounted on the common substrate. In some examples, the electronic amplification chiplet is mounted on the converter chiplet, the converter chiplet is mounted on the photonic chiplet, and the photonic chiplet is mounted on the common substrate. In some examples, the converter chiplet is mounted on the electronic amplification chiplet, and the electronic amplification chiplet is mounted on the common substrate. In some examples, the converter chiplet is mounted on the electronic amplification chiplet, the electronic amplification chiplet is mounted on the photonic chiplet, and the photonic chiplet is mounted on the common substrate. In some examples, the signals travel in the upward direction through the conductive through-vias of two or more chiplets stacked together. In some examples, the signals travel in the downward direction through the conductive through-vias of two or more chiplets stacked together.

In some examples, a chiplet can be mounted partially on a first chiplet and partially on a second chiplet. In some examples, the photonic chiplet is mounted partially on the electronic amplification chiplet and partially on the converter chiplet. In some examples, the electronic amplification chiplet is mounted partially on the photonic chiplet and partially on the converter chiplet. In some examples, the converter chiplet is mounted partially on the photonic chiplet and partially on the electronic amplification chiplet. In some examples, the photonic chiplet is mounted partially on the electronic amplification chiplet and partially on a second substrate (e.g., an interposer or a dummy chiplet) that has conductive through-vias. In some examples, the electronic amplification chiplet is mounted partially on the photonic chiplet and partially on a second substrate that has conductive through-vias. In some examples, the converter chiplet is mounted partially on the photonic chiplet and partially on a second substrate that has conductive through-vias.

Two or more of the chiplets can be integrated into a monolithic chiplet. In some examples, the photonic chiplet and the electronic amplification chiplet are combined in a single monolithic chiplet. In some examples, the electronic amplification chiplet and the converter chiplet are combined in a monolithic chiplet. In some examples, the photonic chiplet, the electronic amplification chiplet, and the converter chiplet are combined in a monolithic chiplet. In some examples, the data processing chiplet and the converter chiplet are combined in a monolithic chiplet. In some examples, the data processing chiplet, the converter chiplet, and the electronic amplification chiplet are combined in a monolithic chiplet.

Any combination of the chiplets can be mounted on, or partially on, an intermediate substrate, an interposer, or a dummy chiplet. The interposer can have coarse-pitch conductive through-vias and fine-pitch conductive through-vias.

One or more of the chiplets can be mounted in one or more cavities, one or more through-holes, one or more partial through-holes, or any combination of the above, in the common substrate.

Various types of package substrates can be used, such as silicon interposers, substrates that use silicon bridges, and substrates that are made in a fan-out wafer-level packaging (FoWLP) process. In some examples, the semiconductor package is overmolded using a molding compound to enhance the structural strength of the package.

When photonic chiplets are mass produced, the configurations of the photonic chiplets are sometimes subject to limitations of the manufacturing process. For example, some manufacturing processes do not provide conductive vias in the substrates of the photonic chiplets. In that case, the vertical grating couplers used to couple light beams from or to external optical fibers, and electrical contacts used to transmit or receive electrical signals, are located in or near the same active layer near one surface (i.e., top surface or bottom surface) of the photonic chiplet. If such a photonic chiplet were flip-chip mounted to a common substrate so that the electrical contacts of the photonic sublet can be electrically coupled to electrical contacts on the common substrate, the vertical grating couplers would be facing the common substrate and may not be able to receive or transmit light to the external optical fibers. If such a photonic chiplet were mounted on the common substrate with the vertical grating couplers facing upwards and be able to receive or transmit light to the external optical fibers, then the electrical contacts on the top side on the photonic chiplet would not be able to be electrically connected to the electrical contacts on the common substrate since there are no conductive vias in the substrate of the photonic chiplet. The following sections describe various techniques for overcoming these problems.

The sections below describe examples of systems that include semiconductor packages each including electronic and photonic chiplets. Each semiconductor package includes a first chiplet that includes a data processing module, and at least a second chiplet that includes a photonic module. In some examples, the semiconductor package includes a first chiplet that includes a data processing module, and a second chiplet that includes a photonic module, an electronics amplification module, and a converter module. In some examples, the semiconductor package includes a first chiplet that includes a data processing module, a second chiplet that includes a photonic module and an electronics amplification module, and a third chiplet that includes a converter module. In some examples, the semiconductor package includes a first chiplet that includes a data processing module, a second chiplet that includes a photonic module, and a third chiplet that includes a converter module and an electronics amplification module. In some examples, the semiconductor package includes a first chiplet that includes a data processing module, a second chiplet that includes a photonic module, a third chiplet that includes a converter module, and a fourth chiplet that includes an electronics amplification module. In some examples, the semiconductor package includes a first chiplet that includes a data processing module and a converter module, a second chiplet that includes a photonic module, and a fourth chiplet that includes an electronics amplification module. In some examples, the semiconductor package includes a first chiplet that includes a data processing module, a converter module, and an electronic amplification module, and a second chiplet that includes a photonic module. The same principles for combining electronic chiplets and photonic chiplets can be applied to a semiconductor package that includes two or more first chiplets that include two or more data processing modules and two or more second chiplets that include any of various combinations of two or more photonic modules, two or more electronic amplification modules, or two or more converter modules.

In some implementations, a semiconductor package has electronic and photonic chiplets, and each chiplet includes a semiconductor die and various components formed on or in the semiconductor die. The chiplets are made as follows. Components are formed or mounted on a wafer, then the wafer is processed to produce multiple chiplets on the wafer in parallel. The wafer is cut or diced to produce multiple individual chiplets. Multiple types of chiplets are produced using the above process. Different chiplets can be manufactured using different semiconductor fabrication processes, or different process nodes. Two or more chiplets (some of which can have different functions) are mounted on a common substrate or an interposer, and a protective covering (e.g., overmolding or casing), electrical contacts, and/or optical fiber connectors are added to form a semiconductor package.

The data processing chiplet can include any type of data processing circuitry, either analog or digital or both. For example, the data processing chiplet can include a network switch, a central processing unit, a graphics processor unit, a tensor processing unit, a digital signal processor, an application specific integrated circuit (ASIC), or a storage device (e.g., solid state memory device).

For example, a network switch can include an Ethernet switch chip, an IP routing chip, a PCIe switch chip, a CXL switch chip, an Infiniband switch, or any other chip that is designed to switch packets from one or more input ports to one or more output ports using one or more packet switching/routing protocols. The network switch can include millions, tens of millions, hundreds of millions, billions, tens of billions, hundreds of billions, or trillions of transistors. The network switch can have a data throughput of 1 Gbps, 10 Gbps, 100 Gbps, 1 Tbps, or more. Examples of the Ethernet switch chips include StrataXGS® Tomahawk BCM56960 switch series, available from Broadcom, San Jose, California. Examples of IP routing chips include FP5 network processor, available from Nokia, Espoo, Finland, and Silicon One P100 processor, available from Cisco, San Jose, California. Examples of the PCI Express switch chips include PEX 87xx series switch chips, available from Broadcom, and XC50256 CXL2.0/PCIe5.0 switch chip, available from XConn Technologies, San Jose, California. Examples of Infiniband switch chips include switch chips used in NDR 400 Gb/s InfiniBand switches, Quantum InfiniBand switches, and EDR 100 Gb/s InfiniBand switches, available from NVIDIA, Santa Clara, California.

For example, a central processing unit can include one or more CPU cores. Each CPU core can include, e.g., a control unit, an arithmetic logic unit (ALU), registers (e.g., input registers, output registers, data registers, address registers, program counter), cache (e.g., L1 cache, L2 cache, L3 cache), buses (e.g., data bus and control bus), a memory management unit, and a clock. The central processing unit can be configured to execute instructions and process data. For example, the central processing unit can be based on the OpenRISC architecture, the SPARC architecture, the Advanced RISC Machine (ARM) architecture, or the RISC-V architecture. RISC is an acronym for Reduced Instruction Set Computer. The central processing unit can include millions, tens of millions, hundreds of millions, billions, tens of billions, hundreds of billions, or trillions of transistors. The central processing unit can have a data throughput of 1 Gbps, 10 Gbps, 100 Gbps, 1 Tbps, or more. Examples of the central processing units include Core i9, i7, and X-series processors, and Xeon processors, available from Intel, Santa Clara, California, EPYC™ processors, available from AMD, Folsom, California, and Cortex-A7xx and -A5xx series processors, available from ARM, Cambridge, United Kingdom.

For example, a graphics processor unit can include, e.g., a graphics and compute array that includes stream processors, CUDA cores, texture mapping units, render output units, and geometry processors. The graphics processor unit can include, e.g., graphics memory (e.g., VRAM, DDR, GDDR, HBM), a graphics memory controller, a bus interface, a power management unit, a video processing unit, and a display interface. The graphics processing unit can be configured to, e.g., accelerate computer graphics and image processing, perform parallel processing of data, and train neural networks. The graphics processing unit can include millions, tens of millions, hundreds of millions, billions, tens of billions, hundreds of billions, or trillions of transistors. The graphics processing unit can have a data throughput of 1 Gbps, 10 Gbps, 100 Gbps, 1 Tbps, or more. Examples of the graphics processing units include L4, L40, H100, A100, Quadro series, and RTX series GPUs, available from NVIDIA.

For example, a tensor processing unit can include an artificial intelligence (AI) accelerator optimized for training and inference of large AI models and various neural networks. Tensor processing units are available from Google, Mountain View, California.

For example, a digital signal processor can be tailored to do specific digital signal processing functions. For example, the digital signal processor can process digital samples of signals at gigabits, tens of gigabits, or hundreds of gigabits per second. Examples of the digital signal processors include DRA7xx series chips, available from Texas Instruments, Dallas, Texas, PSE-V family of chips from Nokia, WaveLogic™ 6 family of chips, available from Ciena, Hanover, Maryland, and PAM4 DSP family of chips, available from Marvell, Santa Clara, California.

For example, the graphics processing units, central processing units, switch chips, and digital signal processors can be implemented as application specific integrated circuits (ASICs). The ASIC can include millions, tens of millions, hundreds of millions, billions, or tens of billions of transistors. For example, a first portion of the ASIC can function as general compute processing cores, a second portion of the ASIC can function as graphics processing cores, a third portion of the ASIC can function as neural engine cores, and a fourth portion of the ASIC can function as a memory storage.

For example, the data processing chiplet can include one or more field-programmable gate arrays (FPGAs) that have different portions that are configured to perform various functions through reconfigurable programming steps. The FPGA devices can have, e.g., millions, tens of millions, hundreds of millions, billions, and tens of billions of transistors. Examples of FPGAs include Versal Adaptive SoC chips, available from AMD, and Agilex® 9, 7, 5, and 3 FPGA family of chips, available from Intel.

For example, a storage device can include a memory controller that controls access of data in semiconductor cells. The storage device can include a volatile storage device, such as a dynamic random access memory (DRAM) device, or a non-volatile storage device, such as a solid state drive that includes single level cells (SLC), multi-level cells (MLC), triple-level cells (TLC), or quad-level cells (QLC). For example, the DRAM device can have a storage capacity of hundreds of gigabytes, or several tera bytes. For example, the solid state drive can have a storage capacity of tens or hundreds of tera bytes. For example, DRAM chips and solid state drive chips are available from Micron, Boise, Idaho.

The data processing chiplet can include two or more of network switches, central processing units, graphics processing units, tensor processing units, digital signal processors, application specific integrated circuits, or storage devices.

In the examples in which the semiconductor package includes a photonic chiplet that has a two-dimensional arrangement of optical couplers optically coupled to a two-dimensional arrangement of optical fibers, the semiconductor package can have a greater data bandwidth as compared to a semiconductor package that uses edge coupling to couple to a one-dimensional arrangement (e.g., row) of optical fibers (e.g., a fiber ribbon).

In some implementations, a semiconductor package includes an electronic data processing chiplet, which includes a data processing module that has a high bandwidth data processing capability (e.g., 1, 10, 100, or more terabits or teraflops per second). One or more photonic modules function as high bandwidth interfaces to external optical links, which can include bundles of optical fibers. Each photonic module includes a two-dimensional arrangement of optical couplers, e.g., 2D array of vertical grating couplers, that couple to a corresponding two-dimensional arrangement of optical fibers. In some examples, each photonic module is associated with an electronic amplification module for driving the electrical signals transmitted to and from the photonic module. One or more converter modules provide conversion between signals transmitted from and to the data processing module, and signals transmitted to and from the electronic amplification module.

There are several configurations for the design of chiplets that include the photonic modules, the electronic amplification modules, and the converter modules. In some examples, three chiplets are used, in which a photonic chiplet includes the photonic module, an electronic amplification chiplet includes the electronic amplification module, and a converter chiplet includes the converter module. In some examples, two chiplets are used, in which the photonic chiplet and the electronic amplification module are integrated in a single monolithic chiplet, and a separate converter chiplet includes the converter module. In some examples, the converter module and the electronic amplification module are integrated in a single monolithic chiplet, and a separate photonic chiplet includes the photonic module. In some examples, the photonic module, the amplification module, and the converter module are integrated in a single monolithic chiplet.

There are several configurations for mounting the chiplets on a common substrate. In some examples, the data processing chiplet is mounted directly on the common substrate. In some examples, the photonic chiplet, the electronic amplification chiplet, and the converter chiplet are each mounted directly on the common substrate. In some examples, the converter chiplet is mounted directly on the common substrate, the photonic chiplet is mounted on the electronic amplification chiplet, and the electronic amplification chiplet is mounted directly on the common substrate. In some examples, the photonic chiplet is mounted on the electronic amplification chiplet, the electronic amplification chiplet is mounted on the converter chiplet, and the converter chiplet is mounted directly on the common substrate. In some examples, the photonic module and the electronic amplification module are integrated in a single chiplet directly mounted on the common substrate. In some examples, the electronic amplification module and the converter module are integrated in a single chiplet directly mounted on the common substrate. In some examples, the photonic chiplet is mounted on the chiplet that includes the electronic amplification module and the converter module. In some examples, the chiplet that includes the photonic module and the electronic amplification module is mounted on the converter chiplet, and the converter chiplet is mounted directly on the common substrate.

The photonic module and the data processing module can be designed independently of each other, allowing more flexibility in designing the overall system. In some implementations, the photonic module and its associated electronic amplification module are designed to transmit and receive electrical signals in a manner that complies with a first interface specification, and the data processing module is designed to receive and transmit electrical signals in a manner that complies with a second interface specification. The converter module enables the data processing module to transmit electrical signals to, and receive electrical signals from, the photonic module.

In some examples, a photonic integrated circuit uses edge coupling techniques to couple to optical fibers. The number of optical fibers that can be coupled to the photonic integrated circuit is limited by the overall length of the side edges available for coupling to the optical fibers. Sometimes only one side edge of the photonic integrated circuit is available for coupling to the optical fibers because the other edges face adjacent integrated circuits and do not have additional space to accommodate the optical fibers. The problem is overcome by the novel systems described in this document by using a photonic chiplet that has a two-dimensional arrangement of optical couplers for interfacing with a corresponding two-dimensional arrangement of optical fibers to increase the number of optical fibers that can be coupled to the photonic chiplet, thereby increasing the input/output bandwidth for the overall package.

Figure 1B:
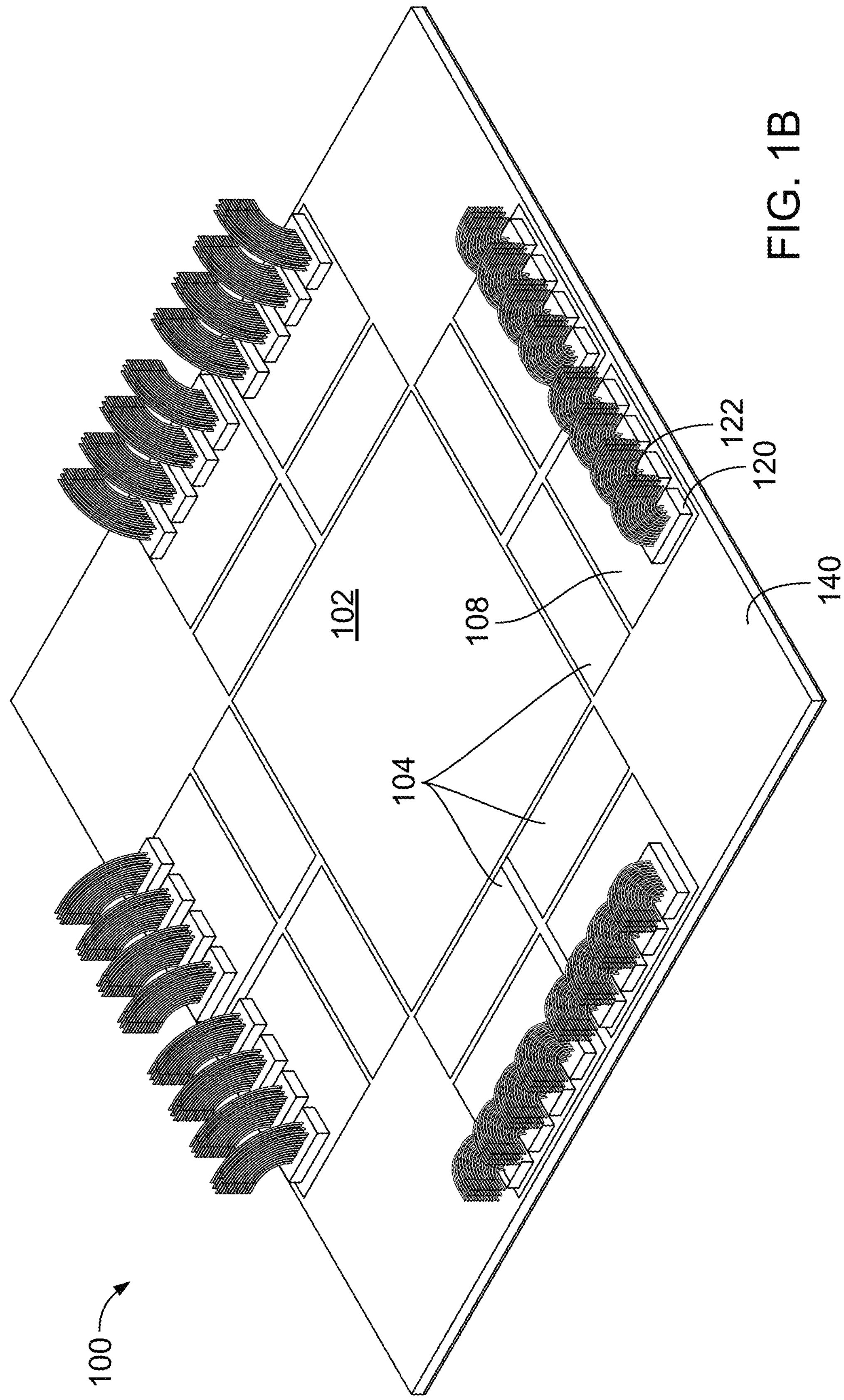
FIG. 1B is a perspective view of an example of the semiconductor package with molding compound.
Figure 1C:
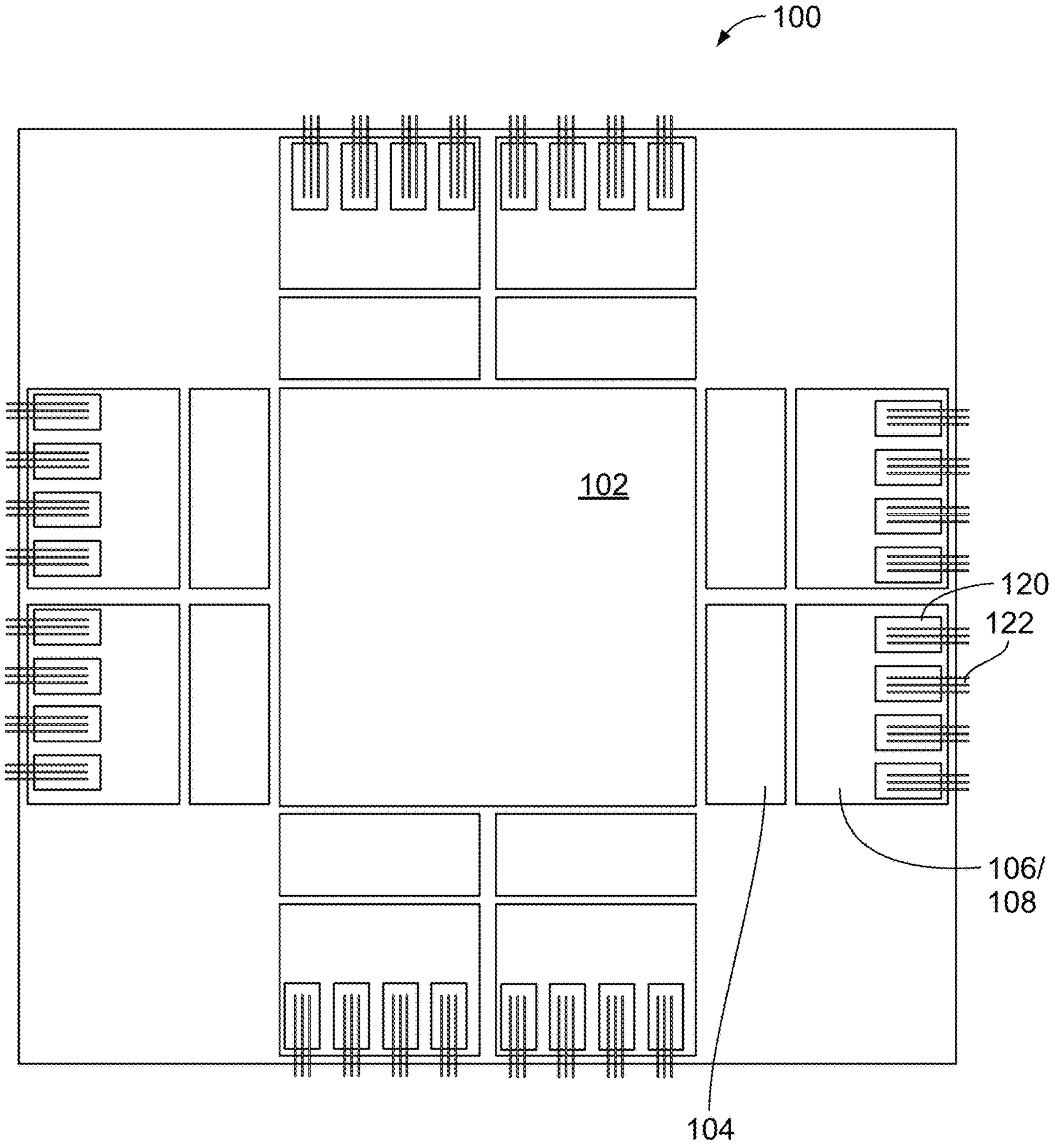
FIGS. 1C and 1D are top views of examples of the semiconductor package with molding compound.
Figure 1D:
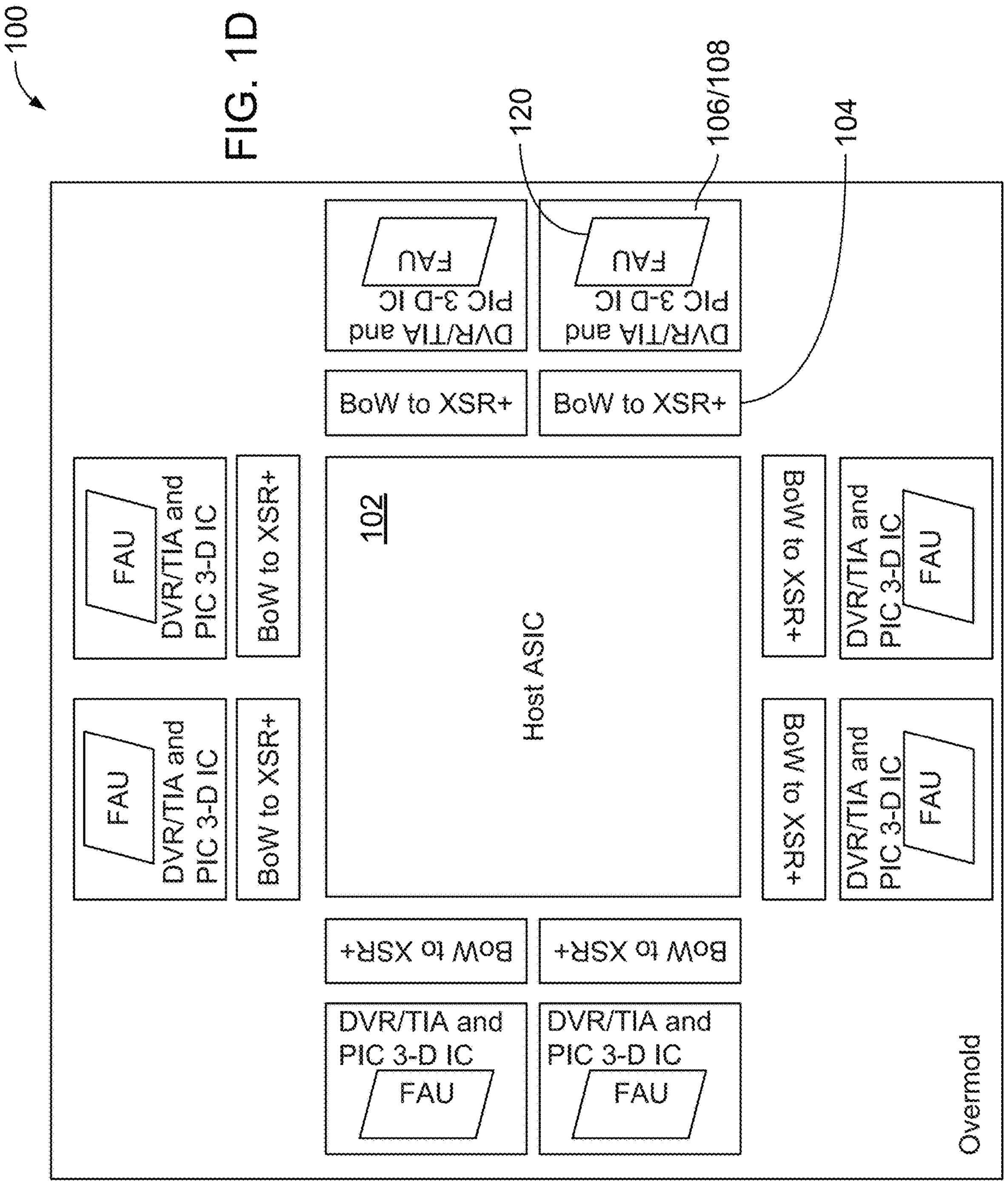
Figure 1E:
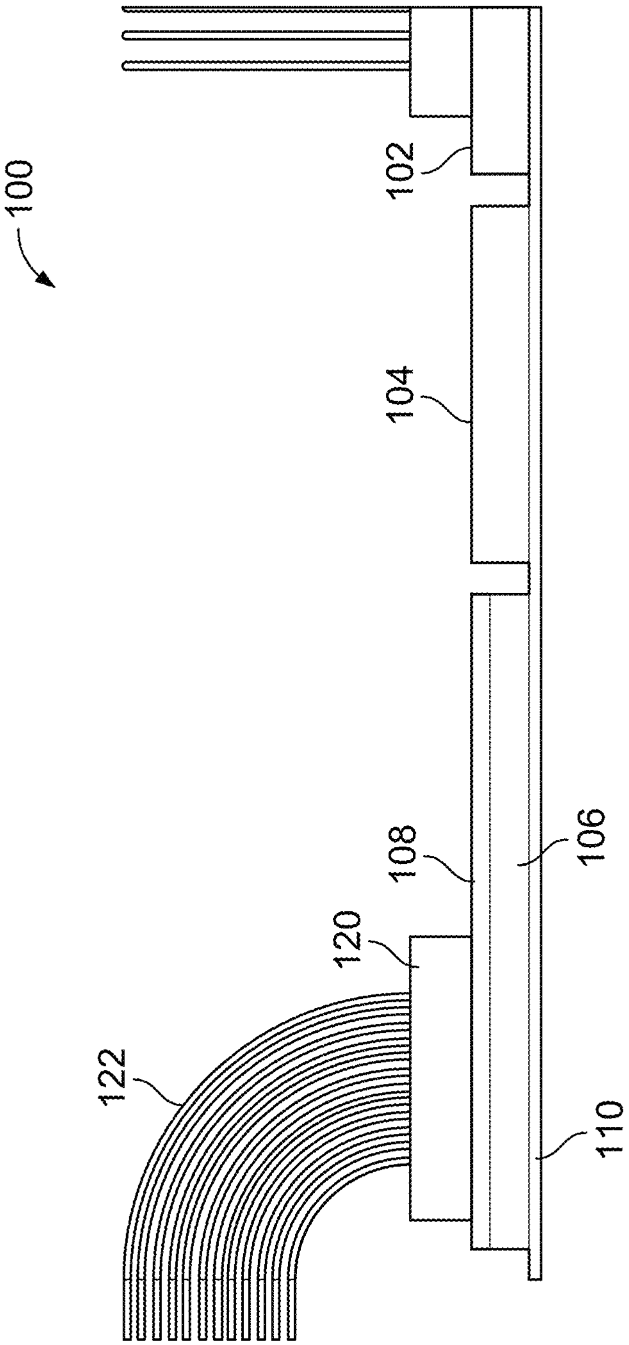
FIG. 1E is a side view of a portion an example of the semiconductor package without molding compound.
Figure 1F:
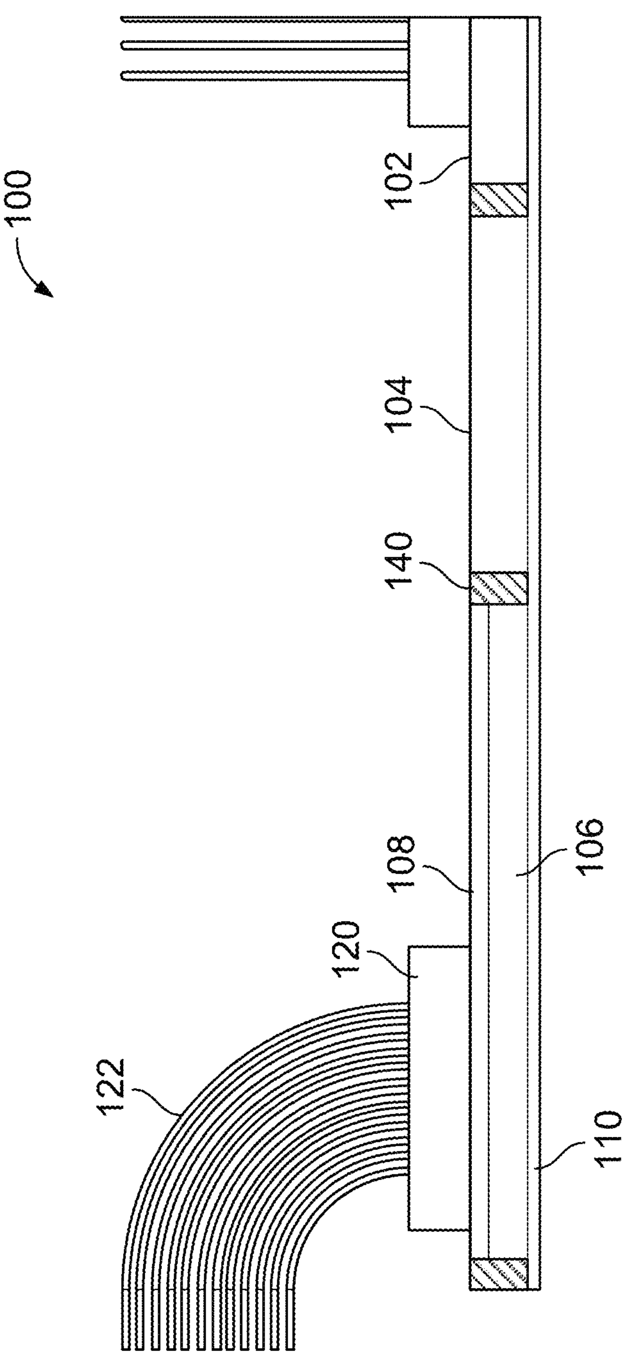
FIG. 1F is a side view of an example of a portion of the semiconductor package with molding compound.
Figure 1G:
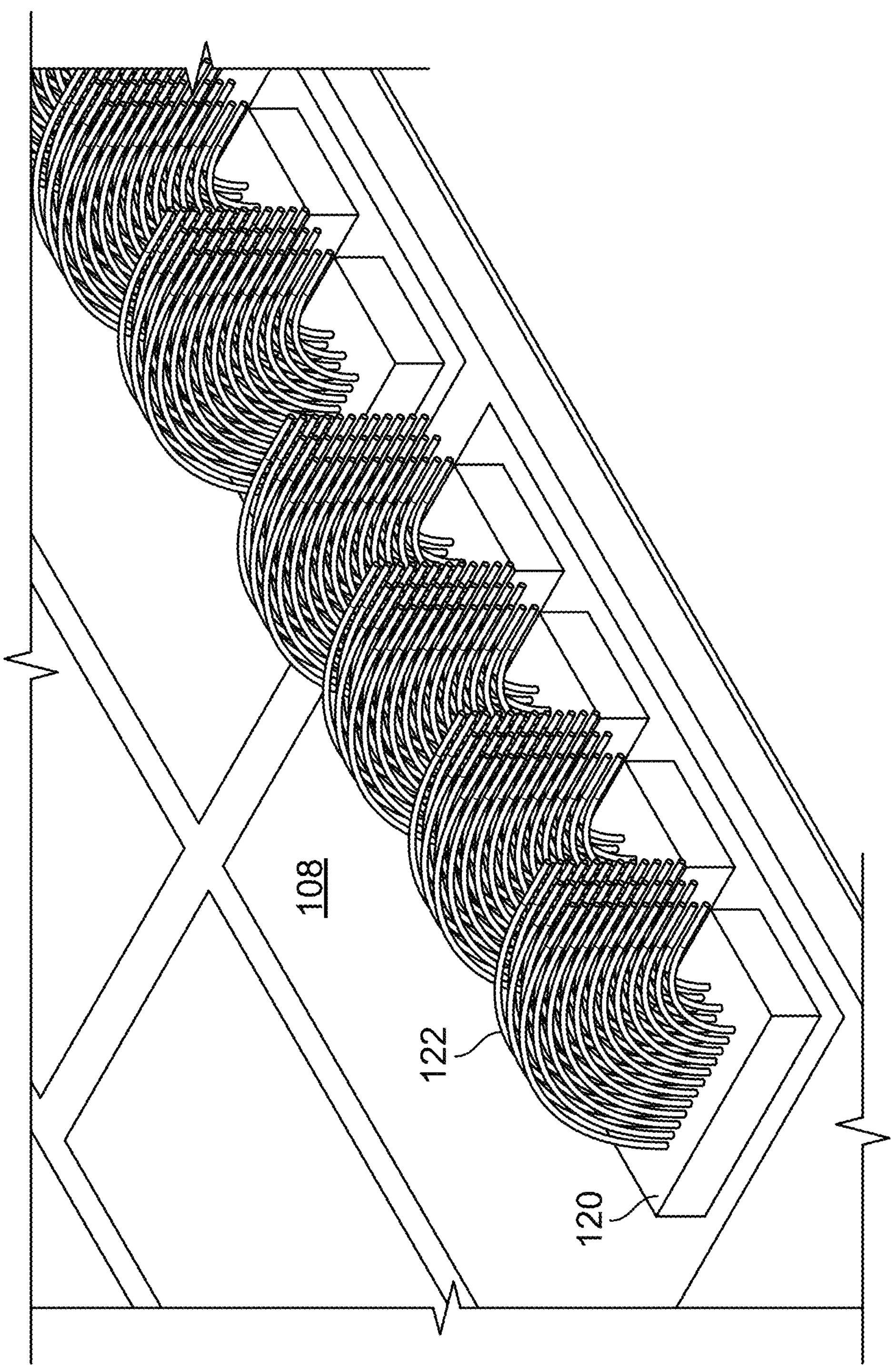
FIGS. 1G and 1H are enlarged views of examples of the fiber optic connector and the optical fibers and/or fiber cores.
Figure 1H:
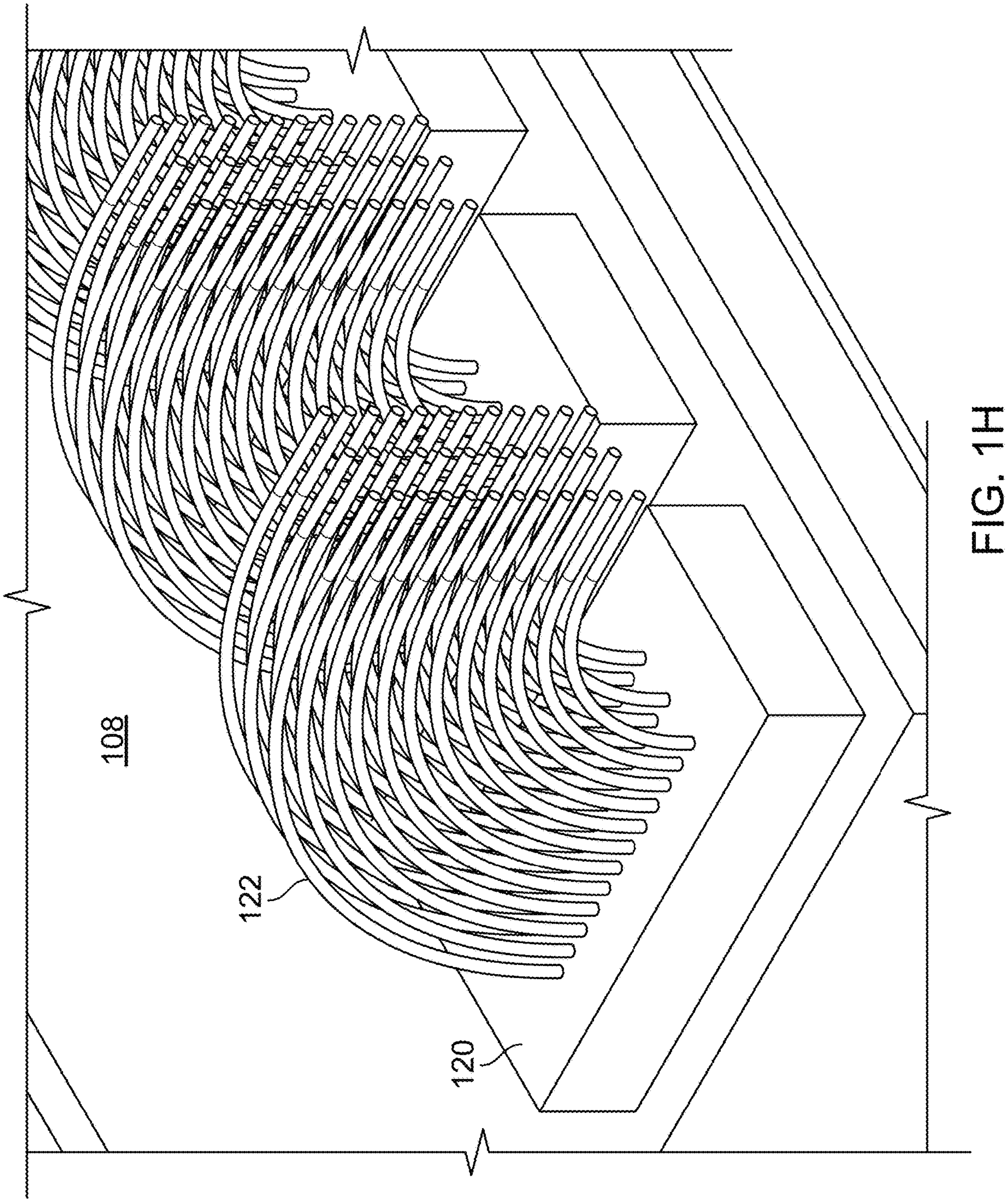
Figure 2:
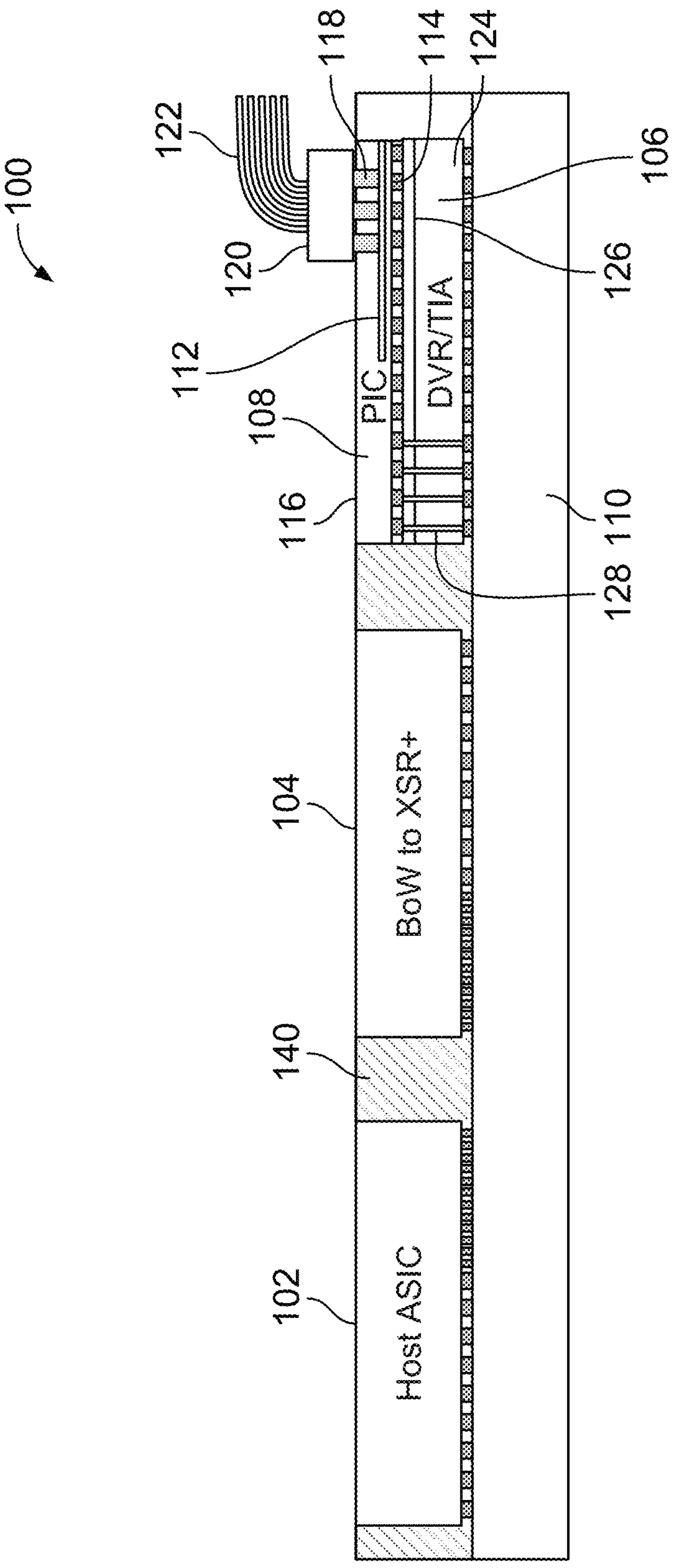
FIG. 2 is a side view of an example of a portion of the semiconductor package.

Referring to FIGS. 1A to 1D and 2, in some implementations, a semiconductor package 100 includes a data processing chiplet 102, a converter chiplet 104, an electronic amplification chiplet (EAC) 106, and a photonic chiplet 108 that are directly or indirectly mounted on a common substrate 110. In FIG. 1D, the term "FAU" refers to fiber array unit. FIG. 1A is a perspective view of the semiconductor package 100 without molding compound. FIG. 1B is a perspective view of the semiconductor package 100 with molding compound. FIGS. 1C and 1D are top views of the semiconductor package 100 with molding compound. FIG. 1E is a side view of a portion the semiconductor package 100 without molding compound. FIG. 1F is a side view of a portion of the semiconductor package 100 with molding compound. FIGS. 1G and 1H are enlarged views of the fiber optic connector 120 and the optical fibers and/or fiber cores 122. The fiber optic connectors 120 shown in FIGS. 1A to 1H are merely examples, the fiber optic connectors 120 can have various geometries and dimensions. FIG. 2 is a side view of a portion of the semiconductor package 100. The data processing chiplet 102, the converter chiplet 104, and the electronic amplification chiplet 106 are directly mounted on the common substrate 110. The photonic chiplet 108 is flip-chip mounted on the electronic amplification chiplet 106. A fiber optic connector 120 is attached to or mounted on the back side 116 of the photonic chiplet 108. A plurality of optical fibers and/or fiber cores 122 are optically coupled to the fiber optic connector 120. In this example, the photonic chiplet 108 uses back-side illumination. The photonic chiplet 108 includes an optically active layer 112 that has active or passive photonic components, e.g., photodiodes, optical modulators, lasers, grating couplers, and/or optical waveguides. The photonic chiplet 108 has an optically active side 114 and a back side 116. At least some of the photonic components are closer to the optically active side 114 than the back side 116. In this example, the optically active side 114 faces towards the electronic amplification chiplet 106.

In the example shown in FIGS. 1A to 1D, the semiconductor package 100 has a pitch-matched configuration in which the shoreline bandwidth density is maintained from the data processing chiplet 102 to the optical input/output. For example, a BoW interface can have approximately the same shoreline density as the BoW→XSR+ converter and approximately the same as the analog DRV/TIA chip and approximately the same as the fiber attach. The chiplet packaging techniques described in this document can also be used in semiconductor packages that are not pitch-matched.

In some implementations, as shown in FIGS. 1A to 1D, a photonic chiplet is coupled to multiple (e.g., 4) fiber optical connectors. In some implementations, the optical fiber cores coupled to the photonic integrated circuit via each fiber optical connector form a 2D arrangement (e.g., a 12×3 arrangement in FIGS. 1A to 1D). In some implementations, the number of fiber cores arranged within the direction from the data processing chiplet to the photonics chiplet (e.g., 12 fibers in FIGS. 1A, 1B, 1E to 1H), is larger or equal to the number of fiber cores arranged perpendicular to the direction from the data processing chiplet to the photonics chiplet (e.g., 3 fibers in FIGS. 1A to 1C, 1G, 1H). A 2D arrangement of optical fiber cores is beneficial in some implementations because it allows to increase optical input/output capacity without increasing the width of the photonic chiplet, thereby enabling the optical interface to be substantially pitch-matched to the converted chiplet, which itself may be substantially pitch-matched to the data processing chiplet. An interface from a first chiplet to a second chiplet is "substantially pitch-matched" if the net information data rate per millimeter of chiplet edge dimension is substantially the same for the first chiplet and for the second chiplet. This enables the passing of information between chiplets without introducing a spatial fan-out and hence keeping the package size to a minimum. For example, the data processor chiplet in FIGS. 1A to 1D can have an electrical input/output density of 1 Terabit per second per millimeter (Tbps/mm) of chiplet edge. The converter chiplet may itself also have the ability to input/output 1 Tbps/mm on its edge facing the data processor chiplet. The edge of the converter chiplet facing the optical chiplet can have an electrical input/output density of 1 Tbps/mm or approximately 1 Tbps/mm (e.g., approximately if the converter chiplet changes the amount of bit rate overhead during the conversion from its data processor facing interface to its optical chiplet facing interface). In order to maintain a substantial pitch-matching, the optical input/output density of the optical chiplet facing away from the converter chiplet should also be approximately 1 Tbps/mm. At a typical fiber-to-fiber spacing of 250 um, and using 100 Gbps per fiber and two fibers for transmit+receive purposes, an optical input/output density of only 200 Gbps/mm can be achieved. Increasing this native optical input/output density to 1 Tbps/mm requires the stacking of 5 rows of fibers within the direction of the data flow, i.e., parallel to the direction from the data processing chiplet to the optical chiplet, creating a 2D array of optical fibers.

In some implementations, the data processing chiplet 102 can include a network switch, a central processing unit, a graphics processor unit, a tensor processing unit, a digital signal processor, an application specific integrated circuit (ASIC), or a storage device (e.g., solid state memory device), or any combination of the above. The data processing chiplet 102 can include one or more network switches, one or more central processing units, one or more graphics processor units, one or more tensor processing units, one or more digital signal processors, one or more application specific integrated circuits (ASICs), or one or more storage devices (e.g., solid state memory device), or any combination of the above. In FIGS. 1A to 1C and 2, the data processing chiplet 102 is shown as a host ASIC, but the data processing chiplet 102 can also be another type of device mentioned above.

In the example of FIGS. 1A to 1C, the data processing chiplet 102 communicates with 8 converter chiplets 104, in which each edge of the data processing chiplet 102 interfaces with two respective converter chiplets 104. Each converter chiplet 104 communicates with a corresponding electronic amplification chiplet 106, which communicates with a corresponding photonic chiplet 108. Each photonic chiplet 108 is optically coupled to four fiber optic connectors 120, and each fiber optic connector 120 is optically coupled to a bundle of optical fibers 122 arranged in a two-dimensional array.

The number of fiber optic connectors coupled to the photonic chiplet 108 can be different from the example shown in FIGS. 1A to 1C. For example, the photonic chiplet 108 can be coupled to a single fiber optic connector, or two fiber optic connectors, or three fiber optic connectors, or five or more fiber optic connectors. The number of optical fibers that are coupled to each fiber optic connector can be different from the examples shown in the figures. In some examples, a converter chiplet can communicate with two or more electronic amplification chiplets. In some examples, an electronic amplification chiplet can communicate with two or more converter chiplets.

In some examples, the data processing chiplet communicates two or more photonic chiplets using different configurations. For example, in a first configuration, the data processing chiplet includes a built-in converter module for communicating with a corresponding electronic amplification chiplet. In a second configuration, the data processing chiplet has a built-in converter module and a built-in electronic amplification module for communicating with a corresponding photonic chiplet. In a third configuration, the data processing chiplet has a built-in converter module, and the photonic chiplet has a built-in electronic amplification module. For example, the data processing chiplet has a first edge, a second edge, and a third edge, the data processing chiplet can communicate with a first photonic chiplet positioned near the first edge using the first configuration, communicate with a second photonic chiplet positioned near the second edge using the second configuration, and communicate with a third photonic chiplet positioned near the third edge using the third configuration.

When the data processing chiplet 102 communicates with multiple converter chiplets 104, different converter chiplets 104 can be configured differently. For example, the data processing chiplet can communicate with a BoW-to-XLR converter positioned near a first edge, an UCIe-to-XLR converter positioned near a second edge, an AIB-to-XLR converter positioned near a third edge, and an XSR-to-XSR retimer positioned near a fourth edge. The data processing chiplet can communicate with any combination of converter chiplets described in this document. The semiconductor package can have a data processing chiplet that communicates with different types of photonic chiplets having different input/output capabilities. This provides a greater flexibility in the design and deployment of the semiconductor package.

In this document, the term "photonic chiplet" refers to a chiplet that includes a "photonic module" or a "photonic integrated circuit (PIC)." The terms "photonic module" and "photonic integrated circuit" are used interchangeably. The term "photonic integrated circuit" should be construed to cover planar lightwave circuits (PLCs), integrated optoelectronic devices, wafer-scale products on substrates, individual photonic chips and dies, and hybrid devices. Example material systems that can be used for manufacturing various PICs can include but are not limited to III-V semiconductor materials, silicon photonics, silica-on-silicon products, silica-glass-based PLCs, polymer integration platforms, lithium niobate and derivatives, nonlinear optical materials, etc. Both packaged devices (e.g., wired-up and/or encapsulated chips) and unpackaged devices (e.g., dies) can be referred to as PICs.

A chiplet can be a semiconductor die or a die stack. A die is a small block of semiconducting material on which an electrical and/or optical integrated circuit is fabricated. Several integrated circuits are produced on a wafer of silicon or other semiconductor (such as GaAs) through processes such as photolithography. The wafer is cut or diced into many pieces, each containing one or more of the integrated circuits. Each of these pieces is referred to as a die. When two or more dies are stacked together vertically, the combination of the two or more dies is referred to as a die stack.

PICs are used for various applications in telecommunications, instrumentation, and signal-processing fields. A PIC typically uses optical waveguides to implement and/or interconnect various circuit components, such as optical switches, couplers, routers, splitters, multiplexers/demultiplexers, filters, modulators, phase shifters, lasers, amplifiers, wavelength converters, optical-to-electrical (O/E) and electrical-to-optical (E/O) signal converters, etc. A waveguide in a PIC is usually an on-chip solid light conductor that guides light due to an index-of-refraction contrast between the waveguide's core and cladding. A PIC typically comprises a planar substrate onto which optoelectronic devices are grown by an additive manufacturing process and/or into which optoelectronic devices are etched by a subtractive manufacturing processes, e.g., using a multi-step sequence of photolithographic and chemical processing steps.

An "optoelectronic device" can operate on both light and electrical currents (voltages) and can include one or more of: (i) an electrically driven light source, such as a laser diode; (ii) an optical amplifier; (iii) an optical-to-electrical converter, such as a photodiode; and (iv) an optoelectronic component that can control the propagation and/or certain properties of light, such as an optical modulator or a switch. The corresponding optoelectronic circuit can additionally include one or more optical elements and/or one or more electronic components that enable the use of the circuit's optoelectronic devices in a manner consistent with the circuit's intended function. Some optoelectronic devices can be implemented using one or more PICs.

As used herein, the term "integrated circuit" (IC) should be construed to encompass both a non-packaged die and a packaged die. In a typical IC-fabrication process, dies (chips) are produced in relatively large batches using wafers of silicon or other suitable material(s). Electrical and optical circuits can be gradually created on a wafer using a multi-step sequence of photolithographic and chemical processing steps. Each wafer is then cut ("diced") into many pieces (chips, dies), each containing a respective copy of the circuit that is being fabricated. Each individual die can be appropriately packaged prior to being incorporated into a larger circuit or be left non-packaged.

The term "hybrid circuit" can refer to a multi-component circuit constructed of multiple monolithic ICs and possibly some discrete circuit components, all attached to each other to be mountable on and electrically connectable to a common base or carrier. A representative hybrid circuit can include (i) one or more packaged or non-packaged dies, with some or all of the dies including optical, optoelectronic, and/or semiconductor devices, and (ii) one or more optional discrete components, such as connectors, resistors, capacitors, and inductors. Electrical connections between the ICs, dies, and discrete components can be formed, e.g., using patterned conducting (such as metal) layers, ball-grid arrays, solder bumps, wire bonds, etc. The individual ICs can include any combination of one or more respective substrates, one or more redistribution layers (RDLs), one or more interposers, one or more laminate plates, etc.

In some examples, individual chips can be stacked. As used herein, the term "stack" refers to an orderly arrangement of packaged or non-packaged dies in which the main planes of the stacked dies are substantially parallel to each other. A stack can typically be mounted on a carrier in an orientation in which the main plains of the stacked dies are parallel to each other and/or to the main plane of the carrier.

A "main plane" of an object, such as a die, a PIC, a substrate, or an IC, is a plane parallel to a substantially planar surface thereof that has the largest sizes, e.g., length and width, among all exterior surfaces of the object. This substantially planar surface can be referred to as a main surface. The exterior surfaces of the object that have one relatively large size, e.g., length, and one relatively small size, e.g., height, are typically referred to as the edges of the object.

In some implementations, the photonic chiplet 108 can be based on any suitable PIC technology/material platform, such as, without any implied limitation, silicon photonics, indium phosphide, or lithium niobate. The photonic chiplet 108 includes, supported on a substrate, suitably connected passive optical elements and/or arrays of passive optical elements, such as optical waveguides, couplers, splitters, filters, delay lines, etc., and optoelectronic elements and/or arrays of optoelectronic elements such as modulators, detectors, and tunable phase shifters. Some of these elements can be vertical-coupling elements configured to couple light to/from the PIC. Herein, the "vertical" direction is a direction that is perpendicular to a main surface of the PIC. In the context of this disclosure, the term "vertical-coupling" denotes coupling at an angle that is substantially out-of-plane relative to a main surface of substrate of the PIC, but not necessarily perpendicular to the main surface. In some examples, vertical coupling can be implemented at angles between 0 degrees (perpendicular) and, e.g., 45 degrees as measured from the surface-normal of the substrate's main surface. The coupling can be performed from the top-side (e.g., the waveguide-side) of the PIC or from the bottom-side (e.g., the substrate-side) of the PIC. In some examples where top-side coupling or bottom-side coupling is used, the light beams can be directed toward or from the top side or bottom side of the PIC at an angle greater than, e.g., 45 degrees as measured from the surface-normal of the substrate's main surface.

In some examples, vertical-coupling elements can be implemented, e.g., as turning mirrors, vertical grating couplers, elephant couplers, or as 3D vertical coupling structures that are 3D-printed onto the PIC, suitably connected to passive optical elements or to optoelectronic elements. In some examples, vertical-coupling elements can be implemented, e.g., using any of the vertical-coupling elements disclosed in the following patent literature: U.S. patent application publication US 2015/0037044, U.S. patent application publication US 2015/0125110, U.S. patent application publication US 2015/0293305, U.S. Pat. No. 9,927,575, U.S. patent application publication US 2018/0329159, U.S. patent application publication US 2019/0258175, and U.S. Pat. No. 10,025,043. The patents and patent application publications mentioned above are incorporated herein by reference in their entirety. Additional details of components that can be included in the photonic chiplet 108 and the fiber optic connector 120, and the interconnection between the photonic chiplet 108 and the fiber optic connector 120, can be found in, e.g., U.S. Pat. No. 11,287,585, issued on Mar. 29, 2022, titled "Optical Fiber-To-Chip Interconnection," assigned to Nubis Communications, Inc., PCT publication WO 2021/183792, published on Sep. 16, 2021, titled "Optical Fiber-To-Chip Interconnection," assigned to Nubis Communications, Inc., U.S. Pat. No. 11,194,109, issued on Dec. 7, 2021, titled "Optical Fiber Cable and Raceway Therefor," assigned to Nubis Communications, Inc., PCT publication WO 2021/188648, published on Sep. 23, 2021, titled "Optical Fiber Cable and Raceway Therefor," assigned to Nubis Communications, Inc., U.S. Pat. No. 11,153,670, issued on Oct. 19, 2021, titled "Communication System Employing Optical Frame Templates," assigned to Nubis Communications, Inc., PCT publication WO 2021/211725, published on Oct. 21, 2021, titled "Communication System Employing Optical Frame Templates," assigned to Nubis Communications, Inc., U.S. publication US 2021/0376950, published on Dec. 2, 2021, titled "Polarization-Diversity Optical Power Supply," issued as U.S. Pat. No. 11,621,795 on Apr. 4, 2023, assigned to Nubis Communications, Inc., PCT publication WO 2021/247521, published on Dec. 9, 2021, titled "Polarization-Diversity Optical Power Supply," assigned to Nubis Communications, Inc., U.S. publication US 2022/0159860, published on May 19, 2022, titled "Data Processing Systems Including Optical Communication Modules," assigned to Nubis Communications, Inc., and U.S. patent application Ser. No. 17/693,040, filed on Mar. 11, 2022, published as US 2022/0291461 on Sep. 15, 2022, titled "Optical Fiber-To-Chip Interconnection," assigned to Nubis Communications, Inc. The patents and patent application publications mentioned above are incorporated herein by reference in their entirety.

In some examples, the vertical-coupling elements can be surface-normal optoelectronic elements such as surface-normal modulators, surface-normal detectors, or surface-normal lasers, e.g., vertical-cavity surface emitting lasers (VCSELs). In an example embodiment, the vertical-coupling elements can be implemented, e.g., using any of the vertical-coupling elements disclosed in U.S. patent application publication US 2019/0312642, U.S. Pat. Nos. 10,025,043, and 8,488,921, all of which are incorporated herein by reference in their entirety. The vertical-coupling elements can be geometrically variously arranged in arrays of such vertical-coupling elements. In some examples, some optical or optoelectronic elements can be spatially co-located or interspersed with some vertical-coupling elements of the array of vertical-coupling elements. In some examples, some optical or optoelectronic elements can be located in areas of the PIC disjoint from vertical-coupling arrays. Optical and optoelectronic elements of the PIC are suitably connected to electronic integrated circuits, such as driver amplifiers, transimpedance amplifiers, electronic control circuits, digital logic, microcontrollers, microprocessors, and/or electronic switches. Some electronic circuits can be spatially co-located or interspersed with some vertical-coupling elements of arrays, and some electronic circuits can be located in areas that are spatially disjoint from the arrays of vertical-coupling elements. Some electronic circuits can be monolithically integrated with optical or optoelectronic elements of the PIC. Some electronic circuits can be on a separate chip from the PIC and may be electrically connected to the PIC using suitable electrical interconnect technologies, such as bond wires, balls, bumps, micro-bumps, pillars, and membranes, e.g., in the form of a stack.

In some examples, the photonic chiplet 108 includes a two-dimensional arrangement of back-side illuminated couplers 134, e.g., vertical grating couplers (see FIG. 3) that are positioned in or near the optically active layer 112 of the photonic chiplet 108. The back-side illuminated couplers 134 are designed to couple light incident on the back side 116 of the photonic chiplet 108 to optical waveguides in the photonic chiplet 108, or to receive light from the optical waveguides and emit light from the back side 116 of the photonic chiplet 108. In some examples, the photonic chiplet 108 has a two-dimensional arrangement of openings 118 at the back side 116 to allow light beams from a two-dimensional arrangement of fiber optic cores 122 to be directed toward the corresponding two-dimensional arrangement of optical couplers 134, and to allow light beams emitted from the two-dimensional arrangement of optical couplers 134 to be directed toward the corresponding two-dimensional arrangement of fiber optic cores 122.

Figure 3:
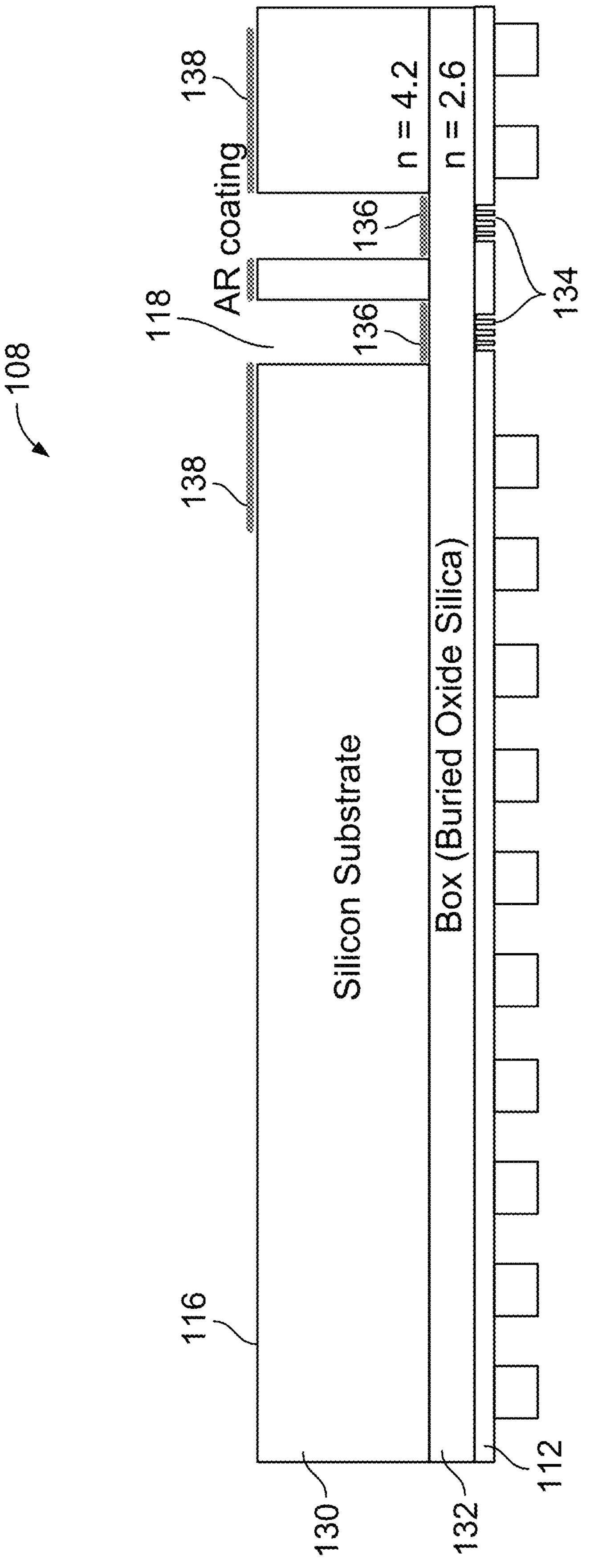
FIG. 3 is a diagram of an example of a photonic chiplet that includes a buried oxide silica layer on a silicon substrate.

Referring to FIG. 3, in some implementations, the photonic chiplet 108 includes a silicon substrate 130, a buried oxide silica layer 132 on the silicon substrate, and the optically active layer 112 on the buried oxide silica layer 132. The optically active layer 112 includes grating couplers 134 that are designed to couple light coming from the back side 116 to optical waveguides in the optically active layer 112. The grating couplers 134 have delicate structures with very small dimensions. The silicon substrate 130 has openings 118 to allow incident light to be directed towards, and output light to be emitted from, the grating couplers 134. Each opening 118 can have a diameter in a range from, e.g., 10 μm to 100 μm. In some examples, the openings 118 have generally cylindrical shapes. In some examples, the openings 118 have generally conical shapes. The openings can also be generally square shapes, or any other shapes. The size of the openings can also be greater than 100 μm.

In some examples, the openings 118 have shapes of arbitrary cross-sections with walls substantially perpendicular to the chiplet's main surface. In some examples, the arbitrary cross-sections can be elliptical, in other examples the arbitrary cross-sections can be substantially rectangular. In some examples, the openings 118 have shapes of arbitrary cross-sections with walls at an angle relative to the surface normal of the chiplet's main surface such that a cross-section at any height above the chiplet has a larger area than a cross-section at a surface of the chiplet.

For example, the openings 118 are made by forming a patterned photomask on the back side 116 of the silicon substrate 108, in which the patterned photomask has openings at the intended locations of the openings 118 in the silicon substrate 130. An etching process is applied to etch the silicon substrate 130 to form the openings 118. The buried oxide silica layer 132 is used as an etch stop to prevent the etching from going too far and damaging the delicate grating couplers 134. For example, etching of the silicon substrate 130 can be performed using an etchant that has a selective etching rate, in which the etching rate of silicon is much higher than the etching rate of oxide silica. The etching process is monitored and stopped when the buried oxide silica layer 132 is exposed.

The silicon substrate 130 has a refractive index of about 4.2, and the buried oxide silica layer 132 has a refractive index of about 2.6. In some examples, the silicon substrate 130 has a thickness of about 100 μm to 1 mm, or about 200 μm to 800 μm, or about 725 μm, and the buried oxide silica layer 132 has a thickness in a range of 0.5 μm to 10 μm, or 1 μm to 5 μm, or about 2 μm. The active layer 112 can have a thickness in a range from about 0.2 μm to 10 μm. In some examples, the active layer 112 can have several metal layers and have a thickness greater than 10 μm. The substrate and the etch stop layer can use other materials and can have other thicknesses. For example, the substrate can have a first refractive index greater than 3.7, and the etch stop layer can have a refractive index less than 3.1 for light having a wavelength in a range from, e.g., 1250 nm to 1620 nm.

In some implementations, an antireflective coating 136 is applied to the portions of the surface of the buried oxide silica layer 132 that are exposed by the openings 118 in the silicon substrate 130. In some examples, an antireflective coating 138 is applied to the back side 116 of the silicon substrate 130 in the regions that may receive the light from the optical fibers 122. The antireflective coatings 136, 138 are designed to reduce reflection of the incident light (e.g., having a wavelength in a range from, e.g., 1250 nm to 1620 nm) such that the reflected light has an intensity, e.g., at most 20%, at most 10%, at most 5%, or at most 1% of the intensity of the incident light.

Referring back to FIGS. 1A to 1C and 2, the electronic amplification chiplet 106 can be an analog electronic amplification chiplet that includes one or more driver amplifiers that amplify electrical signals transmitted to one or more optical modulators in the photonic chiplet 108, and one or more transimpedance amplifiers that amplify electrical signals transmitted from one or more photodetectors in the photonic chiplet 108. For example, the transimpedance amplifier converts the current signal in a photodiode into an amplified voltage signal. The electronic amplification chiplet 106 includes a silicon substrate 124 and an electrically active layer 126 on the silicon substrate 124. The electrically active layer 126 includes active and/or passive electronic components, e.g., amplifiers, switches, filters, and/or conduction lines or traces. The electrically active layer 126 can be disposed near the top or bottom surface of the silicon substrate 124. Conductive through-silicon 128 vias are provided in the silicon substrate 124.

In this document, the term "through-silicon via" is used to refer to a conductive through-via in a silicon substrate. It is understood that if the substrate is made of a material other than silicon, the through-silicon via can be replaced with a conductive through-via.

In some examples, the electrically active layer 126 is disposed on or near the top surface of the substrate 124. Electrical signals from the photonic chiplet 108 are transmitted through bump contacts on the optically active side 114 of the photonic chiplet 108 and bump contacts on the top side of the electronic amplification chiplet 106 to the electrically active layer 126 of the electronic amplification chiplet 106. The electrically active layer 126 of the electronic amplification module 106 transmits electrical signals using the through-silicon vias 128, bump contacts at the bottom side of the electronic amplification chiplet 106, and bump contacts on the top surface of the common substrate 110 to conductive signal lines or traces in the common substrate 110 that are electrically coupled to the converter chiplet 104. Electrical signals from the converter chiplet 104 are transmitted from conductive signal lines on the common substrate 110 to the through-silicon vias 128 and to the electrically active layer 126 of the electronic amplification chiplet 106, and then to the optically active layer 114 of the photonic chiplet 108. When we say that electrical signal lines are electrically coupled to the optically active layer 112, we mean that the electrical signal lines are electrically coupled to the electrical components (e.g., photodiodes, modulators, or lasers) of the optically active layer 112.

In some alternative examples, the electronic amplification chiplet 106 has an electrically active layer that is disposed near the bottom surface of the substrate 124. Electrical signals from the photonic chiplet 108 are transmitted to bump contacts at the top side of the electronic amplification chiplet 106, then from the bump contacts through the through-silicon vias 128 in the substrate 124 to the electrically active layer of the electronic amplification chiplet 106. The electrical signals are then transmitted to the signal lines in the common substrate 110 and forwarded to the converter chiplet 104. Electrical signals from the converter chiplet 104 are transmitted through the signal lines in the common substrate 110 to the electrically active layer of the electronic amplification chiplet 106, then through the through-silicon vias 128 to bump contacts on the top side of the electronic amplification chiplet 106, and then to the photonic chiplet 108.

The fiber optic connector 120 includes fiber ports that are aligned with the openings 118 at the back side 116 of the photonic chiplet 108. In some examples, the fiber optic connector 120 includes a 2D array of lenses to focus light from the array of optical fiber cores toward the 2D array of back-side illuminated grating couplers 134 in the photonic chiplet 108, and to collimate light emitted from the 2D array of back-side illuminated grating couplers 134 toward the 2D array of optical fiber cores 122. In some examples, the fiber connector 120 includes birefringent optical elements to separate, combine, or otherwise modify two orthogonal polarizations states of light propagating within a single fiber or fiber core on their way between a fiber core and one or more the vertical coupling element(s), as described in U.S. Pat. No. 11,287,585, PCT publication WO 2021/183792, and U.S. patent application Ser. No. 17/693,040. In some examples, the fiber connector 120 multiplexes optical signals from a single fiber core onto multiple vertical coupling elements using polarization or wavelength multiplexing elements.

In some examples, the grating couplers 134 of the photonic chiplet 108 are arranged in an arbitrary two-dimensional pattern. In some examples, the grating couplers 134 of the photonic chiplet 108 are arranged in a regular array of rows and columns. In some examples, the photonic chiplet 108 includes grating couplers 134 arranged in a one-dimensional arrangement, e.g., along a line, a curve, or a row. In some examples, the fiber ports of the fiber optic connector 120 are in an arbitrary two-dimensional pattern. In some examples, the fiber ports of the fiber optic connector 120 are arranged in a regular array of rows and columns. In some examples, the fiber ports of the fiber optic connector 120 are arranged in a one-dimensional arrangement, e.g., along a line, a curve, or a row.

In some examples, the grating couplers 134 are arranged in a 2D pattern, the fiber ports are also arranged in a 2D pattern, and each fiber optic port corresponds to one or more grating couplers 134. In some examples, the grating couplers 134 are arranged in a 1D pattern, the fiber ports are also arranged in a 1D pattern, and each fiber optic port corresponds to one or more grating couplers 134.

In some examples, the grating couplers 134 are arranged in a 2D pattern, and the fiber ports are arranged in a 1D pattern. In this case, the fiber optic connector 120 includes optics to transform a one-dimensional arrangement of light beams emitted from the fiber ports arranged in the one-dimensional pattern to a two-dimensional arrangement of light beams that are directed toward grating couplers 134 that are arranged in the two-dimensional pattern. In the reverse direction, the optics transform a two-dimensional arrangement of light beams emitted from the grating couplers 134 arranged in the two-dimensional pattern to a one-dimensional arrangement of light beams that are directed toward the fiber ports that are arranged in the one-dimensional pattern.

In some examples, the grating couplers 134 are arranged in a 1D pattern, and the fiber ports are arranged in a 2D pattern. In this case, the fiber optic connector 120 includes optics to transform a two-dimensional arrangement of light beams emitted from the fiber ports arranged in the two-dimensional pattern to a one-dimensional arrangement of light beams that are directed toward grating couplers 134 that are arranged in the one-dimensional pattern. In the reverse direction, the optics transform a one-dimensional arrangement of light beams emitted from the grating couplers 134 arranged in the one-dimensional pattern to a two-dimensional arrangement of light beams that are directed toward the fiber ports that are arranged in the two-dimensional pattern.

Figure 69:
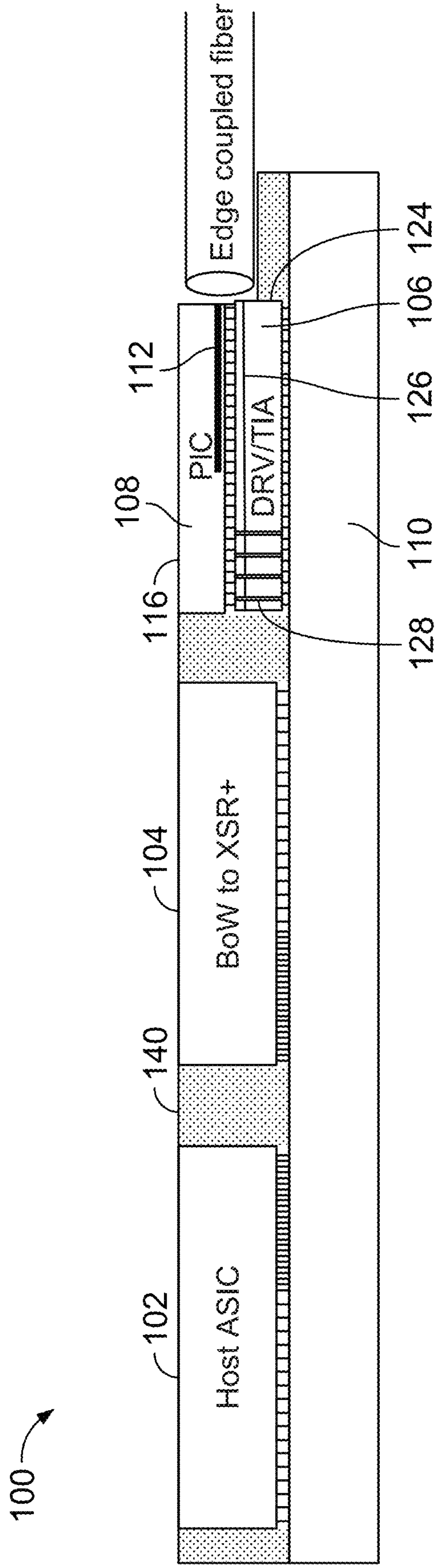
FIGS. 69 to 81 are diagrams of examples of semiconductor packages that include photonic chiplets that are edge-coupled to optical fibers or fiber cores.
Figure 70:
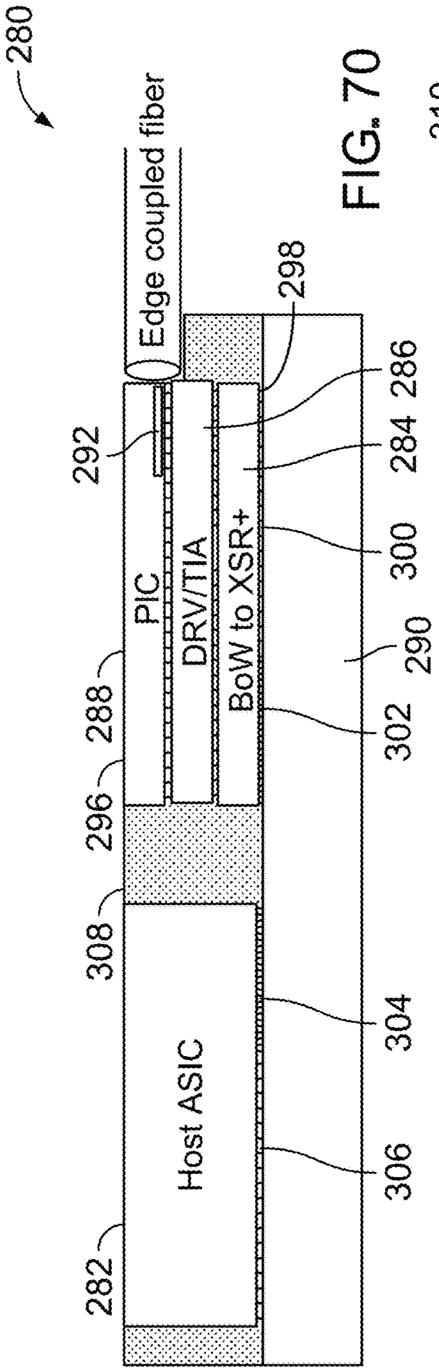
Figure 71:
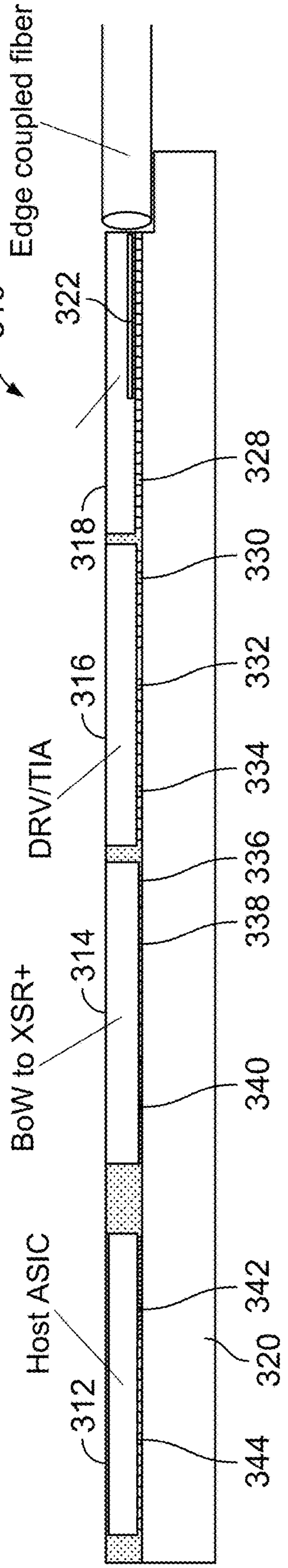
Figure 72:
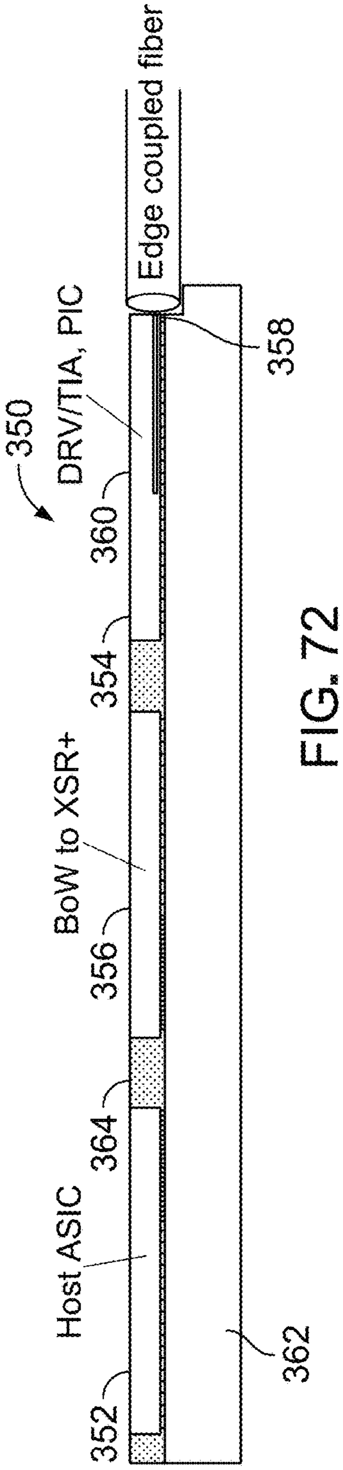
Figure 73:
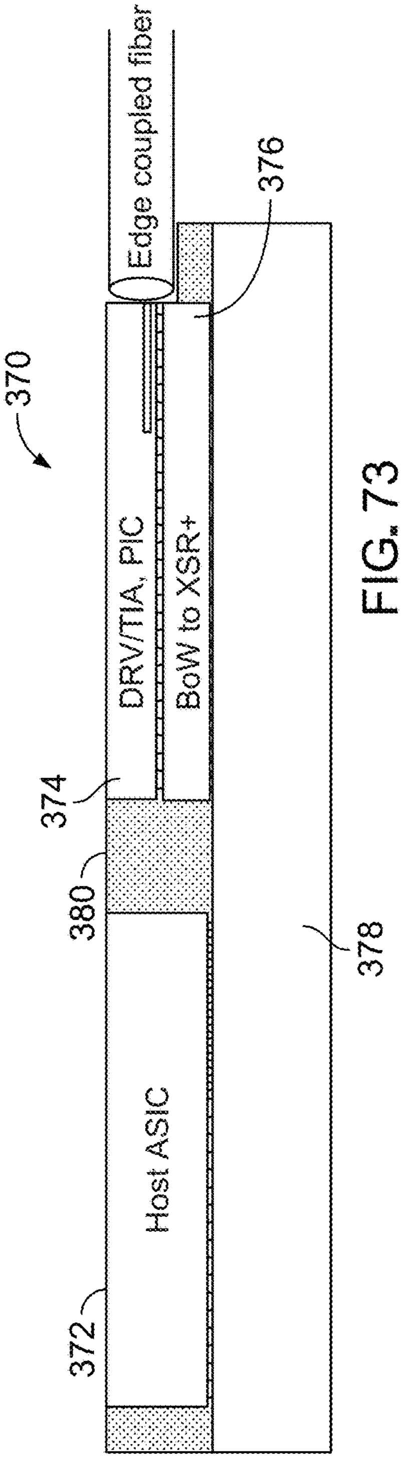
Figure 74:
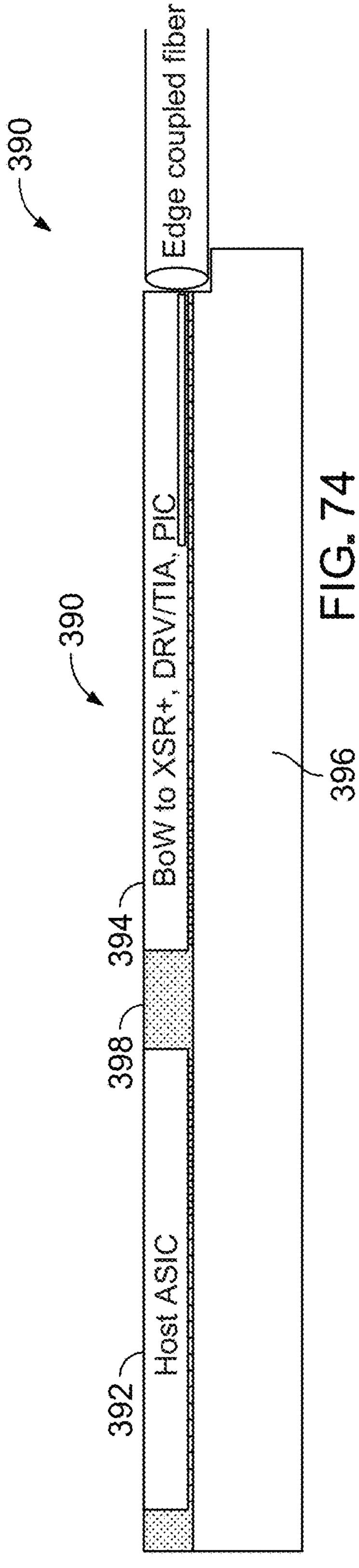
Figure 75:
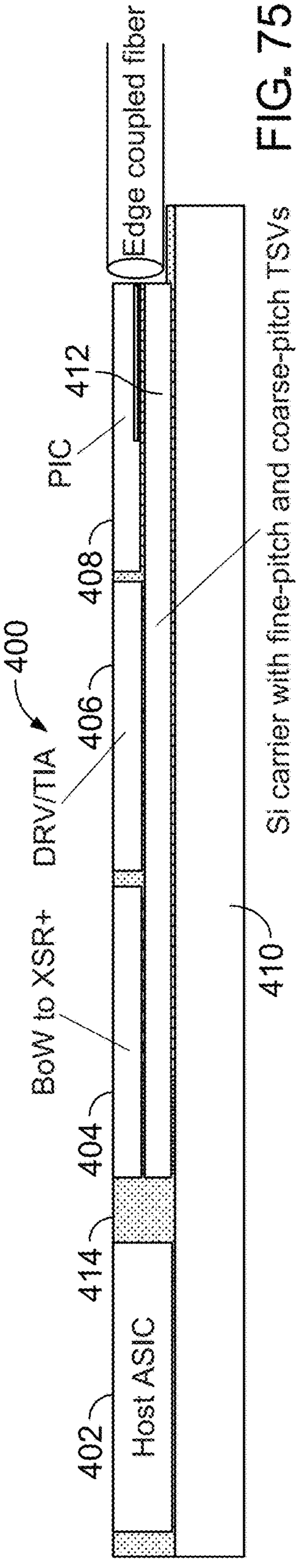
Figure 76:
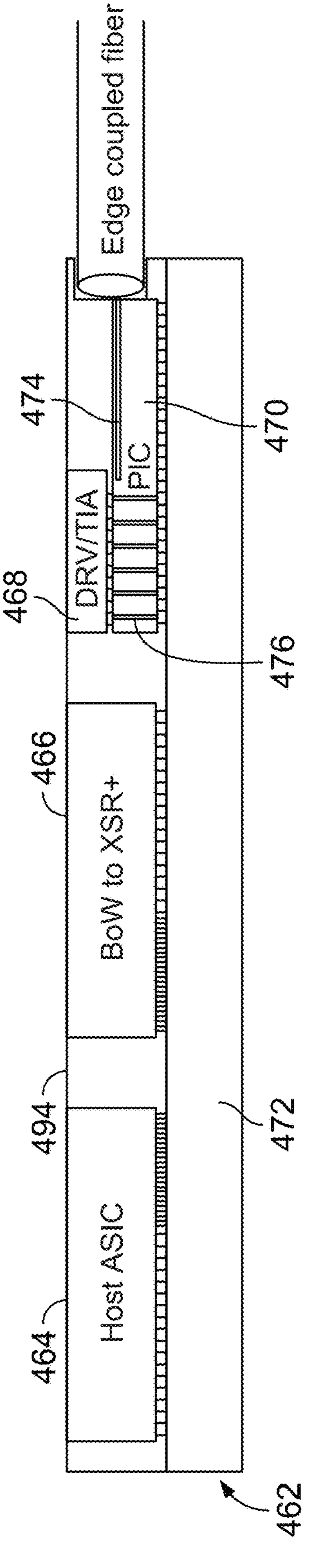
Figure 77:
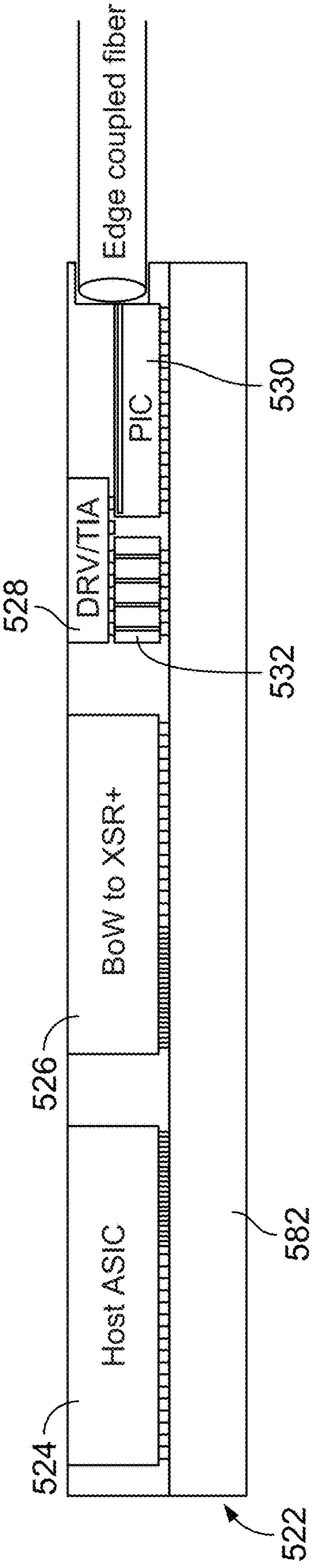
Figure 78:
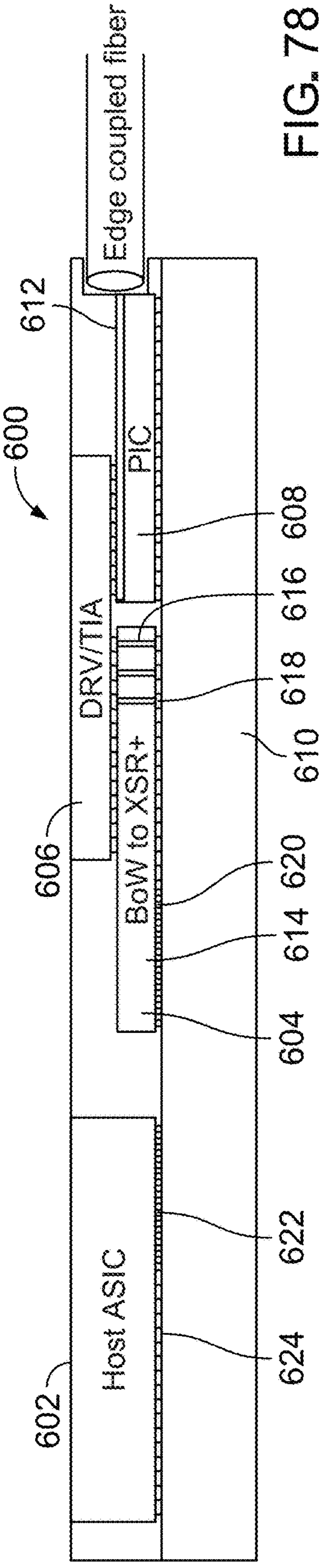
Figure 79:
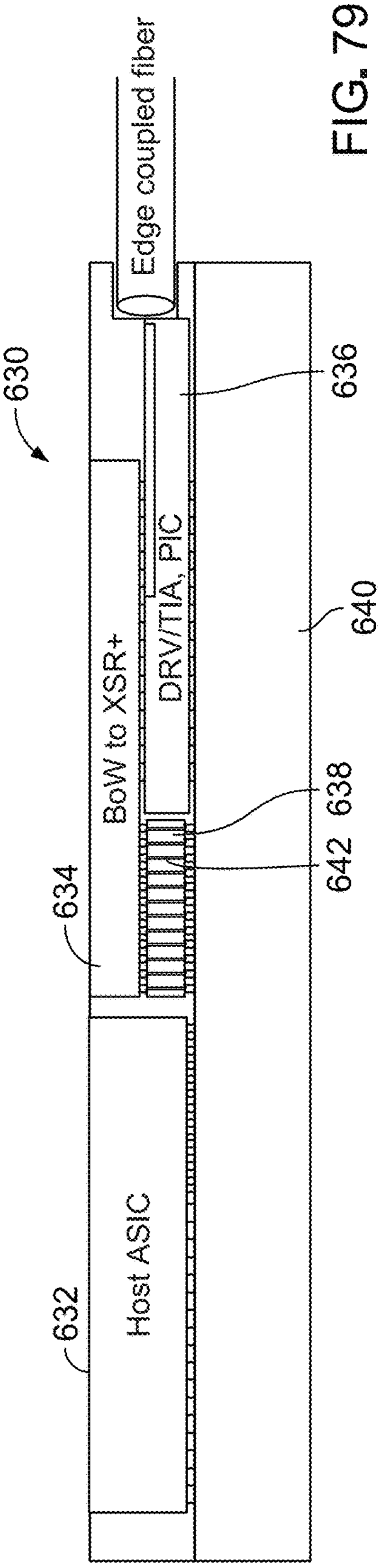
Figure 80:
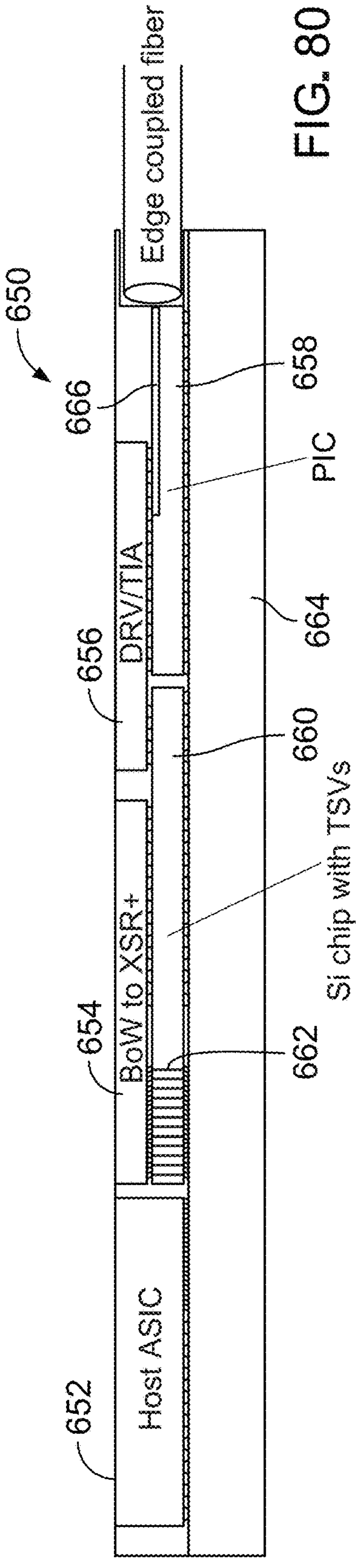
Figure 81:
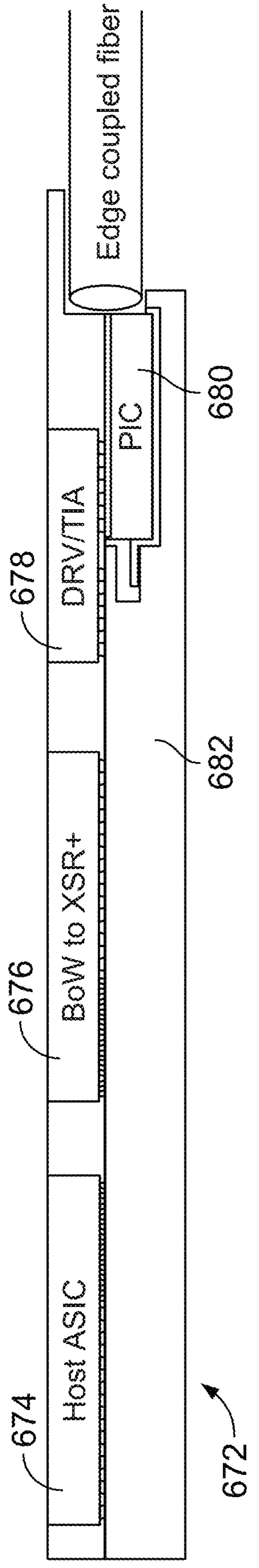

In some examples, as shown in FIGS. 69 to 81, the photonic chiplet can be coupled to optical fibers or fiber cores using edge coupling. FIG. 69 is a diagram of the semiconductor package 100 of FIG. 2 that has been modified to use edge coupling. FIG. 70 is a diagram of the semiconductor package 280 of FIG. 9 that has been modified to use edge coupling. FIG. 71 is a diagram of the semiconductor package 310 of FIG. 10 that has been modified to use edge coupling. FIG. 72 is a diagram of the semiconductor package 350 of FIG. 11 that has been modified to use edge coupling. FIG. 73 is a diagram of the semiconductor package 370 of FIG. 12 that has been modified to use edge coupling. FIG. 74 is a diagram of the semiconductor package 390 of FIG. 13 that has been modified to use edge coupling. FIG. 75 is a diagram of the semiconductor package 400 of FIG. 14 that has been modified to use edge coupling. FIG. 76 is a diagram of the semiconductor package 462 of FIG. 16 that has been modified to use edge coupling. FIG. 77 is a diagram of the semiconductor package 522 of FIG. 17 that has been modified to use edge coupling. FIG. 78 is a diagram of the semiconductor package 600 of FIG. 20 that has been modified to use edge coupling. FIG. 79 is a diagram of the semiconductor package 630 of FIG. 21 that has been modified to use edge coupling. FIG. 80 is a diagram of the semiconductor package 650 of FIG. 22 that has been modified to use edge coupling. FIG. 81 is a diagram of the semiconductor package 672 of FIG. 23 that has been modified to use edge coupling.

In some examples, the common substrate 110 is a silicon interposer, which can be, e.g., a silicon chip cut from a silicon wafer. The silicon interposer supports fine pitched interconnects, e.g., 500 lines per mm. For example, the smallest distance between bump contacts can be 30 μm using advanced copper pillar assembly technologies. In some examples, the common substrate 110 is a substrate that uses silicon bridges, in which fine-pitched silicon interposers are embedded into more conventional coarse-pitched package substrate material. The fine-pitched silicon interposers are used in the areas of the package where slower and parallel interfaces are needed. The coarse-pitched package substrate can be made of, e.g., one or more ceramic materials, or organic "high density build-up" (HDBU). In some examples, the silicon interposer and the substrate that uses silicon bridges have sufficient structural strength to support the package and do not require overmolding.

In the examples of the semiconductor package shown in FIGS. 1A to 1C and 2, an overmolding process is applied resulting in a molding compound 140 that covers some of the side surfaces of the chiplets 102, 104, 106, 108 and some surfaces of the common substrate 110. The overmolding is optional when the common substrate 110 is a silicon interposer or a substrate that uses silicon bridges. Such substrates have sufficient strength and may not need the additional structural support provided by the molding compound.

In some implementations, the common substrate 110 is made in a fan-out wafer-level packaging (FoWLP) process that forms thin redistribution layers (RDLs). The redistribution layers include alternating electrically conductive layers (e.g., copper layers) and electrical insulation layers (e.g., polyimide layers). Each conductive layer is disposed between two insulation layers. Each conductive layer has a thickness in a range from, e.g., about 1 μm to 7 μm, or about 2 μm to 5 μm. Each insulation layer has a thickness in a range from, e.g., about 5 μm to 10 μm. The thickness of the conductive layer and the insulation layer can also be other values.

Figure 29:
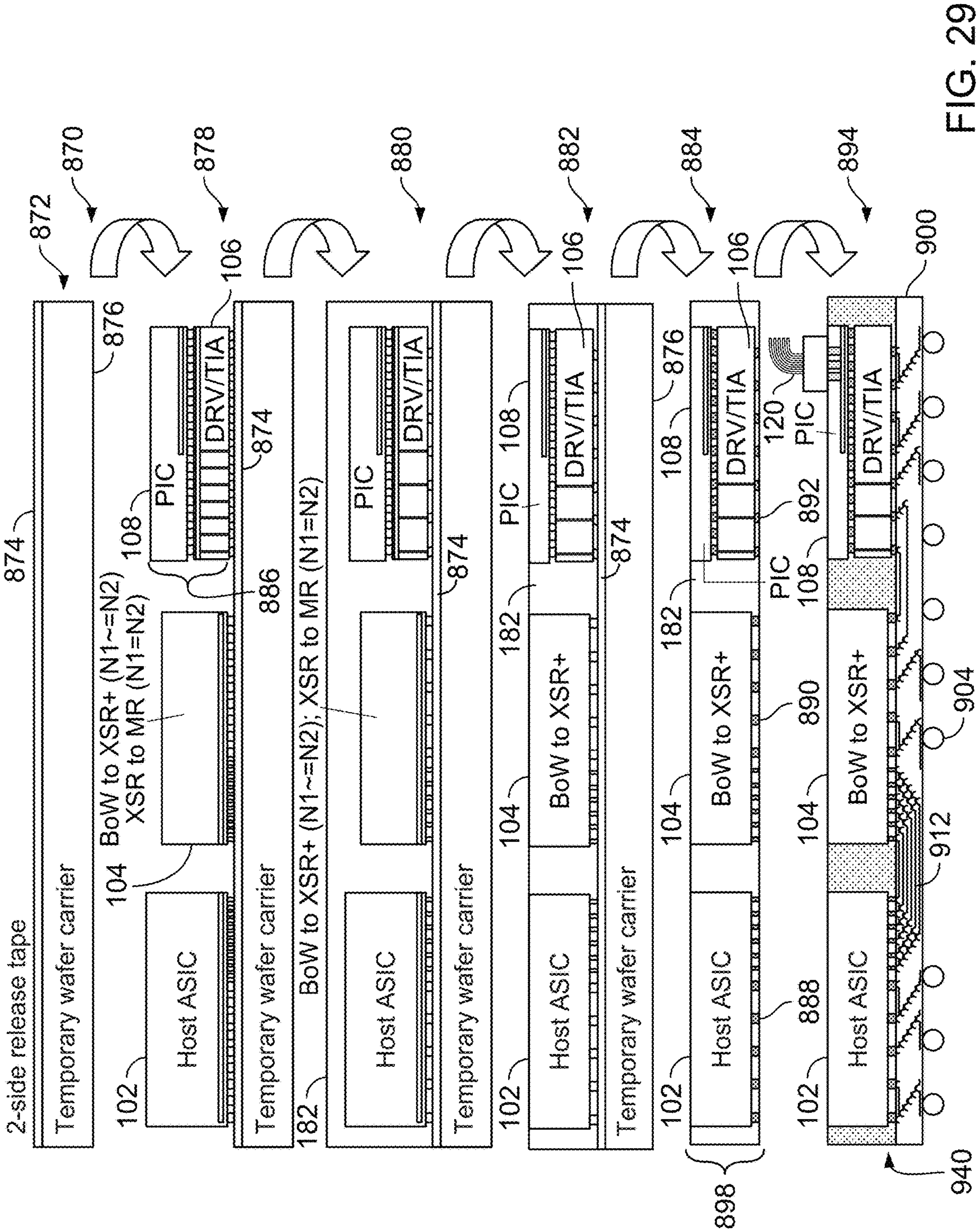
FIGS. 29 and 30 are diagrams of examples of processing steps for fabricating a semiconductor package having redistribution layers.
Figure 30:
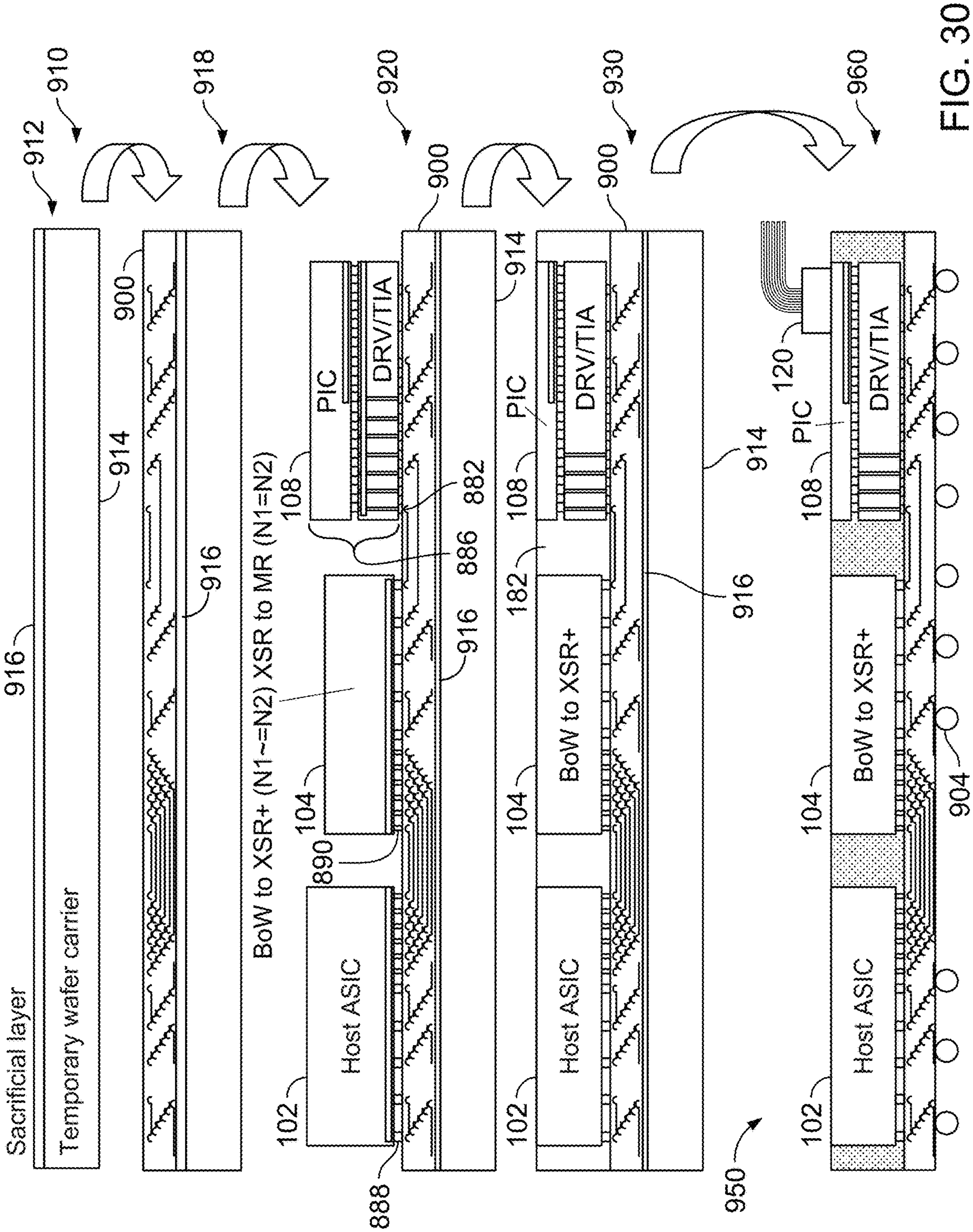

The redistribution layers are thin and may not provide sufficient structural support for the semiconductor package 100. In this case, it is useful to have the molding compound 140 in order to enhance the structural integrity of the semiconductor package 100. In some examples, to improve thermal dissipation from the chiplets 102 and 104, a grinding process is applied to the molding compound 140 to reduce the thickness of the molding compound 140 until the top surfaces of the chiplets 102 and 104 are exposed. In some examples, the chiplets 102 and 104, and the stacked chiplets 106, 108 have different thicknesses. The grinding process is applied to the thicker chiplets until the top surfaces of the heat-generating chiplets 102, 104 are exposed. The electronic amplification chiplet 106 is positioned under the photonic chiplet 108, so some of the heat from the electronic amplification chiplet 106 is dissipated through the photonic chiplet 108. Examples of the processing steps for fabricating the semiconductor package having the redistribution layers are shown in FIGS. 29 and 30.

In the example shown in FIGS. 1A to 1H and 2, the photonic chiplet 108 is mounted on the electronic amplification chiplet 106. The grinding process is applied to the molding compound 140 and some of the chiplets until the top surfaces of the data processing chiplet 102, the converter chiplet 104, and the photonic chiplet 108 are exposed. One of the purposes of exposing the top surface of the photonic chiplet 108 is to allow the photonic chiplet 108 to obtain optically transparent access to an external optical link, such as the fiber cores 122. After the top surface of the photonic chiplet 108 is exposed, an etching process is applied to etch the silicon substrate 130 of the photonic chiplet 108 to form the array of openings 118. Anti-reflection coatings 136, 138 are applied to the exposed surfaces of the buried oxide silica layer 132 and portions of the top surface of the silicon substrate 130.

The semiconductor package 100 shown in FIGS. 1A to 1H and 2 can have the following features:

- The electronic amplification chiplet 106 can have through-silicon vias 128.
- The photonic chiplet 108 can be back-side illuminated.
- The photonic chiplet 108 does not need to have through-silicon vias.
- The cooling of the electronic amplification chiplet 106 can be performed at least in part through the photonic chiplet 108.

The semiconductor package 100 shown in FIGS. 1A to 1H can be modified to use any of the packaging techniques described in this document, such as those shown in FIGS. 8 to 34 and 37 to 38D.

In the example shown in FIGS. 1A to 1H, the fiber optic connectors 120 are optically coupled to optical fibers 122 that bend from a relatively vertical orientation (at the location where the optical fibers 122 are attached to the fiber optic connector 120) to another orientation that is less vertical (e.g., relatively horizontal). In a bent fiber connector, it can be harder to bend polarization-maintaining fibers (PMFs) at a tight radius than it is to bend standard single-mode fiber (SMF). Consequently, in the example shown in FIGS. 1A and 1, one can place the polarization-maintaining fibers at the outside of the fiber bundle where the fiber bend radius is largest, to avoid the bending issue of the polarization-maintaining fibers. Polarization-maintaining fibers can be used to feed in external laser light, in which the external laser light travels through waveguides to optical modulators after the light is coupled onto the photonic chiplet through optical couplers such as grating couplers. In the example of FIGS. 1A and 1B, by placing the polarization-maintaining fibers at the outside of the fiber bundle where the fiber bend radius is largest, the polarization-maintaining fibers are positioned nearest to the modulators on the photonic chiplet 108. As a result, the distance between of the high-power external laser source waveguides and the optical modulators can be minimized.

Figure 4A:
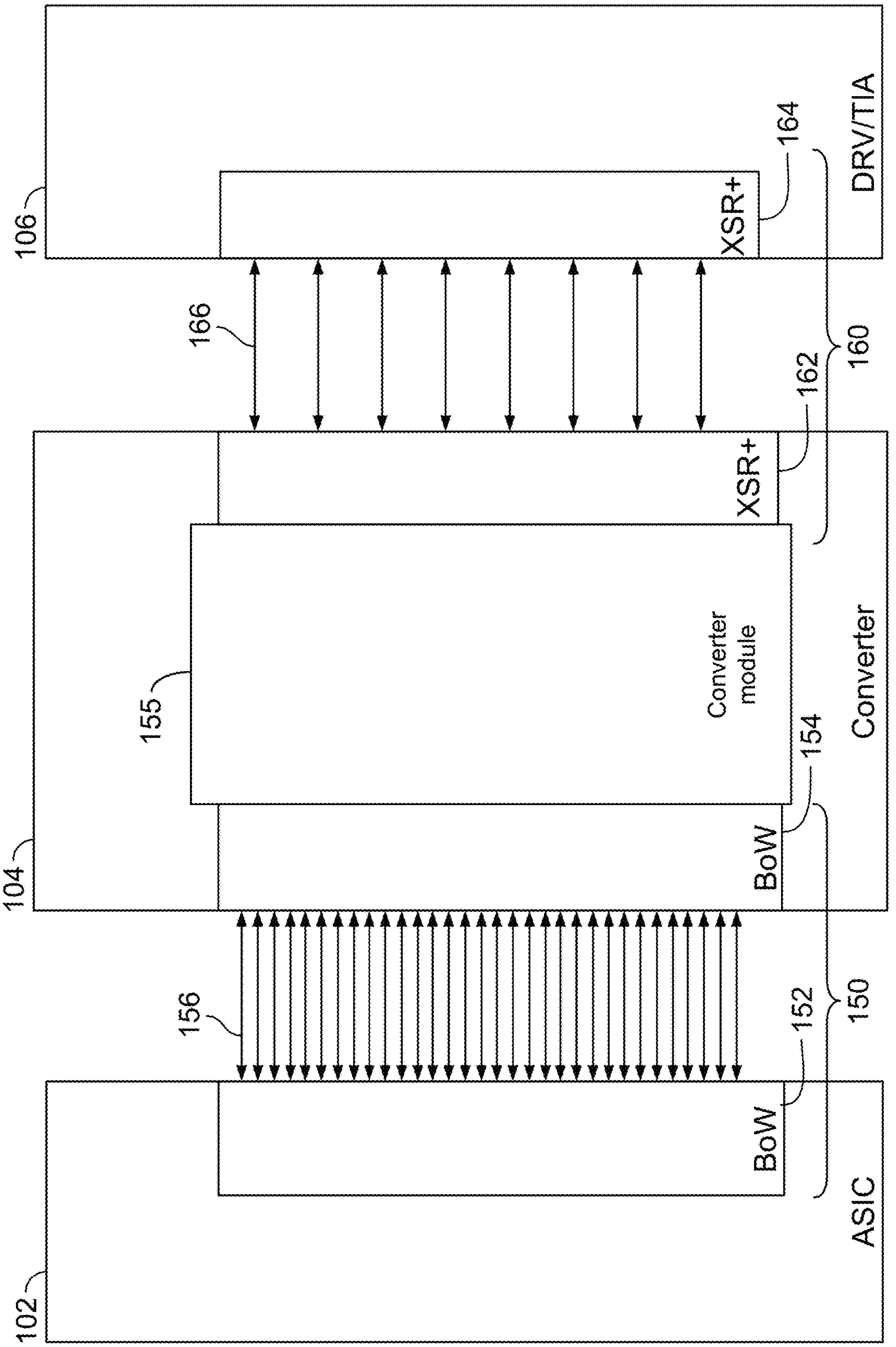
FIG. 4A is a diagram of an example of a converter chiplet that converts signals transmitted between a data processing chiplet and an electronic amplification chiplet.

Referring to FIG. 4A, in some implementations, the data processing chiplet 102 transmits or receives a slow-and-parallel data stream to or from the converter chiplet 104. The converter chiplet 104 transmits or receives a fast-and-serial data stream to or from the electronic amplification chiplet 106. The slow-and-parallel data stream can have a first set of a first number of bit streams, each bit stream at a first bit rate. The fast-and-serial data stream can have a second set of a second number of bit streams, each bit stream at a second bit rate. In some examples, the converter chiplet 104 adds coding overhead to the first set of the first number of bit streams in the process of converting the first set of the first number of bit streams to the second set of the second number of bit streams. In some examples, the product of the first number of bit streams and the first bit rate is approximately equal to the product of the second number of bit streams and the second bit rate. In some examples, the product of the first number of bit streams and the first bit rate is in a range from 66% to 150% of the product of the second number of bit streams and the second bit rate.

Implementing slow-and-parallel data transmission to/from the data processing chiplet 102 is beneficial because transceiver macros for slow-and-parallel transmission generally take up less area and consume less power than fast-and-serial transceiver macros. Consequently, slow-and-parallel input/output blocks take away less chip area from the computer-oriented data processing chiplet 102 than fast-and-serial input/output blocks, whose implementation is preferentially done in the dedicated converter chiplet 104.

In some examples, the second bit rate is at least twice the first bit rate. In some examples, the second bit rate is at least 4 times the first bit rate. In some examples, the second bit rate is at least 8 times the first bit rate. Here, "slow" and "fast" are relative terms. In some examples, the first bit rate can be 1 Gbps, 10 Gbps, or more per lane. In some examples, the second bit rate can be 1 Gbps, 10 Gbps, 50 Gbps, 100 Gbps, or more per lane. When we say that a device can communicate at a bit rate of N Gbps per lane, we mean that for at least some periods of time the device can transmit or receive signals at a bit rate of N Gbps per lane. The device can also transmit or receive signals at a lower bit rate per lane. When we say that a communication interface can support a bit rate of N Gbps per lane, we mean that data signals having a bit rate up to N Gbps per lane can be transmitted through the communication interface. The communication interface can also transmit signals at a lower bit rate per lane.

In the example shown in FIGS. 1A to 1C, 2, and 4, the interconnection between the data processing chiplet 102 and the converter chiplet 104 complies with the bunch of wire (BoW) (or similar wide, parallel input/output standard chiplet interface) channel/equalization specification. The pitch density can be, e.g., up to 500 lines/mm, and the data rate can be, e.g., 16 Gbps per lane. The interconnection between the converter chiplet 104 and the electronic amplification chiplet 106 complies with the XSR+ channel/equalization specification. The data rate can be, e.g., 112 Gbps per lane. The pitch density in the silicon interposer or in a substrate made using the FOWLP fabrication process can also have other values, subject to signal integrity electrical constraints to support the specified data rate.

The converter chiplet 104 performs signal format conversion between the electrical signals from/to the data processing chiplet 102 and the electrical signals to/from the electronic amplification chiplet 106. For example, for the signal paths from the data processing chiplet 102 to the electronic amplification chiplet 106, serializers (which can include multiplexers) are used to serialize the parallel signals. For the signal paths from the electronic amplification chiplet 106 to the data processing chiplet 102, deserializers (which can include de-multiplexers) are used parallelize the serial signals. In some examples, the signal paths from the data processing chiplet 102 to the electronic amplification chiplet 106 include dedicated lanes for forwarding a clock signal. In some examples, the signals from the electronic amplification chiplet 106 to the data processing chiplet 102 include embedded information used to forward a clock signal. Additional details and examples about forwarding clock signals and embedded information used to forward a clock signal are disclosed in U.S. Pat. No. 11,153,670, PCT published application WO 2021/211725, U.S. published application US 2021/0376950, and PCT published application WO 2021/247521.

In some implementations, a standard wide, parallel input/output interface (e.g., BoW interface) is provided between the data processing chiplet 102 and the converter chiplet 104. In the following description, we use the BoW interface as an example, but it can also be another wide, parallel input/output interface and not limited to the BoW interface. The data processing chiplet 102 includes a BoW block 152 that processes (e.g., amplifies, equalizes) electrical signals received from or transmitted to the converter chiplet 104 in a way that complies with the BoW specification. Similarly, the converter chiplet 104 includes a BoW block 154 that processes (e.g., amplifies, equalizes) electrical signals received from or transmitted to the data processing chiplet 102 in a way that complies with the BoW specification. Electrically conductive signal lines 156 provide signal paths for the electrical signals transmitted between the data processing chiplet 102 and the converter chiplet 104. The signal lines 156 can have a fine-pitch in a range from, e.g., 100 lines/mm to 500 lines/mm. The pitch density can further increase as semiconductor processes advances to increase interconnect density, e.g., using extreme ultraviolet and dual damascene technologies.

In some implementations, an XSR+ interface 160 is provided between the converter chiplet 104 and the electronic amplification chiplet 106. The converter chiplet 104 includes an XSR+ block 162 that processes (e.g., amplifies, equalizes) electrical signals received from or transmitted to the electronic amplification chiplet 106 in a way that complies with the XSR+ specification. Similarly, the electronic amplification chiplet 106 includes an XSR+ block 164 that processes (e.g., amplifies, equalizes) electrical signals received from or transmitted to the converter chiplet 104 in a way that complies with the XSR+ specification. Electrically conductive signal lines 166 provide signal paths for the electrical signals transmitted between the converter chiplet 104 and the electronic amplification chiplet 106. The signal lines 166 can have a coarse-pitch in a range from, e.g., 10 μm to 30 μm. The pitch can also be other values.

For example, the BoW interface 150 can support a bit rate of N1×R1, in which N1 is the number of parallel lanes or parallel bit streams, and R1 is the bit rate per lane or per stream. The XSR+ interface 160 can support a bit rate of N2×R2, in which N2 is the number of parallel lanes or parallel bit streams, and R2 is the bit rate per lane or per stream. The BoW interface 150 can have one or more dedicated lanes for clock forwarding. For example, the BoW blocks 152 and 154 can include commercially available BoW IP block macros. Each BoW IP block macro includes a BoW transmitter and receiver that can transmit and receive signals according to the BoW specification. The XSR+ blocks 162 and 164 can use commercially available XSR+IP block macros. Each XSR+IP block macro includes an XSR+ transmitter and receiver that can transmit and receive signals according to the XSR+ specification. The following assumes than N1>N2. For the signals transmitted from the data processing chiplet 102 to the electronic amplification chiplet 106, the BoW block 154 takes the N1 streams of signals each at a bit rate R1 and conditions them for multiplexing into N2 streams of signals each at a bit rate R2. The XSR+ block 162 receives signals from an internal bus and multiplexes the signals up to XSR+ rates (e.g., 100 Gbps), including TX/RX equalization and clock recovery. In the reverse direction, for the signals transmitted from the electronic amplification chiplet 106 to the data processing chiplet 102, the converter block 162 takes the N2 streams of signals each at a bit rate R2 and conditions them for de-multiplexing into N1 streams of signals each at a bit rate R1. The BoW block 154 receives signals from an internal bus and de-multiplexes the signals down to BoW rates (e.g., 16 Gbps), including TX/RX equalization and clock recovery. A converter module 155 is positioned between the BoW block 154 and the XSR+ block 162. The converter module 155 includes, e.g., internal buses that link the BoW block 154 and the XSR+ block 162, and other components that enable the converter chiplet 104 to perform the functions described below.

The BoW block 154 and the XSR+ block 162 of the converter chiplet 104 can have one or more of the following features:

- In the signal paths from the electronic amplification chiplet 106 to the data processing chiplet 102, the converter chiplet 104 causes the signals to be even more parallel, e.g., from R2=10 Gbps to a chip-internal bus at 100 Mbps.
- The converter chiplet 104 performs bit stuffing and/or bit skipping to accommodate asynchronous clocks (BoW<->XSR).
- The converter chiplet 104 applies a serial protocol such as an Ethernet MAC.
- The converter chiplet 104 applies forward error correction (FEC).
- The converter chiplet 104 performs switching lanes, interchanging lanes, interleaving lanes, or any combination of the above.
- The converter chiplet 104 performs traffic monitoring, policing, conditioning, or any combination of the above.
- The converter chiplet 104 performs packet buffering and switching.
- The converter chiplet 104 includes commercially available IP macros for Ethernet MAC, forward error correction, etc.

In some implementations, the interconnection between the data processing chiplet 102 and the converter chiplet 104 can comply with other parallel signal channel/equalization specifications, such as AIB or UCIe. For example, the BoW block 154 can be replaced with an AIB block (which can include AIB IP block macros) or a UCIe block (which can include UCIe block macros). The interconnection between the converter chiplet 104 and the electronic amplification chiplet 106 can comply with other serial signal channel/equalization specifications, such as XLR, LR, MR, SR, VSR, XSR, or USR. For example, the XSR+ block 162 can be replaced with an XLR block (which can include XLR IP block macros), an LR block (which can include LR IP block macros), an MR block (which can include MR IP block macros), an SR block (which can include SR IP block macros), a VSR block (which can include VSR IP block macros), an XSR block (which can include XSR IP block macros), or a USR block (which can include USR IP block macros). Thus, the converter chiplet 104 can be, e.g., a BoW-to-XLR converter, a BoW-to-LR converter, a BoW-to-MR converter, a BoW-to-SR converter, a BoW-to-VSR converter, a BoW-to-XSR converter, a BoW-to-USR converter, an AIB-to-XLR converter, an AIB-to-LR converter, an AIB-to-MR converter, an AIB-to-SR converter, an AIB-to-VSR converter, an AIB-to-XSR converter, an AIB-to-USR converter, an AIB-to-XSR+ converter, an UCIe-to-XLR converter, an UCIe-to-LR converter, an UCIe-to-MR converter, an UCIe-to-SR converter, an UCIe-to-VSR converter, an UCIe-to-XSR converter, an UCIe-to-USR converter, or an UCIe-to-XSR+ converter.

In some examples, both the first interconnection between the data processing chiplet 102 and the converter chiplet 104, and the second interconnection between the converter chiplet 104 and the photonic chiplet 106, can comply with parallel signal channel/equalization specifications. The converter chiplet 104 can function as a retimer and can be, e.g., a BoW-to-AIB converter, a BoW-to-UCIe converter, or an AIB-to-UCIe converter. In some examples, both the first interconnection and the second interconnection can comply with serial signal channel/equalization specifications. The converter chiplet 104 can function as a retimer and can be, e.g., an XLR-to-LR converter, an XLR-to-MR converter, an XLR-to-SR converter, an XLR-to-VSR converter, an XLR-to-XSR converter, an XLR-to-USR converter, an LR-to-XSR+ converter, an LR-to-MR converter, an LR-to-SR converter, an LR-to-XSR converter, an LR-to-USR converter, an LR-to-XSR+ converter, an MR-to-SR converter, an MR-to-VSR converter, an MR-to-XSR converter, an MR-to-USR converter, an MR-to-XSR+ converter, an SR-to-XSR converter, an SR-to-USR converter, an SR-to-XSR+ converter, an XSR-to-USR converter, an XSR-to-XSR+ converter, or an USR-to-XSR+ converter.

The BoW IP block macros are available from, e.g., Blue Cheetah, Sunnyvale, California. The UCIe IP block macros are available from, e.g., Synopsys, Sunnyvale, California. The XSR IP block macros are available from, e.g., Synopsys and Cadence Design Systems, San Jose, California. The LR/MR/VSR IP block macros are available from, e.g., Alphawave Semi, London, United Kingdom.

Figure 4B:
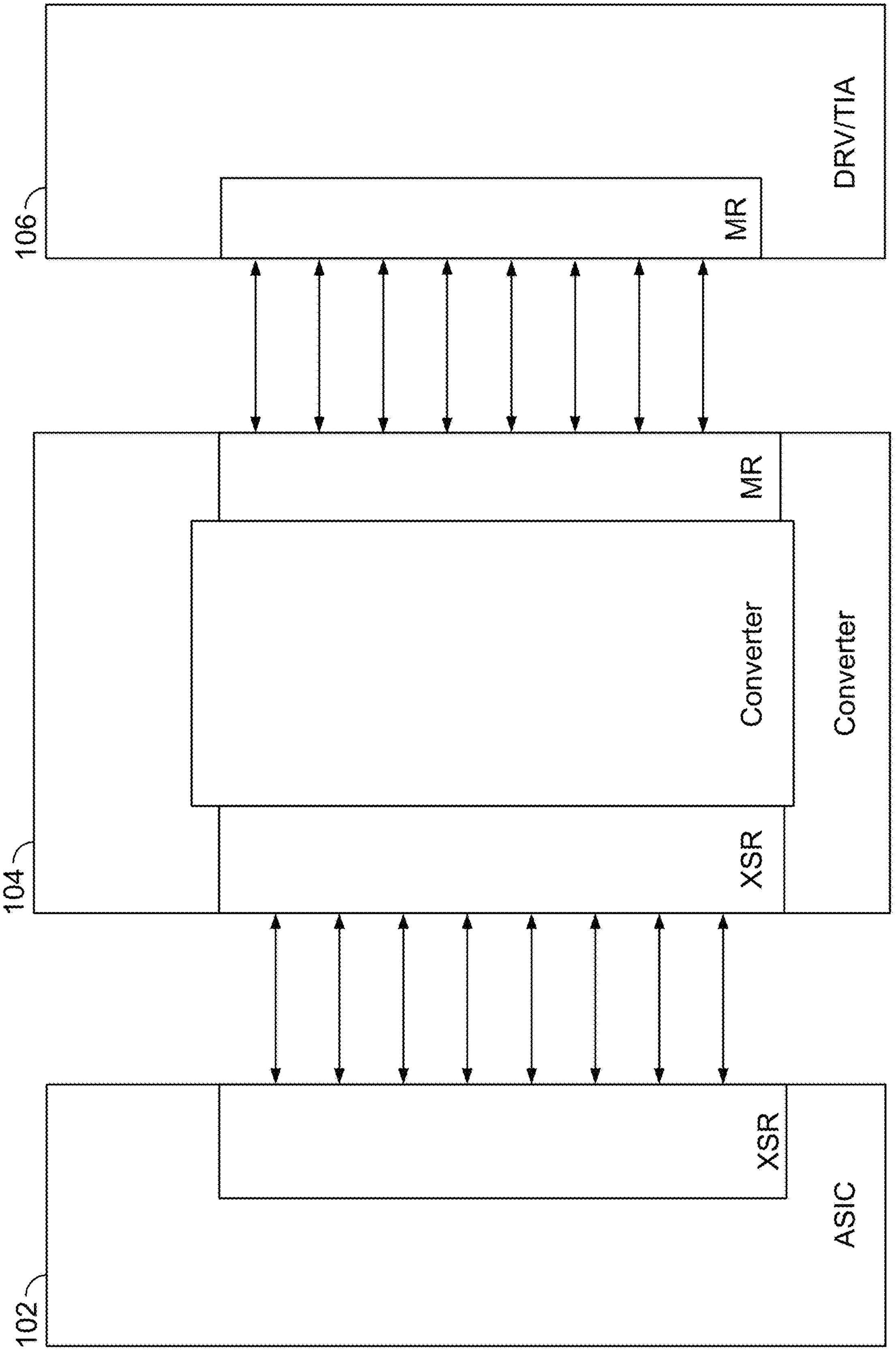
FIG. 4B is a diagram of another example of a converter chiplet that converts signals transmitted between a data processing chiplet and an electronic amplification chiplet.

Referring to FIG. 4B, in some implementations, the data processing chiplet 102 transmits or receives a first fast-and-serial data stream to or from the converter chiplet 104. The converter chiplet 104 transmits or receives a second fast-and-serial data stream to or from the electronic amplification chiplet 106. The first fast-and-serial data stream can comply with a specification that is different from that of the second fast-and-serial data stream. For example, the converter chiplet 104 can have an XSR interface towards the data processing chiplet 102 and an MR interface towards the electronic amplification chiplet 106.

Figure 4C:
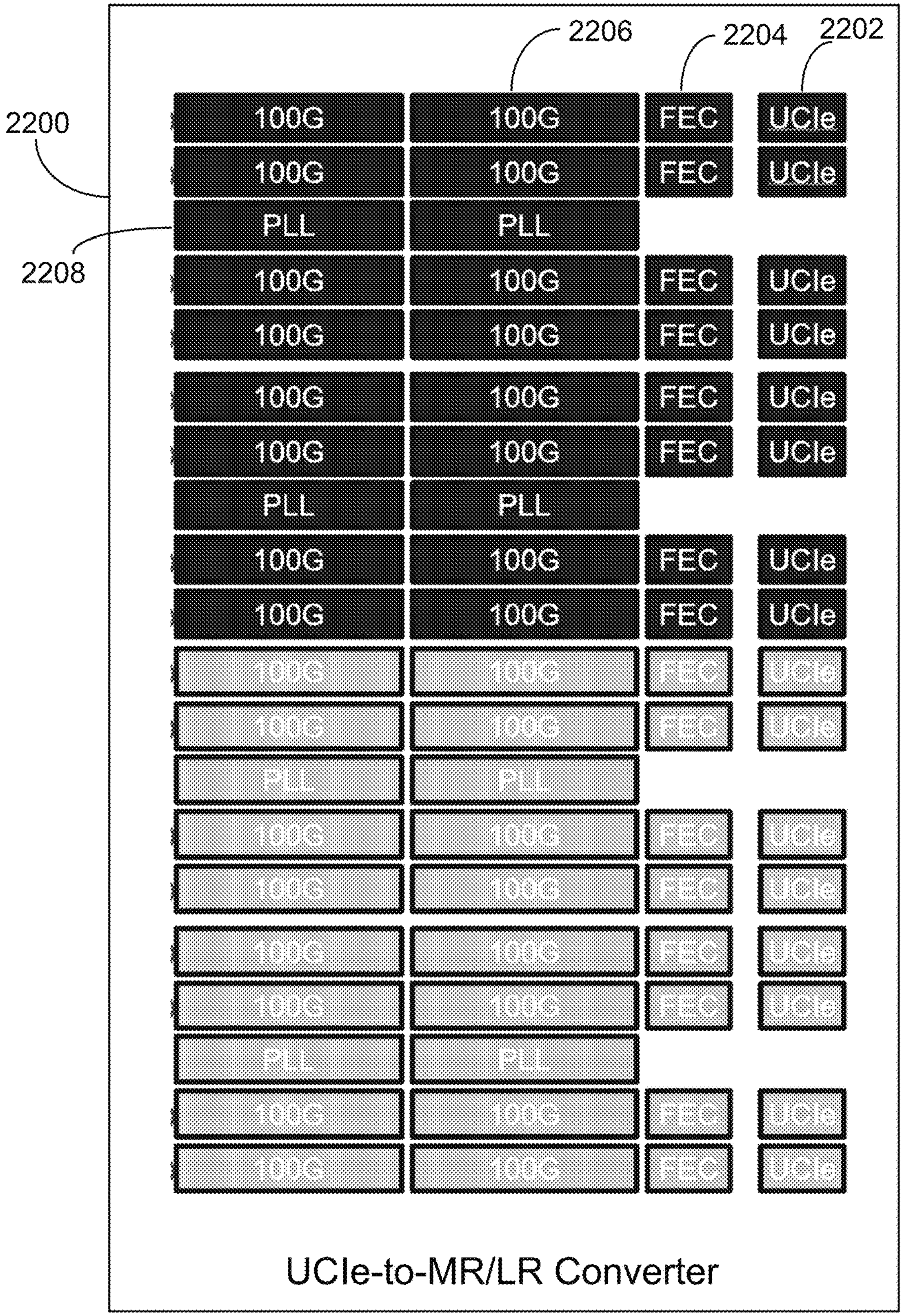
FIG. 4C is a diagram of an example of an UCIe-to-MR or UCIe-to-LR converter chiplet

FIG. 4C is a diagram of an example of an UCIe-to-MR or UCIe-to-LR converter chiplet 2200 that converts signals transmitted between a host ASIC that has an UCIe interface and a driver/TIA module that has an MR or LR interface. In this example, it is assumed that the host ASIC is positioned to the right side of the converter chiplet 2200 and communicates with the converter chiplet 2200 through UCIe signal lines. The driver/TIA module is positioned to the left side of the converter chiplet 2200 and communicates with the converter chiplet 2200 using 100G serial signals through MR or LR signal lines. In this example, the converter chiplet 2200 includes sixteen (16) UCIe blocks 2202 (eight for transmit and eight for receive), optionally sixteen (16) forward error correction (FEC) blocks 2204 (each FEC block corresponds to an UCIe block), thirty-two (32) 100G SerDes blocks 2206, and eight phase lock loop (PLL) blocks 2208. The number of blocks are merely examples, it is understood that the number of UCIe blocks, FEC blocks, 100G SerDes blocks, and PLL blocks can be different from above. In general, the aggregate UCIe bandwidth roughly matches the aggregate SerDes bandwidth. The UCIe blocks 2202 includes UCIe transmitters for transmitting UCIe signals to the UCIe interface of the host ASIC, and UCIe receivers for receiving UCIe signals transmitted from the UCIe interface of the host ASIC. The 100G SerDes block 2206 receives the UCIe signals in parallel lines and multiplexes the UCIe signals to 100G per lane high speed signals. In other examples, it is also possible to multiplex the UCIe signals to, e.g., 50G, 200G, 400G per lane high speed signals. The optional FEC blocks 2204 are positioned between the UCIe blocks 2202 and the 100G SerDes blocks to perform forward error correction. Other protocol-specific blocks (not shown) such as Ethernet Medium Access Protocol (MAC), PCIe protocols, NVLink protocols, Infiniband protocols, etc. may also be included in the converter chiplet, as may monitoring functions such as BER monitoring, eye quality monitoring, etc. Each phase lock loop block 2208 generates a clock signal that is shared by, e.g., four 100G SerDes blocks. In other examples, a PLL block can service 2, 8, 16, 32, or other numbers of SerDes blocks.

For example, if the host ASIC has an ABI or BoW interface, the UCIe blocks 2202 can be replaced with AIB blocks or BoW blocks. If the driver/TIA module has a 200 G, PCIe Gen 6, or PCIe Gen 7 high speed serial interface, the 100G SerDes blocks 2206 can be replaced with 200 G, PCIe Gen 6, or PCIe Gen 7 blocks. Similarly, the converter chiplets shown in FIGS. 4A to 4C and those described elsewhere in this document can be adapted to process signals that comply with future slow-and-parallel signal standards as well as fast-and-serial signal standards in the spirit of this disclosure.

In some examples, the converter chiplet 104 can include a continuous-time linear equalizer.

The following describes an exemplary manufacturing process for making an exemplary semiconductor package that includes a data processing chiplet and a photonic chiplet.

Figure 5:
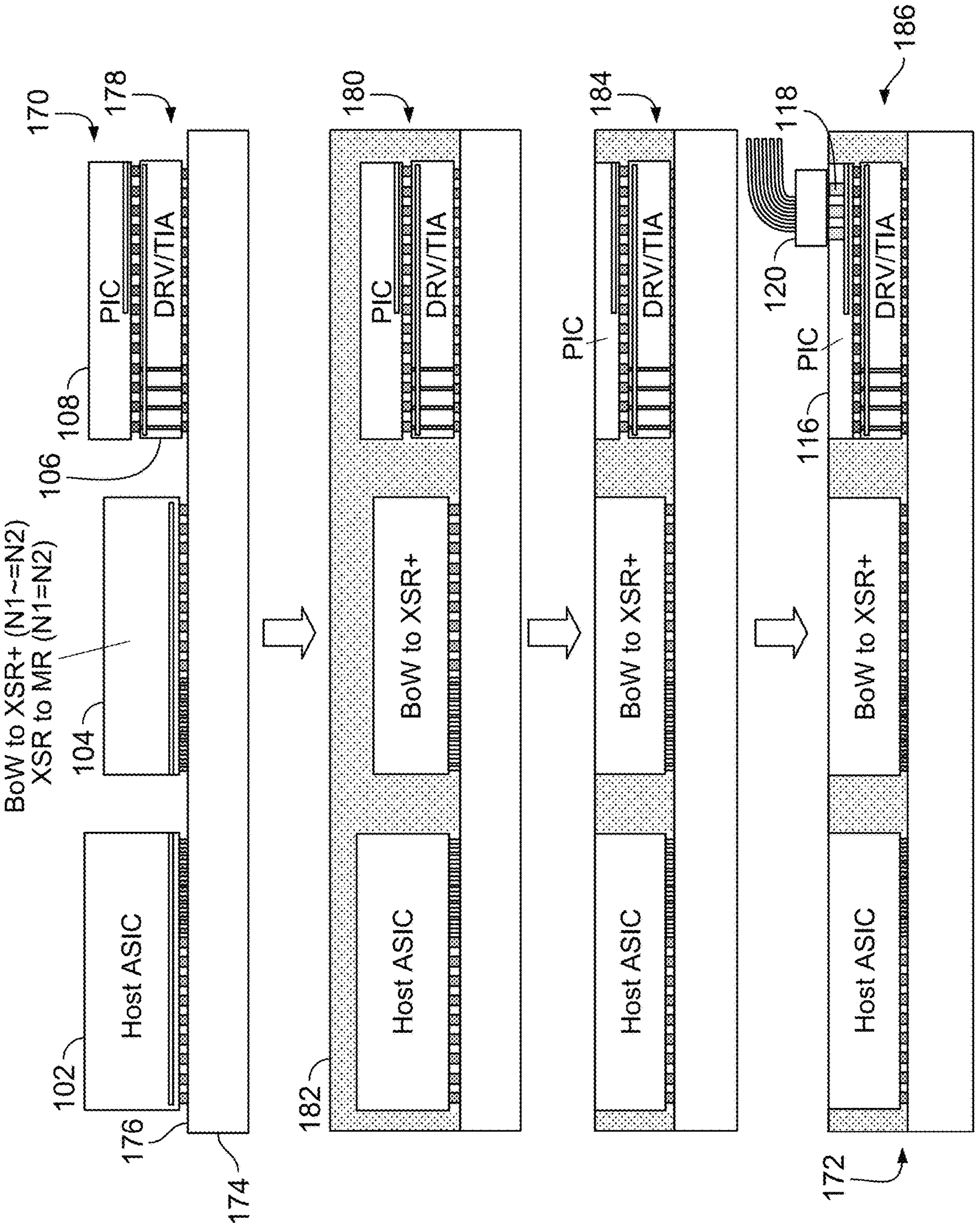
FIG. 5 is a diagram of an exemplary fabrication process for making an exemplary semiconductor package.

FIG. 5 shows an exemplary fabrication process 170 for making an exemplary semiconductor package 172 similar to the one shown in FIGS. 1A to 1C and 2. In a first step 178, the data processing chiplet 102, the converter chiplet 104, and the combination of photonic chiplet 108 and electronic amplification chiplet 106 are placed on a carrier wafer 174, which can be, e.g., a silicon interposer or a substrate that includes silicon bridges (e.g., a coarse-pitched organic substrate embedded with fine-pitch silicon bridges). See FIG. 37 for an example of a semiconductor package that includes a data processing chiplet, a converter chiplet, and a combination of a photonic chiplet and an electronic amplification chiplet mounted on a common substrate that uses one or more silicon bridges. FIG. 5 shows a portion of the carrier wafer 174 and the chiplets that are included in a single semiconductor package 172. It is understood that at the start of the process 170, the carrier wafer 174 can include a plurality of dies, and the carrier wafer 174 is cut or diced into multiple semiconductor packages in a later step in the process 170. See FIGS. 39 and 40 for examples of components (e.g., data processing chiplets, converter chiplets, electronic amplification chiplets, and photonic chiplets) formed or mounted on a semiconductor wafer or a panel substrate, in which the semiconductor wafer or the panel substrate is processed to produce multiple dies in parallel.

Figure 7:
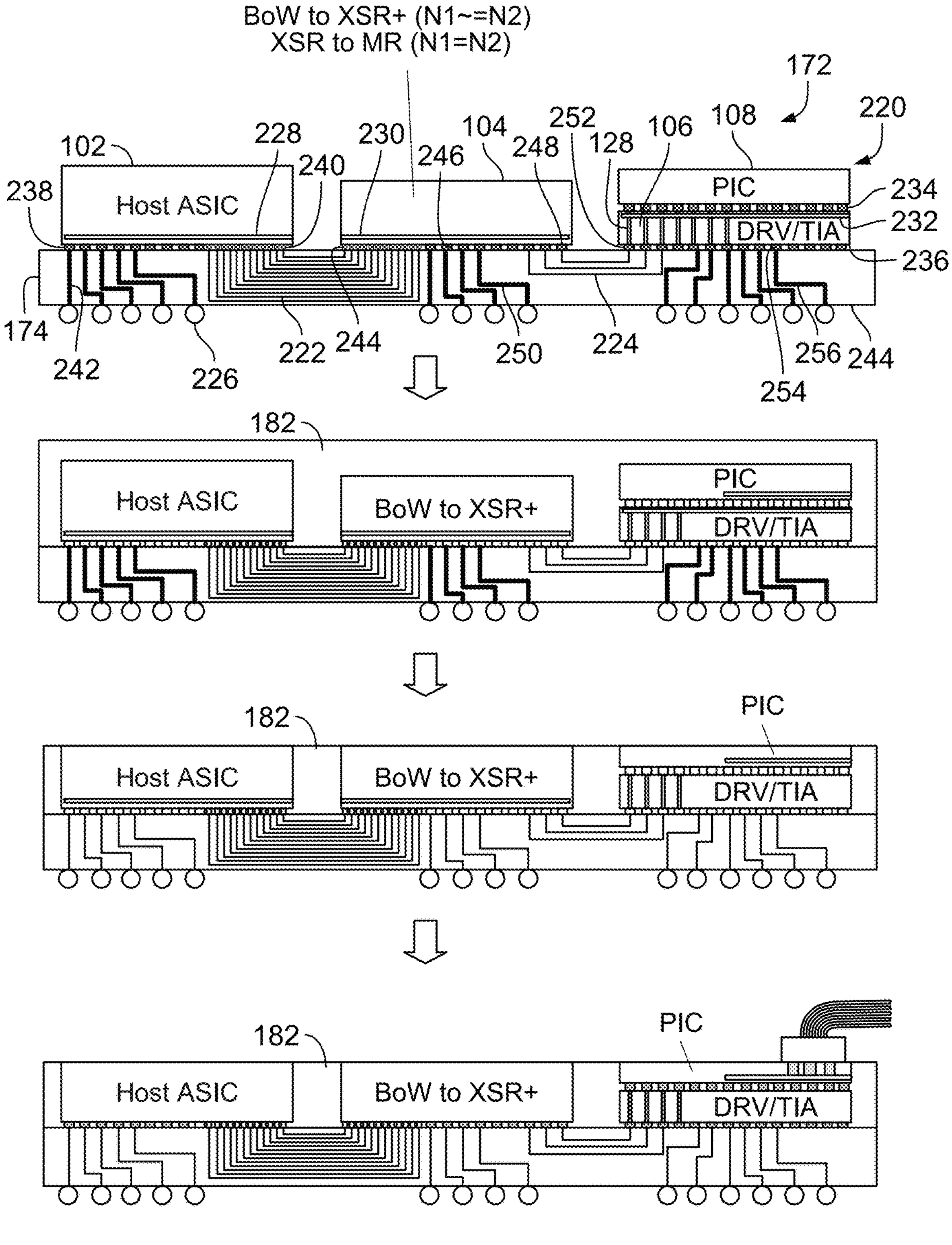
FIGS. 7 and 8 are diagrams of exemplary fabrication processes for making exemplary semiconductor packages.

The carrier wafer 174 has a top surface 176 that includes a predefined pattern of bump contacts and signal lines. The data processing chiplet 102, the converter chiplet 104, and the electronic amplification chiplet 106 are mounted on the carrier wafer 174 such that respective bump contacts on the bottom sides of the data processing chiplet 102, the converter chiplet 104, and the electronic amplification chiplet 106 are electrically connected to respective matching bump contacts on the carrier wafer 174. A first set of a first number N1 of signal lines on the carrier wafer interconnects the data processing chiplet 102 and the converter chiplet 104. A second set of a second number N2 signal lines on the carrier wafer 174 interconnects the converter chiplet 104 and the electronic amplification chiplet 106. The signal lines that interconnect the data processing chiplet 102 and the converter chiplet 104, and the signal lines that interconnect the converter chiplet 104 and the electronic amplification chiplet 106, are shown in FIG. 7.

In some examples, the first interconnection between the data processing chiplet 102 and the converter chiplet 104 complies with the BoW specification (or another parallel channel/equalization specification), and the second interconnection between the converter chiplet 104 and the electronic amplification chiplet 106 complies with the XSR+ specification (or another serial channel/equalization specification). In some examples, $N1\times R1$ $N2\times R2$, in which R1 is the bit rate for each of the N1 streams, and R2 is the bit rate for each of the N2 streams. In some examples, $0.66\times N2\times R2\leq N1\times R1\leq 1.5\times N2\times R2$. In some examples, $2\times R1\leq R2$, or $4\times R1\leq R2$, or $8\times R1\leq R2$.

In some examples, both the first interconnection (between the data processing chiplet 102 and the converter chiplet 104) and the second interconnection (between the converter chiplet 104 and the electronic amplification chiplet 106) comply with parallel channel/equalization specifications (e.g., BoW, AIB, or UCIe). In this case, N1=N2. Similarly, in some examples, both the first interconnection and the second interconnection comply with serial channel/equalization specifications (e.g., XLR, LR, MR, SR, XSR, or XSR+). In this case, N1=N2.

In an optional second step 180, an overmolding process is performed in which a molding compound 182 is overmolded on the carrier wafer 174 and the chiplets 102, 104, 106, 108. The molding compound is cured and hardened. Different molding compounds can have different curing processes. In the examples below, the curing steps are omitted from the description of the manufacturing processes, but it is understood that curing steps can be applied as needed. The molding compound 182 can provide additional structural support for the semiconductor package 172.

In an optional third step 184, a grinding process is performed to reduce the thickness of the molding compound 182 and some of the chiplets so that the top surfaces of the data processing chiplet 102, the converter chiplet 104, and the photonic chiplet 108 are exposed. This step is performed if the overmolding process in the optional second step 180 is performed. Exposing the data processing chiplet 102 and the converter chiplet 104 improves heat dissipation from the chiplets. Exposing the photonic chiplet 108 enables the photonic chiplet 108 to gain access to the external optical link.

In a fourth step 186, the back side 116 of the photonic chiplet 108 (which in the figure is the top side of the photonic chiplet 108 since the photonic chiplet 108 is flip-chip mounted on the electronic amplification chiplet 106) is etched to define openings 118 that expose the buried oxide silica layer 132 at locations above the grating couplers 134. The design of the grating couplers 134 depend on the operating wavelength and on the stack of materials in the active layer 112. Anti-reflection coating 136 can be applied to the exposed surfaces of the buried oxide silica layer 132. In some examples, some anti-reflection coating may be applied to the back side of the photonic chiplet in the vicinity of the openings. A fiber optic connector 120, or a vertically coupled fiber array, is attached to the photonic chiplet 102.

Figure 89:
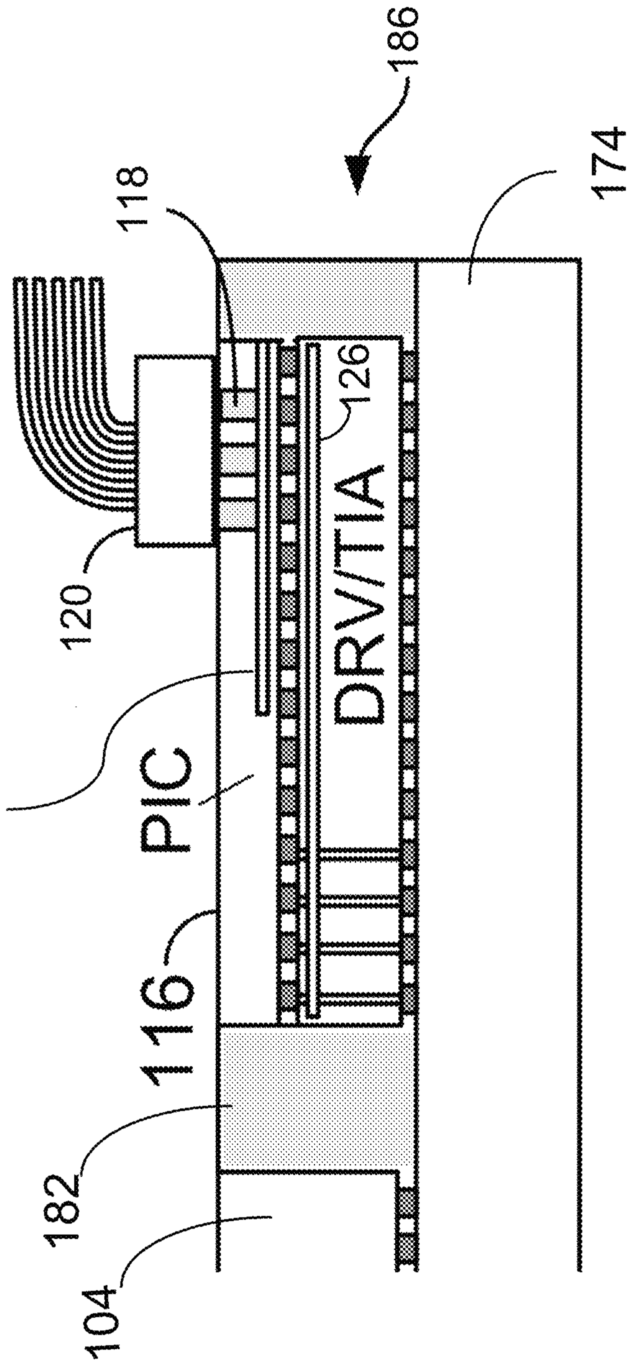
FIG. 89 shows an enlarged view of the right portion of the semiconductor package 172 of FIG. 5.

FIG. 89 shows an enlarged view of the right portion of the semiconductor package 172 of FIG. 5.

In some implementations, the chiplets 102, 104, 106, 108 for multiple semiconductor packages 172 are mounted on the carrier wafer 110. The processing steps 178, 180, and 184 are performed on multiple semiconductor packages on the carrier wafer 110 in parallel, e.g. in a wafer-level or in a panel-level process. (See FIGS. 39 and 40 for examples of components (e.g., data processing chiplets, converter chiplets, electronic amplification chiplets, and photonic chiplets) formed or mounted on a semiconductor wafer or a panel substrate, in which the semiconductor wafer or the panel substrate is processed to produce multiple dies in parallel.) After the openings 118 at the back side 116 of the photonic chiplets 108 are formed, the carrier wafer 110 is cut or diced to form individual semiconductor packages 176. The optical fiber connector or vertically coupled fiber array 120 is then attached to each of the photonic chiplet 108.

In some alternative implementations, a semiconductor package includes the data processing chiplet 102, the converter chiplet 104, and the combination of the photonic chiplet 108 and the electronic amplification chiplet 106 mounted on a common substrate with redistribution layers made in a fan-out wafer-level packaging (FoWLP) process. The processing steps for fabricating the common substrate with redistribution layers made in a fan-out wafer-level packaging (FoWLP) process can be similar to those shown in FIGS. 30 and 31.

Figure 37:
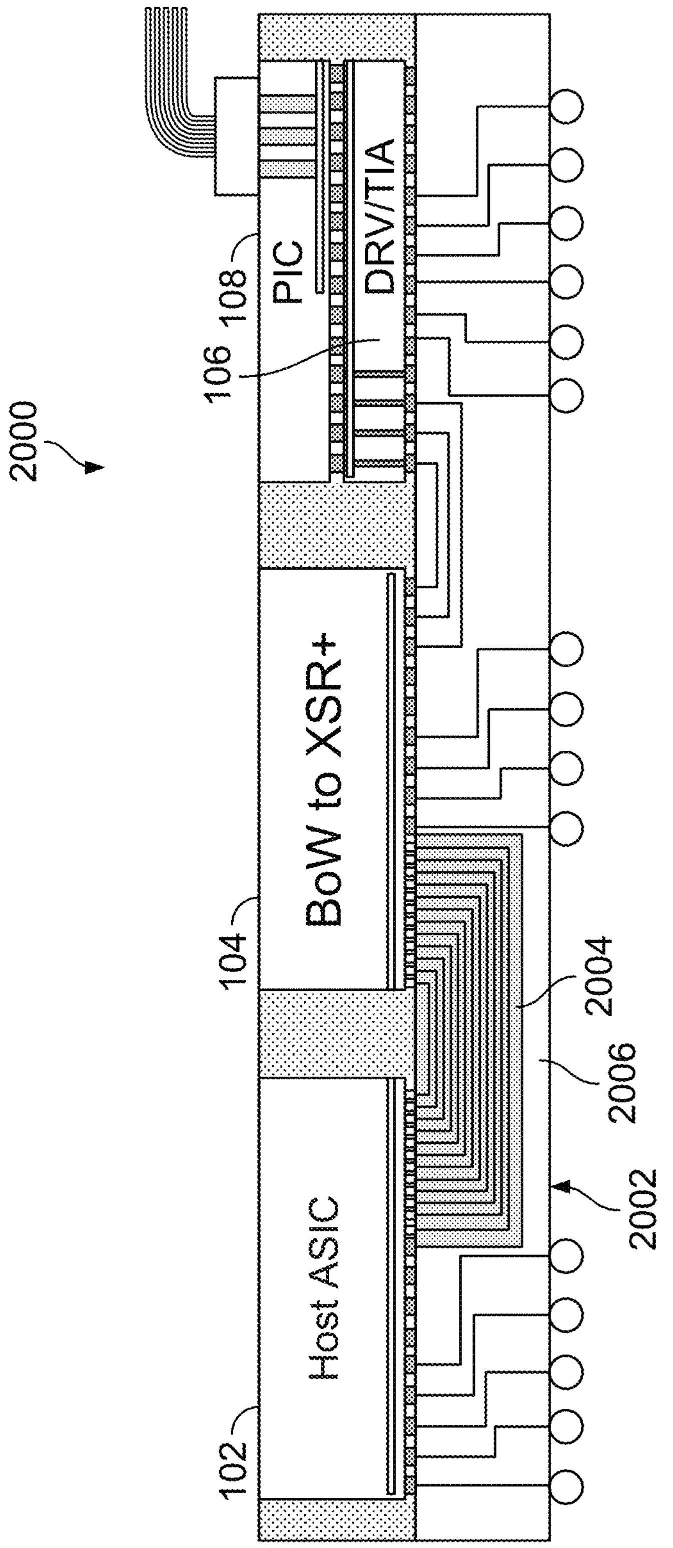
FIG. 37 is a diagram of an example of a semiconductor package that includes a data processing chiplet, a converter chiplet, and a combination of a photonic chiplet and an electronic amplification chiplet mounted on a common substrate that uses one or more silicon bridges.

Referring to FIG. 37, in some alternative implementations, a semiconductor package 2000 includes the data processing chiplet 102, the converter chiplet 104, and the combination of the photonic chiplet 108 and the electronic amplification chiplet 106 mounted on a common substrate 2002 that uses one or more silicon bridges 2004. The processing steps for fabricating the semiconductor package 2000 can be similar to the processing steps shown in FIG. 5, except that the common substrate 2002 includes one or more fine-pitched silicon interposers 2004 that are embedded into a coarse-pitched package substrate material 2006. For example, a fine-pitched silicon interposer is positioned underneath the BoW interface 150 and supports the fine-pitched bump contacts and fine-pitched signal lines of the BoW interface 150 between the data processing chiplet 102 and the BoW-to-XSR+ converter chiplet 104.

Figure 6A:
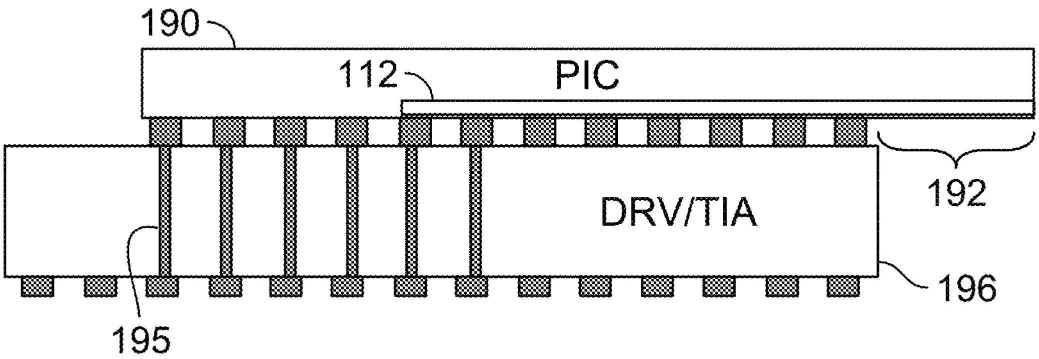
FIGS. 6A to 6C are diagrams of exemplary configurations of a photonic chiplet and an electronic amplification chiplet.

In some implementations, the lateral dimensions of the photonic chiplet 108 can be different from the lateral dimensions of the electronic amplification chiplet 106. Referring to FIG. 6A, in some examples, a photonic chiplet 190 includes a portion 192 that overhangs an electronic amplification chiplet 194. The electronic amplification chiplet 194 includes through-silicon vias 195 the electrically active layer of the electronic amplification chiplet 194 to the side of the electronic amplification chiplet 194 opposite the electrically active layer.

Figure 6B:
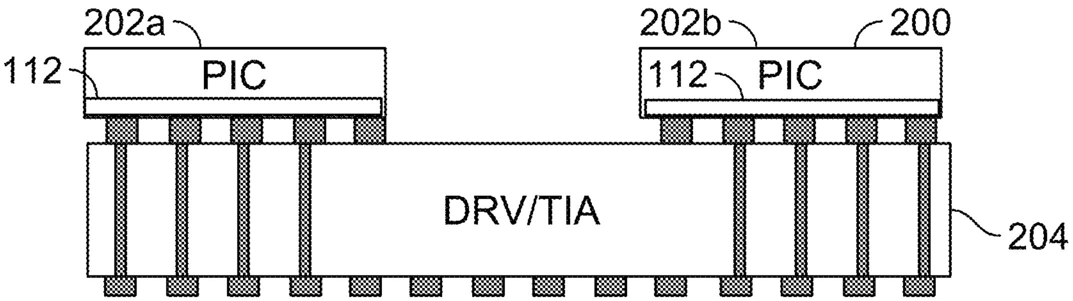

Referring to FIG. 6B, a photonic chiplet 200 can include two or more subparts, e.g., 202*a* and 202*b*, and the footprint of the photonic chiplet 200 can overlap a fraction of the footprint of an electronic amplification chiplet 204.

Figure 6C:
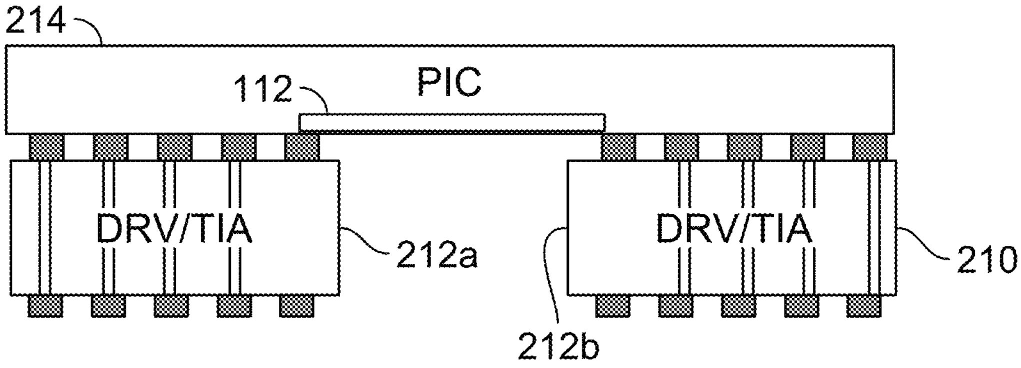

Referring to FIG. 6C, an electronic amplification chiplet 210 can include two or more subparts, e.g., 212*a*, 212*b*, and the footprint of the electronic amplification chiplet 210 can overlap a fraction of the footprint of a photonic chiplet 214.

Figure 90A:
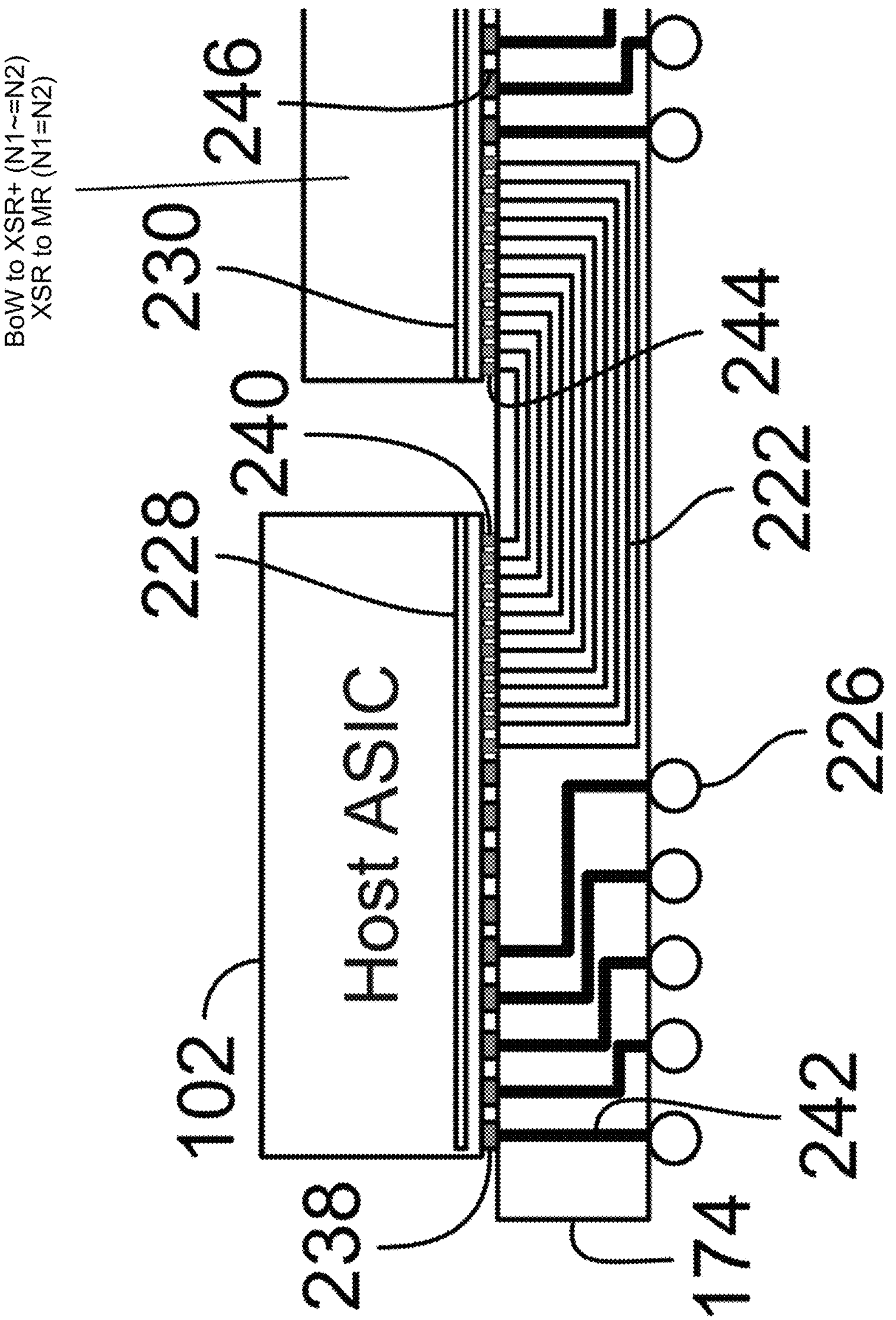
FIG. 90A shows an enlarged view of the upper left portion of FIG. 7.
Figure 90B:
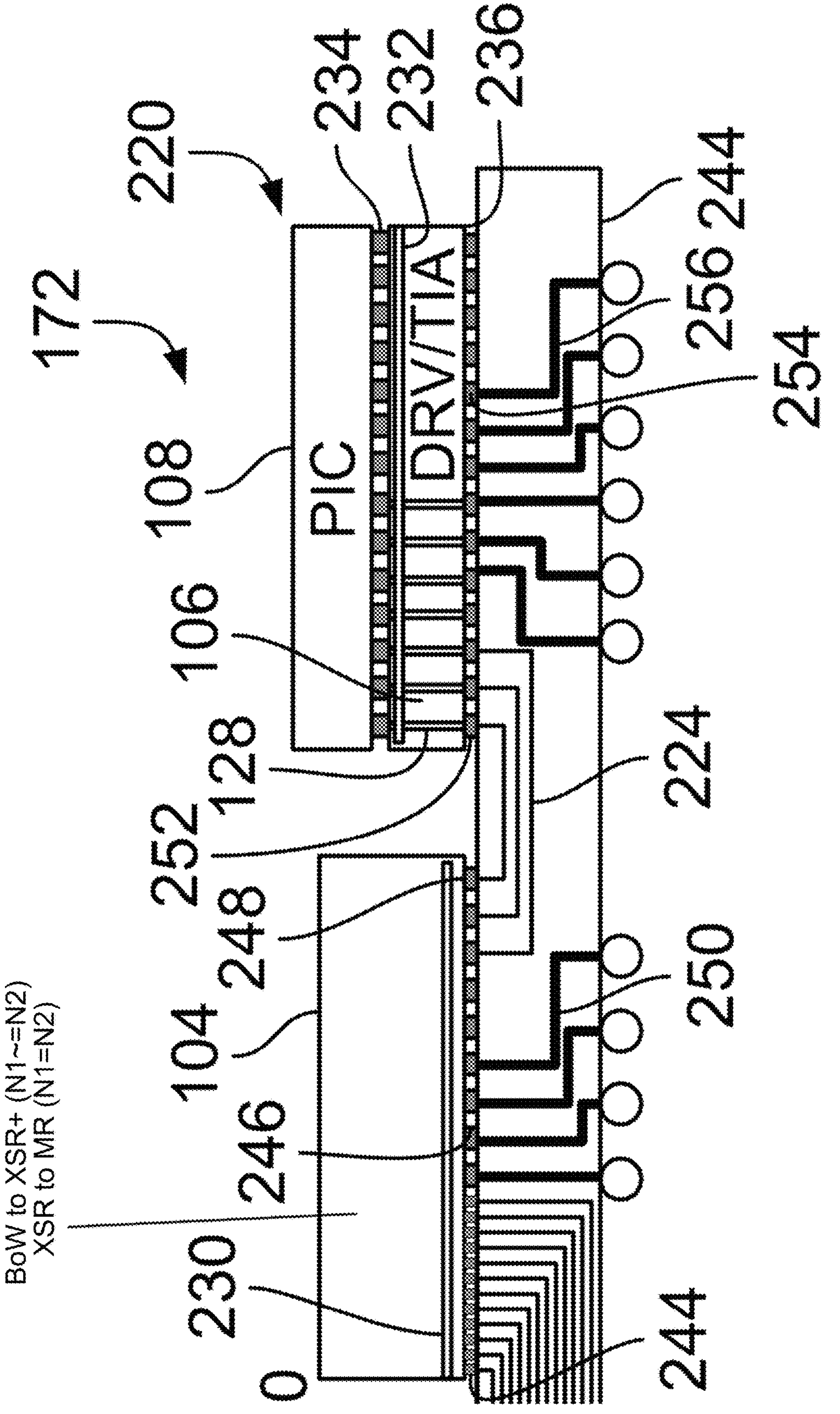
FIG. 90B shows an enlarged view of the upper right portion of FIG. 7.

FIG. 7 shows an exemplary fabrication process 220 that includes processing steps that are similar to the processing steps of the process 170 shown in FIG. 5. In FIG. 7, the electrical connections on or embedded in the carrier wafer 174 are schematically shown. FIG. 90A shows an enlarged view of the upper left portion of FIG. 7. FIG. 90B shows an enlarged view of the upper right portion of FIG. 7. The carrier wafer 174 has a first set of signals lines 222 and a second set of signal lines 224. The first set of signal lines 222 interconnect the data processing chiplet 102 to the converter chiplet 104, and have a fine pitch. The second set of signals lines 224 interconnect the converter chiplet 104 and the electronic amplification chiplet 106, and have a coarse pitch. Also shown in the figure are the electrical contacts 226 at the bottom side 244 of the carrier wafer 174, which enable the completed semiconductor package 172 to be electrically coupled to other devices.

The blue line 228 in the data processing chiplet 102 represents the electrically active layer of the data processing module 102. The blue line 230 in the converter chiplet 104 represents the electrically active layer having circuitry components of the converter module 104. The blue line 232 in the electronic amplification chiplet 106 represents the electrically active layer having circuitry components of the electronic amplification module 106. In this example, the electrically active layer 232 of the electronic amplification chiplet 106 is positioned near the top side 234. The electrically active layer 232 of the electronic amplification chiplet 106 is electrically coupled to the bottom side 236 of the chiplet 106 using through-silicon vias 128.

In some alternative examples, the electrically active layer 232 of the electronic amplification chiplet 106 can be positioned near the bottom side 236, and is electrically coupled to the top side 234 of the chiplet 106 using through-silicon vias 128.

In this example, the data processing chiplet 102 has a set of coarse-pitch bump contacts 238 and a set of fine-pitch bump contacts 240. Some of the coarse-pitch bump contacts 238 are electrically coupled to through-silicon vias 242 in the carrier wafer 174 (assuming the carrier wafer 174 is a silicon wafer) that are electrically coupled to the electrical contacts 226 at the bottom side 244 of the carrier wafer 174. The fine-pitch bump contacts 240 of the data processing chiplet 102 are electrically coupled to the signal lines 222 of the BoW interface. The converter chiplet 106 has a set of fine-pitch bump contacts 244, a first set of coarse-pitch bump contacts 246, and a second set of coarse-pitch bump contacts 248. The fine-pitch bump contacts 244 of the converter chiplet 106 are electrically coupled to the signal lines 222 of the BoW interface. The first set of coarse-pitch bump contacts 246 are electrically coupled to through-silicon vias 250 in the carrier wafer 174 that are electrically coupled to the electrical contacts 226 at the bottom side 244 of the carrier wafer 174. The second set of coarse-pitch bump contacts 248 are electrically coupled to the signal lines 224 of the XSR+ interface. The electronic amplification chiplet 106 has a first set of coarse-pitch bump contacts 252 and a second set of coarse-pitch bump contacts 254. The first set of coarse-pitch bump contacts 252 of the electronic amplification chiplet 106 are electrically coupled to the signal lines 224 of the XSR+ interface. The second set of coarse-pitch bump contacts 254 are electrically coupled to through-silicon vias 256 in the carrier wafer 174 that are electrically coupled to the electrical contacts 226 at the bottom side 244 of the carrier wafer 174.

In some examples, the data processing chiplet 102 has an input/output interface that is compatible with a serial interface specification, such as XSR, and the electronic amplification chiplet 104 has an input/output interface that is also compatible with the serial interface specification. In this case, the converter chiplet 104 functions as a retimer, such as an XSR-to-XSR retimer.

Figure 8:
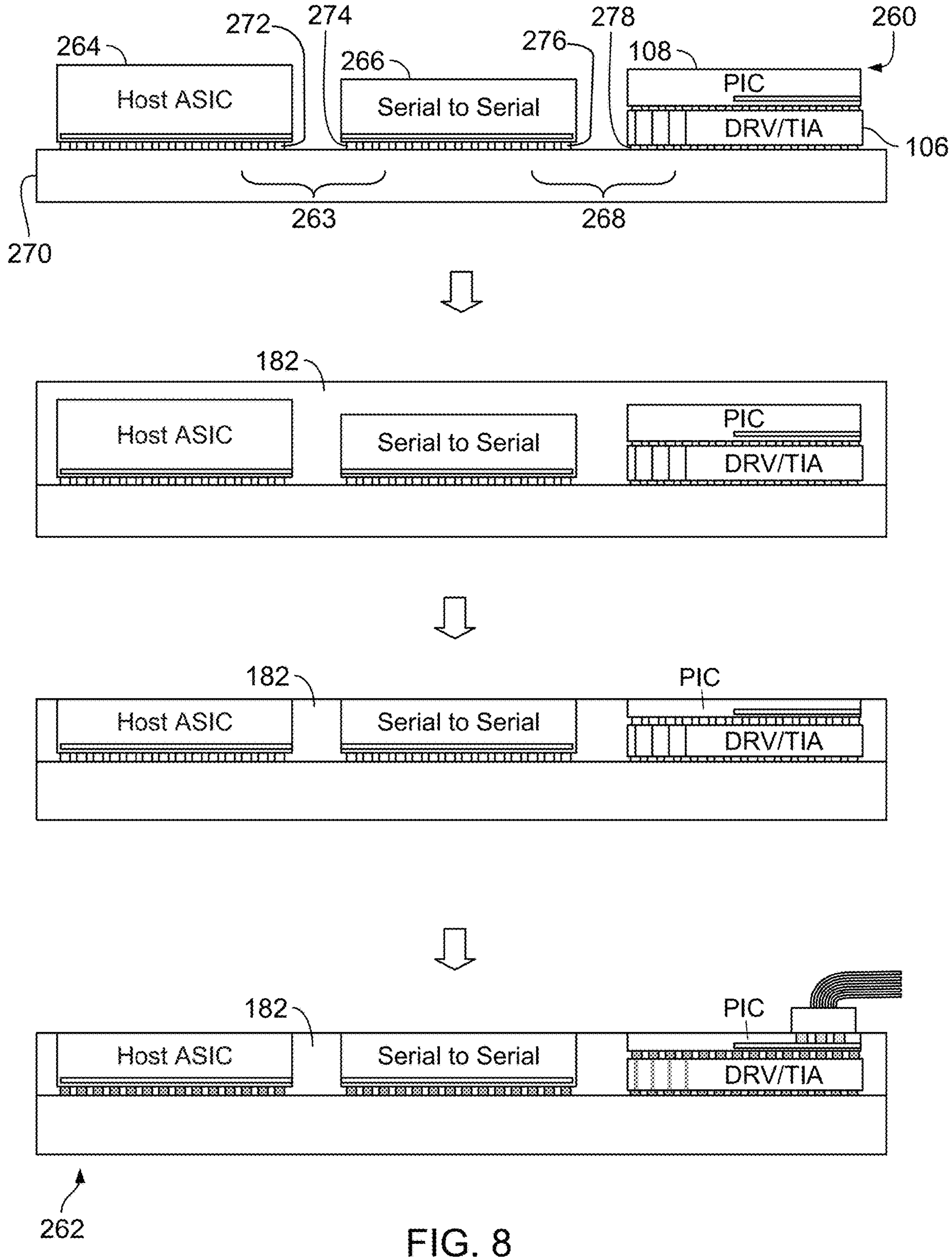

FIG. 8 shows an exemplary process 260 that includes processing steps for fabricating an exemplary semiconductor package 262 that includes a data processing chiplet 264, a converter chiplet 266, an electronic amplification chiplet 106, and a photonic chiplet 108 directly or indirectly mounted on a common substrate 270. A first serial interface 263 is provided between the data processing chiplet 264 and the converter chiplet 266, and a second serial interface 268 is provided between the converter chiplet 266 and the electronic amplification module 106. The processing steps shown in FIG. 8 are similar to the processing steps shown in FIG. 7, except that the fine-pitch contacts and signal lines associated with the BoW interface in FIG. 7 are replaced with coarse-pitch contacts and signal lines associated with the first serial interface 263 in FIG. 8.

The data processing chiplet 264 has a first set of coarse-pitch bump contacts electrically coupled to through-silicon vias of the carrier wafer 270, and a second set of coarse-pitch bump contacts 272 electrically connected to the signal lines of the first interface 263. The converter chiplet 106 has a first set of coarse-pitch bump contacts 274 electrically connected to the signal lines of the first interface 263, a second set of coarse-pitch bump contacts electrically coupled to through-silicon vias of the carrier wafer 270, and a third set of coarse-pitch bump contacts 276 electrically connected to the signal lines of the second interface 268. The electronic amplification chiplet 106 has a first set of coarse-pitch bump contacts 278 electrically connected to the signal lines of the second interface 268, and a second set of coarse-pitch bump contacts electrically connected to through-silicon vias of the carrier wafer 270.

In some alternative implementations, a semiconductor package includes the data processing chiplet 264, the converter chiplet 266, and the combination of the photonic chiplet 108 and the electronic amplification chiplet 106 mounted on a common substrate with redistribution layers made in a fan-out wafer-level packaging (FoWLP) process. The processing steps for fabricating a common substrate with redistribution layers made in a fan-out wafer-level packaging (FoWLP) process can be similar to those shown in FIGS. 30 and 31.

Figure 9:
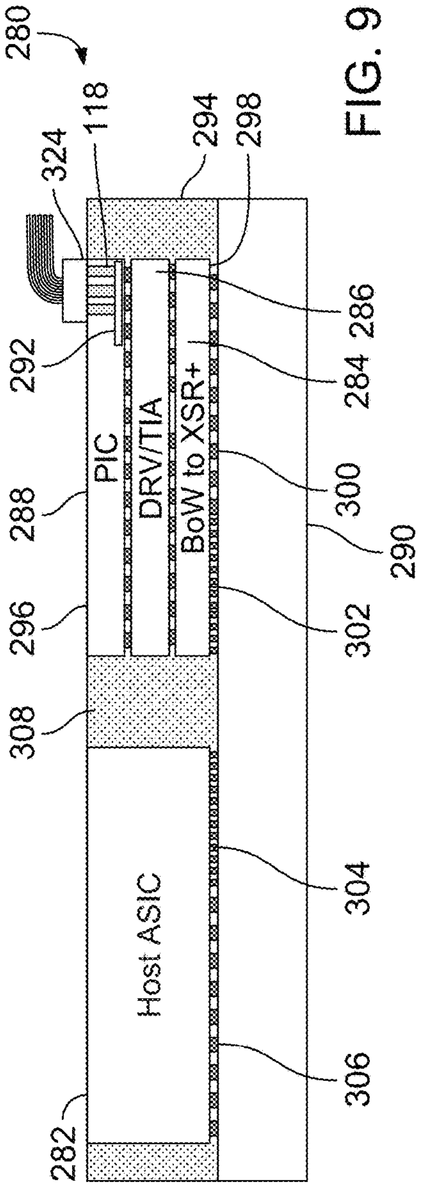
FIG. 9 is a diagram of an example of a semiconductor package that includes a data processing chiplet, a converter chiplet, an electronic amplification chiplet, and a photonic chiplet that are directly or indirectly mounted on a common substrate.
Figure 91A:
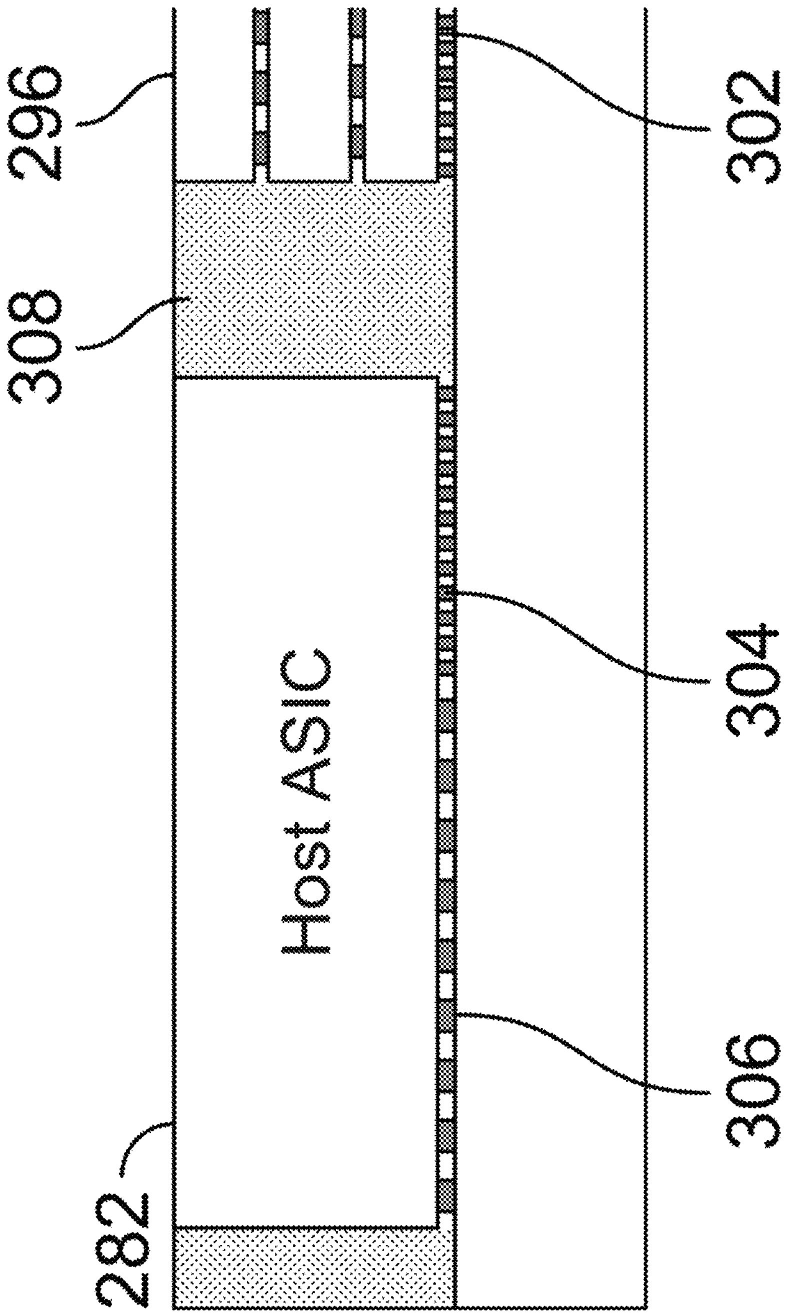
FIG. 91A is an enlarged view of the left portion of the semiconductor package of FIG. 9.
Figure 91B:
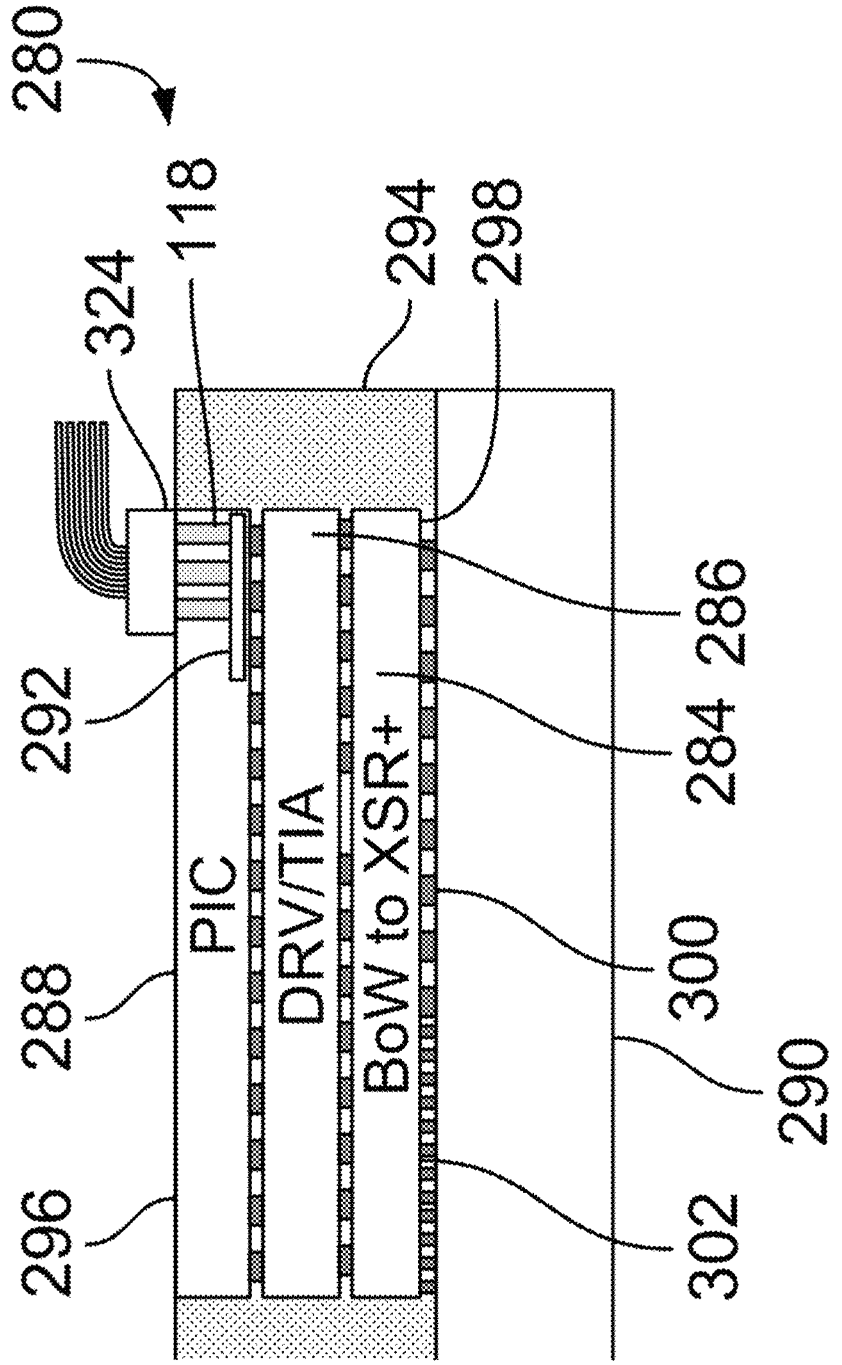
FIG. 91B is an enlarged view of the right portion of the semiconductor package of FIG. 9.

FIG. 9 shows an example of a semiconductor package 280 that includes a data processing chiplet 282, a BoW-to-XSR+ converter chiplet 284, an electronic amplification chiplet 286, and a photonic chiplet 288 that are directly or indirectly mounted on a common substrate 290. FIG. 91A is an enlarged view of the left portion of the semiconductor package 280 of FIG. 9. FIG. 91B is an enlarged view of the right portion of the semiconductor package 280 of FIG. 9. In some examples, the common substrate 290 can be, e.g., a silicon interposer or a substrate made of another material. In some examples, the common substrate 290 is a substrate that includes silicon bridges. For example, the data processing chiplet 282 can include components similar to those of the data processing chiplet 102 (FIGS. 1A to 1C and 2). The BoW-to-XSR+ converter chiplet 284 can include components similar to those of the BoW-to-XSR+ converter chiplet 104 (FIGS. 1A to 1C and 2). The converter chiplet 284 includes through-silicon vias. The electronic amplification chiplet 286 can include components similar to those of the electronic amplification chiplet 106 (FIGS. 1A to 1C and 2). The photonic chiplet 288 can include components similar to those of the photonic chiplet 108 (FIGS. 1A to 1C and 2). In this example, the photonic chiplet 288 uses back-side illumination. The photonic chiplet 288 has an optically active layer 292 on or near the bottom side 294 (so the bottom side 294 is the optically active side, and the top side 296 is the back side of the photonic chiplet 288). The photonic chiplet 288 uses back-side illuminated grating couplers 134 and includes the openings 118 and the antireflection coatings 136 shown in FIG. 3. The data processing chiplet 282 is mounted directly on the common substrate 290. The photonic chiplet 288 is mounted on the electronic amplification chiplet 286, the electronic amplification chiplet 286 is mounted on the converter chiplet 284, and the converter chiplet 284 is mounted on the common substrate 290. A fiber optic connector 324 is attached to the back side 296 of the photonic chiplet 304. The fiber optic connector 324 includes fiber ports that are optically coupled to the grating couplers of the photonic chiplet 288.

The BoW-to-XSR+ converter chiplet 284 has, at the bottom side 298, coarse-pitch bump contacts 300 that are electrically coupled to coarse-pitch through-silicon vias in the common substrate 290. The through-silicon vias and the signal lines in the common substrate 290 are not shown in the figure. The BoW-to-XSR+ converter chiplet 284 has fine-pitch bump contacts 302 that are electrically coupled to the fine-pitch BoW interface signal lines, which are electrically coupled to fine-pitch bump contacts 304 of the data processing chiplet 282. The data processing chiplet 282 has coarse-pitch bump contacts 306 that are electrically coupled to coarse-pitch through-silicon vias in the common substrate 290.

In some alternative examples, the photonic chiplet has an optically active layer on or near the top side (so the top side is the front side of the photonic chiplet), and uses front-side illuminated grating couplers. The photonic chiplet also has through-silicon vias that electrically couple the optically active layer to the bottom side (i.e., back side) of the photonic chiplet.

In some examples, the electronic amplification chiplet 286 has an electrically active layer near the top side of the chiplet 286, and also has through-silicon vias that electrically couple the electrically active layer to the bottom side of the chiplet 286.

In some examples, the electronic amplification chiplet 286 has an electrically active layer near the bottom side of the chiplet 286, and also has through-silicon vias that electrically couple the electrically active layer to the top side of the chiplet 286.

In some examples, the converter chiplet 284 has an electrically active layer near the top side of the chiplet 284, and also has through-silicon vias that electrically couple the electrically active layer to the bottom side of the chiplet 284.

In some examples, the converter chiplet 284 has an electrically active layer near the bottom side of the chiplet 284, and also has through-silicon vias that electrically couple the electrically active layer to the top side of the chiplet 284.

The semiconductor package 280 of FIG. 9 includes molding compound 308 to enhance the structural strength of the semiconductor package 280. The molding compound 308 is optional when the common substrate 290 is a silicon interposer or a substrate that uses silicon bridges.

In some alternative implementations, a semiconductor package is similar to the semiconductor package of FIG. 9 except that the common substrate uses silicon bridges. The common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

In some alternative implementations, a semiconductor package is similar to the semiconductor package of FIG. 9 except that the common substrate has redistribution layers made in a fan-out wafer-level packaging (FoWLP) process.

Figure 10:
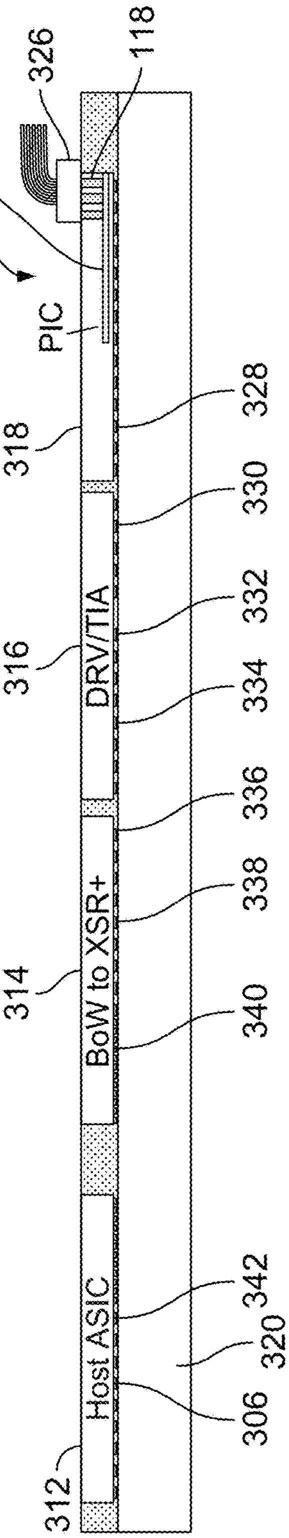
FIG. 10 is a diagram of an example of a semiconductor package that includes a data processing chiplet, a converter chiplet, an electronic amplification chiplet, and a photonic chiplet arranged on a common substrate.
Figure 92A:
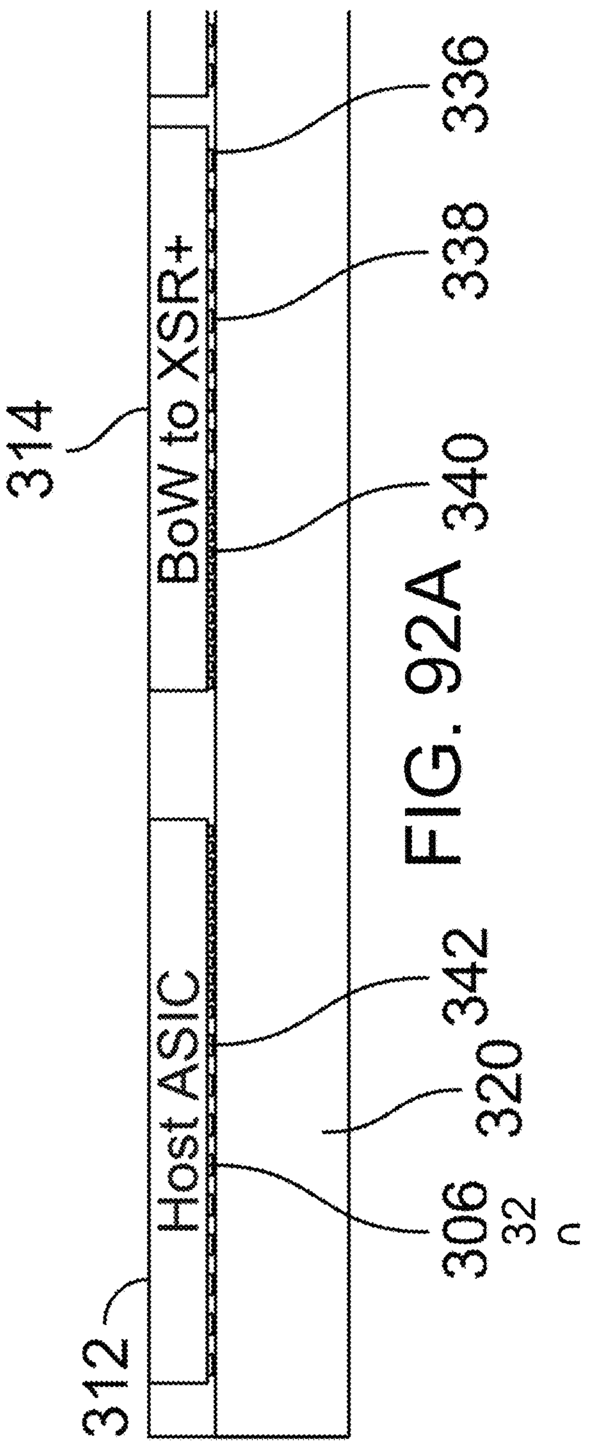
FIG. 92A is an enlarged view of the left portion of the semiconductor package of FIG. 10.
Figure 92B:
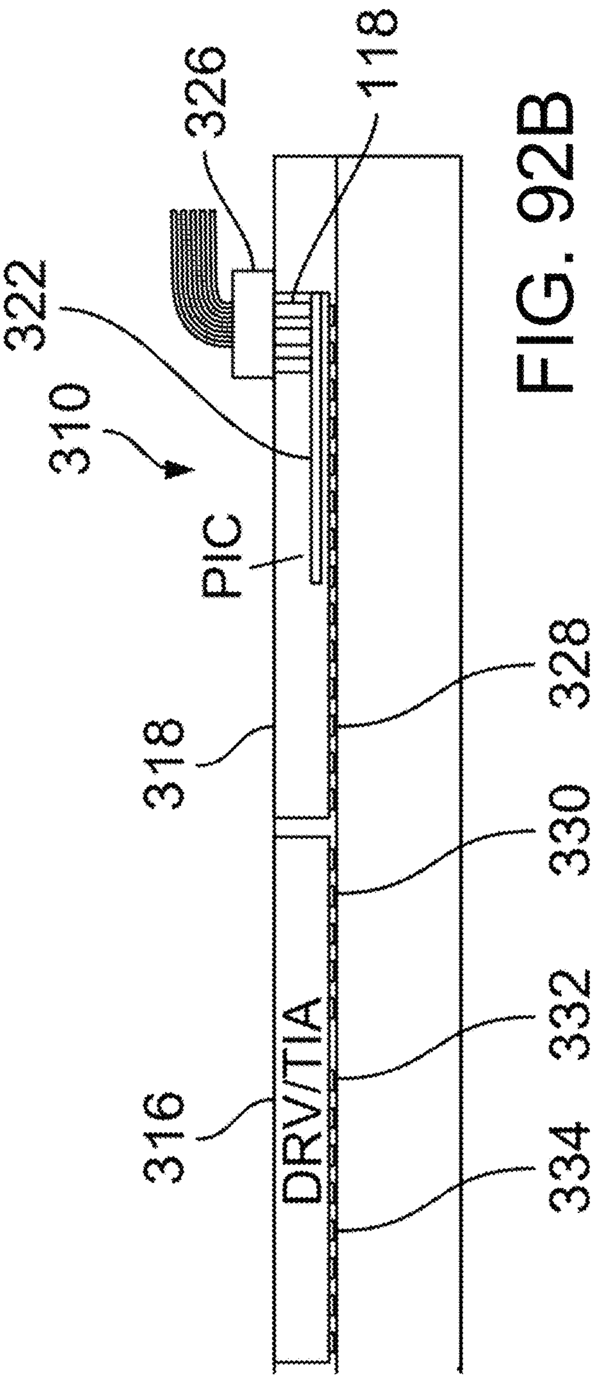
FIG. 92B is an enlarged view of the right portion of the semiconductor package of FIG. 10.

FIG. 10 shows an example of a semiconductor package 310 that includes a data processing chiplet 312, a BoW-to-XSR+ converter chiplet 314, an electronic amplification chiplet 316, and a photonic chiplet 318 arranged in series on a common substrate 320. FIG. 92A is an enlarged view of the left portion of the semiconductor package 310 of FIG. 10. FIG. 92B is an enlarged view of the right portion of the semiconductor package 310 of FIG. 10. The common substrate 320 can be, e.g., a silicon interposer or a substrate made of another material. The following description assumes the common substrate is a silicon interposer. A fiber optic connector 326 is attached to the back side of the photonic chiplet 318. The fiber optic connector 326 includes fiber ports that are optically coupled to the grating couplers of the photonic chiplet 318. For example, the data processing chiplet 312 can include components similar to those of the data processing chiplet 102 (FIGS. 1A to 1C and 2). The BoW-to-XSR+ converter chiplet 314 can include components similar to those of the BoW-to-XSR+ converter chiplet 104 (FIGS. 1A to 1C and 2). The electronic amplification chiplet 316 can include components similar to those of the electronic amplification chiplet 106 (FIGS. 1A to 1C and 2), except that the electronic amplification chiplet 316 does not need to include through-silicon vias (TSVs). The photonic chiplet 318 can include components similar to those of the photonic chiplet 108 (FIGS. 1A to 1C and 2). In this example, the photonic chiplet 318 has an optically active layer 322 on or near the bottom side of the photonic chiplet 318 (so the bottom side is the optically active side, and the top side is the back side of the photonic chiplet 318), similar to the photonic chiplet 288 of FIG. 9. The photonic chiplet 318 uses back-side illuminated grating couplers and includes the openings 118 and the antireflection coatings 136 shown in FIG. 3.

The photonic chiplet 318 has, on the bottom side, coarse-pitch bump contacts 328 that are electrically coupled to coarse-pitch conductive signal lines that are electrically coupled to a first set of coarse-pitch bump contacts 330 of the electronic amplification chiplet 316. The through-silicon vias and the signal lines in the common substrate 320 are not shown in the figure. The electronic amplification chiplet 316 has a second set of coarse-pitch bump contacts 332 that are electrically coupled to coarse-pitch through-silicon vias in the common substrate 320. The electronic amplification chiplet 316 has a third set of coarse-pitch bump contacts 334 that are electrically coupled to coarse-pitch XSR+ interface signal lines that are electrically coupled to a first set of coarse-pitch bump contacts 336 of the BoW-to-XSR+ converter chiplet 314. The converter chiplet 314 has a second set of coarse-pitch bump contacts 338 that are electrically coupled to coarse-pitch through-silicon vias in the common substrate 320. The converter chiplet 314 has fine-pitch bump contacts 340 that are electrically coupled to fine-pitch BoW interface signal lines that are electrically coupled to fine-pitch bump contacts 342 of the data processing chiplet 312. The data processing chiplet 312 has coarse-pitch bump contacts 344 that are electrically coupled to coarse-pitch through-silicon vias in the common substrate 320.

In some alternative examples, the photonic chiplet has an optically active layer on or near the top side (so the top side is the front side of the photonic chiplet), and uses front-side illuminated grating couplers. The photonic chiplet also has through-silicon vias that electrically couple the optically active layer to the back side (i.e., bottom side) of the photonic chiplet.

The semiconductor package 310 of FIG. 10 includes molding compound to enhance the structural strength of the package. The molding compound is optional when the common substrate is a silicon interposer and when the common substrate uses silicon bridges.

In some alternative implementations, a semiconductor package is similar to the semiconductor package of FIG. 10 except that the common substrate uses silicon bridges. The common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

In some alternative implementations, a semiconductor package is similar to the semiconductor package of FIG. 10 except that the common substrate has redistribution layers made in a fan-out wafer-level packaging (FoWLP) process.

Figure 11:
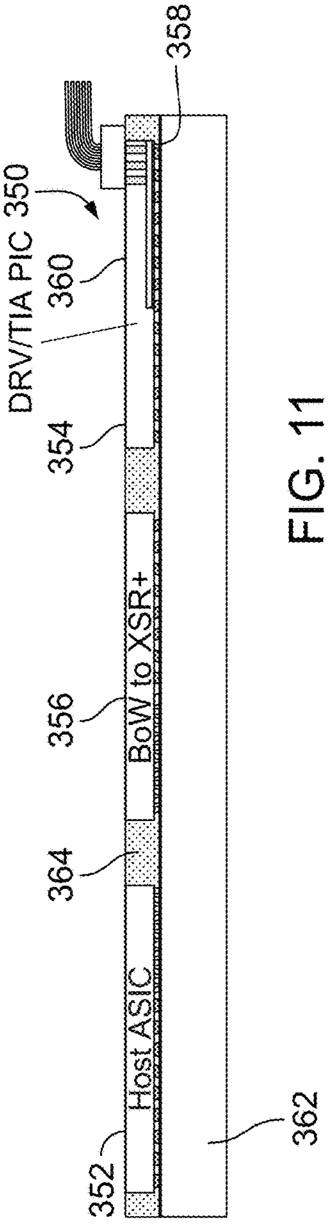
FIGS. 11, 12, and 13 are diagrams of examples of semiconductor packages that each includes a first chiplet, a second chiplet, and a third chiplet.

FIG. 11 shows an example of a semiconductor package 350 that includes a first chiplet 352, a second chiplet 354, and a third chiplet 356. The first chiplet 352 includes a data processing module. For example, the data processing module can include electronic components similar to those of the data processing chiplet 312 (FIG. 10). The second chiplet 354 includes a photonic module and an electronic amplification module. For example, the photonic module can include electrical and optical components similar to those of the photonic chiplet 318 (FIG. 10). The electronic amplification module can include electrical components similar to those of the electronic amplification chiplet 316 (FIG. 10). Here, the photonic module and the electronic amplification module are monolithically integrated in a single chiplet. The external connections between the electronic amplification chiplet 316 and the photonic chiplet 318 of FIG. 10 become internal connections between the electronic amplification module and the photonic module within the second chiplet 354.

In this example, the photonic module has an optically active layer on or near the bottom side 358 of the second chiplet 354 (so the bottom side 358 is the optically active side, and the top side 360 is the back side of the second chiplet 354). The photonic module uses back-side illuminated grating couplers 134 and includes the openings 118 and the antireflection coatings 136, 138 shown in FIG. 3. The third chiplet 356 includes a BoW-to-XSR+ converter module. The BoW-to-XSR+ converter module can include components similar to those of the BoW-to-XSR+ converter chiplet 104 (FIGS. 1A to 1C and 2). Each of the first chiplet 352, the second chiplet 354, and the third chiplet 356 is mounted on a common substrate 362.

In some alternative examples, the photonic module has an optically active layer on or near the top side of the second chiplet (so the top side is the front side of the photonic module), and uses front-side illuminated grating couplers. The photonic module also has through-silicon vias that electrically couple the optically active layer to the bottom side (i.e., back side) of the second chiplet.

The semiconductor package 350 includes molding compound 364 to enhance the structural strength of the semiconductor package 350. The molding compound 364 is optional when the common substrate 362 is a silicon interposer and a substrate that uses silicon bridges.

In some alternative implementations, a semiconductor package is similar to the semiconductor package 350 of FIG. 11 except that the common substrate uses silicon bridges. The common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

In some alternative implementations, a semiconductor package is similar to the semiconductor package 350 of FIG. 11 except that the common substrate has redistribution layers made in a fan-out wafer-level packaging (FoWLP) process.

Figure 12:
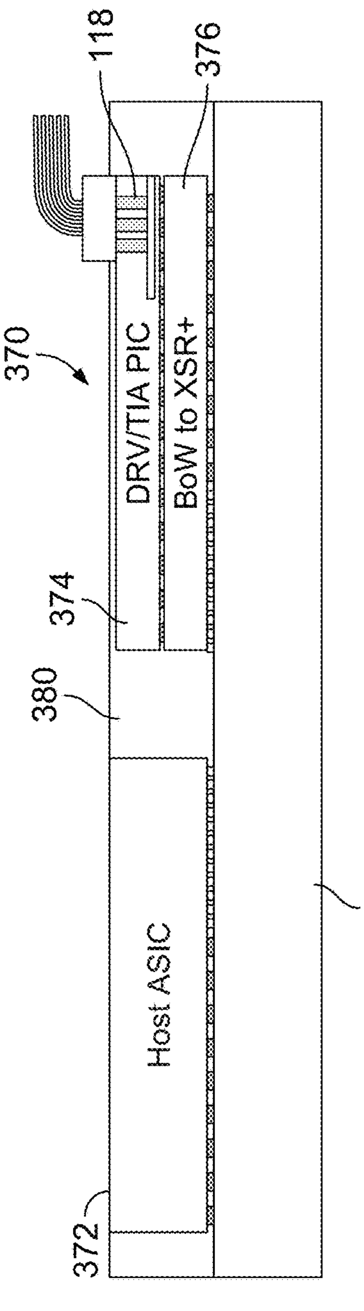

FIG. 12 shows an example of a semiconductor package 370 that includes a first chiplet 372, a second chiplet 374, and a third chiplet 376. The first chiplet 372 includes a data processing module. The first chiplet 372 can be similar to the first chiplet 352 of FIG. 11. The second chiplet 374 includes a photonic module and an electronic amplification module. Here, the photonic module and the electronic amplification module are monolithically integrated in a single chiplet. The second chiplet 374 can be similar to the second chiplet 354 of FIG. 11. In this example, the photonic module has an optically active layer on or near the bottom side of the second chiplet 374 (so the bottom side is the optically active side, and the top side is the back side of the photonic module). The photonic module uses back-side illuminated grating couplers 134 and includes the openings 118 and the antireflection coatings 136, 138 shown in FIG. 3. The third chiplet 376 includes a BoW-to-XSR+ converter module. The first chiplet 372 is mounted on a common substrate 378. The second chiplet 374 is mounted on the third chiplet 376, and the third chiplet 376 is mounted on the common substrate 378.

In some alternative examples, the photonic module has an optically active layer on or near the top side (so the top side is the front side of the second chiplet), and uses front-side illuminated grating couplers. In this example, the second chiplet also has through-silicon vias that electrically couple the optically active layer to the back side (i.e., bottom side) of the second chiplet.

The semiconductor package 370 of FIG. 12 includes molding compound 380 to enhance the structural strength of the semiconductor package 370. The molding compound 380 is optional when the common substrate 378 is a silicon interposer or a substrate that uses silicon bridges.

In some alternative implementations, a semiconductor package is similar to the semiconductor package 370 of FIG. 12 except that the common substrate uses silicon bridges. The common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

In some alternative implementations, a semiconductor package is similar to the semiconductor package 370 of FIG. 12 except that the common substrate has redistribution layers made in a fan-out wafer-level packaging (FoWLP) process.

Figure 13:
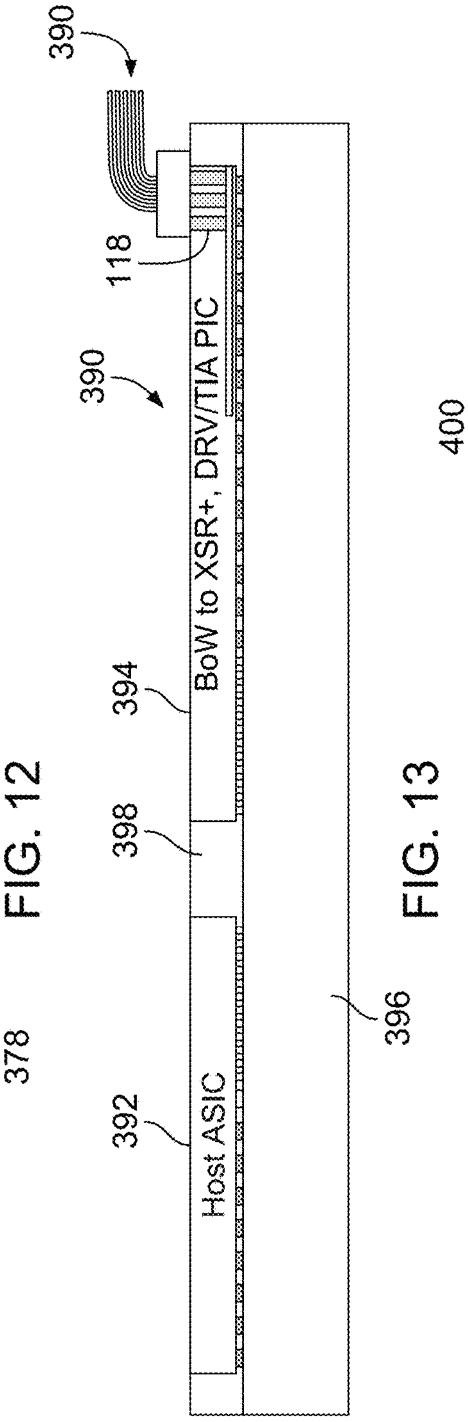

FIG. 13 shows an example of a semiconductor package 390 that includes a first chiplet 392 and a second chiplet 394. The first chiplet 392 includes a data processing module, similar to the first chiplet 372 of FIG. 12. The second chiplet 394 includes a photonic module, an electronic amplification module, and a BoW-to-XSR+ converter module. The photonic module and the electronic amplification module of the second chiplet 394 can be similar to those of the second chiplet 374 of FIG. 12. The converter module in the second chiplet 394 can include electrical components that are similar to those of the converter chiplet 104 of FIGS. 1A to 1C and 2. Here, the photonic module, the electronic amplification module, and the converter module are monolithically integrated in a single chiplet. In this example, the photonic module has an optically active layer on or near the bottom side (so the bottom side is the optically active side, and the top side is the back side of the photonic module). The photonic module uses back-side illuminated grating couplers 134 and includes the openings 118 and the antireflection coatings 136, 138 shown in FIG. 3. Each of the first chiplet 392 and the second chiplet 394 is mounted on a common substrate 396.

In some alternative examples, the photonic module has an optically active layer on or near the top side (so the top side is the front side of the photonic module), and uses front-side illuminated grating couplers. In this example, the second chiplet also has through-silicon vias that electrically couple the optically active layer to the back side (i.e., bottom side) of the second chiplet.

The semiconductor package 390 of FIG. 13 includes molding compound 398 to enhance the structural strength of the semiconductor package 390. The molding compound 398 is optional when the common substrate 396 is a silicon interposer or a substrate that uses silicon bridges.

In some alternative implementations, a semiconductor package is similar to the semiconductor package 390 of FIG. 13 except that the common substrate uses silicon bridges. The common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

In some alternative implementations, a semiconductor package is similar to the semiconductor package 390 of FIG. 13 except that the common substrate has redistribution layers made in a fan-out wafer-level packaging (FoWLP) process.

Figure 14:
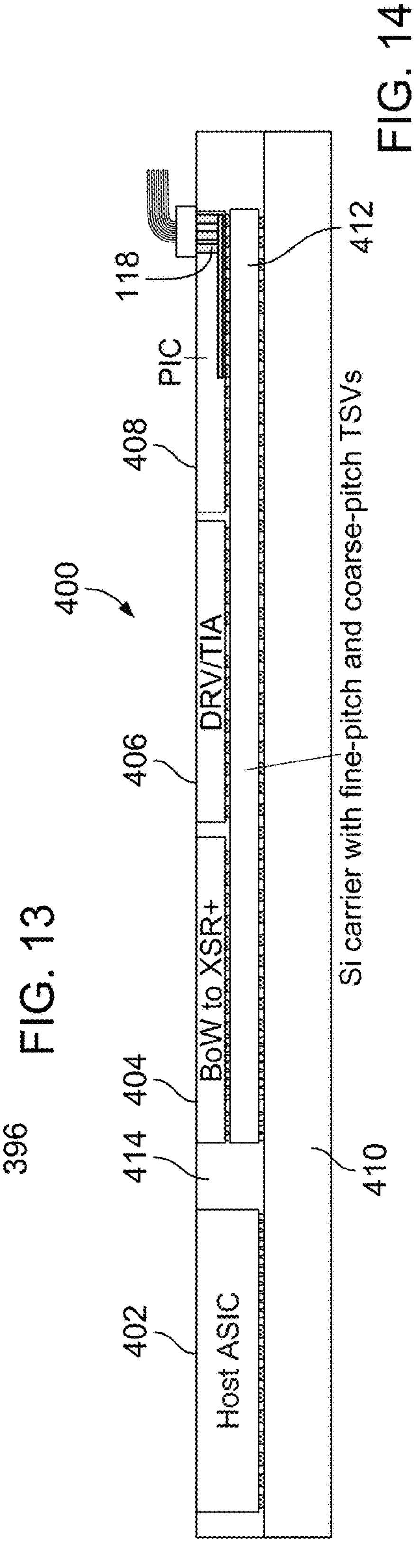
FIG. 14 is a diagram of an example of a semiconductor package that includes a data processing chiplet, a converter chiplet, an electronic amplification chiplet, and a photonic chiplet that are mounted directly or indirectly on a common substrate.

FIG. 14 shows an example of a semiconductor package 400 that includes a data processing chiplet 402, a BoW-to-XSR+ converter chiplet 404, an electronic amplification chiplet 404, and a photonic chiplet 408 that are mounted directly or indirectly on a common substrate 410. In this example, the photonic chiplet 408 uses back-side illumination. The data processing chiplet 402 is mounted directly on the common substrate 410. Each of the converter chiplet 404, the electronic amplification chiplet 406, and the photonic chiplet 408 is mounted on a silicon carrier (or silicon substrate) 412 that includes fine-pitch through-silicon vias (TSVs) and coarse-pitch through-silicon vias. The TSVs in the silicon carrier 412 are not shown in the figure. In some examples, the silicon substrate 412 can be replaced by a substrate made of another material. In this example, the photonic chiplet 408 has an optically active layer on or near the bottom side (so the bottom side is the optically active side, and the top side is the back side of the photonic chiplet 408). The photonic chiplet 408 uses back-side illuminated grating couplers 134 and includes the openings 118 and the antireflection coatings 136, 138 shown in FIG. 3.

The silicon substrate 412 has a first set of conductive traces that electrically couples the photonic chiplet 408 to the electronic amplification chiplet 406. The silicon substrate 412 has a second set of conductive traces for the XSR+ interface that electrically couples the electronic amplification chiplet 406 to the converter chiplet 404. The photonic chiplet 408 has a set of bump contacts (or conductive bumps) that are electrically coupled to the first set of conductive traces of the silicon substrate 412. The electronic amplification chiplet 406 has a first set of bump contacts that are electrically coupled to the first set of conductive traces of the silicon substrate 412. The electronic amplification chiplet 406 has a second set of bump contacts that are electrically coupled to through-silicon vias in the silicon substrate 412. The electronic amplification chiplet 406 has a third set of bump contacts that are electrically coupled to the second set of conductive traces for the XSR+ interface. The silicon substrate 412 can have a mixed pitch (e.g., the pitch of conductive traces and electric contacts can have multiple values) to accommodate interconnect densities between the converter chiplet 404, the electronic amplification chiplet 406, and the photonic chiplet 408, in which the interconnect density is determined by the signal integrity constraints of the chip to chip interface.

The converter chiplet 404 has a first set of bump contacts that are electrically coupled to the second set of conductive traces for the XSR+ interface. The converter chiplet 404 has a second set of bump contacts that are electrically coupled to through-silicon vias in the silicon substrate 412. The converter chiplet 404 has a set of bump contacts that are electrically coupled to through-silicon vias in the silicon substrate 412.

The silicon substrate 412 has, at the bottom side, coarse-pitch bump contacts that are electrically coupled to coarse-pitch through-silicon vias in the common substrate 410. The silicon substrate 412 has, at the bottom side, fine-pitch bump contacts that are electrically coupled to fine-pitch signal lines for the BoW interface that functions as the interconnection between the data processing chiplet 402 and the converter chiplet 404.

In some alternative examples, the photonic chiplet has an optically active layer on or near the top side (so the top side is the front side of the photonic chiplet), and uses front-side illuminated grating couplers. In this example, the photonic chiplet also has through-silicon vias that electrically couple the optically active layer to the back side (i.e., bottom side) of the photonic chiplet.

The photonic chiplet 408, the electronic amplification chiplet 406, and the converter chiplet 404 can be stacked in any way or combined in any way before being mounted on the silicon substrate 412. In some examples, the photonic chiplet 408 is mounted on the electronic amplification chiplet 406, and the electronic amplification chiplet 406 is mounted on the silicon substrate 412. In some examples, the photonic chiplet 408 is mounted on the electronic amplification chiplet 406, the electronic amplification chiplet 406 is mounted on the converter chiplet 404, and the converter chiplet 404 is mounted on the silicon substrate 412.

In some examples, the photonic chiplet 408 and the electronic amplification chiplet 406 can be combined into a single chiplet that is mounted on the silicon substrate 412. In some examples, the photonic chiplet 408 and the electronic amplification chiplet 406 can be combined into a single chiplet, referred to as the second chiplet. The second chiplet is mounted on the converter chiplet 404, and the converter chiplet 404 is mounted on the silicon substrate 412. In some examples, the electronic amplification chiplet 406 and the converter chiplet 404 are combined into a single chiplet, referred to as the third chiplet, that is mounted on the silicon substrate 412. In some examples, the photonic chiplet 408 is mounted on the third chiplet, and the third chiplet is mounted on the silicon substrate 412. In some examples, the photonic chiplet 408, the electronic amplification chiplet 406, and the converter chiplet 404 are combined into a single chiplet that is mounted on the silicon substrate 412.

In some examples, the photonic chiplet 408 is mounted directly on the common substrate 410. The converter chiplet 404 and the electronic amplification chiplet 406 are mounted on the silicon substrate 412, which is mounted on the common substrate 410. The photonic chiplet 408 is electrically coupled to the common substrate 410, which is electrically coupled to the electronic amplification chiplet 406 using through-silicon vias in the silicon substrate 412.

In some examples, the photonic chiplet 408 and the electronic amplification chiplet 406 are mounted on the silicon substrate 412, which is mounted on the common substrate 410. The converter chiplet 404 is mounted on the common substrate 410. The converter chiplet 404 is electrically coupled to the common substrate 410, which is electrically coupled to the electronic amplification chiplet 406 using through-silicon vias in the silicon substrate 412.

The semiconductor package 400 of FIG. 14 includes molding compound 414 to enhance the structural strength of the semiconductor package 400. The molding compound 414 is optional when the common substrate 410 is a silicon interposer or a substrate that uses silicon bridges.

In some alternative implementations, a semiconductor package is similar to the semiconductor package 400 of FIG. 14 except that the common substrate uses silicon bridges. The common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

In some alternative implementations, a semiconductor package is similar to the semiconductor package 400 of FIG. 14 except that the common substrate has redistribution layers made in a fan-out wafer-level packaging (FoWLP) process.

Figure 15:
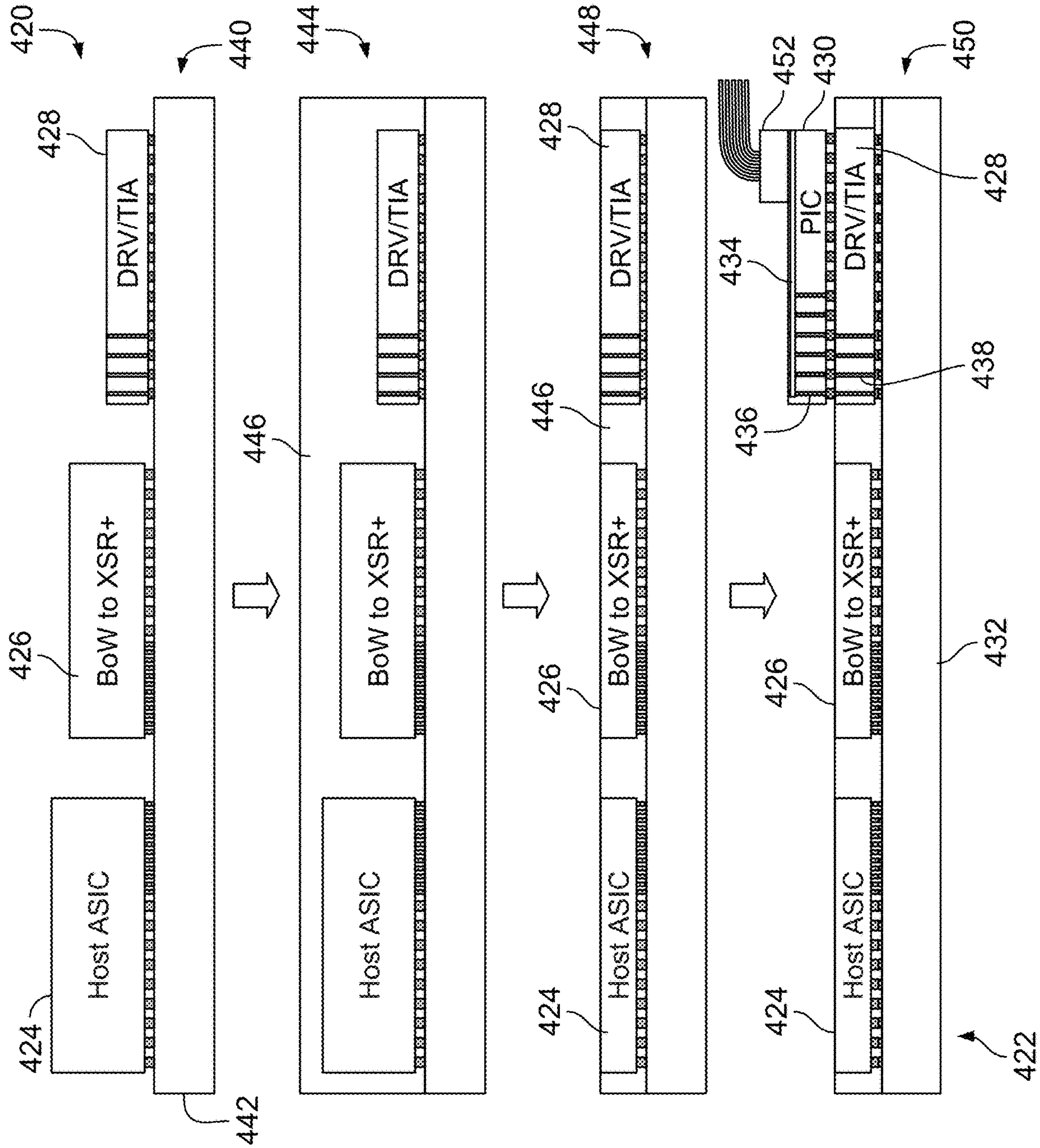
FIGS. 15 and 16 are diagrams of exemplary processes for fabricating exemplary semiconductor packages that each includes a data processing chiplet, a converter chiplet, an electronic amplification chiplet, and a photonic chiplet that are mounted directly or indirectly on a common substrate.
Figure 93:
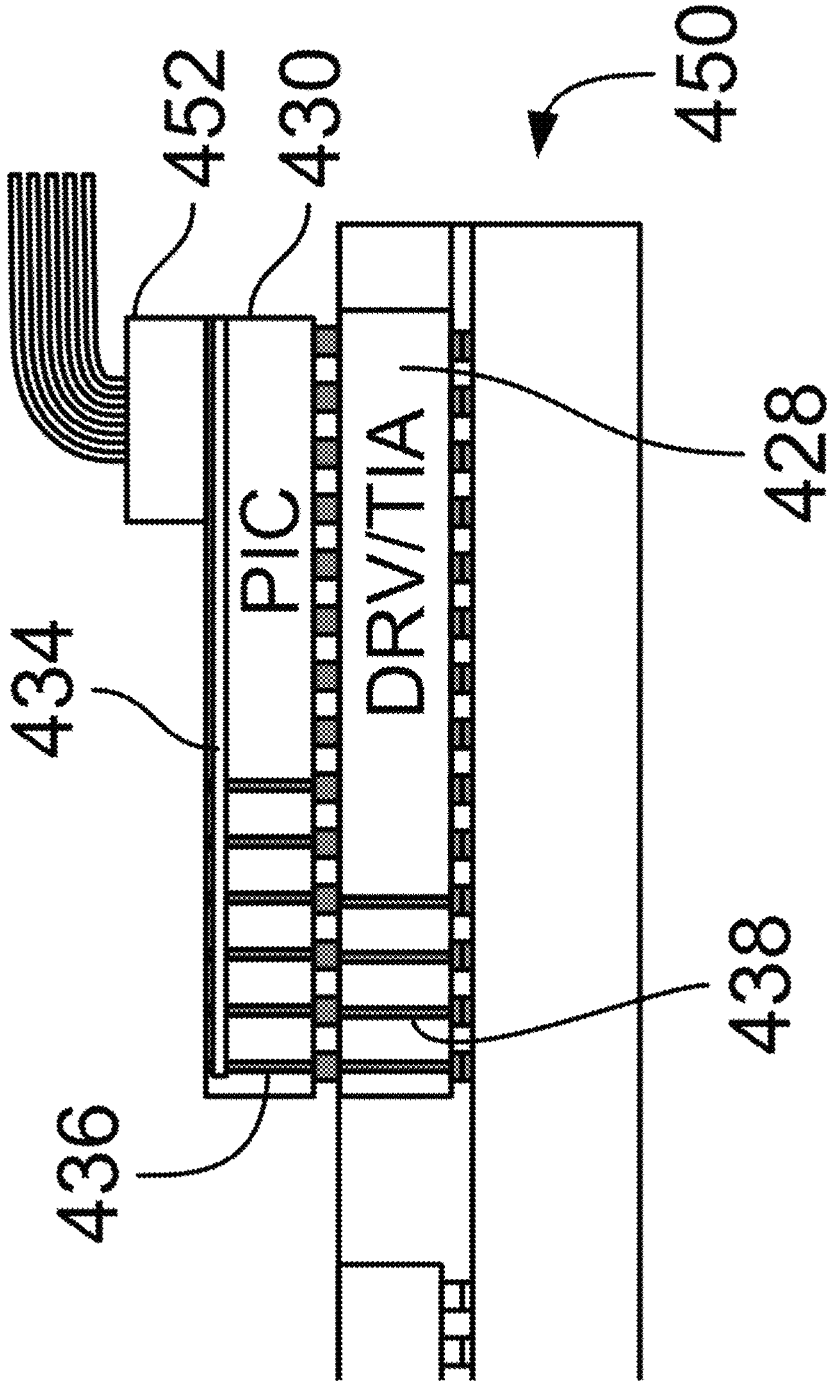
FIG. 93 is an enlarged view of the right portion of the semiconductor package of FIG. 15.

FIG. 15 shows an exemplary process 420 that includes processing steps for fabricating an exemplary semiconductor package 422 that includes a data processing chiplet 424, a BoW-to-XSR+ converter chiplet 426, an electronic amplification chiplet 428, and a photonic chiplet 430 that are mounted directly or indirectly on a common substrate 432. FIG. 93 is an enlarged view of the right portion of the semiconductor package 422 of FIG. 15. The photonic chiplet 430 has an optically active layer 434 on or near the top side (so the top side is the front side or the optically active side) and uses front-side illuminated grating couplers. The photonic chiplet 430 is mounted on the electronic amplification chiplet 428, which is mounted on the common substrate 432. The photonic chiplet 430 has through-silicon vias 436 that electrically couple the optically active layer 434 to the back side of the photonic chiplet 430. The data processing chiplet 424 and the converter chiplet 426 are directly mounted on the common substrate 432. The configuration of the electronic amplification chiplet 428, the converter chiplet 426, and the data processing chiplet 424 can be similar to those shown in FIG. 5.

The semiconductor package 422 shown in FIG. 15 can have the following features:

- The electronic amplification chiplet 428 can have through-silicon vias 438.
- The photonic chiplet 430 does not require back-side illumination and does not require the openings and anti-reflection coatings shown in FIG. 3.
- The photonic chiplet 430 can have conductive through-silicon vias 436.
- The heat generated by the electronic amplification chiplet 428 can be dissipated at least in part through the photonic chiplet 430.

Referring to FIG. 15, in a first step 440, the data processing chiplet 424, the converter chiplet 426, and the electronic amplification chiplet 428 are placed on a carrier wafer 442. The top surface of the carrier wafer 442 includes a predefined pattern of bump contacts and signal lines. The data processing chiplet 424, the converter chiplet 426, and the electronic amplification chiplet 428 are mounted on the carrier wafer 442 such that respective bump contacts on the bottom sides of the data processing chiplet 424, the converter chiplet 426, and the electronic amplification chiplet 428 are electrically connected to respective matching bump contacts on the carrier wafer 442.

In some implementations, a first set of a first number N1 of signal lines on the carrier wafer 442 interconnect the data processing chiplet 424 and the converter chiplet 426. A second set of a second number N2 signal lines on the carrier wafer 442 interconnect the converter chiplet 426 and the electronic amplification chiplet 428. The signal lines that interconnect the data processing chiplet 424 and the converter chiplet 426, and the signal lines that interconnect the converter chiplet 426 and the electronic amplification chiplet 428, can be similar to those shown in FIG. 7.

In an optional second step 444, an overmold process is performed in which a molding compound 446 is applied over the carrier wafer 442 and the chiplets 424, 426, 428. This step is optional and not required when the carrier wafer 442 is a silicon interposer or a wafer that includes silicon bridges (e.g., a coarse-pitched organic substrate that includes fine-pitched silicon bridges). This overmolding step is useful when redistribution layers are used as the common substrate. The molding compound 446 provides additional structural support for the semiconductor package 422.

In an optional third step 448, a grinding process is performed to reduce the thickness of the molding compound 446 and some of the chiplets (e.g., 424 and 426 in this example) so that the top surfaces of the data processing chiplet 424, the converter chiplet 426, and the electronic amplification chiplet 428 are exposed. This improves heat dissipation from the data processing chiplet 424 and the converter chiplet 426. This also enables the electronic amplification chiplet 428 to gain access to the photonic chiplet 430 that will be mounted on the electronic amplification chiplet 428 in the next step. This third step 448 is optional and not needed when the carrier wafer 442 is a silicon interposer or a wafer that includes silicon bridges.

In a fourth step 450, the photonic chiplet 430 is attached to the electronic amplification chiplet 428. The wafer carrier 442 is cut or diced into individual semiconductor packages, and each individual semiconductor package includes the common substrate 432. A fiber optic connector 452 is attached to the photonic chiplet 430, completing the semiconductor package 422. The fiber-optic connector in this example and other examples described in this document can be, e.g., an assembly permanently attached to an array of fibers, or a receptacle that in a second step accepts an assembly permanently attached to an array of fibers.

In some alternative implementations, a semiconductor package is similar to the semiconductor package 422 of FIG. 15 except that the common substrate uses silicon bridges. The common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

The semiconductor package can be fabricated by replacing the carrier wafer 442 in FIG. 15 with a carrier wafer that includes silicon bridges at locations where fine-pitch bump contacts and/or single lines are needed.

In some alternative implementations, a semiconductor package is similar to the semiconductor package 422 of FIG. 15 except that the common substrate has redistribution layers made in a fan-out wafer-level packaging (FoWLP) process. The process for forming the redistribution layers can be similar to those shown in FIG. 29 or 30.

Figure 16:
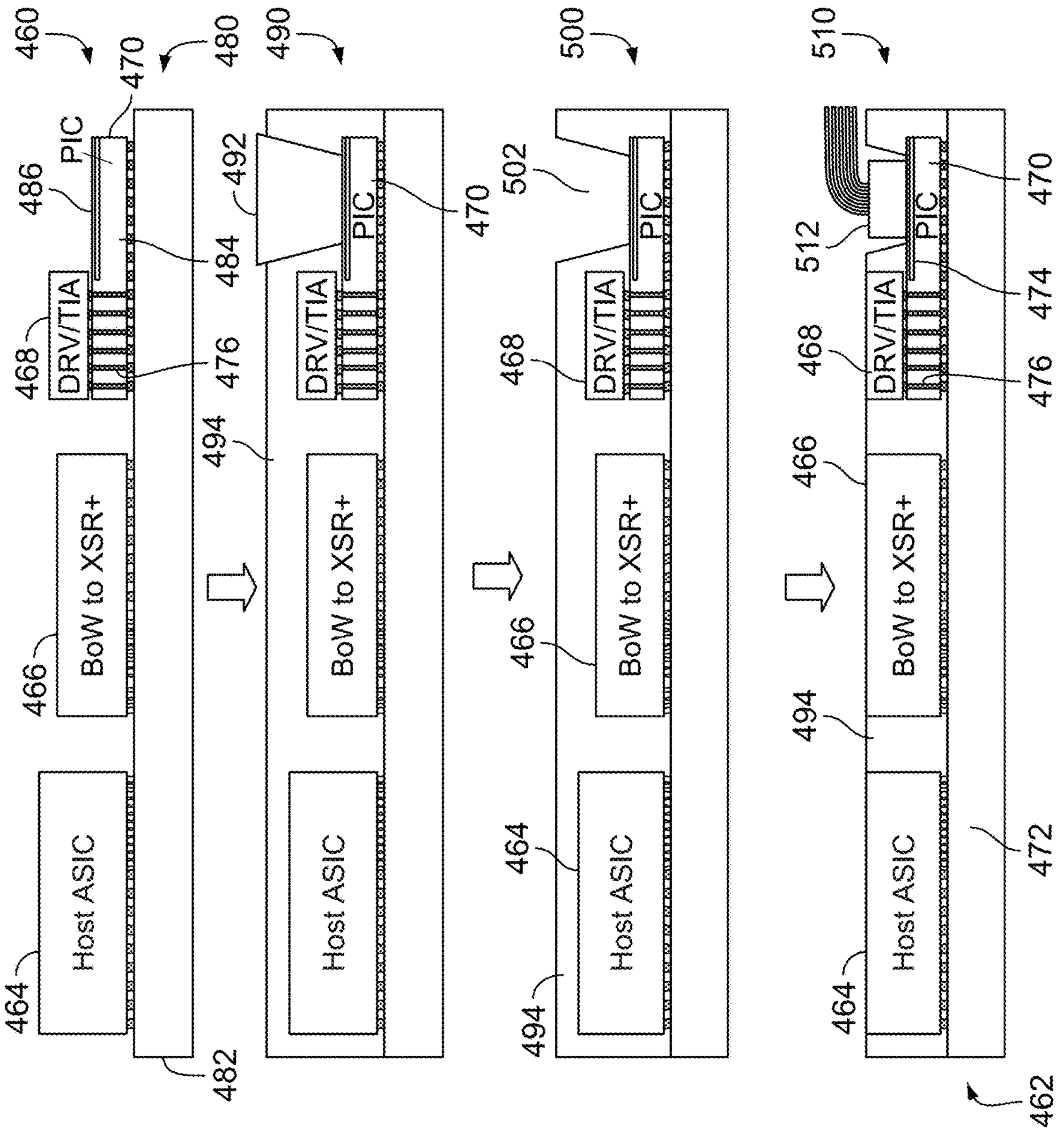

FIG. 16 shows an exemplary process 460 including processing steps for fabricating an exemplary semiconductor package 462 that includes a data processing chiplet 464, a BoW-to-XSR+ converter chiplet 466, an electronic amplification chiplet 468, and a photonic chiplet 470 that are mounted directly or indirectly on a common substrate 472. The photonic chiplet 468 has an optically active layer 474 on or near the top side (so the top side is the front side or the optically active side) and uses front-side illuminated grating couplers. The electronic amplification chiplet 468 is mounted on a portion of the photonic chiplet 470 without covering the grating couplers. The configuration of the converter chiplet 466 and the data processing chiplet 464 can be similar to those shown in FIG. 5.

The fabrication process 460 shown in FIG. 16, and the semiconductor package 462 made using the process 460, can have the following features:

The photonic chiplet 470 can have through-silicon vias 476.

The photonic chiplet 470 does not require back-side illumination and does not require the openings and anti-reflection coatings shown in FIG. 3.

Selective overmolding can be performed without impacting the grating couplers on the photonic chiplet 470.

In some implementations, in a first step 480, the data processing chiplet 464, the converter chiplet 466, and the combination of the electronic amplification chiplet 468 and the photonic chiplet 470 are placed on a carrier wafer 482, which can be a silicon wafer or a wafer having embedded silicon bridges. In the example shown in FIG. 16, the carrier wafer 482 is a silicon wafer. The photonic chiplet 470 has a silicon substrate 484 and an optically active layer 486 on or near a top side of the silicon substrate 484. The photonic chiplet 470 includes a plurality of front-side illuminated grating couplers at or near the optically active layer 486. In some examples, the grating couplers are arranged in a two-dimensional configuration, such as a 2D regular array. In some examples, the grating couplers are arranged in a one-dimensional configuration, such as along a line, a curve, or a row. A portion of the photonic chiplet 470 has through-silicon vias 476. The electronic amplification chiplet 468 is mounted above the photonic chiplet 470 without covering the grating couplers. The electronic amplification chiplet 468 is electrically coupled to the carrier wafer 482 using the through-silicon vias 476 in the photonic chiplet 470.

The top surface of the carrier wafer 482 includes a predefined pattern of bump contacts and signal lines. The data processing chiplet 464, the converter chiplet 466, and the photonic chiplet 470 are mounted on the carrier wafer 482 such that respective bump contacts on the bottom sides of the data processing chiplet 464, the converter chiplet 466, and the photonic chiplet 470 are electrically connected to respective matching bump contacts on the carrier wafer 482. A first set of a first number N1 of signal lines on the carrier wafer 482 interconnect the data processing chiplet 464 and the converter chiplet 466. A second set of a second number N2 signal lines on the carrier wafer 482 interconnect the converter chiplet 466 and the through-silicon vias 476 of the photonic chiplet 470. The signal lines that interconnect the data processing chiplet 464 and the converter chiplet 466, and the signal lines that interconnect the converter chiplet 466 and the through-silicon vias 476 of the photonic chiplet 470, can be similar to those shown in FIG. 7.

In an optional second step 490, a mechanical placeholder 492 is placed above the grating couplers of the photonic chiplet 470. For example, the mechanical placeholder 492 can be made of glass, metal, ceramics, crystalline structures, or plastics. An overmold process is performed in which a molding compound 494 is overmolded on the carrier wafer 482, the chiplets 464, 466, 468, 470, and a portion of the mechanical placeholder 492. The mechanical placeholder 492 is designed to have a height that is greater than the height of the molding compound 494 so that after overmolding, a portion of the mechanical placeholder 492 protrudes from the molding compound 494. In some examples, the mechanical placeholder 492 has sidewalls that are slightly slanted downwards and inwards so that the mechanical placeholder 492 can be pulled up and removed from the molding compound 494 more easily, exposing the grating couplers of the photonic chiplet 470. In some examples, a release layer (e.g. Teflon) is added between the mechanical placeholder 492 and the molding compound 494 to aid in removal of the placeholder 492 after the molding compound 494 is cured. This second step 490 (i.e., placing a mechanical placeholder 492 and applying overmolding) is optional and not required when the carrier wafer 482 is a silicon wafer or a wafer that includes silicon bridges. The molding compound 494 provides additional structural support for the semiconductor package 462. In some examples, if the mechanical placeholder and the overmolding is not used, then a stiffener ring is added to improve mechanical performance.

In some examples, instead of a mechanical placeholder 492, a protective film or mask is formed above the active optical surface of the photonic chiplet 470, including the regions that have active or passive optical components, such as optical waveguides and grating couplers. For example, the protective film or mask can be made of a sacrificial layer, such as a layer of photoresist material. The portion of the molding compound 494 above the grating couplers is etched until the protective film or mask is exposed, then the protective film or mask is etched or otherwise removed to expose the grating couplers. The material of the protective film or mask is selected such that the molding compound 494 above the protective film or mask can be etched away without entirely removing the protective film or mask, and then the exposed protective film or mask can be removed without damaging the grating couplers and other optical components under the exposed protective film or mask.

In an optional third step 500, the mechanical placeholder 492 is removed to form an opening 502 and expose the grating couplers. The third step 500 can be omitted if the second step 490 is omitted.

In a fourth step 510, a grinding process is performed to reduce the thickness of the molding compound 494 and some of the chiplets (e.g., 464, 468 in this example) so that the top surfaces of the data processing chiplet 464, the converter chiplet 466, and the electronic amplification chiplet 468 are exposed. This improves heat dissipation from the data processing chiplet 464, the converter chiplet 466, and the electronic amplification chiplet 468. The grinding step can be omitted if the overmolding process in the second step 490 is omitted. The wafer carrier 482 is cut or diced into individual semiconductor packages, and each individual semiconductor package includes the common substrate 472. A fiber optic connector 512 is attached to the photonic chiplet 470, completing the semiconductor package 462.

In some alternative examples, a semiconductor package includes the data processing chiplet 464, the converter chiplet 466, and the combination of the photonic chiplet 470 and the electronic amplification chiplet 468 mounted on a common substrate with redistribution layers made in a fan-out wafer-level packaging (FoWLP) process. The processing steps for fabricating the redistribution layers can be similar to those shown in FIG. 29 or 30.

In some alternative examples, a semiconductor package includes the data processing chiplet 464, the converter chiplet 466, and the combination of the photonic chiplet 470 and the electronic amplification chiplet 468 mounted on a common substrate that uses silicon bridges. The processing steps for fabricating the semiconductor package can be similar to the processing steps shown in FIG. 16, except that the common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

Figure 17:
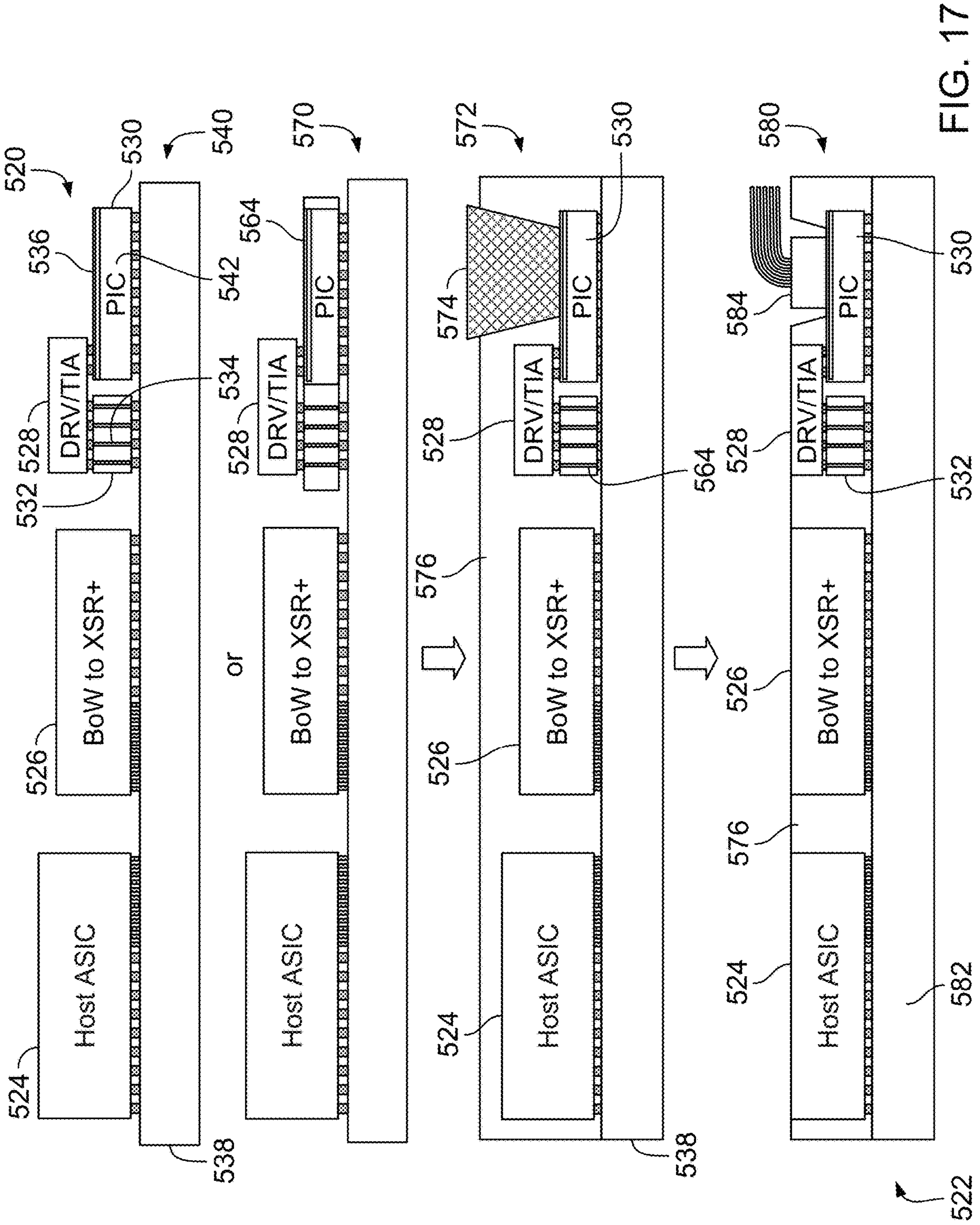
FIG. 17 is a diagram of an exemplary process for fabricating an exemplary semiconductor package that includes a data processing chiplet, a converter chiplet, an electronic amplification chiplet, a photonic chiplet, and a silicon chiplet (or silicon bridge) mounted on a common substrate.

FIG. 17 shows an exemplary process 520 including processing steps for fabricating an exemplary semiconductor package 522 that includes a data processing chiplet 524, a BoW-to-XSR+ converter chiplet 526, an electronic amplification chiplet 528, a photonic chiplet 530, and a silicon chiplet (or silicon bridge) 532 mounted on a common substrate 582. The silicon chiplet 532 can be a silicon chip that includes TSVs 534. The semiconductor package 522 is similar to the semiconductor package 462 of FIG. 16, except that instead of using a photonic chiplet 470 that includes through-silicon vias 476, a photonic chiplet 530 without through-silicon vias and a separate silicon chiplet (or silicon bridge) 532 that includes the through-silicon vias 534 are used.

The photonic chiplet 530 has an optically active layer 536 on or near the top side (so the top side is the front side or the optically active side) and uses front-side illuminated grating couplers. The electronic amplification chiplet 528 is mounted on a portion of the photonic chiplet 530 without covering the grating couplers. The configuration of the converter chiplet 526 and the data processing chiplet 524 can be similar to those shown in FIG. 15.

In some implementations, in a first step 540, the data processing chiplet 524, the converter chiplet 526, and the combination of the electronic amplification chiplet 524, the photonic chiplet 530, and the silicon chiplet 532 are placed on a carrier wafer 538, which can be, e.g., a silicon wafer or a substrate with embedded silicon bridges. The photonic chiplet 530 includes a silicon substrate 542 and an optically active layer on or near a top side of the silicon substrate 542. The photonic chiplet 530 includes a plurality of front-side illuminated grating couplers at or near the optically active layer 536. In some examples, the grating couplers are arranged in a two-dimensional configuration, such as a 2D regular array. In some examples, the grating couplers are arranged in a one-dimensional configuration, such as along a line, a curve, or a row. The electronic amplification chiplet 528 is mounted partially on the photonic chiplet 536 without covering the grating couplers, and mounted partially on the silicon chiplet 532. The electronic amplification chiplet 528 is electrically coupled to the carrier wafer 538 using the through-silicon vias in the silicon chiplet 532.

The top surface of the carrier wafer 538 includes a predefined pattern of bump contacts and signal lines. The data processing chiplet 524, the converter chiplet 526, the photonic chiplet 530, and the silicon chiplet 532 are mounted on the carrier wafer 538 such that respective bump contacts on the bottom sides of the data processing chiplet 524, the converter chiplet 526, the photonic chiplet 530, and the silicon chiplet 532 are electrically connected to respective matching bump contacts on the carrier wafer 538. A first set of a first number N1 of signal lines on the carrier wafer 538 interconnect the data processing chiplet 524 and the converter chiplet 526. A second set of a second number N2 signal lines on the carrier wafer 538 interconnect the converter chiplet 526 and the silicon chiplet 532. The signal lines that interconnect the data processing chiplet 524 and the converter chiplet 526, and the signal lines that interconnect the converter chiplet 526 and the silicon chiplet 532, can be similar to those shown in FIG. 7.

In some implementations, if the photonic chiplet 530 and the silicon chiplet 532 have different heights, it is possible to apply an overmolding processing and a grinding process to equalize the height of the top surfaces of the photonic chiplet 530 and the silicon chiplet 532.

Figure 18:
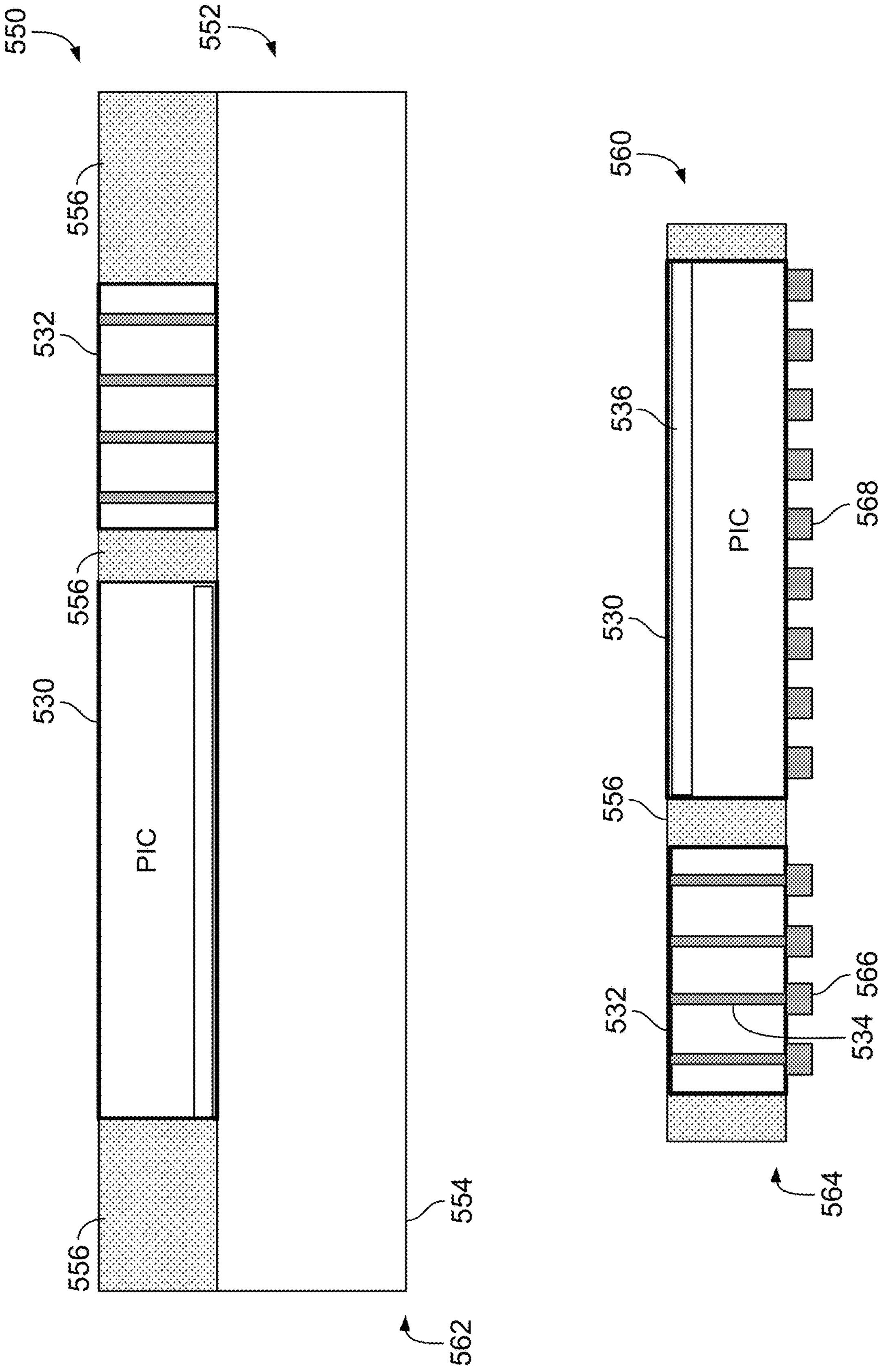
FIG. 18 is a diagram of a process for planarizing a photonic chiplet and a silicon chiplet.

FIG. 18 show a process 550 for planarizing the photonic chiplet 530 and the silicon chiplet 532. In some implementations, in a first step 552 of the process 550, the photonic chiplet 530 and the silicon chiplet 532 are placed on a carrier wafer 554. The carrier wafer 554 is a different wafer from the carrier wafer 538 of FIG. 17. The photonic chiplet 530 is positioned with the grating couplers facing towards the carrier wafer 554 so that the grating couplers are not damaged in a later grinding process. An overmolding process is performed by covering the chiplets 530, 532 and the exposed portions of the carrier wafer 554 with a molding compound 556. A grinding process is applied to remove some of the molding compound 556 and some of the back side of the photonic chiplet 530 and/or the silicon chiplet 532 until both the photonic chiplet 530 and the silicon chiplet 532 are exposed. After the grinding step, the height of the photonic chiplet 530 is the same as the height of the silicon chiplet 532.

In a second step 560, the carrier wafer 554 is cut or diced to form individual components 562 each having a photonic chiplet 530 and a silicon chiplet 532 with overmolding compound 556 on a portion of the carrier wafer 554. Then the photonic chiplet 530 and the silicon chiplet 532 with the overmolding compound 556 are separated from the carrier wafer 554, resulting in a component 564 that includes a photonic chiplet 530 and a silicon chiplet 532 that are mechanically coupled together by the molding compound 556. A metallization process is performed to form a patterned metal layer below the silicon chiplet 532 and the photonic chiplet 530. The patterned metal layer below the silicon chiplet 532 form bump contacts 566 that are used later to electrically couple the through-silicon vias 534 to the corresponding bump contacts on the carrier wafer 538. In some examples, if the photonic chiplet 530 does not have through-silicon vias, then the patterned metal layer below the photonic chiplet 530 form dummy contacts 568 that are not electrically coupled to the optically active layer 536 of the photonic chiplet 530. In some examples, adding the dummy contacts 568 below the photonic chiplet 530 allows the top surface of the photonic chiplet 530 to be at the same height as the top surface of the silicon chiplet 532 when the component 564 is mounted on the carrier wafer 538. This provides level surfaces that the electronic amplification chiplet 528 can be mounted on.

Referring back to FIG. 17, in some implementations, the electronic amplification chiplet 528 is mounted on the component 564 fabricated using the process 550 in FIG. 18, and the component 564 is mounted on the carrier wafer 538.

In an optional second step 572, a mechanical placeholder 574 is placed above the grating couplers of the photonic chiplet 530, and an overmold process is performed by applying a molding compound 576 over the carrier wafer 538, the chiplets 524, 526, 528, the component 564, and a portion of the mechanical placeholder 574, similar to the step 490 in FIG. 16. Alternatively, a protective film or mask can be used and a hole can be etched or drilled into the overmold to expose the couplers.

In a third step 580, the mechanical placeholder 574 is removed to expose the grating couplers of the photonic chiplet 530. A grinding process is performed to expose the top surfaces of the data processing chiplet 524, the converter chiplet 526, and the electronic amplification chiplet 528. The wafer carrier 538 is cut or diced into individual semiconductor packages, and each individual semiconductor package includes the common substrate 582. A fiber optic connector 584 is attached to the photonic chiplet 530, completing the semiconductor package 522. The processing steps 572 and 580 in FIG. 17 can be similar to the processing steps 490 to 510 in FIG. 16.

In some alternative implementations, a semiconductor package is similar to the semiconductor package 522 of FIG. 17 except that the common substrate uses silicon bridges. The common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

In some alternative implementations, a semiconductor package is similar to the semiconductor package 522 of FIG. 17 except that the common substrate has redistribution layers made in a fan-out wafer-level packaging (FoWLP) process. The processing steps for fabricating the redistribution layers can be similar to those shown in FIG. 29 or 30.

Figure 19:
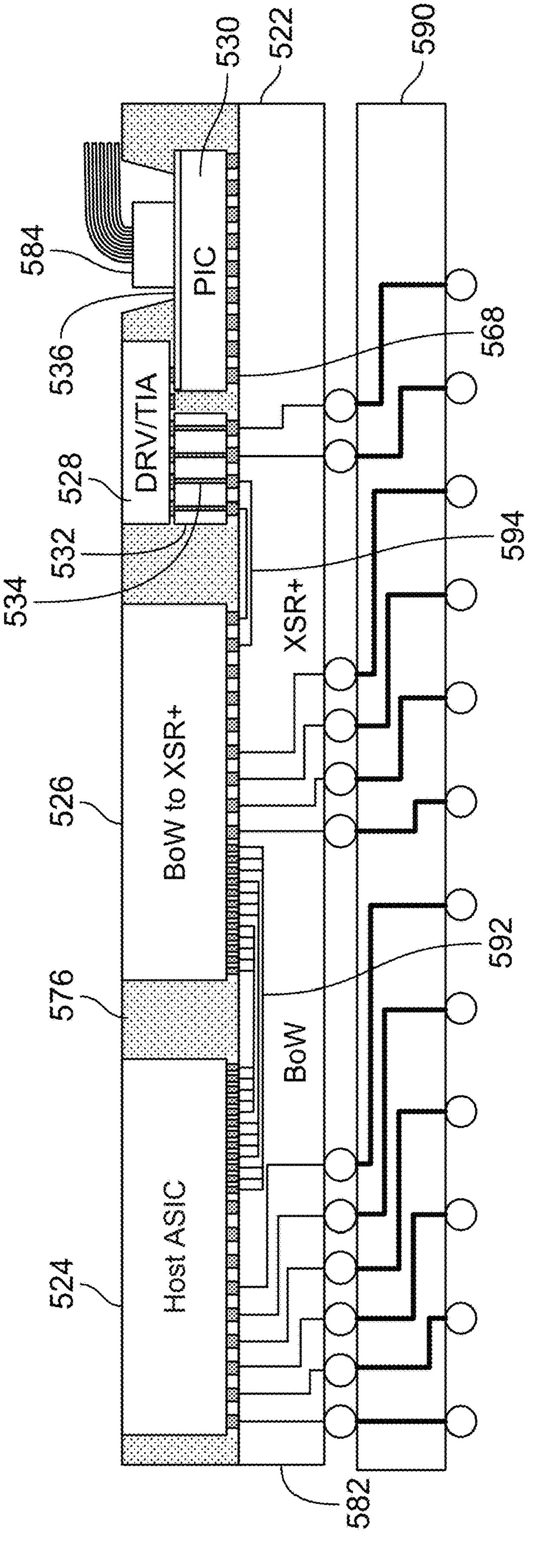
FIG. 19 is a diagram of a semiconductor package mounted on a printed circuit board.

FIG. 19 shows the semiconductor package 522 of FIG. 17 mounted on a printed circuit board 590. The figure also shows the connection lines in the common substrate 582. The common substrate 582 includes a first set of a first number N1 of signal lines 592 that interconnect the data processing chiplet 524 and the converter chiplet 526. The common substrate 582 includes a second set of a second number N2 signal lines 594 that interconnect the converter chiplet 526 and the through-silicon vias 534 of the silicon chiplet 532. The first set of signal lines 592 that interconnect the data processing chiplet 524 and the converter chiplet 526, and the second set of signal lines 594 that interconnect the converter chiplet 526 and the TSVs 534 of the silicon chiplet 524, can be similar to the signal lines shown in FIG. 7. The electrical contacts at the bottom side of the common substrate 582 enable the semiconductor package 522 to be electrically coupled to the printed circuit board 590.

In FIG. 19, the optically active layer 536 has optical features that should not be damaged or contaminated, either by the molding compound 576 that is applied during the overmolding process in step 572, or by the debris generated during the process of grinding the molding compound 576 in step 580. The photonic chiplet 530 includes conductive bumps 568 on the bottom side of the chiplet 530, the conductive bumps 568 are not electrically active and are mostly used to facilitate mounting of the photonic chiplet 530 to the common substrate 582. The fiber optic connector 584 is attached to the photonic chiplet 530 in the last step of the fabrication process.

Figure 20:
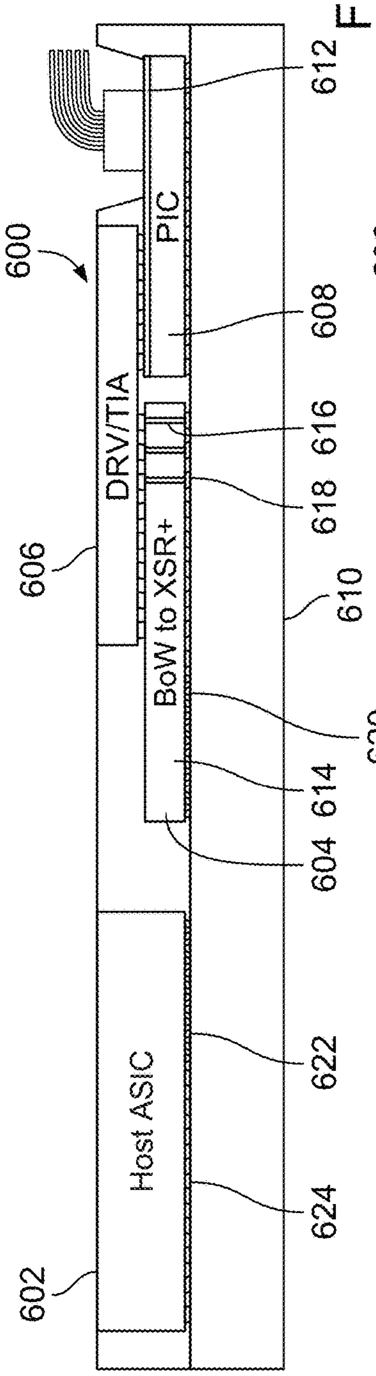
FIG. 20 is a diagram of an example of a semiconductor package that includes a data processing chiplet, a converter chiplet, an electronic amplification chiplet, and a photonic chiplet that are directly or indirectly mounted on a common substrate.

FIG. 20 shows an example of a semiconductor package 600 that includes a data processing chiplet 602, a BoW-to-XSR+ converter chiplet 604, an electronic amplification chiplet 606, and a photonic chiplet that are directly or indirectly mounted on a common substrate 610. In this example, the photonic chiplet 608 uses front-side illumination and has an optically active layer 612 on or near the top side (so the top side is the optically active side, and the bottom side is the back side of the photonic chiplet 608). The photonic chiplet 608 uses front-side illuminated grating couplers. The data processing chiplet 602, the converter chiplet 606, and the photonic chiplet 608 are mounted on the common substrate 610. For example, the common substrate 610 can be a silicon substrate, a substrate made of another material, or a substrate that uses silicon bridges. The electronic amplification chiplet 606 is mounted partially on the photonic chiplet 608 and mounted partially on the converter chiplet 604.

The BoW-to-XSR+ converter chiplet 604 includes a silicon substrate 614 and coarse-pitch through-silicon vias 616. In some examples, the converter chiplet 604 has an electrically active layer near the bottom side of the chiplet 604. The through-silicon vias 616 electrically couple the electrically active layer of the converter chiplet 604 to the electrically active layer of the electronic amplification chiplet 606. In some examples, the converter chiplet 604 has an electrically active layer near the top side of the chiplet 604. The through-silicon vias 616 electrically couple the electrically active layer of the converter chiplet 604 to the common substrate 610.

The converter chiplet 604 has, at the bottom side, coarse-pitch bump contacts 618 that are electrically coupled to the coarse-pitch through-silicon vias 616 in the converter chiplet 604. The BoW-to-XSR+ converter chiplet 604 has fine-pitch bump contacts 620 that are electrically coupled to the fine-pitch BoW interface signal lines (on or in the common substrate 610), which are electrically coupled to fine-pitch bump contacts 622 of the data processing chiplet 602. The data processing chiplet 602 has coarse-pitch bump contacts 624 that are electrically coupled to coarse-pitch through-silicon vias in the common substrate 610.

In some alternative examples, the photonic chiplet has an optically active layer on or near the bottom side (so the bottom side is the front side of the photonic chiplet), and uses back-side illuminated grating couplers, similar to the photonic chiplet 108 of FIGS. 1A to 1C and 2. The photonic chiplet also has through-silicon vias that electrically couple the optically active layer to the top side (i.e., back side) of the photonic chiplet.

In some alternative implementations, a semiconductor package includes the data processing chiplet 602, the BoW-to-XSR+ converter chiplet 604, the electronic amplification chiplet 606, and the photonic chiplet 608 that uses front-side illumination mounted on a common substrate with redistribution layers made in a fan-out wafer-level packaging (FoWLP) process. The processing steps for fabricating the redistribution layers can be similar to those shown in FIG. 29 or 30.

In some alternative implementations, a semiconductor package includes the data processing chiplet 602, the BoW-to-XSR+ converter chiplet 604, the electronic amplification chiplet 606, and the photonic chiplet 608 that uses front-side illumination mounted on a common substrate that uses silicon bridges. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

Figure 21:
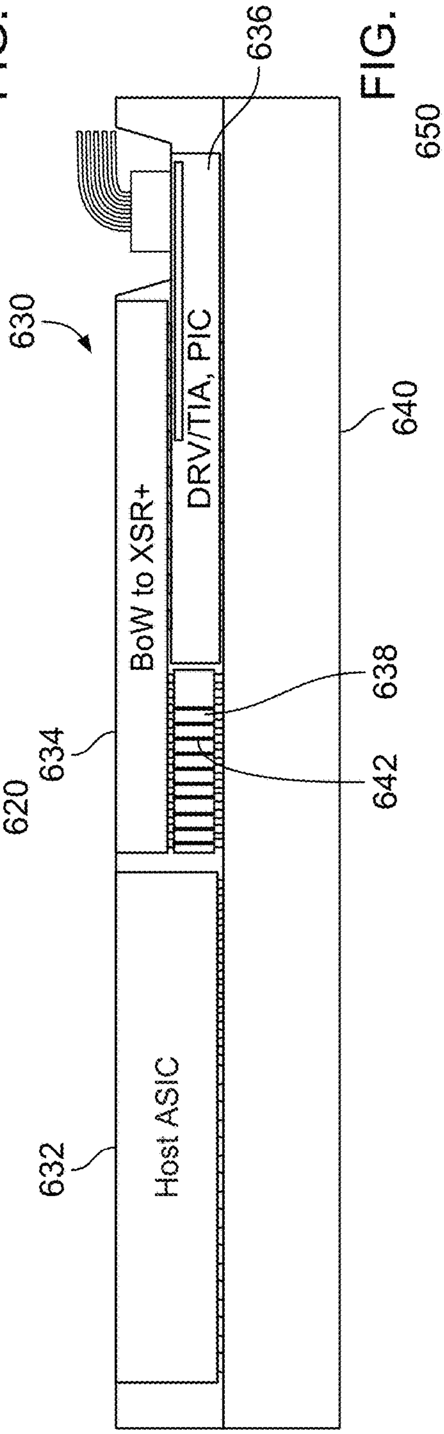
FIG. 21 is a diagram of an example of a semiconductor package that includes a data processing chiplet, a converter chiplet, a second chiplet that includes a photonic module and an electronic amplification module, and a silicon chiplet or silicon bridge.

FIG. 21 shows an example of a semiconductor package 630 that includes a data processing chiplet 632, a BoW-to-XSR+ converter chiplet 634, a second chiplet 636 that includes a photonic module and an electronic amplification module, and a silicon chiplet or silicon bridge 638. In this example, the photonic module uses front-side illumination, similar to the photonic chiplet 608 of FIG. 20. The data processing chiplet 632, the silicon chiplet 638, and the second chiplet 636 are mounted on a common substrate 640, which can be, e.g., a silicon substrate, a substrate made of another material, or a substrate that uses silicon bridges. The converter chiplet 634 is mounted partially on the silicon chiplet 638 and partially on the second chiplet 636.

The silicon chiplet 638 includes fine-pitch through-silicon vias 642 that electrically couple the fine-pitch bump contacts of the BoW-to-XSR+ converter chiplet 634 to the fine-pitch bump contacts of the BoW interface on or in the common substrate 640. The electrically active layer of the electronic amplification module is formed near the top side of the second substrate 636. The electrically active layer of the converter chiplet 634 is electrically coupled to the electrically active layer of the electronic amplification module.

In some implementations, a semiconductor package includes the data processing chiplet 632, the BoW-to-XSR+ converter chiplet 634, the second chiplet 636 that includes the photonic module and the electronic amplification module, and the silicon chiplet or silicon bridge 638 mounted on a common substrate with redistribution layers made in a fan-out wafer-level packaging (FoWLP) process. The processing steps for fabricating the redistribution layers can be similar to those shown in FIG. 29 or 30.

In some implementations, a semiconductor package includes the data processing chiplet 632, the BoW-to-XSR+ converter chiplet 634, the second chiplet 636 that includes the photonic module and the electronic amplification module, and the silicon chiplet or silicon bridge 638 mounted on a common substrate that uses silicon bridges. For example, a fine-pitched silicon interposer is positioned underneath the BoW interface and supports the fine-pitched bump contacts and fine-pitched signal lines of the BoW interface between the data processing chiplet and the fine-pitch through-silicon vias.

Figure 22:
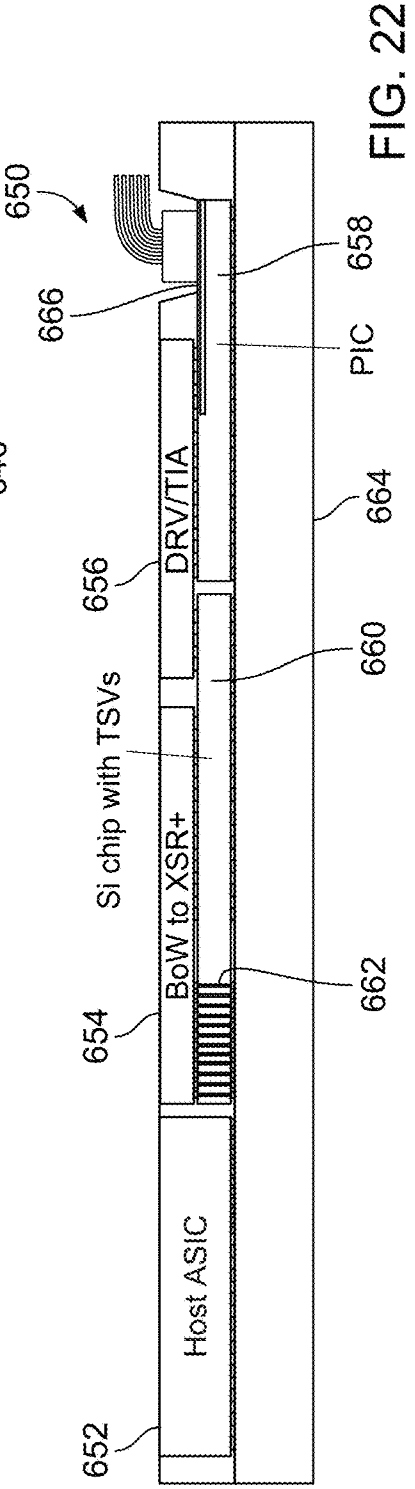
FIG. 22 is a diagram of an example of a semiconductor package that includes a data processing chiplet, a converter chiplet, an electronic amplification chiplet, a photonic chiplet, and a silicon chiplet or silicon bridge that includes fine-pitch through-silicon vias.

FIG. 22 shows an example of a semiconductor package 650 that includes a data processing chiplet 652, a BoW-to-XSR+ converter chiplet 654, an electronic amplification chiplet 656, a photonic chiplet 658, and a silicon chiplet or silicon bridge 660 that includes fine-pitch through-silicon vias 662. In this example, the photonic chiplet 658 uses front-side illumination, similar to the photonic chiplet 608 of FIG. 20. The data processing chiplet 652, the silicon chiplet 662, and the photonic chiplet 658 are mounted on a common substrate 664, which can be, e.g., a silicon substrate, a substrate made of another material, or a substrate that uses silicon bridges. The converter chiplet 654 is mounted on the silicon chiplet 660. The electronic amplification chiplet 656 is mounted partially on the silicon chiplet 660 and partially on the photonic chiplet 658.

The fine-pitch through-silicon vias 662 of the silicon chiplet 660 electrically couple the fine-pitch bump contacts of the BoW-to-XSR+ converter chiplet 654 to the fine-pitch bump contacts of the BoW interface on or in the common substrate 664. The electronic amplification chiplet 656 is electrically coupled to the converter chiplet 654 through conductive signal lines or traces on the silicon chiplet 660. The electronic amplification chiplet 656 is electrically coupled to an optically active layer 666 of the photonic chiplet 658 similar to the example shown in FIG. 20.

In some implementations, a semiconductor package includes the data processing chiplet 652, the BoW-to-XSR+ converter chiplet 654, the electronic amplification chiplet 656, the photonic chiplet 658, and the silicon chiplet or silicon bridge 660 (which includes the fine-pitch through-silicon vias 662) mounted on a common substrate with redistribution layers made in a fan-out wafer-level packaging (FoWLP) process. The processing steps for fabricating the redistribution layers can be similar to those shown in FIG. 29 or 30.

In some implementations, a semiconductor package includes the data processing chiplet 652, the BoW-to-XSR+ converter chiplet 654, the electronic amplification chiplet 656, the photonic chiplet 658, and the silicon chiplet or silicon bridge 660 (which includes the fine-pitch through-silicon vias) mounted on a common substrate that uses silicon bridges. For example, a fine-pitched silicon interposer is positioned underneath the BoW interface and supports the fine-pitched bump contacts and fine-pitched signal lines of the BoW interface between the data processing chiplet and the fine-pitch through-silicon vias.

Figure 23:
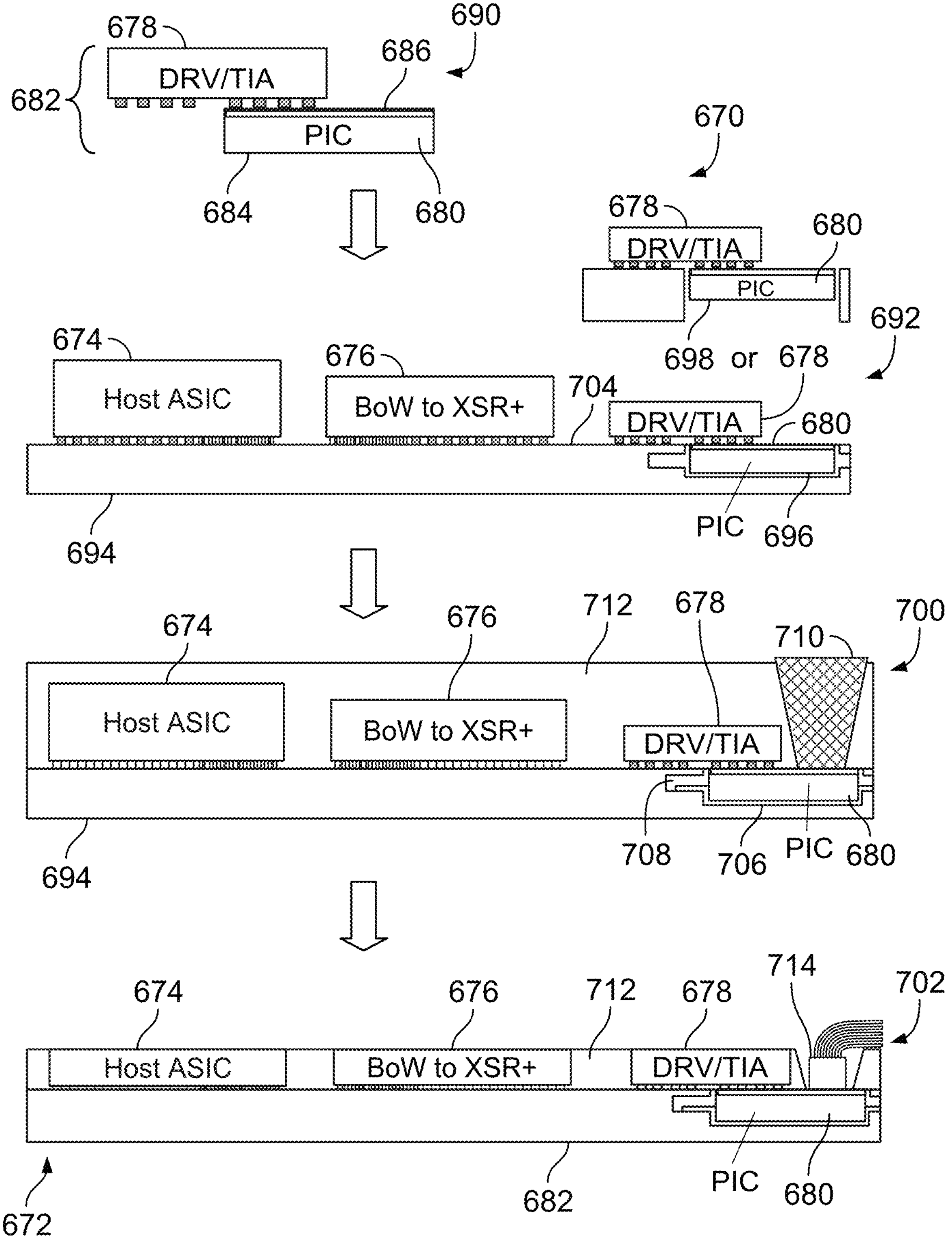
FIG. 23 is a diagram of an exemplary process for fabricating an exemplary semiconductor package that includes a data processing chiplet, a converter chiplet, an electronic amplification chiplet, and a photonic chiplet that is disposed in a cavity or in a through-hole in a common substrate.

FIG. 23 shows an exemplary process 670 that includes processing steps for fabricating an exemplary semiconductor package 672 that includes a data processing chiplet 674, a BoW-to-XSR+ converter chiplet 676, an electronic amplification chiplet 678, and a photonic chiplet 680 that is disposed in a cavity 696 or in a through-hole 698 in a common substrate 682. The photonic chiplet 680 is similar to the photonic chiplet 530 of FIG. 17. The electronic amplification chiplet 678 is mounted on a portion of the photonic chiplet 680 without covering the grating couplers of the photonic chiplet 680. The configuration of the converter chiplet 676 and the data processing chiplet 674 can be similar to those shown in FIG. 15.

In some implementations, in a first step 690, the electronic amplification chiplet 678 is mounted partially on the photonic chiplet 680 to form a die stack 688. The photonic chiplet 680 has a silicon substrate 684 and an optically active layer 686 on or near a top side of the silicon substrate 684. The photonic chiplet 680 includes a plurality of front-side illuminated grating couplers at or near the optically active layer 686. In some examples, the grating couplers are arranged in a two-dimensional configuration, such as a 2D regular array. In some examples, the grating couplers are arranged in a one-dimensional configuration, such as along a line, a curve, or a row. The electronic amplification chiplet 678 is mounted partially on the photonic chiplet 680 without covering the grating couplers.

In a second step 692, a carrier wafer 694 is etched to form the cavity 696 or the through-hole 698. The cavity 696 has a depth that is slightly greater than the thickness of the photonic chiplet 680. The etching process can be performed using photolithography techniques, in which a photoresist layer is applied, exposed, and developed to form a mask layer on the carrier wafer 694. The portion of the carrier wafer 694 not covered by the photoresist mask layer is etched to form the cavity 696. The through-hole 698 can be formed in a similar process. Alternatively, the cavity 696 and the through-hole 698 can be formed by drilling, e.g., laser-drilling. Steps 692, 700, and 702 show an example of processing steps in which the cavity 696 is formed in the carrier wafer 694. Similar processing steps can be used for examples in which the through-hole 698 is formed in the carrier wafer 694.

The data processing chiplet 674, the converter chiplet 676, and the die stack 688 including the electronic amplification chiplet 678 and the photonic chiplet 680 are placed on the carrier wafer 694, which can be, e.g., a silicon interposer or a wafer embedded with silicon bridges. The photonic chiplet 680 is placed in the cavity 696, and the electronic amplification chiplet 678 is mounted partially on the carrier wafer 694 and partially on the PIC 680.

The top surface 704 of the carrier wafer 694 includes a predefined pattern of bump contacts and signal lines. The data processing chiplet 674, the converter chiplet 676, and the electronic amplification chiplet 678 are mounted on the carrier wafer 694 such that respective bump contacts on the bottom sides of the data processing chiplet 674, the converter chiplet 676, and the electronic amplification chiplet 678 are electrically connected to respective matching bump contacts on the carrier wafer 694. A first set of a first number N1 of signal lines on the carrier wafer 694 interconnect the data processing chiplet 674 and the converter chiplet 676. A second set of a second number N2 of signal lines on the carrier wafer 694 interconnect the converter chiplet 676 and the electronic amplification chiplet 678. The signal lines that interconnect the data processing chiplet 674 and the converter chiplet 676, and the signal lines that interconnect the converter chiplet 676 and the electronic amplification chiplet 678, can be similar to those shown in FIG. 7.

In a second step 700, the photonic chiplet 680 is secured to the bottom wall of the cavity by using an adhesive 706, such as an epoxy. In some implementations, wells 708 are built into the carrier wafer 694 to allow the epoxy to overflow without damaging the active optical surface of the photonic chiplet 680.

Optionally, a mechanical placeholder 710 is placed above the grating couplers of the photonic chiplet 680, similar to the examples of FIGS. 16 and 17. For example, the mechanical placeholder 710 can be made of glass, metal, plastics, ceramics, or crystalline structures. An overmold process is performed in which a molding compound 712 is overmolded on the carrier wafer 694, the chiplets 674, 676, 678, 680, and a portion of the mechanical placeholder 710. The mechanical placeholder 710 is designed such that it has a height that is greater than the height of the molding compound 712 so that after overmolding, a portion of the mechanical placeholder 710 protrudes from the molding compound 712. The mechanical placeholder 710 has sidewalls that are slightly slanted downwards and inwards so that the mechanical placeholder 710 can be pulled up and removed from the molding compound 712, exposing the grating couplers of the photonic chiplet 680. This step (i.e., placing a mechanical placeholder and applying overmolding) is optional and not required when the carrier wafer 694 is a silicon wafer or a wafer that includes silicon bridges. The molding compound 712 provides additional structural support for the semiconductor package 672.

In some examples, instead of the mechanical placeholder 710, a protective film or mask is formed above the active optical surface of the photonic chiplet, including the regions that have active or passive optical components, such as optical waveguides and grating couplers. For example, the protective film or mask can be made of a sacrificial layer, such as a layer of photoresist material. The portion of the molding compound 712 above the grating couplers is etched until the protective film or mask is exposed, then the protective film or mask is etched or otherwise removed. The material of the protective film or mask is selected such that the molding compound 712 above the protective film or mask can be etched away without completely removing the protective film or mask, and then the exposed protective film or mask can be removed without damaging the grating couplers and other optical components under the exposed protective film or mask.

In an optional third step 702, the mechanical placeholder 710 is removed to expose the grating couplers of the photonic chiplet 680. A grinding process is performed to reduce the thickness of the molding compound 712 and some of the chiplets (e.g., 674 and 676 in this example) so that the top surfaces of the data processing chiplet 674, the converter chiplet 676, and the electronic amplification chiplet 678 are exposed. This improves heat dissipation from the data processing chiplet 674, the converter chiplet 676, and the electronic amplification chiplet 678. This step can be omitted if the molding compound 712 and the mechanical placeholder 710 are omitted.

A fiber optic connector 714 is attached to the photonic chiplet 680. The fiber optic connector 714 can have fiber ports that are optically coupled to optical fibers and/or fiber cores. In some examples, the fiber optic connector 714 has fiber ports are arranged in a one-dimensional configuration, such as arranged along a line, a curve, or a row. In some examples, the fiber optic connector 714 has fiber ports arranged in a two-dimensional configuration. In some examples, the fiber optic connector 714 has fiber ports arranged in a regular array having rows and columns. In some examples, the fiber optic connector 714 has fiber ports arranged in an arbitrary two-dimensional pattern. In some examples, the fiber optic connector 714 includes optics to transform a two-dimensional arrangement of light beams emitted from fiber ports arranged in a two-dimensional configuration to a one-dimensional arrangement of light beams that are directed toward optical couplers (in or near the optically active layer 686) that are arranged in a one-dimensional configuration. In some examples, the fiber optic connector 714 includes optics to transform a one-dimensional arrangement of light beams emitted from fiber ports arranged in a one-dimensional configuration to a two-dimensional arrangement of light beams that are directed toward optical couplers that are arranged in a two-dimensional configuration.

In some examples, the fiber connector 714 includes birefringent optical elements to separate, combine, or otherwise modify two orthogonal polarizations states of light propagating within a single fiber or fiber core on their way between a fiber core and one or more the vertical coupling element(s). Examples of such birefringent optical elements are described in U.S. Pat. No. 11,287,585 and U.S. patent application Ser. No. 17/693,040. In some examples, the fiber connector 714 multiplexes optical signals from a single fiber core onto multiple vertical coupling elements using polarization or wavelength multiplexing elements.

In some examples, the 2D fiber array allows for optical fiber interfacing that is substantially pitch-matched to the electrical interface between the converter module and the electronic amplification module.

In some alternative implementations, a semiconductor package includes the data processing chiplet 674, the BoW-to-XSR+ converter chiplet 676, the electronic amplification chiplet 678 that are mounted on a common substrate that includes silicon bridges, and the photonic chiplet 680 that is disposed in a cavity in the common substrate. The processing steps for fabricating the semiconductor package can be similar to the processing steps shown in FIG. 23, except that the common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet and the BoW-to-XSR+ converter chiplet.

Figure 24:
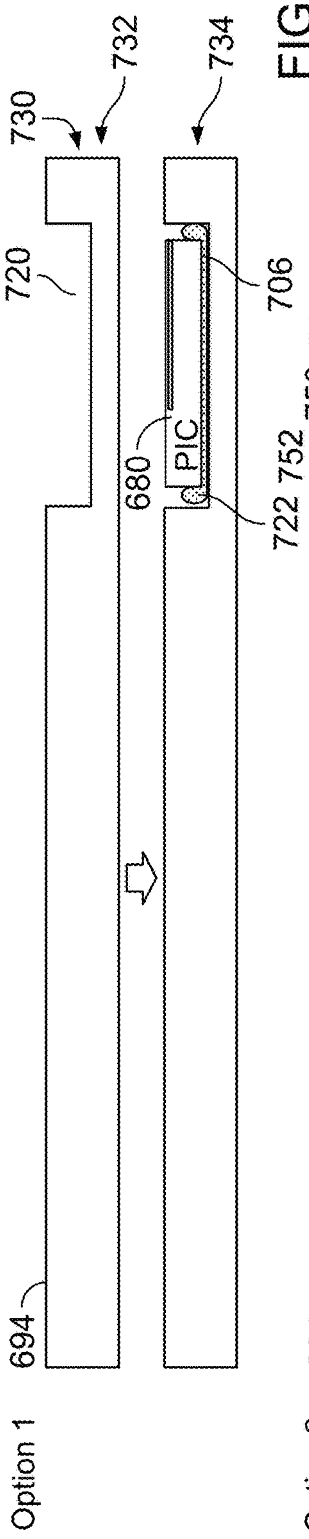
FIGS. 24 to 26 are diagrams of options for forming a cavity and securing a photonic chiplet in the cavity.

There are several ways to form a cavity in the carrier wafer 694. FIG. 24 shows a first option for forming the cavity and securing the photonic chiplet in the cavity. In some implementations, a process 730 for fabricating a semiconductor package that includes a photonic chiplet secured in a cavity includes a step 732 including an etching process that is applied to etch a single cavity 720 in a carrier wafer 694, in which the cavity 720 is wider than the photonic chiplet 680 to allow for overflow of the adhesive 706 to the side portions of the cavity 720.

The process 730 includes a step 734 in which the photonic chiplet 680 is secured to the bottom wall of the cavity 720 using an adhesive 706, and a portion of the adhesive 722 overflows to the side portion of the cavity 720.

Figure 25:
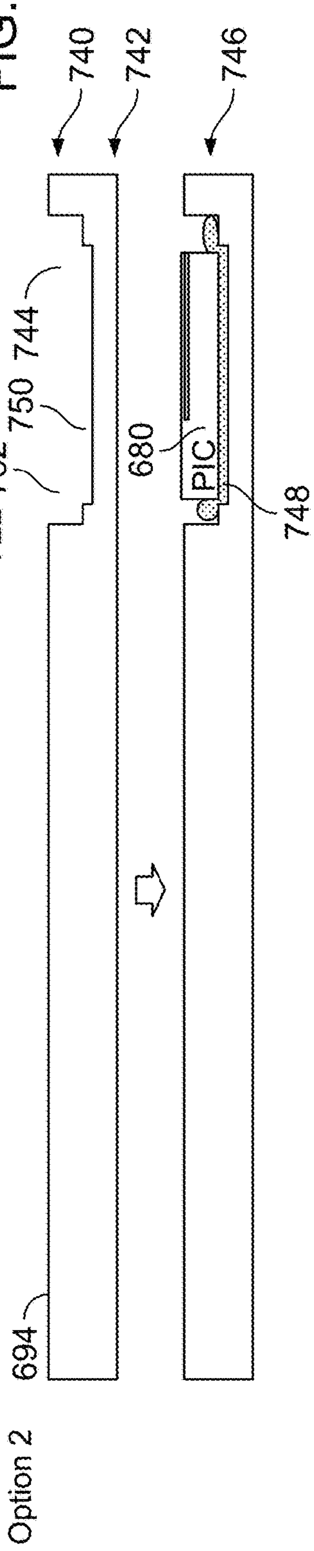

FIG. 25 shows a second option for forming the cavity and securing the photonic chiplet in the cavity. In some implementations, a process 740 for fabricating a semiconductor package that includes a photonic chiplet secured in a cavity includes a step 742 including etching a layered cavity 744 in a carrier wafer 694, in which the layered cavity 744 is wider than the photonic chiplet 680. The layered cavity 744 includes a first portion 750 that is slightly wider than the photonic chiplet 680, and a second portion 752 that is slightly wider than the first portion 750. The process 740 includes a step 746 including placing the photonic chiplet 680 in the first portion 750 of the layered cavity 744, and securing the photonic chiplet 680 to the bottom wall of the cavity 744 using an adhesive 748. The spaces in the second portion 752 between the sidewalls of the photonic chiplet 680 and the sidewalls of the layered cavity 744 allow the adhesive 748 to overflow to the side.

Figure 26:
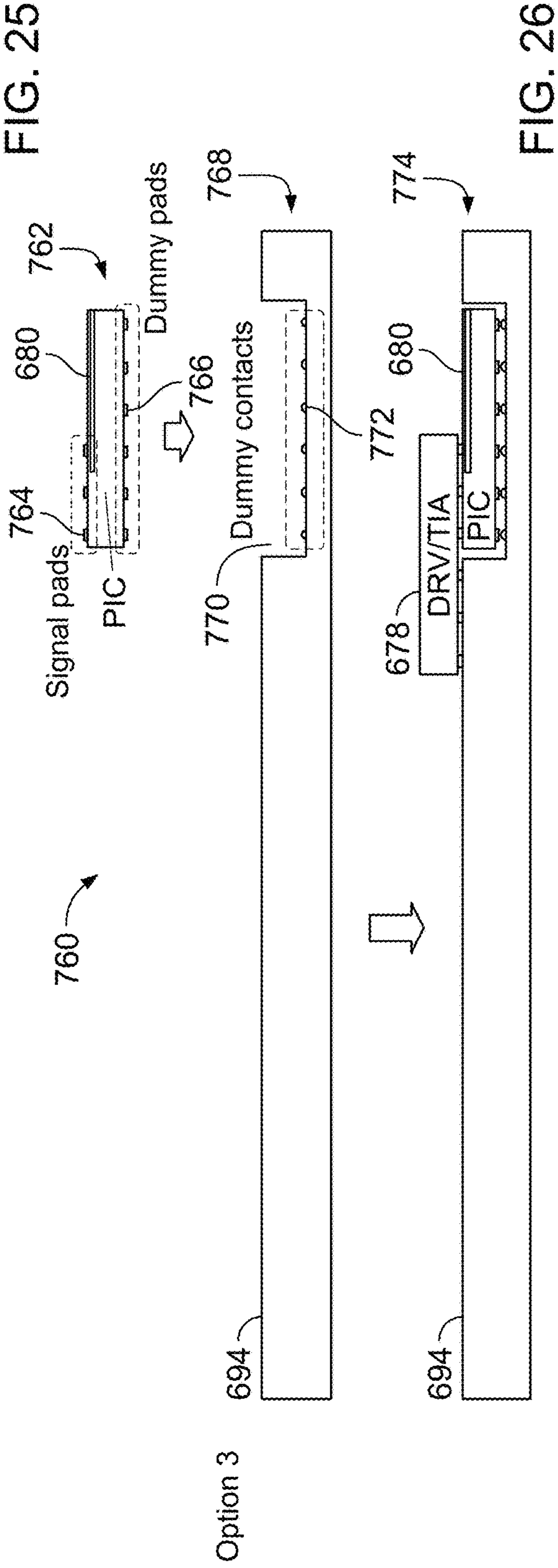

FIG. 26 shows a third option for forming the cavity and securing the photonic chiplet in the cavity. In some implementations, instead of using an adhesive, a fabrication process 760 includes a step 762 including forming signal pads 764 on the top surface of the photonic chiplet 680, and forming dummy pads 766 on the bottom surface of the photonic chiplet 680. The process 760 includes a step 768 including forming a cavity 770 in a carrier wafer 694, and making dummy contacts 772 at the floor of the cavity 770. The process 760 includes a step 774 including bonding the dummy pads 766 on the bottom surface of the photonic chiplet 680 to the dummy contacts 772 at the floor of the cavity 770. The electronic amplification chiplet 678 is mounted partially on the carrier wafer 694 and partially on the photonic chiplet 680.

Figure 27A:
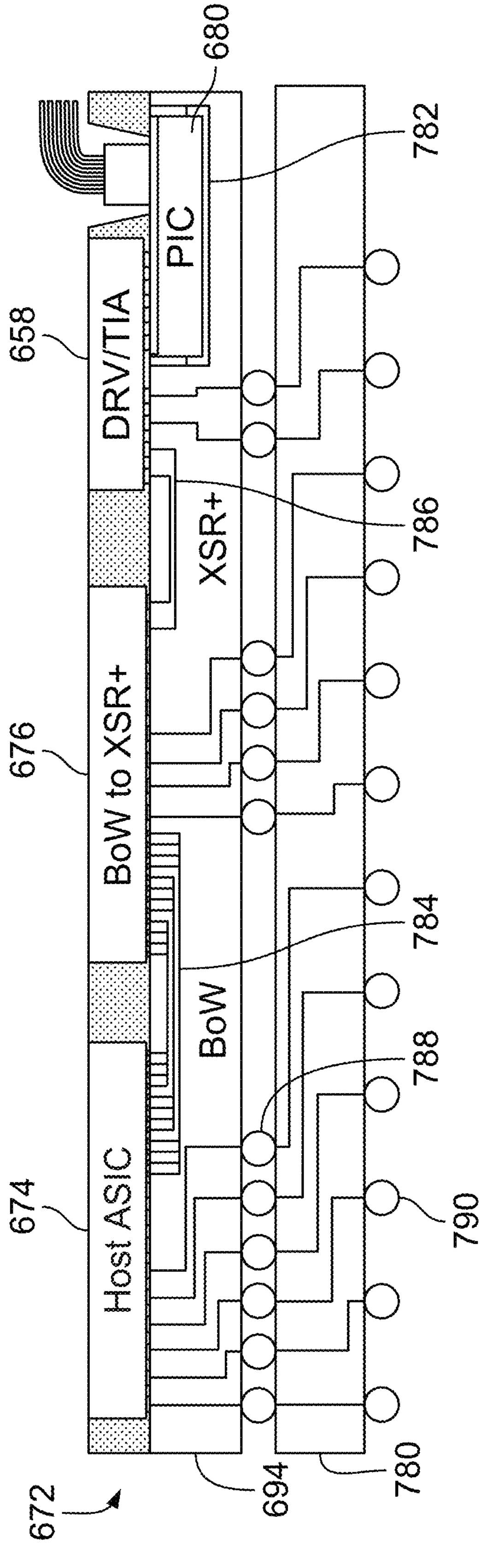
FIGS. 27A and 27B are diagrams each showing a semiconductor package mounted on a printed circuit board.

FIG. 27A shows the semiconductor package 672 of FIG. 23 mounted on a printed circuit board 780. The region 782 beneath the photonic chiplet 680 represents the adhesive, such as epoxy. In some implementations, the photonic chiplet 680 has a thickness of several hundred microns, and the depth of the cavity 696 can be slightly larger than several hundred microns. The carrier wafer or common substrate 694 includes a first set of a first number N1 of signal lines 784 that interconnect the data processing chiplet 674 and the converter chiplet 676. In this example, the first set of the first number N1 of signal lines 784 complies with the BoW specification. The common substrate 694 includes a second set of a second number N2 of signal lines 786 that interconnect the converter chiplet 676 and the electronic amplification chiplet 678. In this example, the second set of the second number N2 of signal lines 786 complies with the XSR+ specification. The signal lines 784 that interconnect the data processing chiplet 674 and the converter chiplet 676, and the signal lines 786 that interconnect the converter chiplet 676 and the electronic amplification chiplet 678, can be similar to those shown in FIGS. 7 and 19. Electrical contacts 788 are formed at the bottom side of the common substrate 788 to enable the semiconductor package 672 to be electrically coupled to the printed circuit board 780. Electrical contacts 790 are formed at the bottom side of the printed circuit board 780 to enable the printed circuit board 780 to be electrically coupled to other modules, such as modules that provide power and control signals.

Figure 27B:
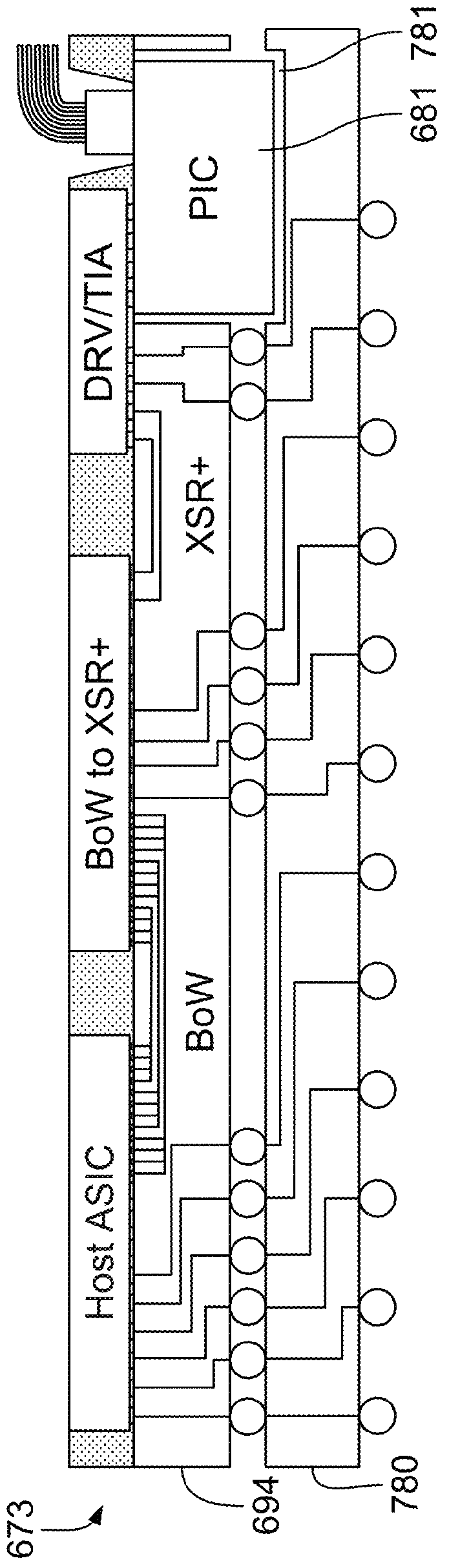

FIG. 27B shows a semiconductor package 673 mounted on a printed circuit board 780. The semiconductor package 673 is similar to the semiconductor package 672 of FIG. 27A, except that the semiconductor package 673 includes a photonic chiplet 681 that has a thickness of several hundred microns and is thicker than the carrier wafer 694, such that the bottom portion of the photonic chiplet 681 protrudes from the carrier wafer 694. The printed circuit board 780 has a cavity 781 that accommodates the bottom portion of the photonic chiplet 681.

Figure 28:
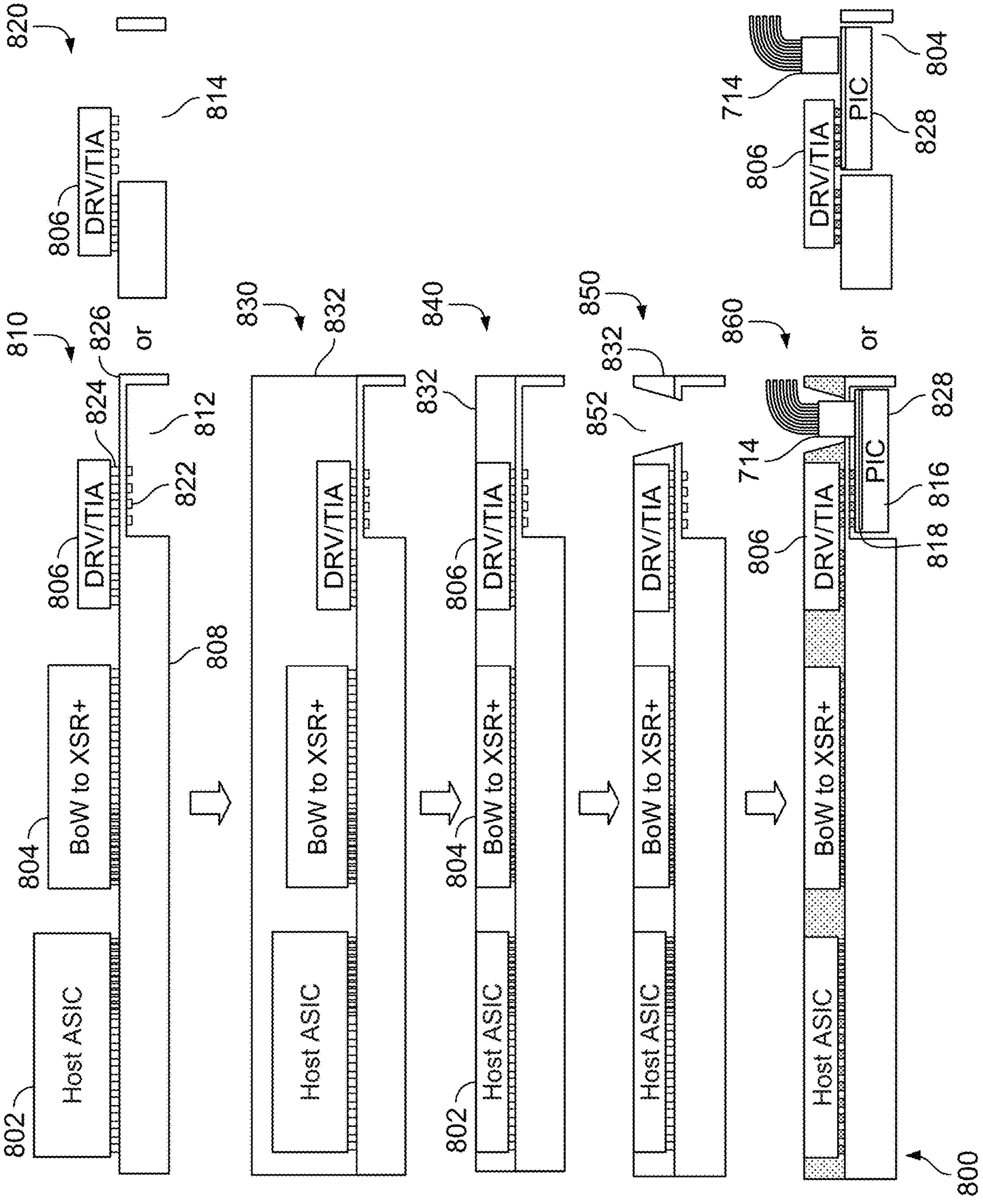
FIG. 28 is a diagram of an exemplary process for fabricating an exemplary semiconductor package that includes a data processing chiplet, a converter chiplet, and an electronic amplification chiplet that are mounted on a carrier wafer or common substrate, and a photonic chiplet that is disposed in a partial hole or a through-hole in the common substrate.

FIG. 28 shows an exemplary process 810 for fabricating an exemplary semiconductor package 800 that includes a data processing chiplet 802, a BoW-to-XSR+ converter chiplet 804, and an electronic amplification chiplet 806 that are mounted on a carrier wafer or common substrate 808, and a photonic chiplet 828 that is disposed in a partial hole 812 or a through-hole 814 in the common substrate 808. The photonic chiplet 828 of FIG. 28 can be similar to the photonic chiplet 680 of FIG. 23. The configurations of the data processing chiplet 802, the converter chiplet 804, and the electronic amplification chiplet 806 can be similar to those shown in FIG. 23.

In some implementations, in a step 820, a partial hole or cavity 812 or a through-hole 814 is etched or drilled in the carrier wafer or common substrate 808. The etching process can be performed using photolithography techniques, in which a photoresist layer is applied, exposed, and developed to form a mask layer on the carrier wafer 808. The portion of the carrier wafer 808 not covered by the photoresist mask layer is etched to form the partial hole 812 or the through-hole 814. Partial holes or cavities, or through-holes, can also be formed by drilling and cutting processes performed using, e.g., laser drilling and/or laser cutting. In this example, the photonic chiplet 828 has a silicon substrate 816 and an optically active layer 818 on or near a top side of the silicon substrate 816. The photonic chiplet 828 includes a plurality of front-side illuminated grating couplers at or near the optically active layer 818. In some examples, the grating couplers are arranged in a two-dimensional configuration, such as a 2D regular array. In some examples, the grating couplers are arranged in a one-dimensional configuration, such as along a line, a curve, or a row. In this example, the electronic amplification chiplet 806 is mounted on the common substrate 808, and a portion of the electronic amplification chiplet 806 is positioned above a thinned portion 826 of the carrier wafer 808 above the partial hole 812. Electrical contacts 822 are formed on the upper wall of the partial hole 812. The electrical contacts 822 are electrically coupled to electrical contacts 824 on the top side of the thinned portion 826 of the carrier wafer 808 by through vias in the thinned portion 826 of the carrier wafer 808.

In an optional step 830, an overmold process is performed in which a molding compound 832 is overmolded on the carrier wafer 808 and the chiplets 802, 804, and 806. This step (i.e., applying overmolding) is optional and not required when the carrier wafer 808 is a silicon interposer or a wafer that includes silicon bridges. The molding compound 832 provides additional structural support for the semiconductor package 800. If the step 830 is performed, then in a step 840, a grinding process is performed to reduce the thickness of the molding compound 832 and some of the chiplets (e.g., 802 and 804 in this example) so that the top surfaces of the data processing chiplet 802, the converter chiplet 804, and the electronic amplification chiplet 806 are exposed. This improves heat dissipation from the data processing chiplet 802, the converter chiplet 804, and the electronic amplification chiplet 806. This step 840 can be omitted if the molding compound 832 is omitted.

The top surface of the carrier wafer 808 includes a predefined pattern of bump contacts and signal lines. The data processing chiplet 802, the converter chiplet 804, and the electronic amplification chiplet 806 are mounted on the carrier wafer 808 such that respective bump contacts on the bottom sides of the data processing chiplet 802, the converter chiplet 804, and the electronic amplification chiplet 806 are electrically connected to respective matching bump contacts on the carrier wafer 808. A first set of a first number N1 of signal lines on the carrier wafer 808 interconnect the data processing chiplet 802 and the converter chiplet 804. A second set of a second number N2 signal lines on the carrier wafer 808 interconnect the converter chiplet 804 and the electronic amplification chiplet 806. The signal lines that interconnect the data processing chiplet 802 and the converter chiplet 804, and the signal lines that interconnect the converter chiplet 804 and the electronic amplification chiplet 806, can be similar to those shown in FIG. 7.

In a step 850, a through hole 852 is etched, drilled, or cut (e.g., using laser drilling or laser cutting) in the molding compound 832 and the thinned portion 826 of the carrier wafer 808 at the location where the grating couplers of the photonic chiplet 828 will be located to provide an opening for the grating couplers. If the step 830 is omitted and the molding compound 832 is not used, then in step 850, the through hole 852 is etched or drilled in the thinned portion 826 of the carrier wafer 808 at the location where the grating couplers of the photonic chiplet 828 will be located to provide an opening for the grating couplers.

In a step 860, the photonic chiplet 828 is inserted in the partial hole or cavity 812 and secured to the upper wall of the partial hole or cavity 822, in which electrical contacts on the top side of the photonic chiplet 828 are mechanically and electrically coupled to the electrical contacts 822 on the upper wall of the partial hole 812. For example, the electrical contacts on the top side of the photonic chiplet 828 can be soldered to the electrical contacts 822 on the upper wall of the partial hole 812. The grating couplers on the top side of the photonic chiplet 828 are exposed by the opening provided by the through hole 852. A fiber optic connector 714 is attached to the top side of the photonic chiplet 828. The fiber optic connector 714 can have fiber ports that are optically coupled to optical fibers and/or fiber cores. In some examples, the fiber optic connector 714 has fiber ports are arranged in a one-dimensional configuration, such as arranged along a line, a curve, or a row. In some examples, the fiber optic connector 714 has fiber ports arranged in a two-dimensional configuration.

In some examples, the fiber optic connector 714 has fiber ports arranged in a regular array having rows and columns. In some examples, the fiber optic connector 714 has fiber ports arranged in an arbitrary two-dimensional pattern. In some examples, the fiber optic connector 714 includes optics to transform a two-dimensional arrangement of light beams emitted from fiber ports arranged in a two-dimensional configuration to a one-dimensional arrangement of light beams that are directed toward optical couplers (in or near the optically active layer 686) that are arranged in a one-dimensional configuration. In some examples, the fiber optic connector 714 includes optics to transform a one-dimensional arrangement of light beams emitted from fiber ports arranged in a one-dimensional configuration to a two-dimensional arrangement of light beams that are directed toward optical couplers that are arranged in a two-dimensional configuration.

In some examples, the fiber connector 714 includes birefringent optical elements to separate, combine, or otherwise modify two orthogonal polarizations states of light propagating within a single fiber or fiber core on their way between a fiber core and one or more the vertical coupling element(s). Examples of such birefringent optical elements are described in U.S. Pat. No. 11,287,585 and U.S. patent application Ser. No. 17/693,040. In some examples, the fiber connector 714 multiplexes optical signals from a single fiber core onto multiple vertical coupling elements using polarization or wavelength multiplexing elements.

In the examples in which the through-hole 814 is formed in the carrier wafer 808 in the step 820, the electronic amplification chiplet 806 is mounted partially on the carrier wafer 808, and a portion of the electronic amplification chiplet 806 overhangs the through-hole 814. In the step 860, the photonic chiplet 828 is inserted into the through-hole 814, and the top side of the photonic chiplet 828 is mechanically and electrically coupled to the bottom side of the electronic amplification chiplet 806. For example, electrical contacts on the top side of the photonic chiplet 828 can be soldered to the electrical contacts on the bottom side of the electronic amplification chiplet 806.

In some alternative implementations, a semiconductor package includes a data processing chiplet 802, a BoW-to-XSR+ converter chiplet 804, and an electronic amplification chiplet 806 that are mounted on a common substrate that includes silicon bridges, and a photonic chiplet 828 that is disposed in a partial hole or cavity, or a through-hole, in the common substrate. The processing steps for fabricating the semiconductor package can be similar to the processing steps shown in FIG. 28, except that the common substrate includes fine-pitched silicon interposers that are embedded into coarse-pitched package substrate material. For example, a fine-pitched silicon interposer is positioned underneath the BoW interface and supports the fine-pitched bump contacts and fine-pitched signal lines of the BoW interface between the data processing chiplet 802 and the BoW-to-XSR+ converter chiplet 804.

FIGS. 29 and 30 show examples of the processing steps for fabricating the semiconductor package having the redistribution layers are shown in FIGS. 29 and 30. FIG. 29 shows an example of a die-first or chip-first fan-out wafer-level packaging (FoWLP) process 870 for fabricating a semiconductor package 940 that uses redistribution layers as the common substrate. In the process 870, chiplets are mounted on a temporary wafer carrier, and redistribution layers are formed later. FIG. 30 shows an example of a redistribution layer-first fan-out wafer-level packaging (FoWLP) process 910 for fabricating a semiconductor package 950 that uses redistribution layers as the common substrate. In the process 910, redistribution layers are formed on a temporary wafer carrier, and the chiplets are mounted on the redistribution layers later.

Referring to FIG. 29, the die-first or chip-first fan-out wafer-level packaging (FoWLP) process 870 includes a step 872 in which a double sided release tape 874 is attached to a temporary wafer carrier 876. In a step 878, a data processing chiplet 102, a converter chiplet 104, and a stack of chiplets 886 including an electronic amplification chiplet (EAC) 106 and a photonic chiplet 108 are mounted on the double sided release tape 874 on the wafer carrier 876. In some examples, the converter chiplet 104 is a BoW to XSR+ converter chiplet 104 that converts signals received from a BoW interface to signals that are provided on an XSR+ interface, or vice versa. For example, the BoW interface can support a bit rate of N1×R1, in which N1 is the number of parallel lanes or parallel bit streams, and R1 is the bit rate per lane or per stream. The XSR+ interface can support a bit rate of N2×R2, in which N2 is the number of parallel lanes or parallel bit streams, and R2 is the bit rate per lane or per stream. In this example, N1~=N2.

In some examples, the converter chiplet 104 is an XSR to MR converter chiplet 104 that converts signals received from an XSR interface 150 to signals that are provided on an MR interface, or vice versa. For example, the XSR interface can support a bit rate of N1×R1, in which N1 is the number of parallel lanes or parallel bit streams, and R1 is the bit rate per lane or per stream. The MR interface can support a bit rate of N2×R2, in which N2 is the number of parallel lanes or parallel bit streams, and R2 is the bit rate per lane or per stream. In this example, N1=N2.

In a step 880, a molding compound 182 is overmolded on the double sided release tape 874 and the chiplets 102, 104, 106, 108. In a step 882, a grinding process is performed to reduce the thickness of the molding compound 182 and one or more of the chiplets so that the top surfaces of the data processing chiplet 102, the converter chiplet 104, and the photonic chiplet 108 are exposed. Exposing the data processing chiplet 102 and the converter chiplet 104 improves heat dissipation from the chiplets. Exposing the photonic chiplet 108 enables the photonic chiplet 108 to gain access to the external optical link.

In a step 884, the data processing chiplet 102, the converter chiplet 104, the stack of chiplets 886 and the molding compound 182 are released from the double sided release tape 874 and removed from the temporary wafer carrier 876, resulting in a module 898 that includes the data processing chiplet 102, the converter chiplet 104, the stack of chiplets 886, and the molding compound 182. Electrical contacts 888 on the bottom side of the data processing chiplet 102, electrical contacts 890 on the bottom side of the converter chiplet 104, and electrical contacts 892 on the bottom side of the electronic amplification chiplet (EAC) 106 are exposed.

In a step 894, redistribution layers 900 are built on the bottom side of the module 898, in which conduction lines or traces 902 in the redistribution layers 900 are electrically coupled to the electrical contacts 888, 890, and 892 of the data processing chiplet 102, the converter chiplet 104, and the electronic amplification chiplet (EAC) 106, respectively. Solder balls 904 are mounted on the bottom side of the redistribution layers 900. A fiber optic connector 120 is attached to or mounted on the photonic chiplet 108. The completes the semiconductor package 940.

In this example, the redistribution layers 900 include a first set of a first number N1 of signal lines that interconnect the data processing chiplet 102 and the converter chiplet 104. The first set of the first number N1 of signal lines support the N1 parallel lanes of the BoW interface between data processing chiplet 102 and the converter chiplet 104. The redistribution layers include a second set of a second number N2 signal lines that interconnect the converter chiplet 104 and the electronic amplification chiplet 106. The second set of the second number N2 of signal lines support the N2 parallel lanes of the XSR+ interface between the converter chiplet 104 and the electronic amplification chiplet 106.

Referring to FIG. 30, the redistribution layer-first fan-out wafer-level packaging (FoWLP) process 910 includes a step 912 in which a temporary wafer carrier 914 having a sacrificial layer 916 is prepared. In a step 918, redistribution layers 900 are built on the sacrificial layer 916, and contact pads are built on the top side of the redistribution layers 900. In a step 920, chip to wafer bonding and underfilling are performed in which the data processing chiplet 102, the converter chiplet 104, and the electronic amplification chiplet 106 are mounted on the redistribution layers 900. Electrical contacts 888 on the bottom side of the data processing chiplet 102, electrical contacts 890 on the bottom side of the converter chiplet 104, and electrical contacts 892 on the bottom side of the electronic amplification chiplet (EAC) 106 are electrically coupled to the contact pads on the redistribution layers 900.

In this example, the redistribution layers 900 include a first set of a first number N1 of signal lines that interconnect the data processing chiplet 102 and the converter chiplet 104. The first set of the first number N1 of signal lines support the N1 parallel lanes of the BoW interface between data processing chiplet 102 and the converter chiplet 104. The redistribution layers include a second set of a second number N2 signal lines that interconnect the converter chiplet 104 and the electronic amplification chiplet 106. The second set of the second number N2 of signal lines support the N2 parallel lanes of the XSR+ interface between the converter chiplet 104 and the electronic amplification chiplet 106.

In a step 930, a molding compound 182 is overmolded on the redistribution layers 900 and the chiplets 102, 104, 106, 108. Optionally, a grinding process is performed to reduce the thickness of the molding compound 182 and one or more of the chiplets so that the top surfaces of the data processing chiplet 102, the converter chiplet 104, and the photonic chiplet 108 are exposed. Exposing the data processing chiplet 102 and the converter chiplet 104 improves heat dissipation from the chiplets. Exposing the photonic chiplet 108 enables the photonic chiplet 108 to gain access to the external optical link. The molding compound 182 provides structural strength to the semiconductor package 950.

In a step 960, the wafer carrier 914 and the sacrificial layer 916 are removed from the redistribution layers 900. Solder balls 904 are mounted on the bottom side of the redistribution layers 900. A fiber optic connector 120 is attached to or mounted on the photonic chiplet 108. This completes the semiconductor package 950.

Figure 31:
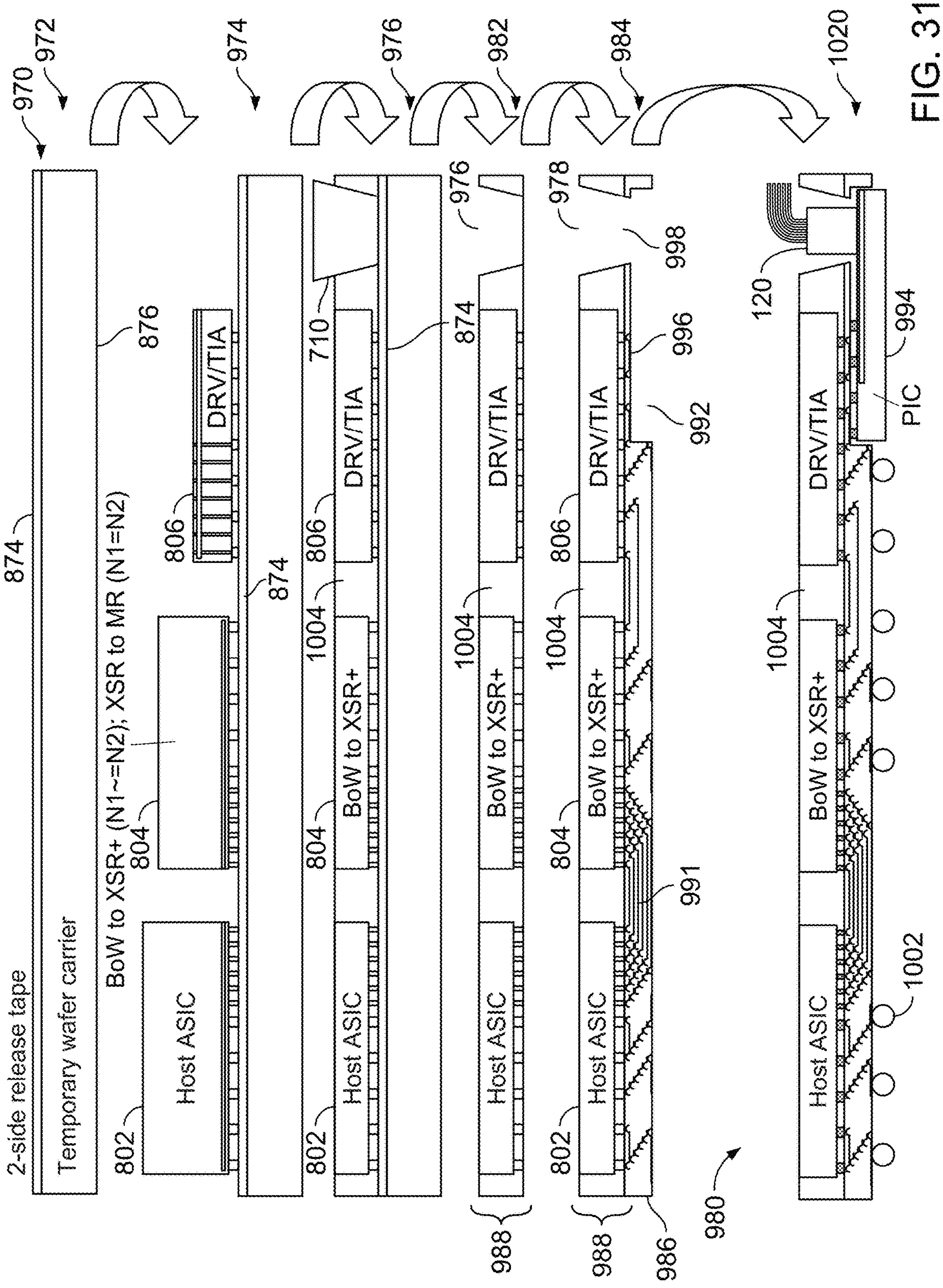
FIGS. 31 and 32 are diagrams of examples of processes for fabricating a semiconductor package that uses redistribution layers as a common substrate, in which a photonic chiplet is positioned in a partial through hole formed in the redistribution layers.
Figure 32:
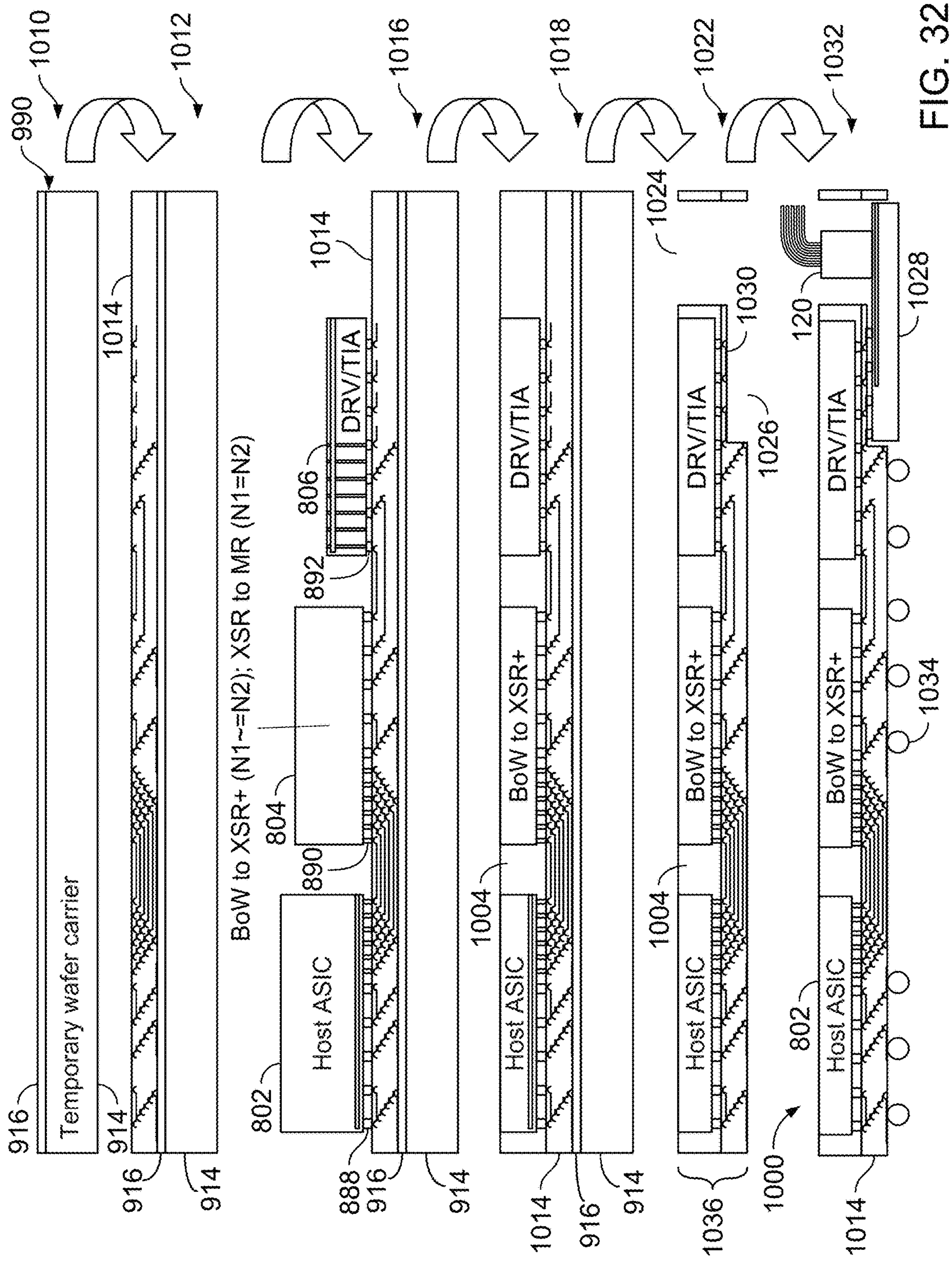

FIGS. 31 and 32 show two examples of processes for fabricating a semiconductor package that uses redistribution layers as a common substrate, in which a photonic chiplet is positioned in a partial through hole formed in the redistribution layers. FIG. 31 shows an example of a die-first or chip-first fan-out wafer-level packaging (FoWLP) process 970 for fabricating a semiconductor package 980 that uses redistribution layers as the common substrate, in which a photonic chiplet is positioned in a partial through hole formed in the redistribution layers. In the process 970, chiplets are mounted on a temporary wafer carrier, and redistribution layers are formed later. FIG. 32 shows an example of a redistribution layer-first fan-out wafer-level packaging (FoWLP) process 990 for fabricating a semiconductor package 1000 that uses redistribution layers as the common substrate, in which a photonic chiplet is positioned in a partial through hole formed in the redistribution layers. In the process 990, redistribution layers are formed on a temporary wafer carrier, and the chiplets are mounted on the redistribution layers later.

Referring to FIG. 31, the die-first or chip-first fan-out wafer-level packaging (FoWLP) process 970 includes a step 972 in which a double sided release tape 874 is attached to a temporary wafer carrier 876. In a step 974, a data processing chiplet 802, a converter chiplet 804, and an electronic amplification chiplet (EAC) 806 are mounted on the double sided release tape 874 on the wafer carrier 876.

In a step 976, a mechanical placeholder 710 is placed at a location above the region where the grating couplers of the photonic chiplet will be positioned. For example, the mechanical placeholder 710 can be made of glass, metal, ceramics, crystalline structures, or plastics. An overmold process is performed in which a molding compound 1004 is overmolded on the double sided release tape 874 and the chiplets 802, 804, 806, and a portion of the mechanical placeholder 710. The mechanical placeholder 710 is designed to have a height that is greater than the height of the molding compound 1004 so that after overmolding, a portion of the mechanical placeholder 710 protrudes from the molding compound 1004. In some examples, the mechanical placeholder 710 has sidewalls that are slightly slanted downwards and inwards so that the mechanical placeholder 710 can be pulled up and removed from the molding compound 1004 more easily to form an opening above the region where the grating couplers of the photonic chiplet will be positioned. The molding compound 1004 provides structural support for the semiconductor package 980. A grinding process is performed to reduce the thickness of the molding compound 1004 and some of the chiplets (e.g., 802, 804 in this example) so that the top surfaces of the data processing chiplet 802, the converter chiplet 804, and the electronic amplification chiplet 806 are exposed. This improves heat dissipation from the data processing chiplet 802, the converter chiplet 804, and the electronic amplification chiplet 806. In a step 982, the data processing chiplet 802, the converter chiplet 804, the electronic amplification chiplet 806, and the molding compound 1004 are released from the double sided release tape 874 and removed from the temporary wafer carrier 876. The mechanical placeholder 710 is pulled up and removed from the molding compound 1004 to form an opening 978 above the region where the grating couplers of the photonic chiplet will be positioned, resulting in a module 988 that includes the data processing chiplet 802, the converter chiplet 804, the electronic amplification chiplet 806, and the molding compound 1004. In some examples, instead of using a mechanical placeholder 710, the opening 978 can be formed by etching or drilling. The drilling process can be performed using, e.g., laser drilling and/or laser cutting.

In a step 984, redistribution layers 986 are built on the bottom side of the module 988, in which conduction lines or traces 991 in the redistribution layers 986 are electrically coupled to the electrical contacts of the data processing chiplet 802, the converter chiplet 804, and the electronic amplification chiplet (EAC) 806, respectively. A cavity or partial hole 992 is formed on the bottom side of the redistribution layers 986. The cavity or partial hole 992 is open on the bottom side and has dimensions slightly larger than the dimensions of a photonic chiplet 994 in the lateral direction (i.e., the direction parallel to the main surface of the module 988). The photonic chiplet 994 can be inserted into the cavity 992 through the opening on the bottom side. A thinned portion 996 of the redistribution layers 986 remains below a portion of the electronic amplification chiplet 806 and forms the upper wall of the cavity 992. The cavity or partial hole 998 has an opening 998 connected to the opening 978 formed by removal of the mechanical placeholder 710.

In this example, the redistribution layers 986 include a first set of a first number N1 of signal lines that interconnect the data processing chiplet 802 and the converter chiplet 804. The first set of the first number N1 of signal lines support the N1 parallel lanes of the BoW interface between data processing chiplet 802 and the converter chiplet 804. The redistribution layers 986 include a second set of a second number N2 signal lines that interconnect the converter chiplet 804 and the electronic amplification chiplet 806. The second set of the second number N2 of signal lines support the N2 parallel lanes of the XSR+ interface between the converter chiplet 804 and the electronic amplification chiplet 806.

In a step 1020, the photonic chiplet 994 is inserted into the cavity or partial hole 992. The electrical contacts on the top side of the photonic chiplet 994 are electrically coupled to the electrical contacts on the bottom side of the thinned portion 996 of the redistribution layers 986. The grating couplers of the photonic chiplet 994 are exposed by the openings 998 and 978. Solder balls 1002 are mounted on the bottom side of the redistribution layers 986. In this example and other examples described in this document, other attachment mechanism can be used, such as thermosonic bonding. Thus, when the term "soldering" is used to attach a first component (e.g., a chiplet) to a second component (e.g., a substrate), it is understood that the first component can be attached to the second component using any form of electrical attachment, such as electrical die-to-die attachment.

In some implementations, in step 974, multiple groups of the data processing chiplets 802, converter chiplets 804, and electronic amplification chiplets 806 are mounted on the release tape across a substantial portion of the temporary wafer carrier 876. In step 976, the molding compound 1004 is applied over the multiple groups of data processing chiplets 802, converter chiplets 804, and electronic amplification chiplets 806 across a substantial portion or the entire temporary wafer carrier. In step, 982, after the multiple groups of data processing chiplets 802, converter chiplets 804, and electronic amplification chiplets 806 are separated from the release tape 874 and the temporary wafer carrier 876, there are multiple modules 988 held together by the molding compound 1004. In step 984, the redistribution layers 986 are built under the multiple modules 988. In step 1020, the molding compound 1004 and redistribution layers 986 are cut or diced into individual semiconductor packages (see examples shown in FIGS. 39 and 40), and each individual semiconductor package includes corresponding redistribution layers 986. A fiber optic connector 120 is attached to or mounted on the photonic chiplet 994. The fiber optic connector 120 can be optically connected to a fiber array. This completes the fabrication of the semiconductor package 980.

In the example of FIG. 31, the photonic chiplet 994 has a thickness that is greater than the thickness of the redistribution layers 986. The combined thickness of the thinned portion 996 of the redistribution layers 986 and the photonic chiplet 994 is less than the combined thickness of the redistribution layers 986 and the solder balls 1002. In some implementations, the photonic chiplet 994 has a thickness of several hundred microns, and the depth of the cavity can be less than the thickness of the photonic chiplet 994. The solder balls 1002 at the bottom side of the redistribution layers 986 enable the semiconductor package 980 to be electrically coupled to other modules, such as a printed circuit board.

Referring to FIG. 32, the redistribution layer-first fan-out wafer-level packaging (FoWLP) process 990 includes a step 1010 in which a temporary wafer carrier 914 having a sacrificial layer 916 is prepared. In a step 1012, redistribution layers 1014 are built on the sacrificial layer 916, and contact pads are built on the top side of the redistribution layers 1014. In a step 1016, chip to wafer bonding and underfilling are performed, in which the data processing chiplet 802, the converter chiplet 804, and the electronic amplification chiplet 806 are mounted on the redistribution layers 900. Electrical contacts 888 on the bottom side of the data processing chiplet 802, electrical contacts 890 on the bottom side of the converter chiplet 804, and electrical contacts 892 on the bottom side of the electronic amplification chiplet (EAC) 806 are electrically coupled to the contact pads on the redistribution layers 1014.

In this example, the redistribution layers 1014 include a first set of a first number N1 of signal lines that interconnect the data processing chiplet 802 and the converter chiplet 804. The first set of the first number N1 of signal lines support the N1 parallel lanes of the BoW interface between data processing chiplet 802 and the converter chiplet 804. The redistribution layers 1014 include a second set of a second number N2 signal lines that interconnect the converter chiplet 804 and the electronic amplification chiplet 806. The second set of the second number N2 of signal lines support the N2 parallel lanes of the XSR+ interface between the converter chiplet 104 and the electronic amplification chiplet 106.

In a step 1018, a molding compound 1004 is overmolded on the redistribution layers 1014 and the chiplets 802, 804, 806. Optionally, a grinding process is performed to reduce the thickness of the molding compound 1004 and one or more of the chiplets so that the top surfaces of the data processing chiplet 802, the converter chiplet 804, and the electronic amplification chiplet 806 are exposed. Exposing the data processing chiplet 802, the converter chiplet 804, and the electronic amplification chiplet 806 improves heat dissipation from the chiplets. The molding compound 182 provides structural strength to the semiconductor package 1000.

In a step 1022, the wafer carrier 914 and the sacrificial layer 916 are removed from the redistribution layers 1014 to form a module 1036 that includes the molding compound 1004, the chiplets 802, 804, 806, and the redistribution layers 1014. A cavity or partial hole 1026 is formed on the bottom side of the redistribution layers 1014. The cavity or partial hole 1026 has dimensions slightly larger than the dimensions of the photonic chiplet 1028 in the lateral direction (i.e., the direction parallel to the main surface of the redistribution layers 1014. A thinned portion 1030 of the redistribution layers 1014 remains below a portion of the electronic amplification chiplet 806 and the molding compound 1004. An opening 1024 is formed by, e.g., etching or drilling through the molding compound 1004 and the thinned portion 1030 of the redistribution layers 1014. The drilling process can be performed using, e.g., laser drilling and/or laser cutting. The opening 1024 is located above the region where the grating couplers of the photonic chiplet will be positioned.

In a step 1032, a photonic chiplet 1028 is inserted into the cavity or partial hole 1026. The electrical contacts on the top side of the photonic chiplet 1028 are electrically coupled to the electrical contacts on the bottom side of the thinned portion 1030 of the redistribution layers 1014. The grating couplers of the photonic chiplet 1028 are exposed by the opening 1024. Solder balls 1034 are mounted on the bottom side of the redistribution layers 1014.

In some implementations, in step 1012, the redistribution layers 1014 are built on the sacrificial layer 916 that spans a substantial portion of the temporary wafer carrier 914. In step 1016, multiple groups of the data processing chiplets 802, converter chiplets 804, and electronic amplification chiplets 806 are mounted on the redistribution layers 1014. In step 1018, the molding compound 1004 is applied over the multiple groups of data processing chiplets 802, converter chiplets 804, and electronic amplification chiplets 806 across a substantial portion or the entire temporary wafer carrier 914. In step, 1022, after the multiple groups of data processing chiplets 802, converter chiplets 804, and electronic amplification chiplets 806 are separated from the sacrificial layer 916 and the temporary wafer carrier 914, there are multiple modules 1036 held together by the molding compound 1004. In step 1032, the molding compound 1004 and redistribution layers 1014 are cut or diced into individual semiconductor packages, and each individual semiconductor package includes corresponding redistribution layers 1014. A fiber optic connector 120 is attached to or mounted on the photonic chiplet 1028. The fiber optic connector 120 can be optically connected to a fiber array. This completes the process 990 for fabricating the semiconductor package 1000.

An advantage of the processes 970 (FIG. 31) and 990 (FIG. 32) is that there is no need to have electrically conductive through-silicon vias in the photonic chiplet 994 or 1028. Many semiconductor fabs that manufacture photonic chiplets do not have readily available semiconductor fabrication processes for making electrically conductive through-silicon vias in photonic chiplets. The processes 970 (FIG. 31) and 990 (FIG. 32) are useful in manufacturing semiconductor packages that include electronic chiplets and photonic chiplets, in which the photonic chiplets do not have electrically conductive through-silicon vias.

Figure 33:
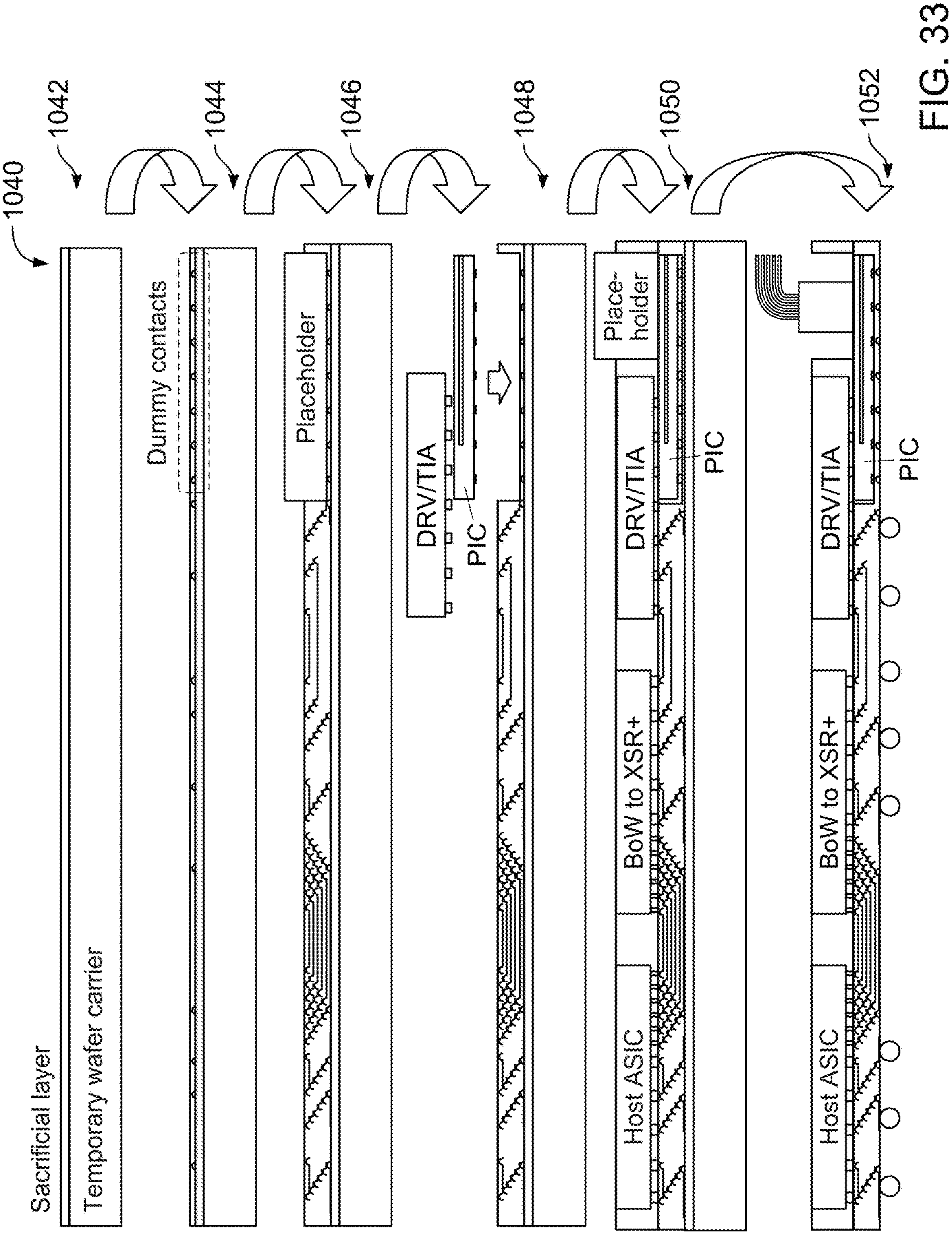
FIG. 33 is a diagram of an example of a redistribution layer-first fan-out wafer-level packaging (FoWLP) process for fabricating a semiconductor package that includes redistribution layers in which a cavity is formed in the redistribution layers, and the photonic chiplet is inserted into the cavity.

FIG. 33 shows a redistribution layer-first fan-out wafer-level packaging (FoWLP) process 1040 for fabricating a semiconductor package that includes redistribution layers in which a cavity is formed in the redistribution layers, and the photonic chiplet is inserted into the cavity. Step 1042: Prepare temporary wafer carrier with sacrificial layer. Step 1044: Build up first RDL layer(s), optionally with dummy contact pads used to affix the PIC later (in lieu of epoxy). Step 1046: Build RDLs and contact pads. Leave future cavity open by etching after RDL build-up or by placing a removable placeholder during RDL build-up. Step 1048: Bond pre-assembled DRV/TIA+PIC onto RDL. Step 1050: Bond other chiplets, overmold and optional grind, use removable placeholder to protect PIC coupling area (or etch overmolding away afterwards). Step 1052: Remove carrier wafer and sacrificial layer, attach solder balls, mount fiber array.

Figure 34:
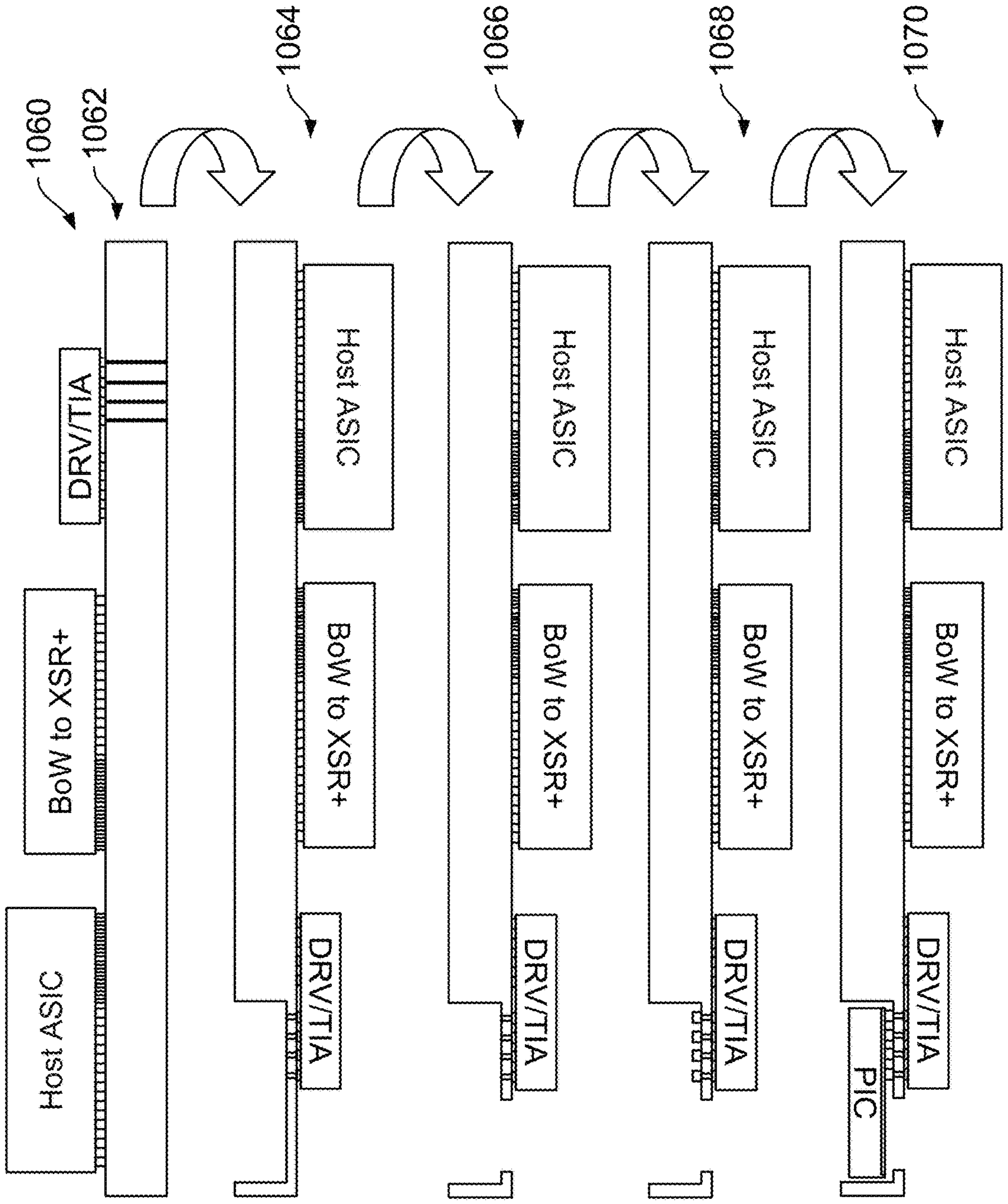
FIG. 34 is a diagram of an example of a process for fabricating a semiconductor package that includes a partial through hole to expose grating couplers of a photonic chiplet.

FIG. 34 shows a process 1060 for fabricating a semiconductor package that includes a partial through hole to expose the grating couplers of the photonic chiplet. Step 1062: Bond dies on top side. Step 1064: Flip the structure and etch a cavity. Step 1066: Etch a full hole where needed to allow light to reach the PIC. Step 1068: Deposit bond contacts for PIC. Step 1070: Bond PIC.

Figure 35:
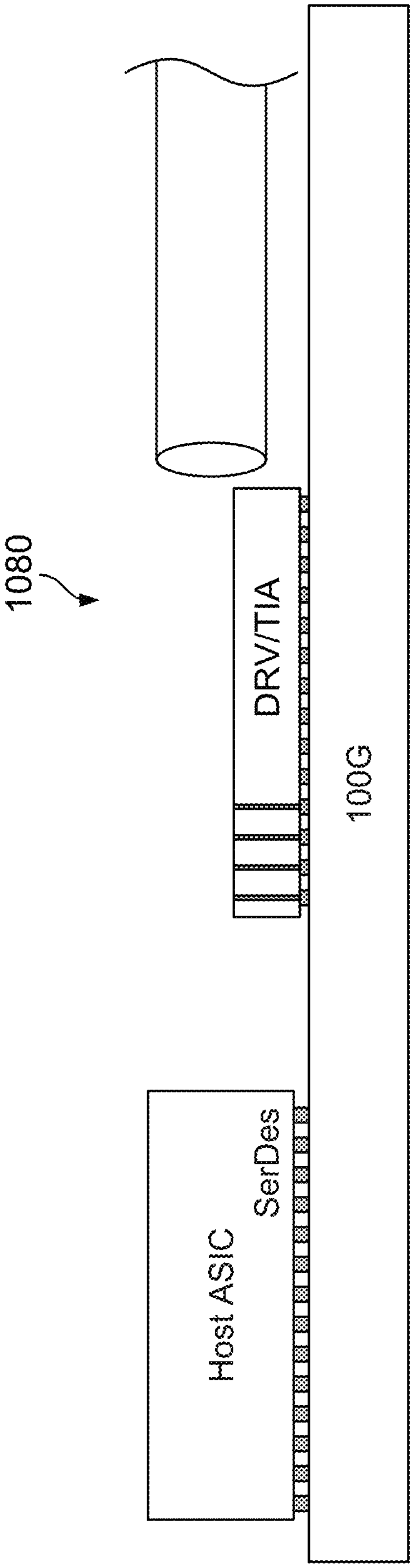
FIG. 35 is a diagram of an example of a semiconductor package in which a photonic chiplet is coupled to one or more optical fibers by edge coupling.

FIG. 35 shows a semiconductor package 1080 in which the photonic chiplet is coupled to one or more optical fibers by edge coupling. Comparing the semiconductor package 100 of FIG. 2 with the semiconductor package 1080, if the optical fibers and/or fiber cores 122 are arranged in a two dimensional pattern, a larger number of optical fibers and/or fiber cores 122 can be vertically coupled to the photonic chiplet 108, as compared to the number of optical fibers that can be coupled to the photonic chiplet using edge coupling. Thus, the semiconductor package 100 (when using a two dimensional arrangement of optical fibers and/or fiber cores) can have a much higher optical input/output bandwidth as compared to the semiconductor package 1080.

Figure 36:
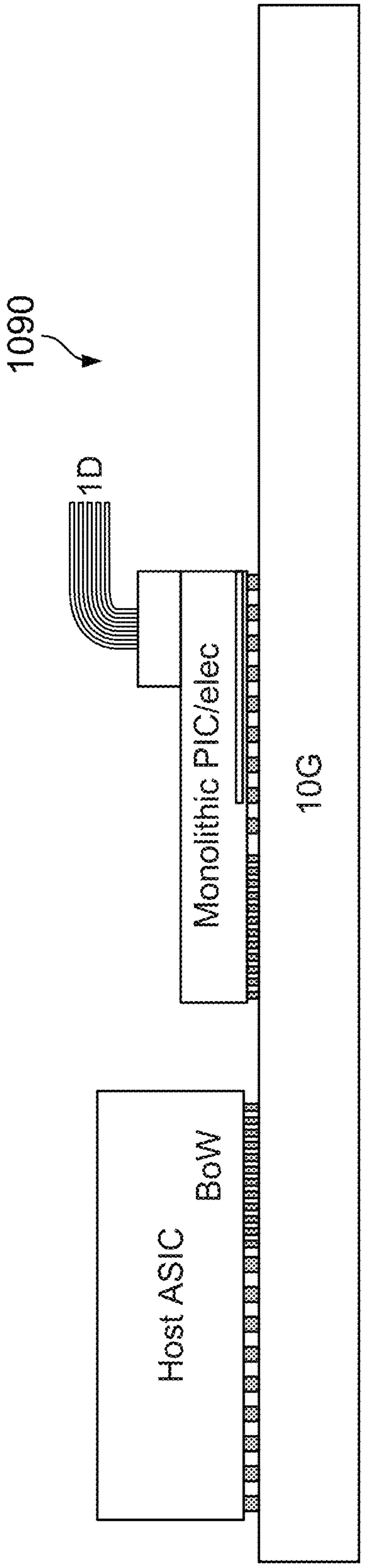
FIG. 36 is a diagram of an example of a semiconductor package in which a photonic chiplet is coupled to an optical fiber ribbon that includes a row of optical fibers.

FIG. 36 shows a semiconductor package 1090 in which the photonic chiplet is coupled to an optical fiber ribbon that includes a row of optical fibers. Comparing the semiconductor package 100 of FIG. 2 with the semiconductor package 1090, if the optical fibers and/or fiber cores 122 are arranged in a two dimensional pattern, a larger number of optical fibers and/or fiber cores 122 can be vertically coupled to the photonic chiplet 108, as compared to the number of optical fibers in the optical fiber ribbon. Thus, the semiconductor package 100 (when using a two dimensional arrangement of optical fibers and/or fiber cores) can have a much higher optical input/output bandwidth as compared to the semiconductor package 1090.

An advantage of the semiconductor packages described above is that engineers can design data processing chiplets (e.g., 102) independently of the photonic chiplets (e.g., 108), and the data processing chiplets can be made using fabrication processes different from the fabrication processes for making the photonic chiplets, while still able to provide high speed communication paths between the data processing chiplets and the photonic chiplets. The data bandwidths of the interfaces between the data processing chiplets and the photonic chiplets in the semiconductor packages (e.g., 100) described above are much higher than the data bandwidths that can be achieved using a system in which data processing integrated circuits and photonic integrated circuits are mounted on printed circuit boards. Engineers can design data processing chiplets that have various capabilities and use various input/output interfaces that are compatible with, or comply with, various interface specification, protocols, or standards. Engineers can design photonic chiplets and electronic amplification chiplets that have various capabilities and use various input/output interfaces that are compatible with, or comply with, various interface specification, standards, or protocols. The design of the data processing chiplets can be performed independently of the design of the photonic chiplets and the electronic amplification chiplets. An engineer can design the semiconductor package by selecting a data processing chiplet that has suitable data processing capabilities and uses a first input/output interface that is compatible with, or complies with, a first interface specification, standard, or protocol. The engineer can select a photonic chiplet that has suitable opto-electronic processing capabilities and a corresponding electronic amplification chiplet that uses a second input/output interface that is compatible with, or complies with, a second interface specification, standard, or protocol. The engineer can then select a converter chiplet that can convert between the first interface used by the data processing chiplet and the second interface used by the electronic amplification chiplet corresponding to the photonic chiplet. As described above, the interface between the data processing chiplet and the photonic chiplet can have a pitch density up to 500 lines/mm, or more, and the data rate can be, e.g., 16 Gbps per lane or more. The bandwidth density that can be achieved by the semiconductor packages described above can be much higher than what can be achieved using a system in which data processing integrated circuits and photonic integrated circuits are mounted on printed circuit boards.

Figure 38A:
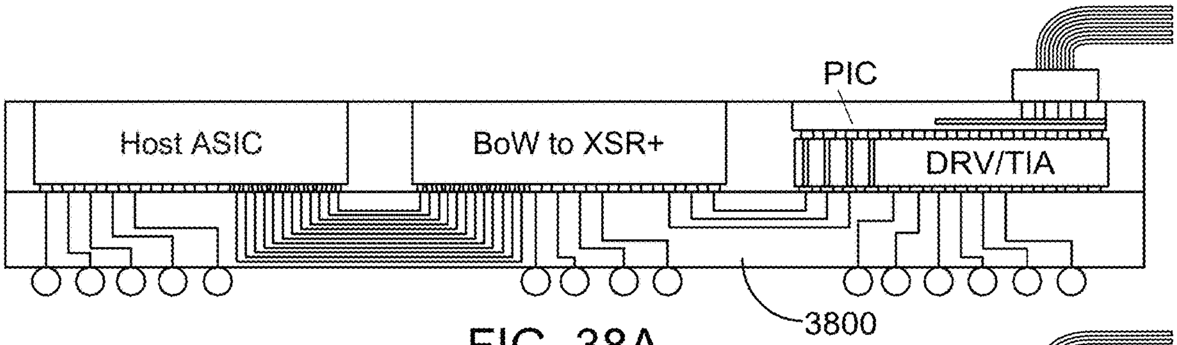
FIGS. 38A to 38D are diagrams of examples of semiconductor packages.
Figure 38B:
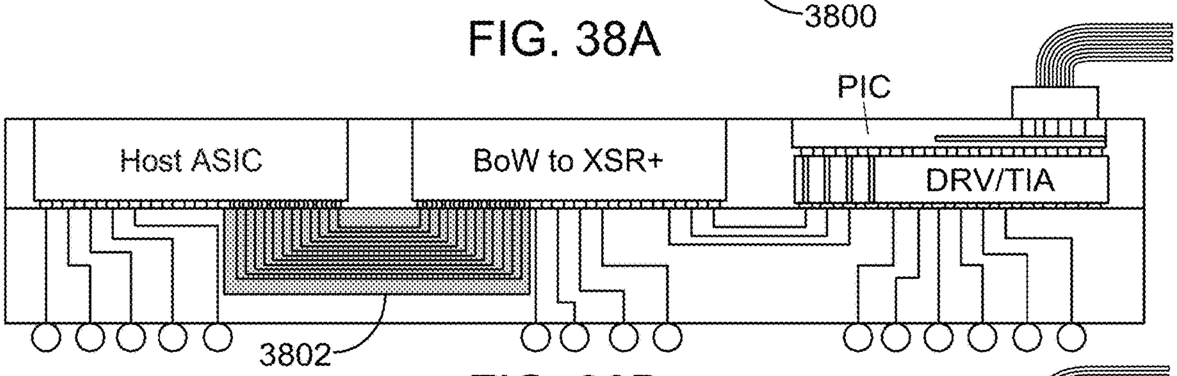
Figure 38C:
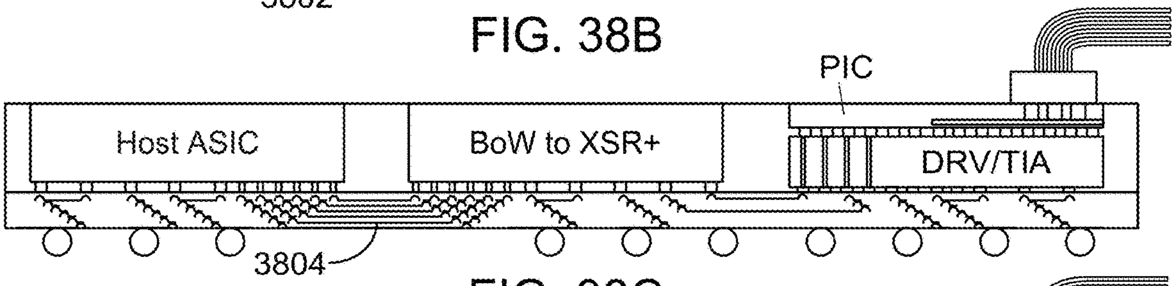
Figure 38D:
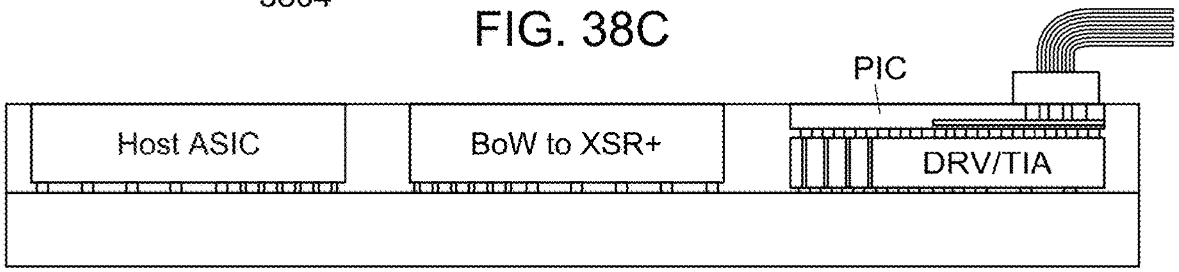

FIG. 38A reproduces the semiconductor package shown near the bottom of FIG. 7. In this example, the common substrate is a silicon interposer 3800, in which the electrical connections are formed by metal layers within a silicon chip. FIG. 38B reproduces the semiconductor package shown in FIG. 37. In this example, a silicon bridge 3802 is used, in which fine-pitched connections formed by metal layers within a silicon chip is inset embedded in a coarse-pitched organic/ceramic substrate. FIG. 38C reproduces the semiconductor package shown near the bottom of FIGS. 29 and 30. In this example, the common substrate includes redistribution layers 3803 made using a fan-out wafer-level packaging (FoWLP) process. The electrical connections are formed by metal layers and polymer layers within a redistribution layers, deposited using a temporary carrier in a chip-first (FIG. 29) or redistribution layer-first (FIG. 30) process. For graphical clarity, the bump pitches are doubled in this figure, but the bump pitches can be the same as those for the examples shown in FIG. 38A (with a silicon interposer) and FIG. 38B (with a silicon bridge). In FIGS. 38A, 38B, and 38C, the configurations of the data processing chiplet 102, the converter chiplet 104, the electronic amplification chiplet 106, and the photonic chiplet 108 are similar, with the common substrate being different. FIG. 38D reproduces the semiconductor package shown near the bottom of FIG. 5. FIG. 38D is a shorthand drawing that serves as a stand-in for all three of the above variants (e.g., the examples shown in FIGS. 38A, 38B, 38C). In a similar manner, the example shown near the bottom of FIG. 8, the examples shown in FIGS. 9 to 14, the example shown near the bottom of FIGS. 15 to 17, the example shown in FIG. 18A, the examples shown in FIGS. 20 to 22, the example shown near the bottom of FIG. 23, and the example shown near the bottom of FIG. 28 are shorthand drawing that serve as stand-ins for three types of the variants, i.e., a semiconductor package that uses a silicon interposer, a semiconductor package that uses one or more silicon bridges, and a semiconductor package that uses redistribution layers.

Figure 39:
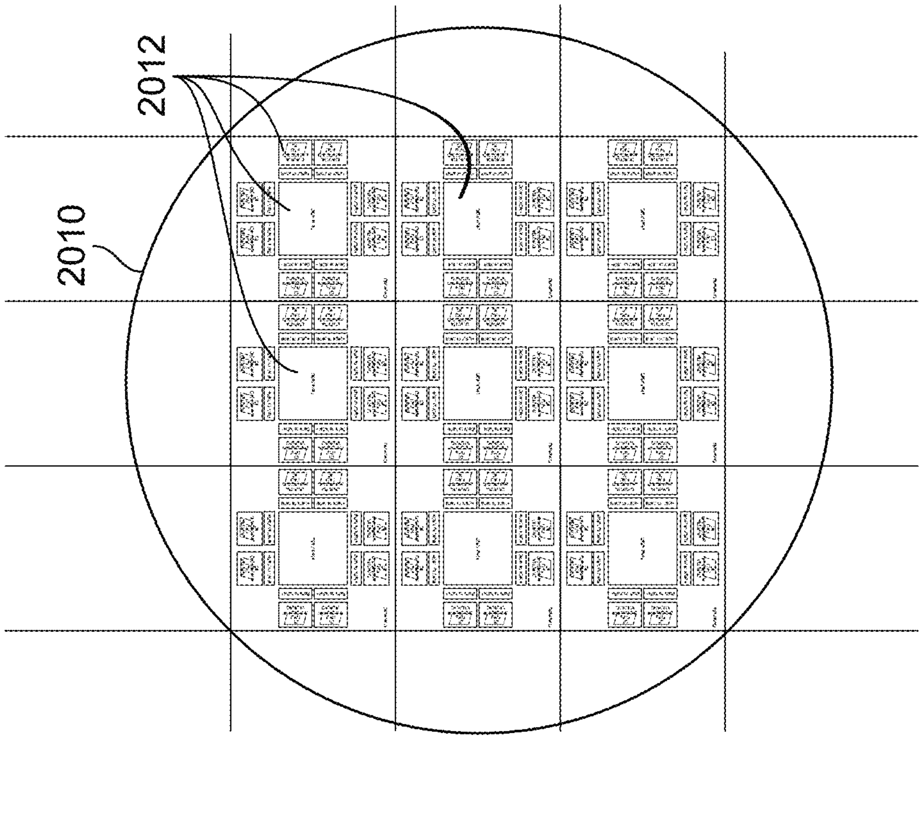
FIG. 39 is a diagram of an example semiconductor wafer on which components are formed or mounted.

Referring to FIG. 39, in some implementations, components 2012 (e.g., data processing chiplets, converter chiplets, electronic amplification chiplets, and photonic chiplets) are formed or mounted on a semiconductor wafer 2010, the wafer 2010 is processed to produce multiple dies in parallel, then the wafer 2010 is cut or diced to produce multiple individual dies. For example, the wafer 2010 can have a diameter of about 100 mm, 200 mm, 300 mm, 450 mm, or larger.

Figure 40:
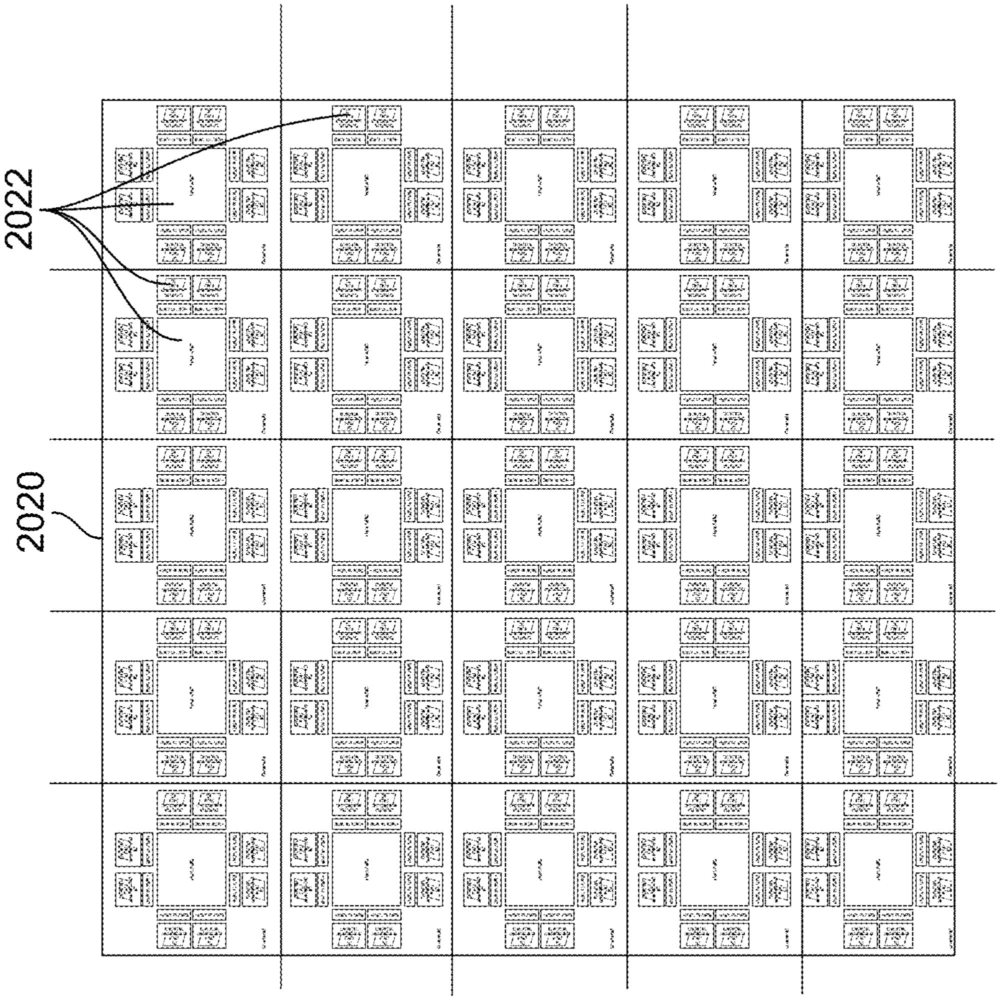
FIG. 40 is a diagram of an example of multiple dies that include components formed or mounted on a semiconductor wafer.

Referring to FIG. 40, in some implementations, components 2022 (e.g., data processing chiplets, converter chiplets, electronic amplification chiplets, and photonic chiplets) are formed or mounted on a panel substrate 2020, the panel substrate 2020 is processed to produce multiple dies in parallel, then the panel substrate 2020 is cut or diced to produce multiple individual dies. For example, the panel substrate 2020 can have dimensions of about 510 mm×415 mm, 510 mm×515 mm, or 600 mm×600 mm.

FIG. 41 is a top view diagram of an application specific integrated circuit that has 25 Tbps data processing bandwidth. An inset 2032 shows an example of the electrical contact layout for the input/output interface.

FIG. 42 shows as table 2040 that includes information about various parameters for various types of input/output interfaces. Examples of the input/output interfaces include 200G SerDes, XLR SerDes, LR SerDes, MR SerDes, XSR SerDes, BoW on organic substrate, and BoW on silicon interposer. Examples of the parameters include pre-lane rate, loss at Nyquist frequency, power, area per 112 Gbps, and shoreline bandwidth density. Based on the information in the table 2040, one can design the converter chiplets, the electronic amplification chiplets, the photonic chiplets, and the fiber optic connectors in a pitch matched configuration.

The shoreline bandwidth density refers to the input/output interface rate per unit length of processor edge, where (i) the input/output interface rate can be defined as simplex, duplex, or full-duplex, and may or may not include protocol overheads such as packet headers, forward error correction (FEC), or clock signals; and (ii) the processor edge can be defined as the edge of a chip (die), the edge of a substrate, or the linear edge of any other substantially planar arrangement of data processing devices. The shoreline bandwidth density is measured in Bps/mm.

In some implementations, the shoreline bandwidth density at the fiber optic connector can be calculated as an average across the entire packaged chip or module. For example, if a chip has an edge of 5 mm and is packaged on a substrate that is 7 mm wide and the substrate is put in an enclosure that is 10 mm wide, and the sum of all optical fibers leaving that enclosure carries 10 Tbps and occupies no more than 10 mm of width, the module would have a shoreline bandwidth density of 1 Tbps/mm on a module level. If the same solution is used on a chiplet level (i.e. omitting the substrate and the enclosure), the chiplet would have a shoreline bandwidth density of 10 Tbps/5 mm=2 Tbps/mm.

In some implementations, the shoreline bandwidth density for a fiber optic connector can be determined in an average systems context, i.e., by placing several equal modules next to each other and amortizing any overheads such as connector mounting structures and gaps across the overall assembled width, and dividing the aggregate bandwidth by the total edge length. The shoreline bandwidth density can also be determined on a module level or on a chiplet level by omitting any packaging overheads, gaps, etc.

Figure 88:
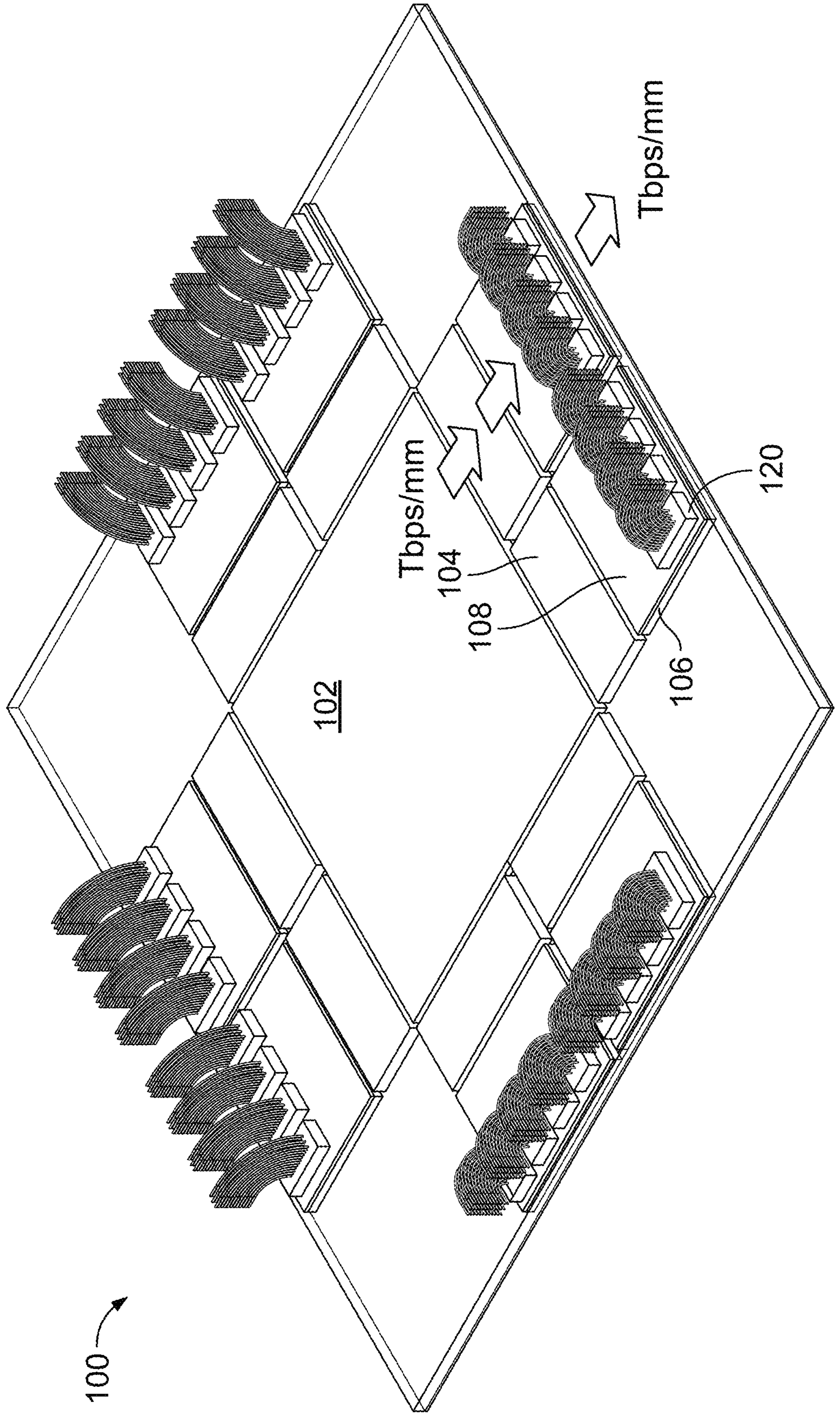
FIG. 88 is a diagram of an example of a semiconductor package that achieves a pitch-matched configuration.

Referring to FIG. 88, in some implementations, the semiconductor package 100 of FIGS. 1A to 1H achieves a pitch-matched configuration when the shoreline bandwidth density is substantially maintained from the data processing chiplet 102 to the converter chiplet 104 to the electronic amplification chiplet 106 to the photonic chiplet 108 and to the fiber optic connector 120.

In some implementations, a semiconductor package that has a "pitch-matched" configuration means there is no need to fan out. A need to fan out can occur from any mechanical mechanism that makes it necessary to broaden the data bus, including any support structures, gaps, etc.

Figure 57A:
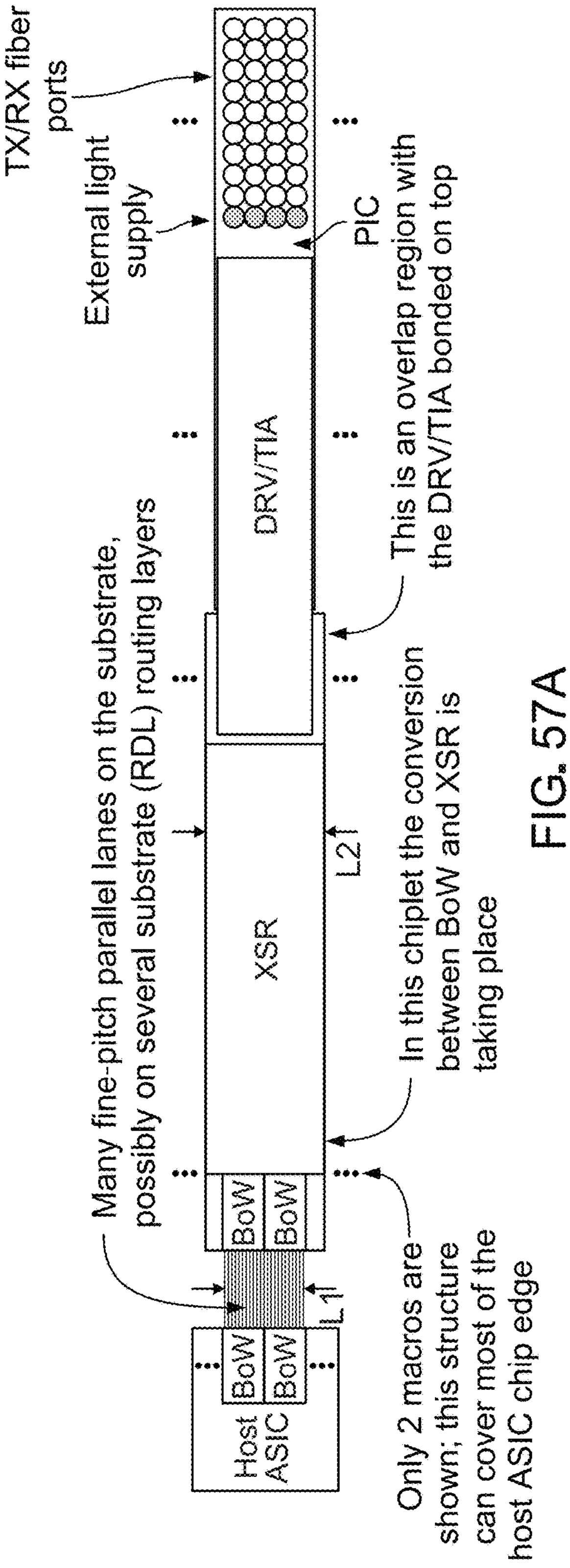
FIGS. 57A to 57C are diagrams that provide information about pitch-matched geometries for an example of an electrical/optical input/output interface.
Figure 57B:
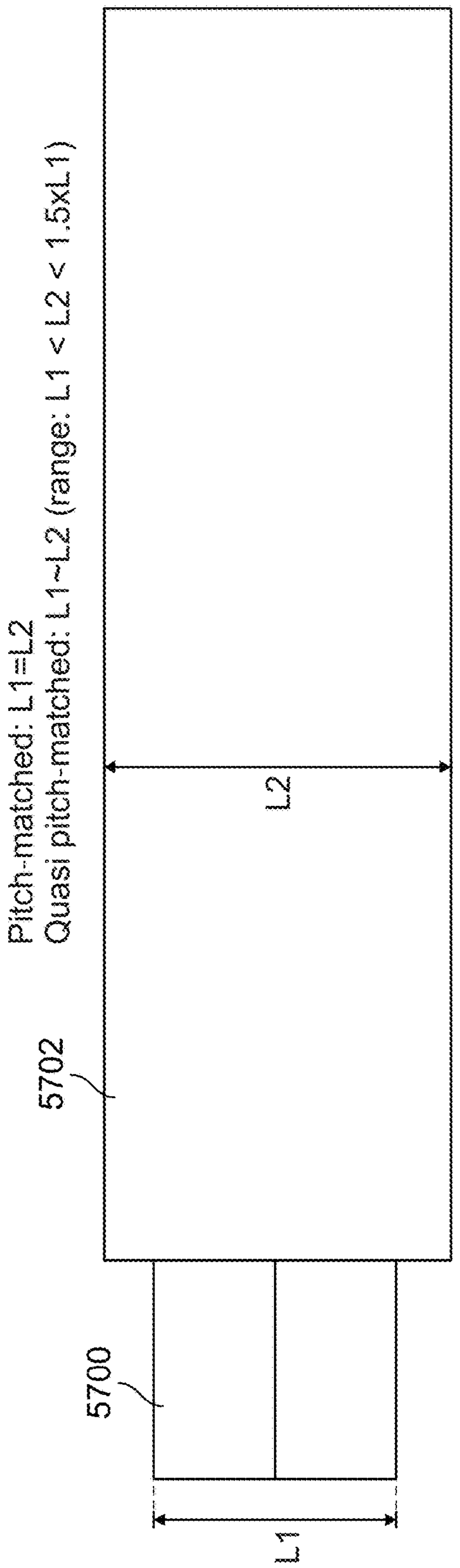

As shown in FIGS. 57A and 57B, when the width L1 of the BoW blocks is the same as the width L2 of the XSR block, i.e., L1=L2, we say that the XSR block is pitch-matched to the BoW blocks. When the width L1 of the BoW blocks is approximately the same as the width L2 of the XSR block, i.e., L1<L2<1.5×L1 (or L2<L1<1.5×L2), we say that the XSR block is quasi pitch-matched to the BoW blocks. In the following, we describe several examples in which the XSR blocks (or LR block) are/is quasi pitch-matched to the BoW blocks. It is also possible to modify the BoW blocks to be slightly wider (e.g., by slightly increasing the spacing between parallel signal lines) such that the XSR blocks (or LR block) are/is pitch-matched to the BoW blocks. The geometries of various modules, such as the slow-and-parallel blocks (e.g., BoW blocks), the fast-and-serial blocks (e.g., XSR blocks, LR blocks), the driver/TIA circuitry, the photonic chiplets, the fiber optic connectors, and the arrays of optical fibers described in this document are merely examples and can be modified according to the requirements of applications.

FIGS. 43 to 57B show top views and side views of some pitch-matched or quasi pitch-matched packaging examples using 2D fiber arrays. The chiplet packaging options discussed above can be made pitch-matched or quasi pitch-matched using the ways explained in these examples. Pitch-matching or quasi pitch-matching is not limited to these examples.

Figure 43:
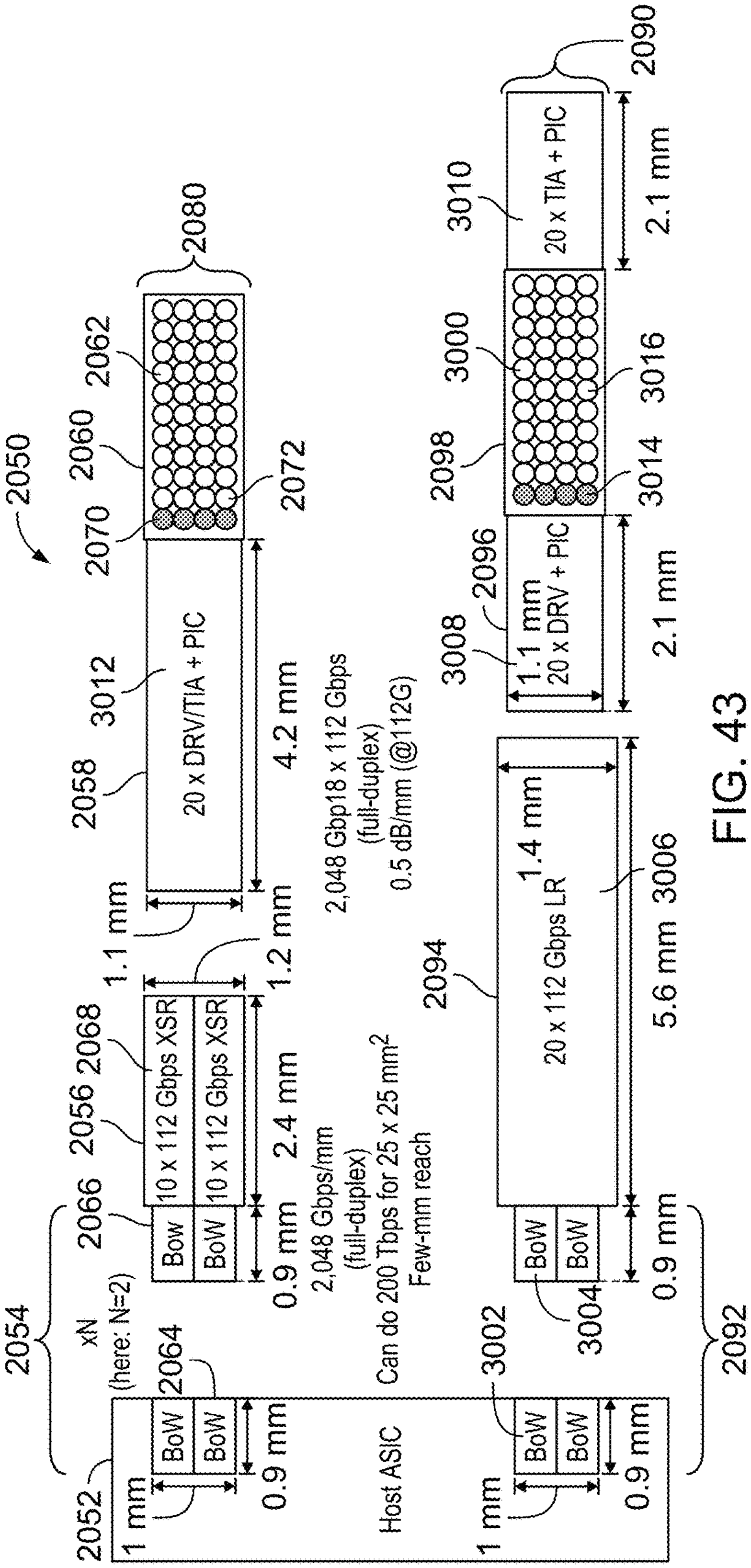
FIGS. 43 to 56C are top views and side views of pitch-matched or quasi pitch-matched packaging examples using 2D fiber arrays.

FIG. 43 shows a top view of a semiconductor package 2050 that includes a host ASIC 2052 and two electrical/optical input/output modules 2080, 2090 that have pitch matching geometries. The first electrical/optical input/output module 2080 includes a BoW interface 2054, a BoW-to-XSR converter chiplet 2056, a combined driver/TIA and photonic chiplet 2058, and a fiber optic connector 2060 that is configured to be optically coupled to an array of optical fibers 2062. The host ASIC 2052 includes two BoW blocks 2064. The BoW-to-XSR converter chiplet 2056 includes two BoW blocks 2066 and two 10×112 Gbps XSR blocks 2068. The combined driver/TIA and photonic chiplet 2058 includes 20×driver/TIA circuitry 3012 and grating couplers that are optically coupled to the optical fibers 2062 through the fiber optic connector 2060. The two BoW blocks 2064 of the host ASIC 2052 communicate with the two BoW blocks 2066 of the converter chiplet 2056. The two 10×112 Gbps XSR blocks 2068 of the converter chiplet 2056 communicate with the 20×driver/TIA circuitry of the combined driver/TIA and photonic chiplet 2058.

In this example, each BoW block 2064, 2066 has a length of 0.9 mm and a width of 0.5 mm. The two BoW blocks 2064 occupy an east/west edge of 1 mm in length. Each 10×112 Gbps XSR block 2068 has a length of 2.4 mm and a width of 0.6 mm. The two 10×112 Gbps XSR blocks 2068 have a combined width of 1.2 mm. The 20×driver/transimpedance amplifier circuitry 3012 has a length of 4.2 mm and a width of 1.1 mm. The array of optical fibers 2060 includes 1 row of optical power supply fibers 2070 (that transmit power supply light) and 10 rows of data fibers 2072 (that transmit control signals and data signals). The shoreline bandwidth density is maintained from the host ASIC 2052 to the optical fibers 2062. According to the table 2040 in FIG. 42, assuming that the BoW interface is formed on a silicon interposer, the BoW blocks 2064, 2066 have a shoreline bandwidth density of about 2,048 Gbps/mm (full duplex).

The shoreline bandwidth density is substantially maintained from the BoW blocks 2064 at the host ASIC 2052 to the optical fibers 2060.

The second electrical/optical input/output module 2090 includes a BoW interface 2092, a BoW-to-LR converter chiplet 2094, a combined driver/TIA and photonic chiplet 2096, and a fiber optic connector 2098 that is configured to be optically coupled to an array of optical fibers 3000. The host ASIC 2052 includes two BoW blocks 3002. The BoW-to-LR converter chiplet 2094 includes two BoW blocks 3004 and a 20×112 Gbps LR block 3006. The combined driver/TIA and photonic chiplet 2096 includes two 20×driver/TIA circuitry 3008, 3010 and grating couplers that are optically coupled to the optical fibers 3000 through the fiber optic connector 2098. The two BoW blocks 3002 of the host ASIC 2052 communicate with the two BoW blocks 3004 of the converter chiplet 2094. The 20×112 Gbps LR block 3006 of the converter chiplet 2094 communicates with the two 20×driver/TIA circuitry 3008, 3010 of the combined driver/TIA and photonic chiplet 2096.

In this example, each BoW block 3002, 3004 has a length of 0.9 mm and a width of 0.5 mm. The two BoW blocks 3002 occupy an east/west edge of 1 mm in length. The 20×112 Gbps LR block 3006 has a length of 5.6 mm and a width of 1.4 mm. Each of the 20×driver/transimpedance amplifiers 3008, 3010 has a length of 2.1 mm and a width of 1.1 mm. The array of optical fibers 3000 includes 1 row of optical power supply fibers 3014 (that transmit power supply light) and 10 rows of data fibers 3016 (that transmit control signals and data signals). The shoreline bandwidth density is maintained from the host ASIC 2052 to the optical fibers 3000. According to the table 2040 in FIG. 42, assuming that the BoW interface is formed on a silicon interposer, the BoW blocks 3002, 3004 have a shoreline bandwidth density of about 2,048 Gbps/mm. The shoreline bandwidth density is substantially maintained from the BoW blocks 3002 at the host ASIC 2052 to the optical fibers 3000.

In the example shown in FIG. 43, the first electrical/optical input/output module 2080 includes two BoW blocks 2064, two BoW blocks 2066, two 10×112 Gbps XSR blocks 2068, one 20×driver/TIA circuitry 3012, and one fiber optic connector 2060 that is optically coupled to one array of optical fibers 2062. In some implementations, to increase input/output data throughput, the electrical/optical input/output module 2080 can be repeated and placed side-by-side in parallel. The BoW blocks 2064 can occupy a large portion of the edge of the host ASIC 2052.

The second electrical/optical input/output module 2090 includes two BoW blocks 3002, two BoW blocks 3004, one 20×112 Gbps LR block 2094, two 20×driver/TIA circuitry 3008, 3010, and one fiber optic connector 2098 that is optically coupled to one array of optical fibers 3000. To increase input/output data throughput, the electrical/optical input/output module 2090 can be repeated and placed side-by-side in parallel. The BoW blocks 3002 can occupy a large portion of the edge of the host ASIC 2052.

Figure 44:
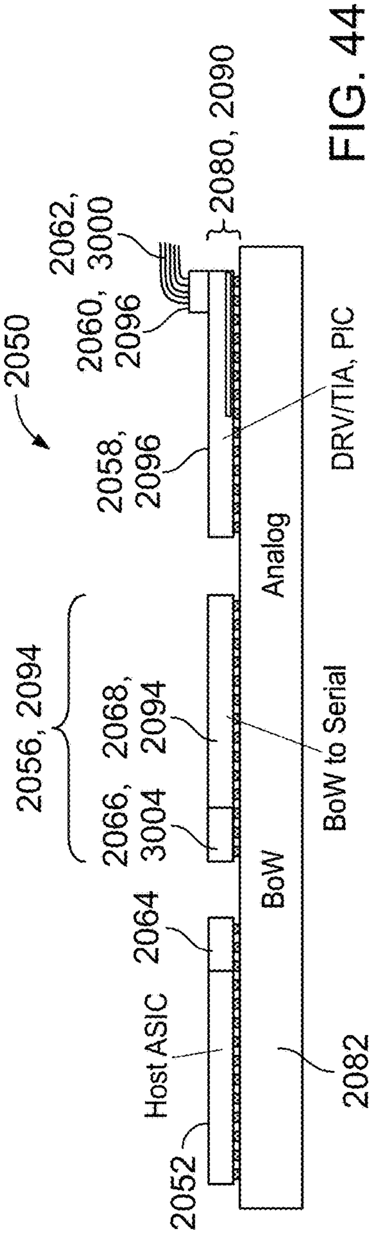

FIG. 44 is a side view diagram of the first electrical/optical input/output module 2080 of the semiconductor package 2050 of FIG. 43. The host ASIC 2052, the BoW-to-serial converter chiplet 2056, 2094, and the combined driver/TIA and photonic chiplet 2058, 2096 are mounted on a common substrate 2082, which can be, e.g., a printed circuit board, an organic substrate, a ceramic substrate, a glass substrate, a silicon interposer, a substrate that includes one or more silicon bridges, or a substrate made in a fan-out wafer-level packaging (FoWLP) process.

Figure 45:
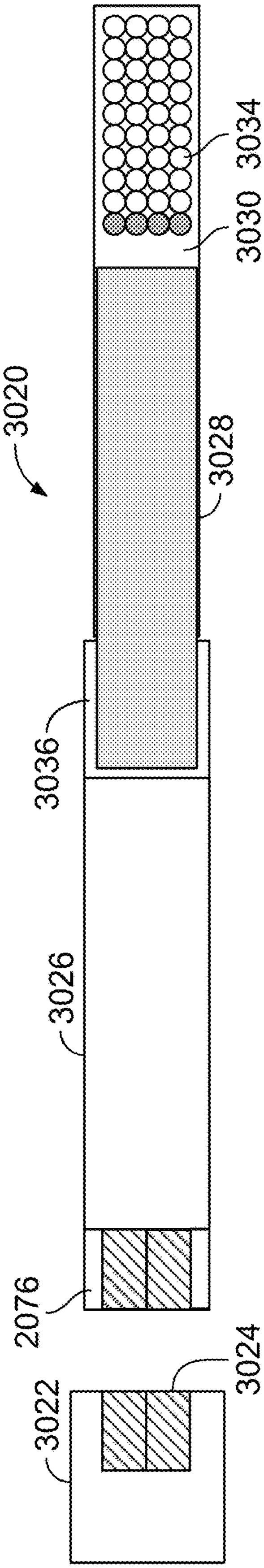
Figure 46:
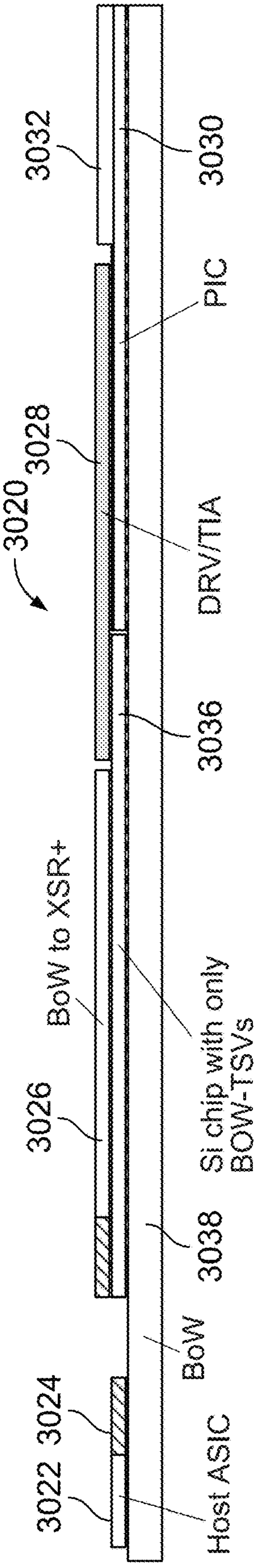

FIGS. 45 and 46 show an example of pitch matching geometries. FIG. 45 shows a top view of a portion of a semiconductor package 3020 that has a pitch-matched configuration. FIG. 46 shows a side view of the semiconductor package 3020. The semiconductor package 3020 has a configuration similar to that of the example shown in FIG. 22. The semiconductor package 3020 includes a data processing chiplet 3022 (host ASIC) having two parallel input/output blocks 3024 (BoW blocks) at an edge, a converter chiplet 3026, an electronic amplification chiplet 3028, a photonic chiplet 3030, and a fiber optic connector 3032 that is configured to be optically coupled to an array of optical fibers 3034. In this example, as shown in FIG. 46, the converter chiplet 3026 includes a BoW-to-XSR+ converter and is mounted on a silicon chip 3036 that has BoW through-silicon vias. The electronic amplification chiplet 3028 includes driver/transimpedance circuitry and is partially mounted on the silicon chip 3028 and partially mounted on the photonic chiplet 3030.

The data processing chiplet 3022, the silicon chip 3036, and the photonic chiplet 3030 are mounted on a common substrate 3038, which can be, e.g., a printed circuit board, an organic substrate, a ceramic substrate, a glass substrate, a silicon interposer, a substrate that includes one or more silicon bridges, or a substrate made in a fan-out wafer-level packaging (FoWLP) process.

Figure 47A:
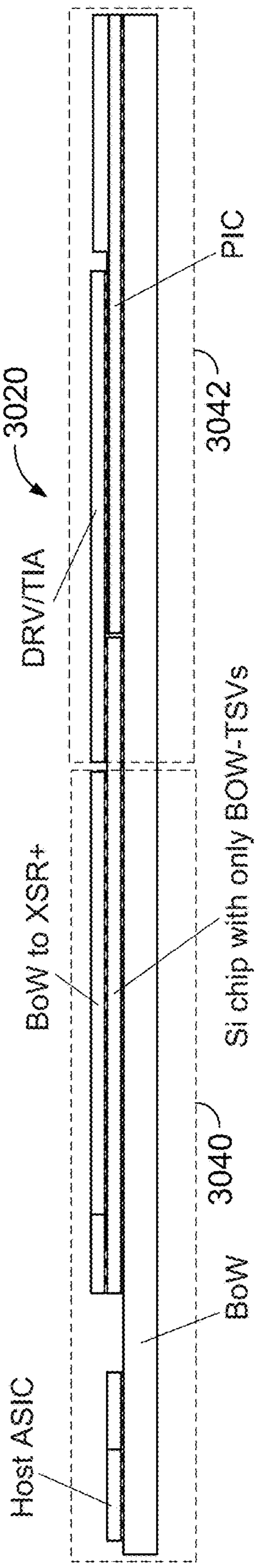
Figure 47B:
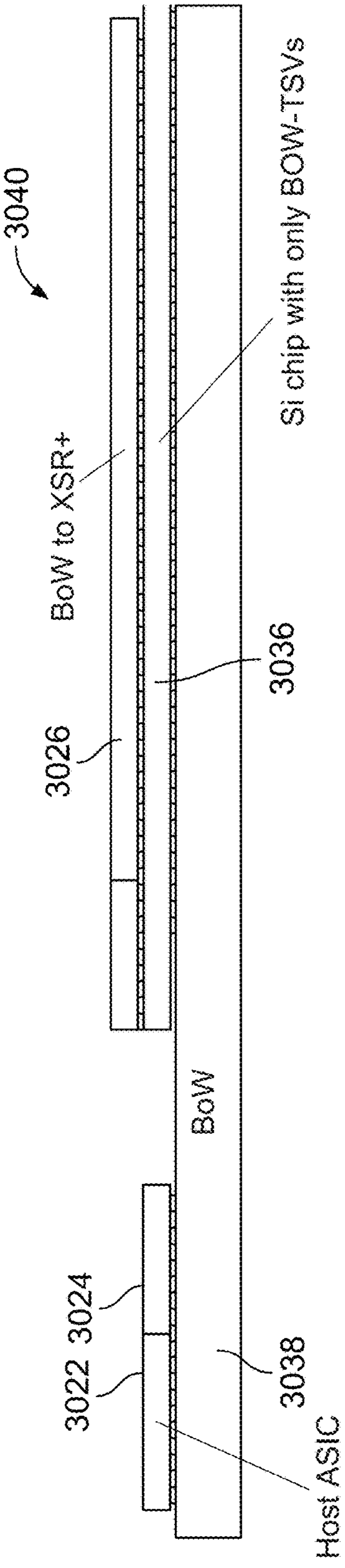
Figure 47C:
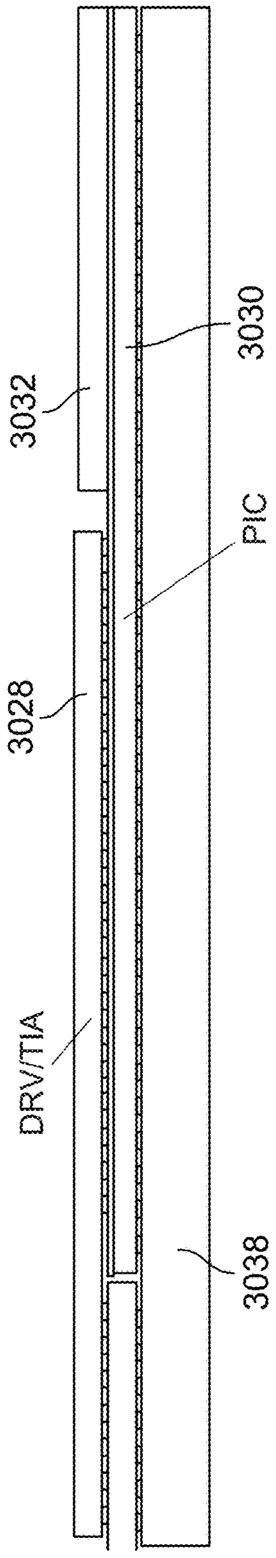

FIG. 47A reproduces the semiconductor package 3020 of FIG. 46. FIG. 47B shows an enlarged view of a first portion 3040 of the semiconductor package 3020. FIG. 47C shows an enlarged view of a second portion 3042 of the semiconductor package 3020.

Figure 48:
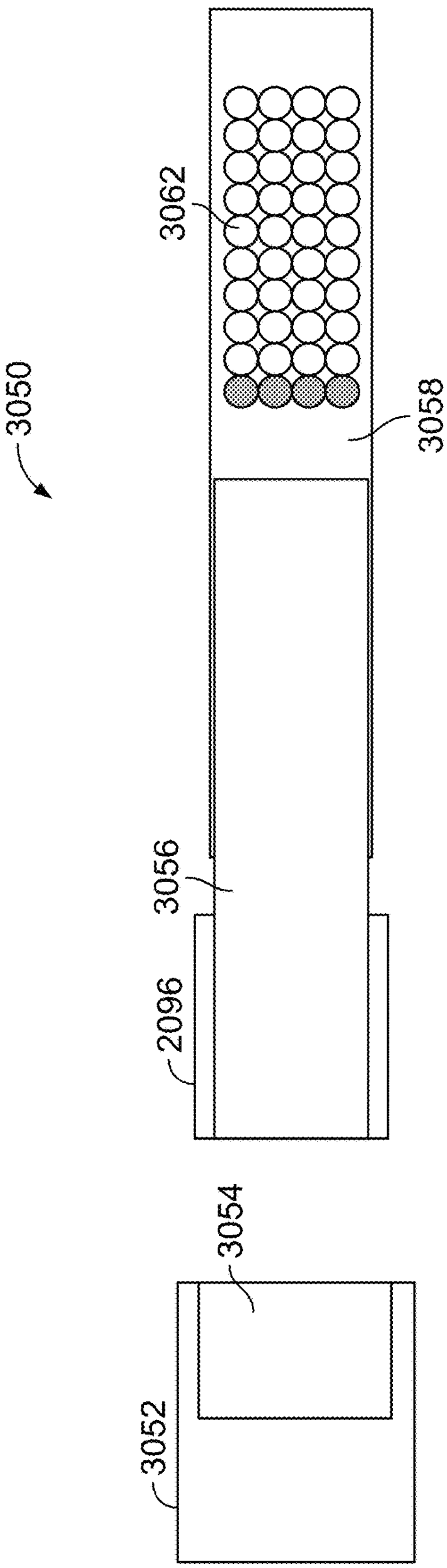
Figure 49:
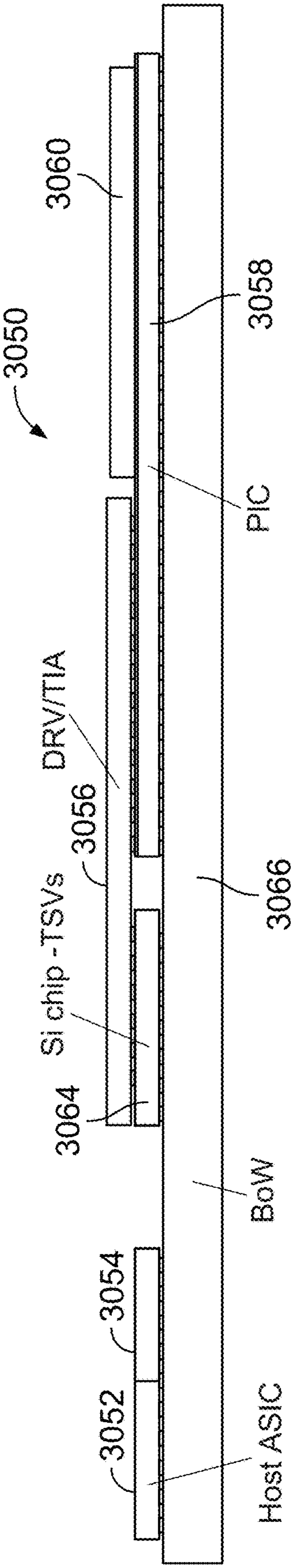

FIG. 48 shows a top view of an example of a portion of a semiconductor package 3050 that has a pitch-matched configuration. FIG. 49 shows a side view of the semiconductor package 3050. The semiconductor package 3050 has a configuration similar to that of the example shown in FIG. 21. In this example, the semiconductor package 3050 includes a host ASIC 3052 that has built-in converter circuitry 3054, a driver/TIA chiplet 3056, a photonic chiplet 3058, and a fiber optic connector 3060 configured to be optically coupled to an array of optical fibers 3062. The driver/TIA chiplet 3056 is partially mounted on a silicon chip 3064 having through-silicon vias and partially mounted on the photonic chiplet 3058.

The data processing chiplet 3052, the silicon chip 3064, and the photonic chiplet 3058 are mounted on a common substrate 3066, which can be, e.g., a printed circuit board, an organic substrate, a ceramic substrate, a glass substrate, a silicon interposer, a substrate that includes one or more silicon bridges, or a substrate made in a fan-out wafer-level packaging (FoWLP) process.

The shoreline bandwidth density is substantially maintained from the built-in converter circuitry 3054 of the host ASIC 3052 to the optical fibers 3062.

Figure 50:
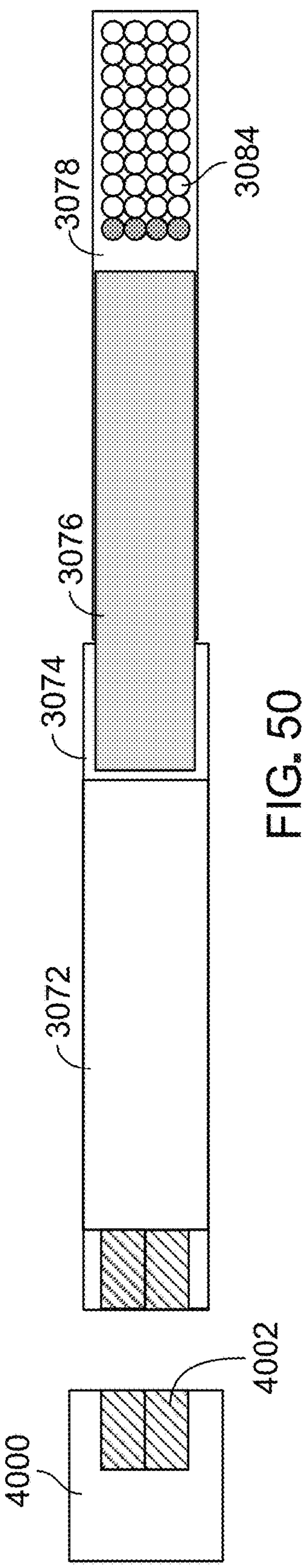
Figure 51:
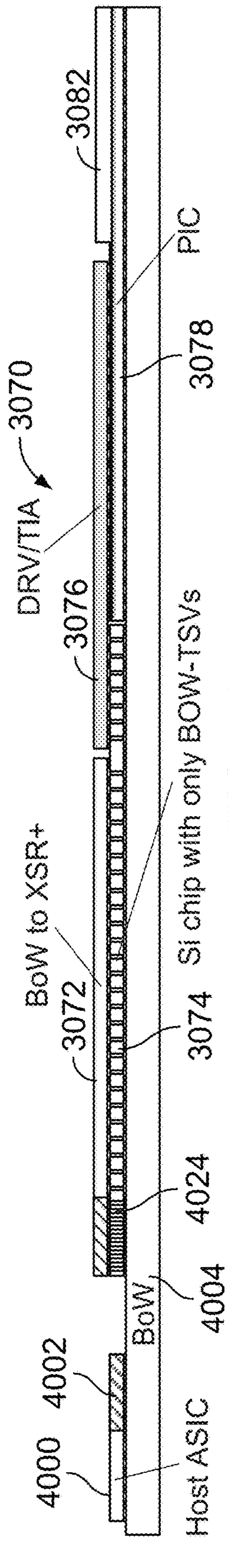
Figure 52:
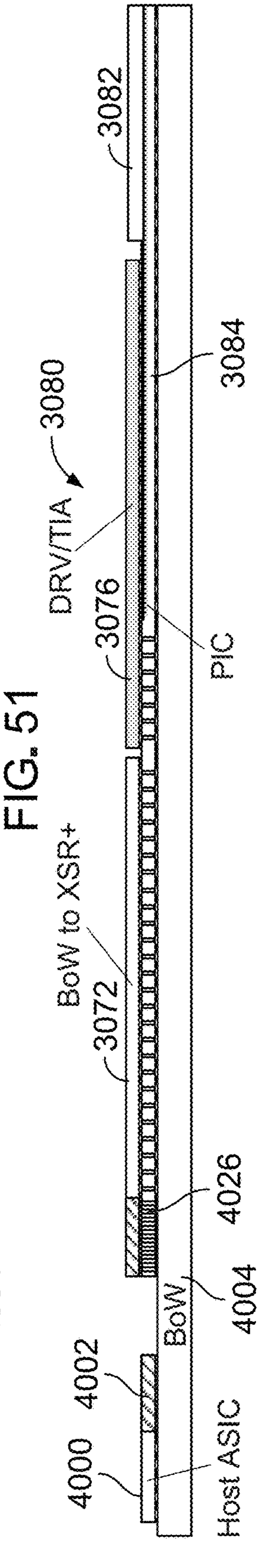
Figure 53:
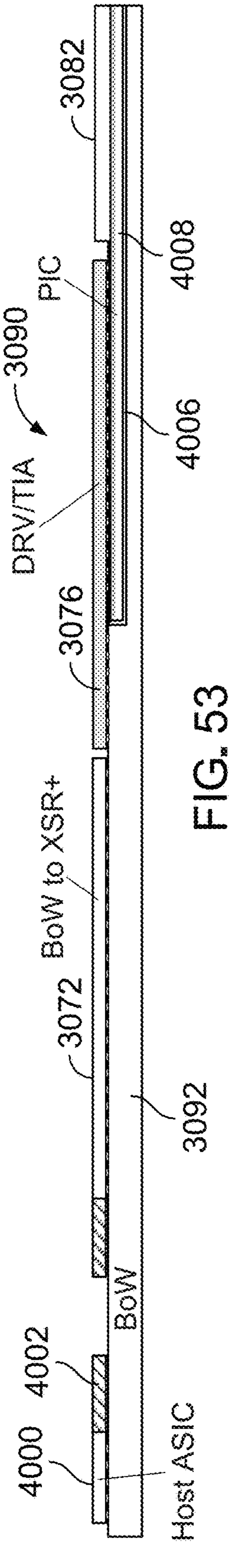

FIGS. 51 to 53 show side views of examples of semiconductor packages that have pitch matched BoW-to-optics geometries. The semiconductor packages shown in FIGS. 51 to 53 have the same top view as shown in FIG. 50. Each of the semiconductor packages shown in FIGS. 51 to 53 has a host ASIC 4000 that includes two BoW blocks 4002, in which the host ASIC 4000 is mounted in a common substrate, which can be, e.g., a printed circuit board, an organic substrate, a ceramic substrate, a glass substrate, a silicon interposer, a substrate that includes one or more silicon bridges, or a substrate made in a fan-out wafer-level packaging (FoWLP) process.

FIG. 51 is a side view of a semiconductor package 3070 that includes a BoW-to-XSR+ converter chiplet 3072 that is mounted on a silicon chip 3074 with BoW through-silicon vias 4024. The through-silicon vias 4024 are used for the BoW signals coming from the host ASIC 4000. Other through-silicon vias can be used for powering/controlling the converter chiplet, DRV/TIA chiplet, and photonic chiplet. The converted serial signals (e.g., XSR signals) remain on the silicon interposer when being transmitted to the DRV/TIA chiplet and do not go down through the through-silicon vias again.

The semiconductor package 3070 is similar to the semiconductor package 3020 of FIG. 46. A driver/transimpedance amplifier chiplet 3076 is partially mounted on the silicon chip 3074 and partially mounted on a photonic chiplet 3078. A fiber optic connector 3082 is attached to the photonic chiplet 3078 and configured to be optically coupled to an array of optical fibers 3084. In this example, the host ASIC 4000, the silicon chip 3074, and the photonic chiplet 3078 are mounted on a common substrate 4004.

FIG. 52 is a side view of a semiconductor package 3080 that includes a BoW-to-XSR+ converter chiplet 3072 that is mounted on a photonic chiplet 3084 having through-silicon vias 4026. A driver/transimpedance amplifier chiplet 3076 and a fiber optic connector 3082 are also mounted on the photonic chiplet 3078. The fiber optic connector 3082 is configured to be optically coupled to an array of optical fibers 3084. The photonic chiplet 3084 is longer than and has a larger area as compared to the photonic chiplet 3078 of FIG. 51. In this example, the host ASIC 4000 and the photonic chiplet 3078 are mounted on a common substrate 4004.

FIG. 53 is a side view of a semiconductor package 3090 that includes a BoW-to-XSR+ converter chiplet 3072 that is mounted on a common substrate 3092. The common substrate 3092 has a cavity 4006, a photonic chiplet 4008 is positioned in the cavity 4006. A driver/TIA chiplet 3076 is partially mounted on the common substrate 3092 and partially mounted on the photonic chiplet 4008.

In each of the semiconductor packages 3070, 3080, 3090, the shoreline bandwidth density is substantially maintained from the host ASIC 4000 to the array of optical fibers 3084.

Figure 54A:
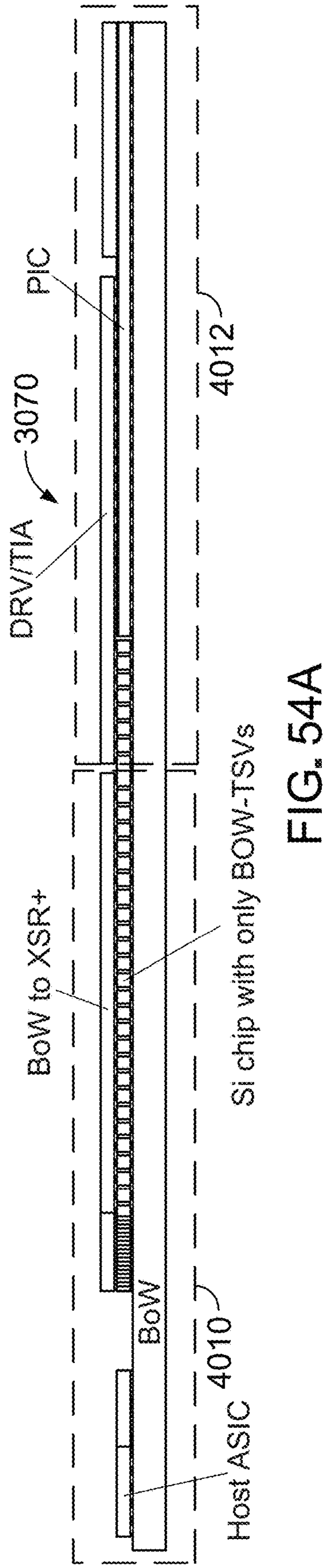
Figure 54B:
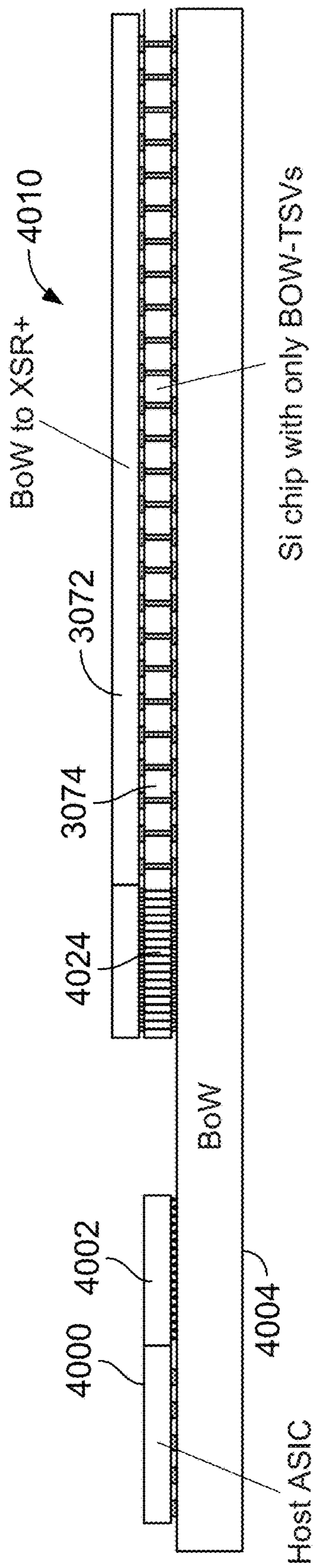
Figure 54C:
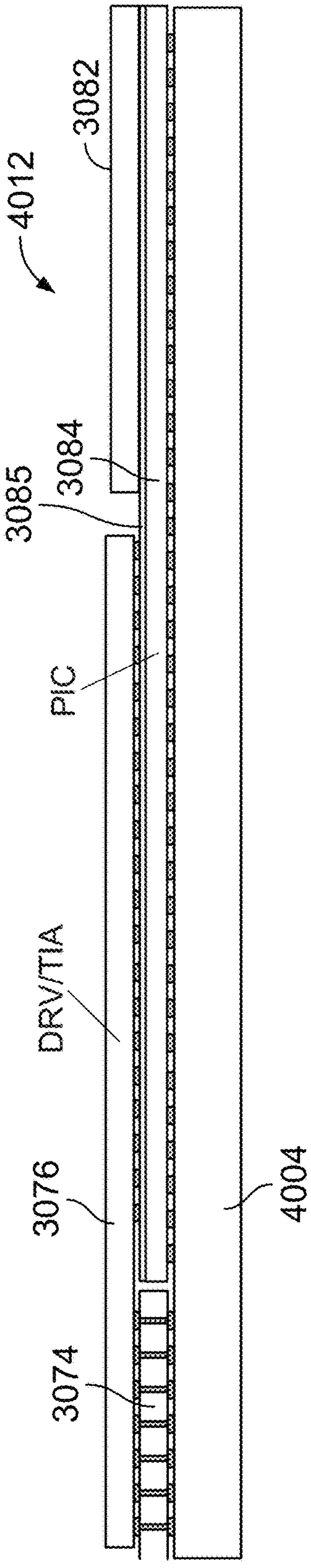

FIG. 54A reproduces the semiconductor package 3070 of FIG. 51. FIG. 54B shows an enlarged view of a first portion 4010 of the semiconductor package 3070. FIG. 54C shows an enlarged view of a second portion 4012 of the semiconductor package 3070. In this example, the photonic integrated circuit 3084 has an active layer 3085 on the top side.

Figure 55A:
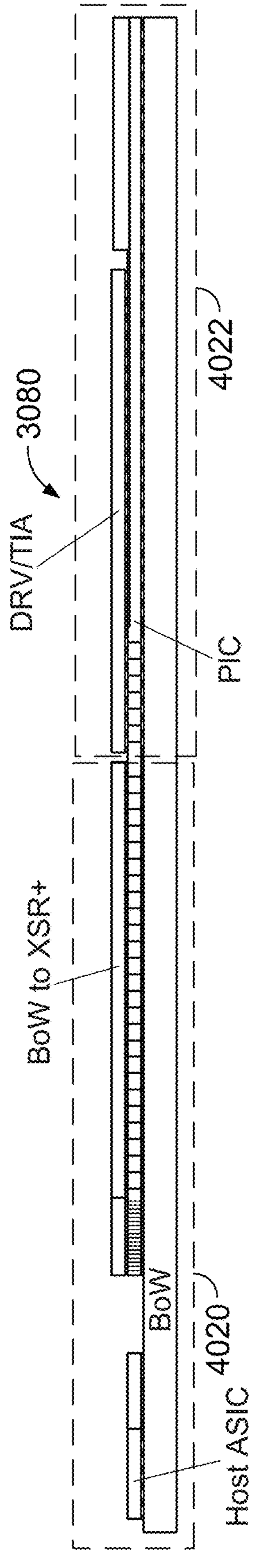
Figure 55B:
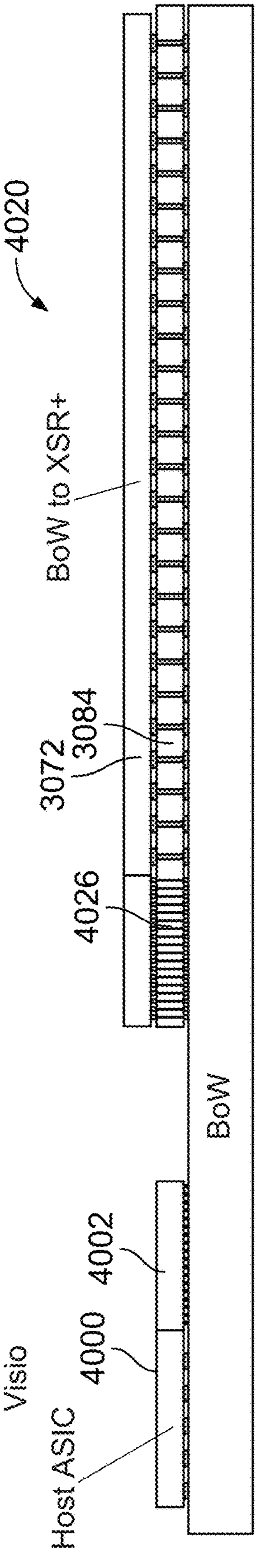
Figure 55C:
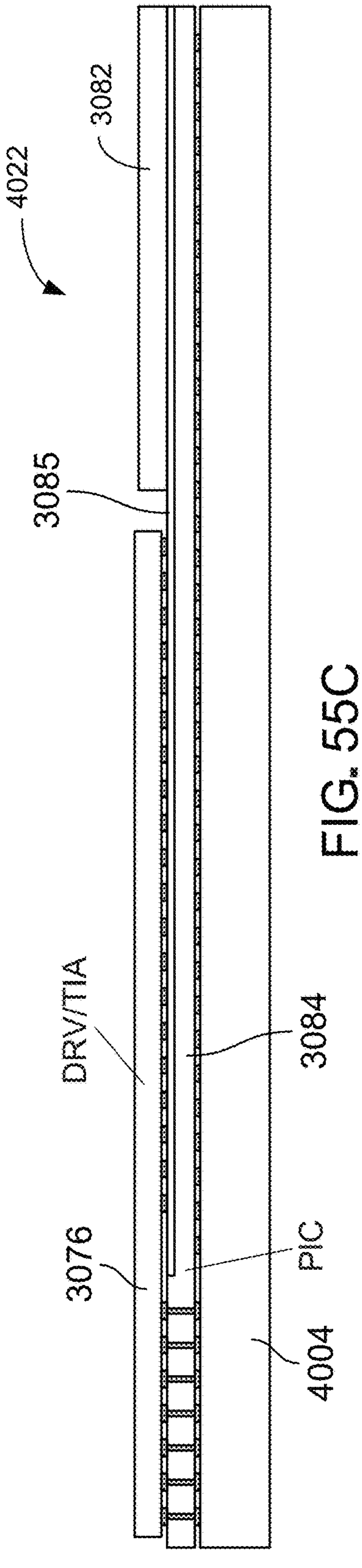

FIG. 55A reproduces the semiconductor package 3080 of FIG. 52. FIG. 55B shows an enlarged view of a first portion 4020 of the semiconductor package 3080. FIG. 55C shows an enlarged view of a second portion 4022 of the semiconductor package 3080. In this example, the photonic integrated circuit 3084 has an active layer 3085 on the top side.

Figure 56A:
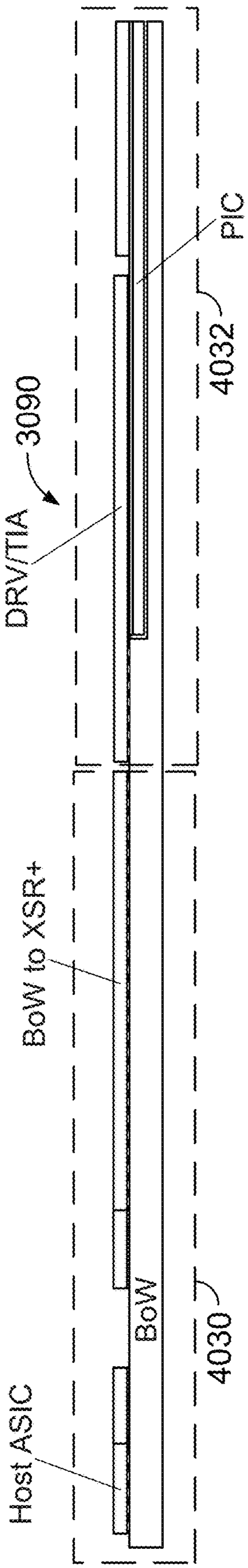
Figure 56B:
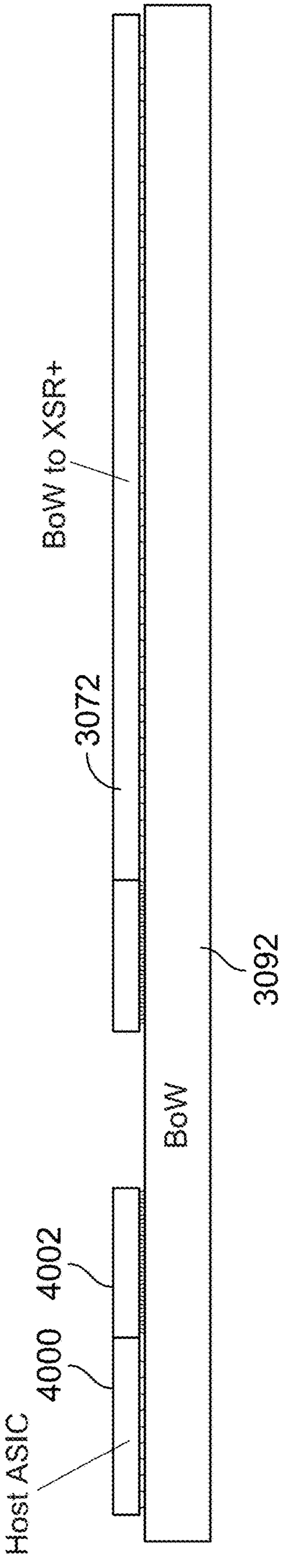
Figure 56C:
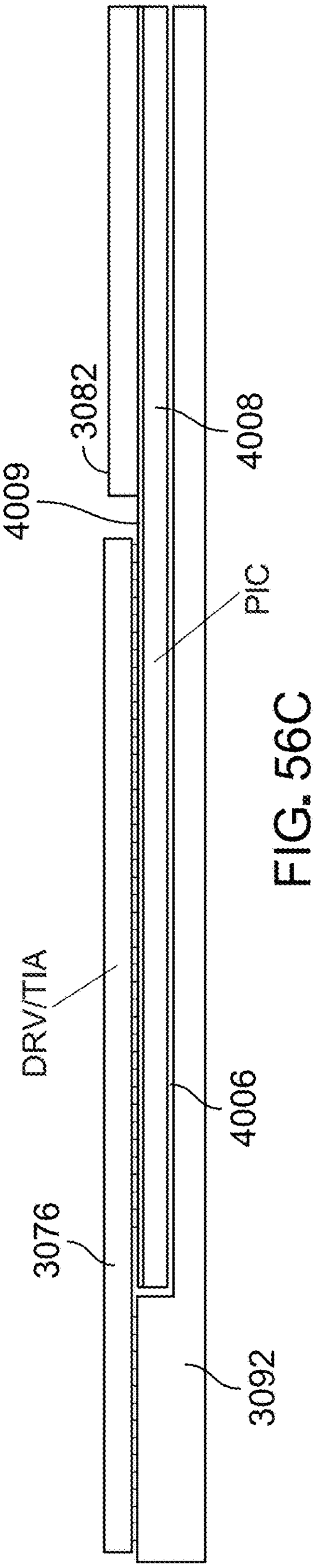

FIG. 56A reproduces the semiconductor package 3070 of FIG. 53. FIG. 56B shows an enlarged view of a first portion 4030 of the semiconductor package 3090. FIG. 56C shows an enlarged view of a second portion 4032 of the semiconductor package 3090. In this example, the photonic integrated circuit 4008 has an active layer 4009 on the top side.

Figure 57C:
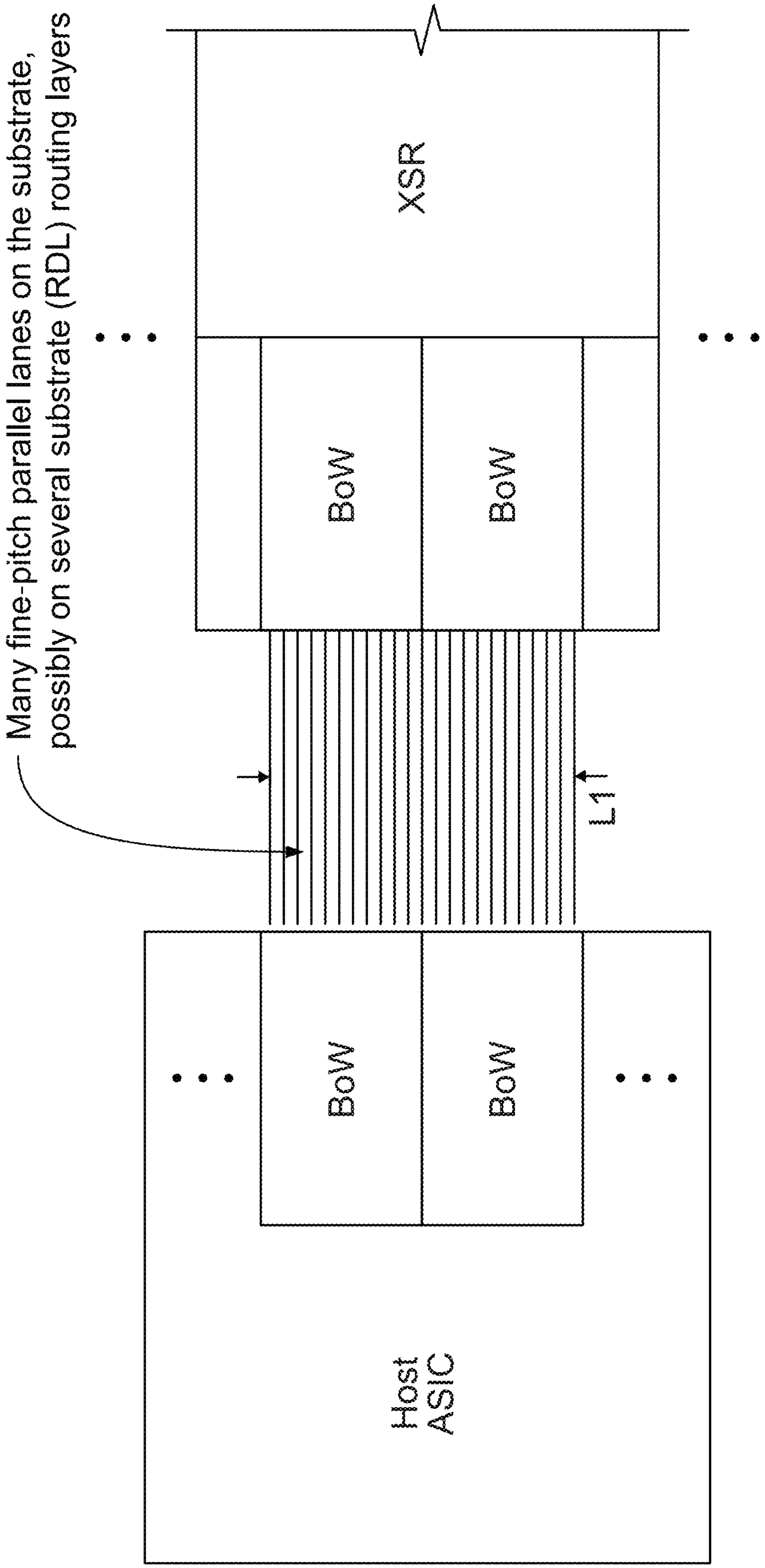

FIGS. 57A to 57C are diagrams that provide additional information about pitch-matched geometries for an electrical/optical input/output interface. FIG. 57C is an enlarged view of the left portion of the diagram in FIG. 57A. In FIG. 57B, the modules 5700 is configured to transmit/receive signals according to a first interface specification (e.g., BoW), and the module 5702 is configured to transmit/receive signals according to a second interface specification (e.g., XSR). The two modules 5700 have a width L1, and the module 5702 has a width L2. The term “pitch-matched” means that $L1=L2$, and the term “quasi pitch-matched” means that $L1 \approx L2$ (range: $L1 < L2 < 1.5 \times L1$).

Figure 58:
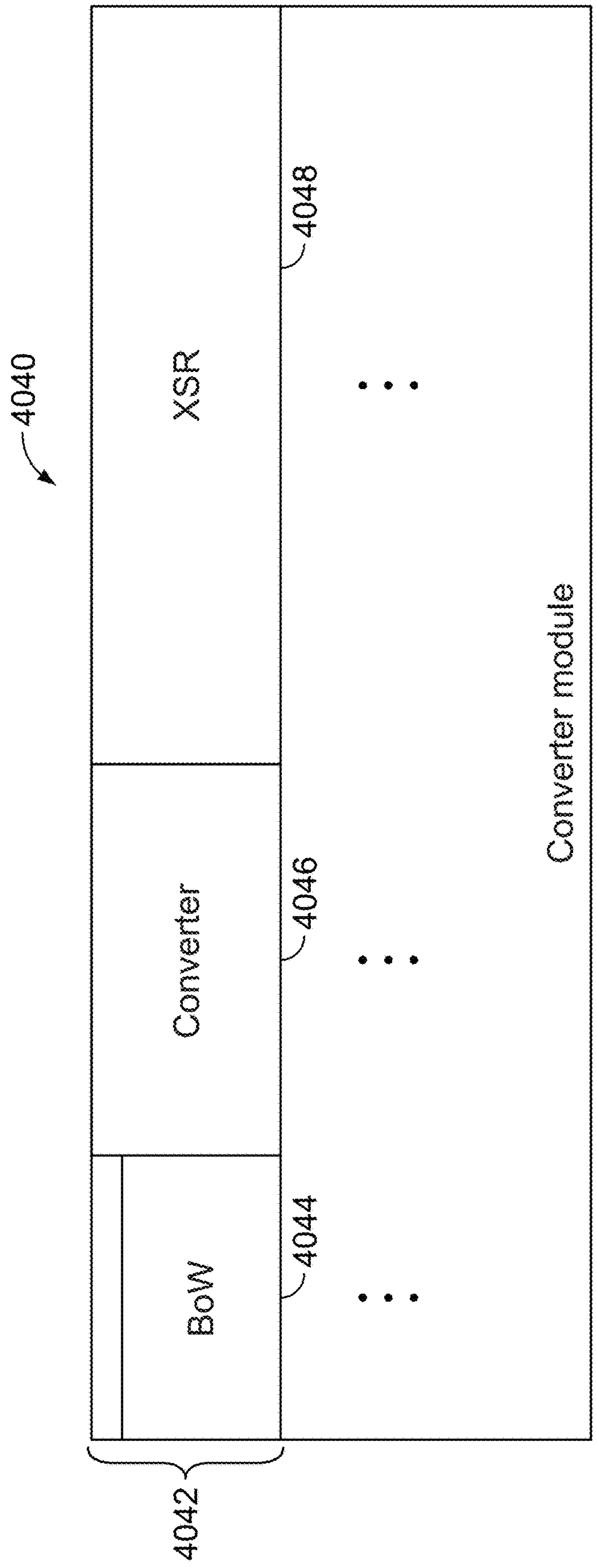
FIG. 58 is a top view of an exemplary converter module that includes multiple converter submodules.

FIG. 58 is a top view of an exemplary converter module 4040 that includes multiple converter submodules 4042. Each converter submodule 4042 includes a BoW block 4044, a converter block 4046, and an XSR block 4048. The BoW block 4044 is quasi pitch-matched to the converter block 4046.

In some examples, the BoW block 4044 implements a BoW interface towards the host ASIC at $N1 \times R1$ data rate, and can have one or more dedicated lanes for clock forwarding. The BoW block 4044 can use state-of-the-art available BoW IP block macros.

In some examples, the converter block 4046 takes N1 signals at R1 data rate and conditions them for multiplexing into N2 signals at R2 data rate and vice versa. This may imply:

- Going down even more parallel, e.g., from R1=10 Gbps to a chip-internal bus at 100 Mbps.
- Bit stuffing/bit skipping to accommodate asynchronous clocks (BoW<->XSR).
- Applying a serial protocol such as an Ethernet MAC.
- Applying FEC.
- Switching/interchanging/interleaving lanes.
- Traffic monitoring, policing, conditioning.
- Packet buffering and switching.
- Uses state-of-the-art available IP macros for Ethernet MAC, FEC, etc.

In some examples, the XSR block 4048 takes the signal from the internal bus and multiplexes it up to XSR rates (e.g., 100 Gbps), including TX/RX equalization and clock recovery. The XSR block 4048 can use state-of-the-art available XSR IP block macros.

Figure 59:
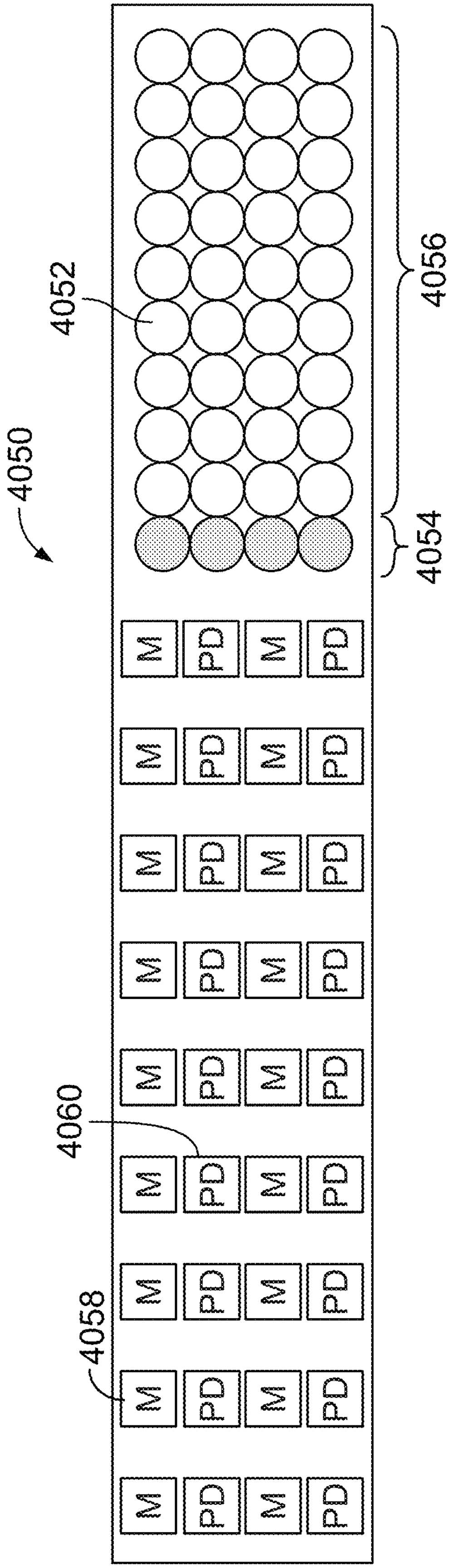
FIG. 59 is a top view diagram of an example of a photonic chiplet configured to be optically coupled to an array of optical fibers.

FIG. 59 is a top view diagram of the photonic chiplet 4050 configured to be optically coupled to an array of optical fibers 4052 that includes 4 power supply fibers 4054 (for transmitting power supply light) and 18 pairs of data fibers 4056 (for transmitting control and/or data signals). The photonic chiplet 4050 includes 18 modulators (M) 4058 for modulating optical signals that are transmitted to corresponding 18 optical fibers. The photonic chiplet 4050 includes 18 photodetectors (PD) 4060 for detecting optical signals that are received from corresponding 18 optical fibers.

Figure 60:
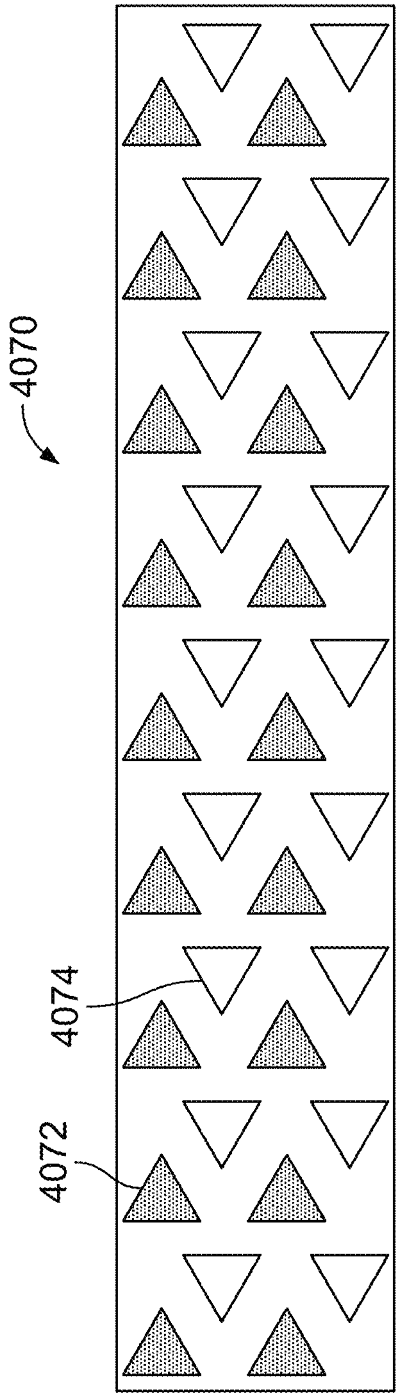
FIG. 60 is a top view diagram of an example of a driver/transimpedance chiplet that is suitable for driving a photonic chiplet.

FIG. 60 is a top view diagram of an example of a driver/transimpedance chiplet 4070 that is suitable for driving the photonic chiplet 4060 of FIG. 59. The driver/TIA chiplet 4070 includes 18 drivers 4072 for driving the 18 modulators 4058, and 18 transimpedance amplifiers 4074 for driving the 18 photodetectors 4060.

Depending on the geometries of the die and various stacking arrangements, the layout of the drivers 4072 and the transimpedance amplifiers 4074, and the layout of the modulators 4058 and the photodetectors 4060, are designed to:

- Place the photodetectors 4060 as near the inputs of the transimpedance amplifiers 4074 as possible (or monolithically integrate at least the first transimpedance stage).
- Place the modulators 4058 as near the outputs of the drivers 4072 as possible (or monolithically integrate at least the last driver stage).
- Connect the modulators 4058 and the photodetectors 4060 to the fiber array 4052 using optical waveguides. The lengths for the optical waveguides are less critical than the lengths for electronic lanes, so we try to minimize the electronic lane lengths.

Figure 61:
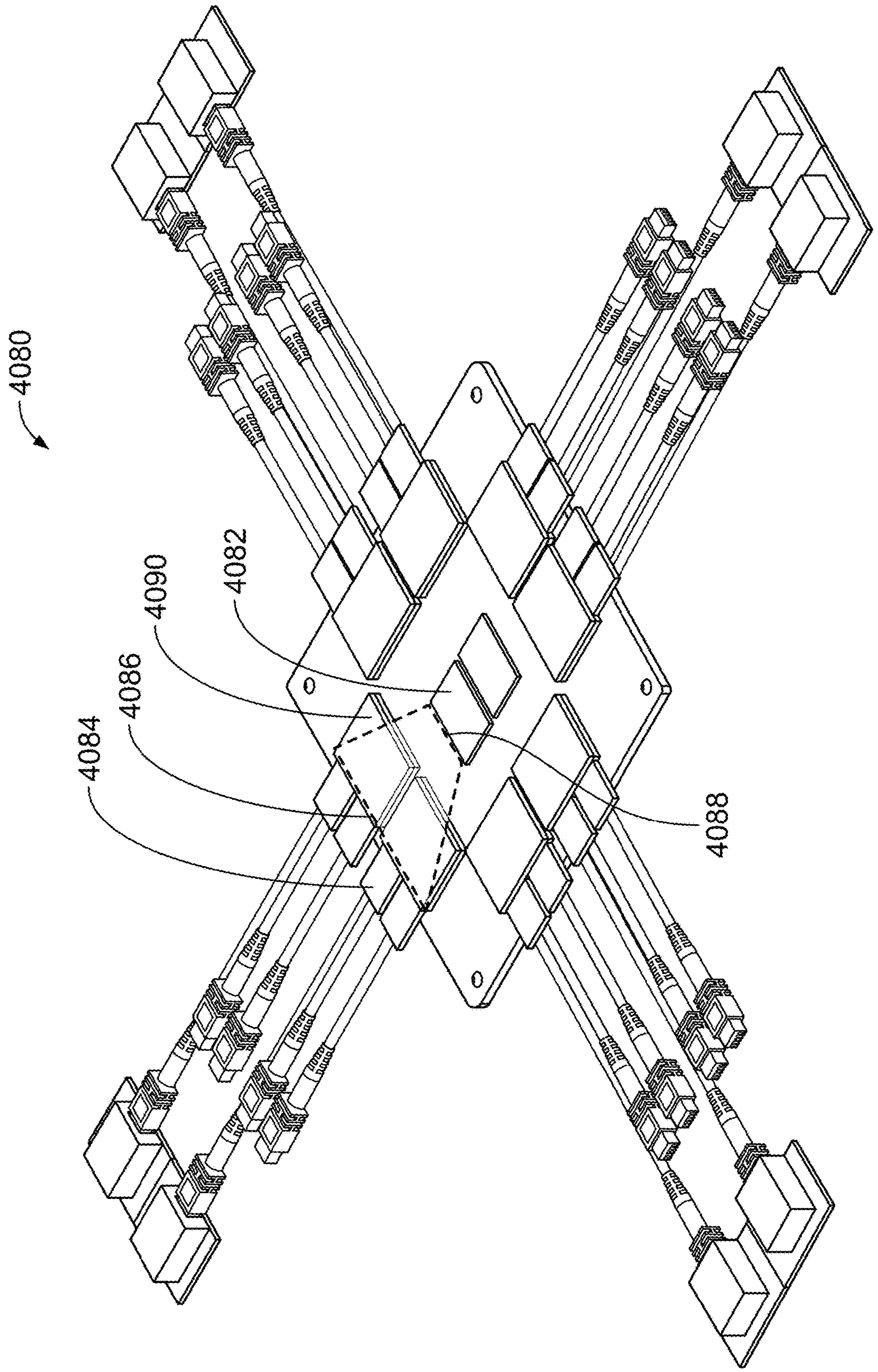
FIG. 61 is a diagram of an example of a semiconductor package that has non-pitch-matched co-packaged optical modules.

FIG. 61 is a diagram of an example of a semiconductor package 4080 that has non-pitch-matched co-packaged optical modules 4090. The electrical/optical paths from a data processing chiplet 4082 to corresponding fiber optic connectors 4084 need fan-out, e.g., 4× to 5× fan-out. The width of the edge 4086 at the fiber optic connectors 4084 can be, e.g., 4 to 5 times the width of the edge 4082 at the data processing chiplet 4082. Thus, the shoreline bandwidth density at the data processing chiplet 4082 can be, e.g., 4 to 5 times the shoreline bandwidth density at the fiber optic connectors 4084.

Figure 62:
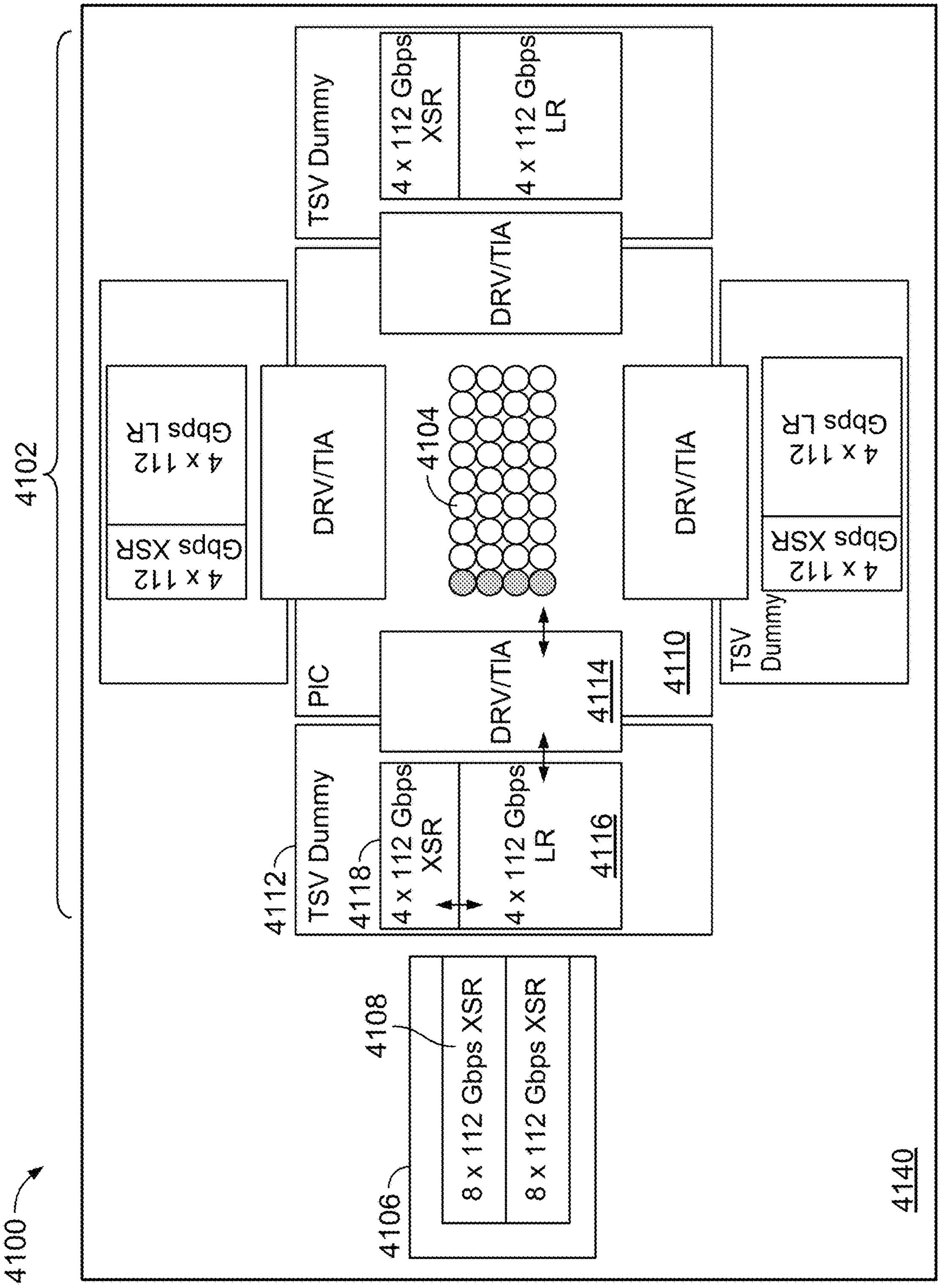
FIG. 62 is a top view diagram of an example of a semiconductor package that includes an XSR-to-optics module that functions as the interface between an array of optical fibers and a data processing chiplet.

FIG. 62 is a top view diagram of an example of a semiconductor package 4100 that includes an XSR-to-optics module 4102 that functions as the interface between an array of optical fibers 4104 and a data processing chiplet 4106. The data processing chiplet 4106 includes two 8×112 Gbps XSR blocks 4108. The XSR-to-optics module 4102 includes a photonic chiplet 4110 that has optical couplers for optically coupling to the array of optical fibers 4104. The photonic chiplet 4110 has four edges. A TSV dummy chiplet 4112 that includes through-silicon vias is positioned adjacent to each edge of the photonic chiplet 4110. Near each edge of the photonic chiplet 4110 there is a driver/TIA chiplet 4114, in which the driver/TIA chiplet 4114 is partially mounted on the TSV dummy chiplet 4112 and partially mounted on the photonic chiplet 4110. The driver/TIA chiplet 4114 communicates with a 4×112 Gbps LR block 4116, which communicates with a 4×112 Gbps XSR block 4118. The 4×112 Gbps LR block 4116 and the 4×112 Gbps XSR block 4118 are mounted on the TSV dummy chiplet 4112. The data processing chiplet 4106, the TSV dummy chiplets 4112, and the photonic chiplet 4110 are mounted on a common substrate 4140, which can be, e.g., a printed circuit board, an organic substrate, a ceramic substrate, a glass substrate, a silicon interposer, a substrate that includes one or more silicon bridges, or a substrate made in a fan-out wafer-level packaging (FoWLP) process.

Figure 63:
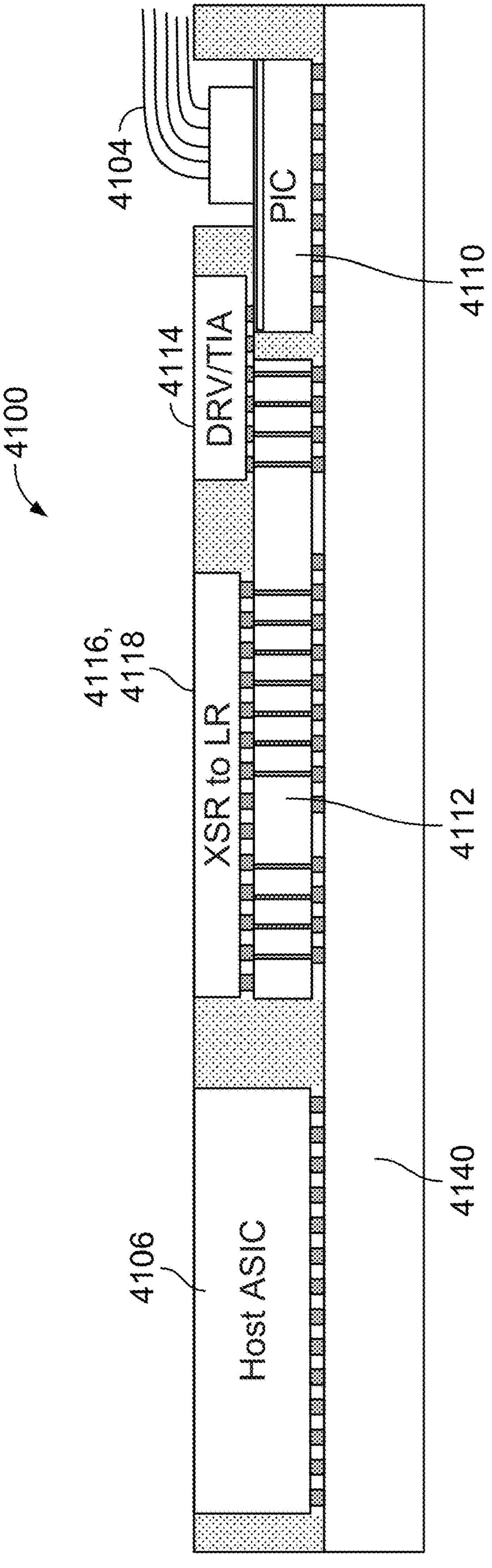
FIG. 63 is a side view diagram of an example of a portion of a semiconductor package.

FIG. 63 is a side view diagram of a portion of the semiconductor package 4100. This configuration is similar to the ones shown in FIGS. 22, 45 to 47C, 50, 51, and 54A to 54C.

Figure 64:
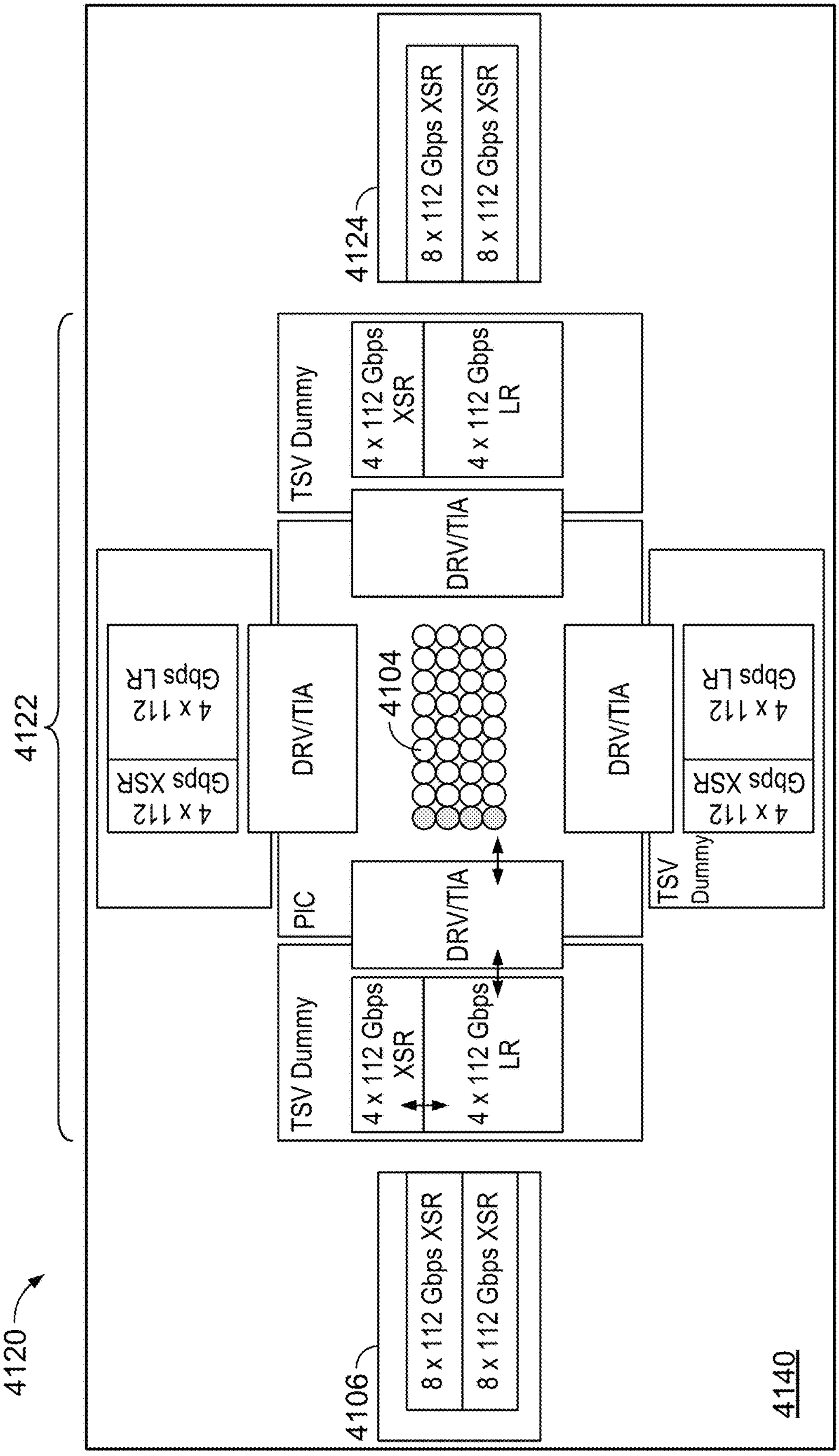
FIGS. 64 and 65 are top view diagrams of examples of semiconductor packages.

FIG. 64 is a top view diagram of an example of a semiconductor package 4120 that is similar to the semiconductor package 4100 of FIG. 62, except that an XSR-to-optics module 4122 functions as the interface between an array of optical fibers 4104 and a first data processing chiplet 4106 and a second data processing chiplet 4124.

Figure 65:
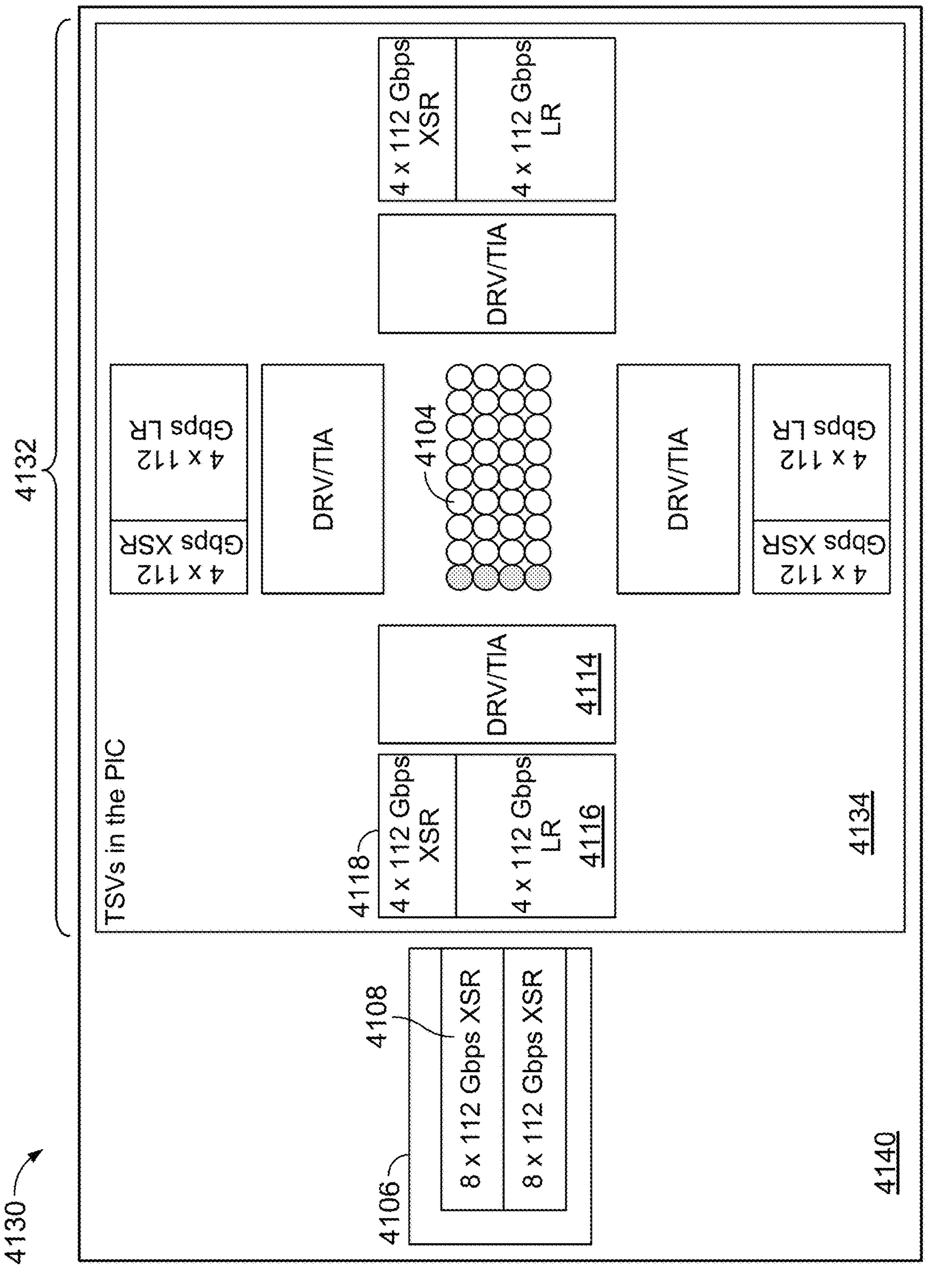

FIG. 65 is a top view diagram of an example of a semiconductor package 4130 that is similar to the semiconductor package 4100 of FIG. 62, except that TSV dummy chiplets are not used. The semiconductor package 4130 includes an XSR-to-optics module 4132 that functions as the interface between an array of optical fibers 4104 and a data processing chiplet 4106. The data processing chiplet 4106 includes two 8×112 Gbps XSR blocks 4108. The XSR-to-optics module 4132 includes a photonic chiplet 4134 that has optical couplers for optically coupling to the array of optical fibers 4104. Four driver/TIA chiplets 4114 are mounted on the photonic chiplet 4134 at locations near four sides of the optical fibers 4104. Each driver/TIA chiplet 4114 communicates with a corresponding 4×112 Gbps LR block 4116, which communicates with a corresponding 4×112 Gbps XSR block 4118. The 4×112 Gbps LR blocks 4116 and the 4×112 Gbps XSR blocks 4118 are mounted on the photonic chiplet 4134. The photonic chiplet 4134 includes through-silicon vias. The data processing chiplet 4106 and the photonic chiplet 4134 are mounted on a common substrate 4140, which can be, e.g., a printed circuit board, an organic substrate, a ceramic substrate, a glass substrate, a silicon interposer, a substrate that includes one or more silicon bridges, or a substrate made in a fan-out wafer-level packaging (FoWLP) process. This configuration is similar to the ones shown in FIGS. 52 and 55A to 55C.

Figure 66:
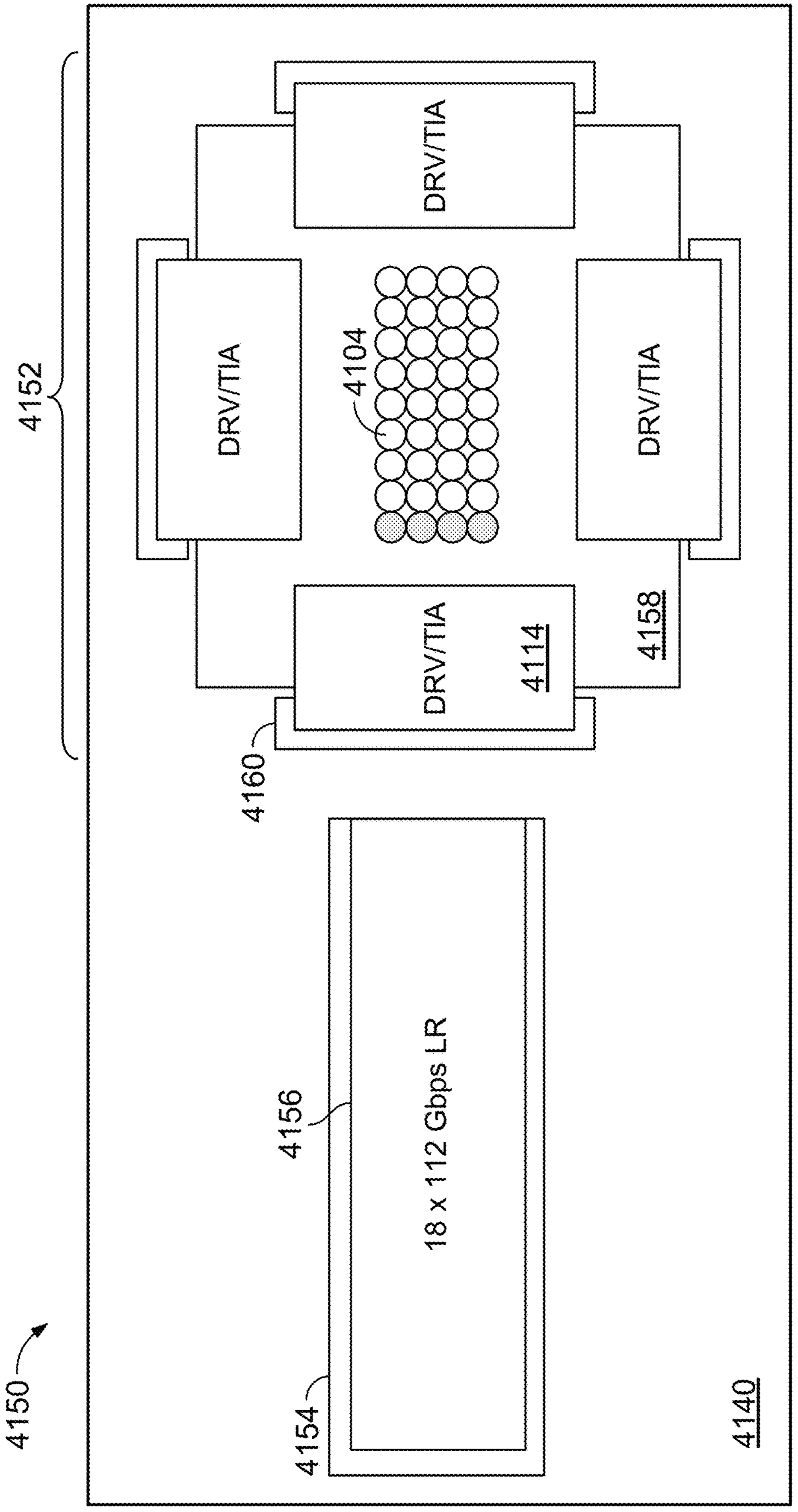
FIGS. 66 and 67 are top view diagrams each showing an example of a semiconductor package that implements a direct drive optics configuration.

FIG. 66 is a top view diagram of an example of a semiconductor package 4150 that implement a direct drive optics configuration. The semiconductor package 4150 includes an optics module 4152 that functions as the interface between an array of optical fibers 4104 and a data processing chiplet 4154. The data processing chiplet 4154 includes a built-in 18×112 Gbps LR block 4156. The optics module 4152 includes a photonic chiplet 4158 that has optical couplers for optically coupling to the array of optical fibers 4104. The photonic chiplet 4158 has four edges, and a TSV dummy chiplet 4160 that includes through-silicon vias is provided near each edge of the photonic chiplet 4158. Near each edge of the photonic chiplet 4158, a driver/TIA chiplet 4114 is partially mounted on the TSV dummy chiplet 4160 and partially mounted on the photonic chiplet 4158. The driver/TIA chiplets 4114 communicate with the 18×112 Gbps LR block 4156. The data processing chiplet 4154, the TSV dummy chiplets 4160, and the photonic chiplet 4158 are mounted on a common substrate 4140, which can be, e.g., a printed circuit board, an organic substrate, a ceramic substrate, a glass substrate, a silicon interposer, a substrate that includes one or more silicon bridges, or a substrate made in a fan-out wafer-level packaging (FoWLP) process. This configuration is similar to the ones shown in FIGS. 48 and 49.

Figure 67:
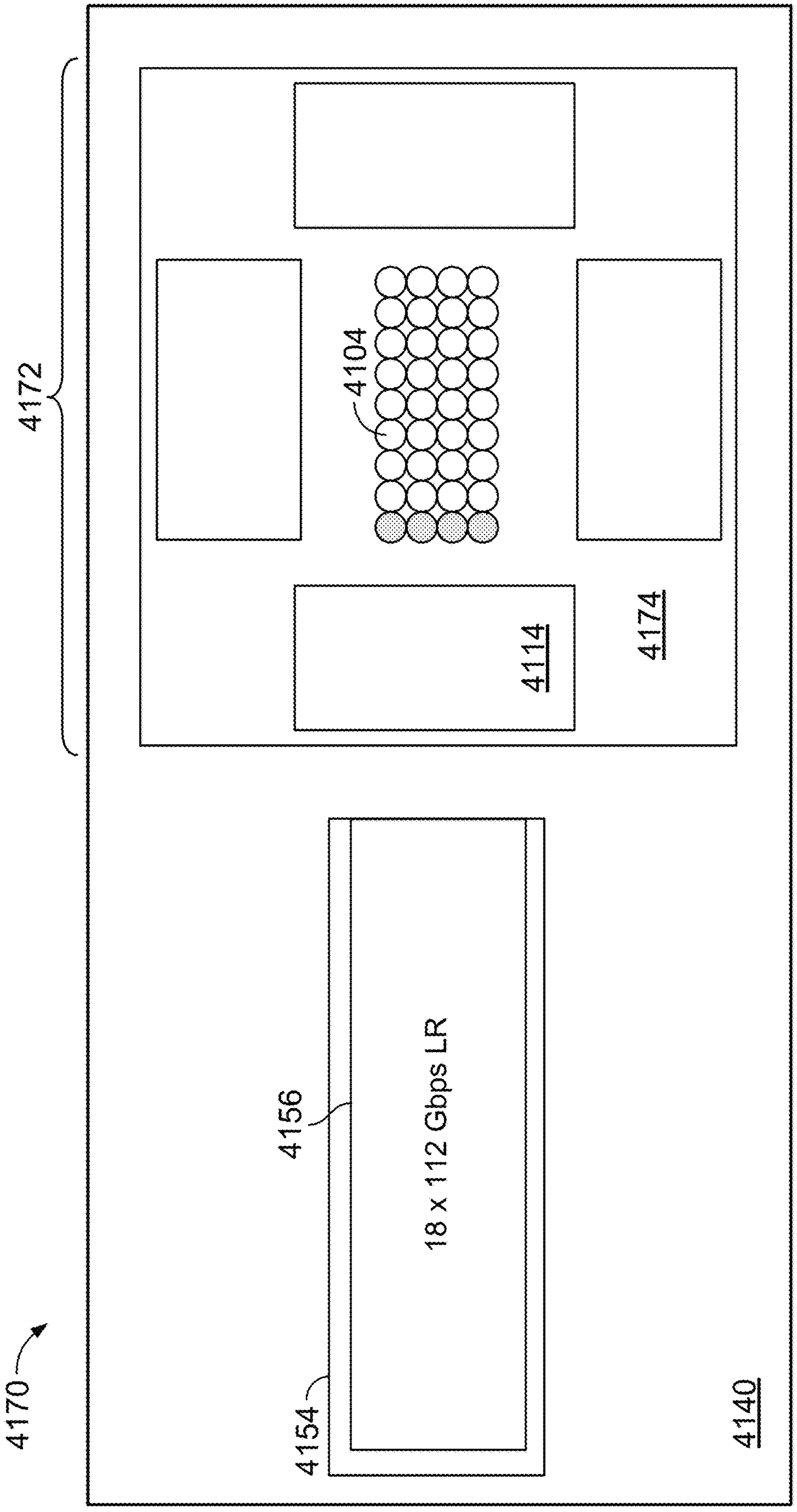

FIG. 67 is a top view diagram of an example of a semiconductor package 4170 that implement a direct drive optics configuration. The semiconductor package 4170 is similar to the semiconductor package 4150 of FIG. 66, except that TSV dummy chiplets are not used. The semiconductor package 4170 includes an optics module 4172 that functions as the interface between an array of optical fibers 4104 and a data processing chiplet 4154. The data processing chiplet 4154 includes a built-in 18×112 Gbps LR block 4156. The optics module 4172 includes a photonic chiplet 4174 that has optical couplers for optically coupling to the array of optical fibers 4104. Four driver/TIA chiplets 4114 are mounted on the photonic chiplet 4174 at positions at four sides of the optical fibers 4104. The photonic chiplet 4174 includes through-silicon vias. The driver/TIA chiplets 4114 communicate with the 18×112 Gbps LR block 4156. The data processing chiplet 4154 and the photonic chiplet 4174 are mounted on a common substrate 4140, which can be, e.g., a printed circuit board, an organic substrate, a ceramic substrate, a glass substrate, a silicon interposer, a substrate that includes one or more silicon bridges, or a substrate made in a fan-out wafer-level packaging (FoWLP) process.

The semiconductor packages shown in FIGS. 43 to 60 and 62 to 67 have pitch-matched or quasi pitch-matches geometries. Such configurations allow the semiconductor package to be made much smaller by not require significant fan-out, which may be needed for some non-pitch matched geometries. For example, using current technology, fiber spacings can be 250 μm in a one-dimensional (1D) fiber array, resulting in 500 μm for a full-duplex link (2 fibers). The BoW interface can achieve edge densities as high as 2 Tbps/mm full-duplex. Per-wavelength bit rates can be 100 Gbps. Hence, the data processing chiplet can provide a shoreline bandwidth density of 2 Tbps/mm, while the 1D fibers can carry 100 Gbps/500 μm, achieving a shoreline bandwidth density of 200 Gbps/mm. To change from the shoreline bandwidth density of 2 Tbps/mm at the data processing chiplet to the shoreline bandwidth density of 200 Gbps/mm at the 1D fiber array, one can either use a fan-out of 10×, or use wavelength division multiplexing with 10 wavelengths per fiber. In some examples, we need to fan out substantially more because it is difficult to build 1D fiber arrays of more than about 20 fibers, and we need to add support overhead around the fibers. As technology advance, it may be possible to double the density of the 1D fiber array to use 127 μm fiber spacings, and double the bit rate to 200 Gbps. However, the shoreline bandwidth densities of parallel interfaces will also increase to be higher than 2 Tbps/mm. For example, the UCIe specification may be able to achieve about ~10 Tbps/mm (1.3 Tbps/mm). Thus, it will still be necessary to use significant fan-out when 1D fiber arrays are used.

In the examples shown in FIGS. 1A to 2, 4, 5, 7 to 17, 19 to 23, 27A to 40, 43 to 57A, and 62 to 67, the semiconductor package includes a data processing chiplet, such as a host ASIC. In some implementations, a semiconductor package can be made to include most of the components shown in the examples shown in FIGS. 1A to 2, 4, 5, 7 to 17, 19 to 23, 27A to 40, 43 to 57A, and 62 to 67, but without the data processing chiplet. The data processing chiplet can be mounted on the semiconductor package afterwards. For example, in some scenarios, a first company makes the semiconductor package without the data processing chiplet, and a second company mounts the data processing chiplet to the semiconductor package to form a complete product.

Figure 68A:
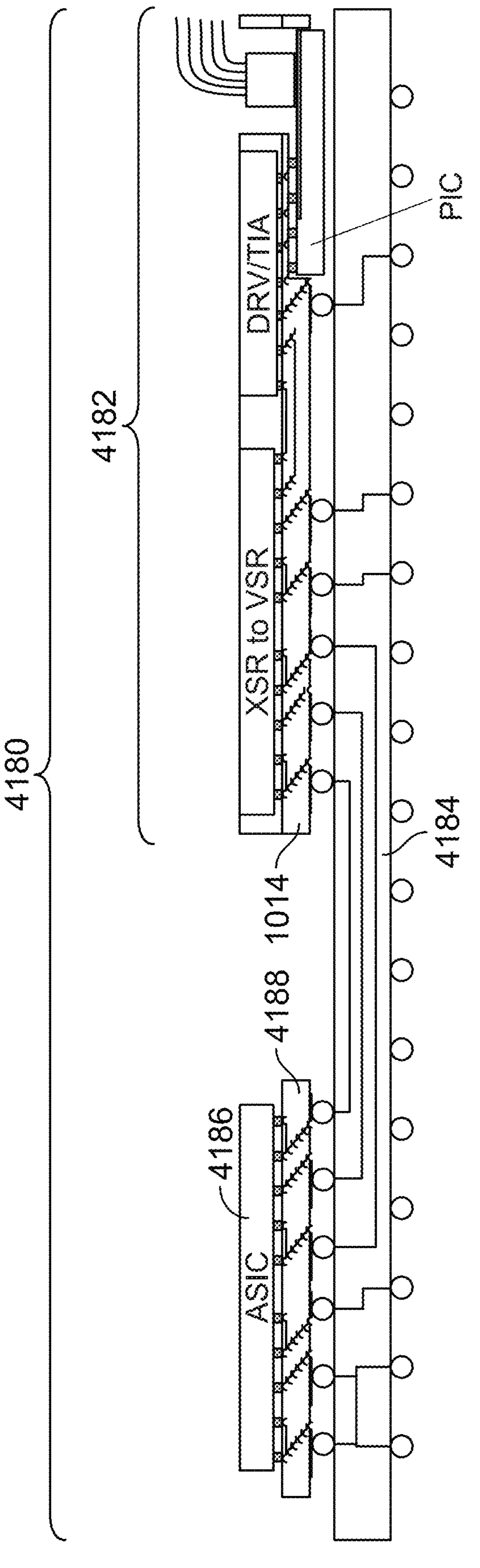
FIG. 68A is a side view of an example of a semiconductor package that includes a semiconductor package mounted on a substrate.

FIG. 68A shows a side view of a semiconductor package 4180 that includes a semiconductor package 4182 mounted on a substrate 4184. The semiconductor package 4182 is similar to the semiconductor package 1000 of FIG. 32, but without the data processing chiplet 802. In this example, the converter chiplet and the DRV/TIA chiplet are both mounted on redistribution layers 1014. A data processing chiplet 4186 is mounted on a substrate 4188, which is mounted on the substrate 4184.

Figure 68B:
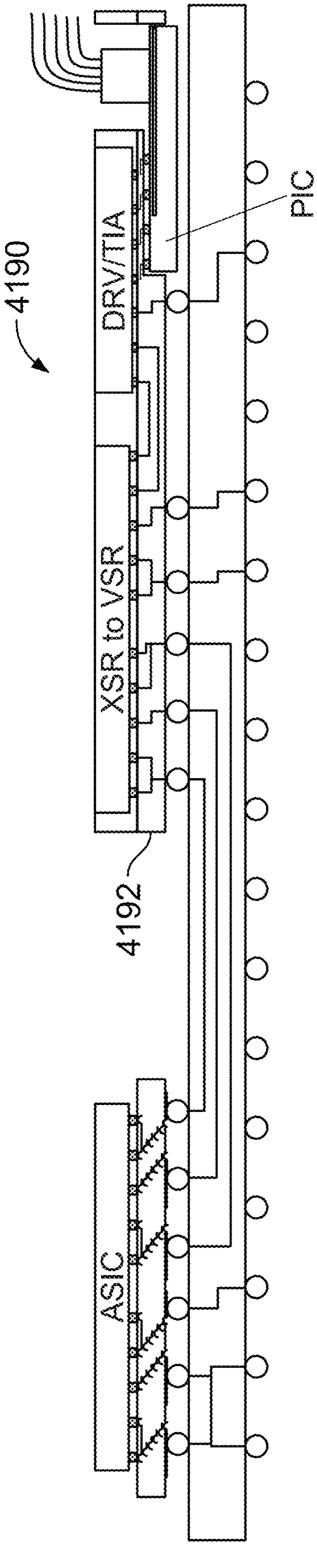
FIG. 68B is a side view of an example of a semiconductor package.

FIG. 68B shows a side view of a semiconductor package 4190 that is similar to the semiconductor package 4180 of FIG. 68A, except that the converter chiplet and the DRV/TIA chiplet are both mounted on a silicon interposer 4192.

Figure 82A:
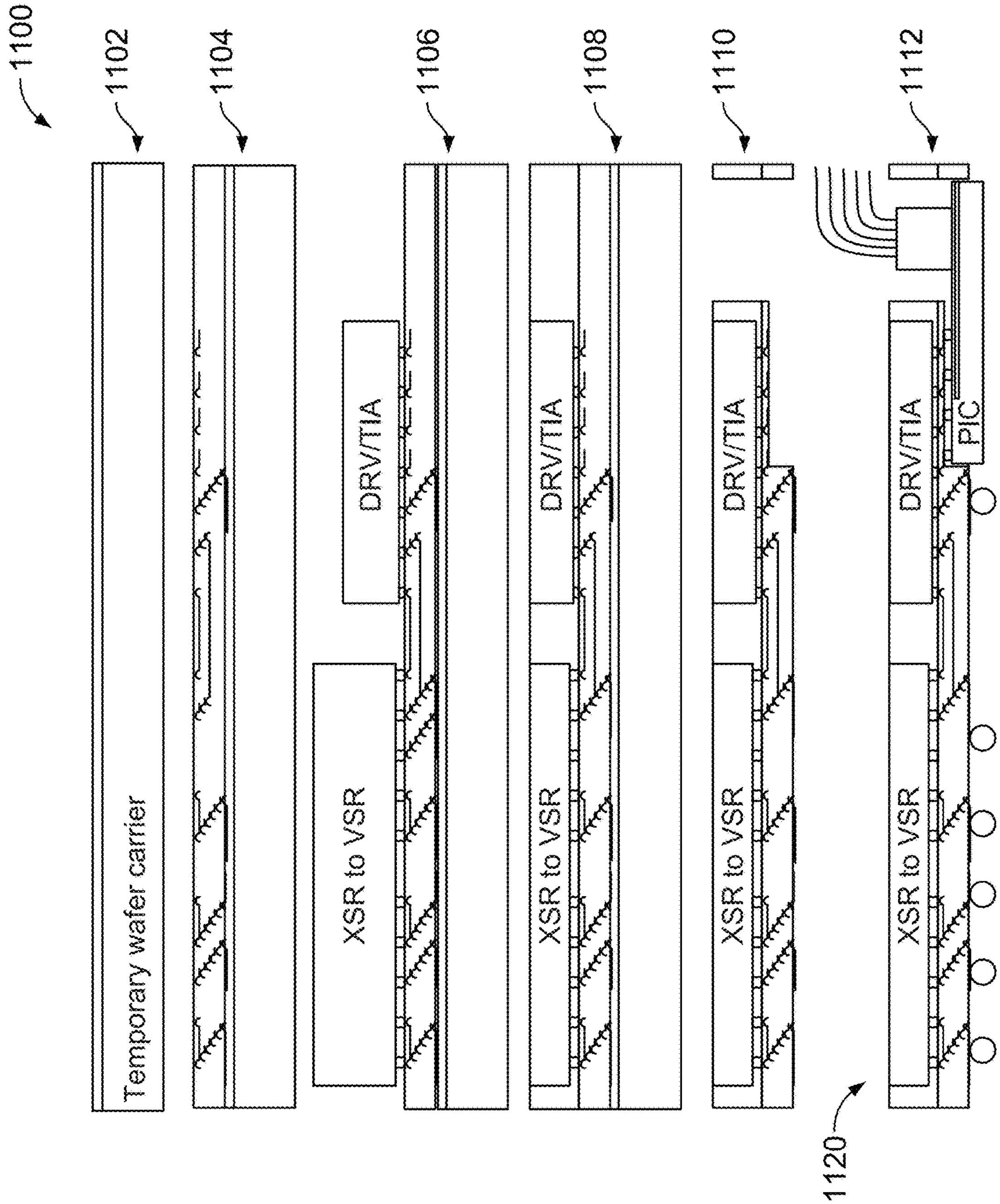
FIGS. 82A and 82B show a diagram of a process for fabricating a semiconductor package.
Figure 82B:
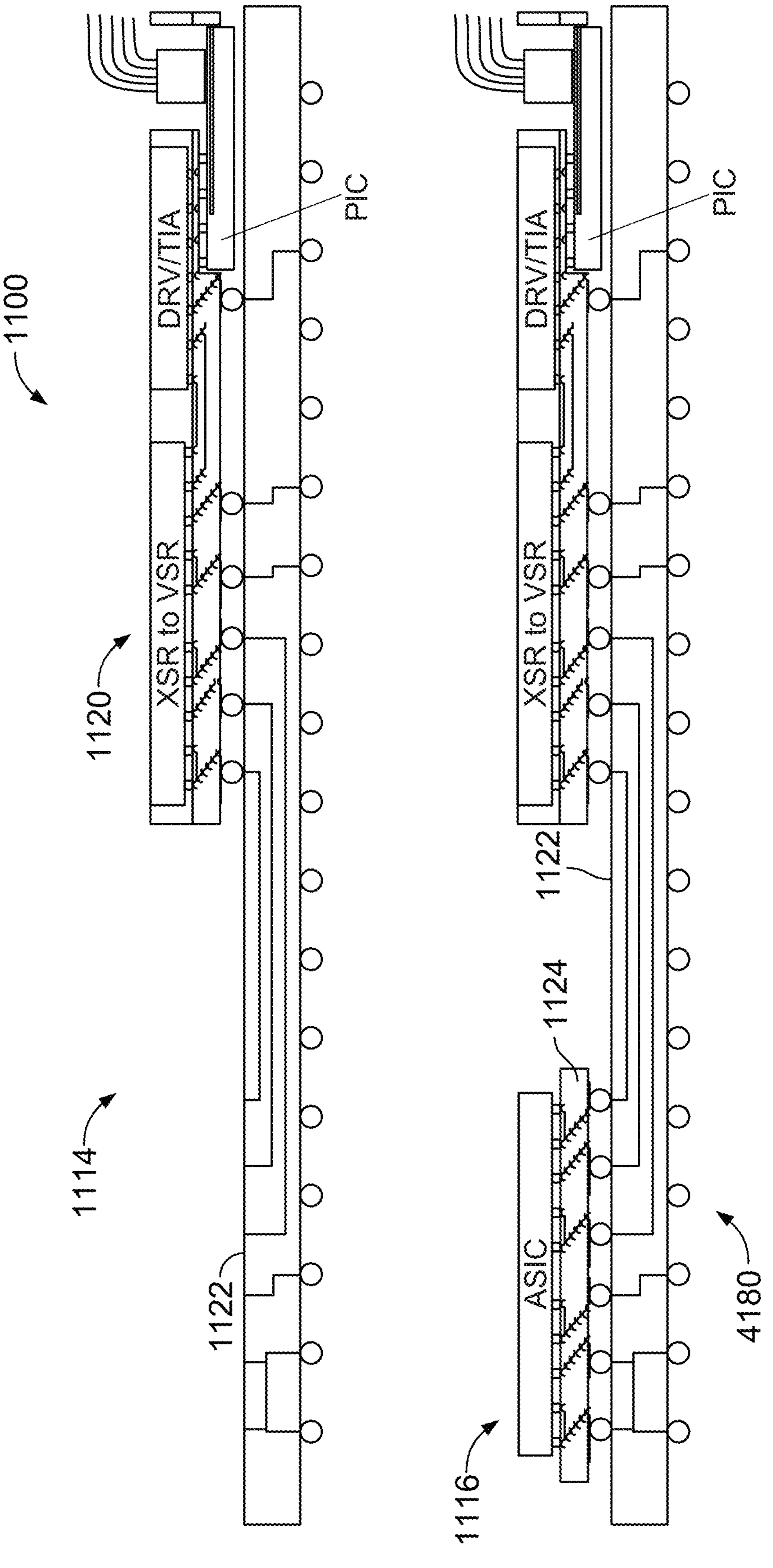

FIGS. 82A and 82B show a diagram of a process 1100 for fabricating the semiconductor package 4180 of FIG. 68A. The process 1100 includes a redistribution layer-first fan-out wafer-level packaging (FoWLP) process for fabricating a semiconductor package that uses redistribution layers as the common substrate, in which a photonic chiplet is positioned in a partial through hole formed in the redistribution layers. Redistribution layers are formed on a temporary wafer carrier, and the chiplets are mounted on the redistribution layers later. Processing steps 1102 to 1112 are similar to steps 1010, 1012, 1016, 1018, 1022, and 1030 in FIG. 32, but without the data processing chiplet 802.

In a step 1102, a temporary wafer carrier having a sacrificial layer is prepared. In a step 1104, redistribution layers are built on the sacrificial layer, and contact pads are built on the top side of the redistribution layers. In a step 1106, chip to wafer bonding and underfilling are performed, in which a converter chiplet (e.g., XSR-to-VSR converter chiplet) and the electronic amplification chiplet (e.g., DRV/TIA chiplet) are mounted on the redistribution layers. Electrical contacts on the bottom side of the converter chiplet, and electrical contacts on the bottom side of the electronic amplification chiplet (EAC) are electrically coupled to the contact pads on the redistribution layers. In this example, the redistribution layers include signal lines that support the VSR interface and interconnect the converter chiplet and the electronic amplification chiplet.

In a step 1108, a molding compound is overmolded on the redistribution layers, the converter chiplet, and the electronic amplification chiplet. Optionally, a grinding process is performed to reduce the thickness of the molding compound and one or more of the chiplets so that the top surfaces of the converter chiplet and the electronic amplification chiplet are exposed. Exposing the converter chiplet and the electronic amplification chiplet improves heat dissipation from the chiplets. The molding compound provides structural strength to the semiconductor package 4180.

In a step 1100, the wafer carrier and the sacrificial layer are removed from the redistribution layers to form a module that includes the molding compound, the converter chiplet, the electronic amplification chiplet, and the redistribution layers. A cavity or partial hole is formed on the bottom side of the redistribution layers. In some examples, a thinned portion of the redistribution layers remains below a portion of the electronic amplification chiplet and the molding compound. In some examples, the electronic amplification chiplet directly connects to the photonic chiplet. An opening in the molding compound and the thinned portion of the redistribution layers is formed by, e.g., etching or drilling through the molding compound and the thinned portion of the redistribution layers. The drilling process can be performed using, e.g., laser drilling and/or laser cutting. The opening is located above the region where the grating couplers of the photonic chiplet will be positioned.

In a step 1112, a photonic chiplet is inserted into the cavity or partial hole. In some examples in which there is a thinned portion of the redistribution layers, the electrical contacts on the top side of the photonic chiplet are electrically coupled to the electrical contacts on the bottom side of the thinned portion of the redistribution layers. The grating couplers of the photonic chiplet are exposed by the opening. Solder balls are mounted on the bottom side of the redistribution layers.

In some implementations, in step 1104, the redistribution layers are built on the sacrificial layer that spans a substantial portion of the temporary wafer carrier. In step 1106, multiple groups of the converter chiplets and the electronic amplification chiplets are mounted on the redistribution layers. In step 1108, the molding compound is applied over the multiple groups of converter chiplets and electronic amplification chiplets across a substantial portion or the entire temporary wafer carrier. In step, 1110, after the multiple groups of converter chiplets and electronic amplification chiplets are separated from the sacrificial layer and the temporary wafer carrier, there are multiple modules held together by the molding compound. In a step 1112, the molding compound and redistribution layers are cut or diced into individual semiconductor packages, and each individual semiconductor package includes corresponding redistribution layers. A fiber optic connector is attached to or mounted on the photonic chiplet. The fiber optic connector can be optically connected to a fiber array. A semiconductor package 1120 that includes the converter chiplet, the electronic amplification chiplet, the photonic chiplet, the redistribution layers, the molding compound, and the fiber optic connector is fabricated.

In a step 1114, the semiconductor package 1120 is mounted on a second substrate 1122, such as a printed circuit board.

In a step 1116, a data processing chiplet is mounted on the second substrate 1122. In some examples, the data processing chiplet can be mounted on a third substrate 1124, such as silicon interposer or redistribution layers, and the third substrate is mounted on the second substrate 1122. The second substrate includes signal lines that enable the data processing chiplet to communicate with the converter chiplet. In this example, the interface between the data processing chiplet and the converter chiplet complies with the XSR specification.

In other examples of processes for fabricating the semiconductor packages, such as the processes shown in FIGS. 5, 7, 8, 15 to 17, 23 to 26, 28 to 31, 33, and 34, each process can be modified by fabricating a first semiconductor package not including the data processing chiplet, mounting the first semiconductor package on a second substrate, and mounting data processing chiplet on the second substrate to fabricate a second semiconductor package. If the second substrate is a silicon interposer, a substrate that uses one or more silicon bridges, or a substrate with redistribution layers made in a fan-out wafer-level packaging (FoWLP) process, the interface between the data processing chiplet and the converter chiplet can be, e.g., BoW, UCIe, or AIB. If the second substrate is a printed circuit board, which may not be able to support the fine pitch needed for the wide parallel bus, then the interface between the data processing chiplet and the converter chiplet can be, e.g., XSR or XSR+. The interface between the converter chiplet and the electronic amplification chiplet can be, e.g., XSR+, USR, XSR, VSR, SR, MR, LR, or XLR.

When a first chiplet (e.g., DRV/TIA) is stacked on top of a second chiplet (e.g., converter), the interface that can be used between the two chiplets can be a serial interface such as XLR, LR, MR, SR, VSR, XSR, USR, or XSR+.

In this document, when we say that the photonic integrated circuit receives first optical signals and generates first electrical signals based on the first optical signals, and the data processor receives the first electrical signals, it is understood that the data processor can receive the first electrical signals directly (in a direct drive configuration) or through an interface circuit (e.g., an XSR-to-LR or XSR-to-MR converter/retimer, or any other type of converter/retimer described above). The first electrical signals received by the data processor do not necessarily have the same format as the first electrical signals generated by the photonic integrated circuit, and the interface circuit performs translation, retiming, or conditioning between the different formats of electrical signals.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

For example, in some implementations, the semiconductor packages described above, such as those shown in FIGS. 2, 5, 7-17, 19-23, and 27-35, can be modified so that the converter chiplet (e.g., 104) is integrated with the data processing chiplet (e.g., 102) as a single chiplet. In this case, the semiconductor package includes the data processing chiplet (which includes built-in converter circuitry), the electronic amplification chiplet (e.g., 106), and the photonic chiplet (e.g., 108). In some implementations, the data processing chiplet, the converter chiplet, and the electronic amplification chiplet are integrated into a single chiplet. In this case, the semiconductor package includes the data processing chiplet (which includes built-in converter circuitry and driver/transimpedance amplifier circuitry) and the photonic chiplet. In some implementations, the electronic amplification chiplet and the photonic chiplet are integrated into a single chiplet. In this case, the semiconductor package includes the data processing chiplet, the converter chiplet, and the photonic chiplet (which includes the driver/transimpedance amplifier circuitry). In some implementations, the data processing chiplet and the converter chiplet are integrated into a first chiplet, and the electronic amplification chiplet and the photonic chiplet are integrated into a second chiplet. In this case, the semiconductor package includes the data processing chiplet (which includes the converter circuitry) and the photonic chiplet (which includes the driver/transimpedance amplifier circuitry).

In FIGS. 1D, 2, 4, 5, 7 to 17, 19 to 23, 27A to 41, and 43 to 57A, the term "host ASIC" or "ASIC" is to represent the data processing chiplet. It is understood that the ASIC can be replaced with any other type of data processing chiplet, such as a network switch, a central processor unit, a graphics processor unit, a tensor processing unit, a neural network processor, an artificial intelligence accelerator, a digital signal processor, a microcontroller, or a data storage device.

In FIGS. 1D, 2, 4, 5, 7, 9 to 17, 19 to 23, 27A to 40, 43 to 57A, the term "BoW" is used as a stand-in for "slow and parallel," and the term "XSR" is used as a stand-in for "fast and serial." It is understood that the BoW interface can be replaced with any other relatively slow and parallel interface, such as AIB or UCIe. It is understood that the XSR interface can be replaced with any other relatively fast and serial interface, such as XLR, LR, MR, SR, VSR, or USR.

In the examples shown in FIGS. 1A to 2, 5, 7 to 17, 19 to 34, 37 to 38D, 43 to 57A, and 62 to 68B, the fiber optic connector is attached to the top side of the photonic chiplet. It is also possible to configure the photonic chiplet or photonic module to have optical couplers (e.g., grating couplers) positioned near the bottom side of the photonic chiplet to enable the fiber optic connector to be attached to the bottom side of the photonic chiplet.

Figure 83:
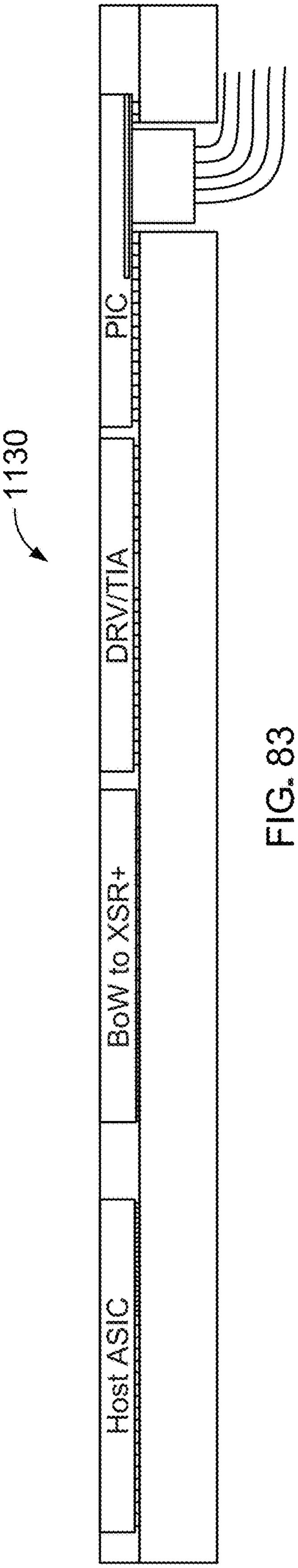
FIG. 83 is a diagram of an example of a semiconductor package that includes a data processing chiplet, a converter chiplet, an electronic amplification chiplet, and a photonic chiplet that are mounted on a common substrate.

Referring to FIG. 83, in some implementations, a semiconductor package 1130 includes a data processing chiplet, a converter chiplet, an electronic amplification chiplet, and a photonic chiplet that are mounted on a common substrate. The photonic chiplet has an active layer near the bottom side, and grating couplers are positioned near the bottom side. The common substrate defines an opening, and the fiber optic connector passes through the opening and attaches to the bottom side of the photonic chiplet.

Figure 84:
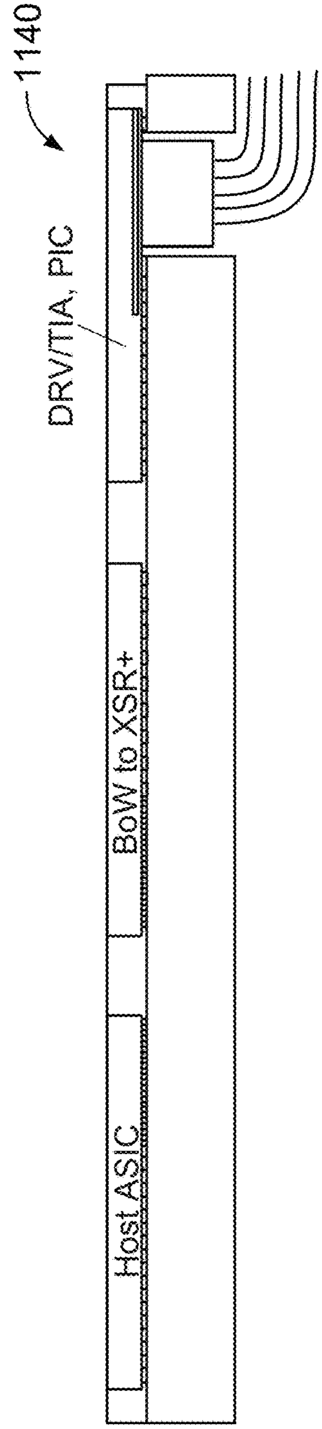
FIG. 84 is a diagram of an example of a semiconductor package that includes a data processing chiplet, a converter chiplet, and a third chiplet that includes an electronic amplification module and a photonic module that are mounted on a common substrate.

Referring to FIG. 84, in some implementations, a semiconductor package 1140 includes a data processing chiplet, a converter chiplet, and a third chiplet that includes an electronic amplification module and a photonic module that are mounted on a common substrate. The photonic module has an active layer near the bottom side, and grating couplers are positioned near the bottom side. The common substrate defines an opening, and the fiber optic connector passes through the opening and attaches to the bottom side of the photonic module.

Figure 85:
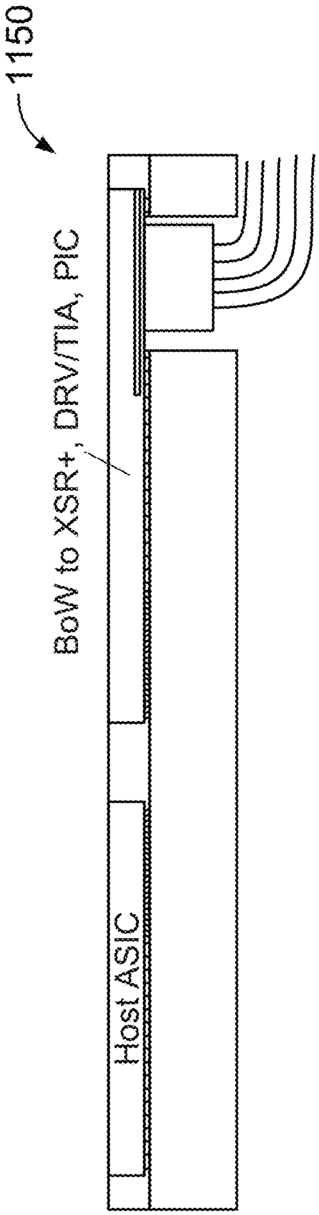
FIG. 85 is a diagram of an example of a semiconductor package that includes a data processing chiplet and a second chiplet that includes a converter module, an electronic amplification module, and a photonic module that are mounted on a common substrate.

Referring to FIG. 85, in some implementations, a semiconductor package 1150 includes a data processing chiplet and a second chiplet that includes a converter module, an electronic amplification module, and a photonic module that are mounted on a common substrate. The photonic module has an active layer near the bottom side, and grating couplers are positioned near the bottom side. The common substrate defines an opening, and the fiber optic connector passes through the opening and attaches to the bottom side of the photonic module.

Figure 86:
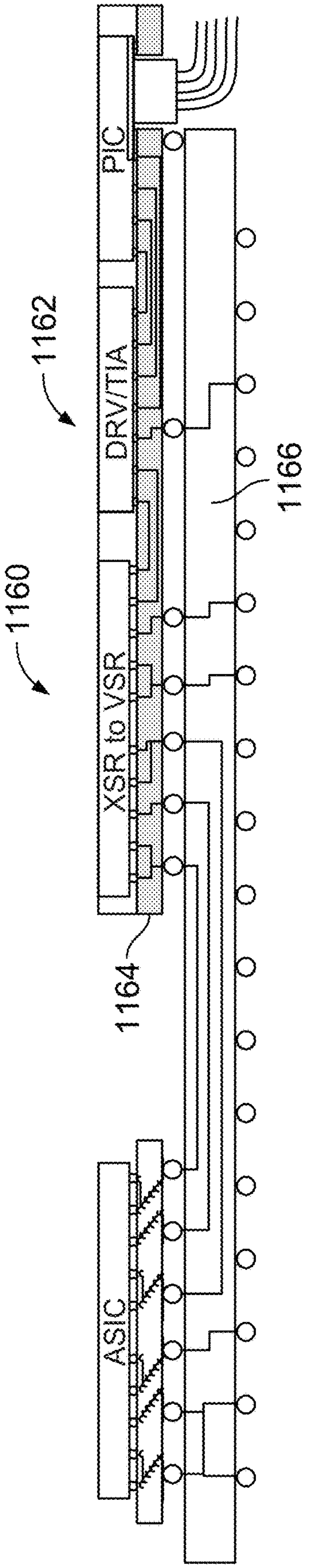
FIGS. 86 and 87 are diagrams of examples of semiconductor packages that each includes a converter chiplet, an electronic amplification chiplet, and a photonic chiplet mounted on a common substrate.

Referring to FIG. 86, in some implementations, a semiconductor package 1160 includes a semiconductor package 1162 including a converter chiplet, an electronic amplification chiplet, and a photonic chiplet mounted on a common substrate 1164. The photonic chiplet has an active layer near the bottom side, and grating couplers are positioned near the bottom side. The common substrate 1164 defines an opening, and the fiber optic connector passes through the opening and attaches to the bottom side of the photonic chiplet. The semiconductor package 1162 and a data processing chiplet are mounted on a second substrate 1166. The semiconductor package 1162 is positioned such that a portion of the photonic chiplet and the fiber optic connector extends beyond the edge of the second substrate 1166.

Figure 87:
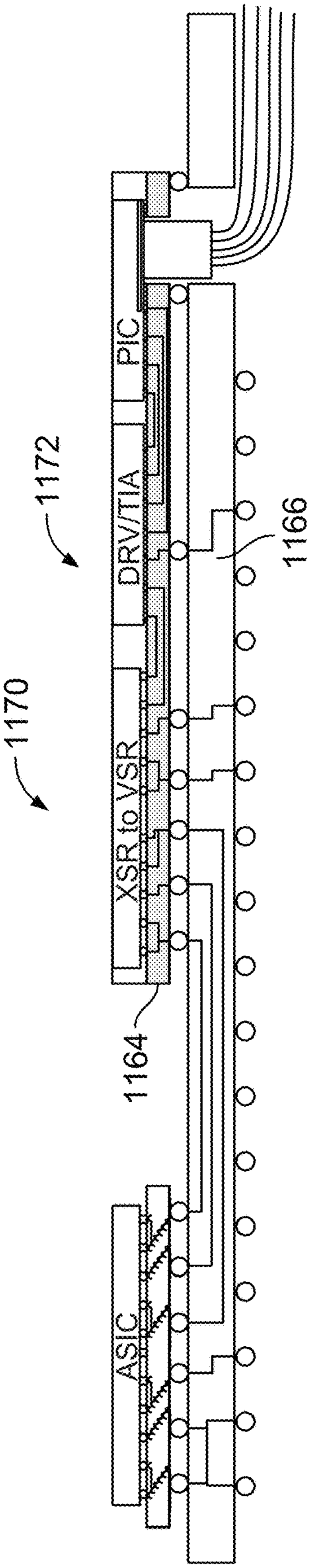

Referring to FIG. 87, in some implementations, a semiconductor package 1170 includes a semiconductor package 1172 including a converter chiplet, an electronic amplification chiplet, and a photonic chiplet mounted on a common substrate 1164. The photonic chiplet has an active layer near the bottom side, and grating couplers are positioned near the bottom side. The common substrate 1164 defines a first opening. The semiconductor package 1172 and a data processing chiplet are mounted on a second substrate 1166. The second substrate 1166 defines a second opening. The fiber optic connector passes through the second opening in the second substrate 1166 and the first opening in the first substrate 1164 and attaches to the bottom side of the photonic chiplet.

In the examples described above, the chiplets can also be replaced with integrated circuit that has its own substrate, encapsulation, and connectors. For example, a data processing chiplet can be replaced with a data processing integrated circuit that includes a semiconductor die having data processing circuitry mounted on a substrate, encapsulated in a protective housing, and have input/output terminations (e.g., ball grid array or bump pads). A converter chiplet can be replaced with a converter integrated circuit that includes a semiconductor die having converter circuitry mounted on a substrate, encapsulated in a protective housing, and have input/output terminations (e.g., ball grid array or bump pads). An electronic amplification chiplet can be replaced with an electronic amplification integrated circuit that includes a semiconductor die having electronic amplification circuitry mounted on a substrate, encapsulated in a protective housing, and have input/output terminations (e.g., ball grid array or bump pads). A photonic chiplet can be replaced with a photonic integrated circuit that includes a semiconductor die having photonic components and circuitry mounted on a substrate, encapsulated in a protective housing, and have electrical input/output terminations (e.g., ball grid array or bump pads) and an optical input/output interface (e.g., grating couplers). A chiplet that includes a data processing module and a converter module can be replaced with an integrated circuit that includes data processing circuitry and converter circuitry. A chiplet that includes a data processing module, a converter module, and an electronic amplification module can be replaced with an integrated circuit that includes data processing circuitry, converter circuitry, and electronic amplification circuitry. A chiplet that includes a converter module and an electronic amplification module can be replaced with an integrated circuit that includes converter circuitry and electronic amplification circuitry. A chiplet that includes a photonic module and an electronic amplification module can be replaced with a photonic integrated circuit that includes photonic components and electronic amplification circuitry. A chiplet that includes a photonic module, an electronic amplification module, and a converter module can be replaced with a photonic integrated circuit that includes photonic components, electronic amplification circuitry, and converter circuitry.

Some embodiments can be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure can be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled or referred to as "processors" and/or "controllers," can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

As used in this application, the term "circuitry" can refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software does not need to be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

Although the present invention is defined in the attached claims, it should be understood that the present invention can also be defined in accordance with the following embodiments:

Embodiment 1: A system comprising:

a first chiplet comprising at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device;

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification module comprising at least one of a driver amplifier or a transimpedance amplifier, and configured to process electrical signals sent to or from the photonic module; and a converter module configured to convert signals between a first interface and a second interface, in which the converter module is configured to communicate with the first chiplet using the first interface, and the converter module is configured to communicate with the electronic amplification module using the second interface.

Embodiment 2: The system of embodiment 1 in which each of the first and second chiplets comprises a semiconductor die or a semiconductor die stack.

Embodiment 3: The system of embodiment 1 or 2 in which the photonic module comprises a plurality of grating couplers that are arranged in a two-dimensional pattern.

Embodiment 4: The system of embodiment 3 in which the plurality of grating couplers comprise at least four rows and at least four columns of grating couplers.

Embodiment 5: The system of any of embodiments 1 to 4, comprising a fiber array connector attached to the photonic module, in which the fiber array connector is configured to be coupled to a fiber optic cable comprising a two-dimensional arrangement of fiber cores.

Embodiment 6: The system of embodiment 5 in which the two-dimensional arrangement of fiber cores comprises an array of at least four rows and at least four columns of fiber cores.

Embodiment 7: The system of any of embodiments 1 to 6 in which the first interface between the first chiplet and the converter module has a shoreline bandwidth density of at least 1 Gbps/mm.

Embodiment 8: The system of embodiment 7 in which the first interface between the first chiplet and the converter module has a shoreline bandwidth density of at least 10 Gbps/mm.

Embodiment 9: The system of embodiment 8 in which the first interface between the first chiplet and the converter module has a shoreline bandwidth density of at least 100 Gbps/mm.

Embodiment 10: The system of embodiment 9 in which the first interface between the first chiplet and the converter module has a shoreline bandwidth density of at least 1000 Gbps/mm.

Embodiment 11: The system of embodiment 10 in which the first interface between the first chiplet and the converter module has a shoreline bandwidth density of at least 2000 Gbps/mm.

Embodiment 12: The system of any of embodiments 1 to 11 in which the system is configured to maintain shoreline bandwidth density from the first chiplet to an optical fiber connector that is attached to the photonic module.

Embodiment 13: The system of embodiment 12 in which the optical fiber connector is configured to be optically coupled to a two-dimensional arrangement of fiber cores, wherein the photonic module and the optical fiber connector are configured to operate at a specified bandwidth such that the optical fiber connector has a fifth shoreline bandwidth density S5, wherein the first interface between the first chiplet and the converter module has a first shoreline bandwidth density S1, and S5 is in a range from 0.5×S1 to 2×S1.

Embodiment 14: The system of embodiment 13 in which S5 is in a range from 0.8×S1 to 1.5×S1.

Embodiment 15: The system of embodiment 14 in which S5 is in a range from 0.9×S1 to 1.1×S1.

Embodiment 16: The system of any of embodiments 12 to 15 in which the converter module has a second shoreline bandwidth density S2, the electronic amplification module has a third shoreline bandwidth density S3, the second chiplet has a fourth shoreline bandwidth density S4, wherein S2 is in a range from 0.5×S1 to 2×S1, and S3 is in a range from 0.5×S2 to 2×S2.

Embodiment 17: The system of embodiment 16 in which S2 is in a range from 0.8×S1 to 1.5×S1, and S3 is in a range from 0.8×S2 to 1.5×S2.

Embodiment 18: The system of embodiment 17 in which S2 is in a range from 0.9×S1 to 1.1×S1, and S3 is in a range from 0.9×S2 to 1.1×S2.

Embodiment 19: The system of embodiment 1 in which the first chiplet, the second chiplet, the electronic amplification module, the converter module, the first interface, and the second interface are assembled into a co-packaged optical-electrical module using a chiplet packaging technique.

Embodiment 20: The system of embodiment 1 or 2 in which the first interface, the converter module, the second interface, the electronic amplification module, and the photonic module are configured to enable the first chiplet to communicate with an external device through an optical link at a data rate of at least 1 terabits per second for at least some periods of time.

Embodiment 21: The system of embodiment 20 in which the first interface, the converter module, the second interface, the electronic amplification module, and the photonic module are configured to enable the first chiplet to communicate with the external device through the optical link at a data rate of at least 10 terabits per second for at least some periods of time.

Embodiment 22: The system of embodiment 21 in which the first interface, the converter module, the second interface, the electronic amplification module, and the photonic module are configured to enable the first chiplet to communicate with the external device through the optical link at a data rate of at least 100 terabits per second for at least some periods of time.

Embodiment 23: The system of any of embodiments 1 to 22 in which the optical link comprises at least one of multiple optical fibers, multiple cores of a multi-core optical fiber, or multiple cores of multi-core optical fibers.

Embodiment 24: The system of any of embodiments 1 to 23 in which the photonic module is configured to at least one of transmit or receive wavelength division multiplexed signals through the optical link.

Embodiment 25: The system of any of embodiments 1 to 24 in which the second chiplet comprises the electronic amplification module, wherein the photonic module and electronic amplification module are formed on a monolithic semiconductor die.

Embodiment 26: The system of embodiment 25 in which the second chiplet comprises the converter module and the second interface, wherein the photonic module, the electronic amplification module, the second interface, and the converter module are formed on the monolithic semiconductor die.

Embodiment 27: The system of any of embodiments 1 to 26 in which the second interface comprises electrical traces between the converter module and the electronic amplification module.

Embodiment 28: The system of any of embodiments 1 to 27 in which the first interface comprises electrical traces between the converter module and the first chiplet.

Embodiment 29: The system of any of embodiments 1 to 7 in which the first chiplet comprises the converter module and the first interface, wherein the first chiplet, the converter module, and the first interface are formed on a monolithic semiconductor die.

Embodiment 30: The system of embodiment 29 in which the first chiplet comprises the converter module, the first interface, the second interface, and the electronic amplification module, wherein the first chiplet, the first interface, the converter module, the second interface, and the electronic amplification module are formed on a monolithic semiconductor die.

Embodiment 31: The system of any of embodiments 1 to 7, 29, and 30 in which the first chiplet comprises a data processing module, and the first interface comprises electrical traces between the converter module and the data processing module.

Embodiment 32: The system of embodiment 31 in which the second interface comprises electrical traces between the converter module and the electronic amplification module.

Embodiment 33: The system of any of embodiments 1 to 32, comprising a common substrate, in which the first chiplet and the second chiplet are mounted on the common substrate.

Embodiment 34: The system of any of embodiments 1 to 33 in which each of the first and second chiplets comprises a semiconductor substrate on which electrical or optical components are formed, and the chiplet is not covered by an encapsulant or molding compound prior to being mounted on the common substrate.

Embodiment 35: The system of any of embodiments 1 to 34, comprising a third chiplet comprising the converter module.

Embodiment 36: The system of embodiment 35 in which the first chiplet, the second chiplet, the third chiplet, the electronic amplification module, the first interface, and the second interface are assembled into a co-packaged optical-electrical module using a chiplet packaging technique.

Embodiment 37: The system of embodiment 35 in which the third chiplet comprises the electronic amplification module, wherein the converter module, the second interface, and the electronic amplification module are formed on a monolithic semiconductor die.

Embodiment 38: The system of embodiment 37 in which the first chiplet, the second chiplet, the third chiplet, and the first interface are assembled into a co-packaged optical-electrical module using a chiplet packaging technique.

Embodiment 39: The system of any of embodiments 35 to 38, comprising a common substrate, in which the first chiplet, the second chiplet, and the third chiplet are mounted on the common substrate.

Embodiment 40: The system of any of embodiments 1 to 35, comprising a fourth chiplet comprising the electronic amplification module.

Embodiment 41: The system of embodiment 40 in which the first chiplet, the second chiplet, the third chiplet, the fourth chiplet, the first interface, and the second interface are assembled into a co-packaged optical-electrical module using a chiplet packaging technique.

Embodiment 42: The system of any of embodiments 1 to 34 in which the first chiplet comprises the converter module.

Embodiment 43: The system of any of embodiments 1 to 34 in which the first chiplet comprises the converter module and the electronic amplification module.

Embodiment 44: The system of any of embodiments 1 to 34 in which the second chiplet comprises the electronic amplification module.

Embodiment 45: The system of any of embodiments 1 to 34 in which the second chiplet comprises the electronic amplification module and the converter module.

Embodiment 46: The system of embodiment 40 or 41, comprising a common substrate, in which the first chiplet, the second chiplet, the third chiplet, and the fourth chiplet are mounted on the common substrate.

Embodiment 47: The system of any of embodiments 33, 39, or 42 in which the common substrate comprises at least one of an organic substrate, a ceramic substrate, a silicon interposer, a substrate using one or more silicon bridges, or a substrate made in a fan-out wafer-level packaging (FoWLP) process.

Embodiment 48: The system of any of embodiments 1 to 47 in which the converter module is configured to convert from a first set of a first number of bit streams, each at a first bit rate, to a second set of a second number of bit streams, each at a second bit rate.

Embodiment 49: The system of embodiment 48 in which the converter module adds coding overhead to the first set of the first number of bit streams in the process of converting the first set of the first number of bit streams to the second set of the second number of bit streams.

Embodiment 50: The system of embodiment 48 in which the first set of the first number of bit streams is transmitted between the first chiplet and the converter module, and the second set of the second number of bit streams is transmitted between the converter module and the electronic amplification module.

Embodiment 51: The system of embodiment 50 in which the second bit rate is at least 1 Gbps for at least some periods of time.

Embodiment 52: The system of embodiment 51 in which the second bit rate is at least 10 Gbps for at least some periods of time.

Embodiment 53: The system of embodiment 52 in which the second bit rate is at least 50 Gbps for at least some periods of time.

Embodiment 54: The system of embodiment 53 in which the second bit rate is at least 100 Gbps for at least some periods of time.

Embodiment 55: The system of any of embodiments 48 to 54 in which the product of the first number of bit streams and the first bit rate is approximately equal to the product of the second number of bit streams and the second bit rate.

Embodiment 56: The system of embodiment 55 in which the product of the first number of bit streams and the first bit rate is in a range from 66% to 150% of the product of the second number of bit streams and the second bit rate.

Embodiment 57: The system of any of embodiments 48 to 55 in which the second bit rate is at least twice the first bit rate.

Embodiment 58: The system of embodiment 57 in which the second bit rate is at least 4 times the first bit rate.

Embodiment 59: The system of embodiment 58 in which the second bit rate is at least 8 times the first bit rate.

Embodiment 60: The system of any of embodiments 1 to 59 in which the converter module comprises at least one of an XLR (extra long reach)-to-BoW (bunch of wire) converter, an LR (long reach)-to-BoW converter, an MR (medium reach)-to-BoW converter, a SR (short reach)-to-BoW converter, a VSR (very short reach)-to-BoW converter, an XSR (extra short reach)-to-BoW converter, a USR (ultra short reach)-to-BoW converter, an XLR-to-AIB (advanced interface bus) converter, an LR-to-AIB converter, an MR-to-AIB converter, an SR-to-AIB converter, a VSR-to-AIB converter, an XSR-to-AIB converter, a USR-to-AIB converter, an XLR-to-UCIe (universal chiplet interconnect express) converter, an LR-to-UCIe converter, an MR-to-UCIe converter, an SR-to-UCIe converter, a VSR-to-UCIe converter, an XSR-to-UCIe converter, or a USR-to-UCIe converter.

Embodiment 61: The system of any of embodiments 1 to 59 in which the converter module comprises at least one of an LR (long reach)-to-BoW converter, an MR (medium reach)-to-BoW converter, a SR (short reach)-to-BoW converter, a VSR (very short reach)-to-BoW converter, an XSR (extra short reach)-to-BoW converter, a USR (ultra short reach)-to-BoW converter, an LR-to-AIB converter, an MR-to-AIB converter, an SR-to-AIB converter, a VSR-to-AIB converter, an XSR-to-AIB converter, a USR-to-AIB converter, an LR-to-UCIe converter, an MR-to-UCIe converter, an SR-to-UCIe converter, a VSR-to-UCIe converter, an XSR-to-UCIe converter, or a USR-to-UCIe converter.

Embodiment 62: The system of embodiment 60 in which the first interface complies with at least one of BoW specification, AIB specification, or UCIe specification, wherein the second interface complies with at least one of XLR specification, LR specification, MR specification, SR specification, VSR specification, or XSR specification.

Embodiment 63: The system of embodiment 60 in which the first interface complies with at least one of BoW specification, AIB specification, or UCIe specification, wherein the second interface complies with at least one of LR specification, MR specification, SR specification, VSR specification, or XSR specification.

Embodiment 64: The system of any of embodiments 1 to 59 in which the converter module comprises at least one of an XLR (extra long reach)-to-LR (long reach) converter, an XLR-to-VSR (very short reach) converter, an XLR-to-MR (medium reach) converter, an XLR-to-SR (short reach) converter, an XLR-to-XSR (extra short reach) converter, an LR-to-MR converter, an LR-to-SR converter, an LR-to-VSR converter, an LR-to-XSR converter, an MR-to-SR converter, an MR-to-VSR converter, an MR-to-XSR converter, a VSR-to-XSR converter, or a SR-to-XSR converter.

Embodiment 65: The system of any of embodiments 1 to 59 in which the converter module comprises at least one of an LR-to-MR converter, an LR-to-SR converter, an LR-to-VSR converter, an LR-to-XSR converter, an MR-to-SR converter, an MR-to-VSR converter, an MR-to-XSR converter, a VSR-to-XSR converter, or a SR-to-XSR converter.

Embodiment 66: The system of embodiment 64 in which the first interface complies with at least one of XLR specification, LR specification, MR specification, SR specification, VSR specification, or XSR specification, wherein the second interface complies with at least one of XLR specification, LR specification, MR specification, SR specification, VSR specification, or XSR specification.

Embodiment 67: The system of embodiment 64 in which the first interface complies with at least one of LR specification, MR specification, SR specification, VSR specification, or XSR specification, wherein the second interface complies with at least one of LR specification, MR specification, SR specification, VSR specification, or XSR specification.

Embodiment 68: The system of any of embodiments 1 to 65 in which the converter module comprises a continuous-time linear equalizer.

Embodiment 69: The system of any of embodiments 1 to 67 in which the electronic amplification module comprises a continuous-time linear equalizer.

Embodiment 70: The system of any of embodiments 1 to 59 or 68 in which the converter module comprises at least one of an XLR (extra long reach)-to-XLR retimer, an LR (long reach)-to-LR retimer, an MR (medium reach)-to-MR retimer, a SR (short reach)-to-SR retimer, a VSR (very short reach)-to-VSR retimer, an XSR (extra short reach)-to-XSR retimer, a BoW (bunch of wire)-to-BoW retime, an AIB (advanced interface bus)-to-AIB retimer, or a UCIe (universal chiplet interconnect express)-to-UCIe retimer.

Embodiment 71: The system of any of embodiments 1 to 59 or 68 in which the converter module comprises at least one of an LR (long reach)-to-LR retimer, an MR (medium reach)-to-MR retimer, a SR (short reach)-to-SR retimer, a VSR (very short reach)-to-VSR retimer, an XSR (extra short reach)-to-XSR retimer, a BoW (bunch of wire)-to-BoW retime, an AIB (advanced interface bus)-to-AIB retimer, or a UCIe (universal chiplet interconnect express)-to-UCIe retimer.

Embodiment 72: The system of embodiment 64 in which the first interface complies with at least one of XLR specification, LR specification, MR specification, SR specification, VSR specification, XSR specification, BoW specification, AIB specification, or UCIe specification, wherein the second interface complies with a same specification as the first interface.

Embodiment 73: The system of embodiment 64 in which the first interface complies with at least one of LR specification, MR specification, SR specification, VSR specification, XSR specification, BoW specification, AIB specification, or UCIe specification, wherein the second interface complies with a same specification as the first interface.

Embodiment 74: The system of any of embodiments 1 to 72 in which the photonic module comprises an optically active layer that comprises active photonic components, the photonic module has an optically active side and a backside, at least some of the active photonic components are closer to the optically active side than the backside;

wherein the photonic module comprises back-side illuminated couplers arranged in a two-dimensional configuration, each back-side illuminated coupler is configured to receive a light beam incident on the back side of the photonic module or emit a light beam that exits the back side of the photonic module.

Embodiment 75: The system of embodiment 74 in which the photonic module comprises a first substrate and a first layer formed on the first substrate, the first substrate comprises a first material having a first refractive index, the first layer comprises a second material having a second refractive index that is smaller than the first refractive index, wherein the first substrate comprises a first side and a second side, the first side of the first substrate faces towards the first layer, the second side of the first substrate forms or faces towards the backside of the photonic module, wherein the first layer is disposed between the first substrate and the optically active layer of the photonic module, wherein the first substrate defines one or more openings that extend from the first side of the first substrate to the second side of the first substrate to allow one or more light beams directed toward the backside of the photonic module to pass through the one or more openings to reach the first layer.

Embodiment 76: The system of embodiment 75 in which the one or more openings in the first substrate expose one or more regions of a surface of the first layer, and an antireflective coating is provided on the exposed one or more regions of the surface of the first layer.

Embodiment 77: The system of embodiment 76 in which the antireflective coating is configured to reduce reflection of light having a wavelength in a predetermined range to at most 5%.

Embodiment 78: The system of embodiment 77 in which the antireflective coating is configured to reduce reflection of light having a wavelength in a predetermined range to at most 1%.

Embodiment 79: The system of any of embodiments 75 to 78 in which the first substrate has a first refractive index greater than 3.7, and the first layer has a second refractive index less than 3.1 for light having a wavelength in a range from 1250 nm to 1620 nm.

Embodiment 80: The system of embodiment 79 in which the first substrate comprises a silicon substrate and the first layer comprises a buried oxide silica layer.

Embodiment 81: The system of any of embodiments 75 to 80 in which the first substrate has a thickness in a range from 100 μm to 500 μm, and the first layer has a thickness in a range from 0.5 μm to 10 μm.

Embodiment 82: The system of embodiment 81 in which the first layer has a thickness in a range from 1 μm to 5 μm.

Embodiment 83: The system of any of embodiments 75 to 82 in which each of the one or more openings has a diameter in a range from 10 μm to 100 μm.

Embodiment 84: The system of any of embodiments 74 to 83 in which the photonic module comprises a layer on the backside of the photonic module that includes microlenses configured to collimate incoming light traveling in an optical path towards the back-side illuminated couplers, or to collimate outgoing light traveling in optical paths away from the back-side illuminated couplers.

Embodiment 85: The system of any of embodiments 1 to 84, comprising a common substrate, in which the first chiplet is mounted on the common substrate.

Embodiment 86: The system of embodiment 85, comprising a fourth chiplet comprising the electronic amplification module, wherein the second chiplet is mounted on the fourth chiplet, and the fourth chiplet is mounted on the common substrate, in which the photonic module is oriented such that an optically active side of the photonic module faces towards the electronic amplification module.

Embodiment 87: The system of embodiment 85, comprising a fourth chiplet comprising the electronic amplification module, wherein the second chiplet is mounted on the fourth chiplet, and the fourth chiplet is mounted on the common substrate, in which the photonic module is oriented such that a backside of the photonic module faces towards the electronic amplification module;

wherein the second chiplet comprises conductive vias that extend from an optically active layer to the backside of the second chiplet.

Embodiment 88: The system of embodiment 86 or 87 in which the fourth chiplet has a first side facing towards the second chiplet and a second side facing towards the common substrate, wherein the electronic amplification module comprises an active electronic layer that is positioned closer to the first side of the fourth chiplet than the second side of the fourth chiplet, wherein the fourth chiplet comprises conductive vias that extend from the active electronic layer to the second side of the fourth chiplet.

Embodiment 89: The system of embodiment 86 or 87 in which the fourth chiplet has a first side facing towards the second chiplet and a second side facing towards the common substrate, wherein the electronic amplification module comprises an active electronic layer that is positioned closer to the second side of the fourth chiplet than the first side of the fourth chiplet, wherein the fourth chiplet comprises conductive vias that extend from the active electronic layer to the first side of the fourth chiplet.

Embodiment 90: The system of embodiment 86, comprising a third chiplet comprising the converter module, wherein the second chiplet is mounted on the fourth chiplet, the fourth chiplet is mounted on the third chiplet, and the third chiplet is mounted on the common substrate.

Embodiment 91: The system of embodiment 90 in which the photonic module is mounted on the electronic amplification module with the optically active side of the photonic module facing towards the electronic amplification module.

Embodiment 92: The system of embodiment 90 in which the photonic module is mounted on the electronic amplification module with the backside of the photonic module facing towards the electronic amplification module;

wherein the second chiplet comprises conductive vias that extend from an optically active layer to the backside of the second chiplet.

Embodiment 93: The system of embodiment 85, comprising a fourth chiplet comprising the electronic amplification module, wherein the second chiplet is mounted on the common substrate, and the fourth chiplet is mounted on the common substrate.

Embodiment 94: The system of embodiment 93 in which the photonic module is oriented such that an optically active side of the photonic module faces towards the common substrate.

Embodiment 95: The system of embodiment 93 in which the photonic module is oriented such that a backside of the photonic module faces towards the common substrate;

wherein the second chiplet comprises conductive vias that extend from an optically active layer to the backside of the second chiplet.

Embodiment 96: The system of any of embodiments 93 to 95, comprising a third chiplet comprising the converter module, wherein the second chiplet is mounted on the common substrate, the third chiplet is mounted on the common substrate.

Embodiment 97: The system of embodiment 85 in which the second chiplet comprises the electronic amplification module, wherein the photonic module and the electronic amplification module are formed on a monolithic semiconductor die, wherein the second chiplet is mounted on the common substrate.

Embodiment 98: The system of embodiment 97 in which the photonic module is oriented such that an optically active side of the photonic module faces towards the common substrate.

Embodiment 99: The system of embodiment 97 in which the photonic module is oriented such that a backside of the photonic module faces towards the common substrate;

wherein the second chiplet comprises conductive vias that extend from an optically active layer to the backside of the second chiplet.

Embodiment 100: The system of embodiment 97, comprising a third chiplet comprising the converter module, wherein the second chiplet is mounted on the common substrate, and the third chiplet is mounted on the common substrate.

Embodiment 101: The system of embodiment 97, comprising a third chiplet comprising the converter module, wherein the second chiplet is mounted on the third chiplet, and the third chiplet is mounted on the common substrate.

Embodiment 102: The system of embodiment 97 in which the second chiplet comprises the converter module, wherein the photonic module, the electronic amplification module, and the converter module are formed on the monolithic semiconductor die.

Embodiment 103: The system of embodiment 85 in which the second chiplet comprises a second substrate comprising through vias (TVs), the photonic module is mounted on the second substrate, the second substrate is mounted on the common substrate, and the optical active layer of the photonic module is electrically coupled to the common substrate using the through vias in the second substrate.

Embodiment 104: The system of embodiment 103 in which the photonic module is oriented such that an optically active side of the photonic module faces towards the second substrate.

Embodiment 105: The system of embodiment 103 in which the photonic module is oriented such that a backside of the photonic module faces towards the second substrate;

wherein the second chiplet comprises conductive vias that extend from an optically active layer to the backside of the second chiplet.

Embodiment 106: The system of embodiment 103 in which the second chiplet comprises the electronic amplification module, the electronic amplification module is mounted on the second substrate, and the electrically active components of the electronic amplification module are electrically coupled to the common substrate using the through vias in the second substrate.

Embodiment 107: The system of embodiment 106 in which the second chiplet comprises the converter module, the converter module is mounted on the second substrate, and the converter module is electrically coupled to the common substrate using the through vias in the second substrate.

Embodiment 108: The system of embodiment 106, comprising a third chiplet comprising the converter module, in which the converter module is mounted on the common substrate.

Embodiment 109: The system of embodiment 85, comprising a third chiplet comprising the converter module, the electronic amplification module, and a second substrate comprising through vias (TVs), wherein the converter module and the electronic amplification module are mounted on the second substrate, and the second substrate is mounted on the common substrate, wherein the converter module and the electronic amplification module are electrically coupled to the common substrate using the through vias in the second substrate, wherein the second chiplet is mounted on the common substrate.

Embodiment 110: The system of embodiment 109 in which the photonic module is oriented such that an optically active side of the photonic module faces towards the second substrate.

Embodiment 111: The system of embodiment 109 in which the photonic module is oriented such that a back side of the photonic module faces towards the second substrate;

wherein the second chiplet comprises conductive vias that extend from an optically active layer to the back side of the second chiplet.

Embodiment 112: The system of any of embodiments 103 to 111 in which the second substrate comprise a silicon substrate.

Embodiment 113: The system of any of embodiments 1 to 109, comprising a fiber array connector attached to the photonic module, in which the fiber array connector is configured to be coupled to a fiber optic cable comprising multiple fiber cores.

Embodiment 114: The system of embodiment 113 in which the fiber array connector is attached to a backside of the photonic module.

Embodiment 115: The system of embodiment 113 in which the fiber array connector is attached to an optically active side of the photonic module, and the second chiplet comprises conductive vias that extend from an optically active layer to a backside of the photonic module.

Embodiment 116: The system of any of embodiments 113 to 115 in which the multiple fiber cores are arranged in a two-dimensional configuration.

Embodiment 117: The system of any of embodiments 113 to 115 in which the multiple fiber cores are arranged in a one-dimensional arrangement.

Embodiment 118: The system of any of embodiments 107 to 117 in which the photonic module comprises a plurality of vertical-coupling elements disposed along a main surface of the photonic module; and wherein the system comprises a fiber-optic connector connected between one or more optical fibers having a plurality of fiber cores and the photonic module to communicate light therebetween through the main surface, the fiber-optic connector comprising optics configured to transfer light between the plurality of fiber cores and the plurality of vertical-coupling elements such that:

a first distance between a first pair of the fiber cores is optically scaled by a first scaling factor having a value different from 1 such that at the vertical-coupling elements, a second distance between a pair of light beams transmitted from or to the first pair of the fiber cores is different from the first distance between the first pair of the fiber cores, and a ratio between the second distance and the first distance is equal to the first scaling factor; and a first diameter of a light beam emitting from an exit surface or entering an entrance surface of at least one of the fiber cores is optically scaled by a second scaling factor that is different from the first scaling factor, wherein at a vertical-coupling element optically coupled to the fiber core, the light beam has a second diameter that is different from the first diameter, and a ratio between the second diameter and the first diameter is equal to the second scaling factor.

Embodiment 119: The system of any of embodiments 107 to 117 in which the photonic module comprises a main surface and a plurality of vertical-coupling elements disposed on the main surface; and wherein the system comprises a fiber-optic connector configured to communicate light between one or more optical fibers having a plurality of fiber cores and the photonic module through the main surface, in which the fiber-optic connector comprises optics configured to process light beams transmitted between the plurality of fiber cores and the plurality of vertical-coupling elements, wherein the plurality of fiber cores comprise a first pair of fiber cores that include a first fiber core and a second fiber core, the second fiber core is spaced apart from the first fiber core by a first distance D1, and the first pair of fiber cores are configured to emit or receive a first pair of light beams that include a first light beam and a second light beam;

wherein the optics is configured to process the first pair of the light beams such that at the vertical-coupling elements, the second light beam is spaced apart from the first light beam by a second distance D2, D2 being different from D1, and D2/D1 equals a first scaling factor;

wherein one of the plurality of fiber cores is configured to emit or receive a third light beam that has a first diameter D3 at an exit surface or entrance surface of the fiber core, and wherein the optics is configured to process the third light beam such that at one of the vertical-coupling elements, the third light beam has a second diameter D4, and D4/D3 equals a second scaling factor that is different from the first scaling factor.

Embodiment 120: The system of any of embodiments 107 to 117 in which the photonic module comprises a plurality of vertical-coupling elements disposed along a main surface of the photonic module; and wherein the system comprises a fiber-optic connector connected between one or more optical fibers and the photonic module to communicate light therebetween through the main surface, wherein the one or more optical fibers have a plurality of fiber cores, each optical fiber includes at least one fiber core, wherein the fiber-optic connector comprises optics configured to transfer light between the plurality of fiber cores and the plurality of vertical-coupling elements such that:

a minimum core-to-core spacing of the fiber cores is different from a minimum spacing between the vertical coupling elements along the main surface of the photonic module;

wherein the fiber-optic connector comprises one or more polarization beam splitters, and one or more polarization-rotating elements;

wherein each of at least some of the one or more polarization beam splitters is configured to split an incident light beam from a corresponding fiber core into a first beam having a first polarization and a second beam having a second polarization different from the first polarization, in which the optics is configured to transmit the first beam having the first polarization to a corresponding first vertical-coupling element, a corresponding polarization-rotating element is configured to rotate the polarization of the second beam to cause the second beam to also have the first polarization, and the optics is further configured to transmit the second beam having the first polarization to a corresponding second vertical-coupling element.

Embodiment 121: The system of any of embodiments 107 to 117 in which the photonic module comprises a two-dimensional arrangement of parallel aligned polarization-sensitive vertical grating couplers disposed along a main surface of the photonic module;

wherein the system comprises a fiber-optic connector configured to process light beams transmitted between the two-dimensional arrangement of optical fiber cores and the two-dimensional arrangement of parallel aligned polarization-sensitive vertical grating couplers;

wherein the fiber-optic connector comprises one or more polarization beam splitters, and one or more polarization-rotating elements;

wherein each polarization beam splitter is configured to split an incident light beam from a corresponding optical fiber core into a first beam having a first polarization and a second beam having a second polarization different from the first polarization, in which the fiber-optic connector comprises optics configured to transmit the first beam having the first polarization to a corresponding first polarization-sensitive vertical grating coupler, a corresponding polarization-rotating element is configured to rotate the polarization of the second beam to cause the second beam to also have the first polarization, and the optics is further configured to transmit the second beam having the first polarization to a corresponding second polarization-sensitive vertical grating coupler.

Embodiment 122: The system of any of embodiments 107 to 117 in which the photonic module comprises a plurality of vertical-coupling elements disposed along a main surface of the photonic module; and a fiber-optic connector connected between one or more optical fibers and the photonic module to communicate light therebetween through the main surface, wherein the one or more optical fibers have a plurality of fiber cores;

wherein the fiber-optic connector comprises optics configured to transfer light between the plurality of fiber cores and the plurality of vertical-coupling elements;

wherein the optics comprises one or more polarization beam splitters, and one or more polarization-rotating elements;

wherein each polarization beam splitter is configured to split an incident light beam from a corresponding fiber core into a first beam having a first polarization and a second beam having a second polarization different from the first polarization;

wherein the optics is configured to transmit the first beam having the first polarization to a corresponding first vertical-coupling element, a corresponding polarization-rotating element is configured to rotate the polarization of the second beam to cause the second beam to also have the first polarization, and the optics is further configured to transmit the second beam having the first polarization to a corresponding second vertical-coupling element;

wherein a minimum core-to-core spacing of the fiber cores is different from a minimum spacing between the vertical grating couplers along the main surface of the photonic module.

Embodiment 123: The system of any of embodiments 107 to 117 in which the photonic module comprises a plurality of vertical-coupling elements disposed along a main surface of the photonic module; and wherein the system comprises a fiber-optic connector connected between one or more optical fibers and the photonic module to communicate light between the one or more optical fibers and the photonic module, wherein the one or more optical fibers have a plurality of fiber cores;

wherein the fiber-optic connector comprises a polarization beam splitter and a patterned birefringent plate;

wherein the polarization beam splitter is configured to split an incident light beam from a corresponding fiber core into a first beam having a first polarization and a second beam having a second polarization different from the first polarization;

wherein the patterned birefringent plate comprises a first region and a second region, the first region has a first optical birefringence, the second region has a second optical birefringence that is different from the first optical birefringence, the first region is produced by applying localized heating to a portion of a birefringent plate to reduce the birefringence at the first region, the second region is not subject to the localized heating and retains its original birefringence;

wherein the polarization beam splitter is configured to direct the first beam towards the first region and direct the second beam towards the second region;

wherein the first region is configured to rotate the polarization of the first beam by a first amount, the second region is configured to rotate the polarization of the second beam by a second amount that is different from the first amount, the first and second amounts are selected to cause the first and second beams to have substantially parallel polarization after passing the patterned birefringent plate.

Embodiment 124: The system of any of embodiments 107 to 117 in which the photonic module comprises a plurality of vertical-coupling elements disposed along a main surface of the photonic module;

wherein the system comprises a first connector part that is part of a fiber-optic connector configured to be connected between one or more optical fibers having a plurality of fiber cores and the photonic module, wherein the fiber-optic connector comprises a polarization beam splitter, and the first connector part comprises a patterned birefringent plate;

wherein the polarization beam splitter is configured to split an incident light beam from a corresponding fiber core into a first beam having a first polarization and a second beam having a second polarization different from the first polarization;

wherein the patterned birefringent plate comprises non-uniform birefringence produced by applying localized heating to the birefringent plate to cause one or more regions of the birefringent plate to have reduced birefringence as compared to one or more other regions of the birefringent plate, resulting in at least one lower-birefringence region and at least one higher-birefringence region in the patterned birefringent plate;

wherein the polarization beam splitter is configured to direct the first beam towards a lower-birefringence region in the patterned birefringent plate and direct the second beam towards a higher-birefringence region in the patterned birefringent plate;

wherein the lower-birefringent region is configured to rotate the polarization of the first beam by a first amount, the higher-birefringent region is configured to rotate the polarization of the second beam by a second amount that is different from the first amount, the first and second amounts are selected to cause the first and second beams to have substantially parallel polarization after passing the patterned birefringent plate.

Embodiment 125: The system of any of embodiments 107 to 117 in which the photonic module comprises a plurality of vertical-coupling elements disposed along a main surface of the photonic module;

wherein the system comprises a fiber-optic connector comprising a patterned birefringent plate, in which the fiber-optic connector is configured to be connected between one or more optical fibers having a plurality of fiber cores and the photonic module;

wherein the patterned birefringent plate comprises non-uniform birefringence produced by applying localized heating to the birefringent plate to cause one or more regions of the birefringent plate to have reduced birefringence as compared to one or more other regions of the birefringent plate, resulting in at least one lower-birefringence region and at least one higher-birefringence region in the patterned birefringent plate;

wherein the lower-birefringence region is configured to rotate the polarization of a first light beam by a first amount, the higher-birefringence region is configured to rotate the polarization of a second light beam by a second amount that is different from the first amount, the first and second light beams are transmitted between one or more of the plurality of fiber cores and one or more of the vertical-coupling elements.

Embodiment 126: The system of any of embodiments 107 to 117 in which the photonic module comprises a plurality of vertical-coupling elements;

wherein the system comprises a fiber-optic connector configured to optically couple a plurality of optical fibers to the plurality of vertical coupling elements on the photonic module, in which the fiber-optic connector comprises:

a patterned birefringent plate comprising a plurality of first regions and a plurality of second regions, the first regions comprising a material having birefringence that is different from the birefringence of the material of the second regions, the first and second regions form an integrated piece of optical element;

wherein the fiber-optic connector is configured to enable light beams to be transmitted between the plurality of optical fibers and the plurality of vertical coupling elements, and the patterned birefringent plate is configured to modify an optical property of a selected portion of light that passes through the patterned birefringent plate.

Embodiment 127: The system of any of embodiments 107 to 117 in which the photonic module comprises a plurality of vertical-coupling elements;

wherein the system comprises a fiber-optic connector configured to optically couple a plurality of optical fibers to the plurality of vertical coupling elements on the photonic module, in which the fiber-optic connector comprises a patterned birefringent plate comprising non-uniform birefringence produced by chemical etching one or more portions of a birefringent plate to cause the patterned birefringent plate to have one or more first regions of birefringent material having a first thickness and one or more second regions of birefringent material having a second thickness that is different from the first thickness;

wherein the fiber-optic connector is configured to enable light beams to be transmitted between the plurality of optical fibers and the plurality of vertical coupling elements, and the patterned birefringent plate is configured to modify an optical property of a selected portion of light that passes through the patterned birefringent plate.

Embodiment 128: The system of any of embodiments 107 to 117 in which the photonic module comprises a plurality of vertical-coupling elements;

wherein the system comprises a fiber-optic connector configured to optically couple a plurality of optical fibers to the plurality of vertical coupling elements on the photonic module, in which the fiber-optic connector comprises a patterned birefringent plate comprising an optically birefringent material, the birefringent plate having a plurality of first regions that have birefringence that is different from the birefringence of second regions, the first regions are formed by localized heating or localized energizing that modifies the birefringence of the first regions, and the second regions are not subject to the localized heating or localized energizing;

wherein the fiber-optic connector is configured to enable light beams to be transmitted between the plurality of optical fibers and the plurality of vertical coupling elements, and the patterned birefringent plate is configured to modify an optical property of a first set of the light beams relative to the optical property of a second set of the light beams.

Embodiment 129: The system of any of embodiments 107 to 117 in which the photonic module comprises a plurality of vertical-coupling elements;

wherein the system comprises a fiber-optic connector configured to optically couple a plurality of optical fibers to the plurality of vertical coupling elements on the photonic module, in which the fiber-optic connector comprises a volume of birefringent material, one or more portions of the volume of birefringent material has or have modified birefringence compared to other portions of the volume of birefringent material, and light beams transmitted between the plurality of optical fibers and the plurality of vertical coupling elements pass through the volume of birefringent material;

wherein the volume of birefringent material is configured to modify a polarization state of a first set of the light beams relative to a second set of the light beams such that the polarization state of the first set of the light beams relative to the second set of the light beams changes after the first and second sets of light beams pass through the volume of birefringent material.

Embodiment 130: The system of any of embodiments 33 to 47 or 85 to 113 in which the common substrate comprises a silicon interposer.

Embodiment 131: The system of any of embodiments 33 to 47 or 85 to 113 in which the common substrate comprises redistribution layers.

Embodiment 132: The system of embodiment 131, comprising a semiconductor package comprising the redistribution layers, the first chiplet, the second chiplet, the electronic amplification module, the converter module, wherein the semiconductor package comprises molding compound that covers at least a portion of side surfaces of the first chiplet, at least a portion of side surfaces of the second chiplet, and at least a portion of a surface of the redistribution layers, wherein the molding compound is configured to enhance a structural stability of the semiconductor package.

Embodiment 133: The system of embodiment 131 or 132 in which the redistribution layers comprise alternating electrically conductive layers and electrical insulation layers, each conductive layer is disposed between two insulation layers, each conductive layer has a thickness in a range from 1 μm to 50 μm, and each insulation layer has a thickness in a range from 1 μm to 300 μm.

Embodiment 134: The system of embodiment 133 in which each conductive layer has a thickness in a range from 1 μm to 20 μm, and each insulation layer has a thickness in a range from 2 μm to 100 μm.

Embodiment 135: The system of embodiment 134 in which each conductive layer has a thickness in a range from 1 μm to 10 μm, and each insulation layer has a thickness in a range from 5 μm to 20 μm.

Embodiment 136: The system of any of embodiments 132 to 135 in which the molding compound is configured to expose top surfaces of the first chiplet and the second chiplet to improve thermal dissipation for the first chiplet and enable the second chiplet to obtain access to an external optical fiber.

Embodiment 137: The system of any of embodiments 33 to 47 or 85 to 113 in which the common substrate comprises a fine-pitched silicon interposer embedded in a coarse-pitched substrate, the fine-pitched silicon interposer comprises a set of fine-pitched bump contacts and/or lanes, the coarse-pitched substrate comprises a set of coarse-pitched bump contacts and/or lanes, the set of fine-pitched bump contacts and/or lanes have a first minimum spacing, the set of coarse-pitched bump contacts and/or lanes have a second minimum spacing that is greater than the first minimum spacing.

Embodiment 138: The system of embodiment 137 in which the coarse-pitched bump contacts has a pitch that is at least three times the pitch of the fine-pitched bump contacts.

Embodiment 139: The system of embodiment 137 in which the coarse-pitched bump contacts has a first pitch, the fine-pitched bump contacts has a second pitch, and the first pitch is at least twice the second pitch.

Embodiment 140: The system of embodiment 137 in which the coarse-pitched substrate comprises at least one of a ceramic substrate or an organic high density build-up substrate.

Embodiment 141: The system of any of embodiments 1 to 72 in which the photonic module comprises an optically active layer that comprises active photonic components, the photonic module has an optically active side and a back side, at least some of the active photonic components are closer to the optically active side than the back side;

wherein the photonic module comprises a plurality of front-side illuminated couplers, each front-side illuminated coupler is configured to receive a light beam incident on the front side of the photonic module or emit a light beam that exits the front side of the photonic module.

Embodiment 142: The system of embodiment 141 in which the front-side illuminated couplers are arranged in a two-dimensional configuration.

Embodiment 143: The system of embodiment 141 in which the front-side illuminated couplers are arranged in a one-dimensional configuration.

Embodiment 144: The system of embodiment 141, comprising a common substrate, in which the first chiplet is mounted on the common substrate.

Embodiment 145: The system of embodiment 144, comprising a fourth chiplet comprising the electronic amplification module, wherein the second chiplet is mounted on the fourth chiplet, and the fourth chiplet is mounted on the common substrate, wherein the photonic module is oriented such that the back side of the photonic module faces towards the electronic amplification module.

Embodiment 146: The system of embodiment 145 in which the second chiplet has a second side that faces towards the fourth chiplet, wherein the second chiplet comprises conductive vias that extend from the optically active layer to the second side of the second chiplet.

Embodiment 147: The system of embodiment 145 in which the fourth chiplet has a first side facing towards the second chiplet and a second side facing towards the common substrate, wherein the electronic amplification module comprises an electrically active layer that is positioned closer to the first side of the fourth chiplet than the second side of the fourth chiplet, wherein the fourth chiplet comprises conductive vias that extend from the electrically active layer to the second side of the fourth chiplet.

Embodiment 148: The system of embodiment 145 in which the fourth chiplet has a first side facing towards the second chiplet and a second side facing towards the common substrate, wherein the electronic amplification module comprises an electrically active layer that is positioned closer to the second side of the fourth chiplet than the first side of the fourth chiplet, wherein the fourth chiplet comprises conductive vias that extend from the active electronic layer to the first side of the fourth chiplet.

Embodiment 149: The system of embodiment 144, comprising:

a fourth chiplet comprising the electronic amplification module, and a third chiplet comprising the converter module, wherein the second chiplet is mounted on the fourth chiplet, the fourth chiplet is mounted on the third chiplet, and the third chiplet is mounted on the common substrate, in which the photonic module is mounted on the electronic amplification module with the backside of the photonic module facing towards the electronic amplification module.

Embodiment 150: The system of embodiment 144, comprising a fourth chiplet comprising the electronic amplification module, wherein the second chiplet is mounted on the common substrate, and the fourth chiplet is mounted on the common substrate, in which the photonic module is oriented such that the backside of the photonic module faces towards the common substrate.

Embodiment 151: The system of embodiment 150, comprising a third chiplet comprising the converter module, wherein the third chiplet is mounted on the common substrate.

Embodiment 152: The system of embodiment 144 in which the second chiplet comprises the electronic amplification module, wherein the photonic module and the electronic amplification module are formed on a monolithic semiconductor die, wherein the second chiplet is mounted on the common substrate, and the photonic module is oriented such that the backside of the photonic module faces towards the common substrate.

Embodiment 153: The system of embodiment 152, comprising a third chiplet comprising the converter module, wherein the third chiplet is mounted on the common substrate.

Embodiment 154: The system of embodiment 152, comprising a third chiplet comprising the converter module, wherein the second chiplet is mounted on the third chiplet, and the third chiplet is mounted on the common substrate.

Embodiment 155: The system of embodiment 152 in which the second chiplet comprises the converter module, wherein the photonic module, the electronic amplification module, and the converter module are formed on the monolithic semiconductor die.

Embodiment 156: The system of embodiment 144 in which the second chiplet comprises a second substrate comprising through vias (TVs), the photonic module is mounted on the second substrate, the second substrate is mounted on the common substrate, and the optical active layer of the photonic module is electrically coupled to the common substrate using the through vias in the second substrate.

Embodiment 157: The system of embodiment 156 in which the second chiplet comprises the electronic amplification module, the electronic amplification module is mounted on the second substrate, and the electrically active components of the electronic amplification module are electrically coupled to the common substrate using the through vias in the second substrate.

Embodiment 158: The system of embodiment 157 in which the second chiplet comprises the converter module, the converter module is mounted on the second substrate, and the converter module is electrically coupled to the common substrate using the through vias in the second substrate.

Embodiment 159: The system of embodiment 157, comprising a third chiplet comprising the converter module, in which the third chiplet module is mounted on the common substrate.

Embodiment 160: The system of embodiment 144, comprising a third chiplet comprising the converter module, the electronic amplification module, and a second substrate comprising through vias (TVs), wherein the converter module and the electronic amplification module are mounted on the second substrate, and the second substrate is mounted on the common substrate, wherein the converter module and the electronic amplification module are electrically coupled to the common substrate using the through vias in the second substrate, wherein the second chiplet is mounted on the common substrate, and the photonic module is oriented such that the backside of the photonic module faces towards the common substrate.

Embodiment 161: The system of any of embodiments 156 to 160 in which the second substrate comprises a silicon substrate comprising through-silicon vias.

Embodiment 162: The system of embodiment 144, comprising:

a fourth chiplet comprising the electronic amplification module, a fifth chiplet comprising through vias (TSVs), wherein the second chiplet and the fifth chiplet are mounted on the common substrate, and the fourth chiplet is mounted partly on the second chiplet and partly on the fifth chiplet;

wherein the electronic amplification module is electrically coupled to the common substrate using the through vias of the fifth chiplet.

Embodiment 163: The system of embodiment 162 in which the fifth chiplet comprises a silicon chiplet comprising through silicon vias.

Embodiment 164: The system of embodiment 162 or 163 in which the photonic module is oriented such that a back side of the photonic module faces towards the common substrate.

Embodiment 165: The system of embodiment 162 or 163 in which the photonic module is oriented such that an optically active side of the photonic module faces towards the common substrate.

Embodiment 166: The system of embodiment 162, comprising a third chiplet comprising the converter module, wherein the third chiplet is mounted on the common substrate.

Embodiment 167: The system of embodiment 144, comprising:

a third chiplet comprising the converter module;

a fourth chiplet comprising the electronic amplification module, a fifth chiplet comprising through vias (TVs), wherein the second chiplet is mounted on the common substrate, wherein the fifth chiplet is mounted on the common substrate, wherein the third chiplet is mounted on the fifth chiplet, and the converter module is electrically coupled to the common substrate using the through vias of the fifth chiplet, wherein the fourth chiplet is mounted partly on the second chiplet and partly on the fifth chiplet, wherein the electronic amplification module is electrically coupled to the common substrate using the through vias of the fifth chiplet.

Embodiment 168: The system of embodiment 167 in which the fifth chiplet comprises a silicon chiplet comprising through silicon vias.

Embodiment 169: The system of embodiment 167 or 168 in which the photonic module is oriented such that a back side of the photonic module faces towards the common substrate.

Embodiment 170: The system of embodiment 167 or 168 in which the photonic module is oriented such that an optically active side of the photonic module faces towards the common substrate.

Embodiment 171: The system of embodiment 144, comprising:

a third chiplet comprising the converter module and the electronic amplification module, wherein the converter module and the electronic amplification module are formed on a monolithic semiconductor die, a fifth chiplet comprising through vias (TVs), wherein the second chiplet and the fifth chiplet are mounted on the common substrate, the third chiplet is mounted partly on the second chiplet and partly on the fifth chiplet, wherein the third chiplet is electrically coupled to the common substrate using the through vias of the fifth chiplet.

Embodiment 172: The system of embodiment 171 in which the fifth chiplet comprises a silicon chiplet comprising through silicon vias.

Embodiment 173: The system of embodiment 171 or 172 in which the photonic module is oriented such that a back side of the photonic module faces towards the common substrate.

Embodiment 174: The system of embodiment 171 or 172 in which the photonic module is oriented such that an optically active side of the photonic module faces towards the common substrate.

Embodiment 175: The system of embodiment 144, comprising:

a third chiplet comprising the converter module, a fifth chiplet comprising through vias (TVs), wherein the second chiplet comprises the electronic amplification module, wherein the photonic module and the electronic amplification module are formed on a monolithic semiconductor die, wherein the second chiplet and the fifth chiplet are mounted on the common substrate, wherein the third chiplet is mounted partly on the fifth chiplet and partly on the second chiplet, in which the converter module is electrically coupled to the common substrate using the through vias of the fifth chiplet.

Embodiment 176: The system of embodiment 175 in which the fifth chiplet comprises a silicon chiplet comprising through silicon vias.

Embodiment 177: The system of embodiment 175 or 176 in which the photonic module is oriented such that a back side of the photonic module faces towards the common substrate.

Embodiment 178: The system of embodiment 175 or 176 in which the photonic module is oriented such that an optically active side of the photonic module faces towards the common substrate.

Embodiment 179: The system of any of embodiments 141 to 171, comprising a fiber array connector attached to the optically active side of the photonic module, in which the fiber array connector is configured to be coupled to a fiber optic cable comprising multiple fiber cores.

Embodiment 180: The system of embodiment 179 in which the multiple fiber cores are arranged in a two-dimensional configuration.

Embodiment 181: The system of embodiment 179 or 180 in which the photonic module comprises optical couplers arranged in a two-dimensional configuration.

Embodiment 182: The system of embodiment 179 or 180 in which the photonic module comprises optical couplers arranged in a one-dimensional configuration;

wherein the fiber array connector comprises optical components to perform at least one of (i) transform light beams emitted from the two-dimensional configuration of fiber cores into a one-dimensional arrangement of light beams that are directed toward the one-dimensional configuration of optical couplers, or (ii) transform light beams emitted from the one-dimensional configuration of optical couplers into a two-dimensional arrangement of light beams that are directed toward the two-dimensional configuration of fiber cores.

Embodiment 183: The system of embodiment 179 in which the multiple fiber cores are arranged in a one-dimensional configuration.

Embodiment 184: The system of embodiment 179 or 183 in which the photonic module comprises optical couplers arranged in a one-dimensional configuration.

Embodiment 185: The system of embodiment 179 or 183 in which the photonic module comprises optical couplers arranged in a two-dimensional configuration;

wherein the fiber array connector comprises optical components to perform at least one of (i) transform light beams emitted from the one-dimensional configuration of fiber cores into a two-dimensional arrangement of light beams that are directed toward the two-dimensional configuration of optical couplers, or (ii) transform light beams emitted from the two-dimensional configuration of optical couplers into a one-dimensional arrangement of light beams that are directed toward the one-dimensional configuration of fiber cores.

Embodiment 186: The system of any of embodiments 144 to 179 in which the common substrate comprises a silicon interposer.

Embodiment 187: The system of any of embodiments 144 to 179 in which the common substrate comprises a redistribution layer.

Embodiment 188: The system of embodiment 187, comprising a semiconductor package comprising the redistribution layer, the first chiplet, the second chiplet, the electronic amplification module, and the converter module, wherein the semiconductor package comprises molding compound that covers at least a portion of side surfaces of the first chiplet, at least a portion of side surfaces of the second chiplet, and at least a portion of a surface of the redistribution layer not covered by the first and second chiplets, wherein the molding compound is configured to enhance a structural stability of the semiconductor package.

Embodiment 189: The system of embodiment 188 in which the molding compound is configured to expose top surfaces of the first chiplet and the second chiplet to improve thermal dissipation for the first chiplet and enable the second chiplet to obtain access to an external optical fiber.

Embodiment 190: The system of any of embodiments 144 to 179 in which the common substrate comprises a fine-pitched silicon interposer embedded in a coarse-pitched substrate, the fine-pitched silicon interposer comprises a set of fine-pitched bump contacts and/or lanes, the coarse-pitched substrate comprises a set of coarse-pitched bump contacts and/or lanes, the set of fine-pitched bump contacts and/or lanes have a first minimum spacing, the set of coarse-pitched bump contacts and/or lanes have a second minimum spacing that is greater than the first minimum spacing.

Embodiment 191: The system of embodiment 190 in which the coarse-pitched substrate comprises at least one of a ceramic substrate or an organic high density build-up substrate.

Embodiment 192: The system of embodiment 144, comprising a fourth chiplet comprising the electronic amplification module, wherein the second chiplet is mounted on the common substrate, and the photonic module is oriented such that the backside of the photonic module faces towards the common substrate, wherein the fourth chiplet is mounted on the second chiplet without covering the front-side illuminated couplers of the photonic module.

Embodiment 193: The system of embodiment 192 in which the second chiplet comprises conductive vias that electrically couple the fourth chiplet to the backside of the photonic module.

Embodiment 194: The system of embodiment 144, comprising:

a fourth chiplet comprising the electronic amplification module, and a third chiplet comprising the converter module, wherein the third chiplet is mounted on the common substrate, wherein the second chiplet is mounted on the third chiplet, and the photonic module is oriented such that the back side of the photonic module faces towards the third chiplet, wherein the fourth chiplet is mounted on the second chiplet without covering the front-side illuminated couplers of the photonic module.

Embodiment 195: The system of any of embodiments 192 to 194, comprising a fiber array connector attached to the optically active side of the photonic module, in which the fiber array connector is configured to be coupled to a fiber optic cable comprising multiple fiber cores.

Embodiment 196: The system of embodiment 195 in which the multiple fiber cores are arranged in a two-dimensional configuration.

Embodiment 197: The system of embodiment 195 or 196 in which the photonic module comprises optical couplers arranged in a two-dimensional configuration.

Embodiment 198: The system of embodiment 195 or 196 in which the photonic module comprises optical couplers arranged in a one-dimensional configuration;

wherein the fiber array connector comprises optical components configured to perform at least one of (i) transform light beams emitted from the two-dimensional configuration of fiber cores into a one-dimensional arrangement of light beams that are directed toward the one-dimensional configuration of optical couplers, or (ii) transform light beams emitted from the one-dimensional configuration of optical couplers into a two-dimensional arrangement of light beams that are directed toward the two-dimensional configuration of fiber cores.

Embodiment 199: The system of embodiment 195 in which the multiple fiber cores are arranged in a one-dimensional configuration.

Embodiment 200: The system of embodiment 195 or 199 in which the photonic module comprises optical couplers arranged in a one-dimensional configuration.

Embodiment 201: The system of embodiment 195 or 199 in which the photonic module comprises optical couplers arranged in a two-dimensional configuration;

wherein the fiber array connector comprises optical components to perform at least one of (i) transform light beams emitted from the one-dimensional configuration of fiber cores into a two-dimensional arrangement of light beams that are directed toward the two-dimensional configuration of optical couplers, or (ii) transform light beams emitted from the two-dimensional configuration of optical couplers into a one-dimensional arrangement of light beams that are directed toward the one-dimensional configuration of fiber cores.

Embodiment 202: The system of any of embodiments 192 to 195 in which the common substrate comprises a silicon interposer.

Embodiment 203: The system of any of embodiments 192 to 195 in which the common substrate comprises a redistribution layer.

Embodiment 204: The system of embodiment 203, comprising a semiconductor package comprising the redistribution layer, the first chiplet, the second chiplet, the fourth chiplet, and the converter module, wherein the semiconductor package comprises molding compound that covers at least a portion of side surfaces of the first chiplet, at least a portion of side surfaces of the second chiplet, at least a portion of side surfaces of the fourth chiplet, and at least a portion of a surface of the redistribution layer not covered by the first and second chiplets, wherein the molding compound is configured to enhance a structural stability of the semiconductor package.

Embodiment 205: The system of embodiment 204 in which the molding compound is configured to expose top surfaces of the first chiplet and the fourth chiplet to improve thermal dissipation for the first chiplet and the fourth chiplet.

Embodiment 206: The system of embodiment 204 or 205 in which the molding compound defines an opening to expose a portion of the optically active side of the photonic module.

Embodiment 207: The system of any of embodiments 192 to 195 in which the common substrate comprises a fine-pitched silicon interposer embedded in a coarse-pitched substrate, the fine-pitched silicon interposer comprises a set of fine-pitched bump contacts and/or lanes, the coarse-pitched substrate comprises a set of coarse-pitched bump contacts and/or lanes, the set of fine-pitched bump contacts and/or lanes have a first minimum spacing, the set of coarse-pitched bump contacts and/or lanes have a second minimum spacing that is greater than the first minimum spacing.

Embodiment 208: The system of embodiment 207 in which the coarse-pitched substrate comprises at least one of a ceramic substrate or an organic high density build-up substrate.

Embodiment 209: The system of embodiment 144 in which the common substrate defines a cavity, the cavity has a bottom wall and a top opening, the second chiplet is disposed in the cavity.

Embodiment 210: The system of embodiment 209 in which a back side of the photonic module faces towards the bottom wall of the cavity.

Embodiment 211: The system of embodiment 209 in which an optically active side of the photonic module faces towards the bottom wall of the cavity;

wherein the photonic module comprises conducting vias that electrically couple an optically active layer to a back side of the photonic module.

Embodiment 212: The system of any of embodiments 209 to 211 in which a depth of the cavity and a thickness of the second chiplet are selected such that a top surface of the second chiplet is at a substantially same level as a top surface of the common substrate.

Embodiment 213: The system of embodiment 212, comprising a fourth chiplet comprising the electronic amplification module, wherein the fourth chiplet is partly mounted on the common substrate and partly mounted on the second chiplet.

Embodiment 214: The system of embodiment 213 in which the fourth chiplet comprises the converter module.

Embodiment 215: The system of any of embodiments 209 to 213 in which the common substrate defines an overflow well adjacent to the cavity, wherein the second chiplet is secured to the bottom wall of the cavity by an adhesive, and the overflow well allows the adhesive to overflow without damaging an optically active surface of the photonic module.

Embodiment 216: The system of embodiment 215 in which the adhesive comprises an epoxy.

Embodiment 217: The system of embodiment 144, comprising a fourth chiplet comprising the electronic amplification module, wherein the common substrate defines a through-hole, the fourth chiplet is partly mounted on the substrate, and a first portion of the fourth chiplet overhangs the through-hole, wherein the second chiplet is disposed in the through-hole, wherein a first portion of the electronic amplification module overhanging the through-hole is electrically connected to the optically active layer of the photonic module.

Embodiment 218: The system of embodiment 217 in which the second chiplet is oriented such that at least a portion of the optically active side of the photonic module faces towards the electronic amplification module.

Embodiment 219: The system of embodiment 217 in which the second chiplet is oriented such that the optically active side of the photonic module faces in a direction towards the common substrate, and at least a portion of a back side of the photonic module faces towards the electronic amplification module;

wherein the second chiplet comprises conductive vias that electrically couple the optically active layer to the back side of the photonic module.

Embodiment 220: The system of embodiment 144, comprising a fourth chiplet comprising the electronic amplification module, wherein the common substrate defines a partial through-hole having a first portion that extends partly through the common substrate and a second portion that extend completely through the common substrate and defines an opening, wherein the second chiplet is disposed in the partial through-hole, the second chiplet is oriented such that the optically active side of the photonic module faces upwards, a first portion of the optically active side of the second chiplet is covered by a thinned portion of the common substrate, and a second portion of the optically active side of the second chiplet is exposed by the opening of the partial through-hole, wherein a first portion of the electronic amplification module is electrically coupled to the first portion of the optically active layer of the photonic module using conductive vias through the thinned portion of the common substrate, wherein the couplers are positioned near the second portion of the optically active side of the second chiplet and configured to at least one of receive incoming light, or transmit outgoing light, that pass through the opening in the partial through-hole.

Embodiment 221: The system of embodiment 144, comprising a fourth chiplet comprising the electronic amplification module, wherein the common substrate defines a partial through-hole having a first portion that extends partly through the common substrate and a second portion that extend completely through the common substrate and defines an opening, wherein the second chiplet is disposed in the partial through-hole, the second chiplet is oriented such that the optically active side of the photonic module faces downwards, a first portion of the back side of the second chiplet is covered by a thinned portion of the common substrate, and a second portion of the back side of the second chiplet is exposed by the opening of the partial through-hole, wherein a first portion of the electronic amplification module is electrically coupled to the first portion of the back side of the photonic module using conductive vias through the thinned portion of the common substrate, wherein the couplers comprise back-side illuminated couplers and configured to at least one of receive light or transmit light that passes through the opening in the partial through-hole.

Embodiment 222: The system of any of embodiments 74 to 221 in which the couplers comprise grating couplers.

Embodiment 223: The system of any of embodiments 1 to 72, 85 to 109, and 130 to 140 in which the photonic module comprises a one-dimensional array of optical couplers configured to receive light from or transmit light to a one-dimensional array of optical fibers or optical fiber cores.

Embodiment 224: The system of any of embodiments 1 to 72, 85 to 109, and 130 to 140 in which the photonic module is configured to be edge coupled to at least one optical fiber.

Embodiment 225: The system of any of embodiments 1 to 72, 85 to 109, and 130 to 140 in which the photonic module is configured to at least one of receive or transmit wavelength division multiplexed optical signals through at least one optical fiber.

Embodiment 226: The system of any of embodiments 1 to 225, comprising a rackmount server comprising a chiplet package comprising the first chiplet, second chiplet, the electronic amplification module, and the converter module.

Embodiment 227: The system of embodiment 226 in which the rackmount server comprises at least one of a rackmount switch, a rackmount computer server, or a rackmount storage server.

Embodiment 228: The system of any of embodiments 1 to 225, comprising a vehicle comprising a chiplet package comprising the first chiplet, second chiplet, the electronic amplification module, and the converter module.

Embodiment 229: The system of embodiment 228 in which the vehicle comprises at least one of a car, a truck, a train, a boat, a ship, a submarine, a helicopter, a drone, an airplane, a space rover, or a space ship.

Embodiment 230: The system of any of embodiments 1 to 225, comprising a robot comprising a chiplet package comprising the first chiplet, second chiplet, the electronic amplification module, and the converter module.

Embodiment 231: The system of embodiment 230 in which the robot comprises at least one of an industrial robot, a helper robot, a medical surgery robot, a merchandise delivery robot, a teaching robot, a cleaning robot, a cooking robot, a construction robot, or an entertainment robot.

Embodiment 232: The system of any of embodiments 1 to 225, comprising a supercomputer comprising a chiplet package comprising the first chiplet, second chiplet, the electronic amplification module, and the converter module.

Embodiment 233: The system of embodiment 226, 227, or 232 in which the system is configured to construct and/or support a simulated environment for training autonomous vehicles.

Embodiment 234: The system of any of embodiments 1 to 233 in which the first chiplet comprises an integrated circuit or a system on a chip (SoC) that includes at least one million transistors.

Embodiment 235: The system of embodiment 234 in which the first chiplet comprises at least one billion transistors.

Embodiment 236: The system of any of embodiments 113 to 140 in which the fiber array connector comprises a first optical connector part that is configured to be removably coupled to a second optical connector part that is attached to the fiber optic cable.

Embodiment 237: The system of embodiment 236 in which the fiber optic cable comprises at least 10 cores of optical fibers, and the first optical connector part is configured to couple at least 10 channels of optical signals to the photonic module.

Embodiment 238: The system of embodiment 237 in which the fiber optic cable comprises at least 100 cores of optical fibers, and the first optical connector part is configured to couple at least 100 channels of optical signals to the photonic module.

Embodiment 239: The system of embodiment 238 in which the fiber optic cable comprises at least 500 cores of optical fibers, and the first optical connector part is configured to couple at least 500 channels of optical signals to the photonic module.

Embodiment 240: The system of embodiment 237 in which the fiber optic cable comprises at least 1000 cores of optical fibers, and the first optical connector part is configured to couple at least 1000 channels of optical signals to the photonic module.

Embodiment 241: The system of any of embodiments 1 to 60 in which the photonic module is configured to generate a plurality of first serial electrical signals based on received first optical signals;

wherein the converter module comprises:

a first serializers/deserializers module comprising multiple serializer units and deserializer units, the first serializers/deserializers module is configured to generate a plurality of sets of first parallel electrical signals based on the plurality of first serial electrical signals, and condition the electrical signals, and each set of first parallel electrical signals is generated based on a corresponding first serial electrical signal; and a second serializers/deserializers module comprising multiple serializer units and deserializer units, in which the second serializers/deserializers module is configured to generate a plurality of second serial electrical signals based on the plurality of sets of first parallel electrical signals, and each second serial electrical signal is generated based on a corresponding set of first parallel electrical signals.

Embodiment 242: A system comprising:

a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

wherein the photonic module comprises an optically active layer that comprises active photonic components, the photonic module has an optically active side and a backside, at least some of the active photonic components are closer to the optically active side than the backside;

wherein the photonic module comprises back-side illuminated couplers arranged in a two-dimensional configuration, each back-side illuminated coupler is configured to receive a light beam incident on the back side of the photonic module or emit a light beam that exits the back side of the photonic module;

wherein the photonic module comprises a first substrate and a first layer formed on the first substrate, the first substrate comprises a first material having a first refractive index, the first layer comprises a second material having a second refractive index that is smaller than the first refractive index, wherein the first substrate comprises a first side and a second side, the first side of the first substrate faces towards the first layer, the second side of the first substrate forms or faces towards the backside of the photonic module, wherein the first layer is disposed between the first substrate and the optically active layer of the photonic module, wherein the first substrate defines at least one opening that extends from the first side of the first substrate to the second side of the first substrate, and the at least one opening is associated with at least one of the back-side illuminated couplers.

Embodiment 243: The system of embodiment 242 in which the at least one opening is configured to enable one or more light beams directed toward the backside of the photonic module to pass through the one or more openings and the first layer to reach at least one of the back-side illuminated couplers.

Embodiment 244: The system of embodiment 242 or 243 in which the at least one opening is configured to enable one or more light beams emitted from at least one of the back-side illuminated couplers to pass through the first layer and the one or more openings to reach an external optical link.

Embodiment 245: The system of any of embodiments 242 to 244 in which the one or more openings in the first substrate expose one or more regions of a surface of the first layer, and a first antireflective coating is provided on the exposed one or more regions of the surface of the first layer.

Embodiment 246: The system of embodiment 245 in which the antireflective coating is configured to reduce reflection of light having a wavelength in a predetermined range to at most 5%.

Embodiment 247: The system of any of embodiments 242 to 246 in which a second antireflective coating is provided on the second side of the first substrate.

Embodiment 248: The system of any of embodiments 242 to 247 in which the first substrate has a first refractive index greater than 3.7, and the first layer has a second refractive index less than 3.1 for light having a wavelength in a range from 1250 nm to 1620 nm.

Embodiment 249: The system of embodiment 248 in which the first substrate comprises a silicon substrate and the first layer comprises a buried oxide silica layer.

Embodiment 250: The system of any of embodiments 242 to 249 in which the first substrate has a thickness in a range from 100 μm to 500 μm, and the first layer has a thickness in a range from 0.5 μm to 10 μm.

Embodiment 251: The system of embodiment 250 in which the first layer has a thickness in a range from 1 μm to 5 μm.

Embodiment 252: The system of any of embodiments 242 to 251 in which each of the one or more openings has a diameter in a range from 10 μm to 100 μm.

Embodiment 253: The system of any of embodiments 242 to 252 in which the photonic module comprises a layer on the backside of the photonic module that includes microlenses configured to focus incoming light traveling in an optical paths toward the back-side illuminated couplers, or to collimate outgoing light traveling in optical paths away from the back-side illuminated couplers.

Embodiment 254: The system of any of embodiments 242 to 253, comprising a common substrate, in which a first chiplet is mounted on the common substrate;

wherein the first chiplet comprises a data processing module comprising at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device;

a second chiplet comprising the photonic module;

wherein the photonic module is configured to perform at least one of (i) converting an output electrical signal provided by the data processing module to an output optical signal that is provided to an external optical link, or (ii) converting an input optical signals from an external optical link to an input electrical signal that is provided to the data processing module.

Embodiment 255: The system of embodiment 254, comprising a third chiplet comprising an electronic amplification module, wherein the second chiplet is mounted on the third chiplet, and the third chiplet is mounted on the common substrate, in which the photonic module is oriented such that the optically active side of the photonic module faces towards the electronic amplification module.

Embodiment 256: The system of embodiment 255 in which the third chiplet has a first side facing towards the second chiplet and a second side facing towards the common substrate, wherein the electronic amplification module comprises an active electronic layer that is positioned closer to the first side of the third chiplet than the second side of the third chiplet, wherein the third chiplet comprises conductive vias that extend from the active electronic layer to the second side of the third chiplet.

Embodiment 257: A system comprising:

a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification module comprising at least one of a driver amplifier or a transimpedance amplifier, and configured to process electrical signals sent to or from the photonic module; and a converter module configured to convert signals between a first interface and a second interface, in which the converter module communicates with a data processing module using the first interface, and the converter module communicates with the electronic amplification module using the second interface;

wherein the photonic module is mounted on the electronic amplification module, and the electronic amplification module is mounted on the converter module such that the photonic module, the electronic amplification module, and the converter module form a stack.

Embodiment 258: The system of embodiment 257, comprising a common substrate comprising a first set of electrical contacts and a second set of electrical contacts;

wherein the first set of electrical contacts has a first pattern configured to be electrically coupled to a data processing module comprising at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device;

wherein the second set of electrical contacts is electrically connected to the converter module.

Embodiment 259: The system of embodiment 258, comprising a first chiplet comprising the data processing module, in which the first chiplet is mounted on the common substrate.

Embodiment 260: The system of embodiment 258 or 259, comprising:

a second chiplet comprising the photonic module;

a third chiplet comprising the electronic amplification module;

a fourth chiplet comprising the converter module; and wherein the second chiplet is mounted on the third chiplet, and the third chiplet is mounted on the fourth chiplet.

Embodiment 261: A system comprising:

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification module comprising at least one of a driver amplifier or a transimpedance amplifier, and configured to process electrical signals sent to or from the photonic module; and a converter module configured to convert signals between a first interface and a second interface, in which the converter module communicates with a first chiplet using the first interface, and the converter module is configured to communicate with the electronic amplification module using the second interface.

Embodiment 262: The system of embodiment 261, comprising:

a third chiplet comprising the electronic amplification module;

a fourth chiplet comprising the converter module; and wherein the second chiplet, the third chiplet, and the fourth chiplet, are mounted on a silicon carrier having fine-pitch through silicon vias and coarse-pitch through silicon vias;

wherein the second chiplet and the third chiplet are electrically coupled to the coarse-pitch through-silicon vias wherein the fourth chiplet comprises a first set of electrical contacts and a second set of electrical contacts, the first set of electrical contacts is electrically coupled to some of the coarse-pitch through-silicon vias, and the second set of electrical contacts is electrically coupled to some of the fine-pitch through-silicon vias.

Embodiment 263: The system of embodiment 262, comprising a common substrate comprising fine-pitch electrical contacts and coarse-pitch electrical contacts, wherein some of the fine-pitch electrical contacts of the common substrate are electrically coupled to the fine-pitch through silicon vias of the silicon carrier, some of the coarse-pitch electrical contacts of the common substrate are electrically coupled to the coarse-pitch through silicon vias of the silicon carrier.

Embodiment 264: The system of embodiment 263, comprising a first chiplet comprising at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device;

wherein the first chiplet comprises fine-pitch electrical contacts and coarse-pitch electrical contacts, some of the fine-pitch electrical contacts of the common substrate are electrically coupled to the fine-pitch electrical contacts of the first chiplet, some of the coarse-pitch electrical contacts of the common substrate are electrically coupled to the coarse-pitch electrical contacts of the first chiplet.

Embodiment 265: The system of embodiment 263 or 264 in which the fine-pitch electrical contacts have a pitch that is less than half the pitch of the coarse-pitch electrical contacts.

Embodiment 266: The system of any of embodiments 262 to 265 in which the photonic module comprises optical couplers arranged in a two-dimensional configuration, each optical coupler is configured to receive a light beam from an external optical link or emit a light beam that is transmitted to the external optical link.

Embodiment 267: The system of embodiment 266 in which the optical couplers comprise backside illuminated couplers.

Embodiment 268: The system of embodiment 266 in which the optical couplers comprise front-side illuminated couplers.

Embodiment 269: A system comprising:

a photonic chiplet comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters; and an electronic amplification chiplet comprising at least one of a driver amplifier or a transimpedance amplifier, and configured to process electrical signals sent to or from the photonic module;

wherein the photonic chiplet comprises a first substrate and an optically active layer on or in the substrate, the optically active layer comprises active photonic components, the photonic chiplet has an optically active side and a backside, at least some of the active photonic components are closer to the optically active side than the backside;

wherein the photonic chiplet comprises optical couplers arranged in a two-dimensional configuration, each optical coupler is configured to receive a light beam incident on the optically active side of the photonic chiplet or emit a light beam that exits the optically active side of the photonic chiplet;

wherein the first substrate comprises conductive vias that extend from the optically active layer to the backside of the photonic chiplet;

wherein the electronic amplification chiplet comprises a second substrate and an electrically active layer, the electrically active layer comprises active electronic components, the electronic amplification chiplet comprises a first side and a second side, the electrically active layer is closer to the first side than the second side, the second substrate comprises conductive vias that extend from the electrically active layer to the second side of the electronic amplification chiplet.

Embodiment 270: The system of embodiment 269 in which the second substrate comprises a silicon substrate comprising through-silicon vias.

Embodiment 271: A system comprising:

a second chiplet comprising a photonic module and an electronic amplification module, the photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

wherein the electronic amplification module comprises at least one of a driver amplifier or a transimpedance amplifier, and configured to process electrical signals sent to or from the photonic module;

wherein the photonic chiplet comprises optical couplers arranged in a two-dimensional configuration, each optical coupler is configured to receive a light beam from an external optical link or emit a light beam that is transmitted to an external optical link;

a third chiplet comprising a converter module configured to convert signals between a first interface and a second interface, in which the converter module is configured to communicate with a first chiplet using the first interface, and the converter module is configured to communicate with the electronic amplification module using the second interface;

wherein the second chiplet is mounted on the third chiplet.

Embodiment 272: The system of embodiment 271 in which the optical couplers comprise backside illuminated couplers.

Embodiment 273: The system of embodiment 271 in which the optical couplers comprise front-side illuminated couplers.

Embodiment 274: A system comprising:

a photonic chiplet comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters; and an electronic amplification chiplet comprising at least one of a driver amplifier or a transimpedance amplifier, and configured to process electrical signals sent to or from the photonic module;

wherein the photonic chiplet comprises a plurality of optical couplers, each optical coupler is configured to receive input light or emit output light;

wherein the electronic amplification module is mounted on a first portion of the photonic chiplet without covering a second portion of the photonic chiplet to enable the optical couplers to receive the input light or emit the output light.

Embodiment 275: The system of embodiment 274 in which the optical couplers are arranged in a two-dimensional configuration.

Embodiment 276: The system of embodiment 274 in which the optical couplers are arranged in a one-dimensional configuration.

Embodiment 277: The system of any of embodiments 274 to 276 in which the photonic chiplet comprises a first substrate and an optically active layer on or in the first substrate, the optically active layer comprises active photonic components, the photonic chiplet has an optically active side and a back side, at least some of the active photonic components are closer to the optically active side than the back side;

wherein the optical couplers of the photonic chiplet comprise front-side illuminated couplers, each front-side illuminated coupler is configured to receive light incident on the optically active side of the photonic chiplet or emit light that exits the optically active side of the photonic chiplet;

wherein the back side of the photonic chiplet faces a direction towards a common substrate;

wherein the photonic chiplet is directly or indirectly mounted on the common substrate.

Embodiment 278: The system of any of embodiments 274 to 277 in which the first substrate of the photonic chiplet comprises conductive vias that extend from the optically active side to the back side of the photonic chiplet;

wherein the electronic amplification chiplet comprises a first set of electrical contacts and a second set of electrical contacts;

wherein the first set of contacts of the electronic amplification chiplet is electrically coupled to the optically active layer of the photonic chiplet;

wherein the second set of contacts of the electronic amplification chiplet is electrically coupled to the conductive vias of the first substrate of the photonic chiplet;

wherein the electronic amplification chiplet is electrically coupled to a common substrate at least in part through the second set of contacts and the conductive vias of the first substrate of the photonic chiplet;

wherein the photonic chiplet is directly or indirectly mounted on the common substrate.

Embodiment 279: The system of any of embodiments 274 to 276 in which the photonic chiplet comprises a first substrate and an optically active layer on or in the first substrate, the optically active layer comprises active photonic components, the photonic chiplet has an optically active side and a back side, at least some of the active photonic components are closer to the optically active side than the back side;

wherein the optical couplers of the photonic chiplet comprise back-side illuminated couplers, each back-side illuminated coupler is configured to receive light incident on the back side of the photonic chiplet or emit light that exits the back side of the photonic chiplet;

wherein the optically active side of the photonic chiplet faces a direction towards a common substrate;

wherein the photonic chiplet is directly or indirectly mounted on the common substrate.

Embodiment 280: The system of any of embodiments 274 to 276 or 279 in which the photonic chiplet comprises a first set of conductive vias and a second set of conductive vias;

wherein the first set of conductive vias electrically couple the optically active layer of the photonic chiplet to the electronic amplification chiplet;

wherein the electronic amplification chiplet is electrically coupled to a common substrate at least in part through the second set of conductive vias of the photonic chiplet;

wherein the photonic chiplet is directly or indirectly mounted on the common substrate.

Embodiment 281: The system of any of embodiments 274 to 280 in which the photonic chiplet is directly mounted on the common substrate.

Embodiment 282: The system of any of embodiments 274 to 280 in which the photonic chiplet is mounted on a second substrate, and the carrier substrate is mounted on the common substrate.

Embodiment 283: The system of embodiment 282 in which the second substrate comprises a silicon interposer.

Embodiment 284: The system of any of embodiments 274 to 280, comprising a converter chiplet configured to convert signals between a first interface and a second interface, in which the converter module is configured to communicate with a data processing chiplet using the first interface, and the converter module is configured to communicate with the electronic amplification chiplet using the second interface.

Embodiment 285: The system of embodiment 284 in which the converter chiplet is mounted on a common substrate, and the photonic chiplet is mounted on the electronic amplification chiplet.

Embodiment 286: The system of embodiment 285 in which the photonic chiplet is oriented such that at least a portion of the back side of the photonic chiplet faces towards the electronic amplification chiplet, Embodiment 287: The system of embodiment 285 in which the photonic chiplet is oriented such that a back side of the photonic chip faces towards the converter chiplet, Embodiment 288: The system of any of embodiments 274 and 277 to 283, comprising a fiber array connector attached to the photonic chiplet, in which the fiber array connector is configured to be coupled to a fiber optic cable comprising multiple fiber cores.

Embodiment 289: The system of embodiment 288 in which the multiple fiber cores are arranged in a two-dimensional configuration.

Embodiment 290: The system of embodiment 288 or 289 in which the photonic module comprises optical couplers arranged in a two-dimensional configuration.

Embodiment 291: The system of embodiment 288 or 289 in which the photonic module comprises optical couplers arranged in a one-dimensional configuration;

wherein the fiber array connector comprises optical components configured to perform at least one of (i) transform light beams emitted from the two-dimensional configuration of fiber cores into a one-dimensional arrangement of light beams that are directed toward the one-dimensional configuration of optical couplers, or (ii) transform light beams emitted from the one-dimensional configuration of optical couplers into a two-dimensional arrangement of light beams that are directed toward the two-dimensional configuration of fiber cores.

Embodiment 292: The system of embodiment 288 in which the multiple fiber cores are arranged in a one-dimensional configuration.

Embodiment 293: The system of embodiment 288 or 292 in which the photonic module comprises optical couplers arranged in a one-dimensional configuration.

Embodiment 294: The system of embodiment 288 or 292 in which the photonic module comprises optical couplers arranged in a two-dimensional configuration;

wherein the fiber array connector comprises optical components to perform at least one of (i) transform light beams emitted from the one-dimensional configuration of fiber cores into a two-dimensional arrangement of light beams that are directed toward the two-dimensional configuration of optical couplers, or (ii) transform light beams emitted from the two-dimensional configuration of optical couplers into a one-dimensional arrangement of light beams that are directed toward the one-dimensional configuration of fiber cores.

Embodiment 295: A system comprising:

a photonic chiplet comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification chiplet comprising at least one of a driver amplifier or a transimpedance amplifier, and configured to process electrical signals sent to or from the photonic module;

a dummy chiplet having a first side and a second side, the dummy chiplet comprising conductive vias extending from the first side to the second side;

wherein the photonic chiplet comprises a first substrate and an optically active layer on or in the substrate, the optically active layer comprises active photonic components, the photonic chiplet has an optically active side and a backside, at least some of the active photonic components are closer to the optically active side than the backside;

wherein the photonic chiplet comprises optical couplers arranged in a two-dimensional configuration, each optical coupler is configured to receive a light beam incident on the optically active side of the photonic chiplet or emit a light beam that exits the optically active side of the photonic chiplet;

wherein the electronic amplification chiplet comprises a first set of electrical contacts and a second set of electrical contacts;

wherein the optically active layer of the photonic chiplet is electrically coupled to the electronic amplification chiplet through the first set of contacts, and the electronic amplification chiplet is electrically coupled through the second set of contacts to the conductive vias of the dummy chiplet.

Embodiment 296: A system comprising:

a photonic chiplet comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification chiplet comprising at least one of a driver amplifier or a transimpedance amplifier, and configured to process electrical signals sent to or from the photonic module;

a dummy chiplet having a first side and a second side, the dummy chiplet comprising conductive vias extending from the first side to the second side;

wherein the photonic chiplet comprises a first substrate and an optically active layer on or in the substrate, the optically active layer comprises active photonic components, the photonic chiplet has an optically active side and a backside, at least some of the active photonic components are closer to the optically active side than the backside;

wherein the photonic chiplet is edge coupled to one or more optical fibers;

wherein the electronic amplification chiplet comprises a first set of electrical contacts and a second set of electrical contacts;

wherein the optically active layer of the photonic chiplet is electrically coupled to the electronic amplification chiplet through the first set of contacts, and the electronic amplification chiplet is electrically coupled through the second set of contacts to the conductive vias of the dummy chiplet.

Embodiment 297: A system comprising:

a photonic chiplet comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

a dummy chiplet having a first side and a second side, the dummy chiplet comprising conductive vias extending from the first side to the second side;

molding compound that covers at least a portion of the photonic chiplet and at least a portion of the dummy chiplet, in which the photonic chiplet is mechanically coupled to the dummy chiplet through the molding compound;

wherein the photonic chiplet and the dummy chiplet have a same thickness.

Embodiment 298: A system comprising:

a photonic chiplet comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification chiplet comprising at least one of a driver amplifier or a transimpedance amplifier, and configured to process electrical signals sent to or from the photonic module;

a converter chiplet comprising converter circuitry configured to convert signals between a first interface and a second interface, in which the converter circuitry communicates with a first chiplet using the first interface, and the converter circuitry communicates with the electronic amplification chiplet using the second interface;

wherein the electronic amplification chiplet comprises a first side and a second side, a first portion of the second side faces towards the optically active side of the photonic chiplet, and a second portion of the second side faces towards the converter chiplet;

wherein the converter chiplet comprises a first side and a second side, the converter circuitry is closer to the first side than the second side;

wherein the converter chiplet comprises conductive vias that extend from the converter circuitry to the second side of the converter chiplet;

wherein the electronic amplification chiplet is partially mounted on the photonic chiplet and partially mounted on the converter chiplet, the electronic amplification chiplet has a first set of electrical contacts and a second set of electrical contacts, the first set of electrical contacts are electrically coupled to the optically active layer of the photonic chiplet, and the second set of electrical contacts are electrically coupled to the converter circuitry of the converter chiplet.

Embodiment 299: A system comprising:

a second chiplet comprising a photonic module and an electronic amplification module, in which the photonic module comprises at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

wherein the electronic amplification chiplet comprises at least one of a driver amplifier or a transimpedance amplifier, and configured to process electrical signals sent to or from the photonic module;

a third chiplet comprising converter circuitry configured to convert signals between a first interface and a second interface, in which the converter circuitry communicates with a first chiplet using the first interface, and the converter circuitry communicates with the electronic amplification chiplet using the second interface;

a dummy chiplet having a first side and a second side, in which the dummy chiplet comprises conductive vias that extend from the first side to the second side;

wherein the third chiplet is partially mounted on the second chiplet and partially mounted on the dummy chiplet;

wherein the third chiplet comprises a first set of electrical contacts and a second set of electrical contacts, the first set of electrical contacts is electrically coupled to the second chiplet, and the second set of electrical contacts is electrically coupled to the conductive vias of the dummy chiplet.

Embodiment 300: A system comprising:

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

a third chiplet comprising an electronic amplification module comprising at least one of a driver amplifier or a transimpedance amplifier, and configured to process electrical signals sent to or from the photonic module;

a fourth chiplet comprising a converter module configured to convert signals between a first interface and a second interface, in which the converter circuitry communicates with a first chiplet using the first interface, and the converter circuitry communicates with the electronic amplification chiplet using the second interface;

a fifth chiplet having a first side and a second side, in which the fifth chiplet comprises through vias that extend from the first side to the second side;

wherein the second chiplet is mounted on the common substrate;

wherein the third chiplet is partially mounted on the second chiplet and partially mounted on the fifth chiplet;

wherein the fourth chiplet is mounted on the fifth chiplet, in which the fifth chiplet comprises conductive traces that electrically couple the third chiplet to the fourth chiplet;

wherein the fourth chiplet is electrically coupled to the common substrate using the through vias of the fifth substrate.

Embodiment 301: The system of embodiment 300 in which the fifth chiplet comprises a silicon chiplet that comprises through-silicon vias that extend from the first side to the second side of the fifth chiplet.

Embodiment 302: The system of embodiment 300 or 301 in which the photonic module comprises an optically active layer that comprises active photonic components, the photonic module has an optically active side and a back side, at least some of the active photonic components are closer to the optically active side than the backside;

wherein the photonic module is oriented such that the back side of the photonic module faces towards the common substrate, and a portion of the optically active side of the photonic module faces the third chiplet;

wherein the photonic module comprises front-side illuminated couplers, each front-side illuminated coupler is configured to receive a light beam incident on the optically active side of the photonic module or emit a light beam that exits the optically active side of the photonic module.

Embodiment 303: The system of embodiment 300 or 301 in which the photonic module comprises an optically active layer that comprises active photonic components, the photonic module has an optically active side and a back side, at least some of the active photonic components are closer to the optically active side than the backside;

wherein the photonic module is oriented such that the optically active side of the photonic module faces towards the common substrate, and a portion of the back side of the photonic module faces the third chiplet;

wherein the photonic module comprises back-side illuminated couplers, each back-side illuminated coupler is configured to receive a light beam incident on the back side of the photonic module or emit a light beam that exits the back side of the photonic module;

wherein the photonic module comprises conductive vias that electrically couple the optically active layer to the back side of the photonic module.

Embodiment 304: The system of embodiment 302 or 303 in which the photonic module comprises front-side or back-side illuminated couplers arranged in a one-dimensional configuration.

Embodiment 305: The system of embodiment 302 or 303 in which the photonic module comprises front-side or back-side illuminated couplers arranged in a two-dimensional configuration.

Embodiment 306: A system comprising:

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

a third chiplet comprising an electronic amplification module comprising at least one of a driver amplifier or a transimpedance amplifier, and configured to process electrical signals sent to or from the photonic module;

a common substrate defining a cavity or a through-hole;

wherein the third chiplet is partially mounted on the second chiplet and partially mounted on the common substrate, in which the second chiplet is disposed at least partially in the cavity or the through-hole.

Embodiment 307: The system of embodiment 306 in which the cavity has a bottom wall and a top opening, the backside of the photonic module faces toward the bottom wall of the cavity;

wherein the photonic module comprises optical couplers arranged in a two-dimensional configuration, each optical coupler is configured to at least one of receive or transmit light that passes through the top opening of the cavity.

Embodiment 308: The system of embodiment 306 or 307 in which a depth of the cavity and a thickness of the second chiplet are selected such that a top surface of the second chiplet is at a substantially same level as a top surface of the common substrate.

Embodiment 309: The system of embodiment 307 or 308 in which the common substrate defines an overflow well adjacent to the cavity, the second chiplet is secured to the bottom wall of the cavity by an adhesive, and the overflow well allows the adhesive to overflow without damaging an optically active surface of the photonic module.

Embodiment 310: The system of embodiment 309 in which the adhesive comprises an epoxy.

Embodiment 311: The system of any of embodiments 300 to 310, comprising an optical fiber connector that is edge coupled to the photonic module.

Embodiment 312: A system comprising:

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

a third chiplet comprising an electronic amplification module comprising at least one of a driver amplifier or a transimpedance amplifier, and configured to process electrical signals sent to or from the photonic module;

a common substrate defining a partial through-hole having a first portion that extends partly through the common substrate and a second portion that extends completely through the common substrate and defines an opening, wherein a thinned portion of the common substrate is disposed above the first portion of the partial through-hole;

wherein the third chiplet is partially mounted on the second chiplet and partially mounted on the common substrate, in which the second chiplet is disposed at least partially in the cavity or the through-hole;

wherein the second chiplet is disposed in the partial through-hole, the second chiplet is oriented such that an optically active side of the photonic module faces upwards, a first portion of the optically active side of the second chiplet is covered by the thinned portion of the common substrate, and a second portion of the optically active side of the second chiplet is exposed by the opening of the partial through-hole;

wherein the electronic amplification module is electrically coupled to the first portion of the optically active layer of the photonic module using conductive vias through the thinned portion of the common substrate.

Embodiment 313: A system comprising:

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification module comprising at least one of a driver amplifier or a transimpedance amplifier, and configured to process electrical signals sent to or from the photonic module;

a common substrate comprising a redistribution layer comprising alternating electrically conductive layers and electrical insulation layers, each conductive layer is disposed between two insulation layers, each conductive layer has a thickness in a range from 1 μm to 50 μm, and each insulation layer has a thickness in a range from 1 μm to 300 μm;

wherein the second chiplet is directly or indirectly mounted on the common substrate; and molding compound that covers at least a portion of side surfaces of the second chiplet and at least a portion of a surface of the common substrate, in which the molding compound is configured to enhance a structural stability of a semiconductor package that includes the second chiplet, the electronic amplification module, the common substrate, and the molding compound.

Embodiment 314: The system of embodiment 313 in which each conductive layer of the redistribution layer has a thickness in a range from 1 μm to 20 μm, and each insulation layer of the redistribution layer has a thickness in a range from 2 μm to 100 μm.

Embodiment 315: The system of embodiment 314 in which each conductive layer of the redistribution layer has a thickness in a range from 1 μm to 10 μm, and each insulation layer of the redistribution layer has a thickness in a range from 5 μm to 20 μm.

Embodiment 316: The system of any of embodiments 313 to 315 in which the molding compound is configured to expose top surfaces of the second chiplet to enable the second chiplet to obtain access to an external optical fiber.

Embodiment 317: The system of any of embodiments 313 to 316 in which the second chiplet comprises the electronic amplification module, and the second chiplet is directly mounted on the common substrate.

Embodiment 318: The system of any of embodiments 313 to 316, comprising a third chiplet comprising the electronic amplification module, in which the second chiplet is mounted on the third chiplet, and the third chiplet is directly mounted on the common substrate.

Embodiment 319: A system comprising:

- a common substrate that includes a first set of bump contacts and a second set of bump contacts, wherein the first set of bump contacts is configured to be electrically connected to a first chiplet comprising at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device;
- a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters; and
- an electronic amplification module comprising at least one of a driver amplifier or a transimpedance amplifier, and configured to process electrical signals sent to or from the photonic module;
- a converter module configured to convert signals between a first interface and a second interface, in which the converter module communicates with the first chiplet using the first interface, and the converter module communicates with the electronic amplification module using the second interface;
- wherein at least some of the second set of bump contacts are directly or indirectly electrically connected to the second chiplet.

Embodiment 320: The system of embodiment 319 in which the second chiplet has a length, a width, and a height, and the height is at most 30% of the shorter of the length and width.

Embodiment 321: The system of embodiment 319 or 320 in which the second chiplet, the electronic amplification module, the converter module, the first interface, and the second interface are assembled into a co-packaged optical-electrical module using a chiplet packaging technique.

Embodiment 322: The system of any of embodiments 319 to 321 in which the first interface, the converter module, the second interface, the electronic amplification module, and the photonic module are configured to enable the first chiplet to communicate with an external device through an optical link at a data rate of at least 1 terabits per second for at least some periods of time.

Embodiment 323: The system of embodiment 322 in which the first interface, the converter module, the second interface, the electronic amplification module, and the photonic module are configured to enable the first chiplet to communicate with the external device through the optical link at a data rate of at least 10 terabits per second for at least some periods of time.

Embodiment 324: The system of embodiment 323 in which the first interface, the converter module, the second interface, the electronic amplification module, and the photonic module are configured to enable the first chiplet to communicate with the external device through the optical link at a data rate of at least 100 terabits per second for at least some periods of time.

Embodiment 325: The system of any of embodiments 322 to 324 in which the optical ink comprises at least one of multiple optical fibers, multiple cores of a multi-core optical fiber, or multiple cores of multi-core optical fibers.

Embodiment 326: The system of any of embodiments 322 to 325 in which the photonic module is configured to at least one of transmit or receive wavelength division multiplexed signals through the optical link.

Embodiment 327: The system of any of embodiments 319 to 326 in which the second chiplet comprises the electronic amplification module, wherein the photonic module and electronic amplification module are formed on a monolithic semiconductor die.

Embodiment 328: The system of embodiment 327 in which the second chiplet comprises the converter module and the second interface, wherein the photonic module, the electronic amplification module, the second interface, and the converter module are formed on the monolithic semiconductor die.

Embodiment 329: A system comprising:

- a semiconductor package comprising:
  - a first chiplet comprising a first side and a second side, in which the first chiplet comprises optical couplers that are configured to be optically coupled to an external optical device;
  - a second chiplet that is configured to at least one of transmit electrical signals to or receive electrical signals from the first chiplet;
  - a common substrate that includes alternating layers of electrically conductive material and electrically insulating material, in which the common substrate has a total thickness of less than 1 mm, wherein the common substrate defines a cavity;
  - a molding compound that covers at least a portion of the common substrate and at least a portion of the surface of the second chiplet, in which the molding compound enhances a structural strength of the semiconductor package, wherein the molding compound defines a first opening that exposes the optical couplers of the first chiplet;
  - wherein the first chiplet is disposed in the cavity in the common substrate, in which at least some electrical contacts of the first chiplet are electrically coupled to at least some electrical contacts of the second chiplet; and
  - wherein at least some electrical contacts of the second chiplet are electrically coupled to at least some electrical contacts of the common substrate.

Embodiment 330: The system of embodiment 329, comprising an optical connector that passes the first opening in the molding compound and is optically coupled to the optical couplers of the first chiplet.

Embodiment 331: The system of embodiment 329 or 330 wherein the first chiplet comprises a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters.

Embodiment 332: The system of any of embodiments 329 to 331 in which the second chiplet has a first portion that is mounted on the common substrate and a second portion that is positioned above the cavity in the common substrate, wherein the second portion of the second chiplet is electrically coupled to the first chiplet.

Embodiment 333: The system of any of embodiments 329 to 331 in which the second chiplet has a first portion that is mounted on the common substrate and a second portion that is positioned above the cavity in the common substrate, wherein a thinned portion of the common substrate is disposed between the second portion of the second chiplet and the first chiplet, the second portion of the second chiplet is electrically coupled to the first chiplet through conductive vias in the thinned portion of the common substrate.

Embodiment 334: The system of any of embodiments 329 to 331 in which the second chiplet comprises at least one of a network switch, a central processor unit, a graphics processor unit, a tensor processing unit, a neural network processor, an artificial intelligence accelerator, a digital signal processor, a microcontroller, an application specific integrated circuit (ASIC), a SerDes, a data converter, a driver/transimpedance module, or a data storage device.

Embodiment 335: The system of embodiment 334 in which the second chiplet comprises a driver/transimpedance module.

Embodiment 336: The system of embodiment 334 in which the second chiplet comprises a converter module and a driver/transimpedance module.

Embodiment 337: The system of embodiment 334 in which the second chiplet comprises at least one of a network switch, a central processor unit, a graphics processor unit, a tensor processing unit, a neural network processor, an artificial intelligence accelerator, a digital signal processor, a microcontroller, an application specific integrated circuit (ASIC), or a storage device, wherein the second chiplet further comprises a converter module, and a driver/transimpedance module.

Embodiment 338: The system of embodiment 334 in which the second chiplet comprises at least one of an XLR (extra long reach)-to-BoW (bunch of wire) converter, an LR (long reach)-to-BoW converter, an MR (medium reach)-to-BoW converter, a SR (short reach)-to-BoW converter, a VSR (very short reach)-to-BoW converter, an XSR (extra short reach)-to-BoW converter, an XLR-to-AIB (advanced interface bus) converter, an LR-to-AIB converter, an MR-to-AIB converter, an SR-to-AIB converter, a VSR-to-AIB converter, an XSR-to-AIB converter, an XLR-to-UCIe (universal chiplet interconnect express) converter, an LR-to-UCIe converter, an MR-to-UCIe converter, an SR-to-UCIe converter, a VSR-to-UCIe converter, or an XSR-to-UCIe converter.

Embodiment 339: The system of embodiment 334 in which the second chiplet comprises at least one of an LR (long reach)-to-BoW converter, an MR (medium reach)-to-BoW converter, a SR (short reach)-to-BoW converter, a VSR (very short reach)-to-BoW converter, an XSR (extra short reach)-to-BoW converter, an LR-to-AIB converter, an MR-to-AIB converter, an SR-to-AIB converter, a VSR-to-AIB converter, an XSR-to-AIB converter, an LR-to-UCIe converter, an MR-to-UCIe converter, an SR-to-UCIe converter, a VSR-to-UCIe converter, or an XSR-to-UCIe converter.

Embodiment 340: The system of embodiment 334, comprising:

an electronic amplification module comprising at least one of a driver amplifier or a transimpedance amplifier, and configured to process electrical signals sent to or from the photonic module; and a converter module configured to convert signals between a first interface and a second interface, in which the converter module is configured to communicate with the second chiplet using the first interface, and the converter module is configured to communicate with the electronic amplification module using the second interface.

Embodiment 341: The system of embodiment 340 in which the common substrate has a first side that faces a first direction, and a second side that faces a second direction;

wherein the electronic amplification module is mounted on the first side of the common substrate, a thinned portion of the common substrate forms a wall of the cavity, and the thinned portion of the common substrate is disposed between a portion of the electronic amplification module and a portion of the first chiplet.

Embodiment 342: The system of embodiment 340 in which the common substrate has a first side that faces a first direction, and a second side that faces a second direction;

wherein the electronic amplification module has a first side that faces the first direction and a second side that faces the second direction, wherein a first portion of the second side of the electronic amplification module faces the first side of the common substrate, and a second portion of the second side of the electronic amplification module faces a portion of the first chiplet.

Embodiment 343: The system of embodiment 341 or 342 in which the first chiplet has a first side and a second side, the first side faces the first direction, and the optical couplers are positioned closer to the first side than the second side.

Embodiment 344: The system of any of embodiments 329 to 343 in which the optical couplers comprise a two-dimensional arrangement of grating couplers.

Embodiment 345: The system of embodiment 344 in which the optical connector is configured to be optically coupled to a two-dimensional array of optical fibers, wherein the optical connector is configured to optically couple at least some of the grating couplers to at least some of the optical fibers.

Embodiment 346: The system of any of embodiments 329 to 345 in which the common substrate comprises redistribution layers that include the alternating layers of electrically conductive material and electrically insulating material, each conductive layer is disposed between two insulation layers, each conductive layer has a thickness in a range from 1 μm to 50 μm, and each insulation layer has a thickness in a range from 1 μm to 300 μm.

Embodiment 347: The system of embodiment 346 in which each conductive layer of the redistribution layer has a thickness in a range from 1 μm to 20 μm, and each insulation layer of the redistribution layer has a thickness in a range from 2 μm to 100 μm.

Embodiment 348: The system of embodiment 347 in which each conductive layer of the redistribution layer has a thickness in a range from 1 μm to 10 μm, and each insulation layer of the redistribution layer has a thickness in a range from 5 μm to 20 μm.

Embodiment 349: The system of embodiment 346 in which the layer of electrically conductive material comprises a layer of copper, and the layer of electrically insulating material comprises a layer of polymer.

Embodiment 350: The system of embodiment 329 in which the second chiplet comprises an electronic amplification module comprising at least one of a driver amplifier or a transimpedance amplifier, and configured to process electrical signals sent to or from the photonic module.

Embodiment 351: The system of embodiment 350 in which the second chiplet comprises a converter module configured to convert signals between a first interface and a second interface, in which the converter module is configured to communicate with a data processing device using the first interface, and the converter module is configured to communicate with the electronic amplification module using the second interface.

Embodiment 352: The system of embodiment 350, comprising a third chiplet that comprises a converter module configured to convert signals between a first interface and a second interface, in which the converter module is configured to communicate with a data processing device using the first interface, and the converter module is configured to communicate with the electronic amplification module using the second interface.

Embodiment 353: The system of any of embodiments 329 to 340 and 344 to 352 in which electrical contacts of the first chiplet are directly connected to electrical contacts of the second chiplet.

Embodiment 354: The system of any of embodiments 329 to 340 and 344 to 352 in which a thinned portion of the common substrate is disposed between a portion of the first chiplet and a portion of the second chiplet, electrical contacts of the first chiplet are electrically coupled to electrical contacts of the second chiplet through conductive vias that pass through the thinned portion of the common substrate.

Embodiment 355: The system of any of embodiments 351 to 354, comprising the data processing device.

Embodiment 356: The system of embodiment 355 in which the data processing device comprises a data processing chiplet.

Embodiment 357: The system of embodiment 356 in which electrical contacts of the data processing chiplet are coupled to electrical contacts of the common substrate.

Embodiment 358: The system of embodiment 357 in which the data processing device comprises a data processing integrated circuit having a semiconductor die mounted on a substrate, a protective covering that covers the semiconductor die, and electrical connectors below the substrate.

Embodiment 359: The system of embodiment 355 or 358 in which the common substrate is mounted on a second substrate, the data processing device is mounted on a third substrate, the third substrate is mounted on the second substrate, and the data processing device is electrically coupled to the second chiplet through conductive lines or traces in or on the second substrate.

Embodiment 360: The system of embodiment 359 in which the third substrate comprises redistribution layers, and the second substrate comprises a multilayer printed circuit board.

Embodiment 361: The system of embodiment 359 in which a portion of the first chiplet is disposed between a thinned portion of the common substrate and the second substrate.

Embodiment 362: The system of embodiment 359 in which a portion of the first chiplet is disposed between a portion of second chiplet and the second substrate.

Embodiment 363: A system comprising:

a semiconductor package comprising:

- a first chiplet comprising optical couplers that are configured to be optically coupled to an external optical device;
- a second chiplet that is configured to at least one of transmit electrical signals to or receive electrical signals from the first chiplet;
- a common substrate that defines a cavity and a first opening;
- wherein the first chiplet is disposed in the cavity in the common substrate, in which at least some electrical contacts of the first chiplet are electrically coupled to at least some electrical contacts of the second chiplet, the first opening in the common substrate exposes the optical couplers of the first chiplet; and
- wherein at least some electrical contacts of the second chiplet are electrically coupled to at least some electrical contacts of the common substrate.

Embodiment 364: The system of embodiment 363 in which the common substrate comprises at least one of an organic substrate, a ceramic substrate, a silicon interposer, a substrate using one or more silicon bridges, or a substrate made in a fan-out wafer-level packaging (FoWLP) process.

Embodiment 365: The system of embodiment 363 in which the common substrate comprises a silicon interposer, a first set of the electrical contacts of the first chiplet has a first pitch, a first set of the electrical contacts of the common substrate also has the first pitch, the first set of the electrical contacts of the first chiplet are electrically connected to the corresponding first set of the electrical contacts of the common substrate.

Embodiment 366: The system of embodiment 363 in which the common substrate comprises a substrate using a bridge, a first set of the electrical contacts of the first chiplet has a first pitch, a first set of electrical contacts of the silicon bridge also has the first pitch, the first set of the electrical contacts of the first chiplet are electrically connected to the corresponding first set of the electrical contacts of the silicon bridge.

Embodiment 367: The system of any of embodiments 363 to 366, comprising an optical connector that passes the first opening in the common substrate and is optically coupled to the optical couplers of the first chiplet.

Embodiment 368: The system of any of embodiments 363 to 367 in which the first chiplet comprises a top side and a bottom side, the second chiplet comprises a top side and a bottom side, the common substrate comprises a top side and a bottom side,

- wherein a first portion of the bottom side of the second chiplet is mounted on the top side of the common substrate,
- wherein a first portion of the top side of the first chiplet is exposed by the first opening in the common substrate,
- wherein a second portion of the bottom side of the second chiplet faces a second portion of the top side of the first chiplet.

Embodiment 369: The system of embodiment 368 in which electrical contacts at the second portion of the bottom side of the second chiplet are electrically connected to electrical contacts at the second portion of the top side of the first chiplet.

Embodiment 370: The system of embodiment 368 in which a thinned portion of the common substrate is disposed between the second portion of the bottom side of the second chiplet and the second portion of the top side of the first chiplet;

wherein electrical contacts at the second portion of the bottom side of the second chiplet are electrically coupled to electrical contacts at the second portion of the top side of the first chiplet through conductive vias in the thinned portion of the common substrate.

Embodiment 371: The system of any of embodiments 363 to 370 wherein the first chiplet comprises a photonic module comprising at least one of optical switches, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters.

Embodiment 372: The system of any of embodiments 363 to 371 in which the second chiplet comprises at least one of a network switch, a central processor unit, a graphics processor unit, a tensor processing unit, a neural network processor, an artificial intelligence accelerator, a digital signal processor, a microcontroller, an application specific integrated circuit (ASIC), a SerDes, a data converter, or a data storage device.

Embodiment 373: The system of embodiment 371, comprising:

an electronic amplification module comprising at least one of a driver amplifier or a transimpedance amplifier, and configured to process electrical signals sent to or from the photonic module; and a converter module configured to convert signals between a first interface and a second interface, in which the converter module is configured to communicate with the second chiplet using the first interface, and the converter module is configured to communicate with the electronic amplification module using the second interface.

Embodiment 374: The system of embodiment 373 in which the common substrate has a first side that faces a first direction, and a second side that faces a second direction;

wherein the electronic amplification module is mounted on the first side of the common substrate, a thinned portion of the common substrate forms a wall of the cavity, and the thinned portion of the common substrate is disposed between a portion of the electronic amplification module and a portion of the first chiplet.

Embodiment 375: The system of embodiment 374 in which the first chiplet has a first side and a second side, the first side faces the first direction, and the optical couplers are positioned closer to the first side than the second side.

Embodiment 376: The system of any of embodiments 363 to 375 in which the optical couplers comprise a two-dimensional arrangement of grating couplers.

Embodiment 377: The system of embodiment 376 in which the optical connector is configured to be optically coupled to a two-dimensional array of optical fibers, wherein the optical connector is configured to optically couple at least some of the grating couplers to at least some of the optical fibers.

Embodiment 378: The system of any of embodiments 363 to 377 in which the common substrate comprises redistribution layers that include the alternating layers of electrically conductive material and electrically insulating material, each conductive layer is disposed between two insulation layers, each conductive layer has a thickness in a range from 1 μm to 50 μm, and each insulation layer has a thickness in a range from 1 μm to 300 μm.

Embodiment 379: The system of embodiment 378 in which the layer of electrically conductive material comprises a layer of copper, and the layer of electrically insulating material comprises a layer of polymer.

Embodiment 380: The system of embodiment 363 in which the second chiplet comprises an electronic amplification module comprising at least one of a driver amplifier or a transimpedance amplifier, and configured to process electrical signals sent to or from the photonic module.

Embodiment 381: The system of embodiment 380 in which the second chiplet comprises a converter module configured to convert signals between a first interface and a second interface, in which the converter module is configured to communicate with a data processing device using the first interface, and the converter module is configured to communicate with the electronic amplification module using the second interface.

Embodiment 382: The system of embodiment 380, comprising a third chiplet that comprises a converter module configured to convert signals between a first interface and a second interface, in which the converter module is configured to communicate with a data processing device using the first interface, and the converter module is configured to communicate with the electronic amplification module using the second interface.

Embodiment 383: The system of embodiment 381 or 382, comprising the data processing device.

Embodiment 384: The system of embodiment 383 in which the data processing device comprises a data processing chiplet.

Embodiment 385: The system of embodiment 384 in which electrical contacts of the data processing chiplet are coupled to electrical contacts of the common substrate.

Embodiment 386: The system of embodiment 383 in which the data processing device comprises a data processing integrated circuit having a semiconductor die mounted on a substrate, a protective covering that covers the semiconductor die, and electrical connectors below the substrate.

Embodiment 387: The system of embodiment 383 or 386 in which the common substrate is mounted on a second substrate, the data processing device is mounted on a third substrate, the third substrate is mounted on the second substrate, and the data processing device is electrically coupled to the second chiplet through conductive lines or traces in or on the second substrate.

Embodiment 388: The system of embodiment 387 in which the third substrate comprises redistribution layers, and the second substrate comprises a multilayer printed circuit board.

Embodiment 389: The system of embodiment 387 in which a portion of the first chiplet is disposed between a thinned portion of the common substrate and the second substrate.

Embodiment 390: The system of embodiment 387 in which the first chiplet is directly electrically connected to the second chiplet.

Embodiment 391: The system of embodiment 387 in which a portion of the first chiplet is disposed between a portion of second chiplet and the second substrate.

Embodiment 392: An apparatus comprising:

an input/output interface comprising a photonic module and a fiber optic connector configured to enable a data processing device having a first shoreline bandwidth density of at least 1 Gbps/mm to communicate with optical fiber cores through the photonic module and the fiber optic connector, wherein the input/output interface is configured to substantially maintain the shoreline bandwidth density from the data processing device to the fiber optic connector with no fan out or with a fan out of not more than 50%.

Embodiment 393: The apparatus of embodiment 392 in which the input/output interface is configured to enable a data processing device having a first shoreline bandwidth density of at least 10 Gbps/mm to communicate with optical fiber cores through the photonic module and the fiber optic connector, wherein the input/output interface is configured to substantially maintain the shoreline bandwidth density from the data processing device to the fiber optic connector with no fan out or with a fan out of not more than 50%.

Embodiment 394: The apparatus of embodiment 392 in which the input/output interface is configured to enable a data processing device having a first shoreline bandwidth density of at least 100 Gbps/mm to communicate with optical fiber cores through the photonic module and the fiber optic connector, wherein the input/output interface is configured to substantially maintain the shoreline bandwidth density from the data processing device to the fiber optic connector with no fan out or with a fan out of not more than 50%.

Embodiment 395: The apparatus of embodiment 392 in which the input/output interface is configured to enable a data processing device having a first shoreline bandwidth density of at least 1 Tbps/mm to communicate with optical fiber cores through the photonic module and the fiber optic connector, wherein the input/output interface is configured to substantially maintain the shoreline bandwidth density from the data processing device to the fiber optic connector with no fan out or with a fan out of not more than 50%.

Embodiment 396: The apparatus of any of embodiments 392 to 395 in which the data processing device comprises a first processor edge, the first shoreline bandwidth density is determined as the input/output interface rate per unit length of the first processor edge.

Embodiment 397: The apparatus of embodiment 396 in which the photonic module has a second shoreline bandwidth density, and the second shoreline bandwidth density is at least 67% of the first shoreline bandwidth density.

Embodiment 398: The apparatus of embodiment 396 or 397 in which the fiber optic connector has a third shoreline bandwidth density, and the third shoreline bandwidth density is at least 67% of the first shoreline bandwidth density.

Embodiment 399: The apparatus of any of embodiments 396 to 398 in which the fiber optic connector is configured to be optically coupled to a two-dimensional (2D) array of at least two rows and at least two columns of optical fiber cores, each row extending in a row direction parallel to the first processor edge, each column extending in a column direction perpendicular to the row direction, wherein the photonic module comprises optical couplers configured to optically communicate with the 2D array of at least two rows and at least two columns of optical fiber cores.

Embodiment 400: The apparatus of embodiment 399 in which the 2D array of optical fiber cores comprises at least two rows and at least four columns of optical fiber cores, and the photonic module comprises optical couplers configured to optically communicate with the 2D array of at least two rows and at least four columns of optical fiber cores.

Embodiment 401: The apparatus of embodiment 399 in which the 2D array of optical fiber cores comprises at least two rows and at least eight columns of optical fiber cores, and the photonic module comprises optical couplers configured to optically communicate with the 2D array of at least two rows and at least eight columns of optical fiber cores.

Embodiment 402: The apparatus of any of embodiments 396 to 398 in which the fiber optic connector is configured to be optically coupled to a two-dimensional (2D) array of at least four rows and at least four columns of optical fiber cores, each row extending in a row direction parallel to the first processor edge, each column extending in a column direction perpendicular to the row direction, wherein the photonic module comprises optical couplers configured to optically communicate with the 2D array of at least four rows and at least four columns of optical fiber cores.

Embodiment 403: The apparatus of embodiment 402 in which the 2D array of optical fiber cores comprises at least four rows and at least eight columns of optical fiber cores, and the photonic module comprises optical couplers configured to optically communicate with the 2D array of at least four rows and at least eight columns of optical fiber cores.

Embodiment 404: The apparatus of embodiment 403 in which the 2D array of optical fiber cores comprises at least four rows and at least sixteen columns of optical fiber cores, and the photonic module comprises optical couplers configured to optically communicate with the 2D array of at least four rows and at least sixteen of optical fiber cores.

Embodiment 405: The apparatus of any of embodiments 396 to 398 in which the fiber optic connector is configured to be optically coupled to a one-dimensional (1D) array of at least two optical fiber cores that extend in a column direction perpendicular to the first processor edge, and the photonic module comprises at least one optical coupler configured to optically communicate with the 1D array of at least two optical fiber cores.

Embodiment 406: The apparatus of embodiment 405 in which the 1D array of optical fiber cores comprises a 1D array of at least four optical fiber cores that extend in the column direction, and the photonic module comprises optical couplers configured to optically communicate with the 1D array of at least four optical fiber cores.

Embodiment 407: The apparatus of embodiment 406 in which the 1D array of optical fiber cores comprises a 1D array of at least eight optical fiber cores that extend in the column direction, and the photonic module comprises optical couplers configured to optically communicate with the 1D array of at least eight optical fiber cores.

Embodiment 408: The apparatus of embodiment 407 in which the 1D array of optical fiber cores comprises a 1D array of at least sixteen optical fiber cores that extend in the column direction, and the photonic module comprises optical couplers configured to optically communicate with the 1D array of at least sixteen optical fiber cores.

Embodiment 409: The apparatus of any of embodiments 392 to 408 in which the input/output interface comprises at least a first fiber optic connector and a second fiber optic connector both attached to the photonic module, the input/output interface is configured to substantially maintain the shoreline bandwidth density from the data processing device to the first and second fiber optic connectors with no fan out or with a fan out of not more than 50%.

Embodiment 410: The apparatus of embodiment 409 in which the input/output interface comprises at least the first fiber optic connector, the second fiber optic connector, a third fiber optic connector, and a fourth fiber optic connector attached to the photonic module, the input/output interface is configured to substantially maintain the shoreline bandwidth density from the data processing device to the first, second, third, and fourth fiber optic connectors with no fan out or with a fan out of not more than 50%.

Embodiment 411: The apparatus of embodiment 410 in which each of the first, second, third, and fourth fiber optic connectors is configured to be optically coupled to a two-dimensional (2D) array of at least two rows and at least two columns of optical fiber cores, each row extending in a row direction parallel to the first processor edge, each column extending in a column direction perpendicular to the row direction, wherein the photonic module comprises optical couplers configured to optically communicate, through each of the first, second, third, and fourth fiber optic connectors, with the corresponding 2D array of at least two rows and at least two columns of optical fiber cores.

Embodiment 412: The apparatus of embodiment 411 in which each of the first, second, third, and fourth fiber optic connectors is configured to be optically coupled to a 2D array of at least four rows and at least four columns of optical fiber cores, wherein the photonic module comprises optical couplers configured to optically communicate, through each of the first, second, third, and fourth fiber optic connectors, with the corresponding 2D array of at least four rows and at least four columns of optical fiber cores.

Embodiment 413: The apparatus of embodiment 412 in which each of the first, second, third, and fourth fiber optic connectors is configured to be optically coupled to a 2D array of at least four rows and at least eight columns of optical fiber cores, wherein the photonic module comprises optical couplers configured to optically communicate, through each of the first, second, third, and fourth fiber optic connectors, with the corresponding 2D array of at least four rows and at least eight columns of optical fiber cores.

Embodiment 414: The apparatus of embodiment 411 in which each of the first, second, third, and fourth fiber optic connectors is configured to be optically coupled to a 2D array of at least two rows and at least four columns of optical fiber cores, wherein the photonic module comprises optical couplers configured to optically communicate, through each of the first, second, third, and fourth fiber optic connectors, with the corresponding 2D array of at least two rows and at least four columns of optical fiber cores.

Embodiment 415: The apparatus of embodiment 414 in which each of the first, second, third, and fourth fiber optic connectors is configured to be optically coupled to a 2D array of at least two rows and at least eight columns of optical fiber cores, wherein the photonic module comprises optical couplers configured to optically communicate, through each of the first, second, third, and fourth fiber optic connectors, with the corresponding 2D array of at least two rows and at least eight columns of optical fiber cores.

Embodiment 416: The apparatus of embodiment 409 or 410 in which each of the first and second fiber optic connectors is configured to be optically coupled to a two-dimensional (2D) array of at least two rows and at least two columns of optical fiber cores, each row extending in a row direction parallel to the first processor edge, each column extending in a column direction perpendicular to the row direction, wherein the photonic module comprises optical couplers configured to optically communicate, through each of the first and second fiber optic connectors, with the corresponding 2D array of at least two rows and at least two columns of optical fiber cores.

Embodiment 417: The apparatus of embodiment 396 in which the data processing device comprises a second processor edge, the data processing device has a second shoreline bandwidth density of at least 1 Gbps/mm at the second processor edge, wherein the input/output interface comprises a second photonic module and a second fiber optic connector configured to enable the data processing device to communicate with optical fiber cores through the second photonic module and the second fiber optic connector, wherein the input/output interface is configured to substantially maintain the shoreline bandwidth density from the second processor edge to the second fiber optic connector with no fan out or with a fan out of not more than 50%.

Embodiment 418: The apparatus of embodiment 417 in which the data processing device comprises a third processor edge, the data processing device has a third shoreline bandwidth density of at least 1 Gbps/mm at the third processor edge, wherein the input/output interface comprises a third photonic module and a third fiber optic connector configured to enable the data processing device to communicate with optical fiber cores through the third photonic module and the third fiber optic connector, wherein the input/output interface is configured to substantially maintain the shoreline bandwidth density from the third processor edge to the third fiber optic connector with no fan out or with a fan out of not more than 50%.

Embodiment 419: The apparatus of embodiment 418 in which the data processing device comprises a fourth processor edge, the data processing device has a fourth shoreline bandwidth density of at least 1 Gbps/mm at the fourth processor edge, wherein the input/output interface comprises a fourth photonic module and a fourth fiber optic connector configured to enable the data processing device to communicate with optical fiber cores through the fourth photonic module and the fourth fiber optic connector, wherein the input/output interface is configured to substantially maintain the shoreline bandwidth density from the fourth processor edge to the fourth fiber optic connector with no fan out or with a fan out of not more than 50%.

Embodiment 420: The apparatus of embodiment 419 in which the input/output interface comprises at least two fiber optic connectors attached to the first photonic module, at least two fiber optic connectors attached to the second photonic module, at least two fiber optic connectors attached to the third photonic module, and at least two fiber optic connectors attached to the fourth photonic module, the input/output interface is configured to substantially maintain the shoreline bandwidth density from the first processor edge to the two fiber optic connectors attached to the first photonic module with no fan out or with a fan out of not more than 50%;

the input/output interface is configured to substantially maintain the shoreline bandwidth density from the second processor edge to the two fiber optic connectors attached to the second photonic module with no fan out or with a fan out of not more than 50%;

the input/output interface is configured to substantially maintain the shoreline bandwidth density from the third processor edge to the two fiber optic connectors attached to the third photonic module with no fan out or with a fan out of not more than 50%;

the input/output interface is configured to substantially maintain the shoreline bandwidth density from the fourth processor edge to the two fiber optic connectors attached to the fourth photonic module with no fan out or with a fan out of not more than 50%.

Embodiment 421: The apparatus of embodiment 420 in which each of the two fiber optic connectors attached to the first photonic module is configured to be optically coupled to a two-dimensional (2D) array of at least two rows and at least two columns of optical fiber cores, each row extending in a row direction parallel to the first processor edge, each column extending in a column direction perpendicular to the row direction, wherein the first photonic module comprises optical couplers configured to optically communicate, through each of the two fiber optic connectors attached to the first photonic module, with the corresponding 2D array of at least two rows and at least two columns of optical fiber cores;

wherein each of the two fiber optic connectors attached to the second photonic module is configured to be optically coupled to a 2D array of at least two rows and at least two columns of optical fiber cores, each row extending in a row direction parallel to the second processor edge, each column extending in a column direction perpendicular to the row direction, wherein the second photonic module comprises optical couplers configured to optically communicate, through each of the two fiber optic connectors attached to the second photonic module, with the corresponding 2D array of at least two rows and at least two columns of optical fiber cores;

wherein each of the two fiber optic connectors attached to the third photonic module is configured to be optically coupled to a 2D array of at least two rows and at least two columns of optical fiber cores, each row extending in a row direction parallel to the third processor edge, each column extending in a column direction perpendicular to the row direction, wherein the third photonic module comprises optical couplers configured to optically communicate, through each of the two fiber optic connectors attached to the third photonic module, with the corresponding 2D array of at least two rows and at least two columns of optical fiber cores;

wherein each of the two fiber optic connectors attached to the fourth photonic module is configured to be optically coupled to a 2D array of at least two rows and at least two columns of optical fiber cores, each row extending in a row direction parallel to the fourth processor edge, each column extending in a column direction perpendicular to the row direction, wherein the fourth photonic module comprises optical couplers configured to optically communicate, through each of the two fiber optic connectors attached to fourth first photonic module, with the corresponding 2D array of at least two rows and at least two columns of optical fiber cores.

Embodiment 422: The apparatus of any of embodiments 392 to 421 in which the photonic module comprises at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters.

Embodiment 423: The apparatus of any of embodiments 392 to 422, comprising the data processing device.

Embodiment 424: The apparatus of embodiment 423 in which the data processing device comprises at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device.

Embodiment 425: The apparatus of any of embodiments 392 to 424, comprising a first substrate, wherein the photonic module is directly or indirectly mounted on the first substrate, wherein the first substrate has a first set of electrical contacts that are electrically coupled to the photonic module, and the first substrate has a second set of electrical contacts that are configured to be electrically coupled to the data processing device.

Embodiment 426: The apparatus of embodiment 425 in which the first substrate comprises at least one of a silicon interposer, a substrate using one or more silicon bridges, or a substrate made in a fan-out wafer-level packaging (FoWLP) process.

Embodiment 427: The apparatus of embodiment 426 in which the input/output interface comprises a converter module directly or indirectly mounted on the first substrate, the converter module comprises at least one of a BoW block, a UCIe block, or an AIB block configured to communicate with the data processing device, wherein the input/output interface comprises a DRV/TIA module configured to drive the photonic module, wherein the converter module comprises at least one of an XLR, an LR, an MR, an SR, a VSR, or an XSR block configured to communicate with the DRV/TIA module.

Embodiment 428: The apparatus of embodiment 426 in which the input/output interface comprises a converter module directly or indirectly mounted on the first substrate, the converter module comprises at least one of a BoW block, a UCIe block, or an AIB block configured to communicate with the data processing device, wherein the input/output interface comprises a DRV/TIA module configured to drive the photonic module, wherein the converter module comprises at least one of an LR, an MR, an SR, a VSR, or an XSR block configured to communicate with the DRV/TIA module.

Embodiment 429: The apparatus of embodiment 427 in which the input/output interface is configured to maintain the shoreline bandwidth density from the data processing device through the converter module, the DRV/TIA module, and the photonic module to the fiber optic connector with no fan out or with a fan out of not more than 50%.

Embodiment 430: The apparatus of embodiment 429 in which the input/output interface is configured to maintain the shoreline bandwidth density from the data processing device through the converter module, the DRV/TIA module, and the photonic module to the fiber optic connector with a fan out of not more than 25%.

Embodiment 431: The apparatus of embodiment 430 in which the input/output interface is configured to maintain the shoreline bandwidth density from the data processing device through the converter module, the DRV/TIA module, and the photonic module to the fiber optic connector with a fan out of not more than 10%.

Embodiment 432: The apparatus of any of embodiments 427 to 431 in which the input/output interface comprises a photonic chiplet, a driver chiplet, and a converter chiplet, the photonic chiplet comprises the photonic module, the driver chiplet comprises the DRV/TIA module, and the converter chiplet comprises the converter module.

Embodiment 433: The apparatus of embodiment 432 in which the first substrate defines a cavity and an opening, the photonic chiplet is disposed in or partially in the cavity, the opening exposes optical couplers of the photonic module, and the fiber optic connector is attached to the photonic module through the opening in the first substrate.

Embodiment 434: The apparatus of embodiment 433 in which the driver chiplet is partially mounted on the first substrate and partially positioned above the photonic chiplet, a bottom side of the driver chiplet has electrical contacts that are electrically coupled to electrical contacts on a top side of the photonic chiplet.

Embodiment 435: The apparatus of embodiment 434 in which at least some electrical contacts on the bottom side of the driver chiplet are directly electrically connected to at least some electrical contacts on the top side of the photonic chiplet.

Embodiment 436: The apparatus of embodiment 434 in which a thinned portion of the first substrate is positioned between the driver chiplet and the photonic chiplet, and the driver chiplet is electrically coupled to the photonic chiplet through conductive vias in the thinned portion of the first substrate.

Embodiment 437: The apparatus of any of embodiments 426 to 436 in which the first substrate comprises redistribution layers made in a fan-out wafer-level packaging (FoWLP) process, wherein the input/output interface comprises molding compound that covers at least a portion of side surfaces of the driver chiplet, at least a portion of side surfaces of the converter chiplet, and at least a portion of a surface of the redistribution layers, wherein the molding compound is configured to enhance a structural stability of the input/output interface.

Embodiment 438: The apparatus of embodiment 437 in which the redistribution layers comprise alternating electrically conductive layers and electrical insulation layers, each conductive layer is disposed between two insulation layers, each conductive layer has a thickness in a range from 1 μm to 50 μm, and each insulation layer has a thickness in a range from 1 μm to 300 μm.

Embodiment 439: The apparatus of embodiment 438 in which each conductive layer has a thickness in a range from 1 μm to 20 μm, and each insulation layer has a thickness in a range from 2 μm to 100 μm.

Embodiment 440: The apparatus of embodiment 439 in which each conductive layer has a thickness in a range from 1 μm to 10 μm, and each insulation layer has a thickness in a range from 5 μm to 20 μm.

Embodiment 441: A system comprising:

a first device comprising a photonic module, the first chiplet having a first shoreline bandwidth density D1 bps/mm;

a fiber optic connector attached to the first device, the fiber optic connector having a third shoreline bandwidth density D3 bps/mm;

wherein the first device is configured to directly or indirectly communicate with a second device that has a second shoreline bandwidth density D2 bps/mm, in which $D2 \geq 1{,}000{,}000$;

wherein the first device and the fiber optic connector are configured such that the first shoreline bandwidth density and the third shoreline bandwidth density substantially match the second shoreline bandwidth density, wherein $D2 \leq 1.5 \times D1$, and $D2 \leq 1.5 \times D3$.

Embodiment 442: The system of embodiment 441 in which the first device is directly or indirectly mounted on a first substrate, the first substrate has a first set of electrical contacts that are electrically coupled to the first device, the first substrate has a second set of electrical contacts that are configured to be electrically coupled to the second device.

Embodiment 443: The system of embodiment 442 in which the first device comprises a first chiplet, the second device comprises a second chiplet.

Embodiment 444: The system of embodiment 443 in which the first chiplet has a first processor edge having a length W1, signal lines leaving the first chiplet through the first processor edge carry R1 bps for at least some periods of time during operation of the first and second chiplets, the first chiplet has a first shoreline bandwidth density $D1 = R1/W1$;

the second chiplet has a second processor edge having a length W2, signal lines leaving the second chiplet through the second processor edge carry R2 bps for at least some periods of time during operation of the first and second chiplets, the second chiplet has a second shoreline bandwidth density $D2 = R2/W2$;

the fiber optic connector has a third processor edge having a length W3, signal lines leaving the fiber optic connector through the third processor edge carry R3 bps for at least some periods of time during operation of the first and second chiplets, the fiber optic connector has a third shoreline bandwidth density $D3 = R3/W3$.

Embodiment 445: The system of embodiment 444 in which the fiber optic connector is configured to be optically coupled to an array of optical fiber cores that has up to a first number N1 of optical fiber cores along a first direction parallel to the third processor edge, the array of optical fiber cores has up to a second number N2 of optical fiber cores along a second direction orthogonal to the first direction, wherein at least one of (i) $N2 \geq N1 \geq 2$, or (ii) $N1 = 1$ and $N2 \geq 2$.

Embodiment 446: The system of any of embodiments 441 to 445 in which the photonic module comprises at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters.

Embodiment 447: The system of any of embodiments 441 to 446 in which the second shoreline bandwidth density D2 bps/mm at the second device is at least 10 Gbps/mm for at least some periods of time during operation of the first and second devices.

Embodiment 448: The system of embodiment 447 in which the second shoreline bandwidth density D2 bps/mm at the second device is at least 100 Gbps/mm for at least some periods of time during operation of the first and second chiplets.

Embodiment 449: The system of embodiment 448 in which the second shoreline bandwidth density D2 bps/mm at the second device is at least 1 Tbps/mm for at least some periods of time during operation of the first and second chiplets.

Embodiment 450: The system of embodiment 449 in which the second shoreline bandwidth density D2 bps/mm at the second device is at least 2 Tbps/mm for at least some periods of time during operation of the first and second chiplets.

Embodiment 451: The system of any of embodiments 445 to 450 in which the array of optical fiber cores comprises a 2D array of optical fiber cores have up to at least 4 or more optical fiber cores along the second direction.

Embodiment 452: The system of embodiment 451 in which the 2D array of optical fiber cores have up to at least 8 or more optical fiber cores along the second direction.

Embodiment 453: The system of any of embodiments 445 to 452 in which N2≥2×N1.

Embodiment 454: The system of embodiment 453 in which N2≥3×N1.

Embodiment 455: The system of any of embodiments 444 to 455 in which the signal lines leaving the second chiplet through the second processor edge have a minimum spacing not more than 1 mm.

Embodiment 456: The system of any of embodiments 441 to 455, comprising at least two fiber optic connectors that are attached to the first device.

Embodiment 457: The system of embodiment 456 in which each of the at least two fiber optic connectors is configured to be optically coupled to a corresponding 2D array of optical fiber cores.

Embodiment 458: The system of embodiment 457 in which each of the at least two fiber optic connectors is configured to be optically coupled to a corresponding 2D array of at least two rows and at least four columns of optical fiber cores.

Embodiment 459: The system of embodiment 458 in which each of the at least two fiber optic connectors is configured to be optically coupled to a corresponding 2D arrays of at least four rows and at least eight columns of optical fiber cores.

Embodiment 460: The system of any of embodiments 445 to 459 in which the fiber optic connector comprises at least one power supply fiber port and a plurality of data fiber ports, the at least one power supply fiber port is configured to be optically coupled to at least one power supply fiber core, the plurality of data fiber ports are configured to be optically coupled to a plurality of data fiber cores, the at least one power supply fiber core is configured to transmit power supply light, the data fiber cores are configured to transmit control and/or data signals.

Embodiment 461: The system of embodiment 460, comprising the at least one power supply fiber core, in which the at least one power supply fiber core comprises at least one polarization maintaining fiber that maintains polarization of the power supply light transmitted through the at least one power supply fiber core.

Embodiment 462: The system of embodiment 461 in which the array of fiber optic cores is curved, the at least one power supply fiber core has a radius of curvature that is larger than the radius of curvature of the data fiber cores.

Embodiment 463: The system of embodiment 462 in which the array of fiber optic cores is curved away from the first device as the array of fiber optic cores extend away from the first device, the at least one power supply fiber core is positioned closer to the second device than the data fiber cores.

Embodiment 464: The system of any of embodiments 441 to 463, comprising the second device, in which the second device comprises a data processing chiplet comprising at least one million transistors and is capable of processing data at a bandwidth of at least 1 Gbps.

Embodiment 465: The system of embodiment 464 in which the data processing chiplet comprises at least one hundred million transistors and is capable of processing data at a bandwidth of at least 100 Gbps.

Embodiment 466: The system of any of embodiments 441 to 465, comprising the second device, in which the second device is mounted on an organic substrate, the second device comprises one or more BoW blocks, and the second shoreline bandwidth density is at least 200 Gbps/mm.

Embodiment 467: The system of embodiment 466 in which the second shoreline bandwidth density is at least 300 Gbps/mm.

Embodiment 468: The system of any of embodiments 441 to 465, comprising the second device, in which the second device comprises one or more BoW blocks mounted on a silicon interposer, and the second shoreline bandwidth density is at least 1000 Gbps/mm.

Embodiment 469: The system of embodiment 468 in which the second shoreline bandwidth density is at least 1900 Gbps/mm.

Embodiment 470: The system of any of embodiments 441 to 465 in which the second device comprises one or more XSR SerDes, the one or more XSR SerDes, and the second shoreline bandwidth density is at least 800 Gbps/mm.

Embodiment 471: The system of embodiment 470 in which the second shoreline bandwidth density is at least 1300 Gbps/mm.

Embodiment 472: The system of any of embodiments 441 to 465 in which the second device comprises one or more MR SerDes, and the second shoreline bandwidth density is at least 300 Gbps/mm.

Embodiment 473: The system of embodiment 472 in which the second shoreline bandwidth density is at least 500 Gbps/mm.

Embodiment 474: The system of any of embodiments 441 to 465 in which the second device comprises one or more LR SerDes, and the second shoreline bandwidth density is at least 300 Gbps/mm.

Embodiment 475: The system of embodiment 474 in which the second shoreline bandwidth density is at least 500 Gbps/mm.

Embodiment 476: The system of any of embodiments 441 to 465 in which the second device comprises one or more XLR SerDes, and the second shoreline bandwidth density is at least 300 Gbps/mm.

Embodiment 477: The system of any of embodiments 441 to 465 in which the second shoreline bandwidth density is at least 300 Gbps/mm.

Embodiment 478: The system of embodiment 476 in which the second device comprises one or more XLR SerDes, and the second shoreline bandwidth density is at least 500 Gbps/mm.

Embodiment 479: The system of embodiment 476 in which the second shoreline bandwidth density is at least 500 Gbps/mm.

Embodiment 480: The system of any of embodiments 441 to 465 in which the second device comprises one or more 200G SerDes, and the second shoreline bandwidth density is at least 700 Gbps/mm.

Embodiment 481: The system of embodiment 480 in which the second chiplet comprises an input/output interface comprising one or more 200G SerDes, and the second shoreline bandwidth density is at least 1100 Gbps/mm.

Embodiment 482: The system of any of embodiments 441 to 481 in which the second device comprises a data processing module, the system comprises a converter module external to the second chiplet, the data processing module communicates with the converter module, the converter module communicates with a driver/TIA module, and the driver/TIA module drives the photonic module.

Embodiment 483: The system of any of embodiments 441 to 481 in which the second device comprises a data processing module and a converter module, the system comprises a driver/TIA module external to the second device, the second device communicates with the driver/TIA module, and the driver/TIA module drives the photonic module.

Embodiment 484: The system of any of embodiments 441 to 481 in which the second device comprises a data processing module, a converter module, and a driver/TIA module, and the second device drives the photonic module.

Embodiment 485: The system of any of embodiments 441 to 484 in which the first device and the second device are mounted on a silicon interposer.

Embodiment 486: The system of any of embodiments 441 to 484 in which the first device and the second device are mounted on a substrate using one or more silicon bridges, the second device comprises an input/output block mounted on one of the one or more silicon bridges.

Embodiment 487: The system of any of embodiments 441 to 484 in which the first device and the second device are mounted on a substrate comprising redistribution layers made in a fan-out wafer-level packaging (FoWLP) process.

Embodiment 488: An apparatus comprising:

a first chiplet configured to be optically coupled to a two-dimensional (2D) array of optical fiber cores; and wherein the first chiplet is configured to directly or indirectly send electrical signals to or receive electrical signals from a second chiplet, wherein the first chiplet has a geometry that enables the first chiplet to be substantially pitch-matched or quasi pitch-matched with the second chiplet.

Embodiment 489: The apparatus of embodiment 488, comprising the second chiplet.

Embodiment 490: The apparatus of embodiment 488 or 489 in which the first chiplet has a shoreline bandwidth density D1, the second chiplet has a shoreline bandwidth density D2, and D2≤5×D1.

Embodiment 491: The apparatus of embodiment 490 in which D2≤1.25×D1.

Embodiment 492: The apparatus of embodiment 491 in which D2≤1.1×D1.

Embodiment 493: The apparatus of any of embodiments 490 to 492, comprising a fiber optic connector attached to the first chiplet and configured to be optically coupled to the 2D array of optical fiber cores, in which the fiber optic connector has a third shoreline bandwidth density D3, and D2≤1.5×D3.

Embodiment 494: The apparatus of embodiment 493 in which D2≤1.25×D3.

Embodiment 495: The apparatus of embodiment 494 in which D2≤1.1×D3.

Embodiment 496: The apparatus of any of embodiments 488 to 495 in which the 2D array of optical fiber cores comprise a first number N1 of optical fiber cores along a first direction parallel to a first processor edge of the second chiplet, the 2D array of optical fiber cores have a second number N2 of optical fiber cores along a second direction orthogonal to the first direction, wherein at least one of (i) N2≥N1≥2, or (ii) N1=1 and N2≥2.

Embodiment 497: A method comprising maintaining a shoreline bandwidth density of at least 1 Gbps/mm from a data processing device to a fiber optic connector with no fan out or a fan out of not more than 50%.

Embodiment 498: The method of embodiment 497, comprising maintaining a shoreline bandwidth density of at least 10 Gbps/mm from the data processing device to the fiber optic connector with no fan out or a fan out of not more than 50%.

Embodiment 499: The method of embodiment 498, comprising maintaining a shoreline bandwidth density of at least 100 Gbps/mm from the data processing device to the fiber optic connector with no fan out or a fan out of not more than 50%.

Embodiment 500: The method of embodiment 499, comprising maintaining a shoreline bandwidth density of at least 1 Tbps/mm from the data processing device to the fiber optic connector with no fan out or a fan out of not more than 50%.

Embodiment 501: The method of embodiment 500, comprising maintaining a shoreline bandwidth density of at least 2 Tbps/mm from the data processing device to the fiber optic connector with no fan out or a fan out of not more than 50%.

Embodiment 502: The method of any of embodiments 497 to 501, comprising transmitting, through the fiber optic connector, signals between the data processing device and a 2D array of optical fiber cores having at least two rows and at least two columns of optical fiber cores, each row extending along a row direction parallel to a processor edge of the data processing device, each column extending along a column direction perpendicular to the row direction.

Embodiment 503: The method of embodiment 502, comprising transmitting, through the fiber optic connector, signals between the data processing device and a 2D array of optical fiber cores having at least two rows and at least four columns of optical fiber cores.

Embodiment 504: The method of embodiment 503, comprising transmitting, through the fiber optic connector, signals between the data processing device and a 2D array of optical fiber cores having at least two rows and at least eight columns of optical fiber cores.

Embodiment 505: The method of any of embodiments 497 to 501, comprising transmitting, through the fiber optic connector, signals between the data processing device and a 2D array of optical fiber cores having at least four rows and at least four columns of optical fiber cores, each row extending along a row direction parallel to a processor edge of the data processing device, each column extending along a column direction perpendicular to the row direction.

Embodiment 506: The method of any of embodiments 497 to 505, wherein the data processing device comprises at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device.

Embodiment 507: The method of embodiment 506, comprising providing a photonic module disposed in a signal path between the data processing device and the fiber optic connector; and maintaining the shoreline bandwidth density from the data processing device through the photonic module to the fiber optic connector with no fan out or a fan out of not more than 50% as signals are transmitted from the data processing device through the photonic module to the fiber optic connector;

wherein the photonic module comprises at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters.

Embodiment 508: The method of embodiment 507, wherein the photonic module comprises a plurality of grating couplers that are arranged in a two-dimensional pattern;

wherein the method comprises transmitting signals between the photonic module and a plurality of optical fiber cores arranged in a corresponding two-dimensional pattern through the grating couplers that are arranged in the two-dimensional pattern.

Embodiment 509: The method of embodiment 508, wherein the data processing device comprises a processor edge having a width W1, the shoreline bandwidth density is determined as an input/output interface rate per unit length of the processor edge; and wherein the plurality of grating couplers comprise a plurality of rows and a plurality of columns of grating couplers, each row extends along a row direction parallel to the processor edge, and each row of grating couplers occupies a width W2 that is no greater than 1.5×W1.

Embodiment 510: The method of any of embodiments 507 to 509, comprising using the data processing device to process electrical signals;

providing an electronic amplification module disposed in the signal path between the data processing device and the photonic module, in which the electronic amplification module comprises at least one of a driver amplifier or a transimpedance amplifier;

using the electronic amplification module to process electrical signals sent to or from the photonic module; and maintaining the shoreline bandwidth density from the data processing device through the electronic amplification module and the photonic module to the fiber optic connector with no fan out or a fan out of not more than 50% as signals are transmitted from the data processing device through the electronic amplification module and the photonic module to the fiber optic connector.

Embodiment 511: The method of embodiment 510, comprising providing a converter module disposed in the signal path between the data processing device and the electronic amplification module;

using the converter module to communicate with the data processing device using a first interface;

using the converter module to communicate with the electronic amplification module using a second interface;

using the converter module to convert signals between the first interface and the second interface; and maintaining the shoreline bandwidth density from the data processing device through the converter module, the electronic amplification module, and the photonic module to the fiber optic connector with no fan out or a fan out of not more than 50% as signals are transmitted from the data processing device through the converter module, the electronic amplification module, and the photonic module to the fiber optic connector.

Embodiment 512: The method of embodiment 511, wherein the first interface complies with at least one of BoW (bunch of wire) specification, AIB (advanced interface bus) specification, or UCIe (universal chiplet interconnect express) specification;

wherein the second interface complies with at least one of XLR (extra long reach) specification, LR (long reach) specification, MR (medium reach) specification, SR (short reach) specification, VSR (very short reach) specification, or XSR (extra short reach) specification; and wherein the converter module comprises at least one of an XLR-to-BoW converter, an LR-to-BoW converter, an MR-to-BoW converter, an SR-to-BoW converter, a VSR-to-BoW converter, an XSR-to-BoW converter, an XLR-to-AIB converter, an LR-to-AIB converter, an MR-to-AIB converter, an SR-to-AIB converter, a VSR-to-AIB converter, an XSR-to-AIB converter, an XLR-to-UCIe converter, an LR-to-UCIe converter, an MR-to-UCIe converter, an SR-to-UCIe converter, a VSR-to-UCIe converter, or an XSR-to-UCIe converter.

Embodiment 513: The method of embodiment 511, wherein the first interface complies with at least one of BoW (bunch of wire) specification, AIB (advanced interface bus) specification, or UCIe (universal chiplet interconnect express) specification;

wherein the second interface complies with at least one of LR (long reach) specification, MR (medium reach) specification, SR (short reach) specification, VSR (very short reach) specification, or XSR (extra short reach) specification; and wherein the converter module comprises at least one of an LR-to-BoW converter, an MR-to-BoW converter, an SR-to-BoW converter, a VSR-to-BoW converter, an XSR-to-BoW converter, an XLR-to-AIB converter, an LR-to-AIB converter, an MR-to-AIB converter, an SR-to-AIB converter, a VSR-to-AIB converter, an XSR-to-AIB converter, an XLR-to-UCIe converter, an LR-to-UCIe converter, an MR-to-UCIe converter, an SR-to-UCIe converter, a VSR-to-UCIe converter, or an XSR-to-UCIe converter.

Embodiment 514: The method of embodiment 511, wherein the first interface complies with at least one of XLR (extra long reach) specification, LR (long reach) specification, MR (medium reach) specification, SR (short reach) specification, VSR (very short reach) specification, or XSR (extra short reach) specification;

wherein the second interface complies with at least one of XLR (extra long reach) specification, LR (long reach) specification, MR (medium reach) specification, SR (short reach) specification, VSR (very short reach) specification, or XSR (extra short reach) specification; and wherein the converter module comprises at least one of an XLR-to-LR converter, an XLR-to-VSR converter, an XLR-to-MR converter, an XLR-to-SR converter, an XLR-to-XSR converter, an LR-to-MR converter, an LR-to-SR converter, an LR-to-VSR converter, an LR-to-XSR converter, an MR-to-SR converter, an MR-to-VSR converter, an MR-to-XSR converter, a VSR-to-XSR converter, or a SR-to-XSR converter.

Embodiment 515: The method of embodiment 511, wherein the first interface complies with at least one of LR (long reach) specification, MR (medium reach) specification, SR (short reach) specification, VSR (very short reach) specification, or XSR (extra short reach) specification;

wherein the second interface complies with at least one of LR (long reach) specification, MR (medium reach) specification, SR (short reach) specification, VSR (very short reach) specification, or XSR (extra short reach) specification; and wherein the converter module comprises at least one of an LR-to-MR converter, an LR-to-SR converter, an LR-to-VSR converter, an LR-to-XSR converter, an MR-to-SR converter, an MR-to-VSR converter, an MR-to-XSR converter, a VSR-to-XSR converter, or a SR-to-XSR converter.

Embodiment 516: A method comprising:

mounting a second chiplet on a temporary wafer carrier, in which the second chiplet is configured to at least one of transmit electrical signals to or receive electrical signals from a first chiplet that comprises electrical and optical components, the second chiplet comprises a first side and a second side, the second chiplet comprises conductive bumps on the second side, the second side of the second chiplet faces the wafer carrier;

overmolding the second chiplet and the wafer carrier by applying a molding compound over the second chiplet and the wafer carrier;

removing the wafer carrier from the second chiplet, exposing the conductive bumps on the second chiplet;

forming redistribution layers that are electrically coupled to at least some of the conductive bumps of the second chiplet;

forming a cavity in the redistribution layers, the cavity having dimensions in a lateral direction slightly larger than dimensions of the second chiplet;

forming a first opening in the molding compound at a first location;

inserting the first chiplet into the cavity in the redistribution layers, in which the first chiplet comprises optical couplers, the first opening in the molding compound and the redistribution layers are positioned above the optical couplers, the optical couplers are configured to be optically coupled to an external optical device through an optical path that passes the first opening in the molding compound and the redistribution layers; and electrically coupling at least some of electrical contacts of the first chiplet to at least some electrical contacts of the redistribution layers.

Embodiment 517: The method of embodiment 516 comprising passing an optical connector through the first opening in the molding compound and the redistribution layers, and optically coupling the optical connector to the optical couplers of the first chiplet.

Embodiment 518: The method of embodiment 516 or 517 in which forming a first opening in the molding compound comprises using at least one of etching or drilling to form the first opening in the molding compound at the first location.

Embodiment 518: The method of embodiment 516 or 517 in which forming a first opening in the molding compound comprises:

positioning a mechanical placeholder at the first location prior to applying the molding compound over the second chiplet and the wafer carrier, and removing the mechanical placeholder after applying the molding compound over the second chiplet and the wafer carrier to form the first opening in the molding compound at the first location.

Embodiment 520: A system comprising:

a semiconductor package comprising:

a first chiplet comprising a first side and a second side, in which the first chiplet comprises optical components that are optically coupled to an external optical device through an optical path that passes the first side of the first chiplet;

a second chiplet that is configured to at least one of transmit electrical signals to or receive electrical signals from the first chiplet;

a common substrate that includes alternating layers of electrically conductive material and electrically insulating material, in which the common substrate has a total thickness of less than 1 mm, the first chiplet is directly or indirectly mounted on the common substrate, the first chiplet is oriented such that the first side faces away from the common substrate and the second side faces towards the common substrate, the second chiplet is directly or indirectly mounted on the common substrate;

a molding compound that bonds to at least a portion of a surface of the first chiplet, at least a portion of a surface of the second chiplet, and at least a portion of a surface of the common substrate, in which the molding compound enhances a structural stability of the semiconductor package.

Embodiment 521: A method comprising:

providing a temporary wafer carrier having a two-side release tape on the temporary wafer carrier;

mounting a first chiplet on the two-side release tape, in which the first chiplet comprises a first side and a second side, the first chiplet comprises at least one optical coupler, the first chiplet is oriented such that the second side of the first chiplet faces towards the two-side release tape, the first chiplet comprises conductive bumps on the second side;

mounting a second chiplet on the two-side release tape, in which the second chiplet comprises a first side and a second side, the second chiplet is oriented such that the second side of the second chiplet faces towards the two-side release tape, the first chiplet comprises conductive bumps on the second side, the second chiplet is configured to at least one of transmit electrical signals to or receive electrical signals from the first chiplet;

overmolding the first chiplet, the second chiplet, and the temporary wafer carrier with the two-side release tape by applying a molding compound over the first chiplet, the second chiplet, and the temporary wafer carrier with the two-side release tape;

grinding the molding compounding to reduce a thickness of the molding compound until a first surface of the first chiplet is exposed;

removing the two-side tape and the carrier wafer from the first chiplet and the second chiplet, exposing the conductive bumps on the second side of the first chiplet and the conductive bumps on the second side of the second chiplet; and forming redistribution layers that are electrically coupled to the conductive bumps of the first chiplet and the conductive bumps on the second chiplet.

Embodiment 522: The method of embodiment 521, comprising attaching an optical connector to the first side of the first chiplet and aligning the optical connector with the at least one optical coupler of the first chiplet.

Embodiment 523: The method of embodiment 521 or 522 in which grinding the molding compounding comprises reducing the thickness of the molding compound until a second surface of the second chiplet is also exposed.

Embodiment 524: A method of fabricating a semiconductor package comprising a first chiplet having an electronic integrated circuit and a second chiplet having a photonic integrated circuit, the photonic integrated circuit having at least one optical coupler, the method comprising:

mounting the first chiplet and the second chiplet on a temporary wafer carrier;

applying a molding compound over the first chiplet, the second chiplet, and the temporary wafer carrier;

exposing at least a portion of a first surface of the second chiplet such that the exposed portion of the first surface is not covered by the molding compound to enable the at least one optical coupler to gain access to an optical path that extends to outside of the semiconductor package;

removing the temporary wafer carrier from the first chiplet and the second chiplet; and forming redistribution layers that are coupled to the first chiplet and the second chiplet.

Embodiment 525: A system comprising:

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

a third chiplet comprising a converter module and an electronic amplification module, wherein the converter module and the electronic amplification module are formed on a monolithic semiconductor die;

wherein the electronic amplification module comprises at least one of a driver amplifier or a transimpedance amplifier, and configured to process electrical signals sent to or from the photonic module;

wherein the converter module is configured to convert signals between a first interface and a second interface, in which the converter module is configured to communicate with a first chiplet using the first interface, and the converter module is configured to communicate with the electronic amplification module using the second interface.

Embodiment 526: The system of embodiment 525 in which each of the first and second chiplets has a length, a width, and a height, and the height is at most 30% of the shorter of the length and width.

Embodiment 527: The system of embodiment 525 or 526, comprising a common substrate, in which the second chiplet and the third chiplet are directly or indirectly mounted on the common substrate.

Embodiment 528: The system of embodiment 527 in which each of the second and third chiplets comprises a semiconductor substrate that is cut from a semiconductor wafer, the chiplet has a first length and a first width immediately after being cut from the semiconductor wafer, the chiplet has a second length and a second width immediately prior to being mounted on the common substrate, the second length is not more than twice the first length, the second width is not more than twice the first width.

Embodiment 529: The system of embodiment 527 or 528 in which the photonic module comprises an optically active layer that comprises active photonic components, the photonic module has an optically active side and a back side, at least some of the active photonic components are closer to the optically active side than the back side;

wherein the second chiplet is oriented such that the back side of the photonic module faces towards the common substrate;

wherein the second chiplet comprises conductive vias that electrically couple the optically active layer to the back side of the photonic module.

Embodiment 530: The system of embodiment 527 or 528 in which the photonic module comprises an optically active layer that comprises active photonic components, the photonic module has an optically active side and a back side, at least some of the active photonic components are closer to the optically active side than the back side;

wherein the second chiplet is oriented such that the optically active side of the photonic module faces towards the common substrate.

Embodiment 531: The system of embodiment 530 in which the photonic module comprises back-side illuminated couplers, each back-side illuminated coupler is configured to receive a light beam incident on the back side of the photonic module or emit a light beam that exits the back side of the photonic module.

Embodiment 532: The system of embodiment 531 in which the back-side illuminated couplers are arranged in a two-dimensional configuration.

Embodiment 533: The system of embodiment 531 in which the backside illuminated couplers are arranged in a one-dimensional configuration.

Embodiment 534: The system of any of embodiments 530 to 533 in which the photonic module comprises a first substrate and a first layer formed on the first substrate, the first substrate comprises a first material having a first refractive index, the first layer comprises a second material having a second refractive index that is smaller than the first refractive index, wherein the first substrate comprises a first side and a second side, the first side of the first substrate faces towards the first layer, the second side of the first substrate forms or faces towards the back side of the photonic module, wherein the first layer is disposed between the first substrate and the optically active layer of the photonic module, wherein the first substrate defines one or more openings that extend from the first side of the first substrate to the second side of the first substrate to allow one or more light beams directed toward the back side of the photonic module to pass through the one or more openings to reach the first layer.

Embodiment 535: The system of embodiment 534 in which the one or more openings in the first substrate expose one or more regions of a surface of the first layer, and an antireflective coating is provided on the exposed one or more regions of the surface of the first layer.

Embodiment 536: The system of embodiment 535 in which the antireflective coating is configured to reduce the intensity of reflection of incident light having a wavelength in a predetermined range to at most 5% of the intensity of the incident light.

Embodiment 537: The system of embodiment 535 or 536 in which an antireflective coating is provided on the second side of the first substrate.

Embodiment 538: The system of any of embodiments 534 to 537 in which the first substrate has a first refractive index greater than 3.7, and the first layer has a second refractive index less than 3.1 for light having a wavelength in a range from 1250 mm to 1620 mm.

Embodiment 539: The system of embodiment 538 in which the first substrate comprises a silicon substrate and the first layer comprises a buried oxide silica layer.

Embodiment 540: The system of any of embodiments 534 to 539 in which the first substrate has a thickness in a range from 100 μm to 500 μm, and the first layer has a thickness in a range from 0.5 μm to 10 μm.

Embodiment 541: The system of embodiment 540 in which the first layer has a thickness in a range from 1 μm to 5 μm.

Embodiment 542: The system of any of embodiments 534 to 541 in which each of the one or more openings has a diameter in a range from 10 μm to 100 μm.

Embodiment 543: The system of any of embodiments 530 to 542 in which the photonic module comprises a layer on the backside of the photonic module that includes microlenses configured to focus incoming light traveling in an optical path toward the back-side illuminated couplers, or to collimate outgoing light traveling in optical paths away from the back-side illuminated couplers.

Embodiment 544: The system of any of embodiments 527 to 543 in which the second chiplet is directly mounted on the common substrate, and the third chiplet is directly mounted on the common substrate.

Embodiment 545: The system of any of embodiments 527 to 543 in which the second chiplet is mounted on the third chiplet, and the third chiplet is directly mounted on the common substrate.

Embodiment 546: The system of embodiment 545 in which the third chiplet has an electrically active layer, wherein the third chiplet has an electrically active side and a back side, the electrically active layer is closer to the electrically active side than the back side, wherein the third chiplet is oriented such that the back side faces towards the common substrate;

wherein the third chiplet comprises conductive vias that extend from the electrically active layer to the back side.

Embodiment 547: The system of any of embodiments 527 to 543 in which the second chiplet and the third chiplet are mounted on a second substrate comprising through vias, the second substrate is mounted on the common substrate, wherein the converter module is electrically coupled to the common substrate using the through vias in the second substrate.

Embodiment 548: The system of any of embodiments 527 to 543, comprising a second substrate comprising through vias, in which the second substrate is directly mounted on the common substrate, the second substrate is directly mounted on the common substrate, the third chiplet is partially mounted on the second chiplet and the second substrate, wherein the third chiplet is electrically coupled to the common substrate using the through vias in the second substrate.

Embodiment 549: The system of any of embodiments 527 to 543 in which the common substrate defines a cavity or a through-hole;

wherein the third chiplet is partially mounted on the second chiplet and partially mounted on the common substrate, in which the second chiplet is disposed at least partially in the cavity or the through-hole.

Embodiment 550: The system of any of embodiments 527 to 543 in which the common substrate defines a partial through-hole having a first portion that extends partly through the common substrate and a second portion that extend completely through the common substrate and defines an opening, wherein a thinned portion of the common substrate is disposed above the first portion of the partial through-hole;

wherein the third chiplet is partially mounted on the second chiplet and partially mounted on the common substrate, the second chiplet is disposed at least partially in the cavity or the through-hole, a first portion of the second chiplet is covered by the thinned portion of the common substrate, and a second portion of the second chiplet is exposed by the opening of the partial through-hole;

wherein the electronic amplification module is electrically coupled to the first portion of the optically active layer of the photonic module using conductive vias through the thinned portion of the common substrate.

Embodiment 551: The system of any of embodiments 547 to 550 in which the second substrate comprise a silicon substrate comprising through-silicon vias.

Embodiment 552: A system comprising:

a semiconductor package comprising a first chiplet and a second chiplet;

wherein the first chiplet comprises a data processing module;

wherein the second chiplet comprises a photonic module comprising an optically active layer comprising active photonic components, the photonic module has an optically active side and a back side, at least some of the active photonic components are closer to the optically active side than the back side;

wherein the photonic module comprises back-side illuminated couplers arranged in a two-dimensional configuration, each back-side illuminated coupler is configured to receive light incident on the back side of the photonic module or emit light that exits the back side of the photonic module;

wherein the photonic module comprises a first substrate and a first layer formed on the first substrate, the first substrate comprises a first material having a first refractive index, the first layer comprises a second material having a second refractive index that is smaller than the first refractive index;

wherein the first substrate comprises a first side and a second side, the first side of the first substrate faces towards the first layer, the second side of the first substrate forms or faces towards the backside of the photonic module;

wherein the photonic module is configured to perform at least one of (i) convert output electrical signals provided by the data processing module to output optical signals that are transmitted to an external optical link through the back-side illuminated couplers, or (ii) convert input optical signals received through the back-side illuminated couplers to input electrical signals that are provided to the data processing module.

Embodiment 553: The system of embodiment 552 in which the first layer of the photonic module is disposed between the first substrate of the photonic module and the optically active layer of the photonic module, wherein the first substrate defines one or more openings that extend from the first side of the first substrate to the second side of the first substrate to allow one or more light beams directed toward the backside of the photonic module to pass through the one or more openings to reach the first layer.

Embodiment 554: The system of embodiment 553 in which the one or more openings in the first substrate of the photonic module expose one or more regions of a surface of the first layer of the photonic module, and an antireflective coating is provided on the exposed one or more regions of the surface of the first layer.

Embodiment 555: The system of embodiment 554 in which the antireflective coating is configured to reduce reflection of light having a wavelength in a predetermined range to at most 10%.

Embodiment 556: A system comprising:

a semiconductor package comprising a first chiplet, a second chiplet, a third chiplet, a fourth chiplet, and a common substrate;

wherein the first chiplet comprises a data processing module;

wherein the second chiplet comprises a photonic module comprising back-side illuminated couplers arranged in a two-dimensional configuration, each back-side illuminated coupler is configured to receive light incident on the back side of the photonic module or emit light that exits the back side of the photonic module;

wherein the fourth chiplet comprises an electronic amplification module comprising at least one of (i) a driver amplifier configured to amplify electrical signals transmitted to the photonic module, or (ii) a transimpedance amplifier configured to amplify electrical signals transmitted from the photonic module;

wherein the third chiplet comprises a converter module configured to convert signals between a first interface and a second interface, in which the data processing module communicates with the converter module using the first interface that complies with a first die-to-die interface specification, and the converter module communicates with the electronic amplification module using the second interface that complies with a second die-to-die interface specification;

wherein the first chiplet is mounted on the common substrate;

wherein the second chiplet, third chiplet, and fourth chiplet are directly or indirectly mounted on the common substrate.

Embodiment 557: The system of embodiment 556 in which the second chiplet is mounted on the common substrate, the fourth chiplet is mounted on the common substrate, and the third chiplet is mounted on the common substrate.

Embodiment 558: The system of embodiment 556 in which the second chiplet is mounted on the fourth chiplet, and the fourth chiplet is mounted on the common substrate.

Embodiment 559: The system of embodiment 556 in which the second chiplet is mounted on the fourth chiplet, the fourth chiplet is mounted on the third chiplet, and the third chiplet is mounted on the common substrate.

Embodiment 560: The system of embodiment 556 in which the semiconductor package comprise a second silicon substrate that is mounted on the common substrate, the second chiplet is mounted on the second silicon substrate, the fourth chiplet is mounted on the second silicon substrate, and the third chiplet is mounted on the second silicon substrate.

Embodiment 561: A system comprising:

a semiconductor package comprising a first chiplet, a second chiplet, a third chiplet, a fourth chiplet, and a common substrate made in a fan-out wafer-level packaging (FoWLP) process;

wherein the first chiplet comprises a data processing module;

wherein the second chiplet comprises a photonic module comprising couplers arranged in a two-dimensional configuration, each coupler is configured to receive incident light or emit output light;

wherein the fourth chiplet comprises an electronic amplification module configured to amplify electrical signals transmitted to or from the photonic module;

wherein the third chiplet comprises a converter module configured to convert signals between a first interface and a second interface, in which the data processing module communicates with the converter module using the first interface that complies with a first die-to-die interface specification, and the converter module communicates with the electronic amplification module using the second interface that complies with a second die-to-die interface specification;

wherein the first chiplet is mounted on the common substrate;

wherein the second chiplet, third chiplet, and fourth chiplet are directly or indirectly mounted on the common substrate;

molding compound surrounding at least a portion of the first chip, wherein the molding compound surrounds at least a portion of at least one of the second chiplet, third chiplet, or fourth chiplet, wherein the molding compound surrounds at least a portion of a surface of the common substrate, and the molding compound is configured to enhance a structural stability of the semiconductor package.

Embodiment 562: A system comprising:

a semiconductor package comprising a first chiplet, a second chiplet, a third chiplet, and a common substrate;

wherein the first chiplet comprises a data processing module;

wherein the second chiplet comprises a photonic module and an electronic amplification module;

wherein the photonic module comprises back-side illuminated couplers arranged in a two-dimensional configuration, each back-side illuminated coupler is configured to receive light incident on the back side of the photonic module or emit light that exits the back side of the photonic module;

wherein the electronic amplification module comprises at least one of (i) a driver amplifier configured to amplify electrical signals transmitted to the photonic module, or (ii) a transimpedance amplifier configured to amplify electrical signals transmitted from the photonic module;

wherein the third chiplet comprises a converter module configured to convert signals between a first interface and a second interface, in which the data processing module communicates with the converter module using the first interface that complies with a first die-to-die interface specification, and the converter module communicates with the electronic amplification module using the second interface that complies with a second die-to-die interface specification;

wherein the first chiplet is mounted on the common substrate;

wherein the second chiplet and third chiplet are directly or indirectly mounted on the common substrate.

Embodiment 563: A system comprising:

a semiconductor package comprising a first chiplet, a second chiplet, a third chiplet, and a common substrate;

wherein the first chiplet comprises a data processing module;

wherein the second chiplet comprises a photonic module comprising back-side illuminated couplers arranged in a two-dimensional configuration, each back-side illuminated coupler is configured to receive light incident on the back side of the photonic module or emit light that exits the back side of the photonic module;

wherein the third chiplet comprises a converter module and an electronic amplification module;

wherein the electronic amplification module is configured to amplify electrical signals transmitted to or from the photonic module;

wherein the converter module is configured to convert a first set of a first number of bit streams from the data processing module, each bit stream at a first bit rate, to a second set of a second number of bit streams to the electronic amplification module, each bit stream at a second bit rate;

wherein the first chiplet is mounted on the common substrate;

wherein the second chiplet and third chiplet are directly or indirectly mounted on the common substrate.

Embodiment 564: A system comprising:

a semiconductor package comprising a first chiplet, a second chiplet, and a common substrate;

wherein the first chiplet comprises a data processing module;

wherein the second chiplet comprises a photonic module, an electronic amplification module, and a converter module;

wherein the photonic module comprises back-side illuminated couplers arranged in a two-dimensional configuration, each back-side illuminated coupler is configured to receive light incident on the back side of the photonic module or emit light that exits the back side of the photonic module;

wherein the electronic amplification module comprises at least one of (i) a driver amplifier configured to amplify electrical signals transmitted to the photonic module, or (ii) a transimpedance amplifier configured to amplify electrical signals transmitted from the photonic module;

wherein the converter module is configured to convert a first set of a first number of bit streams from the data processing module, each bit stream at a first bit rate, to a second set of a second number of bit streams to the electronic amplification module, each bit stream at a second bit rate;

wherein the first chiplet and the second chiplet are mounted on the common substrate.

Embodiment 565: A system comprising:

a semiconductor package comprising a first chiplet, a second chiplet, a third chiplet, a fourth chiplet, and a common substrate;

wherein the first chiplet comprises a data processing module;

wherein the second chiplet comprises a photonic module comprising front-side illuminated couplers arranged in a two-dimensional configuration, each front-side illuminated coupler is configured to receive light incident on the front side of the photonic module or emit light that exits the front side of the photonic module;

wherein the photonic module is configured to perform at least one of (i) convert input optical signals to high speed serial input electrical signals, or (ii) convert high speed serial output electrical signals to output optical signals;

wherein the fourth chiplet comprises an electronic amplification module configured to amplify at least one of (i) the high speed serial output electrical signals transmitted to the photonic module, or (ii) the high speed serial input electrical signals transmitted from the photonic module;

wherein the third chiplet comprises a converter module configured to perform at least one of (i) convert the high speed serial input electrical signals from the electronic amplification module to low speed parallel input electrical signals transmitted to the data processing module, or (ii) convert low speed parallel output electrical signals transmitted from the data processing module to high speed serial output electrical signals transmitted to the electronic amplification module;

wherein the first chiplet is mounted on the common substrate;

wherein at least one of the second chiplet, third chiplet, or fourth chiplet is mounted on the common substrate.

Embodiment 566: A system comprising:

a semiconductor package comprising a first chiplet, a second chiplet, a third chiplet, and a common substrate;

wherein the first chiplet comprises a data processing module, and the first chiplet is mounted on the common substrate;

wherein the second chiplet comprises a photonic module comprising an optically active layer comprising active photonic components, the photonic module has an optically active side and a backside, at least some of the active photonic components are closer to the optically active side than the backside;

wherein the photonic module comprises front-side illuminated couplers arranged in a two-dimensional configuration, each front-side illuminated coupler is configured to receive light incident on the front side of the photonic module or emit light that exits the front side of the photonic module;

wherein the photonic module comprises a first substrate, the optically active layer is formed on the first substrate, and the first substrate comprises conductive vias that electrically couple at least some of the active photonic components to the backside of the photonic module;

wherein the third chiplet comprises an electronic amplification module comprising at least one of a driver amplifier or a transimpedance amplifier;

wherein the second chiplet is mounted on the third chiplet with the backside of the photonic module facing towards the electronic amplification module;

wherein the third chiplet is mounted on the common substrate.

Embodiment 567: A system comprising:

a common substrate;

a first integrated circuit (IC) configured to processes data;

a converter integrated circuit;

an analog electronic amplification integrated circuit configured to amplify electrical signals;

wherein the first integrated circuit, the converter integrated circuit, and the electronic amplification integrated circuit are mounted on the common substrate;

wherein the common substrate comprises at least one of an organic substrate, a ceramic substrate, a silicon interposer, a substrate using silicon bridges, or a substrate made in a fan-out wafer-level packaging (FoWLP) process;

a photonic integrated circuit comprising an optically active layer that comprises active photonic components, the photonic integrated circuit has an optically active side and a backside, at least some of the active photonic components are closer to the optically active side than the backside;

wherein the photonic integrated circuit comprises back-side illuminated couplers arrange in a two-dimensional configuration, each back-side illuminated coupler is configured to receive a light beam incident on the back side of the photonic integrated circuit or emit a light beam that exits the back side of the photonic integrated circuit;

wherein the photonic integrated circuit is mounted on the electronic amplification integrated circuit with the optically active side of the photonic integrated circuit facing towards the electronic amplification integrated circuit;

wherein the common substrate comprises first signal lines configured to enable transmission of first electrical signals between the first integrated circuit and the converter integrated circuit, and second signal lines configured to enable transmission of second electrical signals between the converter integrated circuit and the analog electronic amplification integrated circuit.

Embodiment 568: The system of embodiment 567 in which the first integrated circuit comprises at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device.

Embodiment 569: The system of embodiment 567 or 568 in which the converter integrated circuit is configured to convert a first set of a first number of bit streams from the first IC, each at a first bit rate, to a second set of a second number of bit streams to the analog electronic amplification IC, each at a second bit rate.

Embodiment 570: The system of embodiment 569 in which the product of the first number of bit streams and the first bit rate is approximately equal to the product of the second number of bit streams and the second bit rate.

Embodiment 571: The system of embodiment 569 or 570 in which the second bit rate is at least twice the first bit rate.

Embodiment 572: The system of embodiment 571 in which the second bit rate is at least 4 times the first bit rate.

Embodiment 573: The system of embodiment 572 in which the second bit rate is at least 8 times the first bit rate.

Embodiment 574: The system of any of embodiments 567 to 573 in which the converter IC comprises at least one of an XLR (extra long reach)-to-BoW (bunch of wire) converter, an LR (long reach)-to-BoW converter, an MR (medium reach)-to-BoW converter, a SR (short reach)-to-BoW converter, an XSR (extra short reach)-to-BoW converter, an XLR-to-AIB (advanced interface bus) converter, an LR-to-AIB converter, an MR-to-AIB converter, an SR-to-AIB converter, an XSR-to-AIB converter, an XLR-to-UCIe (universal chiplet interconnect express) converter, an LR-to-UCIe converter, an MR-to-UCIe converter, an SR-to-UCIe converter, or an XSR-to-UCIe converter.

Embodiment 575: The system of any of embodiments 567 to 573 in which the converter IC comprises at least one of an LR (long reach)-to-BoW converter, an MR (medium reach)-to-BoW converter, a SR (short reach)-to-BoW converter, an XSR (extra short reach)-to-BoW converter, an LR-to-AIB converter, an MR-to-AIB converter, an SR-to-AIB converter, an XSR-to-AIB converter, an LR-to-UCIe converter, an MR-to-UCIe converter, an SR-to-UCIe converter, or an XSR-to-UCIe converter.

Embodiment 576: The system of any of embodiments 567 to 573 in which the converter IC comprises at least one of an XLR (extra long reach)-to-LR (long reach) converter, an XLR-to-MR (medium reach) converter, an XLR-to-SR (short reach) converter, an XLR-to-XSR (extra short reach) converter, an LR-to-MR converter, an LR-to-SR converter, an LR-to-XSR converter, an MR-to-SR converter, an MR-to-XSR converter, or a SR-to-XSR converter.

Embodiment 577: The system of any of embodiments 567 to 573 in which the converter IC comprises at least one of an LR-to-MR converter, an LR-to-SR converter, an LR-to-XSR converter, an MR-to-SR converter, an MR-to-XSR converter, or a SR-to-XSR converter.

Embodiment 578: The system of any of embodiments 567 to 573 in which the converter IC comprises a continuous-time linear equalizer.

Embodiment 579: The system of any of embodiments 567 to 573 or 578 in which the converter integrated circuit comprises at least one of an XLR (extra long reach)-to-XLR retimer, an LR (long reach)-to-LR retimer, an MR (medium reach)-to-MR retimer, a SR (short reach)-to-SR retimer, an XSR (extra short reach)-to-XSR retimer, a BoW (bunch of wire)-to-BoW retime, an AIB (advanced interface bus)-to-AIB retimer, or a UCIe (universal chiplet interconnect express)-to-UCIe retimer.

Embodiment 580: The system of any of embodiments 567 to 573 or 578 in which the converter integrated circuit comprises at least one of an LR (long reach)-to-LR retimer, an MR (medium reach)-to-MR retimer, a SR (short reach)-to-SR retimer, an XSR (extra short reach)-to-XSR retimer, a BoW (bunch of wire)-to-BoW retime, an AIB (advanced interface bus)-to-AIB retimer, or a UCIe (universal chiplet interconnect express)-to-UCIe retimer.

Embodiment 581: The system of any of embodiments 567 to 579 in which the analog electronic amplification integrated circuit comprises at least one of a driver amplifier or a transimpedance amplifier (TIA).

Embodiment 582: The system of any of embodiments 567 to 581 in which the photonic integrated circuit comprises optical components comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

wherein the photonic integrated circuit comprises optical waveguides to implement and/or interconnect the optical components.

Embodiment 583: The system of any of embodiments 567 to 582 in which the photonic integrated circuit comprises a first substrate and a first layer formed on the first substrate, the first substrate comprises a first material having a first refractive index, the first layer comprises a second material having a second refractive index that is smaller than the first refractive index, wherein the first substrate comprises a first side and a second side, the first side of the first substrate faces towards the first layer, the second side of the first substrate forms or faces towards the backside of the photonic integrated circuit, wherein the first layer is disposed between the first substrate and the optically active layer of the photonic integrated circuit, wherein the first substrate defines one or more openings that extend from the first side of the first substrate to the second side of the first substrate to allow one or more light beams directed toward the backside of the photonic integrated circuit to pass through the one or more openings to reach the first layer.

Embodiment 584: The system of embodiment 583 in which the one or more openings in the first substrate expose one or more regions of a surface of the first layer, and an antireflective coating is provided on the exposed one or more regions of the surface of the first layer.

Embodiment 585: The system of embodiment 584 in which the antireflective coating is configured to reduce reflection of light having a wavelength in a predetermined range to at most 10%.

Embodiment 586: The system of embodiment 583 or 584 in which an antireflective coating is provided on the second side of the first substrate.

Embodiment 587: The system of any of embodiments 583 to 586 in which the first substrate has a first refractive index greater than 3.7, and the first layer has a second refractive index less than 3.1 for light having a wavelength in a range from 1250 mm to 1620 mm.

Embodiment 588: The system of embodiment 587 in which the first substrate comprises a silicon substrate and the first layer comprises a buried oxide silica layer.

Embodiment 589: The system of any of embodiments 583 to 588 in which the first substrate has a thickness in a range from 100 μm to 500 μm, and the first layer has a thickness in a range from 0.5 μm to 10 μm.

Embodiment 590: The system of embodiment 589 in which the first layer has a thickness in a range from 1 μm to 5 μm.

Embodiment 591: The system of any of embodiments 583 to 590 in which each of the one or more openings has a diameter in a range from 10 μm to 100 μm.

Embodiment 592: The system of any of embodiments 567 to 582 in which the photonic integrated circuit comprises a layer on the backside of the photonic IC that includes microlenses configured to focus incoming light traveling in an optical paths toward the back-side illuminated couplers, or to collimate outgoing light traveling in optical paths away from the back-side illuminated couplers.

Embodiment 593: The system of any of embodiments 567 to 591 in which the first IC communicates with the converter IC through a die-to-die interface that complies with at least one of XLR (extra long reach) specification, LR (long reach) specification, MR (medium reach) specification, SR (short reach) specification, XSR (extra short reach) specification, BoW (bunch of wire) specification, AIB (advanced interface bus) specification, or UCIe (universal chiplet interconnect express) specification.

Embodiment 594: The system of any of embodiments 567 to 591 in which the first IC communicates with the converter IC through a die-to-die interface that complies with at least one of LR (long reach) specification, MR (medium reach) specification, SR (short reach) specification, XSR (extra short reach) specification, BoW (bunch of wire) specification, AIB (advanced interface bus) specification, or UCIe (universal chiplet interconnect express) specification.

Embodiment 595: The system of any of embodiments 567 to 591 in which the converter IC communicates with the analog electronic amplification IC through a second interface that complies with at least one of XLR (extra long reach) specification, LR (long reach) specification, MR (medium reach) specification, SR (short reach) specification, XSR (extra short reach) specification, BoW (bunch of wire) specification, AIB (advanced interface bus) specification, or UCIe (universal chiplet interconnect express) specification.

Embodiment 596: The system of any of embodiments 567 to 591 in which the converter IC communicates with the analog electronic amplification IC through a second interface that complies with at least one of LR (long reach) specification, MR (medium reach) specification, SR (short reach) specification, XSR (extra short reach) specification, BoW (bunch of wire) specification, AIB (advanced interface bus) specification, or UCIe (universal chiplet interconnect express) specification.

Embodiment 597: The system of any of embodiments 567 to 595 in which the active photonic components are electrically coupled to an electrically active layer of the electronic amplification IC, and the electrically active layer of the electronic amplification IC is electrically coupled to the common substrate using conductive vias in the electronic amplification integrated circuit.

Embodiment 598: The system of any of embodiments 567 to 597 in which the photonic integrated circuit is configured to transmit first data signals to the analog electronic amplification integrated circuit, at least a portion of the first data signals have a data rate of at least 1 Gbps, and the photonic integrated circuit is configured to receive electrical power that is transmitted from power lines on the common substrate through the conductive vias in the electronic amplification integrated circuit.

Embodiment 599: The system of any of embodiments 567 to 598 in which the photonic integrated circuit is configured to receive and/or transmit control signals through the conductive vias in the electronic amplification integrated circuit, wherein the control signals are configured to control operations of at least one of the electronic amplification IC or the photonic integrated circuit.

Embodiment 600: The system of any of embodiments 567 to 599 in which the photonic integrated circuit is configured to convert input optical signals to a first set of a first number of bit streams of electrical signals, each bit stream at a first bit rate, at least some of the bit streams each has a data rate of at least 1 Gbps, the analog electronic amplification integrated circuit is configured to amplify the first set of the first number of bit streams of electrical signals to generate amplified first set of the first umber of electrical signals, and the converter integrated circuit is configured to convert the amplified first set of the first number of electrical signals to a second set of a second number of bit streams of electrical signals, each bit stream at a second bit rate, and send the second set of the second number of bit streams of electrical signals to the first integrated circuit.

Embodiment 601: The system of embodiment 600 in which the photonic integrated circuit is configured to convert input optical signals to a first set of electrical signals, at least some of the first set of electrical signals have a data rate of at least 10 Gbps, the analog electronic amplification integrated circuit is configured to amplify the first set of electrical signals to generate amplified first set of electrical signals, the converter integrated circuit is configured to convert the amplified first set of electrical signals to a second set of electrical signals and send the second set of electrical signals to the first integrated circuit.

Embodiment 602: The system of embodiment 601 in which the photonic integrated circuit is configured to convert input optical signals to a first set of electrical signals, at least some of the first set of electrical signals have a data rate of at least 100 Gbps, the analog electronic amplification integrated circuit is configured to amplify the first set of electrical signals to generate amplified first set of electrical signals, the converter integrated circuit is configured to convert the amplified first set of electrical signals to a second set of electrical signals and send the second set of electrical signals to the first integrated circuit.

Embodiment 603: The system of any of embodiments 567 to 602 in which the first integrated circuit is configured to send a second set of electrical signals to the converter integrated circuit, at least some of the second set of electrical signals have a data rate of at least 1 Gbps, the converter integrated circuit is configured to convert the second set of electrical signals to a first set of electrical signals, and the analog electronic amplification integrated circuit is configured to amplify the first set of electrical signals to generate amplified first set of electrical signals and send the amplified first set of electrical signals to the photonic integrated circuit.

Embodiment 604: The system of embodiment 603 in which the first integrated circuit is configured to send a second set of electrical signals to the converter integrated circuit, at least some of the second set of electrical signals have a data rate of at least 10 Gbps, the converter integrated circuit is configured to convert the second set of electrical signals to a first set of electrical signals, and the analog electronic amplification integrated circuit is configured to amplify the first set of electrical signals to generate amplified first set of electrical signals and send the amplified first set of electrical signals to the photonic integrated circuit.

Embodiment 605: The system of embodiment 604 in which the first integrated circuit is configured to send BoW signals to the converter integrated circuit, at least some of the BoW signals have a data rate of at least 100 Gbps to the converter integrated circuit, the converter integrated circuit is configured to convert the BoW signals to XSR signals, and the analog electronic amplification integrated circuit is configured to amplify the XSR signals to generate amplified XSR signals and send the amplified XSR signals to the photonic integrated circuit.

Embodiment 606: The system of any of embodiments 600 to 605 in which the converter integrated circuit comprises a first set of electrical contacts configured to receive or transmit BoW signals, and a second set of electrical contacts configured to receive or transmit XSR signals, the first set of electrical contacts comprise fine-pitched bump contacts and/or lanes, the second set of electrical contacts comprise coarse-pitched bump contacts and/or lanes, at least some of the fine-pitched bump contacts and/or lanes have a first pitch, and at least some of the coarse-pitched bump contacts and/or lanes have a second pitch.

Embodiment 607: The system of any of embodiments 567 to 606 in which the common substrate supports a mixture of fine-pitched and coarse-pitched bump contacts and/or lanes, at least some of the fine-pitched bump contacts and/or lanes have a first pitch, and at least some of the coarse-pitched bump contacts and/or lanes have a second pitch.

Embodiment 608: The system of embodiment 607 in which the fine-pitched bump contacts and/or lanes comprise bunch-of-wire (BoW) bump contacts and/or lanes, and the coarse-pitched bump contacts and/or lanes comprise extra-short-reach (XSR) bump contacts and/or lanes.

Embodiment 609: The system of any of embodiments 567 to 608 in which the back-side illuminated couplers comprise back-side illuminated grating couplers.

Embodiment 610: The system of any of embodiments 567 to 609 in which the back-side illuminated couplers are arrange in a two-dimensional configuration that comprises at least two rows and at least eight columns of couplers.

Embodiment 611: The system of embodiment 610 in which the back-side illuminated couplers are arrange in a two-dimensional configuration that comprises at least four rows and at least eight columns of couplers.

Embodiment 612: The system of embodiment 611 in which the back-side illuminated couplers are arrange in a two-dimensional configuration that comprises at least six rows and at least eight columns of couplers.

Embodiment 613: The system of any of embodiments 567 to 612 in which the common substrate comprises a silicon interposer.

Embodiment 614: The system of any of embodiments 567 to 612 in which the common substrate comprises a redistribution layer.

Embodiment 615: The system of any of embodiments 567 to 612 in which the common substrate comprises a fine-pitched silicon interposer embedded in a coarse-pitched substrate, the fine-pitched silicon interposer comprises a set of fine-pitched bump contacts and/or lanes, the coarse-pitched substrate comprises a set of coarse-pitched bump contacts and/or lanes, the set of fine-pitched bump contacts and/or lanes have a first minimum spacing, the set of coarse-pitched bump contacts and/or lanes have a second minimum spacing that is greater than the first minimum spacing.

Embodiment 616: The system of embodiment 615 in which the coarse-pitched substrate comprises at least one of a ceramic substrate or an organic high density build-up substrate.

Embodiment 617: The system of any of embodiments 567 to 615, comprising a fiber array connector attached to the backside of the photonic integrated circuit, in which the fiber array connector is configured to be coupled to a fiber optic cable comprising multiple fiber cores arranged in a two-dimensional configuration.

Embodiment 618: The system of embodiment 617 in which the fiber array connector comprises optics to focus or collimate light beams that are transmitted between the multiple fiber cores and the backside illuminated couplers of the photonic integrated circuit.

Embodiment 619: The system of any of embodiments 567 to 618 in which the photonic integrated circuit has a lateral footprint that is substantially the same as a footprint of the analog electronic amplification integrated circuit.

Embodiment 620: The system of any of embodiments 567 to 618 in which a portion of the photonic integrated circuit overhangs the analog electronic amplification integrated circuit.

Embodiment 621: The system of any of embodiments 567 to 618 in which the photonic integrated circuit comprises two or more separate photonic integrated circuit subunits that are mounted on the electronic amplification integrated circuit.

Embodiment 622: The system of any of embodiments 567 to 618 in which the electronic amplification integrated circuit comprise two or more electronic amplification integrated circuit subunits, and the photonic integrated circuit is mounted on the two or more electronic amplification integrated circuit subunits.

Embodiment 623: The system of any of embodiments 567 to 622 in which the electronic amplification integrated circuit is mounted on the converter integrated circuit such that the photonic integrated circuit, the analog electronic amplification integrated circuit, and the converter integrated circuit form a stack.

Embodiment 624: The system of any of embodiments 567 to 622 in which the converter integrated circuit and the analog electronic amplification integrated circuit are mounted on a silicon carrier, and the silicon carrier is mounted on the common substrate.

Embodiment 625: The system of embodiment 624 in which the silicon carrier comprises a set of fine-pitch through-silicon vias and a set of coarse-pitch through-silicon vias, the fine-pitch through-silicon vias have a minimum spacing that is smaller than the minimum spacing of the coarse-pitch through-silicon vias.

Embodiment 626: The system of embodiment 625 in which the converter integrated circuit comprises an XSR-to-BoW converter, and the fine-pitch through-silicon vias are configured to carry the BoW signals.

Embodiment 627: The system of any of embodiments 567 to 626, comprising a molding compound that encapsulates at least a portion of at least one of the common substrate, the first integrated circuit, the converter integrated circuit, the analog electronic amplification integrated circuit, or the photonic integrated circuit.

Embodiment 628: The system of any of embodiments 567 to 627 in which the converter integrated circuit is positioned between the first IC and the analog electronic amplification integrated circuit, wherein the first IC and the converter integrated circuit are pitch matched to each other.

Embodiment 629: The system of embodiment 628 in which the converter IC and the analog electronic amplification integrated circuit are pitch matched to each other.

Embodiment 630: The system of embodiment 628 or 629, comprising a first set of conductive lines or traces that transmit electrical signals between the first IC and the converter IC, wherein the first set of conductive lines or traces are electrically coupled to a first set of bump contacts or lanes on the first IC and electrically coupled to a second set of bump contacts or lanes on the converter IC, wherein the first set of bump contacts or lanes occupy a footprint having a first width w1, the second set of bump contacts or lanes occupy a footprint having a second width w2, and $0.5\times w1\leq w2\leq 2\times w1$;

wherein the first IC, the converter IC, and the analog electronic amplification IC are positioned along a first axis, the first width w1 is measured in a direction perpendicular to the first axis, and the second width w2 is measured in a direction perpendicular to the first axis.

Embodiment 631: The system of embodiment 630, comprising a third set of conductive lines or traces that transmit electrical signals between the converter IC and the analog electronic amplification IC, wherein the third set of conductive lines or traces are electrically coupled to a first set of bump contacts or lanes on the converter IC and electrically coupled to a fourth set of bump contacts or lanes on the analog electronic amplification IC, wherein the third set of bump contacts or lanes occupy a footprint having a third width w3, the fourth set of bump contacts or lanes occupy a footprint having a fourth width w4, and $0.5\times w3\leq w4\leq 2\times w3$, wherein the third width w3 is measured in a direction perpendicular to the first axis, and the fourth width w4 is measured in a direction perpendicular to the first axis.

Embodiment 632: The system of embodiment 631 in which $0.5\times w2\leq w3\leq 2\times w2$.

Embodiment 633: The system of any of embodiments 567 to 632 in which the converter integrated circuit is positioned between the first IC and the analog electronic amplification integrated circuit, the first IC has a first edge facing the converter IC, the converter IC has a first edge facing the first IC, wherein the first edge of the first IC has a first width w1, the first edge of the converter IC has a second width w2, and $0.5\times w1\leq w2\leq 2\times w1$, wherein the first IC, the converter IC, and the analog electronic amplification IC are positioned along a first axis, the first width w1 is measured in a direction perpendicular to the first axis, and the second width w2 is measured in a direction perpendicular to the first axis.

Embodiment 634: The system of embodiment 633 in which $0.75\times w1\leq w2\leq 1.5\times w1$.

Embodiment 635: The system of embodiment 634 in which $0.9\times w1\leq w2\leq 1.1\times w1$.

Embodiment 636: The system of any of embodiments 633 to 635 in which the converter IC has a second edge facing the analog electronic amplification integrated circuit, the analog electronic amplification IC has a first edge facing the converter integrated circuit, wherein the second edge of the converter IC has a third width w3, the first edge of the analog electronic amplification integrated circuit has a fourth width w4, and $0.5\times w3\leq w4\leq 2\times w3$.

Embodiment 637: The system of embodiment 636 in which $0.75\times w3\leq w4\leq 1.5\times w3$.

Embodiment 638: The system of embodiment 637 in which $0.9\times w3\leq w4\leq 1.1\times w3$.

Embodiment 639: The system of any of embodiments 633 to 638 in which $0.75\times w2\leq w3\leq 1.5\times w2$.

Embodiment 640: The system of embodiment 639 in which $0.9\times w2\leq w3\leq 1.1\times w2$.

Embodiment 641: The system of any of embodiments 567 to 640 in which the first integrated circuit comprises a first chiplet, the converter integrated circuit comprises a converter chiplet, and the analog electronic amplification IC comprises an analog electronic amplification chiplet.

Embodiment 642: The system of any of embodiments 567 to 641, comprising a fiber optic connector attached to the backside of the photonic IC.

Embodiment 643: The system of embodiment 641 or 642, comprising a rackmount server comprising a chiplet package comprising the common substrate, the first chiplet, the converter chiplet, the analog electronic amplification chiplet, and the photonic IC.

Embodiment 644: The system of embodiment 643 in which the rackmount server comprises at least one of a rackmount switch, a rackmount computer server, or a rackmount storage server.

Embodiment 645: The system of embodiment 641 or 642, comprising a vehicle comprising a chiplet package comprising the common substrate, the first chiplet, the converter chiplet, the analog electronic amplification chiplet, and the photonic IC.

Embodiment 646: The system of embodiment 641 or 642, comprising a robot comprising a chiplet package comprising the common substrate, the first chiplet, the converter chiplet, the analog electronic amplification chiplet, and the photonic IC.

Embodiment 647: The system of embodiment 641 or 642, comprising a supercomputer comprising a chiplet package comprising the common substrate, the first chiplet, the converter chiplet, the analog electronic amplification chiplet, and the photonic IC.

Embodiment 648: A method comprising:

providing a common substrate having a first set of contacts, a second set of contacts, and a third set of contacts;

wherein the common substrate comprises at least one of a silicon interposer or a substrate using silicon bridges;

mounting a first integrated circuit (IC) on the common substrate and electrically connecting a fourth set of contacts on the first IC to the first set of contacts on the common substrate;

mounting a converter IC on the common substrate and electrically connecting a fifth set of contacts on the converter IC to the second set of contacts on the common substrate;

mounting an analog electronic amplification IC and a photonic integrated circuit on the common substrate and electrically connecting a sixth set of contacts on the analog electronic amplification IC to the third set of contacts on the common substrate;

wherein the photonic integrated circuit comprises an optically active layer that comprises active photonic components, the photonic integrated circuit has an optically active side and a backside, at least some of the active photonic components are closer to the optically active side than the backside;

wherein the photonic integrated circuit comprises back-side illuminated couplers arrange in a two-dimensional configuration, each back-side illuminated coupler is configured to receive a light beam incident on the back side of the photonic integrated circuit or emit a light beam that exits the back side of the photonic integrated circuit;

wherein the photonic integrated circuit is mounted on the electronic amplification integrated circuit with the optically active side of the photonic integrated circuit facing towards the electronic amplification integrated circuit, and the active photonic components are electrically coupled to the common substrate through conductive vias in the electronic amplification integrated circuit.

Embodiment 649: The method of embodiment 648 in which the first integrated circuit comprises at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device.

Embodiment 650: The method of embodiment 648 or 649 in which the converter integrated circuit comprises at least one of an XLR (extra long reach)-to-LR (long reach) converter, an XLR-to-MR (medium reach) converter, an XLR-to-SR (short reach) converter, an XLR-to-XSR converter, an LR-to-MR converter, an LR-to-SR converter, an LR-to-XSR converter, an MR-to-SR converter, an MR-to-XSR converter, an SR-to-XSR converter, an XLR-to-BoW (bunch of wire) converter, an LR-to-BoW converter, an MR-to-BoW converter, or an XSR-to-BoW converter.

Embodiment 651: The method of embodiment 648 or 649 in which the converter integrated circuit comprises at least one of an LR-to-MR converter, an LR-to-SR converter, an LR-to-XSR converter, an MR-to-SR converter, an MR-to-XSR converter, an SR-to-XSR converter, an XLR-to-BoW (bunch of wire) converter, an LR-to-BoW converter, an MR-to-BoW converter, or an XSR-to-BoW converter.

Embodiment 652: The method of any of embodiments 648 to 650 in which the converter integrated circuit comprises at least one of an XLR (extra long reach)-to-XLR retimer, an LR (long reach)-to-LR retimer, an MR (medium reach)-to-MR retimer, a SR (short reach)-to-SR retimer, an XSR (extra short reach)-to-XSR retimer, or a BoW (bunch of wire)-to-BoW retimer.

Embodiment 653: The method of any of embodiments 648 to 650 in which the converter integrated circuit comprises at least one of an LR (long reach)-to-LR retimer, an MR (medium reach)-to-MR retimer, a SR (short reach)-to-SR retimer, an XSR (extra short reach)-to-XSR retimer, or a BoW (bunch of wire)-to-BoW retimer.

Embodiment 654: The method of any of embodiments 648 to 652 in which the analog electronic amplification integrated circuit comprises at least one of a driver amplifier or a transimpedance amplifier (TIA).

Embodiment 655: The method of any of embodiments 648 to 654 in which the photonic integrated circuit comprises optical components comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

wherein the photonic integrated circuit comprises optical waveguides to implement and/or interconnect the optical components.

Embodiment 656: The method of any of embodiments 648 to 655 in which the photonic integrated circuit comprises a first substrate and a first layer formed on the first substrate, the first substrate comprises a first material having a first refractive index, the first layer comprises a second material having a second refractive index that is smaller than the first refractive index;

wherein first substrate comprises a first side and a second side, the first side of the first substrate faces towards the first layer, the second side of the first substrate forms or faces towards the backside of the photonic integrated circuit, wherein the first layer is disposed between the first substrate and the optically active layer of the photonic integrated circuit.

Embodiment 657: The method of embodiment 656, comprising etching the first substrate to generate one or more openings that extend from the first side of the first substrate to the second side of the first substrate and exposing one or more portions of a surface of the first layer.

Embodiment 658: The method of embodiment 657, comprising forming an antireflective coating on one or more exposed portions of the surface of the first layer, in which the antireflective coating is configured to reduce reflection of light having a wavelength in a predetermined range by at least 90%.

Embodiment 659: The method of any of embodiments 656 to 658 in which the first substrate has a first refractive index greater than 3.7, and the first layer has a second refractive index less than 3.1.

Embodiment 660: The method of embodiment 659 in which the first substrate comprises a silicon substrate and the first layer comprises a buried oxide silica layer.

Embodiment 661: The method of any of embodiments 656 to 660 in which the first substrate has a thickness in a range from 100 μm to 500 μm, and the first layer has a thickness in a range from 0.5 μm to 10 μm.

Embodiment 662: The method of embodiment 661 in which the first layer has a thickness in a range from 1 μm to 5 μm.

Embodiment 663: The method of any of embodiments 656 to 662 in which etching the first substrate to generate one or more openings comprises etching the first substrate to generate one or more openings.

Embodiment 664: The method of any of embodiments 648 to 658, comprising mounting the photonic IC on the analog electronic amplification IC, and then mounting the analog electronic amplification IC on the common substrate.

Embodiment 665: The method of any of embodiments 648 to 658, comprising mounting the analog electronic amplification IC on the common substrate, and then mounting the photonic IC on the analog electronic amplification IC.

Embodiment 666: The method of any of embodiments 648 to 665 in which the photonic integrated circuit comprises an input/output interface comprising at least one of an XLR (extra long reach) SerDes (serializers/deserializers), an LR (long reach) SerDes, an MR (medium reach) SerDes, an XSR (extra short reach) SerDes, or a BoW (bunch of wire) input/output interface.

Embodiment 667: The method of any of embodiments 648 to 665 in which the photonic integrated circuit comprises an input/output interface comprising at least one of an LR (long reach) SerDes (serializers/deserializers), an MR (medium reach) SerDes, an XSR (extra short reach) SerDes, or a BoW (bunch of wire) input/output interface.

Embodiment 668: The method of any of embodiments 648 to 666 in which the first integrated circuit comprises an input/output interface comprising at least one of an XLR (extra long reach) SerDes (serializers/deserializers), an LR (long reach) SerDes, an MR (medium reach) SerDes, an XSR (extra short reach) SerDes, or a BoW (bunch of wire) input/output interface.

Embodiment 669: The method of any of embodiments 648 to 666 in which the first integrated circuit comprises an input/output interface comprising at least one of an LR (long reach) SerDes (serializers/deserializers), an MR (medium reach) SerDes, an XSR (extra short reach) SerDes, or a BoW (bunch of wire) input/output interface.

Embodiment 670: The method of any of embodiments 648 to 668 in which the active photonic components are electrically coupled to some of the contacts in the third set of contacts on the common substrate using through silicon vias (TSVs) in the electronic amplification integrated circuit.

Embodiment 671: The method of any of embodiments 648 to 670 in which the photonic integrated circuit is configured to transmit first data signals to the analog electronic amplification integrated circuit, at least a portion of the first data signals have a data rate of at least 1 Gbps, and the photonic integrated circuit is configured to receive electrical power that is transmitted from power lines on the common substrate through the conductive vias in the electronic amplification integrated circuit.

Embodiment 672: The method of any of embodiments 648 to 671 in which the photonic integrated circuit is configured to receive and/or transmit control signals through the conductive vias in the electronic amplification integrated circuit.

Embodiment 673: The method of any of embodiments 648 to 672 in which the photonic integrated circuit is configured to convert input optical signals to XSR signals, at least some of the XSR signals have a data rate of at least 1 Gbps, the analog electronic amplification integrated circuit is configured to amplify the XSR signals to generate amplified XSR signals, and the converter integrated circuit is configured to convert the amplified XSR signals to BoW signals and send the BoW signals to the first integrated circuit.

Embodiment 674: The method of embodiment 673 in which the photonic integrated circuit is configured to convert input optical signals to XSR signals, at least some of the XSR signals have a data rate of at least 10 Gbps, the analog electronic amplification integrated circuit is configured to amplify the XSR signals to generate amplified, the converter integrated circuit is configured to convert the amplified XSR signals to BoW signals and send the BoW signals to the first integrated circuit.

Embodiment 675: The method of embodiment 674 in which the photonic integrated circuit is configured to convert input optical signals to XSR signals, at least some of the XSR signals have a data rate of at least 100 Gbps, the analog electronic amplification integrated circuit is configured to amplify the XSR signals to generate amplified, the converter integrated circuit is configured to convert the amplified XSR signals to BoW signals and send the BoW signals to the first integrated circuit.

Embodiment 676: The method of any of embodiments 648 to 675 in which the first integrated circuit is configured to send BoW signals to the converter integrated circuit, at least some of the BoW signals have a data rate of at least 1 Gbps, the converter integrated circuit is configured to convert the BoW signals to XSR signals, and the analog electronic amplification integrated circuit is configured to amplify the XSR signals to generate amplified XSR signals and send the amplified XSR signals to the photonic integrated circuit.

Embodiment 677: The method of embodiment 676 in which the first integrated circuit is configured to send BoW signals to the converter integrated circuit, at least some of the BoW signals have a data rate of at least 10 Gbps to the converter integrated circuit, the converter integrated circuit is configured to convert the BoW signals to XSR signals, and the analog electronic amplification integrated circuit is configured to amplify the XSR signals to generate amplified XSR signals and send the amplified XSR signals to the photonic integrated circuit.

Embodiment 678: The method of embodiment 677 in which the first integrated circuit is configured to send BoW signals to the converter integrated circuit, at least some of the BoW signals have a data rate of at least 100 Gbps to the converter integrated circuit, the converter integrated circuit is configured to convert the BoW signals to XSR signals, and the analog electronic amplification integrated circuit is configured to amplify the XSR signals to generate amplified XSR signals and send the amplified XSR signals to the photonic integrated circuit.

Embodiment 679: The method of any of embodiments 673 to 678 in which the fifth set of contacts on the converter integrated circuit comprises a first subset of electrical contacts configured to receive or transmit BoW signals, and a second subset of electrical contacts configured to receive or transmit XSR signals, the first subset of electrical contacts comprise fine-pitched bump contacts and/or lanes, the second subset of electrical contacts comprise coarse-pitched bump contacts and/or lanes, at least some of the fine-pitched bump contacts and/or lanes have a first pitch, and at least some of the coarse-pitched bump contacts and/or lanes have a second pitch.

Embodiment 680: The method of any of embodiments 648 to 679 in which the first set of contacts, the second set of contacts, and the third set of contacts comprise a mixture of fine-pitched and coarse-pitched bump contacts and/or lanes, at least some of the fine-pitched bump contacts and/or lanes have a first pitch, and at least some of the coarse-pitched bump contacts and/or lanes have a second pitch.

Embodiment 681: The method of embodiment 680 in which the fine-pitched bump contacts and/or lanes comprise bunch-of-wire (BoW) bump contacts and/or lanes, and the coarse-pitched bump contacts and/or lanes comprise extra-short-reach (XSR) bump contacts and/or lanes.

Embodiment 682: The method of any of embodiments 648 to 681 in which the back-side illuminated couplers comprise back-side illuminated grating couplers.

Embodiment 683: The method of any of embodiments 648 to 682 in which the back-side illuminated couplers are arrange in a two-dimensional configuration that comprises at least two rows and at least eight columns of couplers.

Embodiment 684: The method of embodiment 683 in which the back-side illuminated couplers are arrange in a two-dimensional configuration that comprises at least four rows and at least eight columns of couplers.

Embodiment 685: The method of embodiment 684 in which the back-side illuminated couplers are arrange in a two-dimensional configuration that comprises at least six rows and at least eight columns of couplers.

Embodiment 686: The method of any of embodiments 648 to 685 in which the common substrate comprises a silicon interposer.

Embodiment 687: The method any of embodiments 648 to 686 in which the first integrated circuit comprises a first chiplet, the converter integrated circuit comprises a converter chiplet, and the analog electronic amplification IC comprises an analog electronic amplification chiplet.

Embodiment 688: The method of any of embodiments 648 to 687, comprising attaching a fiber optic connector to the backside of the photonic IC.

Embodiment 689: The method of embodiment 687 or 688, comprising assembling a rackmount server comprising a chiplet package comprising the common substrate, the first chiplet, the converter chiplet, the analog electronic amplification chiplet, and the photonic IC.

Embodiment 690: The method of embodiment 689 in which assembling the rackmount server comprises assembling at least one of a rackmount switch, a rackmount computer server, or a rackmount storage server.

Embodiment 691: The method of embodiment 687 or 688, comprising assembling a vehicle comprising a chiplet package comprising the common substrate, the first chiplet, the converter chiplet, the analog electronic amplification chiplet, and the photonic IC.

Embodiment 692: The method of embodiment 687 or 688, comprising assembling a robot comprising a chiplet package comprising the common substrate, the first chiplet, the converter chiplet, the analog electronic amplification chiplet, and the photonic IC.

Embodiment 693: The system of embodiment 687 or 688, comprising assembling a supercomputer comprising a chiplet package comprising the common substrate, the first chiplet, the converter chiplet, the analog electronic amplification chiplet, and the photonic IC.

Embodiment 694: A method comprising:

providing a common substrate;

mounting a first integrated circuit (IC) on the common substrate;

mounting a converter IC on the common substrate;

mounting an analog electronic amplification IC and a photonic integrated circuit on the common substrate, in which the photonic integrated circuit is mounted on the electronic amplification integrated circuit;

wherein the photonic integrated circuit comprises an optically active layer that comprises active photonic components, the photonic integrated circuit has an optically active side and a backside, at least some of the active photonic components are closer to the optically active side than the backside;

wherein the photonic integrated circuit comprises at least one back-side illuminated coupler configured to receive a light beam incident on the back side of the photonic integrated circuit or emit a light beam that exits the back side of the photonic integrated circuit;

wherein the photonic integrated circuit is mounted on the electronic amplification integrated circuit with the optically active side of the photonic integrated circuit facing towards the electronic amplification integrated circuit;

wherein the photonic integrated circuit comprises a first substrate and a first layer formed on the first substrate, the first substrate comprises a first material having a first refractive index, the first layer comprises a second material having a second refractive index that is smaller than the first refractive index;

wherein first substrate comprises a first side and a second side, the first side of the first substrate faces towards the first layer, the second side of the first substrate forms or faces towards the backside of the photonic integrated circuit, wherein the first layer is disposed between the first substrate and the optically active layer of the photonic integrated circuit; and etching the first substrate to generate one or more openings that extend from the first side of the first substrate to the second side of the first substrate and exposing one or more portions of a surface of the first layer.

Embodiment 695: The method of embodiment 694, comprising forming an antireflective coating on one or more exposed portions of the surface of the first layer, in which the antireflective coating is configured to reduce reflection of light having a wavelength in a predetermined range by at least 90%.

Embodiment 696: The method of embodiment 694 or 695 in which the first substrate has a first refractive index greater than 3.7, and the first layer has a second refractive index less than 3.1.

Embodiment 697: The method of embodiment 696 in which the first substrate comprises a silicon substrate and the first layer comprises a buried oxide silica layer.

Embodiment 698: The method of any of embodiments 694 to 697 in which the first substrate has a thickness in a range from 100 μm to 500 μm, and the first layer has a thickness in a range from 0.5 μm to 10 μm.

Embodiment 699: The method of embodiment 698 in which the first layer has a thickness in a range from 1 μm to 5 μm.

Embodiment 700: The method of any of embodiments 694 to 699 in which etching the first substrate to generate one or more openings comprises etching the first substrate to generate one or more openings.

Embodiment 701: A method comprising:

providing a temporary wafer carrier, in which a release tape is provided on the temporary wafer carrier;

placing a first integrated circuit (IC) on the release tape;

placing a converter IC on the release tape;

placing an analog electronic amplification IC and a photonic integrated circuit on the release tape, in which the photonic integrated circuit is mounted on the electronic amplification integrated circuit;

overmolding the first IC, the converter IC, the analog electronic amplification IC, the photonic IC, and at least a portion of the release tape with a molding compound;

removing the temporary wafer carrier and the release tape from the first IC, the converter IC, the analog electronic amplification IC, and the molding compound; and forming a redistribution layer that comprises electrical contacts that are electrically connected to the first IC, the converter IC, and the analog electronic amplification IC.

Embodiment 702: The method of embodiment 701, comprising performing a planarization process by grinding a backside of the molding compound, the backside of the molding compound faces away from the release tape, wherein the grinding comprises grinding the molding compound until at least one of the first IC, the converter IC, or the photonic integrated circuit is exposed.

Embodiment 703: The method of embodiment 702 in which the planarization process comprises grinding the molding compound and at least one of the first IC, the converter IC, or the photonic integrated circuit until the first IC, the converter IC, and the photonic integrated circuit are exposed and has a substantially similar height.

Embodiment 704: The method of photonic integrated circuit comprises an optically active layer that comprises active photonic components, the photonic integrated circuit has an optically active side and a backside, at least some of the active photonic components are closer to the optically active side than the backside;

wherein the photonic integrated circuit comprises at least one back-side illuminated coupler configured to receive a light beam incident on the back side of the photonic integrated circuit or emit a light beam that exits the back side of the photonic integrated circuit;

wherein the photonic integrated circuit is mounted on the electronic amplification integrated circuit with the optically active side of the photonic integrated circuit facing towards the electronic amplification integrated circuit;

Embodiment 705: A method comprising:

providing a temporary wafer carrier, in which a release tape is provided on the temporary wafer carrier;

forming a redistribution layer on the release tape, in which the redistribution layer comprises a first side and a second side, the first side of the redistribution layer faces the release tape;

mounting a first integrated circuit (IC) on the second side of the redistribution layer, in which electrical contacts on the first IC are mated with corresponding electrical contacts on the redistribution layer;

mounting a converter IC on the second side of the redistribution layer, in which electrical contacts on the converter IC are mated with corresponding electrical contacts on the redistribution layer;

mounting an analog electronic amplification IC and a photonic integrated circuit on the second side of the redistribution layer, in which the photonic integrated circuit is mounted on the electronic amplification integrated circuit, and electrical contacts on the analog electronic amplification IC are mated with corresponding electrical contacts on the redistribution layer;

overmolding the first IC, the converter IC, the analog electronic amplification IC, the photonic IC, and at least a portion of the redistribution layer with a molding compound;

removing the temporary wafer carrier and the release tape from the redistribution layer; and forming contact pads on the second side of the redistribution layer, in which at least some of the contact pads are electrically coupled to the first IC, the converter IC, and the analog electronic amplification IC.

Embodiment 706: A system comprising:

a common substrate;

a first data processing device;

a converter device;

an analog electronic amplification device configured to amplify electrical signals;

a photonic device;

wherein the converter device is configured to convert signals between the first data processing device and the analog electronic amplification device;

wherein the analog electronic amplification circuit is configured to amplify electrical signals sent to or from the photonic device;

wherein the first data processing device is mounted on the common substrate;

wherein the photonic device comprises an optically active layer that comprises active photonic components, the photonic device has an optically active side and a backside, at least some of the active photonic components are closer to the optically active side than the backside;

wherein the photonic device comprises back-side illuminated couplers arrange in a two-dimensional configuration, each back-side illuminated coupler is configured to receive a light beam incident on the back side of the photonic device or emit a light beam that exits the back side of the photonic device;

wherein the photonic device is oriented such that the optically active side of the photonic integrated circuit faces in a direction towards the common substrate.

Embodiment 707: The system of embodiment 706 in which the photonic device comprises optical components comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

wherein the photonic device comprises optical waveguides to implement and/or interconnect the optical components.

Embodiment 708: The system of embodiment 706 or 707 in which the photonic device comprises a first substrate and a first layer formed on the first substrate, the first substrate comprises a first material having a first refractive index, the first layer comprises a second material having a second refractive index that is smaller than the first refractive index, wherein first substrate comprises a first side and a second side, the first side of the first substrate faces towards the first layer, the second side of the first substrate forms or faces towards the backside of the photonic device, wherein the first layer is disposed between the first substrate and the optically active layer of the photonic device, wherein the first substrate defines one or more openings that extend from the first side of the first substrate to the second side of the first substrate to allow one or more light beams directed toward the backside of the photonic device to pass through the one or more openings to reach the first layer.

Embodiment 709: The system of embodiment 708 in which the one or more openings in the first substrate exposes one or more regions of a surface of the first layer, and an antireflective coating is provided on the exposed one or more regions of the surface of the first layer, the antireflective coating is configured to reduce reflection of light having a wavelength in a predetermined range by at least 90%.

Embodiment 710: The system of embodiment 708 or 709 in which an antireflective coating is provided on the second side of the first substrate.

Embodiment 711: The system of any of embodiments 708 to 710 in which the first substrate has a first refractive index greater than 3.7, and the first layer has a second refractive index less than 3.1.

Embodiment 712: The system of embodiment 711 in which the first substrate comprises a silicon substrate and the first layer comprises a buried oxide silica layer.

Embodiment 713: The system of any of embodiments 708 to 712 in which the first substrate has a thickness in a range from 100 μm to 500 μm, and the first layer has a thickness in a range from 0.5 μm to 10 μm.

Embodiment 714: The system of embodiment 713 in which the first layer has a thickness in a range from 1 μm to 5 μm.

Embodiment 715: The system of any of embodiments 706 to 714 in which the common substrate comprises at least one of a printed circuit board, a ceramic substrate, an organic high density build-up substrate, a silicon interposer, a substrate using silicon bridges, or a substrate made in a fan-out wafer-level packaging (FoWLP) process.

Embodiment 716: The system of any of embodiments 706 to 715 in which the data processing device comprises a data processing chiplet, the converter device comprises a converter chiplet, the analog electronic amplification device comprises an analog electronic amplification chiplet, and the photonic device comprises a photonic IC.

Embodiment 717: The system of embodiment 716 in which the photonic integrated circuit is mounted on the analog electronic amplification chiplet, and the analog electronic amplification chiplet is mounted on the common substrate.

Embodiment 718: The system of embodiment 717 in which the optically active side of the photonic integrated circuit faces towards the analog electronic amplification chiplet, and at least some of the active photonic components are electrically coupled to the common substrate through conductive vias in the analog electronic amplification chiplet.

Embodiment 719: The system of embodiment 716 in which the photonic integrated circuit is mounted on the analog electronic amplification chiplet, the analog electronic amplification chiplet is mounted on the converter chiplet, and the converter chiplet is mounted on the common substrate.

Embodiment 720: The system of embodiment 719 in which the optically active side of the photonic integrated circuit faces towards the analog electronic amplification chiplet, and at least some of the active photonic components are electrically coupled to the common substrate through conductive vias in the analog electronic amplification chiplet and conductive vias in the converter chiplet.

Embodiment 721: The system of embodiment 716 in which the photonic integrated circuit is mounted on the common substrate, the analog electronic amplification chiplet is mounted on the common substrate, and the converter chiplet is mounted on the common substrate.

Embodiment 722: The system of embodiment 716 in which the photonic integrated circuit and the analog electronic amplification chiplet are monolithically integrated to form a single amplifier-photonic chiplet, the amplifier-photonic chiplet is mounted on the converter chiplet, and the converter chiplet is mounted on the common substrate.

Embodiment 723: The system of embodiment 716 in which the photonic integrated circuit, the analog electronic amplification chiplet, and the converter chiplet are monolithically integrated to form a single converter-amplifier-photonic chiplet, and the converter-amplifier-photonic chiplet is mounted on the common substrate.

Embodiment 724: The system of embodiment 716 in which the photonic integrated circuit is mounted on a silicon carrier, the analog electronic amplification chiplet is mounted on the silicon carrier, the converter chiplet is mounted on the silicon carrier, and the silicon carrier is mounted on the common substrate.

Embodiment 725: The system of embodiment 724 in which the silicon carrier comprises fine-pitch through silicon vias and coarse-pitch through silicon vias, the fine-pitch through silicon vias have a first minimum distance d1, the coarse-pitch through silicon vias have a second minimum distance d2, d1<d2.

Embodiment 726: The system of embodiment 716 in which the photonic integrated circuit is mounted on a silicon carrier, the analog electronic amplification chiplet is mounted on the silicon carrier, the silicon carrier is mounted on the common substrate, and the converter chiplet is mounted on the common substrate.

Embodiment 727: The system of embodiment 716 in which the analog electronic amplification chiplet is mounted on a silicon carrier, the converter chiplet is mounted on the silicon carrier, the silicon carrier is mounted on the common substrate, and the photonic IC is mounted on the common substrate.

Embodiment 728: A method comprising:

providing a common substrate;

mounting a first data processing device on the common substrate;

mounting, directly or indirectly, a converter device on the common substrate;

mounting, directly or indirectly, an analog electronic amplification device on the common substrate, in which the analog electronic amplification device is configured to amplify electrical signals;

mounting, directly or indirectly, a photonic device on the common substrate;

wherein the converter device is configured to convert signals between the first data processing device and the analog electronic amplification device;

wherein the analog electronic amplification circuit is configured to amplify electrical signals sent to or from the photonic device;

wherein the first data processing device is mounted on the common substrate;

wherein the photonic device comprises an optically active layer that comprises active photonic components, the photonic device has an optically active side and a backside, at least some of the active photonic components are closer to the optically active side than the backside;

wherein the photonic device comprises back-side illuminated couplers arrange in a two-dimensional configuration, each back-side illuminated coupler is configured to receive a light beam incident on the back side of the photonic device or emit a light beam that exits the back side of the photonic device;

orienting the photonic device such that the optically active side of the photonic integrated circuit faces in a direction towards the common substrate.

Embodiment 729: The method of embodiment 728 in which the photonic device comprises optical components comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

wherein the photonic device comprises optical waveguides to implement and/or interconnect the optical components.

Embodiment 730: The method of embodiment 728 or 729 in which the photonic device comprises a first substrate and a first layer formed on the first substrate, the first substrate comprises a first material having a first refractive index, the first layer comprises a second material having a second refractive index that is smaller than the first refractive index, wherein first substrate comprises a first side and a second side, the first side of the first substrate faces towards the first layer, the second side of the first substrate forms or faces towards the backside of the photonic device, wherein the first layer is disposed between the first substrate and the optically active layer of the photonic device, wherein the method comprises etching the first substrate to define one or more openings that extend from the first side of the first substrate to the second side of the first substrate to allow one or more light beams directed toward the backside of the photonic device to pass through the one or more openings to reach the first layer.

Embodiment 731: The method of embodiment 730 in which the one or more openings in the first substrate exposes one or more regions of a surface of the first layer, and the method comprises forming an antireflective coating on the exposed one or more regions of the surface of the first layer, the antireflective coating is configured to reduce reflection of light having a wavelength in a predetermined range by at least 90%.

Embodiment 732: The method of embodiment 730 or 731, comprising forming an antireflective coating on the second side of the first substrate, in which the antireflective coating is configured to reduce reflection of light having a wavelength in a predetermined range by at least 90%.

Embodiment 733: The method of any of embodiments 730 to 732 in which the first substrate has a first refractive index greater than 3.7, and the first layer has a second refractive index less than 3.1.

Embodiment 734: The method of embodiment 733 in which the first substrate comprises a silicon substrate and the first layer comprises a buried oxide silica layer.

Embodiment 735: The method of any of embodiments 730 to 734 in which the first substrate has a thickness in a range from 100 μm to 500 μm, and the first layer has a thickness in a range from 0.5 μm to 10 μm.

Embodiment 736: The method of embodiment 735 in which the first layer has a thickness in a range from 1 μm to 5 μm.

Embodiment 737: The method of any of embodiments 728 to 736 in which the common substrate comprises at least one of a printed circuit board, a ceramic substrate, an organic high density build-up substrate, a silicon interposer, a substrate using silicon bridges, or a substrate made in a fan-out wafer-level packaging (FoWLP) process.

Embodiment 738: The method of any of embodiments 728 to 737 in which the data processing device comprises a data processing chiplet, the converter device comprises a converter chiplet, the analog electronic amplification device comprises an analog electronic amplification chiplet, and the photonic device comprises a photonic IC.

Embodiment 739: The method of embodiment 738, comprising mounting the photonic integrated circuit on the analog electronic amplification chiplet, and mounting the analog electronic amplification chiplet on the common substrate.

Embodiment 740: The method of embodiment 739, comprising orienting the photonic IC such that the optically active side of the photonic integrated circuit faces towards the analog electronic amplification chiplet, and electrically coupling at least some of the active photonic components of the photonic IC to the common substrate through conductive vias in the analog electronic amplification chiplet.

Embodiment 741: The method of embodiment 738, comprising mounting the photonic integrated circuit on the analog electronic amplification chiplet, mounting the analog electronic amplification chiplet on the converter chiplet, and mounting the converter chiplet on the common substrate.

Embodiment 742: The method of embodiment 741, comprising orienting the photonic IC such that the optically active side of the photonic integrated circuit faces towards the analog electronic amplification chiplet, and electrically coupling at least some of the active photonic components of the photonic IC to the common substrate through conductive vias in the analog electronic amplification chiplet and conductive vias in the converter chiplet.

Embodiment 743: The method of embodiment 738, comprising mounting the photonic integrated circuit on the common substrate, mounting the analog electronic amplification chiplet on the common substrate, and mounting the converter chiplet on the common substrate.

Embodiment 744: The method of embodiment 738 in which the photonic integrated circuit and the analog electronic amplification chiplet are monolithically integrated to form a single amplifier-photonic chiplet, and the method comprises mounting the amplifier-photonic chiplet on the converter chiplet, and mounting the converter chiplet on the common substrate.

Embodiment 745: The method of embodiment 738 in which the photonic integrated circuit, the analog electronic amplification chiplet, and the converter chiplet are monolithically integrated to form a single converter-amplifier-photonic chiplet, and the method comprises mounting the converter-amplifier-photonic chiplet on the common substrate.

Embodiment 746: The method of embodiment 738, comprising mounting the photonic integrated circuit on a silicon carrier, mounting the analog electronic amplification chiplet on the silicon carrier, mounting the converter chiplet on the silicon carrier, and mounting the silicon carrier on the common substrate.

Embodiment 747: The method of embodiment 746 in which the silicon carrier comprises fine-pitch through silicon vias and coarse-pitch through silicon vias, the fine-pitch through silicon vias have a first minimum distance d1, the coarse-pitch through silicon vias have a second minimum distance d2, d1<d2.

Embodiment 748: The method of embodiment 728, comprising mounting the photonic integrated circuit on a silicon carrier, mounting the analog electronic amplification chiplet on the silicon carrier, mounting the silicon carrier on the common substrate, and mounting the converter chiplet on the common substrate.

Embodiment 749: The method of embodiment 728, comprising mounting the analog electronic amplification chiplet on a silicon carrier, mounting the converter chiplet on the silicon carrier, mounting the silicon carrier on the common substrate, and mounting the photonic IC on the common substrate.

Embodiment 750: A system comprising:

a common substrate;

a first integrated circuit configured to processes data;

a converter integrated circuit;

an analog electronic amplification integrated circuit configured to amplify electrical signals;

a photonic integrated circuit;

wherein the first integrated circuit, the converter integrated circuit, the analog electronic amplification integrated circuit, and the photonic integrated circuit are mounted on the common substrate;

wherein the common substrate comprises at least one of an organic substrate, a ceramic substrate, a silicon interposer, a substrate using silicon bridges, or a substrate made in a fan-out wafer-level packaging (FoWLP) process;

wherein the photonic integrated circuit comprises an optically active layer that comprises active photonic components, the photonic integrated circuit has an optically active side and a backside, at least some of the active photonic components are closer to the optically active side than the backside;

wherein the photonic integrated circuit comprises back-side illuminated couplers arrange in a two-dimensional configuration, each back-side illuminated coupler is configured to receive a light beam incident on the back side of the photonic integrated circuit or emit a light beam that exits the back side of the photonic integrated circuit;

wherein the optically active side of the photonic integrated circuit faces towards the common substrate;

wherein the common substrate comprises first signal lines configured to enable transmission of electrical signals between the first integrated circuit and the converter integrated circuit, second signal lines configured to enable transmission of second electrical signals between the converter integrated circuit and the analog electronic amplification integrated circuit, and third signal lines configured to enable transmission of third electrical signals between the analog electronic amplification integrated circuit and the photonic integrated circuit.

Embodiment 751: An apparatus comprising:

an optical input/output chiplet interfacing to an electronic chiplet in a pitch-matched manner, wherein the optical input/output chiplet is configured to be vertically optically coupled to a 2D array of optical fiber cores.

Embodiment 752: The apparatus of embodiment 751 in which the optical input/output chiplet has a first edge, the electronic chiplet has a first edge, a first set of electrically conductive lines extend from the first edge of the optical input/output chiplet to the first edge of the electronic chiplet, the first set of electrically conductive lines are configured to transmit all of the main surface that extends along an x-y plane, the optical input/output chiplet has a first edge, the electronic chiplet has a first edge, the first edge of the optical input/output chiplet faces in a direction towards the first edge of the electronic chiplet the number of fiber cores in the y-direction is at least as large as the number of fiber cores in the x-direction, in which x-direction extending parallel to the edges along which the two chiplets are mounted (i.e., the "beachfront"), y-direction extending perpendicular to the edges along which the two chiplets are mounted (i.e., the direction of the data flow);

wherein the optical chiplet has more than one 2D fiber arrays connected to it.

What is claimed is:

1. A system comprising:

a first chiplet comprising at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device;

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification module comprising at least one of a driver amplifier or a transimpedance amplifier, and configured to process electrical signals sent to or from the photonic module;

a converter module comprising a serializer-deserializer (SerDes) circuit, the converter module configured to convert signals between a first interface and a second interface, in which the converter module is configured to communicate with the first chiplet using the first interface, and the converter module is configured to communicate with the electronic amplification module using the second interface; and an optical fiber connector attached to the photonic module, wherein the system is configured to maintain a shoreline bandwidth density from the first chiplet to the optical fiber connector, wherein the optical fiber connector is configured to be optically coupled to a two-dimensional arrangement of fiber cores, wherein the photonic module and the optical fiber connector are configured to operate at a specified bandwidth such that the optical fiber connector has a fifth shoreline bandwidth density S5, and wherein the first interface between the first chiplet and the converter module has a first shoreline bandwidth density S1, and S5 is in a range from 0.5×S1 to 2×S1.

2. The system of claim 1 in which each of the first and second chiplets comprises a semiconductor die or a semiconductor die stack.

3. The system of claim 1 in which the photonic module comprises a plurality of grating couplers that are arranged in a two-dimensional pattern.

4. The system of claim 3 in which the plurality of grating couplers comprise at least four rows and at least four columns of grating couplers.

5. The system of claim 1, comprising a fiber array connector attached to the photonic module, in which the fiber array connector is configured to be coupled to a fiber optic cable comprising a two-dimensional arrangement of fiber cores.

6. The system of claim 5 in which the two-dimensional arrangement of fiber cores comprises an array of at least four rows and at least four columns of fiber cores.

7. The system of claim 1 in which the first interface between the first chiplet and the converter module has a shoreline bandwidth density of at least 1 Gbps/mm.

8. The system of claim 7 in which the first interface between the first chiplet and the converter module has the shoreline bandwidth density of at least 2000 Gbps/mm.

9. The system of claim 1 in which S5 is in a range from 0.9×S1 to 1.1×S1.

10. The system of claim 1 in which the converter module has a second shoreline bandwidth density S2, the electronic amplification module has a third shoreline bandwidth density S3, the second chiplet has a fourth shoreline bandwidth density S4, wherein S2 is in a range from 0.5×S1 to 2×S1, and S3 is in a range from 0.5×S2 to 2×S2.

11. The system of claim 10 in which S2 is in a range from 0.9×S1 to 1.1×S1, and S3 is in a range from 0.9×S2 to 1.1×S2.

12. The system of claim 1 in which the first chiplet, the second chiplet, the electronic amplification module, the converter module, the first interface, and the second interface are assembled into a co-packaged optical-electrical module using a chiplet packaging technique.

13. The system of claim 1 in which the first interface, the converter module, the second interface, the electronic amplification module, and the photonic module are configured to enable the first chiplet to communicate with an external device through an optical link at a data rate of at least 1 terabits per second.

14. The system of claim 13 in which the first interface, the converter module, the second interface, the electronic amplification module, and the photonic module are configured to enable the first chiplet to communicate with the external device through the optical link at a data rate of at least 100 terabits per second.

15. The system of claim 1 in which the optical link comprises at least one of multiple optical fibers, multiple cores of a multi-core optical fiber, or multiple cores of multi-core optical fibers.

16. The system of claim 1 in which the photonic module is configured to at least one of transmit or receive wavelength division multiplexed signals through an optical link coupled to the optical fiber connector.

17. The system of claim 1 in which the second chiplet comprises the electronic amplification module, wherein the photonic module and electronic amplification module are formed on a monolithic semiconductor die.

18. The system of claim 17 in which the second chiplet comprises the converter module and the second interface, wherein the photonic module, the electronic amplification module, the second interface, and the converter module are formed on the monolithic semiconductor die.

19. The system of claim 1 in which the second interface comprises electrical traces between the converter module and the electronic amplification module.

20. The system of claim 1 in which the first interface comprises electrical traces between the converter module and the first chiplet.

21. The system of claim 1 in which the first chiplet comprises the converter module and the first interface, wherein the first chiplet, the converter module, and the first interface are formed on a monolithic semiconductor die.

22. The system of claim 21 in which the first chiplet comprises the converter module, the first interface, the second interface, and the electronic amplification module, wherein the first chiplet, the first interface, the converter module, the second interface, and the electronic amplification module are formed on the monolithic semiconductor die.

23. The system of claim 1 in which the first chiplet comprises a data processing module, and the first interface comprises electrical traces between the converter module and the data processing module.

24. The system of claim 23 in which the second interface comprises electrical traces between the converter module and the electronic amplification module.

25. The system of claim 1, comprising a common substrate, in which the first chiplet and the second chiplet are mounted on the common substrate.

26. The system of claim 25 in which the common substrate comprises at least one of an organic substrate, a ceramic substrate, a silicon interposer, a substrate using one or more silicon bridges, or a substrate made in a fan-out wafer-level packaging (FoWLP) process.

27. The system of claim 1 in which each of the first and second chiplets comprises a semiconductor substrate on which electrical or optical components are formed, and the chiplet is not covered by an encapsulant or molding compound prior to being mounted on the common substrate.

28. The system of claim 1, comprising a third chiplet comprising the converter module.

29. The system of claim 28 in which the first chiplet, the second chiplet, the third chiplet, the electronic amplification module, the first interface, and the second interface are assembled into a co-packaged optical-electrical module using a chiplet packaging technique.

30. The system of claim 28 in which the third chiplet comprises the electronic amplification module, wherein the converter module, the second interface, and the electronic amplification module are formed on a monolithic semiconductor die.

31. The system of claim 30 in which the first chiplet, the second chiplet, the third chiplet, and the first interface are assembled into a co-packaged optical-electrical module using a chiplet packaging technique.

32. The system of claim 28, comprising a common substrate, in which the first chiplet, the second chiplet, and the third chiplet are mounted on the common substrate.

33. The system of claim 1, comprising a fourth chiplet comprising the electronic amplification module.

34. The system of claim 33 in which the first chiplet, the second chiplet, the third chiplet, the fourth chiplet, the first interface, and the second interface are assembled into a co-packaged optical-electrical module using a chiplet packaging technique.

35. The system of claim 33, comprising a common substrate, in which the first chiplet, the second chiplet, the third chiplet, and the fourth chiplet are mounted on the common substrate.

36. The system of claim 1 in which the first chiplet comprises the converter module.

37. The system of claim 1 in which the first chiplet comprises the converter module and the electronic amplification module.

38. The system of claim 1 in which the second chiplet comprises the electronic amplification module.

39. The system of claim 1 in which the second chiplet comprises the electronic amplification module and the converter module.

40. The system of claim 1 in which the converter module is configured to convert from a first set of a first number of bit streams, each at a first bit rate, to a second set of a second number of bit streams, each at a second bit rate.

41. The system of claim 40 in which the converter module adds coding overhead to the first set of the first number of bit streams in the process of converting the first set of the first number of bit streams to the second set of the second number of bit streams.

42. The system of claim 40 in which the first set of the first number of bit streams is transmitted between the first chiplet and the converter module, and the second set of the second number of bit streams is transmitted between the converter module and the electronic amplification module.

43. The system of claim 42 in which the second bit rate is at least 1 Gbps.

44. The system of claim 43 in which the second bit rate is at least 100 Gbps.

45. The system of claim 40 in which the product of the first number of bit streams and the first bit rate is approximately equal to the product of the second number of bit streams and the second bit rate.

46. The system of claim 45 in which the product of the first number of bit streams and the first bit rate is in a range from 66% to 150% of the product of the second number of bit streams and the second bit rate.

47. The system of claim 40 in which the second bit rate is at least twice the first bit rate.

48. The system of claim 47 in which the second bit rate is at least 8 times the first bit rate.

49. The system of claim 1 in which the converter module comprises at least one of an LR (long reach)-to-BoW converter, an MR (medium reach)-to-BoW converter, a SR (short reach)-to-BoW converter, a VSR (very short reach)-to-BoW converter, an XSR (extra short reach)-to-BoW converter, a USR (ultra short reach)-to-BoW converter, an LR-to-AIB converter, an MR-to-AIB converter, an SR-to-AIB converter, a VSR-to-AIB converter, an XSR-to-AIB converter, a USR-to-AIB converter, an LR-to-UCIe converter, an MR-to-UCIe converter, an SR-to-UCIe converter, a VSR-to-UCIe converter, an XSR-to-UCIe converter, or a USR-to-UCIe converter.

50. The system of claim 49 in which the first interface complies with at least one of BoW specification, AIB specification, or UCIe specification, wherein the second interface complies with at least one of LR specification, MR specification, SR specification, VSR specification, or XSR specification.

51. The system of claim 1 in which the converter module comprises at least one of an LR-to-MR converter, an LR-to-SR converter, an LR-to-VSR converter, an LR-to-XSR converter, an MR-to-SR converter, an MR-to-VSR converter, an MR-to-XSR converter, a VSR-to-XSR converter, or a SR-to-XSR converter.

52. The system of claim 51 in which the first interface complies with at least one of LR specification, MR specification, SR specification, VSR specification, or XSR specification, wherein the second interface complies with at least one of LR specification, MR specification, SR specification, VSR specification, or XSR specification.

53. The system of claim 1 in which the converter module comprises a continuous-time linear equalizer.

54. The system of claim 1 in which the electronic amplification module comprises a continuous-time linear equalizer.

55. The system of claim 1 in which the converter module comprises at least one of an LR (long reach)-to-LR retimer, an MR (medium reach)-to-MR retimer, a SR (short reach)-to-SR retimer, a VSR (very short reach)-to-VSR retimer, an XSR (extra short reach)-to-XSR retimer, a BoW (bunch of wire)-to-BoW retime, an AIB (advanced interface bus)-to-AIB retimer, or a UCIe (universal chiplet interconnect express)-to-UCIe retimer.

56. The system of claim 1 in which the first interface complies with at least one of LR specification, MR specification, SR specification, VSR specification, XSR specification, BoW specification, AIB specification, or UCIe specification, wherein the second interface complies with a same specification as the first interface.

57. A system comprising:

a first chiplet comprising at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device;

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification module comprising at least one of a driver amplifier or a transimpedance amplifier, and configured to process electrical signals sent to or from the photonic module;

a converter module comprising a serializer-deserializer (SerDes) circuit, the converter module configured to convert signals between a first interface and a second interface, wherein the converter module is configured to communicate with the first chiplet using the first interface, and the converter module is configured to communicate with the electronic amplification module using the second interface; and an optical fiber connector attached to the photonic module, wherein the system is configured to maintain a shoreline bandwidth density from the first chiplet to the optical fiber connector, wherein the first interface between the first chiplet and the converter module has a first shoreline bandwidth density S1, the converter module has a second shoreline bandwidth density S2, the electronic amplification module has a third shoreline bandwidth density S3, and the second chiplet has a fourth shoreline bandwidth density S4, and wherein S2 is in a range from 0.5×S1 to 2×S1, and S3 is in a range from 0.5×S2 to 2×S2.

58. The system of claim 57 in which S2 is in a range from 0.9×S1 to 1.1×S1, and S3 is in a range from 0.9×S2 to 1.1×S2.

59. The system of claim 57 in which S4 is in a range from 0.5×S3 to 2×S3.

60. The system of claim 57 in which the optical fiber connector is configured to be optically coupled to a two-dimensional arrangement of fiber cores comprising at least four rows and at least four columns of fiber cores.

61. A system comprising:

a first chiplet comprising at least one of a network switch, a central processor unit, a graphics processor unit, a tensor processing unit, a neural network processor, an artificial intelligence accelerator, a digital signal processor, a microcontroller, an application specific integrated circuit (ASIC), or a data storage device;

a second chiplet comprising a photonic module comprising at least one of optical switches, optical couplers, optical routers, optical splitters, optical multiplexers, optical demultiplexers, optical filters, optical modulators, optical phase shifters, lasers, optical amplifiers, wavelength converters, optical-to-electrical (O/E) signal converters, or electrical-to-optical (E/O) signal converters;

an electronic amplification module comprising at least one of a driver amplifier or a transimpedance amplifier, and configured to process electrical signals sent to or from the photonic module; and a converter module comprising a serializer-deserializer (SerDes) circuit, the converter module configured to convert signals between a first interface and a second interface, wherein the converter module is configured to communicate with the first chiplet using the first interface, and the converter module is configured to communicate with the electronic amplification module using the second interface, wherein the converter module is configured to convert from a first set of a first number of bit streams, each at a first bit rate, to a second set of a second number of bit streams, each at a second bit rate, wherein the first set of the first number of bit streams is transmitted between the first chiplet and the converter module, and the second set of the second number of bit streams is transmitted between the converter module and the electronic amplification module, and wherein a product of the first number of bit streams and the first bit rate is in a range from 66% to 150% of a product of the second number of bit streams and the second bit rate.

62. The system of claim 61 in which the second bit rate is at least 1 Gbps.

63. The system of claim 61 in which the second bit rate is at least 100 Gbps.

64. The system of claim 61 in which the converter module adds coding overhead to the first set of the first number of bit streams in the process of converting the first set of the first number of bit streams to the second set of the second number of bit streams.

65. The system of claim 61 in which the second bit rate is at least twice the first bit rate.

66. The system of claim 61 in which the first interface complies with at least one of BoW specification, AIB specification, or UCIe specification, and the second interface complies with at least one of LR specification, MR specification, SR specification, VSR specification, or XSR specification.

* * * * *